United States Patent
Penha et al.

(10) Patent No.: US 9,706,127 B2
(45) Date of Patent: Jul. 11, 2017

(54) DEVICES AND METHODS FOR CAPTURING AND INTERACTING WITH ENHANCED DIGITAL IMAGES

(71) Applicant: Apple Inc., Cupertino, CA (US)

(72) Inventors: Henrique D. Penha, San Francisco, CA (US); Gregory M. Apodaca, Saratoga, CA (US); Brendan J. Langoulant, San Francisco, CA (US); Behkish J. Manzari, San Francisco, CA (US); Charles A. Mezak, San Francisco, CA (US); Pavel Pivonka, San Francisco, CA (US); Justin S. Titi, Morgan Hill, CA (US); Simon Bovet, Zurich (CH)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/864,601

(22) Filed: Sep. 24, 2015

(65) Prior Publication Data

US 2016/0357387 A1    Dec. 8, 2016

Related U.S. Application Data

(63) Continuation of application No. 14/863,432, filed on Sep. 23, 2015.
(Continued)

(51) Int. Cl.
*G06F 3/0488* (2013.01)
*G11B 27/031* (2006.01)
(Continued)

(52) U.S. Cl.
CPC ....... *H04N 5/23293* (2013.01); *G06F 3/0485* (2013.01); *G06F 3/0487* (2013.01);
(Continued)

(58) Field of Classification Search
CPC .... G06F 3/0488; G06F 3/0485; G06F 1/1643; G06F 1/1692; G06F 3/0412;
(Continued)

(56) References Cited

U.S. PATENT DOCUMENTS

| | | |
|---|---|---|
| 5,374,787 A | 12/1994 | Miller et al. |
| 5,463,722 A | 10/1995 | Venolia |

(Continued)

FOREIGN PATENT DOCUMENTS

| | | |
|---|---|---|
| CN | 1808362 A | 7/2006 |
| CN | 101222704 A | 7/2008 |

(Continued)

OTHER PUBLICATIONS

Agarwal, "How to Copy and Paste Text on Windows Phone 8," Guiding Tech, http://web.archive.org/web20130709204246/http://www.guidingtech.com/20280/copy-paste-text-windows-phone-8/, Jul. 9, 2013, 10 pages.

(Continued)

Primary Examiner — Mekonnen Dagnew
(74) Attorney, Agent, or Firm — Morgan, Lewis & Bockius LLP

(57) ABSTRACT

An electronic device that includes a touch-sensitive surface stores a plurality of sequences of images. The device displays a first representative image for a first sequence of images in a movable first area on a display. The device detects a gesture on the touch-sensitive surface, the gesture including movement by a contact that corresponds to movement in a first direction on the display. In response to detecting the gesture on the touch-sensitive surface: the device moves the first area in the first direction on the display; moves a movable second area in the first direction on the display; and, in accordance with a determination that sequence-display criteria are met, displays, in chronological (Continued)

order in the second area, at least some images for a second sequence of images acquired by the camera before acquiring a second representative image for the second sequence of images.

45 Claims, 182 Drawing Sheets

Related U.S. Application Data

(60) Provisional application No. 62/215,689, filed on Sep. 8, 2015, provisional application No. 62/172,233, filed on Jun. 8, 2015, provisional application No. 62/172,223, filed on Jun. 7, 2015.

(51) Int. Cl.
| | |
|---|---|
| H04N 5/232 | (2006.01) |
| G06F 3/0487 | (2013.01) |
| G06F 3/0484 | (2013.01) |
| G06K 9/00 | (2006.01) |
| H04N 1/00 | (2006.01) |
| H04N 1/21 | (2006.01) |
| H04N 5/235 | (2006.01) |
| G06F 3/0485 | (2013.01) |
| G11B 27/34 | (2006.01) |
| G06F 3/0481 | (2013.01) |
| H04N 101/00 | (2006.01) |

(52) U.S. Cl.
CPC ........ *G06F 3/0488* (2013.01); *G06F 3/04817* (2013.01); *G06F 3/04842* (2013.01); *G06F 3/04845* (2013.01); *G06K 9/00624* (2013.01); *G11B 27/031* (2013.01); *G11B 27/34* (2013.01); *H04N 1/00204* (2013.01); *H04N 1/2125* (2013.01); *H04N 1/2145* (2013.01); *H04N 5/2353* (2013.01); *H04N 5/23216* (2013.01); *H04N 5/23222* (2013.01); *G06T 2207/10016* (2013.01); *H04N 2101/00* (2013.01)

(58) Field of Classification Search
CPC ............... G06F 3/0416; G06F 3/04883; G06F 3/04886; G06F 1/1618; G06F 1/162; G06F 1/1622; G11B 27/031; G11B 27/34; H04N 5/23293; H04N 1/00411; H04N 1/2125; H04N 1/00501; G08B 13/19684
See application file for complete search history.

(56) References Cited

U.S. PATENT DOCUMENTS

| | | | |
|---|---|---|---|
| 5,510,813 A | 4/1996 | Makinwa et al. |
| 5,555,354 A | 9/1996 | Strasnick et al. |
| 5,559,301 A | 9/1996 | Bryan, Jr. et al. |
| 5,793,360 A | 8/1998 | Fleck et al. |
| 5,801,692 A | 9/1998 | Muzio et al. |
| 5,805,144 A | 9/1998 | Scholder et al. |
| 5,825,352 A | 10/1998 | Bisset et al. |
| 5,844,560 A | 12/1998 | Crutcher et al. |
| 5,872,922 A | 2/1999 | Hogan et al. |
| 5,946,647 A | 8/1999 | Miller et al. |
| 6,002,397 A | 12/1999 | Jaaskelainen, Jr. |
| 6,031,989 A | 2/2000 | Cordell |
| 6,088,019 A | 7/2000 | Rosenberg |
| 6,088,027 A | 7/2000 | Konar et al. |
| 6,111,575 A | 8/2000 | Martinez et al. |
| 6,208,329 B1 | 3/2001 | Ballare |
| 6,208,340 B1 | 3/2001 | Amin et al. |
| 6,219,034 B1 | 4/2001 | Elbing et al. |
| 6,243,080 B1 | 6/2001 | Molne |
| 6,252,594 B1 | 6/2001 | Xia et al. |
| 6,396,523 B1 | 5/2002 | Segal et al. |
| 6,429,846 B2 | 8/2002 | Rosenberg et al. |
| 6,448,977 B1 | 9/2002 | Braun et al. |
| 6,459,442 B1 | 10/2002 | Edwards et al. |
| 6,563,487 B2 | 5/2003 | Martin et al. |
| 6,567,102 B2 | 5/2003 | Kung |
| 6,583,798 B1 | 6/2003 | Hoek et al. |
| 6,590,568 B1 | 7/2003 | Astala et al. |
| 6,661,438 B1 | 12/2003 | Shiraishi et al. |
| 6,735,307 B1 | 5/2004 | Volckers |
| 6,750,890 B1 | 6/2004 | Sugimoto |
| 6,822,635 B2 | 11/2004 | Shahoian et al. |
| 6,919,927 B1 | 7/2005 | Hyodo |
| 7,138,983 B2 | 11/2006 | Wakai et al. |
| 7,411,575 B2 | 8/2008 | Hill et al. |
| 7,479,949 B2 | 1/2009 | Jobs et al. |
| 7,533,352 B2 | 5/2009 | Chew et al. |
| 7,577,530 B2 | 8/2009 | Vignalou-Marche |
| 7,614,008 B2 | 11/2009 | Ording |
| 7,619,616 B2 | 11/2009 | Rimas Ribikauskas et al. |
| 7,656,413 B2 | 2/2010 | Khan et al. |
| 7,683,889 B2 | 3/2010 | Rimas Ribikauskas et al. |
| 7,743,348 B2 | 6/2010 | Robbins et al. |
| 7,760,187 B2 | 7/2010 | Kennedy |
| 7,787,026 B1 | 8/2010 | Flory et al. |
| 7,797,642 B1 | 9/2010 | Karam et al. |
| 7,801,950 B2 | 9/2010 | Eisenstadt et al. |
| 7,812,826 B2 | 10/2010 | Ording et al. |
| 7,890,862 B2 | 2/2011 | Kompe et al. |
| 7,952,566 B2 | 5/2011 | Poupyrev et al. |
| 7,956,847 B2 | 6/2011 | Christie |
| 7,973,778 B2 | 7/2011 | Chen |
| 8,040,142 B1 | 10/2011 | Bokma et al. |
| 8,106,856 B2 | 1/2012 | Matas et al. |
| 8,125,440 B2 | 2/2012 | Guyot-Sionnest et al. |
| RE43,448 E | 6/2012 | Kimoto et al. |
| 8,209,628 B1 | 6/2012 | Davidson |
| 8,390,583 B2 | 3/2013 | Forutanpour et al. |
| 8,456,431 B2 | 6/2013 | Victor |
| 8,508,494 B2 | 8/2013 | Moore |
| 8,542,205 B1 | 9/2013 | Keller |
| 8,581,870 B2 | 11/2013 | Bokma et al. |
| 8,587,542 B2 | 11/2013 | Moore |
| 8,593,415 B2 | 11/2013 | Han et al. |
| 8,638,311 B2 | 1/2014 | Kang et al. |
| 8,669,945 B2 | 3/2014 | Coddington |
| 8,698,765 B1 | 4/2014 | Keller |
| 8,717,305 B2 | 5/2014 | Williamson et al. |
| 8,743,069 B2 | 6/2014 | Morton et al. |
| 8,773,389 B1 | 7/2014 | Freed |
| 8,793,577 B2 | 7/2014 | Schellingerhout et al. |
| 8,872,729 B2 | 10/2014 | Lyons et al. |
| 8,872,773 B2 | 10/2014 | Mak et al. |
| 8,875,044 B2 | 10/2014 | Ozawa et al. |
| 8,914,732 B2 | 12/2014 | Jun et al. |
| 8,952,987 B2 | 2/2015 | Momeyer et al. |
| 8,959,430 B1 | 2/2015 | Spivak et al. |
| 8,976,128 B2 | 3/2015 | Moore |
| 9,026,932 B1 | 5/2015 | Dixon |
| 9,030,419 B1 | 5/2015 | Freed |
| 9,030,436 B2 | 5/2015 | Ikeda |
| 9,069,460 B2 | 6/2015 | Moore |
| 9,092,058 B2 | 7/2015 | Kasahara et al. |
| 9,098,188 B2 | 8/2015 | Kim |
| 9,116,571 B2 | 8/2015 | Zeliff et al. |
| 9,122,364 B2 | 9/2015 | Kuwabara et al. |
| 9,148,618 B2 | 9/2015 | Matas et al. |
| 9,164,779 B2 | 10/2015 | Brakensiek et al. |
| 9,170,607 B2 | 10/2015 | Bose et al. |
| 9,218,105 B2 | 12/2015 | Mansson et al. |
| 9,244,562 B1 | 1/2016 | Rosenberg et al. |
| 9,244,576 B1 | 1/2016 | Vadagave et al. |
| 9,244,601 B2 | 1/2016 | Kim et al. |
| 9,262,002 B2 | 2/2016 | Momeyer et al. |
| 9,304,668 B2 | 4/2016 | Rezende et al. |
| 9,307,112 B2 | 4/2016 | Molgaard et al. |
| 9,361,018 B2 | 6/2016 | Defazio et al. |
| 9,389,718 B1 | 7/2016 | Letourneur |

(56) References Cited

U.S. PATENT DOCUMENTS

| | | |
|---|---|---|
| 9,389,722 B2 | 7/2016 | Matsuki et al. |
| 9,400,581 B2 | 7/2016 | Bokma et al. |
| 9,405,367 B2 | 8/2016 | Jung et al. |
| 9,417,754 B2 | 8/2016 | Smith |
| 9,471,145 B2 | 10/2016 | Langlois et al. |
| 9,477,393 B2 | 10/2016 | Zambetti et al. |
| 9,542,013 B2 | 1/2017 | Dearman et al. |
| 2001/0045965 A1 | 11/2001 | Orbanes et al. |
| 2002/0008691 A1 | 1/2002 | Hanajima et al. |
| 2002/0015064 A1 | 2/2002 | Robotham et al. |
| 2002/0109678 A1 | 8/2002 | Marmolin et al. |
| 2002/0140680 A1 | 10/2002 | Lu |
| 2002/0180763 A1 | 12/2002 | Kung |
| 2003/0086496 A1 | 5/2003 | Zhang et al. |
| 2003/0151589 A1 | 8/2003 | Bensen et al. |
| 2003/0184574 A1 | 10/2003 | Phillips et al. |
| 2003/0189647 A1 | 10/2003 | Kang |
| 2003/0222915 A1 | 12/2003 | Marion et al. |
| 2004/0021643 A1 | 2/2004 | Hoshino et al. |
| 2004/0056849 A1 | 3/2004 | Lohbihler et al. |
| 2004/0108995 A1 | 6/2004 | Hoshino et al. |
| 2004/0138849 A1 | 7/2004 | Schmidt et al. |
| 2004/0150631 A1 | 8/2004 | Fleck et al. |
| 2004/0150644 A1 | 8/2004 | Kincaid et al. |
| 2004/0174399 A1 | 9/2004 | Wu et al. |
| 2004/0219969 A1 | 11/2004 | Casey et al. |
| 2005/0012723 A1 | 1/2005 | Pallakoff |
| 2005/0110769 A1 | 5/2005 | DaCosta et al. |
| 2005/0125742 A1 | 6/2005 | Grotjohn et al. |
| 2005/0132297 A1 | 6/2005 | Milic-Frayling et al. |
| 2005/0134578 A1 | 6/2005 | Chambers et al. |
| 2005/0183017 A1 | 8/2005 | Cain |
| 2005/0190280 A1 | 9/2005 | Haas et al. |
| 2005/0204295 A1 | 9/2005 | Voorhees et al. |
| 2005/0223338 A1 | 10/2005 | Partanen |
| 2005/0229112 A1 | 10/2005 | Clay et al. |
| 2005/0289476 A1 | 12/2005 | Tokkonen |
| 2006/0022955 A1 | 2/2006 | Kennedy |
| 2006/0022956 A1 | 2/2006 | Lengeling et al. |
| 2006/0026536 A1 | 2/2006 | Hotelling et al. |
| 2006/0036971 A1 | 2/2006 | Mendel et al. |
| 2006/0059436 A1 | 3/2006 | Nurmi |
| 2006/0067677 A1 | 3/2006 | Tokiwa et al. |
| 2006/0101347 A1 | 5/2006 | Runov et al. |
| 2006/0109252 A1 | 5/2006 | Kolmykov-Zotov et al. |
| 2006/0109256 A1 | 5/2006 | Grant et al. |
| 2006/0119586 A1 | 6/2006 | Grant et al. |
| 2006/0132455 A1 | 6/2006 | Rimas-Ribikauskas et al. |
| 2006/0132456 A1 | 6/2006 | Anson |
| 2006/0132457 A1 | 6/2006 | Rimas-Ribikauskas et al. |
| 2006/0136834 A1 | 6/2006 | Cao et al. |
| 2006/0136845 A1 | 6/2006 | Rimas-Ribikauskas et al. |
| 2006/0197753 A1 | 9/2006 | Hotelling |
| 2006/0212812 A1 | 9/2006 | Simmons et al. |
| 2006/0213754 A1 | 9/2006 | Jarrett et al. |
| 2006/0233248 A1 | 10/2006 | Rynderman et al. |
| 2006/0274042 A1 | 12/2006 | Krah et al. |
| 2006/0277469 A1 | 12/2006 | Chaudhri et al. |
| 2006/0282778 A1 | 12/2006 | Barsness et al. |
| 2006/0284858 A1 | 12/2006 | Rekimoto |
| 2006/0290681 A1 | 12/2006 | Ho et al. |
| 2007/0024595 A1 | 2/2007 | Baker et al. |
| 2007/0024646 A1 | 2/2007 | Saarinen et al. |
| 2007/0080953 A1 | 4/2007 | Lii |
| 2007/0113681 A1 | 5/2007 | Nishimura et al. |
| 2007/0120835 A1 | 5/2007 | Sato |
| 2007/0124699 A1 | 5/2007 | Michaels |
| 2007/0168890 A1 | 7/2007 | Zhao et al. |
| 2007/0176904 A1 | 8/2007 | Russo |
| 2007/0186178 A1 | 8/2007 | Schiller |
| 2007/0222768 A1 | 9/2007 | Geurts et al. |
| 2007/0229455 A1 | 10/2007 | Martin et al. |
| 2007/0236450 A1 | 10/2007 | Colgate et al. |
| 2007/0236477 A1 | 10/2007 | Ryu et al. |
| 2007/0245241 A1 | 10/2007 | Bertram et al. |
| 2007/0257821 A1 | 11/2007 | Son et al. |
| 2007/0270182 A1 | 11/2007 | Gulliksson et al. |
| 2007/0294295 A1 | 12/2007 | Finkelstein et al. |
| 2008/0024459 A1 | 1/2008 | Poupyrev et al. |
| 2008/0034306 A1 | 2/2008 | Ording |
| 2008/0036743 A1 | 2/2008 | Westerman et al. |
| 2008/0052945 A1 | 3/2008 | Matas et al. |
| 2008/0066010 A1 | 3/2008 | Brodersen et al. |
| 2008/0094367 A1 | 4/2008 | Van De Ven et al. |
| 2008/0106523 A1 | 5/2008 | Conrad |
| 2008/0136790 A1 | 6/2008 | Hio |
| 2008/0155415 A1 | 6/2008 | Yoon et al. |
| 2008/0168395 A1 | 7/2008 | Ording et al. |
| 2008/0168403 A1 | 7/2008 | Westerman et al. |
| 2008/0202824 A1 | 8/2008 | Philipp et al. |
| 2008/0204427 A1 | 8/2008 | Heesemans et al. |
| 2008/0219493 A1 | 9/2008 | Tadmor |
| 2008/0222569 A1 | 9/2008 | Champion et al. |
| 2008/0259046 A1 | 10/2008 | Carsanaro |
| 2008/0263452 A1 | 10/2008 | Tomkins |
| 2008/0284866 A1 | 11/2008 | Mizutani |
| 2008/0294984 A1 | 11/2008 | Ramsay et al. |
| 2008/0297475 A1 | 12/2008 | Woolf et al. |
| 2008/0303799 A1 | 12/2008 | Schwesig et al. |
| 2008/0307359 A1 | 12/2008 | Louch et al. |
| 2008/0317378 A1 | 12/2008 | Steinberg et al. |
| 2008/0320419 A1 | 12/2008 | Matas et al. |
| 2009/0007017 A1 | 1/2009 | Anzures et al. |
| 2009/0046110 A1 | 2/2009 | Sadler et al. |
| 2009/0058828 A1 | 3/2009 | Jiang et al. |
| 2009/0066668 A1 | 3/2009 | Kim et al. |
| 2009/0073118 A1 | 3/2009 | Yamaji et al. |
| 2009/0083665 A1 | 3/2009 | Anttila et al. |
| 2009/0085878 A1 | 4/2009 | Heubel et al. |
| 2009/0085881 A1 | 4/2009 | Keam |
| 2009/0102804 A1 | 4/2009 | Wong et al. |
| 2009/0102805 A1 | 4/2009 | Meijer et al. |
| 2009/0140985 A1 | 6/2009 | Liu |
| 2009/0158198 A1 | 6/2009 | Hayter et al. |
| 2009/0160793 A1 | 6/2009 | Rekimoto |
| 2009/0167507 A1 | 7/2009 | Maenpaa |
| 2009/0167508 A1 | 7/2009 | Fadell et al. |
| 2009/0167704 A1 | 7/2009 | Terlizzi et al. |
| 2009/0225037 A1 | 9/2009 | Williamson et al. |
| 2009/0237374 A1 | 9/2009 | Li et al. |
| 2009/0247112 A1 | 10/2009 | Lundy et al. |
| 2009/0267906 A1 | 10/2009 | Schroderus |
| 2009/0282360 A1 | 11/2009 | Park et al. |
| 2009/0293009 A1 | 11/2009 | Meserth et al. |
| 2009/0303187 A1 | 12/2009 | Pallakoff |
| 2009/0322893 A1 | 12/2009 | Stallings et al. |
| 2010/0007926 A1 | 1/2010 | Imaizumi et al. |
| 2010/0011304 A1 | 1/2010 | Van Os |
| 2010/0013777 A1 | 1/2010 | Baudisch et al. |
| 2010/0017710 A1 | 1/2010 | Kim et al. |
| 2010/0026640 A1 | 2/2010 | Kim et al. |
| 2010/0026647 A1 | 2/2010 | Abe et al. |
| 2010/0039446 A1 | 2/2010 | Hillis et al. |
| 2010/0044121 A1 | 2/2010 | Simon et al. |
| 2010/0057235 A1 | 3/2010 | Wang et al. |
| 2010/0058231 A1 | 3/2010 | Duarte et al. |
| 2010/0070908 A1 | 3/2010 | Mori et al. |
| 2010/0073329 A1 | 3/2010 | Raman et al. |
| 2010/0083116 A1 | 4/2010 | Akifusa et al. |
| 2010/0085302 A1 | 4/2010 | Fairweather et al. |
| 2010/0085314 A1 | 4/2010 | Kwok |
| 2010/0085317 A1 | 4/2010 | Park et al. |
| 2010/0088596 A1 | 4/2010 | Griffin et al. |
| 2010/0127983 A1 | 5/2010 | Irani et al. |
| 2010/0128002 A1 | 5/2010 | Stacy et al. |
| 2010/0138776 A1 | 6/2010 | Korhonen |
| 2010/0149096 A1 | 6/2010 | Migos et al. |
| 2010/0156813 A1 | 6/2010 | Duarte et al. |
| 2010/0156818 A1 | 6/2010 | Burrough et al. |
| 2010/0156823 A1 | 6/2010 | Paleczny et al. |
| 2010/0156825 A1 | 6/2010 | Sohn et al. |
| 2010/0171713 A1 | 7/2010 | Kwok et al. |
| 2010/0175023 A1 | 7/2010 | Gatlin et al. |
| 2010/0180225 A1 | 7/2010 | Chiba et al. |

(56) References Cited

U.S. PATENT DOCUMENTS

| | | |
|---|---|---|
| 2010/0211872 A1 | 8/2010 | Rolston et al. |
| 2010/0225604 A1 | 9/2010 | Homma et al. |
| 2010/0231534 A1 | 9/2010 | Chaudhri et al. |
| 2010/0235726 A1 | 9/2010 | Ording et al. |
| 2010/0235733 A1 | 9/2010 | Drislane et al. |
| 2010/0235746 A1 | 9/2010 | Anzures |
| 2010/0240415 A1 | 9/2010 | Kim et al. |
| 2010/0271312 A1 | 10/2010 | Alameh et al. |
| 2010/0271500 A1 | 10/2010 | Park et al. |
| 2010/0289807 A1 | 11/2010 | Yu et al. |
| 2010/0302177 A1 | 12/2010 | Kim et al. |
| 2010/0302179 A1 | 12/2010 | Ahn et al. |
| 2010/0306702 A1 | 12/2010 | Warner |
| 2010/0308983 A1 | 12/2010 | Conte et al. |
| 2010/0309147 A1 | 12/2010 | Fleizach et al. |
| 2010/0313124 A1 | 12/2010 | Privault et al. |
| 2010/0313156 A1 | 12/2010 | Louch et al. |
| 2010/0313158 A1 | 12/2010 | Lee et al. |
| 2010/0313166 A1 | 12/2010 | Nakayama et al. |
| 2010/0315417 A1 | 12/2010 | Cho et al. |
| 2010/0315438 A1 | 12/2010 | Horodezky et al. |
| 2010/0325578 A1 | 12/2010 | Mital et al. |
| 2011/0018695 A1 | 1/2011 | Bells et al. |
| 2011/0050588 A1 | 3/2011 | Li et al. |
| 2011/0050591 A1 | 3/2011 | Kim et al. |
| 2011/0050594 A1 | 3/2011 | Kim et al. |
| 2011/0050629 A1 | 3/2011 | Homma et al. |
| 2011/0050630 A1 | 3/2011 | Ikeda |
| 2011/0050653 A1 | 3/2011 | Miyazawa et al. |
| 2011/0054837 A1 | 3/2011 | Ikeda |
| 2011/0057886 A1 | 3/2011 | Ng et al. |
| 2011/0061029 A1 | 3/2011 | Yeh et al. |
| 2011/0063248 A1 | 3/2011 | Yoon |
| 2011/0069012 A1 | 3/2011 | Martensson |
| 2011/0069016 A1 | 3/2011 | Victor |
| 2011/0074697 A1 | 3/2011 | Rapp et al. |
| 2011/0080350 A1 | 4/2011 | Almalki et al. |
| 2011/0084910 A1 | 4/2011 | Almalki et al. |
| 2011/0087983 A1 | 4/2011 | Shim |
| 2011/0093815 A1 | 4/2011 | Gobeil |
| 2011/0093817 A1 | 4/2011 | Song et al. |
| 2011/0107272 A1 | 5/2011 | Aguilar |
| 2011/0116716 A1 | 5/2011 | Kwon et al. |
| 2011/0141031 A1 | 6/2011 | McCullough et al. |
| 2011/0141052 A1 | 6/2011 | Bernstein et al. |
| 2011/0144777 A1 | 6/2011 | Firkins et al. |
| 2011/0145752 A1 | 6/2011 | Fagans |
| 2011/0145753 A1 | 6/2011 | Prakash |
| 2011/0145764 A1 | 6/2011 | Higuchi et al. |
| 2011/0149138 A1 | 6/2011 | Watkins |
| 2011/0163971 A1 | 7/2011 | Wagner et al. |
| 2011/0164042 A1 | 7/2011 | Chaudhri |
| 2011/0169765 A1 | 7/2011 | Aono |
| 2011/0175830 A1 | 7/2011 | Miyazawa et al. |
| 2011/0179368 A1 | 7/2011 | King et al. |
| 2011/0179381 A1 | 7/2011 | King |
| 2011/0181538 A1 | 7/2011 | Aono |
| 2011/0185316 A1 | 7/2011 | Reid et al. |
| 2011/0193809 A1 | 8/2011 | Walley et al. |
| 2011/0193881 A1 | 8/2011 | Rydenhag |
| 2011/0201387 A1 | 8/2011 | Paek et al. |
| 2011/0202834 A1 | 8/2011 | Mandryk et al. |
| 2011/0202853 A1 | 8/2011 | Mujkic |
| 2011/0205163 A1 | 8/2011 | Hinckley et al. |
| 2011/0209088 A1 | 8/2011 | Hinckley et al. |
| 2011/0209093 A1 | 8/2011 | Hinckley et al. |
| 2011/0209099 A1 | 8/2011 | Hinckley et al. |
| 2011/0210931 A1 | 9/2011 | Shai |
| 2011/0215914 A1 | 9/2011 | Edwards |
| 2011/0221684 A1 | 9/2011 | Rydenhag |
| 2011/0221776 A1 | 9/2011 | Shimotani et al. |
| 2011/0231789 A1 | 9/2011 | Bukurak et al. |
| 2011/0238690 A1 | 9/2011 | Arrasvuori et al. |
| 2011/0239110 A1 | 9/2011 | Garrett et al. |
| 2011/0242029 A1 | 10/2011 | Kasahara et al. |
| 2011/0246877 A1 | 10/2011 | Kwak et al. |
| 2011/0248948 A1 | 10/2011 | Griffin et al. |
| 2011/0252357 A1 | 10/2011 | Chaudhri |
| 2011/0252362 A1 | 10/2011 | Cho et al. |
| 2011/0258537 A1 | 10/2011 | Rives et al. |
| 2011/0263298 A1 | 10/2011 | Park |
| 2011/0267530 A1 | 11/2011 | Chun |
| 2011/0279381 A1 | 11/2011 | Tong et al. |
| 2011/0279395 A1 | 11/2011 | Kuwabara et al. |
| 2011/0279852 A1 | 11/2011 | Oda et al. |
| 2011/0285656 A1 | 11/2011 | Yaksick et al. |
| 2011/0285659 A1 | 11/2011 | Kuwabara et al. |
| 2011/0291951 A1 | 12/2011 | Tong |
| 2011/0296351 A1 | 12/2011 | Ewing, Jr. et al. |
| 2011/0304559 A1 | 12/2011 | Pasquero |
| 2011/0304577 A1 | 12/2011 | Brown et al. |
| 2012/0013541 A1 | 1/2012 | Boka et al. |
| 2012/0013542 A1 | 1/2012 | Shenfield |
| 2012/0026110 A1 | 2/2012 | Yamano |
| 2012/0036556 A1 | 2/2012 | LeBeau et al. |
| 2012/0038580 A1 | 2/2012 | Sasaki |
| 2012/0044153 A1 | 2/2012 | Arrasvuori et al. |
| 2012/0056837 A1 | 3/2012 | Park et al. |
| 2012/0056848 A1 | 3/2012 | Yamano et al. |
| 2012/0062564 A1 | 3/2012 | Miyashita et al. |
| 2012/0062604 A1 | 3/2012 | Lobo |
| 2012/0066630 A1 | 3/2012 | Kim et al. |
| 2012/0066648 A1 | 3/2012 | Rolleston et al. |
| 2012/0081375 A1 | 4/2012 | Robert et al. |
| 2012/0084689 A1 | 4/2012 | Ledet et al. |
| 2012/0089932 A1 | 4/2012 | Kano et al. |
| 2012/0096393 A1 | 4/2012 | Shim et al. |
| 2012/0098780 A1 | 4/2012 | Fujisawa et al. |
| 2012/0102437 A1 | 4/2012 | Worley et al. |
| 2012/0105358 A1 | 5/2012 | Momeyer et al. |
| 2012/0105367 A1 | 5/2012 | Son et al. |
| 2012/0106852 A1 | 5/2012 | Khawand et al. |
| 2012/0113023 A1 | 5/2012 | Koch et al. |
| 2012/0126962 A1 | 5/2012 | Ujii et al. |
| 2012/0131495 A1 | 5/2012 | Goossens et al. |
| 2012/0146945 A1 | 6/2012 | Miyazawa et al. |
| 2012/0147052 A1 | 6/2012 | Homma et al. |
| 2012/0154328 A1 | 6/2012 | Kono |
| 2012/0159380 A1 | 6/2012 | Kocienda et al. |
| 2012/0169646 A1 | 7/2012 | Berkes et al. |
| 2012/0176403 A1 | 7/2012 | Cha et al. |
| 2012/0179967 A1 | 7/2012 | Hayes |
| 2012/0182226 A1 | 7/2012 | Tuli |
| 2012/0183271 A1 | 7/2012 | Forutanpour et al. |
| 2012/0206393 A1 | 8/2012 | Hillis et al. |
| 2012/0218203 A1 | 8/2012 | Kanki |
| 2012/0235912 A1 | 9/2012 | Laubach |
| 2012/0236037 A1 | 9/2012 | Lessing et al. |
| 2012/0249575 A1 | 10/2012 | Krolczyk et al. |
| 2012/0249853 A1 | 10/2012 | Krolczyk et al. |
| 2012/0256846 A1 | 10/2012 | Mak |
| 2012/0256847 A1 | 10/2012 | Mak et al. |
| 2012/0256857 A1 | 10/2012 | Mak |
| 2012/0257071 A1 | 10/2012 | Prentice |
| 2012/0260220 A1 | 10/2012 | Griffin |
| 2012/0274591 A1 | 11/2012 | Rimas-Ribikauskas et al. |
| 2012/0274662 A1 | 11/2012 | Kim et al. |
| 2012/0284673 A1 | 11/2012 | Lamb et al. |
| 2012/0293449 A1 | 11/2012 | Dietz |
| 2012/0293551 A1 | 11/2012 | Momeyer et al. |
| 2012/0304132 A1 | 11/2012 | Sareen et al. |
| 2012/0304133 A1 | 11/2012 | Nan et al. |
| 2012/0306764 A1 | 12/2012 | Kamibeppu |
| 2012/0306765 A1 | 12/2012 | Moore |
| 2012/0306766 A1 | 12/2012 | Moore |
| 2012/0306772 A1 | 12/2012 | Tan et al. |
| 2012/0306778 A1 | 12/2012 | Wheeldreyer et al. |
| 2012/0311429 A1 | 12/2012 | Decker et al. |
| 2012/0311437 A1 | 12/2012 | Weeldreyer et al. |
| 2013/0002561 A1 | 1/2013 | Wakasa |
| 2013/0016042 A1 | 1/2013 | Makinen et al. |
| 2013/0019158 A1 | 1/2013 | Watanabe |
| 2013/0019174 A1 | 1/2013 | Gil et al. |
| 2013/0044062 A1 | 2/2013 | Bose et al. |

(56) References Cited

U.S. PATENT DOCUMENTS

| | | |
|---|---|---|
| 2013/0047100 A1 | 2/2013 | Kroeger et al. |
| 2013/0050131 A1 | 2/2013 | Lee et al. |
| 2013/0061172 A1 | 3/2013 | Huang et al. |
| 2013/0063389 A1 | 3/2013 | Moore |
| 2013/0067383 A1 | 3/2013 | Kataoka et al. |
| 2013/0067513 A1 | 3/2013 | Takami |
| 2013/0077804 A1 | 3/2013 | Glebe et al. |
| 2013/0082824 A1 | 4/2013 | Colley |
| 2013/0097520 A1 | 4/2013 | Lewin et al. |
| 2013/0097521 A1 | 4/2013 | Lewin et al. |
| 2013/0097534 A1 | 4/2013 | Lewin et al. |
| 2013/0097539 A1 | 4/2013 | Mansson et al. |
| 2013/0097562 A1 | 4/2013 | Kermoian et al. |
| 2013/0102366 A1 | 4/2013 | Teng et al. |
| 2013/0113720 A1 | 5/2013 | Van Eerd et al. |
| 2013/0135243 A1 | 5/2013 | Hirsch et al. |
| 2013/0135499 A1 | 5/2013 | Song |
| 2013/0141364 A1 | 6/2013 | Lynn et al. |
| 2013/0141396 A1 | 6/2013 | Lynn et al. |
| 2013/0145313 A1 | 6/2013 | Roh et al. |
| 2013/0154948 A1 | 6/2013 | Schediwy et al. |
| 2013/0154959 A1 | 6/2013 | Lindsay et al. |
| 2013/0155018 A1 | 6/2013 | Dagdeviren |
| 2013/0159893 A1 | 6/2013 | Lewis et al. |
| 2013/0162667 A1 | 6/2013 | Eskolin et al. |
| 2013/0174094 A1 | 7/2013 | Heo et al. |
| 2013/0174179 A1 | 7/2013 | Park et al. |
| 2013/0179840 A1 | 7/2013 | Fisher et al. |
| 2013/0191791 A1 | 7/2013 | Rydenhag et al. |
| 2013/0198690 A1 | 8/2013 | Barsoum et al. |
| 2013/0212541 A1 | 8/2013 | Dolenc et al. |
| 2013/0222671 A1 | 8/2013 | Tseng et al. |
| 2013/0227450 A1 | 8/2013 | Na et al. |
| 2013/0232402 A1 | 9/2013 | Lu et al. |
| 2013/0234929 A1 | 9/2013 | Libin |
| 2013/0257793 A1 | 10/2013 | Zeliff et al. |
| 2013/0257817 A1 | 10/2013 | Yliaho |
| 2013/0265246 A1 | 10/2013 | Tae |
| 2013/0268875 A1 | 10/2013 | Han et al. |
| 2013/0278520 A1 | 10/2013 | Weng et al. |
| 2013/0325342 A1 | 12/2013 | Pylappan et al. |
| 2013/0326420 A1 | 12/2013 | Liu et al. |
| 2013/0326421 A1 | 12/2013 | Jo |
| 2013/0328770 A1 | 12/2013 | Parham |
| 2013/0332892 A1 | 12/2013 | Matsuki |
| 2013/0339909 A1 | 12/2013 | Ha |
| 2014/0002355 A1 | 1/2014 | Lee et al. |
| 2014/0002374 A1 | 1/2014 | Hunt et al. |
| 2014/0002386 A1 | 1/2014 | Rosenberg et al. |
| 2014/0028571 A1 | 1/2014 | St. Clair |
| 2014/0028601 A1 | 1/2014 | Moore |
| 2014/0049491 A1 | 2/2014 | Nagar et al. |
| 2014/0055367 A1 | 2/2014 | Dearman et al. |
| 2014/0055377 A1 | 2/2014 | Kim |
| 2014/0063316 A1 | 3/2014 | Lee et al. |
| 2014/0068475 A1 | 3/2014 | Li et al. |
| 2014/0078343 A1 | 3/2014 | Dai et al. |
| 2014/0092025 A1 | 4/2014 | Pala et al. |
| 2014/0109016 A1 | 4/2014 | Ouyang et al. |
| 2014/0111456 A1 | 4/2014 | Kashiwa et al. |
| 2014/0111670 A1 | 4/2014 | Lord et al. |
| 2014/0139471 A1 | 5/2014 | Matsuki |
| 2014/0152581 A1 | 6/2014 | Case et al. |
| 2014/0160063 A1 | 6/2014 | Yairi et al. |
| 2014/0160073 A1 | 6/2014 | Matsuki |
| 2014/0165006 A1 | 6/2014 | Chaudhri et al. |
| 2014/0168153 A1 | 6/2014 | Deichmann et al. |
| 2014/0173517 A1 | 6/2014 | Chaudhri |
| 2014/0184526 A1 | 7/2014 | Cho |
| 2014/0210758 A1 | 7/2014 | Park et al. |
| 2014/0210798 A1 | 7/2014 | Wilson |
| 2014/0245202 A1 | 8/2014 | Yoon et al. |
| 2014/0267114 A1 | 9/2014 | Lisseman et al. |
| 2014/0267135 A1 | 9/2014 | Chhabra |
| 2014/0282084 A1 | 9/2014 | Murarka et al. |
| 2014/0282214 A1 | 9/2014 | Shirzadi et al. |
| 2014/0300569 A1 | 10/2014 | Matsuki et al. |
| 2014/0304646 A1 | 10/2014 | Rossman |
| 2014/0304651 A1 | 10/2014 | Johansson et al. |
| 2014/0306897 A1 | 10/2014 | Cueto |
| 2014/0306899 A1 | 10/2014 | Hicks |
| 2014/0310638 A1 | 10/2014 | Lee et al. |
| 2014/0313130 A1 | 10/2014 | Yamano et al. |
| 2014/0333561 A1 | 11/2014 | Bull et al. |
| 2014/0344765 A1 | 11/2014 | Hicks et al. |
| 2014/0354845 A1 | 12/2014 | Molgaard et al. |
| 2014/0354850 A1 | 12/2014 | Kosaka et al. |
| 2014/0359528 A1 | 12/2014 | Murata |
| 2014/0380247 A1 | 12/2014 | Tecarro et al. |
| 2015/0015763 A1 | 1/2015 | Lee et al. |
| 2015/0020036 A1 | 1/2015 | Kim et al. |
| 2015/0026584 A1 | 1/2015 | Kobyakov et al. |
| 2015/0026592 A1 | 1/2015 | Mohammed et al. |
| 2015/0033184 A1 | 1/2015 | Kim et al. |
| 2015/0046876 A1 | 2/2015 | Goldenberg |
| 2015/0058723 A1 | 2/2015 | Cieplinski et al. |
| 2015/0062052 A1 | 3/2015 | Bernstein et al. |
| 2015/0062068 A1 | 3/2015 | Shih et al. |
| 2015/0067495 A1 | 3/2015 | Bernstein et al. |
| 2015/0067496 A1 | 3/2015 | Missig et al. |
| 2015/0067497 A1 | 3/2015 | Cieplinski et al. |
| 2015/0067513 A1 | 3/2015 | Zambetti et al. |
| 2015/0067519 A1 | 3/2015 | Missig et al. |
| 2015/0067559 A1 | 3/2015 | Missig et al. |
| 2015/0067560 A1 | 3/2015 | Cieplinski et al. |
| 2015/0067563 A1 | 3/2015 | Bernstein et al. |
| 2015/0067596 A1 | 3/2015 | Brown et al. |
| 2015/0067601 A1 | 3/2015 | Bernstein et al. |
| 2015/0067602 A1 | 3/2015 | Bernstein et al. |
| 2015/0067605 A1 | 3/2015 | Zambetti et al. |
| 2015/0071547 A1 | 3/2015 | Keating et al. |
| 2015/0116205 A1 | 4/2015 | Westerman et al. |
| 2015/0121225 A1* | 4/2015 | Somasundaram H04N 21/47217 715/721 |
| 2015/0128092 A1 | 5/2015 | Lee et al. |
| 2015/0135109 A1 | 5/2015 | Zambetti et al. |
| 2015/0138126 A1 | 5/2015 | Westerman |
| 2015/0138155 A1 | 5/2015 | Bernstein et al. |
| 2015/0139605 A1 | 5/2015 | Wiklof |
| 2015/0143273 A1 | 5/2015 | Bernstein et al. |
| 2015/0149899 A1 | 5/2015 | Bernstein et al. |
| 2015/0149964 A1 | 5/2015 | Bernstein et al. |
| 2015/0149967 A1 | 5/2015 | Bernstein et al. |
| 2015/0153929 A1 | 6/2015 | Bernstein et al. |
| 2015/0160729 A1 | 6/2015 | Nakagawa |
| 2015/0205495 A1 | 7/2015 | Koide et al. |
| 2015/0234446 A1 | 8/2015 | Nathan et al. |
| 2015/0253866 A1 | 9/2015 | Amm et al. |
| 2015/0268813 A1 | 9/2015 | Bos |
| 2015/0321607 A1* | 11/2015 | Cho ............... B60R 11/04 348/36 |
| 2015/0332107 A1 | 11/2015 | Paniaras |
| 2015/0378519 A1 | 12/2015 | Brown et al. |
| 2015/0378982 A1 | 12/2015 | McKenzie et al. |
| 2015/0381931 A1 | 12/2015 | Uhma et al. |
| 2016/0004427 A1 | 1/2016 | Zambetti et al. |
| 2016/0004428 A1 | 1/2016 | Bernstein et al. |
| 2016/0004429 A1 | 1/2016 | Bernstein et al. |
| 2016/0004430 A1 | 1/2016 | Missig et al. |
| 2016/0004431 A1 | 1/2016 | Bernstein et al. |
| 2016/0004432 A1 | 1/2016 | Bernstein et al. |
| 2016/0011771 A1 | 1/2016 | Cieplinski |
| 2016/0019718 A1 | 1/2016 | Mukkamala et al. |
| 2016/0041750 A1 | 2/2016 | Cieplinski et al. |
| 2016/0048326 A1 | 2/2016 | Kim et al. |
| 2016/0062466 A1 | 3/2016 | Moussette et al. |
| 2016/0062619 A1 | 3/2016 | Reeve et al. |
| 2016/0070401 A1 | 3/2016 | Kim et al. |
| 2016/0132139 A1 | 5/2016 | Du et al. |
| 2016/0210025 A1 | 7/2016 | Bernstein et al. |
| 2016/0259412 A1 | 9/2016 | Flint et al. |
| 2016/0259413 A1 | 9/2016 | Anzures et al. |
| 2016/0259495 A1 | 9/2016 | Butcher et al. |
| 2016/0259496 A1 | 9/2016 | Butcher et al. |

(56) References Cited

U.S. PATENT DOCUMENTS

| | | |
|---|---|---|
| 2016/0259497 A1 | 9/2016 | Foss et al. |
| 2016/0259498 A1 | 9/2016 | Foss et al. |
| 2016/0259499 A1 | 9/2016 | Kocienda et al. |
| 2016/0259516 A1 | 9/2016 | Kudurshian et al. |
| 2016/0259517 A1 | 9/2016 | Butcher et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0259536 A1 | 9/2016 | Kudurshian et al. |
| 2016/0274686 A1 | 9/2016 | Ruiz et al. |
| 2016/0274728 A1 | 9/2016 | Luo et al. |
| 2016/0274761 A1 | 9/2016 | Ruiz et al. |
| 2016/0320906 A1 | 11/2016 | Bokma et al. |
| 2016/0357305 A1 | 12/2016 | Wells et al. |
| 2016/0357368 A1 | 12/2016 | Federighi et al. |
| 2016/0357389 A1 | 12/2016 | Dakin et al. |
| 2016/0357390 A1 | 12/2016 | Federighi et al. |
| 2016/0357404 A1 | 12/2016 | Alonso Ruiz et al. |
| 2016/0360116 A1 | 12/2016 | Penha et al. |
| 2017/0075520 A1 | 3/2017 | Bauer et al. |
| 2017/0075562 A1 | 3/2017 | Bauer et al. |
| 2017/0075563 A1 | 3/2017 | Bauer et al. |

FOREIGN PATENT DOCUMENTS

| | | |
|---|---|---|
| CN | 101593077 A | 12/2009 |
| CN | 101809526 A | 8/2010 |
| CN | 102004593 A | 4/2011 |
| CN | 102112946 A | 6/2011 |
| CN | 102385478 A | 3/2012 |
| CN | 102662573 A | 9/2012 |
| CN | 102841677 A | 12/2012 |
| CN | 103097992 A | 5/2013 |
| DE | 100 59 906 A1 | 6/2002 |
| EP | 0 859 307 A1 | 3/1998 |
| EP | 0 880 090 A2 | 11/1998 |
| EP | 1 028 583 A1 | 8/2000 |
| EP | 1 406 150 A1 | 4/2004 |
| EP | 1 674 977 A2 | 6/2006 |
| EP | 1 882 902 A1 | 1/2008 |
| EP | 2 000 896 A2 | 12/2008 |
| EP | 2 017 701 A1 | 1/2009 |
| EP | 2 028 583 A2 | 2/2009 |
| EP | 2 141 574 A2 | 1/2010 |
| EP | 2 175 357 A1 | 4/2010 |
| EP | 2 196 893 A2 | 6/2010 |
| EP | 2 214 087 A1 | 8/2010 |
| EP | 2 226 715 A2 | 9/2010 |
| EP | 2 299 351 A2 | 3/2011 |
| EP | 2 302 496 A1 | 3/2011 |
| EP | 2 375 309 A1 | 10/2011 |
| EP | 2 375 314 A1 | 10/2011 |
| EP | 2 386 935 A1 | 11/2011 |
| EP | 2 407 868 A1 | 1/2012 |
| EP | 2 426 580 A2 | 3/2012 |
| EP | 2 447 818 A1 | 5/2012 |
| EP | 2 527 966 A2 | 11/2012 |
| EP | 2 541 376 A1 | 1/2013 |
| EP | 2 555 500 A1 | 2/2013 |
| EP | 2 530 677 A2 | 7/2013 |
| EP | 2 615 535 A1 | 7/2013 |
| EP | 2 631 737 A1 | 8/2013 |
| EP | 2 674 846 A2 | 12/2013 |
| EP | 2 733 578 A2 | 5/2014 |
| EP | 2 808 764 A1 | 12/2014 |
| EP | 2 809 058 A1 | 12/2014 |
| EP | 2 813 938 A1 | 12/2014 |
| GB | 2 402 105 A | 12/2004 |
| JP | H07-151512 | 6/1995 |
| JP | H08-227341 A | 9/1996 |
| JP | H09-330175 A | 12/1997 |
| JP | H11-203044 A | 7/1999 |
| JP | 2001-202192 A | 7/2001 |
| JP | 2002-149312 A | 5/2002 |
| JP | 2003-157131 A | 5/2003 |
| JP | 2003-186597 A | 7/2003 |
| JP | 2004-054861 A | 2/2004 |
| JP | 2004-062648 A | 2/2004 |
| JP | 2004-070492 A | 3/2004 |
| JP | 2004-086733 A | 3/2004 |
| JP | 2005-031786 A | 2/2005 |
| JP | 2005-092386 A | 4/2005 |
| JP | 2005-135106 A | 5/2005 |
| JP | 2005-157842 A | 6/2005 |
| JP | 2006-185443 A | 7/2006 |
| JP | 2007-116384 A | 5/2007 |
| JP | 2007-264808 A | 10/2007 |
| JP | 2008-009759 A | 1/2008 |
| JP | 2008-015890 A | 1/2008 |
| JP | 2008-033739 A | 2/2008 |
| JP | 2008-146453 A | 6/2008 |
| JP | 2008-537615 | 9/2008 |
| JP | 2008 305174 A | 12/2008 |
| JP | 2009-500761 | 1/2009 |
| JP | 2009-211704 A | 9/2009 |
| JP | 2009-217543 A | 9/2009 |
| JP | 2010-009321 A | 1/2010 |
| JP | 2010-146507 A | 7/2010 |
| JP | 2010-152716 A | 7/2010 |
| JP | 2010-176174 A | 8/2010 |
| JP | 2010-176337 A | 8/2010 |
| JP | 2010-181934 A | 8/2010 |
| JP | 2010-541071 A | 12/2010 |
| JP | 2011-501307 A | 1/2011 |
| JP | 2011-048666 A | 3/2011 |
| JP | 2011-048686 A | 3/2011 |
| JP | 2011-048762 A | 3/2011 |
| JP | 2011-048832 A | 3/2011 |
| JP | 2011-053831 A | 3/2011 |
| JP | 2011-059821 A | 3/2011 |
| JP | 2011-070342 A | 4/2011 |
| JP | 2011-100290 A | 5/2011 |
| JP | 2011-107823 A | 6/2011 |
| JP | 2011-123773 A | 6/2011 |
| JP | 2011-141868 A | 7/2011 |
| JP | 2011-192179 A | 9/2011 |
| JP | 2011-192215 A | 9/2011 |
| JP | 2011-242386 A | 12/2011 |
| JP | 2011-253556 A | 12/2011 |
| JP | 2011-257941 A | 12/2011 |
| JP | 2011-530101 A | 12/2011 |
| JP | 2012-027940 A | 2/2012 |
| JP | 2012-043266 A | 3/2012 |
| JP | 2012-043267 A | 3/2012 |
| JP | 2012-053754 | 3/2012 |
| JP | 2012-053926 A | 3/2012 |
| JP | 2012-073873 A | 4/2012 |
| JP | 2012-509605 A | 4/2012 |
| JP | 2012-093820 A | 5/2012 |
| JP | 2012-123564 A | 6/2012 |
| JP | 2012-128825 A | 7/2012 |
| JP | 2013-080521 A | 5/2013 |
| JP | 2014-130567 A | 7/2014 |
| KR | 2006-0071353 A | 6/2006 |
| KR | 2008-0045143 A | 4/2008 |
| KR | 2008-0054346 A | 6/2008 |
| KR | 2010 0133246 A | 12/2010 |
| KR | 2011 0086501 A | 7/2011 |
| KR | 2013 0099647 A | 9/2013 |
| KR | 2014 0079110 A | 6/2014 |
| KR | 20150021977 A | 3/2015 |
| WO | WO 2005/106637 A2 | 11/2005 |
| WO | WO 2006/013485 A2 | 2/2006 |
| WO | WO 2006/042309 A1 | 4/2006 |
| WO | WO 2007/121557 A1 | 11/2007 |
| WO | WO 2008/030976 A2 | 3/2008 |
| WO | WO 2008/064142 A2 | 5/2008 |
| WO | WO 2009/155981 A1 | 12/2009 |
| WO | WO 2009/158549 A2 | 12/2009 |
| WO | WO 2010/013876 A1 | 2/2010 |
| WO | WO 2010/090010 A1 | 8/2010 |
| WO | WO 2011/024389 A1 | 3/2011 |
| WO | WO 2011/024465 A1 | 3/2011 |

(56) References Cited

FOREIGN PATENT DOCUMENTS

| | | |
|---|---|---|
| WO | WO 2011/093045 A1 | 8/2011 |
| WO | WO 2011/105009 A1 | 9/2011 |
| WO | WO 2011/115187 A1 | 9/2011 |
| WO | WO 2011/121375 A1 | 10/2011 |
| WO | WO 2012/096804 A2 | 7/2012 |
| WO | WO 2012/150540 A2 | 11/2012 |
| WO | WO 2013/169299 A1 | 11/2013 |
| WO | WO 2013/169849 A2 | 11/2013 |
| WO | WO 2013/169851 A2 | 11/2013 |
| WO | WO 2013/169853 A1 | 11/2013 |
| WO | WO 2013/169854 A2 | 11/2013 |
| WO | WO 2013/169870 A1 | 11/2013 |
| WO | WO 2013/169875 A2 | 11/2013 |
| WO | WO 2013/169877 A2 | 11/2013 |
| WO | WO 2013/169882 A2 | 11/2013 |
| WO | WO 2014/105275 A1 | 7/2014 |
| WO | WO 2014/105276 A1 | 7/2014 |
| WO | WO 2014/105277 A1 | 7/2014 |
| WO | WO 2014/105278 A1 | 7/2014 |
| WO | WO 2014/105279 A1 | 7/2014 |
| WO | WO 2014/129655 A1 | 8/2014 |
| WO | WO 2014/149173 A1 | 9/2014 |

OTHER PUBLICATIONS

Azundris, "A Fire in the Sky," http://web.archive.org/web/20140722062639/http://blog.azundrix.com/archives/168-A-fire-in-the-sky.html, Jul. 22, 2014, 8 pages.
B-log—betriebsraum weblog, "Extremely Efficient Menu Selection: Marking Menus for the Flash Platform," http://www.betriebsraurn.de/blog/2009/12/11/extremely-efficient-menu-selection-marking -for-the-flash-platform, Dec. 11, 2009, 9 pages.
Clark, "Global Moxie, Touch Means a Renaissance for Radial Menus," http://globalmoxie.com/blog/radial-menus-for-touch-ui~print.shtml, Jul. 17, 2012, 7 pages.
Cohen, Cinemagraphs are Animated Gifs for Adults, http://www.tubefilter.com/2011/07/10/cinemagraph, Jul. 10, 2011, 3 pages.
CrackBerry Forums, Windows 8 Bezel Control and Gestures, http://wwwforums.crackberry.com/blackberry-playbook-f222/windows-8-bezel-control-gestures-705129/, Mar. 1, 2012, 8 pages.
Crook, "Microsoft Patenting Multi-Screen, Milti-Touch Gesures," http://techcrunch.com/2011/08/25/microsoft-awarded-patents-for-multi-screen-multi-touch-gestures/, Aug. 25, 2011, 8 pages.
cvil.ly—a design blog, Interesting Touch Interactions on Windows 8, http://cvil.ly/2011/06/04/interesting-touch-interactions-on-windows-8/, Jun. 4, 2011, 3 pages.
Davidson, et al., "Extending 2D Object Arrangement with Pressure-Sensitive Layering Cues", Proceedings of the 21st Annual ACM Symposium on User Interface Software and Technology, Oct. 19, 2008, 4 pages.
Dinwiddie, et al., "Combined-User Interface for Computers, Television, Video Recorders, and Telephone, Etc", ip.com Journal, Aug. 1, 1990, 3 Pages.
Drinkwater, "Glossary: Pre/Post Alarm Image Buffer," http://www.networkwebcams.com/ip-camera-learning-center/2008/07/17/glossary-prepost-alarm-image-buffer/, Jul. 17, 2008, 1 page.
Fenlon, "The Case for Bezel Touch Gestures on Apple's iPad," http://www.tested.com/tech/tablets/3104-the case-for-bezel-touch-gestures-on-apples-ipad/, Nov. 2, 2011, 6 pages.
Flixel, "Cinemagraph Pro for Mac", https://flixel.com/products/mac/cinemagraph-pro, 2014, 7 pages.
Flock, "Cinemagraphics: What It Looks Like When a Photo Moves," http://www.washingtonpost.com/blogs/blowpost/post/cinernagraphs-what-it-looks-like-when-a-photo-moves/2011/07-08/gl@AONez3H.blog.html, Jul. 12, 2011, 3 pages.
Flowplayer, "Slowmotion: Flowplayer," https://web.archive.org/web/20150226191526/http://flash.flowplayer.org/plugins/streaming/slowmotion.html, Feb. 26, 2015, 4 pages.

Forlines, et al., "Glimpse: a Novel Input Model for Multi-level Devices", Chi '05 Extended Abstracts on Human Factors in Computing Systems, Apr. 2, 2005, 4 pages.
IBM et al., "Pressure-Sensitive Icons", IBM Technical Disclosure Bulletin, vol. 33, No. 1B, Jun. 1, 1990, 3 pages.
iCIMS Recruiting Software, "Blackberry Playbook Review," http://www.tested.com/tech.tablets/5749-blackberry-playbook-review/, 2015, 11 pages.
Kaaresoja, "Snap-Crackle-Pop: Tactile Feedback for Mobile Touch Screens," Nokia Research Center, Helsinki, Finland, Proceedings of Eurohaptics vol. 2006, Jul. 3, 2006, 2 pages.
Kronfli, "HTC Zoe Comes to Goole Play, Here's Everthing You Need to Know," Know Your Mobile, http://www.knowyourmobile.com/htc/htc-one/19550/what-htc-zoe, Aug. 14, 2014, 5 pages.
Laurie, "The Power of the Right Click," http://vlaurie.com/right-click/customize-context-menu.html, 2002-2016, 3 pages.
McRitchie, "Internet Explorer Right-Click Menus," http://web.archive.org/web-201405020/http:/dmcritchie.mvps.org/ie/rightie6.htm, May 2, 2014, 10 pages.
Microsoft, "Use Radial Menus to Display Commands in OneNote for Windows 8," https://support.office.com/en-us/article/Use-radial-menues-to-display-OneNote-commands-Od75f03f-cde7-493a-a8a0b2ed6f99fbe2, 2016, 5 pages.
Minsky, "Computational Haptics the *Sandpaper* System for Synthesizing Texture for a Force-Feedback Display," Massachusetts Institute of Technology, Jun. 1978, 217 pages.
Nikon, "Scene Recognition System and Advanced SRS," http://www.nikonusa.com/en.Learn-And-Explore/Article/ftlzi4rr/Scene-Recognition-System.html, Jul. 22, 2015, 2 pages.
O'Hara, et al., "Pressure-Sensitive Icons", ip.com Journal, ip.com Inc., West Henrietta, NY, US, Jun. 1, 1990, 2 pages.
Pallenberg, "Wow, the new iPad had gestures." https://plus.google.com/+SaschaPallenberg/posts/aaJtJogu8ac, Mar. 7, 2012, 2 pages.
PoliceOne.com, "COBAN Technoligies Pre-Event Buffer & Fail Safe Feature," http://www.policeone.com/police-products/police-technology/mobile-computures/videos/5955587-COBAN-Technologies-Pre-Event, Nov. 11, 2010, 2 pages.
Pradeep, "Android App Development—Microsoft Awarded With Patents on Gestures Supported on Windows 8," http://mspoweruser.com/microsoft-awarded-with-patents-on-gestures-supported-on-windows-8/, Aug. 25, 2011, 16 pages.
"Quickly Preview Songs in Windows Media Player 12 in Windows 7," Quickly Preview Songs in Windows Media Player 12 in Windows 7. How-to Geek, Apr. 28, 2010, Web. May 8, 2010, http://web.archive.org/web/20100502013134/http://www.howtogeek.com/howto/16157/quickly-preview-songs-in-windows-media-center-12-in-windows-7>, 6 pages.
Quinn, et al., "Zoofing! Faster List Selections with Pressure-Zoom-Flick-Scrolling", Proceedings of the 21st Annual Conference of the Australian Computer-Human Interaction Special Interest Group on Design, Nov. 23, 2009, ACM Press, vol. 411, 8 pages.
Rekimoto, et al., "PreSense: Interaction Techniques for Finger Sensing Input Devices", Proceedings of the 16th Annual ACM Symposium on User Interface Software and Technology, Nov. 30, 2003, 10 pages.
Rekimoto, et al., "PreSensell: Bi-directional Touch and Pressure Sensing Interactions with Tactile Feedback", Conference on Human Factors in Computing Systems Archive, ACM, Apr. 22, 2006, 6 pages.
Sony, "Intelligent Scene Recognition," https://www.sony-asia.com/article/252999/section/product/product/dsc-t77, downloaded on May 20, 2016, 5 pages.
Stross, "Wearing a Badge, and a Video Camera," The New York Times, http://www.nytimes.com/2013/04/07/business/wearable-video-cameras-for-police-offers.html? R=0, Apr. 6, 2013, 4 pages.
Taser, "Taser Axon Body Camera User Manual," https://www.taser.com/images/support/downloads/product-resourses/axon_body_product_manual.pdf, Oct. 1, 2013, 24 pages.
Tidwell, "Designing Interfaces," O'Reilly Media, Inc., USA, Nov. 2005, 348 pages.
Wikipedia, "AirDrop,", Wikipedia, the free encyclopedia, http://en.wikipedia.org/wiki/AirDrop, May 17, 2016, 5 pages.

(56) References Cited

OTHER PUBLICATIONS

Wikipedia, "Cinemagraph," Wikipedia, the free encyclopedia, http://en.wikipedia.org/wiki/Cinemagraph, Last Modified Mar. 16, 2016, 2 pages.
Wikipedia, "Context Menu," Wikipedia, the free encyclopedia https://en.wikipedia.org/wiki/Context menu, Last Modified May 15, 2016, 4 pages.
Wikipedia, "HTC One (M7)," Wikipedia, the free encyclopedia, https://en.wikipedia.org/wiki/HTC_One_(M7), Mar. 2013, 20 pages.
Wikipedia, "Mobile Ad Hoc Network," Wikipedia, the free encyclopedia, http://en.wikipedia.org/wiki/Mobile_ad_hoc_network, May 20, 2016, 4 pages.
Wikipedia, "Pie Menu," Wikipedia, the free encyclopedia, http://en.wikipedia.org/wiki/Pie_menu, Last Modified Jun. 4, 2016, 3 pages.
Wikipedia, "Quick Look," from Wikipedia, the free encyclopedia, https;//en.wikipedia.org/wiki/Quick_Look, Last Modified Jan. 15, 2016, 3 pages.
Wikipedia, "Sony Xperia Z1", Wikipedia, the free encyclopedia, https://enwikipedia.org/wiki/Sony_Experia_Z1, Sep. 2013, 10 pages.
YouTube, "Blackberry Playbook bezel interaction," https://www.youtube.com/watch?v=YGkzFqnOwXI, Jan. 10, 2011, 2 pages.
Office Action, dated Dec. 18, 2015, received in Australian Patent Application No. 2013368440, which corresponds with U.S. Appl. No. 14/536,426, 3 pages.
Office Action, dated Apr. 5, 2016, received in Korean Patent Application No. 10-2015-7018851, which corresponds with U.S. Appl. No. 14/536,426, 7 pages.
Office Action, dated Jul. 21, 2016, received in European Patent Application No. 13795391.5, which corresponds with U.S. Appl. No. 14/536,426, 9 pages.
Office Action, dated Dec. 17, 2015, received in U.S. Appl. No. 14/536,426, 28 pages.
Final Office Action, dated May 6, 2016, received in U.S. Appl. No. 14/536,426, 23 pages.
Office Action, dated Jul. 15, 2015, received in Australian Patent Application No. 2013259606, which corresponds with U.S. Appl. No. 14/536,426, 3 pages.
Notice of Allowance, dated May 23, 2016, received in Australian Patent Application No. 2013259606, which corresponds with U.S. Appl. No. 14/536,426, 3 pages.
Office Action, dated Nov. 18, 2015, received in Australian Patent Application No. 2015101231, which corresponds with U.S. Appl. No. 14/536,426, 3 pages.
Decision to Grant, dated Jul. 14, 2016, received in European Patent Application No. 13724100.6, which corresponds with U.S. Appl. No. 14/536,426, 1 page.
Office Action, dated Mar. 4, 2016, received in Japanese Patent Application No. 2015-511644, which corresponds with U.S. Appl. No. 14/536,426, 3 pages.
Office Action, dated Feb. 1, 2016, received in Australian Patent Application No. 2013368441, which corresponds with U.S. Appl. No. 14/608,926, 3 pages.
Notice of Allowance, dated Mar. 30, 2016, received in Australian Patent Application No. 2013368441, which corresponds with U.S. Appl. No. 14/608,926, 1 page.
Certificate of Grant, dated Jul. 29, 2016, received in Australian Patent Application No. 2013368441, which corresponds with U.S. Appl. No. 14/608,926, 1 page.
Office Action, dated Apr. 21, 2016, received in European Patent Application No. 13795392.3, which corresponds with U.S. Appl. No. 14/608,926, 6 pages.
Office Action, dated May 6, 2016, received in European Patent Application No. 13795392.3, which corresponds with U.S. Appl. No. 14/608,926, 6 pages.
Office Action, dated Mar. 14, 2016, received in Japanese Patent Application No. 2015-549392, which corresponds with U.S. Appl. No. 14/608,926, 4 pages.
Office Action, dated May 12, 2016, received in Korean Patent Application No. 10-2015-7018853, which corresponds with U.S. Appl. No. 14/608,926, 4 pages.
Office Action, dated Jul. 17, 2015, received in Australian Patent Application No. 2013259613, which corresponds with U.S. Appl. No. 14/536,646, 5 pages.
Office Action, dated May 31, 2016, received in Australian Patent Application No. 2013259613, which corresponds with U.S. Appl. No. 14/536,646, 4 pages.
Notice of Allowance, dated Jul. 5, 2016, received in Australian Patent Application No. 2013259613, which corresponds with U.S. Appl. No. 14/536,646, 3 pages.
Office Action, dated Nov. 12, 2015, received in European Patent Application No. 13724102.2, which corresponds with U.S. Appl. No. 14/536,646, 6 pages.
Office Action, dated May 31, 2016, received in European Patent Application No. 13724102.2, which corresponds with U.S. Appl. No. 14/536,646, 5 pages.
Office Action, dated Feb. 29, 2016, received in Japanese Patent Application No. 2015-511645, which corresponds with U.S. Appl. No. 14/536,646, 5 pages.
Office Action, dated Aug. 27, 2015, received in Australian Patent Application No. 2013259614, which corresponds with U.S. Appl. No. 14/536,141, 4 pages.
Office Action, dated Jan. 7, 2016, received in European Patent Application No. 13726053.5, which corresponds with U.S. Appl. No. 14/536,141, 10 pages.
Office Action, dated Feb. 29, 2016, received in Japanese Patent Application No. 2015-511646, which corresponds with U.S. Appl. No. 14/536,141, 3 pages.
Office Action, dated Jan. 29, 2016, received in Australian Patent Application No. 2013368443, which corresponds with U.S. Appl. No. 14/536,141, 3 pages.
Notice of Allowance, dated Mar. 11, 2016, received in Australian Patent Application No. 2013368443, which corresponds with U.S. Appl. No. 14/536,141, 2 pages.
Certificate of Grant, dated Jul. 7, 2016, received in Australian Patent Application No. 2013368443, which corresponds with U.S. Appl. No. 14/536,141, 3 pages.
Office Action, dated Jul. 4, 2016, received in Japanese Patent Application No. 2015-549393, which corresponds with U.S. Appl. No. 14/536,141, 4 pages.
Office Action, dated Apr. 5, 2016, received in Korean Patent Application No. 10-2015-7018448, which corresponds with U.S. Appl. No. 14/536,141, 6 pages.
Office Action, dated Aug. 1, 2016, received in U.S. Appl. No. 14/536,203, 14 pages.
Office Action, dated Jul. 9, 2015, received in Australian Patent Application No. 2013259630, which corresponds with U.S. Appl. No. 14/536,203, 3 pages.
Notice of Allowance, dated Jun. 15, 2016, received in Australian Patent Applicatin No. 2013259630, which corresponds with U.S. Appl. No. 14/536,203, 3 pages.
Office Action, dated Nov. 11, 2015, received in European Patent Application No. 13724104.8, which corresponds with U.S. Appl. No. 14/536,203, 5 pages.
Office Action, dated May 31, 2016, received in European Patent Application No. 13724104.8, which corresponds with U.S. Appl. No. 14/536,203, 5 pages.
Office Action, dated Feb. 15, 2016, received in Japanese Patent Application No. 2015-511650, which corresponds with U.S. Appl. No. 14/536,203, 5 pages.
Notice of Allowance, dated Aug. 5, 2016, received in Japanese Patent Application No. 2015-511650, which corresponds with U.S. Appl. No. 14/536,203, 4 pages.
Office Action, dated Dec. 4, 2015, received in Korean Patent Application No. 2014-7034520, which corresponds with U.S. Appl. No. 14/536,203, 4 pages.
Office Action, dated Jul. 22, 2016, received in European Office Action No. 13798465.4, which corresponds with U.S. Appl. No. 14/608,965, 8 pages.

(56) References Cited

OTHER PUBLICATIONS

Office Action, dated Aug. 10, 2015, received in Australian Patent Application No. 2013259637, which corresponds with U.S. Appl. No. 14/536,267, 3 pages.
Notice of Allowance, dated Jun. 28, 2016, received in Australian Patent Application No. 2013259637, which corresponds with U.S. Appl. No. 14/536,267, 3 pages.
Office Action, dated Jan. 29, 2016, received in Japanese Patent Application No. 2015-511652, which corresponds with U.S. Appl. No. 14/536,267, 3 pages.
Office Action, dated Dec. 4, 2015, received in Korean Patent Application No. 2014-7034530, which corresponds with U.S. Appl. No. 14/536,267, 3 pages.
Office Action, dated Aug. 18, 2015, received in Australian Patent Application No. 2013259642, which corresponds with U.S. Appl. No. 14/536,291, 3 pages.
Office Action, dated Jul. 25, 2016, received in Australian Patent Application No. 2013259642, which corresponds with U.S. Appl. No. 14/536,291, 3 pages.
Office Action, dated Aug. 10, 2016, received in AustralianPatent Application No. 2013259642, which corresponds with U.S. Appl. No. 14/536,291, 4 pages.
Office Action, dated Jan. 7, 2016, received in European Patent Application No. 13724107.1, which corresponds with U.S. Appl. No. 14/536,291, 11 pages.
Office Action, dated Mar. 8, 2016, received in Japanese Patent Application No. 2015-511655, which corresponds with U.S. Appl. No. 14/536,291, 4 pages.
Office Action, dated Jan. 15, 2016, received in Australian Patent Application No. 2013368445, which corresponds with U.S. Appl. No. 14/608,985, 3 pages.
Office Action, dated Jul. 25, 2016, received in Japanese Patent Application No. 13811032.5, which corresponds with U.S. Appl. No. 14/608,985, 8 pages.
Office Action, dated Apr. 25, 2016, received in Japanese Patent Application No. 2015-550384, which corresponds with U.S. Appl. No. 14/608,985, 4 pages.
Office Action, dated Mar. 31, 2016, received in U.S. Appl. No. 14/864,737, 17 pages.
Notice of Allowance, dated Jul. 1, 2016, received in Chinese Patent Application No. 201620214376.7, which correresponds with U.S. Appl. No. 14/864,737, 3 pages.
Patent, dated Aug. 3, 2016, received in Chinese Patent Application No. 201620214376.7, which correresponds with U.S. Appl. No. 14/864,737, 5 pages.
Certificate of Registration, dated Jun. 20, 2016, received in German Patent Application No. 202016001845.1, which correresponds with U.S. Appl. No. 14/864,737, 3 pages.
Office Action, dated Apr. 5, 2016, received in Danish Patent Application No. 201500577, which corresponds with U.S. Appl. No. 14/864,737, 7 pages.
Intention to Grant, dated Aug. 2, 2016, received in Danish Patent Application No. 201500577, which corresponds with U.S. Appl. No. 14/864,737, 2 pages.
Office Action, dated Jun. 27, 2016, received in U.S. Appl. No. 14/866,981, 22 pages.
Office Action, dated May 10, 2016, received in Australian Patent Application No. 2016100254, which corresponds with U.S. Appl. No. 14/866,981, 6 pages.
Notice of Allowance, dated Jul. 27, 2016, received in Chinese Patent Application No. 201620176169.7, which corresponds with U.S. Appl. No. 14/866,981, 3 pages.
Certificate of Registration, dated Jun. 20, 2016, received in German Patent Application No. 202016001514.2, which corresponds with U.S. Appl. No. 14/864,737, 3 pages.
Office Action, dated Mar. 18, 2016, received in Danish Patent Application No. 2016100254, which corresponds with U.S. Appl. No. 14/866,981, 9 pages.
Office Action, dated May 19, 2016, received in Australian Patent Application No. 2016100251, which corresponds with U.S. Appl. No. 14/866,159, 5 pages.
Certificate of Registration, dated Jun. 16, 2016, received in German Patent No. 202016001483.9, which corresponds with U.S. Appl. No. 14/866,159, 3 pages.
Office Action, dated Mar. 9, 2016, received in Danish Patent Application No. 201500574, which corresponds with U.S. Appl. No. 14/866,159, 11 pages.
Innovation Patent Certificate, dated Aug. 4, 2016, received in Australian Patent Appliction No. 2016101201, which corresponds with U.S. Appl. No. 14/686,078, 1 page.
Certificate of Registration, dated Jun. 30, 2016, received in German Patent Application No. 20201600156.9, which corresponds with U.S. Appl. No. 14/868,078, 3 pages.
Office Action, dated Mar. 30, 2016, received in Australian Patent Application No. 201500588, which corresponds with U.S. Appl. No. 14/868,078, 9 pages.
Office Action, dated May 9, 2016, received in U.S. Appl. No. 14/863,432, 26 pages.
Office Action, dated Apr. 4, 2016, received in Danish Patent Application No. 201500582, which corresponds with U.S. Appl. No. 14/863,432, 10 pages.
Patent, dated Aug. 8, 2016, received in Australian Patent Application 2016100653, corresponds with U.S. Appl. No. 14/866,511, 1 page.
Office Action, dated Mar. 22, 2016, received in Danish Patent Application No. 201500576, which corresponds with U.S. Appl. No. 14/866,511, 10 pages.
Notice of Allowance, dated Jun. 8, 2016, received in Danish Patent Application No. 201500576, which corresponds with U.S. Appl. No. 14/866,511, 2 pages.
Office Action, dated May 10, 2016, received in U.S. Appl. No. 14/866,489, 15 pages.
Office Action, dated Mar. 28, 2016, received in U.S. Appl. No. 14/869,899, 17 pages.
Office Action, dated Jun. 28, 2016, received in U.S. Appl. No. 14/869,899, 5 pages.
Office Action, dated Feb. 3, 2016, received in Danish Patent Application No. 201500592, which corresponds with U.S. Appl. No. 14/869,899, 9 pages.
Office Action, dated Mar. 4, 2016, received in U.S. Appl. No. 14/866,992, 30 pages.
Final Office Action, dated Jul. 29, 2016, received in U.S. Appl. No. 14/866,992, 35 pages.
Office Action, dated Mar. 18, 2016, received in Danish Patent Application No. 201500593, which corresponds with U.S. Appl. No. 14/866,992, 10 pages.
Office Action, dated Jun. 27, 2016, received in Danish Patent Application No. 201500593, which corresponds with U.S. Appl. No. 14/866,992, 7 pages.
Office Action, dated Nov. 30, 2015, received in U.S. Appl. No. 14/845,217, 24 pages.
Final Office Action, dated Apr. 22, 2016, received in U.S. Appl. No. 14/845,217, 36 pages.
Office Action, dated Feb. 3, 2016, received in U.S. Appl. No. 14/856,517, 36 pages.
Final Office Action, dated Jul. 13, 2016, received in U.S. Appl. No. 14/856,517, 30 pages.
Office Action, dated Feb. 11, 2016, received in U.S. Appl. No. 14/856,519, 34 pages.
Final Office Action, dated Jul. 15, 2016, received in U.S. Appl. No. 14/856,519, 31 pages.
Office Action, dated Feb. 1, 2016, received in U.S. Appl. No. 14/857,645, 15 pages.
Final Office Action, dated Jun. 16, 2016, received in U.S. Appl. No. 14/857,645, 12 pages.
Notice of Allowance, dated May 23, 2016, received in U.S. Appl. No. 14/864,580, 9 pages.
Corrected Notice of Allowability, dated Jun. 16, 2016, received in U.S. Appl. No. 14/864,580, 2 pages.
Notice of Allowance, dated Aug. 4, 2016, received in U.S. Appl. No. 14/864,580, 9 pages.

(56) References Cited

OTHER PUBLICATIONS

Office Action, dated Apr. 8, 2016, received in Danish Patent Application No. 201500584, which corresponds with U.S. Appl. No. 14/864,580, 9 pages.
Office Action, dated Apr. 19, 2016, received in U.S. Appl. No. 14/864,627, 9 pages.
Office Action, dated Apr. 8, 2016, received in Danish Patent Application No. 201500585, which corresponds with U.S. Appl. No. 14/864,627, 9 pages.
Office Action, dated Mar. 29, 2016, received in U.S. Appl. No. 14/866,361, 22 pages.
Notice of Allowance, dated Jul. 19, 2016, received in U.S. Appl. No. 14/866,361, 8 pages.
Office Action, dated Jun. 10, 2016, received in Australian Patent Application No. 2016100292, which corresponds with U.S. Appl. No. 14/866,361, 4 pages.
Notice of Allowance/Grant, dated Jul. 1, 2016, received in Chinese Patent Application No. 201620251706.X, which corresponds with U.S. Appl. No. 14/866,361, 3 pages.
Letters Patent, dated Aug. 3, 2016, received in Chinese Patent Application No. 201620251706.X, which corresponds with U.S. Appl. No. 14/866,361, 3 pages.
Certificate of Registration, dated Jun. 24, 2016, received in German Patent Application No. 202016001819.2, which corresponds with U.S. Appl. No. 14/866,361, 3 pages.
Office Action, dated Apr. 7, 2016, received in Danish Patent Application No. 201500579, which corresponds with U.S. Appl. No. 14/866,361, 10 pages.
Patent, dated Aug. 8, 2016, received in Australian Patent Application No. 2016100649, which corresponds with U.S. Appl. No. 14/866,987, 1 page.
Office Action, dated Mar. 22, 2016, received in Danish Patent Application No. 201500587, which corresponds with U.S. Appl. No. 14/866,987, 8 pages.
Notice of Allowance, dated Jun. 10, 2016, received in Danish Patent Application No. 201500587, which corresponds with U.S. Appl. No. 14/866,987, 2 pages.
Certificate of Exam, dated Jul. 21, 2016, received in Australian Patent Application No. 2016100652, which corresponds with U.S. Appl. No. 14/866,989, 1 page.
Office Action, dated Apr. 1, 2016, received in Danish Patent Application No. 201500589, which corresponds with U.S. Appl. No. 14/866,989, 8 pages.
Notice of Allowance, dated Jun. 10, 2016, received in Danish Patent Application No. 201500589, which corresponds with U.S. Appl. No. 14/866,989, 2 pages.
Office Action, dated Apr. 11, 2016, received in U.S. Appl. No. 14/871,236, 23 pages.
Office Action, dated Jun. 28, 2016, received in U.S. Appl. No. 14/871,236, 21 pages.
Office Action, dated Apr. 8, 2016, received in Danish Patent Application No. 201500595, which corresponds with U.S. Appl. No. 14/871,236, 12 pages.
Office Action, dated May 26, 2016, received in Danish Patent Application No. 201500595, which corresponds with U.S. Appl. No. 14/871,236, 14 pages.
Office Action, dated Apr. 6, 2016, received in Danish Patent Application No. 201500596, which corresponds with U.S. Appl. No. 14/870,882, 7 pages.
Office Action, dated Jun. 9, 2016, received in Danish Patent Application No. 201500596, which corresponds with U.S. Appl. No. 14/870,882, 9 pages.
Office Action, dated Apr. 7, 2016, received in Danish Patent Application No. 201500597, which corresponds with U.S. Appl. No. 14/871,227, 7 pages.
Notice of Allowance, dated Jun. 21, 2016, received in Danish Patent Application No. 201500597, which corresponds with U.S. Appl. No. 14/871,227, 2 pages.
Office Action, dated Apr. 18, 2016, received in Danish Patent Application No. 201500601, which corresponds with U.S. Appl. No. 14/871,336, 8 pages.
Notice of Allowance, dated Apr. 18, 2016, received in Danish Patent Application No. 201500600, which corresponds with U.S. Appl. No. 14/871,462, 7 pages.
Office Action, dated Apr. 29, 2016, received in U.S. Appl. No. 14/867,823, 28 pages.
Office Action, dated Mar. 18, 2016, received in Danish Patent Application No. 201500594, which corresponds with U.S. Appl. No. 14/867,823, 10 pages.
Office Action, dated May 10, 2016, received in U.S. Appl. No. 14/867,892, 28 pages.
Office Action, dated Mar. 21, 2016, received in Danish Patent Application No. 201500598, which corresponds with U.S. Appl. No. 14/867,892, 9 pages.
Office Action, dated May 23, 2016, received in Australian Patent Application No. 2016100253, which corresponds with U.S. Appl. No. 14/867,990, 5 pages.
Certificate of Registration, dated Jun. 16, 2016, received in German Patent No. 202016001489.8, which corresponds with U.S. Appl. No. 14/867,990, 3 pages.
Office Action, dated Mar. 18, 2016, received in Danish Patent Application No. 201500581, which corresponds with U.S. Appl. No. 14/867,990, 9 pages.
International Search Report and Written Opinion dated May 26, 2014, received in International Application No. PCT/US2013/040053, which corresponds to U.S. Appl. No. 14/535,671, 32 pages.
International Preliminary Report on Patentability dated Nov. 20, 2014, received in International Application No. PCT/US2013/040053, which corresponds to U.S. Appl. No. 14/535,671, 26 pages.
International Search Report and Written Opinion dated Apr. 7, 2014, received in International Application No. PCT/US2013/069472, which corresponds to U.S. Appl. No. 14/608,895, 24 pages.
International Preliminary Report on Patentability, dated Jun. 30, 2015, received in International Patent Application No. PCT/US2013/069472, which corresponds with U.S. Appl. No. 14/608,895, 18 pages.
International Search Report and Written Opinion dated Aug. 7, 2013, received in International Application No. PCT/US2013/040054, which corresponds to U.S. Appl. No. 14/536,235, 12 pages.
International Preliminary Report on Patentability dated Nov. 20, 2014, received in International Application No. PCT/US2013/040054, which corresponds to U.S. Appl. No. 14/536,235, 11 pages.
International Search Report and Written Opinion dated Aug. 7, 2013, received in International Application No. PCT/US2013/040056, which corresponds to U.S. Appl. No. 14/536,367, 12 pages.
International Preliminary Report on Patentability dated Nov. 20, 2014, received in International Application No. PCT/US2013/040056, which corresponds to U.S. Appl. No. 14/536,367, 11 pages.
Extended European Search Report, dated Nov. 6, 2015, received in European Patent Application No. 15183980.0, which corresponds with U.S. Appl. No. 14/536,426, 7 pages.
International Search Report and Written Opinion dated Aug. 6, 2013, received in International Application No. PCT/US2013/040058, which corresponds to U.S. Appl. No. 14/536,426, 12 pages.
International Preliminary Report on Patentability dated Nov. 20, 2014, received in International Application No. PCT/US2013/040058, which corresponds to U.S. Appl. No. 14/536,426, 11 pages.
International Search Report and Written Opinion dated Feb. 5, 2014, received in International Application No. PCT/US2013/040061, which corresponds to U.S. Appl. No. 14/536,464, 30 pages.
International Preliminary Report on Patentability dated Nov. 20, 2014, received in International Application No. PCT/US2013/040061, which corresponds to U.S. Appl. No. 14/536,464, 26 pages.
International Search Report and Written Opinion dated May 8, 2014, received in International Application No. PCT/US2013/040067, which corresponds to U.S. Appl. No. 14/536,644, 45 pages.
International Preliminary Report on Patentability dated Nov. 20, 2014, received in International Application No. PCT/US2013/040067, which corresponds to U.S. Appl. No. 14/536,644, 36 pages.

(56) References Cited

OTHER PUBLICATIONS

International Search Report and Written Opinion dated Mar. 12, 2014, received in International Application No. PCT/US2013/069479, which corresponds with U.S. Appl. No. 14/608,926, 14 pages.
International Preliminary Report on Patentability, dated Jun. 30, 2015, received in International Patent Application No. PCT/US2013/069479, which corresponds with U.S. Appl. No. 14/608,926, 11 pages.
International Search Report and Written Opinion dated Aug. 7, 2013, received in International Application No. PCT/US2013/040070, which corresponds to U.S. Appl. No. 14/535,646, 12 pages.
International Preliminary Report on Patentability dated Nov. 20, 2014, received in International Application No. PCT/US2013/040070, which corresponds to U.S. Appl. No. 14/535,646, 10 pages.
International Search Report and Written Opinion dated Apr. 7, 2014, received in International Application No. PCT/US2013/040072, which corresponds to U.S. Appl. No. 14/536,141, 38 pages.
International Preliminary Report on Patentability dated Nov. 20, 2014, received in International Application No. PCT/US2013/040072, which corresponds to U.S. Appl. No. 14/536,141, 32 pages.
International Search Report and Written Opinion dated Apr. 7, 2014, received in International Application No. PCT/US2013/069483, which corresponds with U.S. Appl. No. 14/608,942, 18 pages.
International Preliminary Report on Patentability, dated Jun. 30, 2015, received in International Application No. PCT/2013/069483, which corresponds to U.S. Appl. No. 14/608,942, 13 pages.
International Search Report and Written Opinion dated Mar. 3, 2014, received in International Application No. PCT/US2013/040087, which corresponds to U.S. Appl. No. 14/536,166, 35 pages.
International Preliminary Report on Patentability dated Nov. 20, 2014, received in International Application No. PCT/2013/040087, which corresponds to U.S. Appl. No. 14/536,166, 29 pages.
International Search Report and Written Opinion dated Aug. 7, 2013, received in International Application No. PCT/US2013/040093, which corresponds to U.S. Appl. No. 14/536,203, 11 pages.
International Preliminary Report on Patentability dated Nov. 20, 2014, received in International Application No. PCT/2013040093, which corresponds to U.S. Appl. No. 14/536,203, 9 pages.
International Search Report and Written Opinion dated Jul. 9, 2014, received in International Application No. PCT/US2013/069484, which corresponds with U.S. Appl. No. 14/608,965, 17 pages.
International Preliminary Report on Patentability, dated Jun. 30, 2015, received in International Patent Application No. PCT/US2013/069484, which corresponds with U.S. Appl. No. 14/608,965, 12 pages.
International Search Report and Written Opinion dated Feb. 5, 2014, received in International Application No. PCT/US2013/040098, which corresponds to U.S. Appl. No. 14/536,247, 35 pages.
International Preliminary Report on Patentability dated Nov. 20, 2014, received in International Application No. PCT/2013/040098, which corresponds to U.S. Appl. No. 14/536,247, 27 pages.
International Search Report and Written Opinion dated Jan. 27, 2014, received in International Application No. PCT/US2013/040101, which corresponds to U.S. Appl. No. 14/536,267, 30 pages.
International Preliminary Report on Patentability dated Nov. 20, 2014, received in International Application No. PCT/2013/040101, which corresponds to U.S. Appl. No. 14/536,267, 24 pages.
International Search Report and Written Opinion dated Jan. 8, 2014, received in International Application No. PCT/US2013/040108, which corresponds to U.S. Appl. No. 14/536,291, 30 pages.
International Preliminary Report on Patentability dated Nov. 20, 2014, received in International Application No. PCT/2013/040108, which corresponds to U.S. Appl. No. 14/536,291, 25 pages.
International Search Report and Written Opinion dated Jun. 2, 2014, received in International Application No. PCT/US2013/069486, which corresponds with U.S. Appl. No. 14/608,985, 7 pages.
International Preliminary Report on Patentability, dated Jun. 30, 2015, received in International Patent Application No. PCT/US2013/069486, which corresponds with U.S. Appl. No. 14/608,985, 19 pages.
International Search Report and Written Opinion dated Mar. 6, 2014, received in International Application No. PCT/US2013/069489, which corresponds with U.S. Appl. No. 14/609,006, 12 pages.
International Preliminary Report on Patentability, dated Jun. 30, 2015, received in International Patent Application No. PCT/US2013/069489, which corresponds with U.S. Appl. No. 14/609,006, 10 pages.
International Search Report and Written Opinion, dated Apr. 25, 2016, received in International Patent Application No. PCT/US2016/018758, which corresponds with U.S. Appl. No. 14/866,159, 15 pages.
International Search Report and Written Opinion, dated Jul. 21, 2016, received in International Patent Application No. PCT/US2016/019913, which corresponds with U.S. Appl. No. 14/868,078, 16 pages.
Office Action, dated Jan. 25, 2016, received in U.S. Appl. No. 14/864,580, 29 pages.
Bolluyt, "5 Apple Watch Revelations from Apple's New WatchKit", http://www.cheatsheet.com/tecnology/5-apple-watch-revelations-from-apples-new-watchkit.html/?a=viewall, Nov. 22, 2014, 3 pages.
Farshad, "SageThumbs—Preview and Convert Pictures From Windows Context Menu", https://web.addictivetips.com/windows-tips/sagethumbs-preview-and-convert-photos-from-windows-context-menu, Aug. 8, 2011, 5 pages.
Innovation (Unexamined) Patent, dated Aug. 25, 2016, received in Australian Patent Application No. 2016101436, which corresponds with U.S. Appl. No. 14/871,236, 1 pages.
Anonymous, "Notifications, Android 4.4 and Lower", Android Developers, https://developer.android.com/design/patterns/notifications_k.html, May 24, 2015, 9 pages.
Dzyre, "10 Android Notification Features You Can Fiddle With", http://www.hongkiat.com/blog/android-notification-features, Mar. 10, 2014, 10 pages.
Gardner, "Recenz—Recent Apps In One Tap", You Tube, https://www.youtube.com/watch?v-qailSHRgsTo, May 15, 2015, 1 page.
Gonzalo et al., "Zliding: Fluid Zooming and Sliding for High Precision Parameter Manipulation", Department of Computer Science, University of Toronto, Seattle, Washington, Oct. 23, 2005, 10 pages.
Grant, "Android's Notification Center", https://www.objc.io/issues/11-android/android-notifications, Apr. 30, 2014, 26 pages.
Mitroff, "Google Android 5.0 Lollipop," http://www.cnet.com/products/google-android-5-0-lollipop, Mar. 12, 2015, 5 pages.
Notice of Allowance, dated Dec. 20, 2016, received in Australian Patent Application No. 2013368440, which corresponds with U.S. Appl. No. 14/536,426, 3 pages.
Office Action, dated Jan. 20, 2017, received in European Patent Application No. 15183980.0, which corresponds with U.S. Appl. No. 14/536,426, 5 pages.
Office Action, dated Jan. 3, 2017, received in Australian Patent Application No. 2016201451, which corresponds with U.S. Appl. No. 14/608,926, 3 pages.
Office Action, dated Nov. 11, 2016, received in European Patent Application No. 13795392.3, which corresponds with U.S. Appl. No. 14/608,926, 6 pages.
Notice of Allowance, dated Jan. 17, 2017, received in Japanese Patent Application No. 2015-549392, which corresponds with U.S. Appl. No. 14/608,926, 2 pages.
Office Action, dated Dec. 1, 2016, received in Chinese Patent Application No. 2013800362059, which corresponds with U.S. Appl. No. 14/536,646, 3 pages.
Notice of Allowance, dated Jan. 4, 2017, received in European Patent Application No. 13724102.2, which corresponds with U.S. Appl. No. 14/536,646, 5 pages.
Notice of Allowance, dated Dec. 22, 2016, received in Japanese Patent Application No. 2015-511645, which corresponds with U.S. Appl. No. 14/536,646, 2 pages.

(56) References Cited

OTHER PUBLICATIONS

Office Action, dated Dec. 8, 2016, received in U.S. Appl. No. 14/608,942, 9 pages.
Notice of Allowance, dated Feb. 1, 2017, received received in U.S. Appl. No. 14/536,203, 9 pages.
Office Action, dated Dec. 9, 2016, received in Chinese Patent Application No. 2016120601564130, which corresponds with U.S. Appl. No. 14/536,267, 4 pages.
Office Action, dated Jan. 5, 2017, received in Korean Patent Application No. 2016-7029533, which corresponds with U.S. Appl. No. 14/536,267, 2 pages.
Final Office Action, dated Dec. 22, 2016, received in Japanese Patent Application No. 2015-511655, which corresponds with U.S. Appl. No. 14/536,291, 3 pages.
Notice of Allowance, dated Jan. 18, 2017, received in Australian Patent Application No. 2013368445, which corresponds with U.S. Appl. No. 14/608,985, 3 pages.
Notice of Allowance, dated Jan. 24, 2017, received in Japanese Patent Application No. 2015-550384, which corresponds with U.S. Appl. No. 14/608,985, 5 pages.
Office Action, dated Nov. 4, 2016, received in Korean Patent Application No. 10-2015-7019984, which corresponds with U.S. Appl. No. 14/608,985, 8 pages.
Office Action, dated Jan. 19, 2017, received in U.S. Appl. No. 14/609,042, 12 pages.
Office Action, dated Dec. 5, 2016, received in Danish Patent Application No. 201500575, which corresponds with U.S. Appl. No. 14/866,981, 3 pages.
Notice of Allowance, dated Jan. 30, 2017, received in received in Danish Patent Application No. 201500588, which corresponds with U.S. Appl. No. 14/868,078, 2 pages.
Notice of Allowance, dated Jan. 12, 2017, received in Chinese Patent Application No. 201620470063.8, which corresponds with U.S. Appl. No. 14/863,432, 1 page.
Final Office Action, dated Jan. 27, 2017, received in U.S. Appl. No. 14/866,511, 26 pages.
Notice of Allowance, dated Jan. 12, 2017, received in Chinese Patent Application No. 201620470281.1, which corresponds with U.S. Appl. No. 14/866,511, 1 page.
Patent, dated Jan. 23, 2017, received in Danish Patent Application No. 201500576, which corresponds with U.S. Appl. No. 14/866,511, 3 pages.
Office Action, dated Nov. 22, 2016, received in Danish Patent Application No. 201670594, which corresponds with U.S. Appl. No. 14/869,899, 9 pages.
Office Action, dated Nov. 22, 2016, received in Australian Patent Application No. 2016101418, which corresponds with U.S. Appl. No. 14/866,992, 7 pages.
Notice of Allowance, dated Jan. 4, 2017, received in U.S. Appl. No. 14/845,217, 5 pages.
Notice of Allowance, dated Dec. 28, 2016, received in U.S. Appl. No. 14/864,580, 8 pages.
Notice of Allowance, dated Jan. 31, 2017, received in U.S. Appl. No. 14/864,627, 7 pages.
Certificate of Examination, dated Dec. 8, 2016, received in Australian Patent Application No. 2016100292, which corresponds with U.S. Appl. No. 14/866,361, 1 page.
Patent, dated Sep. 19, 2016, received in German Patent Application No. 202016002908.9, which corresponds with U.S. Appl. No. 14/866,987, 3 pages.
Notice of Allowance, dated Jan. 31, 2017, received in Danish Patent Application No. 201670463, which corresponds with U.S. Appl. No. 14/866,987, 3 pages.
Office Action, dated Feb. 9, 2017, received in U.S. Appl. No. 14/869,873, 17 pages.
Office Action, dated Nov. 25, 2016, received in U.S. Appl. No. 15/081,771, 17 pages.
Office Action, dated Jan. 20, 2017, received in U.S. Appl. No. 15/231,745, 21 pages.

Office Action (Search Report), dated Dec. 14, 2016, received in Danish Patent Application No. 201670590, which corresponds with U.S. Appl. No. 15/231,745, 9 pages.
Office Action, dated Jan. 5, 2017, received in Danish Patent Application No. 201670592, which corresponds with U.S. Appl. No. 15/231,745, 3 pages.
International Search Report and Written Opinion, dated Nov. 14, 2016, received in International Patent Application No. PCT/US2016/033541, which corresponds with U.S. Appl. No. 14/866,511, 29 pages.
International Search Report and Written Opinion, dated Jan. 12, 2017, received in International Patent No. PCT/US2016/046419, which corresponds with U.S. Appl. No. 14/866,992, 23 pages.
International Search Report and Written Opinion, dated Dec. 15, 2016, received in International Patent Application No. PCT/US2016/046403, which corresponds with U.S. Appl. No. 15/009,661, 17 pages.
Extended European Search Report, dated Dec. 21, 2016, received in European Patent Application No. 16189790.5, which corresponds with U.S. Appl. No. 14/871,462, 8 pages.
International Search Report and Written Opinion, dated Jan. 3, 2017, received in International Patent Application No. PCT/US2016/046214, which corresponds with U.S. Appl. No. 15/231,745, 25 pages.
Anonymous, "Nokia 808 PureView screenshots", retrieved from Internet; no URL, Nov. 12, 2012, 8 pages.
Anonymous, "Nokia 808 PureView User Guide," http://download-fds.webapps.microsoft.com/supportFiles/phones/files/pdf_guides/devices/808/Nokia_808_UG_en_APAC.pdf, Jan. 1, 2012, 144 pages.
Bolluyt, "5 Apple Watch Revelations from Apple's New WatchKit" http://www.cheatsheet.com/tecnology/5-apple-watch-revelations-from-apples-new-watchkit.html/?a=viewall, Nov. 22, 2014, 3 pages.
Farshad, "SageThumbs-Preview and Convert Pictures From Windows Context Menu", https://web.addictivetips.com/windows-tips/sagethumbs-preview-and-convert-photos-from-windows-context-menu, Aug. 8, 2011, 5 pages.
Flaherty, "Is Apple Watch's Pressure-Sensitive Screen a Bigger Deal Than the Gadget Itself?", http://www.wired.com/2014/09/apple-watchs-pressure-sensitive-screen-bigger-deal-gadget, Sep. 15, 2014, 3 pages.
iPodHacks 142: "Water Ripple Effects on the Home and Lock Screen: AquaBoard Cydia Tweak Review", YouTube, https://www.youtube.comwatch?v=Auu_uRaYHJs, Sep. 24, 2012, 3 pages.
Kiener, "Force Touch on iPhone", https://www.youtube.com/watch?v=CEMmnsU5fC8, Aug. 4, 2015, 4 pages.
Kumar, "How to Enable Ripple Effect on Lock Screen of Galaxy S2", YouTube, http, http://www.youtube.com/watch?v+B9-4M5abLXA, Feb. 12, 2013, 3 pages.
Matthew, "How to Preview Photos and Images From Right-Click Context Menue in Windows [Tip]", https://dottech.org/159009/add-image-preview-in-windows-context-menu-tip, Jul. 4, 2014, 5 pages.
Mohr, "Do Not Disturb—The iPhone Feature You Should Be Using", http.www.wonderoftech.com/do-not-disturb-iphone, Jul. 14, 2014, 30 pages.
Nacca, "NiLS Lock Screen Notifications / Floating Panel—Review", https://www.youtube.com/watch?v=McT4QnS9TDY, Feb. 3, 2014, 4 pages.
Phonebuff, "How to Pair Bluetooth on the iPhone", https://www.youtube.com/watch?v=LudNwEar9A8, Feb. 8, 2012, 3 pages.
VGJFeliz, "How to Master Android Lollipop Notifications in Four Minutes!", https://www.youtube.com/watch?v=S-zBRG7GJgs, Feb. 8, 2015, 5 pages.
Office Action, dated Oct. 18, 2016, received in Australian Patent Application No. 2013368440, which corresponds with U.S. Appl. No. 14/536,426, 3 pages.
Office Action, dated Sep. 13, 2016, received in Japanese Patent Application No. 2015-547948, which corresponds with U.S. Appl. No. 14/536,426, 5 pages.
Certificate of Grant, dated Sep. 15, 2016, received in Australian Patent Australian Patent Application No. 2013259606, which corresponds with U.S. Appl. No. 14/536,426, 1 page.

(56) References Cited

OTHER PUBLICATIONS

Letters Patent, dated Aug. 10, 2016, received in European Patent Application No. 13724100.6, which corresponds with U.S. Appl. No. 14/536,426, 1 page.
Notice of Allowance, dated Aug. 15, 2016, received in Australian Patent Application No. 2013259614, which corresponds with U.S. Appl. No. 14/536,141, 1 page.
Office Action, dated Aug. 31, 2016, received in European Patent Application No. 13726053.5, which corresponds with U.S. Appl. No. 14/536,141, 10 pages.
Office Action, dated Oct. 25, 2016, received in Japanese Patent Application No. 2015-511646, which corresponds with U.S. Appl. No. 14/536,141, 6 pages.
Office Action, dated Oct. 7, 2016, received in European Patent Application No. 13798464.7, which corresponds with U.S. Appl. No. 14/608,942, 7 pages.
Certificate of Grant, dated Oct. 21, 2016, received in Australian Patent Application No. 2013259630, which corresponds with U.S. Appl. No. 14/536,203, 3 pages.
Certificate of Patent, dated Sep. 9, 2016, received in Japanese Patent Application No. 2015-511650, which corresponds with U.S. Appl. No. 14/536,203, 3 pages.
Notice of Allowance, dated Sep. 1, 2016, received in Korean Patent Application No. 2014-7034520, which corresponds with U.S. Appl. No. 14/536,203, 5 pages.
Office Action, dated Oct. 20, 2016, received in U.S. Appl. No. 14/536,247, 10 pages.
Certificate of Grant, dated Oct. 21, 2016, received in Australian Patent Application No. 2013259637, which corresponds with U.S. Appl. No. 14/536,267, 3 pages.
Notice of Allowance, dated Sep. 26, 2016, received in Japanese Patent Application No. 2015-511652, which corresponds with U.S. Appl. No. 14/536,267, 5 pages.
Notice of Allowance, dated Sep. 1, 2016, received in Korean Patent Application No. 2014-7034530, which corresponds with U.S. Appl. No. 14/536,267, 3 pages.
Innovation Patent, dated Sep. 1, 2016, received in Australian Patent Application No. 2016101481, which corresponds with U.S. Appl. No. 14/536,291, 1 page.
Office Action, dated Sep. 29, 2016, received in Australian Patent Application No. 2016101481, which corresponds with U.S. Appl. No. 14/536,291, 3 pages.
Office Action, dated Aug. 22, 2016, received in European Patent Application No. 13724107.1, which corresponds with U.S. Appl. No. 14/536,291, 7 pages.
Notice of Allowance, dated Oct. 24, 2016, received in U.S. Appl. No. 14/866,981, 7 pages.
Patent, dated Nov. 2, 2016, received in Australian Patent Application No. 2016100254, which corresponds with U.S. Appl. No. 14/866,981, 1 page.
Patent, dated Sep. 28, 2016, received in Chinese Patent Application No. 201620176169.7, which corresponds with U.S. Appl. No. 14/866,981, 4 pages.
Office Action, dated Jul. 5, 2016, received in Chinese Patent Application No. 201620186008.6, which corresponds with U.S. Appl. No. 14/866,159, 4 pages.
Office Action, dated Sep. 27, 2016, received in Danish Patent Application No. 201500574, which corresponds with U.S. Appl. No. 14/866,159, 4 pages.
Office Action, dated Oct. 12, 2016, received in Australian Patent Application No. 2016101201, which corresponds with U.S. Appl. No. 14/686,078, 3 pages.
Notice of Allowance, dated Oct. 1, 2016, received in Chinese Patent Application No. 201620175847.8, which corresponds with U.S. Appl. No. 14/686,078, 1 page.
Office Action, dated Sep. 2, 2016, received in Australian Patent Application No. 201500588, which corresponds with U.S. Appl. No. 14/868,078, 4 pages.
Notice of Allowance, dated Nov. 14, 2016, received in U.S. Appl. No. 14/863,432, 7 pages.
Office Action, dated Aug. 19, 2016, received in Australian Patent Application No. 2016100647, which corresponds with U.S. Appl. No. 14/863,432, 5 pages.
Office Action and Additional Search Report, dated Oct. 7, 2016, received in Danish Patent Application No. 201500582, which corresponds with U.S. Appl. No. 14/863,432, 6 pages.
Office Action, dated Oct. 13, 2016, received in U.S. Appl. No. 14/866,511, 27 pages.
Office Action, dated Aug. 19, 2016, received in U.S. Appl. No. 14/291,880, 19 pages.
Final Office Action, dated Sep. 16, 2016, received in U.S. Appl. No. 14/866,489, 24 pages.
Final Office Action, dated Sep. 2, 2016, received in U.S. Appl. No. 14/869,899, 22 pages.
Innovation (Unexamined) Patent, dated Aug. 25, 2016, received in Australian Patent Application No. 2016101438, which corresponds with U.S. Appl. No. 14/869,899, 1 page.
Certificate of Examination, dated Oct. 11, 2016, received in Australian Patent Application No. 2016101438, which corresponds with U.S. Appl. No. 14/869,899, 1 page.
Office Action, dated Oct. 7, 2016, received in Danish Patent Application No. 201500592, which corresponds with U.S. Appl. No. 14/869,899, 6 pages.
Innovation Patent, dated Sep. 22, 2016, received in Australian Patent Application No. 2016101418, which corresponds with U.S. Appl. No. 14/866,992, 1 page.
Notice of Allowance, dated Aug. 26, 2016, received in U.S. Appl. No. 14/845,217, 5 pages.
Notice of Allowance, dated Oct. 24, 2016, received in U.S. Appl. No. 14/857,645, 6 pages.
Office Action, dated Aug. 19, 2016, received in Australian Patent Application No. 2016100648, which corresponds with U.S. Appl. No. 14/864,580, 6 pages.
Notice of Allowance, dated Nov. 8, 2016, received in Chinese Patent Application No. 201620470247.4, which corresponds with U.S. Appl. No. 14/864,580, 3 pages.
Certificate of Registration, dated Oct. 14, 2016, received in German Patent Application No. 20201600003234.9, which corresponds with U.S. Appl. No. 14/864,580, 3 pages.
Office Action, dated Oct. 7, 2016, received in Danish Patent Application No. 201500584, which corresponds with U.S. Appl. No. 14/864,580, 3 pages.
Office Action, dated Oct. 7, 2016, received in Danish Patent Application No. 201500585, which corresponds with U.S. Appl. No. 14/864,627, 3 pages.
Office Action, dated Oct. 28, 2016, received in Danish Patent Application No. 201500579, which corresponds with U.S. Appl. No. 14/866,361, 3 pages.
Office Action, dated Oct. 19, 2016, received in Chinese Patent Application No. 2016201470246.X, which corresponds with U.S. Appl. No. 14/866,987, 4 pages.
Notice of Allowance, dated Nov. 1, 2016, received in Danish Patent Application No. 201500587, which corresponds with U.S. Appl. No. 14/866,987, 2 pages.
Office Action and Search Report, dated Sep. 9, 2016, received in Danish Patent Application No. 201670463, which corresponds with U.S. Appl. No. 14/866,987, 7 pages.
Notice of Allowance, dated Nov. 1, 2016, received in Danish Patent Application No. 201500589, which corresponds with U.S. Appl. No. 14/866,989, 2 pages.
Final Office Action, dated Nov. 4, 2016, received in U.S. Appl. No. 14/871,236, 24 pages.
Innovation (Unexamined) Patent, dated Aug. 25, 2016, received in Australian Patent Application No. 2016101433, which corresponds with U.S. Appl. No. 14/871,236, 1 page.
Office Action, dated Oct. 14, 2016, received in Australian Patent Application No. 2016101433, which corresponds with U.S. Appl. No. 14/871,236, 3 pages.
Office Action and Additional Search Report, dated Sep. 30, 2016, received in Danish Patent Application No. 201500595, which corresponds with U.S. Appl. No. 14/871,236, 10 pages.

(56) References Cited

OTHER PUBLICATIONS

Innovation (Unexamined) Patent, dated Aug. 25, 2016, received in Australian Patent Application No. 2016101436, which corresponds with U.S. Appl. No. 14/871,236, 1 page.
Office Action, dated Oct. 31, 2016, received in Australian Patent Application No. 2016101438, which corresponds with U.S. Appl. No. 14/871,236, 6 pages.
Office Action, dated Oct. 17, 2016, received in Australian Patent Application No. 2016203040, which corresponds with U.S. Appl. No. 14/871,227, 7 pages.
Office Action, dated Oct. 18, 2016, received in Australian Patent Application No. 2016101431, which corresponds with U.S. Appl. No. 14/871,227, 3 pages.
Patent, dated Sep. 26, 2016, received in Danish Patent Application No. 201500597, which corresponds with U.S. Appl. No. 14/871,227, 7 pages.
Office Action, dated Oct. 14, 2016, received in Australian Patent Application No. 2016101437, which corresponds with U.S. Appl. No. 14/871,336, 2 pages.
Office Action, dated Oct. 18, 2016, received in Australian Patent Application No. 201500601, which corresponds with U.S. Appl. No. 14/871,336, 3 pages.
Innovation Patent, dated Aug. 25, 2016, received in Australian Patent Application No. 2016101435, which corresponds with U.S. Appl. No. 14/871,462, 1 page.
Office Action, dated Oct. 4, 2016, received in Australian Patent Application No. 2016101435, which corresponds with U.S. Appl. No. 14/871,462, 3 pages.
Office Action, dated Oct. 4, 2016, received in Australian Patent Application No. 2016231505, which corresponds with U.S. Appl. No. 14/871,462, 3 pages.
Grant, dated Aug. 30, 2016, received in Danish Patent Application No. 201500600, which corresponds with U.S. Appl. No. 14/871,462, 2 pages.
Final Office Action, dated Sep. 28, 2016, received in U.S. Appl. No. 14/867,823, 31 pages.
Office Action, dated Sep. 7, 2016, received in Danish Patent Application No. 201500594, which corresponds with U.S. Appl. No. 14/867,823, 4 pages.
Final Office Action, dated Nov. 2, 2016, received in U.S. Appl. No. 14/867,892, 48 pages.
Office Action, Sep. 14, 2016, received in Danish Patent Application No. 201500598, which corresponds with U.S. Appl. No. 14/867,892, 4 pages.
Office Action, dated Jul. 5, 2016, received in Chinese Patent Application No. 201620176221.9, which corresponds with U.S. Appl. No. 14/867,990, 4 pages.
Office Action, dated Sep. 26, 2016, received in Danish Patent Application No. 201500581, which corresponds with U.S. Appl. No. 14/867,990, 5 pages.
Office Action and Search Report, dated Oct. 17, 2016, received in Danish Patent Application No. 201670587, which corresponds with U.S. Appl. No. 15/231,745, 9 pages.
Office Action and Search Report, dated Oct. 12, 2016, received in Danish Patent Application No. 201670593, which corresponds with U.S. Appl. No. 15/231,745, 7 pages.
Office Action (Search Report), dated Nov. 10, 2016, received in Danish Patent Application No. 201670591, which corresponds with U.S. Appl. No. 15/231,745, 12 pages.
Office Action and Search Report, dated Oct. 26, 2016, received in Danish Patent Application No. 201670592, which corresponds with U.S. Appl. No. 15/231,745, 8 pages.
Extended European Search Report, dated Oct. 7, 2016, received in European Patent Application No. 16177863.4, which corresponds with U.S. Appl. No. 14/536,267, 12 pages.
International Search Report and Written Opinion, dated Oct. 14, 2016, received in International Patent Application No. PCT/US2016/020697, which corresponds with U.S. Appl. No. 14/866,981, 21 pages.
International Search Report and Written Opinion, dated Oct. 31, 2016, received in International Patent Application No. PCT/US2016/033578, which corresponds with U.S. Appl. No. 14/863,432, 36 pages.
International Search Report and Written Opinion, dated Aug. 29, 2016, received in International Patent Application No. PCT/US2016/021400, which corresponds with U.S. Appl. No. 14/869,899, 48 pages.
Angelov, "Sponsor Flip Wall With Jquery & CSS", Tutorialzine. N.p., Mar. 24, 2010. Web. http://tutorialzine.com/2010/03/sponsor-wall-slip-jquery-css/, Mar. 24, 2010, 8 pages.
Elliot, "Mac System 7", YouTube. Web. Mar. 8, 2017, http://www.youtube.com/watch?v=XLv22hfuuik, Aug. 3, 2011, 1 page.
Kost, "LR3-Deselect All Images But One", Julieanne Kost's Blog, blogs.adobe.com/jkost/2011/12/lr3-deselect-all-images-but-one.html, Dec. 22, 2011, 1 page.
Microsoft, "Lumia—How to Personalize Your Start Screen", https://www.youtube.com/watch?v=6GI5Z3TrSEs, Nov. 11, 2014, 3 pages.
Office Action, dated Mar. 15, 2017, received in U.S. Appl. No. 14/535,671, 13 pages.
Office Action, dated Feb. 24, 2017, received in Korean Patent Application No. 10-2015-7018851, which corresponds with U.S. Appl. No. 14/536,426, 3 pages.
Office Action, dated Apr. 5, 2017, received in U.S. Appl. No. 14/536,367, 16 pages.
Office Action, dated Feb. 6, 2017, received in Japanese Patent Application No. 2015-511644, which corresponds with U.S. Appl. No. 14/536,426, 6 pages.
Office Action, dated Mar. 9, 2017, received in U.S. Appl. No. 14/536,464, 21 pages.
Patent, dated Feb. 17, 2017, received in Japanese Patent Application No. 2015549392, which corresponds with U.S. Appl. No. 14/608,926, 3 pages.
Notice of Allowance, dated Mar. 31, 2017, received in Korean Patent Application No. 2015-7018853, which corresponds with U.S. Appl. No. 14/608,926, 4 pages.
Office Action, dated Apr. 3, 2017, received in U.S. Patent Application No. 14/536,141, 11 pages.
Office Action, dated Mar. 3, 2017, received in Chinese Patent Application No. 201380035893.7, which corresponds with U.S. Appl. No. 14/536,646, 8 pages.
Office Action, dated Mar. 29, 2017, received in Australian patent Application No. 2016201303, which corresponds with U.S. Appl. No. 14/608,942, 3 pages.
Office Action, dated Feb. 24, 2017, received in Korean Patent Application No. 2015-7018448, which corresponds with U.S. Appl. No. 14/608,942, 4 pages.
Office Action, dated Feb. 6, 2017, received in Korean Patent Application No. 2016-7033834, which corresponds with U.S. Appl. No. 14/536,203, 4 pages.
Final Office Action, dated Mar. 24, 2017, received in U.S. Appl. No. 14/536,247, 14 pages.
Office Action, dated Mar. 24, 2017, received in U.S. Appl. No. 14/536,267, 12 pages.
Office Action, dated Mar. 24, 2017, received in Australian Patent Application No. 2016204411, which corresponds with U.S. Appl. No. 14/536,267, 3 pages.
Office Action, dated Mar. 3, 2017, received in Japanese Patent Application No. 2016-125839, which corresponds with U.S. Appl. No. 14/536,267, 6 pages.
Office Action, dated Apr. 7, 2017, received in U.S. Appl. No. 14/536,291, 11 pages.
Office Action, dated Mar. 23, 2017, received in European Patent Application No. 13724107.1, which corresponds with U.S. Appl. No. 14/536,291, 8 pages.
Office Action, dated Feb. 27, 2017, received in European Patent Application No. 13811032.5, which corresponds with U.S. Appl. No. 14/608,985, 6 pages.
Patent, dated Feb. 24, 2017, received in Japanese Patent Application No. 2015-550384, which corresponds with U.S. Appl. No. 14/608,985, 2 pages.
Office Action, dated Mar. 24, 2017, received in U.S. Appl. No. 14/609,006, 13 pages.

(56) References Cited

OTHER PUBLICATIONS

Notice of Allowance, dated Feb. 27, 2017, received in U.S. Appl. No. 14/864,737, 9 pages.
Notice of Allowance, dated Feb. 10, 2017, received in U.S. Appl. No. 14/866,981, 5 pages.
Office Action, dated Mar. 14, 2017, received in Danish Patent Application No. 201500574, which corresponds with U.S. Appl. No. 14/866,159, 5 pages.
Notice of Allowance, dated Feb. 28, 2017, received in U.S. Appl. No. 14/869,899, 9 pages.
Office Action, dated Apr. 13, 2017, received in U.S. Appl. No. 14/866,992, 34 pages.
Office Action, dated Feb. 7, 2017, received in Australian Patent Application No. 2016101418, which corresponds with U.S. Appl. No. 14/866,992, 5 pages.
Office Action, dated Feb. 6, 2017, received in Danish Patent Application No. 201500593, which corresponds with U.S. Appl. No. 14/866,992, 4 pages.
Office Action, dated Mar. 31, 2017, received in U.S. Appl. No. 14/857,700, 14 pages.
Notice of Allowance, dated Feb. 28, 2017, received in U.S. Appl. No. 14/871,236, 9 pages.
Office Action, dated Apr. 11, 2017, received in Australian Patent Application No. 2016101437, which corresponds with U.S. Appl. No. 14/871,336, 4 pages.
Notice of Allowance, dated Mar. 23, 2017, received in Danish Patent Application No. 201500601, which corresponds with U.S. Appl. No. 14/871,336, 2 pages.
Office Action, dated Mar. 13, 2017, received in Japanese Patent Application No. 2016-183289, which corresponds with U.S. Appl. No. 14/871,462, 5 pages.
Office Action, dated Mar. 1, 2017, received in U.S. Appl. No. 14/869,855, 14 pages.
Extended European Search Report, dated Mar. 15, 2017, received in European Patent Application No. 17153418.3, which corresponds with U.S. Appl. No. 14/536,648, 7 pages.
International Search Report and Written Opinion, dated Feb. 27, 2017, received in International Patent Application No. PCT/US2016/046407, which corresponds with U.S. Appl. No. 15/009,688, 30 pages.
iPhoneOperator, "Walser Liveeffekt fur Homescreen & Lockscreen—Aquaboard (Cydia)", http://www.youtube.com/watch?v=fG9YMF-mB0Q, Sep. 22, 2012, 3 pages.
Office Action, dated May 15, 2017, received in Australian Patent Application No. 2016216580, which corresponds with U.S. Appl. No. 14/536,426, 3 pages.
Office Action, dated May 4, 2017, received in Chinese Patent Application No. 201380068414.1, which corresponds with U.S. Appl. No. 14/608,926, 5 pages.
Office Action, dated May 12, 2017, received in Japanese Patent Application No. 2015-549393, which corresponds with U.S. Appl. No. 14/608,942, 5 pages.
Office Action, dated May 15, 2017, received in Japanese Patent Application No. 2016-558331, which corresponds with U.S. Appl. No. 14/864,737, 5 pages.
Office Action, dated May 18, 2017, received in Dutch Patent Application No. 2016452, which corresponds with U.S. Appl. No. 14/864,737, 22 pages.
Notice of Allowance, dated May 2, 2017, received in received in Danish Patent Application No. 201500588, which corresponds with U.S. Appl. No. 14/868,078, 2 pages.
Office Action, dated May 18, 2017, received in Dutch Patent Application No. 2016376, which corresponds with U.S. Appl. No. 14/868,078, 15 pages.
Office Action, dated May 18, 2017, received in Dutch Patent Application No. 2016801, which corresponds with U.S. Appl. No. 14/863,432, 34 pages.
Office Action, dated May 5, 2017, received in Danish Patent Application No. 201500584, which corresponds with U.S. Appl. No. 14/864,580, 3 pages.
Office Action, dated May 4, 2017, received in Danish Patent Application No. 201500585, which corresponds with U.S. Appl. No. 14/864,627, 4 pages.
Patent, dated May 3, 2017, received in Chinese Patent Application No. 2016201470246.X, which corresponds with U.S. Appl. No. 14/866,987, 2 pages.
Office Action, dated Apr. 19, 2017, received in Danish Patent Application No. 201670463, which corresponds with U.S. Appl. No. 14/866,987, 3 pages.
Office Action, dated Apr. 13, 2017, received in Australian Patent Application No. 2016101431, which corresponds with U.S. Appl. No. 14/871,227, 4 pages.
Office Action, dated Mar. 24, 2017, received in Japanese Patent Application No. 2016-533201, which corresponds with U.S. Appl. No. 14/871,227, 6 pages.
Office Action, dated May 15, 2017, received in Danish Patent Application No. 201500594, which corresponds with U.S. Appl. No. 14/867,823, 4 pages.
Office Action, dated May 4, 2017, received in Danish Patent Application No. 201500598, which corresponds with U.S. Appl. No. 14/867,892, 4 pages.
Office Action, dated May 3, 2017, received in Danish Patent Application No. 201500581, which corresponds with U.S. Appl. No. 14/867,990, 5 pages.
Office Action, dated May 23, 2017, received in Danish Patent Application No. 201770190, which corresponds with U.S. Appl. No. 15/136,782, 7 pages.
Notice of Allowance, dated May 12, 2017, received in U.S. Appl. No. 14/608,942, 10 pages.
Office Action, dated Apr. 19, 2017, received in U.S. Appl. No. 14/536,296, 12 pages.
Notice of Allowance, dated Apr. 27, 2017, received in U.S. Appl. No. 14/863,432, 7 pages.
Notice of Allowance, dated Apr. 27, 2017, received in U.S. Appl. No. 16/866,489, 27 pages.
Office Action, dated May 2, 2017, received in U.S. Appl. No. 14/856,517, 34 pages.
Office Action, dated May 18, 2017, received in U.S. Appl. No. 14/856,519, 35 pages.
Office Action, dated May 11, 2017, received in U.S. Appl. No. 14/867,823, 42 pages.
Final Office Action, dated May 1, 2017, received in U.S. Appl. No. 15/136,782, 18 pages.

* cited by examiner

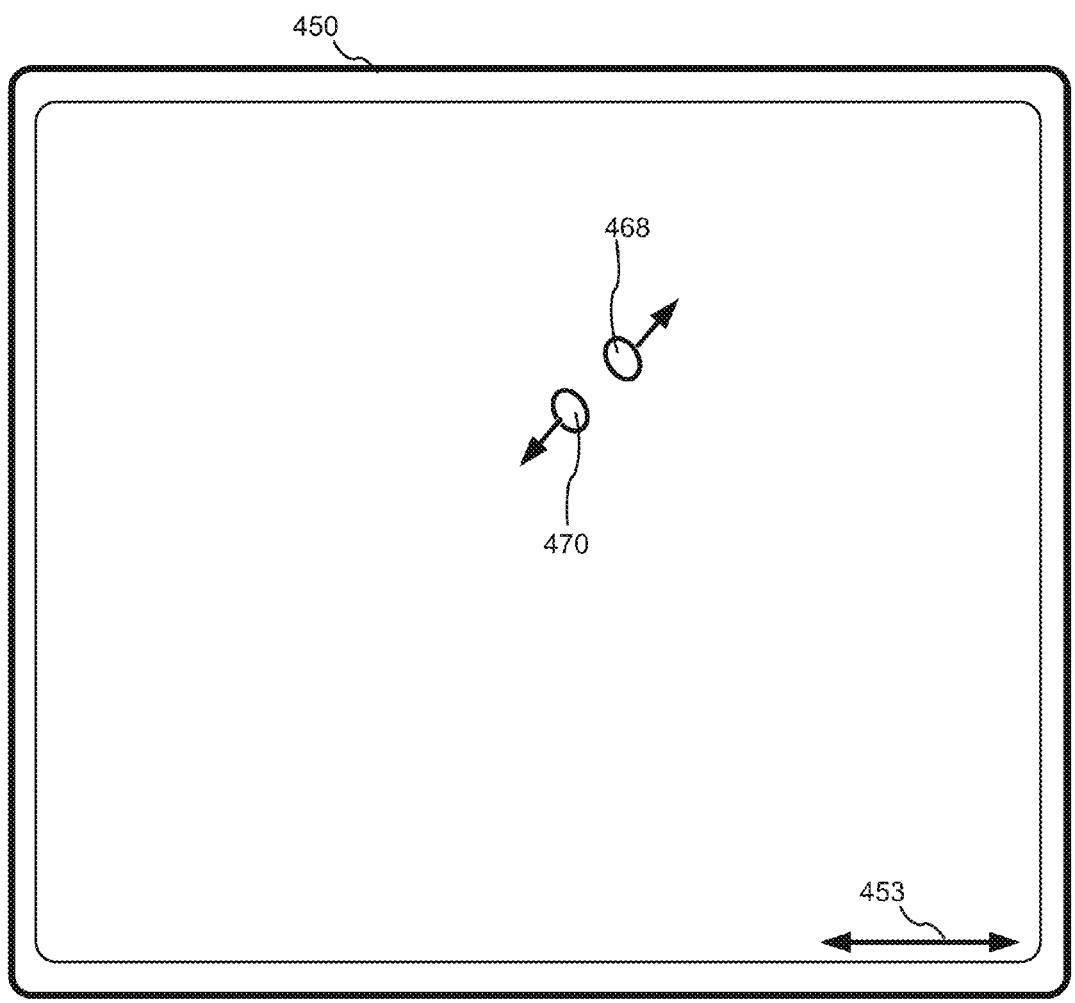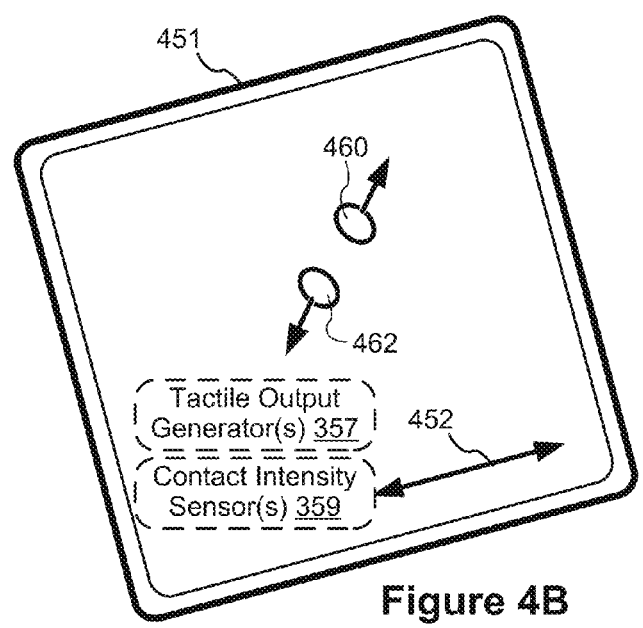
Figure 4B

900

902 While in a first media acquisition mode for a camera at an electronic device with a display, one or more processors, and memory, display a live preview on the display > 904 The first media acquisition mode is configured to be enabled or disabled by a user of the device
>
>> 906 The live preview is displayed as part of a media capture user interface that includes an affordance for enabling the first media acquisition mode.
>>
>> While the first media acquisition mode is enabled, the affordance is animated, and, while the first media acquisition mode is disabled, the affordance is not animated.

908 While displaying the live preview, detect activation of a shutter button at a first time

910 In response to detecting activation of the shutter button at the first time, group a plurality of images acquired by the camera in temporal proximity to the activation of the shutter button at the first time into a first sequence of images.

The first sequence of images includes: a plurality of images acquired by the camera prior to detecting activation of the shutter button at the first time; a representative image that represents the first sequence of images and was acquired by the camera after one or more of the other images in the first sequence of images; and a plurality of images acquired by the camera after acquiring the representative image.

> 912 The first sequence of images are stored as a first distinct set of images in the memory > 914 The live preview displays images at a first resolution and the first sequence of images includes images, at the first resolution, that were displayed in the live preview
>
>> 916 The representative image acquired by the camera has a second resolution that is higher than the first resolution (A)

Figure 9A

910 In response to detecting activation of the shutter button at the first time, group a plurality of images acquired by the camera in temporal proximity to the activation of the shutter button at the first time into a first sequence of images.

The first sequence of images includes: a plurality of images acquired by the camera prior to detecting activation of the shutter button at the first time; a representative image that represents the first sequence of images and was acquired by the camera after one or more of the other images in the first sequence of images; and a plurality of images acquired by the camera after acquiring the representative image.

(A)

918 Parameters for a respective sequence of images grouped in response to detecting a respective activation of the shutter button are configurable by a user of the device

920 The plurality of images acquired by the camera prior to detecting activation of the shutter button at the first time are stored in a first form in the memory prior to detecting activation of the shutter button at the first time and are stored in a second form in the memory in response to detecting activation of the shutter button at the first time

922 The plurality of images acquired prior to detecting activation of the shutter button at the first time is a predefined number of images

924 The plurality of images acquired prior to detecting activation of the shutter button at the first time is images that are within a predefined time prior to the first time

926 The plurality of images acquired prior to detecting activation of the shutter button at the first time is images that are within a predefined time prior to a time at which the representative image is acquired

928 The plurality of images acquired prior to detecting activation of the shutter button at the first time are from a range of time between the first time and a second time that is prior to the first time, and acquiring the plurality of images prior to detecting activation of the shutter button at the first time is independent of detecting an interaction with the shutter button that is temporally proximate to the second time (B)

Figure 9B

910 In response to detecting activation of the shutter button at the first time, group a plurality of images acquired by the camera in temporal proximity to the activation of the shutter button at the first time into a first sequence of images.

The first sequence of images includes: a plurality of images acquired by the camera prior to detecting activation of the shutter button at the first time; a representative image that represents the first sequence of images and was acquired by the camera after one or more of the other images in the first sequence of images; and a plurality of images acquired by the camera after acquiring the representative image.

(B)

930 The plurality of images, in the first sequence of images, that are acquired prior to detecting activation of the shutter button at the first time meet one or more predefined grouping criteria

932 The predefined grouping criteria include selecting a predefined number of images prior to detecting activation of the shutter button

934 The predefined grouping criteria include selecting a predefined number of images prior to the representative image

936 The predefined grouping criteria include selecting images in a predefined range of time immediately prior to detecting activation of the shutter button

938 The predefined grouping criteria include selecting images in a predefined range of time immediately prior to the time at which the representative image is acquired (C)

1002 At an electronic device with a display and a touch-sensitive surface, display a representative image on the display. The representative image is one image in a sequence of images taken by a camera. The sequence of images includes one or more images acquired by the camera after acquiring the representative image. The sequence of images includes one or more images acquired by the camera before acquiring the representative image.

1004 While displaying the representative image on the display, detect a first portion of a first input 1006 The first input is a press-and-hold gesture 1008 The device includes one or more sensors to detect intensity of contacts with the touch-sensitive surface, and the first input includes a finger contact that satisfies first contact-intensity criteria

1010 In response to detecting the first portion of the first input, replace display of the representative image with display, in sequence, of the one or more images acquired by the camera after acquiring the representative image 1012 The one or more images acquired by the camera after acquiring the representative image are displayed, in response to detecting the first portion of the first input, in sequence at a rate that is based on an intensity of a contact in the first portion of the input

1014 After detecting the first portion of the first input, detect a second portion of the first input

Figure 10A

1044 The one or more images are sequentially displayed in accordance with respective intensity levels of the first portion of the first input 1046 The first portion of the first input includes a change in intensity of a contact detected on the touch-sensitive surface. While the representative image is displayed and the contact has a first intensity, detect an increase in intensity of the contact by a respective amount to a second intensity; in response to detecting the increase in intensity of the contact by the respective amount, replace display of the representative image with display of a first subsequent image that is a respective number of images after the representative image in the sequence of images; while displaying the first subsequent image and the contact has the second intensity, detect an increase in intensity of the contact by the respective amount to a third intensity; and, in response to detecting the increase in intensity of the contact by the respective amount from the second intensity to the third intensity, replace display of the first subsequent image with display of a second subsequent image that is the respective number of images after the first subsequent image in the sequence of images.

1048 The respective number of images is based on the magnitude of the respective change in intensity of the contact 1050 When the respective change in intensity of the contact has a first magnitude, the first sequential image is immediately after the respective image in the sequence of images and the second sequential image is immediately after the first sequential image in the sequence of images. When the respective change in intensity of the contact has a second magnitude that is greater than the first magnitude, the first sequential image spaced apart from the respective image by a respective number of images in the sequence of images and the second sequential image is spaced apart from the first sequential image by the respective number of images in the sequence of images. The respective number of images is one or more images.

Figure 10D

1052 The first portion of the first input includes a change in intensity of a contact detected on the touch-sensitive surface. While the representative image is displayed and the contact has a first intensity, detect an increase in intensity of the contact by a respective amount to a second intensity; in response to detecting the increase in intensity of the contact by the respective amount, replace display of the representative image with display of a first subsequent image that is a respective number of images after the representative image in the sequence of images; while displaying the first subsequent image and the contact has the second intensity, detect a change in intensity of the contact by the respective amount; and, in response to detecting the change in intensity of the contact by the respective amount: in accordance with a determination that the change in intensity of the contact by the respective amount includes an increase in intensity of the contact from the second intensity to a third intensity, replace display of the first subsequent image with display of a second subsequent image that is the respective number of images after the first subsequent image in the sequence of images; and, in accordance with a determination that the change in intensity of the contact by the respective amount includes a decrease in intensity of the contact from the second intensity to the first intensity, replace display of the first subsequent image with display of the representative image.

10002 At an electronic device with a display and a touch-sensitive surface, display a representative image on the display.

The representative image is one image in a sequence of images taken by a camera. The sequence of images includes one or more images acquired by the camera after acquiring the representative image. The sequence of images includes one or more images acquired by the camera before acquiring the representative image.

10004 While displaying the representative image on the display, detect a first portion of a first input.

10006 The first input is a press-and-hold gesture

10008 In response to detecting the first portion of the first input:

transition from displaying the representative image to displaying a respective prior image in the sequence of images, wherein the respective prior image was acquired by the camera before acquiring the representative image; and, after transitioning from displaying the representative image to displaying the respective prior image, display, in sequence starting with the respective prior image, at least some of the one or more images acquired by the camera before acquiring the representative image and at least some of the one or more images acquired by the camera after acquiring the representative image.

10010 Transitioning from displaying the representative image to displaying the respective prior image includes displaying, in sequence, at least some of the one or more images acquired by the camera after acquiring the representative image and then replacing display of a respective subsequent image acquired after acquiring the representative image with the respective prior image.

10012 Transitioning from displaying the representative image to displaying the respective prior image includes replacing display of the representative image with the respective prior image.

10008 In response to detecting the first portion of the first input:

transition from displaying the representative image to displaying a respective prior image in the sequence of images, wherein the respective prior image was acquired by the camera before acquiring the representative image; and, after transitioning from displaying the representative image to displaying the respective prior image, display, in sequence starting with the respective prior image, at least some of the one or more images acquired by the camera before acquiring the representative image and at least some of the one or more images acquired by the camera after acquiring the representative image.

(A)

---

10014 Transitioning from displaying the representative image to displaying the respective prior image includes:

in accordance with a determination that the first portion of the first input meets first playback criteria, displaying, in sequence, at least some of the one or more images acquired by the camera after acquiring the representative image and then replacing display of a respective subsequent image acquired after acquiring the representative image with the respective prior image; and, in accordance with a determination that the first portion of the first input meets second playback criteria, different from the first playback criteria, replacing display of the representative image with the respective prior image.

---

10016 The device includes one or more sensor units to detect intensity of contacts with the touch-sensitive surface.

The first input includes a contact on the touch-sensitive surface.

The first playback criteria include a criterion that is met when the contact has a characteristic intensity above a first intensity threshold.

The second playback criteria include a criterion that is met when the contact has a characteristic intensity above a second intensity threshold that is greater than the first intensity threshold.

10008 In response to detecting the first portion of the first input:

transition from displaying the representative image to displaying a respective prior image in the sequence of images, wherein the respective prior image was acquired by the camera before acquiring the representative image; and, after transitioning from displaying the representative image to displaying the respective prior image, display, in sequence starting with the respective prior image, at least some of the one or more images acquired by the camera before acquiring the representative image and at least some of the one or more images acquired by the camera after acquiring the representative image.

(B)

10018 The one or more images acquired by the camera before acquiring the representative image and the one or more images acquired by the camera after acquiring the representative image are displayed, in sequence starting with the respective prior image, at a fixed rate.

10020 Present audio that corresponds to the sequence of images.

---

10022 After detecting the first portion of the first input, detect a second portion of the first input.

In response to detecting the second portion of the first input, display, in sequence, at least some of the one or more images acquired by the camera before acquiring the representative image and at least some of the one or more images acquired by the camera after acquiring the representative image.

10024 In response to detecting the second portion of the first input, display metadata that corresponds to the sequence of images.

---

10026 Detect termination of the first input.

In response to detecting termination of the first input, display the representative image.

Figure 10H

10028 Detect termination of the first input while displaying a first image in the sequence of images.

In response to detecting termination of the first input while displaying the first image in the sequence of images:
in accordance with a determination that the first image occurs before the representative image in the sequence of images, sequentially display, in chronological order, images from the first image to the representative image, and in accordance with a determination that the first image occurs after the representative image in the sequence of images, sequentially display, in reverse-chronological order, images from the first image to the representative image.

---

10030 The sequence of images is configured to be sequentially displayed in a loop in either a forward direction or a reverse direction.

Detect termination of the first input while displaying a first image in the sequence of images.

In response to detecting termination of the first input while displaying the first image in the sequence of images:

in accordance with a determination that there are fewer images between the first image and the representative image when the loop is traversed in the forward direction, sequentially display images from the first image to the representative image in the forward direction, and in accordance with a determination that there are fewer images between the first image and the representative image when the loop is traversed in the reverse direction, sequentially display images from the first image to the representative image in the reverse direction.

10052 At an electronic device with a display, a touch-sensitive surface, and one or more sensors to detect intensity of contacts with the touch-sensitive surface: display a representative image on the display.

The representative image is one image in a sequence of images taken by a camera. The sequence of images includes one or more images acquired by the camera after acquiring the representative image.

| 10054 The sequence of images includes one or more images acquired by the camera before acquiring the representative image. |

10056 While displaying the representative image on the display, detect a first input that includes detecting an increase in a characteristic intensity of a contact on the touch-sensitive surface to a first intensity that is greater than a first intensity threshold.

| 10058 The first input is a press-and-hold gesture. |

10060 In response to detecting the increase in the characteristic intensity of the contact, advance, in a first direction, through the one or more images acquired by the camera after acquiring the representative image at a rate that is determined based at least in part on the first intensity 10062 After advancing through the one or more images acquired by the camera after acquiring the representative image at the rate that is determined based on the first intensity, detect a decrease in intensity of the contact to a second intensity that is less than the first intensity (A)

Figure 10J

10064 In response to detecting the decrease in the characteristic intensity of the contact to the second intensity:

in accordance with a determination that the second intensity is above the first intensity threshold, continue to advance, in the first direction, through the one or more images acquired by the camera after acquiring the representative image at a second rate, wherein: the second rate is determined based at least in part on the second intensity and the second rate is slower than the first rate; and, in accordance with a determination that the second intensity is below the first intensity threshold, move, in a second direction that is opposite to the first direction, through the one or more images acquired by the camera after acquiring the representative image at a rate that is determined based at least in part on the second intensity.

---

10066 Images are displayed, in sequence, at a rate that increases as the characteristic intensity of the contact increases.

---

10068 The images are displayed, in sequence, at a rate proportional to a difference between the characteristic intensity of the contact and the first intensity threshold

---

10070 Decrease a rate at which images in the sequence of images are displayed as a terminus of the sequence of images is approached.

10072 The first rate is determined based in part on a proximity of a currently displayed image to an end of the sequence of images.

10074 The second rate is determined based in part on a proximity of a currently displayed image to a beginning of the sequence of images.

---

10076 The rate of advancement through the sequence of images is constrained by a maximum rate while the contact is detected on the touch-sensitive surface.

Figure 10K

10064 In response to detecting the decrease in the characteristic intensity of the contact to the second intensity:

in accordance with a determination that the second intensity is above the first intensity threshold, continue to advance, in the first direction, through the one or more images acquired by the camera after acquiring the representative image at a second rate, wherein: the second rate is determined based at least in part on the second intensity and the second rate is slower than the first rate; and, in accordance with a determination that the second intensity is below the first intensity threshold, move, in a second direction that is opposite to the first direction, through the one or more images acquired by the camera after acquiring the representative image at a rate that is determined based at least in part on the second intensity.

(B)

10078 Intensity values of the characteristic intensity of the contact proximate to the first intensity threshold are associated with rate values that are at least a predetermined amount away from a rate of zero images per second.

10080 The rate of movement through the sequence of images is constrained by a maximum reverse rate while the contact is detected on the touch-sensitive surface.

10082 The representative image is displayed as a background image on a lock screen of a device, and one or more foreground elements are not changed while the device advances through the one or more images captured after the respective image.

10084 Display metadata that corresponds to the sequence of images.

10086 Detect liftoff of the contact from the touch-sensitive surface.

In response to detecting liftoff of the contact, move through the images in the second direction at a rate that is greater than the maximum reverse rate.

Figure 10L

10088 Detect termination of the first input.

In response to detecting termination of the first input, display the representative image.

---

10090 Detect termination of the first input while displaying a first image in the sequence of images.

In response to detecting termination of the first input while displaying the first image in the sequence of images:

in accordance with a determination that the first image occurs before the representative image in the sequence of images, sequentially display, in chronological order, images from the first image to the representative image, and in accordance with a determination that the first image occurs after the representative image in the sequence of images, sequentially display, in reverse-chronological order, images from the first image to the representative image.

1102 Store a plurality of sequences of images.

A respective sequence of images includes:
a respective representative image taken by a camera,
one or more images acquired by the camera after acquiring the respective representative image, and
one or more images acquired by the camera before acquiring the respective representative image.

1104 Display a first representative image for a first sequence of images in a movable first area on the display

1106 The first sequence of images is a message in a message conversation displayed in a scrollable region of a messaging application, and the first sequence of images is displayed as the scrollable region of the messaging application is scrolled

1108 Detect a drag gesture on the touch-sensitive surface

1112 In accordance with a determination that the drag gesture is in a first direction on the touch-sensitive surface:

1114 In the moveable first area, replace display of the first representative image for the first sequence of images with display, in chronological order, of at least some of one or more images for the first sequence of images acquired by the camera after acquiring the first representative image for the first sequence of images

1116 Move the first area in the first direction

1118 Moving the first area in the first direction includes moving at least part of the first area off of the display in the first direction (A)

11002 At an electronic device with a display and a touch-sensitive surface: store a plurality of sequences of images.

A respective sequence of images includes: a respective representative image taken by a camera, and one or more images acquired by the camera before acquiring the respective representative image.

> 11004 A respective sequence of images includes one or more images acquired by the camera after acquiring the respective representative image.

11006 Display a first representative image for a first sequence of images in a movable first area on the display.

> 11008 The first sequence of images is a message in a message conversation displayed in a scrollable region of a messaging application, and the first sequence of images is displayed as the scrollable region of the messaging application is scrolled.

11010 Detect a gesture on the touch-sensitive surface, the gesture including movement by a contact that corresponds to movement in a first direction on the display.

11012 In response to detecting the gesture on the touch-sensitive surface:
  move the first area in the first direction on the display;
  move a movable second area in the first direction on the display; and,
  in accordance with a determination that sequence-display criteria are met, while moving the second area in the first direction, display, in chronological order in the second area, at least some of one or more images for a second sequence of images acquired by the camera before acquiring a second representative image for the second sequence of images.

11012 In response to detecting the gesture on the touch-sensitive surface:
  move the first area in the first direction on the display;
  move a movable second area in the first direction on the display; and,
  in accordance with a determination that sequence-display criteria are met, while moving the second area in the first direction, display, in chronological order in the second area, at least some of one or more images for a second sequence of images acquired by the camera before acquiring a second representative image for the second sequence of images.

(A)

11014 In response to detecting the gesture on the touch-sensitive surface:
in accordance with a determination that the sequence-display criteria are not met, while moving the second area in the first direction, display the second representative image for the second sequence of images in the movable second area on the display 11016 The sequence-display criteria include a criterion that the contact lifts off prior to displaying, in chronological order in the second area, at least some of one or more images for the second sequence of images acquired by the camera before acquiring the second representative image.

11018 Moving the movable second area in the first direction on the display includes displaying a respective prior image that was acquired prior to acquiring the second representative image in the second region.

11020 The sequence-display criteria include detecting liftoff of the contact

In response to detecting liftoff of the contact, continue to move the moveable second area in the first direction and continue to move the moveable first area in the first direction. The images from the second sequence of images are displayed at a rate such that the second representative image is displayed in the moveable second area when the moveable second area stops moving in the first direction.

Figure 11G

11012 In response to detecting the gesture on the touch-sensitive surface:
　　move the first area in the first direction on the display;
　　move a movable second area in the first direction on the display; and,
　　in accordance with a determination that sequence-display criteria are met, while moving the second area in the first direction, display, in chronological order in the second area, at least some of one or more images for a second sequence of images acquired by the camera before acquiring a second representative image for the second sequence of images.

11022 While moving the moveable first region, display a simulated parallax effect for an image within the moveable first region such that the image within the moveable first region shifts relative to a frame of the moveable first region.

11024 While moving the moveable second region while the contact is detected on the touch-sensitive surface, display a simulated parallax effect for an image within the moveable second region such that the image within the moveable second region shifts relative to a frame of the moveable second region.

11026 Moving the first area in the first direction includes moving at least part of the first area off of the display in the first direction.

11028 Moving the second area in the first direction includes moving at least part of the second area onto the display in the first direction.

11030 After moving the second area in the first direction, display the second representative image for the second sequence of images in the second area.

11032 While displaying the second representative image for the second sequence of images in the second area, detect a change in intensity of an input corresponding to the second representative image.

In response to detecting the change in intensity of the input, advance through the second sequence of images in the second area without moving the second area on the display

Figure 11H

11034 Detect termination of the drag gesture while moving the first area and the second area.

In response to detecting termination of the drag gesture while moving the first area and the second area:
    in accordance with a determination that the drag gesture meets next-sequence-navigation criteria:
        move the first area completely off the display in the first direction;
        move the second area completely onto the display; and
        display the second representative image for the second sequence of images in the second area.

11036 In response to detecting termination of the drag gesture while moving the first area and the second area:
    in accordance with a determination that the drag gesture does not meet the next-sequence-navigation criteria:
        move the second area completely off the display in a second direction, opposite the first direction;
        move the first area completely onto the display; and
        display the first representative image for the first sequence of images in the first area.

1202 Store a plurality of sequences of images.

A respective sequence of images includes:
a respective representative image taken by a camera,
one or more images acquired by the camera after acquiring the respective representative image, and
one or more images acquired by the camera before acquiring the respective representative image.

↓

1204 Store a plurality of images that are distinct from the images in the plurality of sequences of images.

A respective image in the plurality of images is not part of a sequence of images in the plurality of sequences of images.

↓

1206 Display a first image on the display

↓

1208 While displaying the first image on the display, detect a first input

↓

1210 In response to detecting the first input:

1212 In accordance with a determination that the first image is an image in a first sequence of images, perform a first operation that includes displaying at least some of the images in the first sequence of images besides the first image

↓

1214 In accordance with a determination that the first image is an image in the plurality of images that are distinct from the images in the plurality of sequences of images, perform a second operation, distinct from the first operation, involving the first image (A)

Figure 12A

1210 In response to detecting the first input:

(A)

---

1216 The first input is a press-and-hold gesture, the first operation displays at least a portion of the first sequence of images, and the second operation displays information about the first image with the first image

---

1218 The first input is a press-and-hold gesture, the first operation displays at least a portion of the first sequence of images, and the second operation displays an animation that shows different portions of the first image

---

1220 The device includes one or more sensors to detect intensity of contacts with the touch-sensitive surface, the first input includes a finger contact that satisfies first contact-intensity criteria, the first operation displays at least a portion of the first sequence of images, and the second operation displays information about the first image with the first image

---

1222 The device includes one or more sensors to detect intensity of contacts with the touch-sensitive surface, the first input includes a finger contact that satisfies first contact-intensity criteria, the first operation displays at least a portion of the first sequence of images, and the second operation displays an animation that shows different portions of the first image

---

1224 The first input is a drag gesture, the first operation displays at least some of the images in the first sequence of images while transitioning from displaying the first image to displaying a second image (the second image not being an image in the first sequence of images), and the second operation transitions from displaying the first image to displaying a third image (the third image not being an image in the first sequence of images)

2402 Display a representative image on a display.

The representative image is one image in a sequence of images taken by a camera. The sequence of images includes one or more images acquired by the camera after acquiring the representative image. The sequence of images includes one or more images acquired by the camera before acquiring the representative image.

↓

2404 While displaying the representative image on the display, detect an input to modify the representative image.

↓

2406 In response to detecting the input to modify the representative image:

in accordance with a determination that the device is in a first editing mode, modify the representative image, the one or more images acquired by the camera after acquiring the representative image, and the one or more images acquired by the camera before acquiring the representative image; and, in accordance with a determination that the device is in a second editing mode, distinct from the first editing mode, modify the representative image, without modifying the one or more images acquired by the camera after acquiring the representative image, and without modifying the one or more images acquired by the camera before acquiring the representative image.

2408 After modifying the representative image, without modifying the one or more images acquired by the camera after acquiring the representative image, and without modifying the one or more images acquired by the camera before acquiring the representative image:

Display the modified representative image on the display;

While displaying the modified representative image on the display, detect a first portion of a second input;

In response to detecting the first portion of the second input, replace display of the modified representative image with display of, in sequence, at least some of the one or more images acquired by the camera after acquiring the representative image;

After detecting the first portion of the second input, detect a second portion of the second input; and, In response to detecting the second portion of the second input, display, in sequence, at least some of the one or more images acquired by the camera before acquiring the representative image, the representative image without modification, and at least some of the one or more images acquired by the camera after acquiring the representative image.

---

2410 After modifying the representative image, without modifying the one or more images acquired by the camera after acquiring the representative image, and without modifying the one or more images acquired by the camera before acquiring the representative image:

Display the modified representative image on the display;

While displaying the modified representative image on the display, detect a second input; and, In response to detecting the second input, display, in sequence, at least some of the one or more images acquired by the camera before acquiring the representative image, the representative image without modification, and at least some of the one or more images acquired by the camera after acquiring the representative image.

Figure 24B

2412 After modifying the representative image, without modifying the one or more images acquired by the camera after acquiring the representative image, and without modifying the one or more images acquired by the camera before acquiring the representative image:

Display the modified representative image on the display;

While displaying the modified representative image on the display, detect a first portion of a second input;

In response to detecting the first portion of the second input, replace display of the modified representative image with display of, in sequence, at least some of the one or more images acquired by the camera after acquiring the representative image;

After detecting the first portion of the second input, detect a second portion of the second input; and, In response to detecting the second portion of the second input, display, in sequence, at least some of the one or more images acquired by the camera before acquiring the representative image, the modified representative image, and at least some of the one or more images acquired by the camera after acquiring the representative image.

2414 After modifying the representative image, without modifying the one or more images acquired by the camera after acquiring the representative image, and without modifying the one or more images acquired by the camera before acquiring the representative image:

Display the modified representative image on the display;

While displaying the modified representative image on the display, detect a second input; and, In response to detecting the second input, display, in sequence, at least some of the one or more images acquired by the camera before acquiring the representative image, the modified representative image, and at least some of the one or more images acquired by the camera after acquiring the representative image.

Figure 24C

2416 After modifying the representative image, without modifying the one or more images acquired by the camera after acquiring the representative image, and without modifying the one or more images acquired by the camera before acquiring the representative image:

Display the modified representative image on the display;

While displaying the modified representative image on the display, detect a first portion of a second input;

In response to detecting the first portion of the second input, replace display of the modified representative image with display of, in sequence, at least some of the one or more images acquired by the camera after acquiring the representative image;

After detecting the first portion of the second input, detect a second portion of the second input; and, In response to detecting the second portion of the second input, display, in sequence, at least some of the one or more images acquired by the camera before acquiring the representative image and at least some of the one or more images acquired by the camera after acquiring the representative image.

---

2418 After modifying the representative image, without modifying the one or more images acquired by the camera after acquiring the representative image, and without modifying the one or more images acquired by the camera before acquiring the representative image:

Display the modified representative image on the display;

While displaying the modified representative image on the display, detect a second input.

In response to detecting the second input, display, in sequence, at least some of the one or more images acquired by the camera before acquiring the representative image and at least some of the one or more images acquired by the camera after acquiring the representative image.

Figure 24D

2420 After modifying the representative image, the one or more images acquired by the camera after acquiring the representative image, and the one or more images acquired by the camera before acquiring the representative image:

Display the modified representative image on the display;

While displaying the modified representative image on the display, detect a first portion of a second input;

In response to detecting the first portion of the second input, replace display of the modified representative image with display of, in sequence, at least some of the modified one or more images acquired by the camera after acquiring the representative image;

After detecting the first portion of the second input, detect a second portion of the second input; and, In response to detecting the second portion of the second input, display, in sequence, at least some of the modified one or more images acquired by the camera before acquiring the representative image, the modified representative image, and at least some of the modified one or more images acquired by the camera after acquiring the representative image.

---

2422 After modifying the representative image, the one or more images acquired by the camera after acquiring the representative image, and the one or more images acquired by the camera before acquiring the representative image:

Display the modified representative image on the display;

While displaying the modified representative image on the display, detect a second input; and, In response to detecting the second input, display, in sequence, at least some of the modified one or more images acquired by the camera before acquiring the representative image, the modified representative image, and at least some of the modified one or more images acquired by the camera after acquiring the representative image.

---

2424 Detect a second input corresponding to a request to delete the one or more images acquired by the camera before acquiring the representative image and the one or more images acquired by the camera after acquiring the representative image; and, In response to detecting the second input, delete the one or more images acquired by the camera before acquiring the representative image and the one or more images acquired by the camera after acquiring the representative image.

2502 Display, on a display, a representative image in a user interface of an application that is configured to communicate with other electronic devices.

The representative image is one image in a sequence of images taken by a camera. The sequence of images includes one or more images acquired by the camera after acquiring the representative image. The sequence of images includes one or more images acquired by the camera before acquiring the representative image.

> 2504 The application that is configured to communicate with other electronic devices is displayed in response to detecting selection of an application icon that corresponds to the application in a sharing user interface

2506 While displaying the representative image on the display, detect an input that corresponds to a request to send the representative image or a request to select the representative image for sending to a second electronic device, remote from the first electronic device, using the application

2508 In response to detecting the input that corresponds to the request to send the representative image or to the request to select the representative image for sending to the second electronic device:

in accordance with a determination that the second electronic device is configured to interact with the sequence of images as a group, display a first set of options for sending at least a portion of the sequence of images to the second electronic device; and, in accordance with a determination that the second electronic device is not configured to interact with the sequence of images as a group, display a second set of options for sending at least a portion of the sequence of images to the second electronic device, wherein the second set of options is different from the first set of options.

2508 In response to detecting the input that corresponds to the request to send the representative image or to the request to select the representative image for sending to the second electronic device:

in accordance with a determination that the second electronic device is configured to interact with the sequence of images as a group, display a first set of options for sending at least a portion of the sequence of images to the second electronic device; and, in accordance with a determination that the second electronic device is not configured to interact with the sequence of images as a group, display a second set of options for sending at least a portion of the sequence of images to the second electronic device, wherein the second set of options is different from the first set of options.

(A)

---

2510 The first set of options for sending at least a portion of the sequence of images to the second electronic device includes an option to send the entire sequence of images

---

2512 The second set of options for sending at least a portion of the sequence of images to the second electronic device includes an option for converting at least the portion of the sequence of images to a video format

---

2514 The first set of options for sending at least a portion of the sequence of images to the second electronic device includes an option for converting at least the portion of the sequence of images to a video format.

---

2516 In accordance with the determination that the second electronic device is configured to interact with the sequence of images as a group, send audio that corresponds to the sequence of images.

---

2518 In accordance with the determination that the second electronic device is configured to interact with the sequence of images as a group, send metadata that corresponds to the first sequence of images.

---

2520 The second set of options for sending at least a portion of the sequence of images to the second electronic device includes an option for sending the representative image without sending the one or more images acquired by the camera after acquiring the representative image and without sending the one or more images acquired by the camera before acquiring the representative image.

2522 Determine whether the first electronic device is in a first mode that permits sending the sequence of images.

In accordance with a determination that the first electronic device is not in the first mode that permits sending the sequence of images as a group, modify the first set of options for sending at least the portion of the sequence of images to the second electronic device.

2524 While displaying the representative image on the display, detect a second input.

In response to detecting the second input, replace display of the representative image with display of, in sequence, at least some of the images in the sequence of images.

2526 The first electronic device the first electronic device includes a touch-sensitive surface and one or more sensors to detect intensity of contacts with the touch-sensitive surface.

The second input includes a finger contact that satisfies first contact-intensity criteria.

2602 At an electronic device with a display and a camera: while in a first media acquisition mode for the camera: display a live preview of a scene on the display 2604 Perform scene recognition on the scene 2606 While displaying the live preview of the scene, detect a single activation of a shutter button at a first time 2608 In response to detecting the single activation of the shutter button at the first time:

In accordance with a determination that the scene meets action capture criteria, based at least in part on the scene recognition performed on the scene, retain a plurality of images acquired by the camera in temporal proximity to the activation of the shutter button at the first time and group the plurality of images into a first sequence of images.

The first sequence of images includes:
a plurality of images acquired by the camera prior to detecting activation of the shutter button at the first time;
a representative image that represents the first sequence of images and was acquired by the camera after one or more of the other images in the first sequence of images; and
a plurality of images acquired by the camera after acquiring the representative image.

In accordance with a determination that the scene does not meet the action capture criteria, the device retains a single image in temporal proximity to the activation of the shutter button at the first time (without grouping a plurality of images acquired by the camera in temporal proximity to the activation of the shutter button at the first time into a first sequence of images).

2610 The action capture criteria include recognizing one or more faces in the scene (A)

Figure 26A

2608 In response to detecting the single activation of the shutter button at the first time:

In accordance with a determination that the scene meets action capture criteria, based at least in part on the scene recognition performed on the scene, retain a plurality of images acquired by the camera in temporal proximity to the activation of the shutter button at the first time and group the plurality of images into a first sequence of images.

The first sequence of images includes:
a plurality of images acquired by the camera prior to detecting activation of the shutter button at the first time;
a representative image that represents the first sequence of images and was acquired by the camera after one or more of the other images in the first sequence of images; and
a plurality of images acquired by the camera after acquiring the representative image.

In accordance with a determination that the scene does not meet the action capture criteria, the device retains a single image in temporal proximity to the activation of the shutter button at the first time (without grouping a plurality of images acquired by the camera in temporal proximity to the activation of the shutter button at the first time into a first sequence of images).

(A)

2612 The device includes default image capture parameters for acquiring images

2614 Determine that the scene contains a single face in portrait orientation, the single face occupying more than a predetermined amount of the display

2616 In response to determining that the scene contains the single face in portrait orientation, the single face occupying more than a predetermined amount of the display: acquire the plurality of images with image capture parameters that are distinct from the default image capture parameters 2618 The action capture criteria include recognizing motion in the scene (B)

Figure 26B

2608 In response to detecting the single activation of the shutter button at the first time:

In accordance with a determination that the scene meets action capture criteria, based at least in part on the scene recognition performed on the scene, retain a plurality of images acquired by the camera in temporal proximity to the activation of the shutter button at the first time and group the plurality of images into a first sequence of images.

The first sequence of images includes:
a plurality of images acquired by the camera prior to detecting activation of the shutter button at the first time;
a representative image that represents the first sequence of images and was acquired by the camera after one or more of the other images in the first sequence of images; and
a plurality of images acquired by the camera after acquiring the representative image.

In accordance with a determination that the scene does not meet the action capture criteria, the device retains a single image in temporal proximity to the activation of the shutter button at the first time (without grouping a plurality of images acquired by the camera in temporal proximity to the activation of the shutter button at the first time into a first sequence of images).

(B)

2620 Performing scene recognition on the scene includes determining an amount of motion in the scene.

Retaining the plurality of images acquired by the camera in temporal proximity to the activation of the shutter button at the first time includes:

In accordance with a determination that the amount of motion is a first amount, retaining the plurality of images at a first frame rate; and In accordance with a determination that the amount of motion is a second amount that is greater than the first amount, retaining images at a second frame rate that is higher than the first frame rate.

2622 The action capture criteria include detecting movement of the electronic device above a predetermined threshold value.

2608 In response to detecting the single activation of the shutter button at the first time:

In accordance with a determination that the scene meets action capture criteria, based at least in part on the scene recognition performed on the scene, retain a plurality of images acquired by the camera in temporal proximity to the activation of the shutter button at the first time and group the plurality of images into a first sequence of images.

The first sequence of images includes:
a plurality of images acquired by the camera prior to detecting activation of the shutter button at the first time;
a representative image that represents the first sequence of images and was acquired by the camera after one or more of the other images in the first sequence of images; and
a plurality of images acquired by the camera after acquiring the representative image.

In accordance with a determination that the scene does not meet the action capture criteria, the device retains a single image in temporal proximity to the activation of the shutter button at the first time (without grouping a plurality of images acquired by the camera in temporal proximity to the activation of the shutter button at the first time into a first sequence of images).

(C)

---

2624 The number of images in the retained plurality of images depends on detected movement of the device while the plurality of images was acquired

---

2626 Performing scene recognition on the scene includes recognizing text.

The action capture criteria include a criterion that is met when an amount of text in the scene is below a predefined threshold.

2702 Display an image on a display.

The image is one image in a sequence of images taken by a camera.
The sequence of images includes a representative image.
The sequence of images includes one or more images acquired by the camera after acquiring the representative image.
The sequence of images includes one or more images acquired by the camera before acquiring the representative image.

> 2704 The displayed image is the representative image from the sequence of images.

> 2706 The displayed image is a currently selected image from the sequence of images.

2708 While displaying the image in the sequence of images on the display, detect a first input 2710 In response to detecting the first input: display a user interface for trimming the sequence of images to a subset, less than all, of the sequence of images.

The user interface includes:
    an area that contains representations of images in the sequence of images;
    a user-adjustable begin-trim icon that delimits a beginning image in the subset of the sequence of images via a position of the begin-trim icon in the area that contains representations of images in the sequence of images; and
    a user-adjustable end-trim icon that delimits an ending image in the subset of the sequence of images via a position of the end-trim icon in the area that contains representations of images in the sequence of images.

The begin-trim icon is located at a first position, in the area that contains representations of images in the sequence of images, that is automatically selected by the device.

The end-trim icon is located at a second position, in the area that contains representations of images in the sequence of images, that is automatically selected by the device.

2710 In response to detecting the first input: display a user interface for trimming the sequence of images to a subset, less than all, of the sequence of images.

The user interface includes:
- an area that contains representations of images in the sequence of images;
- a user-adjustable begin-trim icon that delimits a beginning image in the subset of the sequence of images via a position of the begin-trim icon in the area that contains representations of images in the sequence of images; and
- a user-adjustable end-trim icon that delimits an ending image in the subset of the sequence of images via a position of the end-trim icon in the area that contains representations of images in the sequence of images.

The begin-trim icon is located at a first position, in the area that contains representations of images in the sequence of images, that is automatically selected by the device.

The end-trim icon is located at a second position, in the area that contains representations of images in the sequence of images, that is automatically selected by the device.

(A)

2714 The user interface for trimming the sequence of images includes a second area that displays the image in the sequence of images.

The second area is displayed concurrently with the area that contains representations of images in the sequence of images.

2716 Automatically selecting the beginning image in the subset and the corresponding first position of the begin-trim icon is based on one or more characteristics of the images in the sequence of images.

Automatically selecting the ending image in the subset and the corresponding second position of the begin-trim icon is based on one or more characteristics of the images in the sequence of images.

2718 The sequence of images includes an initial image and a final image.

Display, in the area that contains representations of images in the sequence of images, one or more representations of images, not included in the sequence of images, that were obtained before the initial image in the sequence of images and/or that were obtained after the final image in the sequence of images.

2710 In response to detecting the first input: display a user interface for trimming the sequence of images to a subset, less than all, of the sequence of images.

The user interface includes:
    an area that contains representations of images in the sequence of images;
    a user-adjustable begin-trim icon that delimits a beginning image in the subset of the sequence of images via a position of the begin-trim icon in the area that contains representations of images in the sequence of images; and
    a user-adjustable end-trim icon that delimits an ending image in the subset of the sequence of images via a position of the end-trim icon in the area that contains representations of images in the sequence of images.

The begin-trim icon is located at a first position, in the area that contains representations of images in the sequence of images, that is automatically selected by the device.

The end-trim icon is located at a second position, in the area that contains representations of images in the sequence of images, that is automatically selected by the device.

(B)

2720 Prior to detecting the second input, while displaying the user interface for trimming the sequence of images, detect an input on the end-trim icon.

In response to detecting the input on the end-trim icon, move the end-trim icon from the second position to a third position in the area that contains representations of images in the sequence of images.

2722 While displaying the user interface for trimming the sequence of images, detect a second input

2724 In response to detecting a second input, trim the sequence of images to the subset of the sequence of images in accordance with a current position of the begin-trim icon and a current position of the end-trim icon

Figure 27C

> 2726 Delete images, from the sequence of images, which are not included in the subset of the sequence of images

---

> 2728 The sequence of images includes an initial image and a final image, and the user interface includes a reset affordance.
>
> Prior to detecting the second input, while displaying the user interface for trimming the sequence of images, detect an input on the reset affordance.
>
> In response to detecting the input on the reset affordance:
>     Display, the begin-trim icon at a position, in the area that contains representations of images in the sequence of images, that corresponds to delimiting the initial image in the sequence of images.
>
>     Display the end-trim icon at a position, in the area that contains representations of images in the sequence of images, that corresponds to delimiting the final image in the sequence of images.

---

> 2730 In response to detecting the input on the reset affordance: display an automatic selection affordance that when activated displays the begin-trim icon at the first position and the end-trim icon at the second position, in the area that contains representations of images in the sequence of images.

---

> 2732 In response to detecting a third input, select a new representative image for the subset of the sequence of images.

---

> 2734 After trimming the sequence of images to the subset of the sequence of images in accordance with the current position of the begin-trim icon and the current position of the end-trim icon, display a representative image of the subset of the sequence of images on the display.
>
> While displaying the representative image on the display, detect a third input.
>
> In response to detecting the third input, replace display of the representative image with an animated playback of the subset of the sequence of images.

Figure 27D

2736 In response to detecting a fourth input, disable the animated playback of the subset of the sequence of images while retaining the subset of images 2738 In response to detecting a third input that corresponds to a request to edit the representative image, provide a user of the device with options to:
    continue editing the representative image with the animated playback of the subset of the sequence of images disabled; and
    cancel editing the representative image.

2740 Present an affordance for deleting images in the sequence of images other than the representative image.

In response to detecting a third input, delete the one or more images acquired by the camera after acquiring the representative image and the one or more images acquired by the camera before acquiring the representative image.

Figure 27E

DEVICES AND METHODS FOR CAPTURING AND INTERACTING WITH ENHANCED DIGITAL IMAGES

RELATED APPLICATIONS

This application is a continuation of U.S. application Ser. No. 14/863,432, filed Sep. 23, 2015, which claims priority to: (1) U.S. Provisional Application Ser. No. 62/215,689, filed Sep. 8, 2015, entitled "Devices and Methods for Capturing and Interacting with Enhanced Digital Images"; (2) U.S. Provisional Application Ser. No. 62/172,233, filed Jun. 8, 2015, entitled "Devices and Methods for Capturing and Interacting with Enhanced Digital Images"; and (3) U.S. Provisional Application Ser. No. 62/172,223, filed Jun. 7, 2015, entitled "Reduced Size User Interface," all of which are incorporated by reference herein in their entireties.

TECHNICAL FIELD

This relates generally to electronic devices with touch-sensitive surfaces, including but not limited to electronic devices with touch-sensitive surfaces that capture, display and/or otherwise manipulate digital content taken or recorded by cameras.

BACKGROUND

The use of electronic devices for capturing, viewing, editing, and sharing digital content has increased significantly in recent years. Users frequently record digital content (e.g., images and/or videos) with their portable electronic devices (e.g., smart phones, tablets, and dedicated digital cameras); view and edit their digital content in image management applications (e.g., Photos from Apple Inc. of Cupertino, Calif.) and/or digital content management applications (e.g., iTunes from Apple Inc. of Cupertino, Calif.); and share their digital content with others through instant messages, email, social media applications, and other communication applications.

Portable electronic devices typically capture two types of digital content: still images and video. A still image is typically captured by simply pressing a shutter button. The still image freezes an instant in time, but details of the moment surrounding that instant are lost. Videos record extended periods of time, which may include both interesting moments and not-so-interesting moments. Significant editing is typically required to remove the less interesting moments.

SUMMARY

Accordingly, there is a need for electronic devices with improved methods and interfaces for capturing and interacting with moments taken or recorded by cameras. Such methods and interfaces optionally complement or replace conventional methods for capturing and interacting with still images and video.

The disclosed devices expand photography beyond the still image by providing new and improved methods for capturing and interacting with moments. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at an electronic device with a display and a camera. The method includes, while in a first media acquisition mode for the camera, displaying a live preview on the display. The method further includes, while displaying the live preview, detecting activation of a shutter button at a first time, and, in response to detecting activation of the shutter button at the first time, grouping a plurality of images acquired by the camera in temporal proximity to the activation of the shutter button at the first time into a first sequence of images. The first sequence of images includes: a plurality of images acquired by the camera prior to detecting activation of the shutter button at the first time; a representative image that represents the first sequence of images and was acquired by the camera after one or more of the other images in the first sequence of images; and a plurality of images acquired by the camera after acquiring the representative image.

In accordance with some embodiments, a method is performed at an electronic device with a display and a touch-sensitive surface. The method includes displaying a representative image on the display. The representative image is one image in a sequence of images taken by a camera. The sequence of images includes one or more images acquired by the camera after acquiring the representative image. The sequence of images also includes one or more images acquired by the camera before acquiring the representative image. The method includes, while displaying the representative image on the display, detecting a first portion of a first input and, in response to detecting the first portion of the first input, replacing display of the representative image with display, in sequence, of the one or more images acquired by the camera after acquiring the representative image. The method further includes, after detecting the first portion of the first input, detecting a second portion of the first input, and, in response to detecting the second portion of the first input, displaying, in sequence, the one or more images acquired by the camera before acquiring the representative image, the representative image, and the one or more images acquired by the camera after acquiring the representative image.

In accordance with some embodiments, a method is performed at an electronic device with a display and a touch-sensitive surface. The method includes displaying a representative image on the display. The representative image is one image in a sequence of images taken by a camera. The sequence of images includes one or more images acquired by the camera after acquiring the representative image. The sequence of images includes one or more images acquired by the camera before acquiring the representative image. The method further includes, while displaying the representative image on the display, detecting a first portion of a first input. The method further includes, in response to detecting the first portion of the first input, transitioning from displaying the representative image to displaying a respective prior image in the sequence of images, where the respective prior image was acquired by the camera before acquiring the representative image. The method further includes, in response to detecting the first portion of the first input, after transitioning from displaying the representative image to displaying the respective prior image, displaying, in sequence starting with the respective prior image, at least some of the one or more images acquired by the camera before acquiring the representative image and at least some of the one or more images acquired by the camera after acquiring the representative image.

In accordance with some embodiments, a method is performed at an electronic device with a display, a touch-sensitive surface, and one or more sensors to detect intensity of contacts with the touch-sensitive surface. The method includes displaying a representative image on the display. The representative image is one image in a sequence of images taken by a camera. The sequence of images includes one or more images acquired by the camera after acquiring the representative image. The method further includes, while displaying the representative image on the display, detecting a first input that includes detecting an increase in a characteristic intensity of a contact on the touch-sensitive surface to a first intensity that is greater than a first intensity threshold. The method further includes, in response to detecting the increase in the characteristic intensity of the contact, advancing, in a first direction, through the one or more images acquired by the camera after acquiring the representative image at a rate that is determined based at least in part on the first intensity. The method further includes, after advancing through the one or more images acquired by the camera after acquiring the representative image at the rate that is determined based on the first intensity, detecting a decrease in intensity of the contact to a second intensity that is less than the first intensity. The method further includes, in response to detecting the decrease in the characteristic intensity of the contact to the second intensity, in accordance with a determination that the second intensity is above the first intensity threshold, continuing to advance, in the first direction, through the one or more images acquired by the camera after acquiring the representative image at a second rate. The second rate is determined based at least in part on the second intensity and the second rate is slower than the first rate. The method further includes, in response to detecting the decrease in the characteristic intensity of the contact to the second intensity, in accordance with a determination that the second intensity is below the first intensity threshold, moving, in a second direction that is opposite to the first direction, through the one or more images acquired by the camera after acquiring the representative image at a rate that is determined based at least in part on the second intensity.

In accordance with some embodiments, a method is performed at an electronic device with a display and a touch-sensitive surface. The method includes storing a plurality of sequences of images. A respective sequence of images includes a respective representative image taken by a camera, one or more images acquired by the camera after acquiring the respective representative image, and one or more images acquired by the camera before acquiring the respective representative image. The method further includes displaying a first representative image for a first sequence of images in a movable first area on the display. The method further includes detecting a drag gesture on the touch-sensitive surface. The method further includes, in accordance with a determination that the drag gesture is in a first direction on the touch-sensitive surface: in the moveable first area, replacing display of the first representative image for the first sequence of images with display, in chronological order, of at least some of one or more images for the first sequence of images acquired by the camera after acquiring the first representative image for the first sequence of images. The method further includes moving the first area in the first direction.

In accordance with some embodiments, a method is performed at an electronic device with a display and a touch-sensitive surface. The method includes storing a plurality of sequences of images. A respective sequence of images includes: a respective representative image taken by a camera, and one or more images acquired by the camera before acquiring the respective representative image. The method further includes displaying a first representative image for a first sequence of images in a movable first area on the display. The method further includes detecting a gesture on the touch-sensitive surface, the gesture including movement by a contact that corresponds to movement in a first direction on the display. The method further includes, in response to detecting the gesture on the touch-sensitive surface: moving the first area in the first direction on the display; moving a movable second area in the first direction on the display; and, in accordance with a determination that sequence-display criteria are met, while moving the second area in the first direction, displaying, in chronological order in the second area, at least some of the one or more images for a second sequence of images acquired by the camera before acquiring a second representative image for the second sequence of images.

In accordance with some embodiments, a method is performed at an electronic device with a display and a touch-sensitive surface. The method includes storing a plurality of sequences of images. A respective sequence of images includes: a respective representative image taken by a camera, one or more images acquired by the camera after acquiring the respective representative image, and one or more images acquired by the camera before acquiring the respective representative image. The method further includes storing a plurality of images that are distinct from the images in the plurality of sequences of images. A respective image in the plurality of images is not part of a sequence of images in the plurality of sequences of images. The method further includes displaying a first image on the display and, while displaying the first image on the display, detecting a first input. The method further includes, in response to detecting the first input: in accordance with a determination that the first image is an image in a first sequence of images, performing a first operation that includes displaying at least some of the images in the first sequence of images besides the first image. The method further includes, in accordance with a determination that the first image is an image in the plurality of images that are distinct from the images in the plurality of sequences of images, performing a second operation, distinct from the first operation, involving the first image.

In accordance with some embodiments, a method is performed at an electronic device with a display and a touch-sensitive surface. The method includes displaying a representative image on the display. The representative image is one image in a sequence of images taken by a camera. The sequence of images includes one or more images acquired by the camera after acquiring the representative image. The sequence of images includes one or more images acquired by the camera before acquiring the representative image. The method further includes, while displaying the representative image on the display, detecting an input to modify the representative image. The method further includes, in response to detecting the input to modify the representative image: in accordance with a determination that the device is in a first editing mode, modifying the representative image, the one or more images acquired by the camera after acquiring the representative image, and the one or more images acquired by the camera before acquiring the representative image; and, in accordance with a determination that the device is in a second editing mode, distinct from the first editing mode, modifying the representative image, without modifying the one or more images acquired by the camera after acquiring the representative image, and without modifying the one or more images acquired by the camera before acquiring the representative image.

In accordance with some embodiments, a method is performed at a first electronic device with a display. The method includes displaying, on the display, a representative image in a user interface of an application that is configured to communicate with other electronic devices. The representative image is one image in a sequence of images taken by a camera. The sequence of images includes one or more images acquired by the camera after acquiring the representative image. The sequence of images includes one or more images acquired by the camera before acquiring the representative image. The method further includes, while displaying the representative image on the display, detecting an input that corresponds to a request to send the representative image or a request to select the representative image for sending to a second electronic device, remote from the first electronic device, using the application. The method further includes, in response to detecting the input that corresponds to the request to send the representative image or to the request to select the representative image for sending to the second electronic device: in accordance with a determination that the second electronic device is configured to interact with the sequence of images as a group, displaying a first set of options for sending at least a portion of the sequence of images to the second electronic device; and, in accordance with a determination that the second electronic device is not configured to interact with the sequence of images as a group, displaying a second set of options for sending at least a portion of the sequence of images to the second electronic device, wherein the second set of options is different from the first set of options.

In accordance with some embodiments, a method is performed at an electronic device with a display and a camera. The method includes, while in a first media acquisition mode for the camera, displaying a live preview of a scene on the display and performing scene recognition on the scene. The method further includes, while displaying the live preview of the scene, detecting a single activation of a shutter button at a first time. The method further includes, in response to detecting the single activation of the shutter button at the first time, in accordance with a determination that the scene meets action capture criteria, based at least in part on the scene recognition performed on the scene, retaining a plurality of images acquired by the camera in temporal proximity to the activation of the shutter button at the first time and grouping the plurality of images into a first sequence of images. The first sequence of images includes: a plurality of images acquired by the camera prior to detecting activation of the shutter button at the first time; a representative image that represents the first sequence of images and was acquired by the camera after one or more of the other images in the first sequence of images; and a plurality of images acquired by the camera after acquiring the representative image. The method further includes, in response to detecting the single activation of the shutter button at the first time, in accordance with a determination that the scene does not meet the action capture criteria, retaining a single image in temporal proximity to the activation of the shutter button at the first time.

In accordance with some embodiments, a method is performed at an electronic device with a display and a touch-sensitive surface. The method includes displaying an image on the display. The image is one image in a sequence of images taken by a camera. The sequence of images includes a representative image. The sequence of images includes one or more images acquired by the camera after acquiring the representative image. The sequence of images includes one or more images acquired by the camera before acquiring the representative image. The method further includes, while displaying the image in the sequence of images on the display, detecting a first input. The method further includes, in response to detecting the first input: displaying a user interface for trimming the sequence of images to a subset, less than all, of the sequence of images. The user interface includes: an area that contains representations of images in the sequence of images; a user-adjustable begin-trim icon that delimits a beginning image in the subset of the sequence of images via a position of the begin-trim icon in the area that contains representations of images in the sequence of images; and a user-adjustable end-trim icon that delimits an ending image in the subset of the sequence of images via a position of the end-trim icon in the area that contains representations of images in the sequence of images. The begin-trim icon is located at a first position, in the area that contains representations of images in the sequence of images, that is automatically selected by the device. The end-trim icon is located at a second position, in the area that contains representations of images in the sequence of images, that is automatically selected by the device. The method further includes, while displaying the user interface for trimming the sequence of images, detecting a second input. The method further includes, in response to detecting a second input, trimming the sequence of images to the subset of the sequence of images in accordance with a current position of the begin-trim icon and a current position of the end-trim icon.

In accordance with some embodiments, an electronic device includes a display unit configured to display a live preview, a camera unit configured to acquire images, and a processing unit coupled with the display unit and the camera unit. The processing unit is configured to, while in a first media acquisition mode for the camera unit, display the live preview on the display unit. The processing unit is further configured to, while displaying the live preview, detect activation of a shutter button at a first time, and, in response to detecting activation of the shutter button at the first time, group a plurality of images acquired by the camera unit in temporal proximity to the activation of the shutter button at the first time into a first sequence of images. The first sequence of images includes: a plurality of images acquired by the camera unit prior to detecting activation of the shutter button at the first time; a representative image that represents the first sequence of images and was acquired by the camera unit after one or more of the other images in the first sequence of images; and a plurality of images acquired by the camera unit after acquiring the representative image.

In accordance with some embodiments, an electronic device includes a display unit configured to display images, a touch-sensitive surface unit configured to detect user inputs, and a processing unit coupled with the display unit and the touch-sensitive surface unit. The processing unit is configured to display a representative image on the display unit. The representative image is one image in a sequence of images taken by a camera. The sequence of images includes one or more images acquired by the camera after acquiring the representative image. The sequence of images includes one or more images acquired by the camera before acquiring the representative image. The processing unit is further configured to, while displaying the representative image on the display unit, detect a first portion of a first input. The processing unit is further configured to, in response to detecting the first portion of the first input, replace display of the representative image with display, on the display unit, in sequence, of the one or more images acquired by the camera after acquiring the representative image. The processing unit is further configured to, after detecting the first portion of the first input, detect a second portion of the first input. The processing unit is further configured to, in response to detecting the second portion of the first input, display, on the display unit, in sequence, the one or more images acquired by the camera before acquiring the representative image, the representative image, and the one or more images acquired by the camera after acquiring the representative image.

In accordance with some embodiments, an electronic device includes a display unit configured to display images, a touch-sensitive surface unit configured to detect user inputs, and a processing unit coupled with the display unit and the touch-sensitive surface unit. The processing unit is configured to enable display of a representative image on the display unit. The representative image is one image in a sequence of images taken by a camera. The sequence of images includes one or more images acquired by the camera after acquiring the representative image. The sequence of images includes one or more images acquired by the camera before acquiring the representative image. The processing unit is further configured to, while enabling display of the representative image on the display unit, detect a first portion of a first input. The processing unit is further configured to, in response to detecting the first portion of the first input: transition from displaying the representative image to displaying a respective prior image in the sequence of images, wherein the respective prior image was acquired by the camera before acquiring the representative image; and, after transitioning from displaying the representative image to displaying the respective prior image, enable display of, in sequence starting with the respective prior image, at least some of the one or more images acquired by the camera before acquiring the representative image and at least some of the one or more images acquired by the camera after acquiring the representative image.

In accordance with some embodiments, an electronic device includes a display unit configured to display images, a touch-sensitive surface unit configured to detect user inputs, one or more sensors units configured to detect intensity of contacts with the touch-sensitive surface unit, and a processing unit coupled with the display unit, the touch-sensitive surface unit, and the one or more sensors. The processing unit is configured to enable display of a representative image on the display unit. The representative image is one image in a sequence of images taken by a camera. The sequence of images includes one or more images acquired by the camera after acquiring the representative image. The processing unit is further configured to, while enabling display of the representative image on the display unit, detect a first input that includes detecting an increase in a characteristic intensity of a contact on the touch-sensitive surface unit to a first intensity that is greater than a first intensity threshold. The processing unit is further configured to, in response to detecting the increase in the characteristic intensity of the contact, advance, in a first direction, through the one or more images acquired by the camera after acquiring the representative image at a rate that is determined based at least in part on the first intensity. The processing unit is further configured to, after advancing through the one or more images acquired by the camera after acquiring the representative image at the rate that is determined based on the first intensity, detect a decrease in intensity of the contact to a second intensity that is less than the first intensity. The processing unit is further configured to, in response to detecting the decrease in the characteristic intensity of the contact to the second intensity: in accordance with a determination that the second intensity is above the first intensity threshold, continue to advance, in the first direction, through the one or more images acquired by the camera after acquiring the representative image at a second rate. The second rate is determined based at least in part on the second intensity and the second rate is slower than the first rate. The processing unit is further configured to, in response to detecting the decrease in the characteristic intensity of the contact to the second intensity: in accordance with a determination that the second intensity is below the first intensity threshold, move, in a second direction that is opposite to the first direction, through the one or more images acquired by the camera after acquiring the representative image at a rate that is determined based at least in part on the second intensity.

In accordance with some embodiments, an electronic device includes a display unit configured to display images, a touch-sensitive surface unit configured to detect user inputs, a memory unit configured to store images, and a processing unit coupled with the display unit, the memory unit, and the touch-sensitive surface unit. The processing unit is configured to store, in the memory unit, a plurality of sequences of images. A respective sequence of images includes: a respective representative image taken by a camera, one or more images acquired by the camera after acquiring the respective representative image, and one or more images acquired by the camera before acquiring the respective representative image. The processing unit is further configured to display, on the display unit, a first representative image for a first sequence of images in a movable first area on the display unit. The processing unit is further configured to detect a drag gesture on the touch-sensitive surface unit. The processing unit is further configured to, in accordance with a determination that the drag gesture is in a first direction on the touch-sensitive surface unit: in the moveable first area, replace display of the first representative image for the first sequence of images with display, on the display unit, in chronological order, of at least some of one or more images for the first sequence of images acquired by the camera after acquiring the first representative image for the first sequence of images, and move the first area in the first direction on the display unit.

In accordance with some embodiments, an electronic device includes a display unit configured to display images, a touch-sensitive surface unit configured to detect user inputs, and a processing unit coupled with the display unit and the touch-sensitive surface unit. The processing unit is configured to store a plurality of sequences of images. A respective sequence of images includes: a respective representative image taken by a camera, and one or more images acquired by the camera before acquiring the respective representative image. The processing unit is further configured to enable display of a first representative image for a first sequence of images in a movable first area on the display unit. The processing unit is configured to detect a gesture on the touch-sensitive surface unit, the gesture including movement by a contact that corresponds to movement in a first direction on the display unit. The processing unit is configured to, in response to detecting the gesture on the touch-sensitive surface unit: move the first area in the first direction on the display unit; move a movable second area in the first direction on the display unit; and, in accordance with a determination that sequence-display criteria are met, while moving the second area in the first direction, enable display of, in chronological order in the second area, at least some of the one or more images for a second sequence of images acquired by the camera before acquiring a second representative image for the second sequence of images.

In accordance with some embodiments, an electronic device includes a display unit configured to display images, a touch-sensitive surface unit configured to detect user inputs, a memory unit configured to store images, and a processing unit coupled with the display unit, the memory unit, and the touch-sensitive surface unit. The processing unit is configured to store, in the memory unit, a plurality of sequences of images. A respective sequence of images includes a respective representative image taken by a camera, one or more images acquired by the camera after acquiring the respective representative image, and one or more images acquired by the camera before acquiring the respective representative image. The processing unit is further configured to store, in the memory unit, a plurality of images that are distinct from the images in the plurality of sequences of images. A respective image in the plurality of images is not part of a sequence of images in the plurality of sequences of images. The processing unit is further configured to display a first image on the display unit. The processing unit is further configured to, while displaying the first image on the display unit, detect a first input. The processing unit is further configured to, in response to detecting the first input: in accordance with a determination that the first image is an image in a first sequence of images, perform a first operation that includes displaying, on the display unit, at least some of the images in the first sequence of images besides the first image. The processing unit is further configured to, in accordance with a determination that the first image is an image in the plurality of images that are distinct from the images in the plurality of sequences of images, perform a second operation, distinct from the first operation, involving the first image.

In accordance with some embodiments, an electronic device includes a display unit configured to display images, a touch-sensitive surface unit configured to detect user inputs, and a processing unit coupled with the display unit and the touch-sensitive surface unit. The processing unit is configured to enable display of a representative image on the display unit. The representative image is one image in a sequence of images taken by a camera. The sequence of images includes one or more images acquired by the camera after acquiring the representative image. The sequence of images includes one or more images acquired by the camera before acquiring the representative image. The processing unit is further configured to, while enabling display of the representative image on the display unit, detect an input to modify the representative image. The processing unit is configured to, in response to detecting the input to modify the representative image: in accordance with a determination that the device is in a first editing mode, modify the representative image, the one or more images acquired by the camera after acquiring the representative image, and the one or more images acquired by the camera before acquiring the representative image; and, in accordance with a determination that the device is in a second editing mode, distinct from the first editing mode, modify the representative image, without modifying the one or more images acquired by the camera after acquiring the representative image, and without modifying the one or more images acquired by the camera before acquiring the representative image.

In accordance with some embodiments, an electronic device includes a display unit configured to display images and a processing unit coupled with the display unit. The processing unit is configured to enable display, on the display unit, of a representative image in a user interface of an application that is configured to communicate with other electronic devices. The representative image is one image in a sequence of images taken by a camera. The sequence of images includes one or more images acquired by the camera after acquiring the representative image. The sequence of images includes one or more images acquired by the camera before acquiring the representative image. The processing unit is further configured to, while enabling display of the representative image on the display unit, detect an input that corresponds to a request to send the representative image or a request to select the representative image for sending to a second electronic device, remote from the electronic device, using the application. The processing unit is further configured to, in response to detecting the input that corresponds to the request to send the representative image or to the request to select the representative image for sending to the second electronic device: in accordance with a determination that the second electronic device is configured to interact with the sequence of images as a group, enable display of a first set of options for sending at least a portion of the sequence of images to the second electronic device; and, in accordance with a determination that the second electronic device is not configured to interact with the sequence of images as a group, enable display of a second set of options for sending at least a portion of the sequence of images to the second electronic device, wherein the second set of options is different from the first set of options.

In accordance with some embodiments, an electronic device includes a display unit configured to display images, a camera unit configured to acquire images, and a processing unit coupled with the display unit and the camera unit. The processing unit is configured to, while in a first media acquisition mode for the camera unit, enable display of a live preview of a scene on the display unit and perform scene recognition on the scene. The processing unit is further configured to, while enabling display of the live preview of the scene, detect a single activation of a shutter button at a first time. The processing unit is further configured to, in response to detecting the single activation of the shutter button at the first time: in accordance with a determination that the scene meets action capture criteria, based at least in part on the scene recognition performed on the scene, retain a plurality of images acquired by the camera unit in temporal proximity to the activation of the shutter button at the first time and group the plurality of images into a first sequence of images. The first sequence of images includes: a plurality of images acquired by the camera unit prior to detecting activation of the shutter button at the first time; a representative image that represents the first sequence of images and was acquired by the camera unit after one or more of the other images in the first sequence of images; and a plurality of images acquired by the camera unit after acquiring the representative image. The processing unit is further configured to, in response to detecting the single activation of the shutter button at the first time: in accordance with a determination that the scene does not meet the action capture criteria, retain a single image in temporal proximity to the activation of the shutter button at the first time.

In accordance with some embodiments, an electronic device includes a display unit configured to display images, a touch-sensitive surface unit configured to detect user inputs, and a processing unit coupled with the display unit and the camera unit. The processing unit is configured to enable display of an image on the display unit. The image is one image in a sequence of images taken by a camera. The sequence of images includes a representative image. The sequence of images includes one or more images acquired by the camera after acquiring the representative image. The sequence of images includes one or more images acquired by the camera before acquiring the representative image. The processing unit is further configured to, while enabling display of the image in the sequence of images on the display unit, detect a first input. The processing unit is further configured to, in response to detecting the first input, enable display of a user interface for trimming the sequence of images to a subset, less than all, of the sequence of images. The user interface includes: an area that contains representations of images in the sequence of images; a user-adjustable begin-trim icon that delimits a beginning image in the subset of the sequence of images via a position of the begin-trim icon in the area that contains representations of images in the sequence of images; and a user-adjustable end-trim icon that delimits an ending image in the subset of the sequence of images via a position of the end-trim icon in the area that contains representations of images in the sequence of images. The begin-trim icon is located at a first position, in the area that contains representations of images in the sequence of images, that is automatically selected by the device. The end-trim icon is located at a second position, in the area that contains representations of images in the sequence of images, that is automatically selected by the device. The processing unit is further configured to, while enabling display of the user interface for trimming the sequence of images, detect a second input. The processing unit is further configured to, in response to detecting a second input, trim the sequence of images to the subset of the sequence of images in accordance with a current position of the begin-trim icon and a current position of the end-trim icon.

In accordance with some embodiments, an electronic device includes a display, a touch-sensitive surface, one or more optional sensors to detect intensity of contacts with the touch-sensitive surface, one or more processors, memory, and one or more programs; the one or more programs are stored in the memory and configured to be executed by the one or more processors and the one or more programs include instructions for performing or causing performance of the operations of any of the methods described herein. In accordance with some embodiments, a computer readable storage medium has stored therein instructions which when executed by an electronic device with a display, a touch-sensitive surface, and one or more optional sensors to detect intensity of contacts with the touch-sensitive surface, cause the device to perform or cause performance of the operations of any of the methods described herein. In accordance with some embodiments, a graphical user interface on an electronic device with a display, a touch-sensitive surface, one or more optional sensors to detect intensity of contacts with the touch-sensitive surface, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, and one or more optional sensors to detect intensity of contacts with the touch-sensitive surface; and means for performing or causing performance of the operations of any of the methods described herein. In accordance with some embodiments, an information processing apparatus, for use in an electronic device with a display and a touch-sensitive surface, and one or more optional sensors to detect intensity of contacts with the touch-sensitive surface, includes means for performing or causing performance of the operations of any of the methods described herein.

Thus, electronic devices are provided with improved methods and interfaces for capturing and interacting with moments taken or recorded by cameras. Such methods and interfaces may complement or replace conventional methods for capturing and interacting with still images and video.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4B illustrates an exemplary user interface for a multifunction device with a touch-sensitive surface that is separate from the display in accordance with some embodiments.

FIGS. 9A-9G are flow diagrams illustrating a method of capturing a grouped sequence of related images in accordance with some embodiments.

FIGS. 10A-10E are flow diagrams illustrating a method of displaying (or replaying) a sequence of related images in accordance with some embodiments.

FIGS. 10E-10I are flow diagrams illustrating a method of displaying (or replaying) a sequence of related images in accordance with some embodiments.

FIGS. 10J-10M are flow diagrams illustrating a method of displaying (or replaying) a sequence of related images in accordance with some embodiments.

FIGS. 11A-11E are flow diagrams illustrating a method of navigating through sequences of related images in accordance with some embodiments.

FIGS. 11F-11I are flow diagrams illustrating a method of navigating through sequences of related images in accordance with some embodiments.

FIGS. 12A-12B are flow diagrams illustrating a method of performing distinct operations on sequences of related images as compared to individual images in accordance with some embodiments.

FIGS. 24A-24E illustrate a flow diagram of a method of modifying images in a sequence of images, in accordance with some embodiments.

FIGS. 25A-25C illustrate a flow diagram of a method of sending images from a sequence of images to a second electronic device, in accordance with some embodiments.

FIGS. 26A-26D illustrate a flow diagram of a method of acquiring photos (e.g., enhanced photos or still photos) using scene recognition, in accordance with some embodiments.

FIGS. 27A-27E illustrate a flow diagram of a method of trimming a sequence of images (e.g., an enhanced photo), in accordance with some embodiments.

DESCRIPTION OF EMBODIMENTS

Figure 1A:
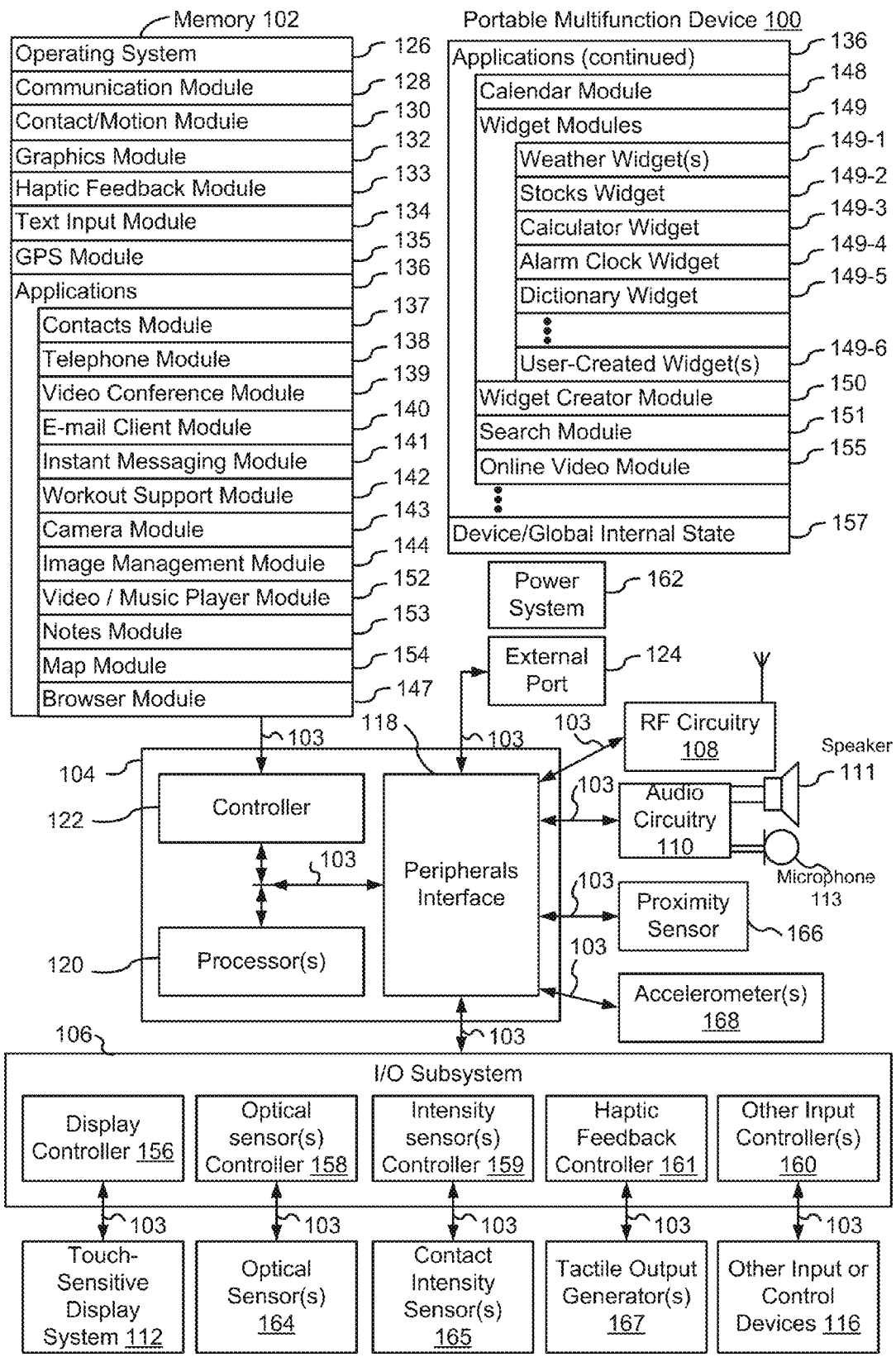
FIG. 1A is a block diagram illustrating a portable multifunction device with a touch-sensitive display in accordance with some embodiments.

As noted above, portable electronic devices typically capture two types of digital content: still images and video. A still image is typically captured by simply pressing a shutter button. The still image freezes an instant in time, but details of the moment surrounding that instant are lost. Videos record extended periods of time, which may include both interesting moments and not-so-interesting moments. Significant editing is typically required to remove the less interesting moments.

Here, new and improved devices and methods for capturing and interacting with moments are described.

In some embodiments, in response to the press of a shutter button, the device groups a sequence of images together that includes a representative image (analogous to the instant captured in a conventional still image), as well as images acquired before the shutter button was pressed and images acquired after the representative image. Thus, the press of a shutter button captures the moment around an instant in time, instead of just the instant. In some embodiments, additional information about the moment, such as sound and metadata, is also captured. From a user perspective, this process makes capturing moments (grouped sequences of images that include a representative image) as easy as capturing instants (a single still image)—the user just needs to press a shutter button. To distinguish from a single still image, the term "enhanced photo" is sometimes used for brevity to refer to a grouped sequence of images.

In some embodiments, while viewing a representative image, an enhanced photo can "come to life" and replay the moment in response to a user input (e.g., a press-and-hold gesture or a deep press gesture on the enhanced photo).

In some embodiments, while navigating between enhanced photos, for a respective enhanced photo, the images taken just before the representative image of the enhanced photo are shown as the enhanced photo comes into view on the display and/or the images taken just after the representative image are shown as the enhanced photo leaves the display, which enhances display of the moment.

In some embodiments, while navigating between enhanced photos and conventional still images, enhanced photos are "replayed" while coming into view and/or leaving the display, while for the conventional still images additional information (e.g., location data) and/or animations within the still image are shown when the still images are displayed.

In some embodiments, a user can modify a representative image in an enhanced photo and have the modifications applied to just the representative image or applied to all of the images in the enhanced photo (e.g., the user can toggle between an apply-to-all mode and a still image editing mode).

In some embodiments, when a respective user sends an enhanced photo to another user, the respective user's device presents different options for sending the enhanced photo depending on whether the other user's device is compatible with enhanced photos (e.g., presents an option for sending the enhanced photo as an enhanced photo when the other user's device is compatible with enhanced photos, and presents an option for sending just the representative image when the other user's device incompatible with enhanced photos).

In some embodiments, a device performs scene recognition (e.g., while in an image capture mode). When the scene is conducive to retaining an enhanced photo (e.g., the scene includes movement or faces), in response to the press of a shutter button, the device retains an enhanced photo. When the scene is not conducive to retaining an enhanced photo (e.g., the scene is a picture of a receipt), in response to the press of a shutter button, the device retains a single still image.

In some embodiments, a user can trim a sequence of images to a subset of the sequence of images. The device provides handles for trimming the sequence at automatically chosen positions in the sequence (e.g., based on scene recognition) The handles can also be used to manually trim the sequence.

Below, FIGS. 1A-1B, 2, and 3 provide a description of exemplary devices. FIGS. 4A-4B, 5A-5K, 6A-6FF, 7A-7CC, 8A-8L, 20A-20L, 21A-21J, 22A-22D, and 23A-23E illustrate exemplary user interfaces for capturing, navigating, and performing operations on or related to a sequence of related images. FIGS. 9A-9G are flow diagrams illustrating a method of capturing a sequence of related images in accordance with some embodiments. FIGS. 10A-10M flow diagrams illustrating methods of displaying (or replaying) a sequence of related images in accordance with some embodiments. FIGS. 11A-11I are flow diagrams illustrating methods of navigating through photos that include a sequence of related images in accordance with some embodiments. FIGS. 12A-12B are flow diagrams illustrating a method of performing distinct operations on photos that include a sequence of related images as compared to still photos in accordance with some embodiments. FIGS. 24A-24E are flow diagrams of a method of modifying images in a sequence of images, in accordance with some embodiments. FIGS. 25A-25C are flow diagrams of a method of sending images from a sequence of images to a second electronic device, in accordance with some embodiments. FIGS. 26A-26D are flow diagrams of a method of acquiring photos (e.g., enhanced photos or still photos) using scene recognition, in accordance with some embodiments. FIGS. 27A-27E are flow diagrams of a method of trimming a sequence of images (e.g., an enhanced photo), in accordance with some embodiments. The user interfaces in FIGS. 5A-5K, 6A-6FF, 7A-7CC, 8A-8L, 20A-20L, 21A-21J, 22A-22D, and 23A-23E are used to illustrate the processes in FIGS. 9A-9G, 10A-10M, 11A-11I, 12A-12B, 24A-24E, 25A-25C, 26A-26D, and 27A-27E.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., graphical user interface object that is configured to respond to inputs directed toward the graphical user interface object). Examples of user-interactive graphical user interface objects include, without limitation, a button, slider, icon, selectable menu item, switch, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images, enhanced photographs, and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generator(s) 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
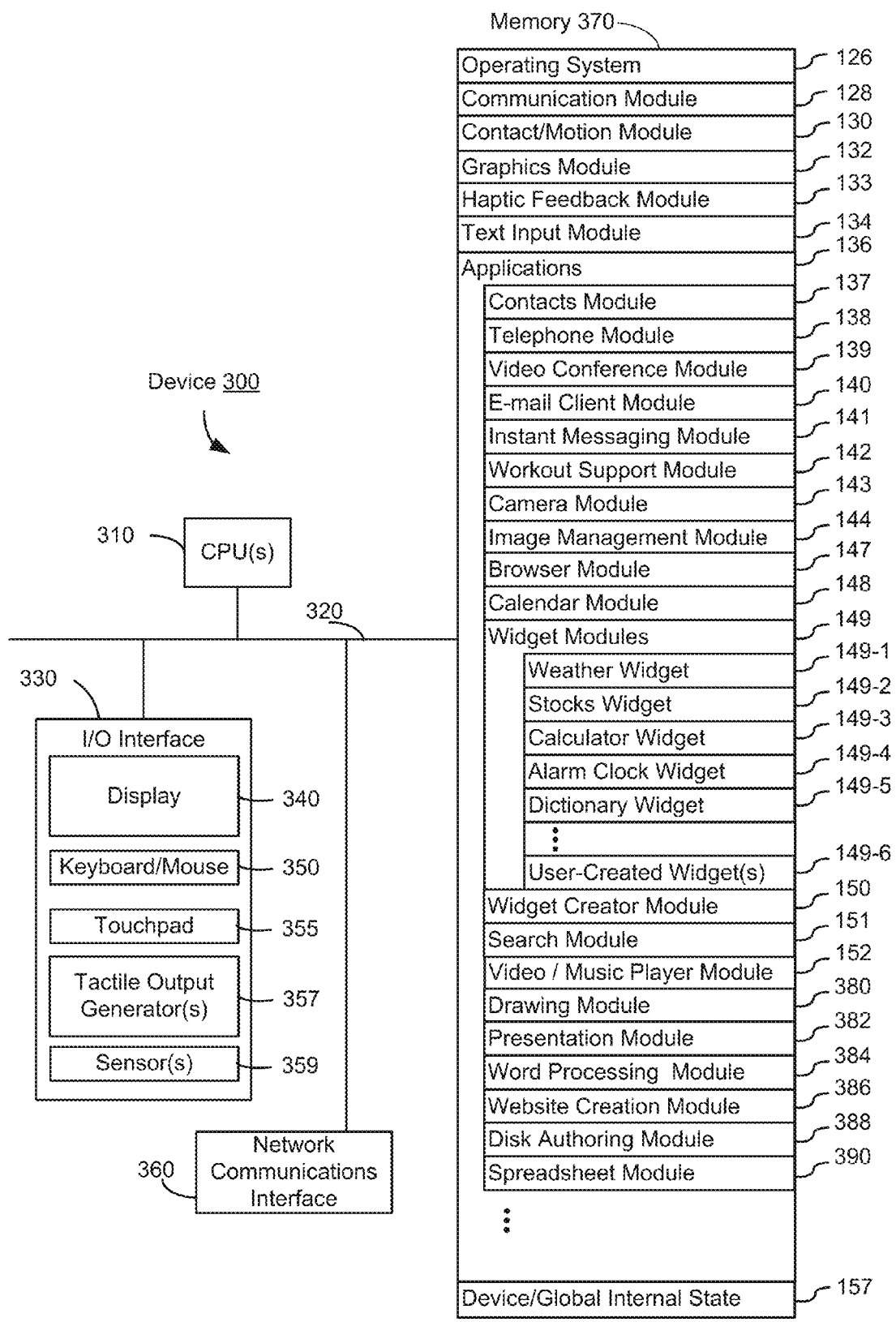
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos (e.g., still images), enhanced photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
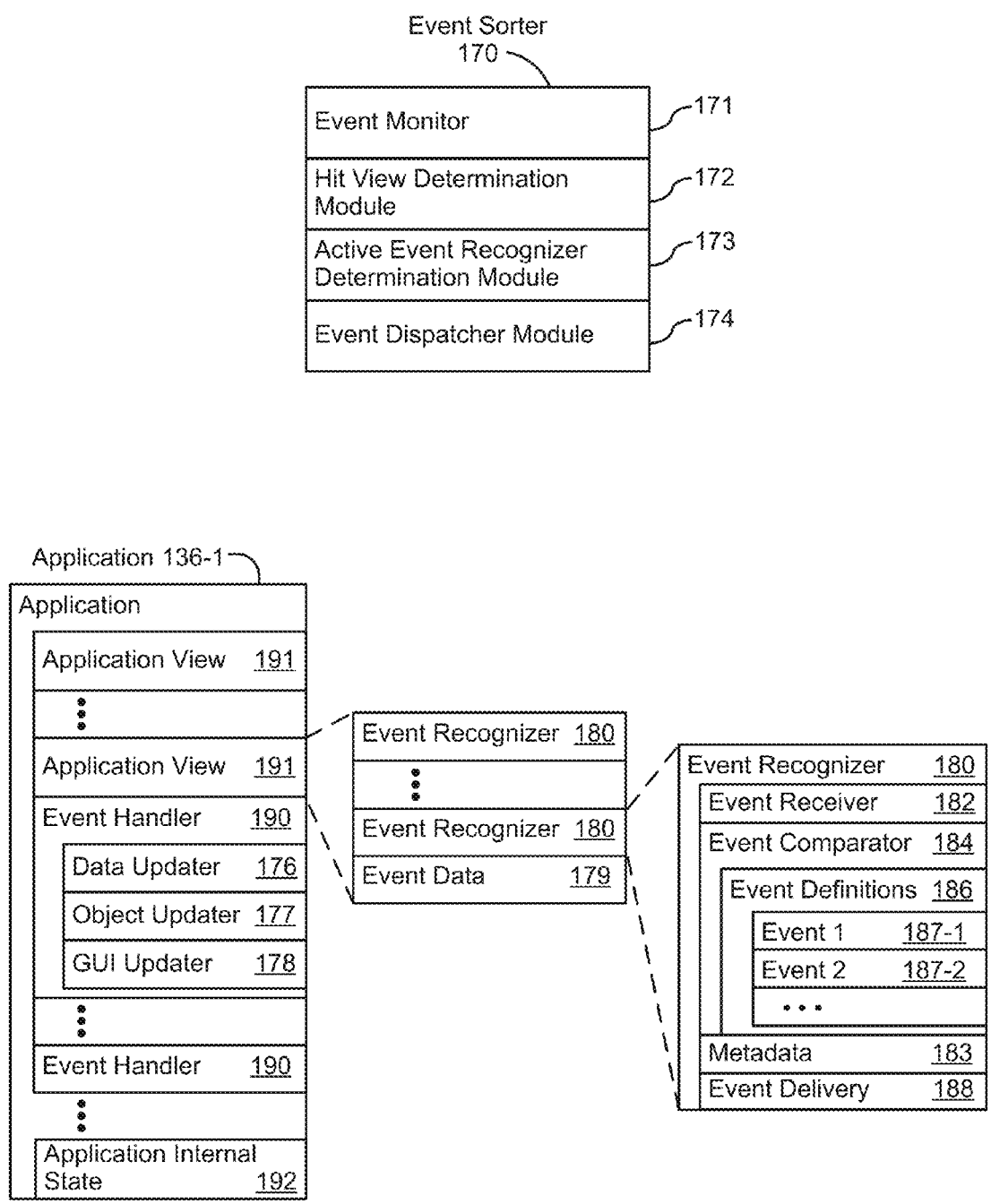
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
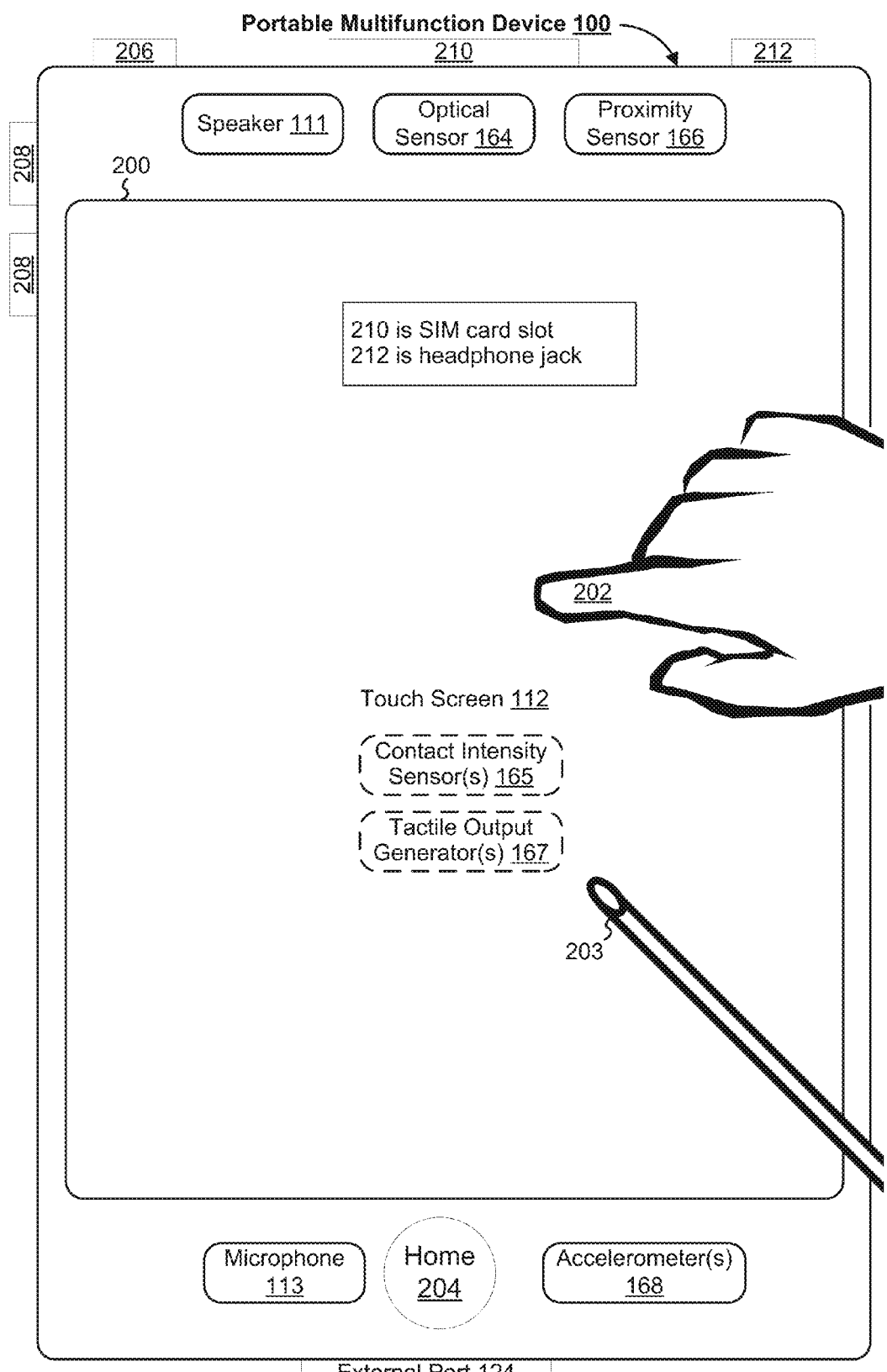
FIG. 2 illustrates a portable multifunction device having a touch screen in accordance with some embodiments.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

Figure 4A:
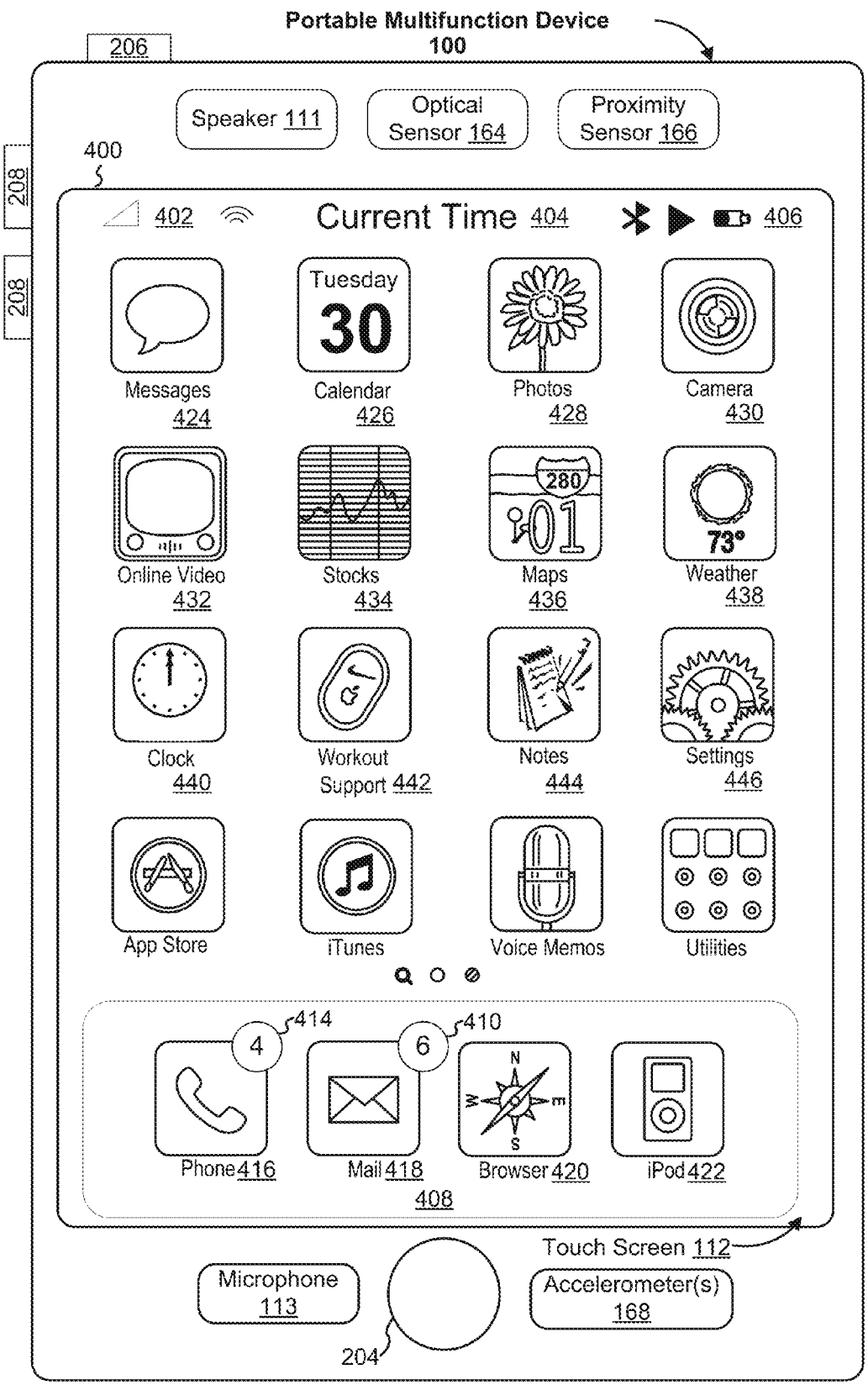
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Map;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, which provides access to settings for device 100 and its various applications 136.

It should be noted that the icon labels illustrated in FIG. 4A are merely exemplary. For example, in some embodiments, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an exemplary user interface on a device (e.g., device 300, FIG. 3) with a touch-sensitive surface 451 (e.g., a tablet or touchpad 355, FIG. 3) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures described herein optionally include various intensity diagrams that show the current intensity of the contact on the touch-sensitive surface relative to one or more intensity thresholds (e.g., a contact detection intensity threshold $IT_0$, a light press intensity threshold $IT_L$, a deep press intensity threshold $IT_D$ (e.g., that is at least initially higher than $I_L$), and/or one or more other intensity thresholds (e.g., an intensity threshold $I_H$ that is lower than $I_L$)). This intensity diagram is typically not part of the displayed user interface, but is provided to aid in the interpretation of the figures. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold $IT_0$ below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some "light press" inputs, the intensity of a contact exceeding a first intensity threshold during the input triggers a first response. In some embodiments, the response of the device to inputs detected by the device depends on criteria that include both the contact intensity during the input and time-based criteria. For example, for some "deep press" inputs, the intensity of a contact exceeding a second intensity threshold during the input, greater than the first intensity threshold for a light press, triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental deep press inputs. As another example, for some "deep press" inputs, there is a reduced-sensitivity time period that occurs after the time at which the first intensity threshold is met. During the reduced-sensitivity time period, the second intensity threshold is increased. This temporary increase in the second intensity threshold also helps to avoid accidental deep press inputs. For other deep press inputs, the response to detection of a deep press input does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

Figure 4C:
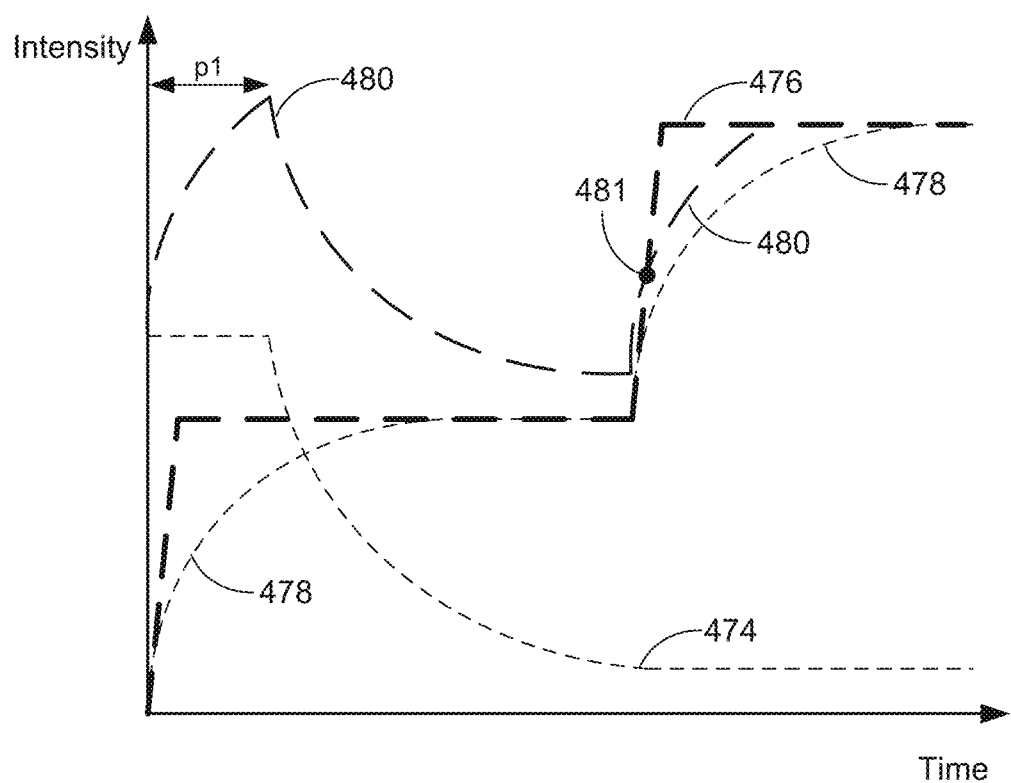
FIGS. 4C-4E illustrate exemplary dynamic intensity thresholds in accordance with some embodiments.

For example, FIG. 4C illustrates a dynamic intensity threshold 480 that changes over time based in part on the intensity of touch input 476 over time. Dynamic intensity threshold 480 is a sum of two components, first component 474 that decays over time after a predefined delay time p1 from when touch input 476 is initially detected, and second component 478 that trails the intensity of touch input 476 over time. The initial high intensity threshold of first component 474 reduces accidental triggering of a "deep press" response, while still allowing an immediate "deep press" response if touch input 476 provides sufficient intensity. Second component 478 reduces unintentional triggering of a "deep press" response by gradual intensity fluctuations of in a touch input. In some embodiments, when touch input 476 satisfies dynamic intensity threshold 480 (e.g., at point 481 in FIG. 4C), the "deep press" response is triggered.

Figure 4D:
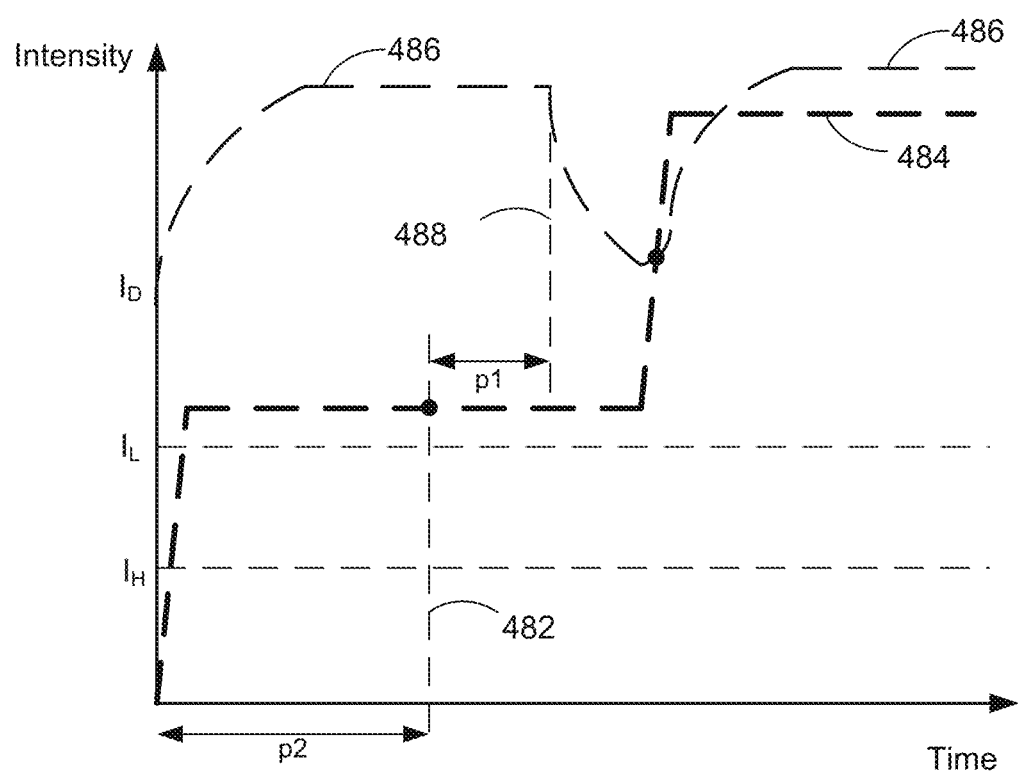

FIG. 4D illustrates another dynamic intensity threshold 486 (e.g., intensity threshold $I_D$). FIG. 4D also illustrates two other intensity thresholds: a first intensity threshold $I_H$ and a second intensity threshold $I_L$. In FIG. 4D, although touch input 484 satisfies the first intensity threshold $I_H$ and the second intensity threshold $I_L$ prior to time p2, no response is provided until delay time p2 has elapsed at time 482. Also in FIG. 4D, dynamic intensity threshold 486 decays over time, with the decay starting at time 488 after a predefined delay time p1 has elapsed from time 482 (when the response associated with the second intensity threshold $I_L$ was triggered). This type of dynamic intensity threshold reduces accidental triggering of a response associated with the dynamic intensity threshold $I_D$ immediately after, or concurrently with, triggering a response associated with a lower intensity threshold, such as the first intensity threshold $I_H$ or the second intensity threshold $I_L$.

Figure 4E:
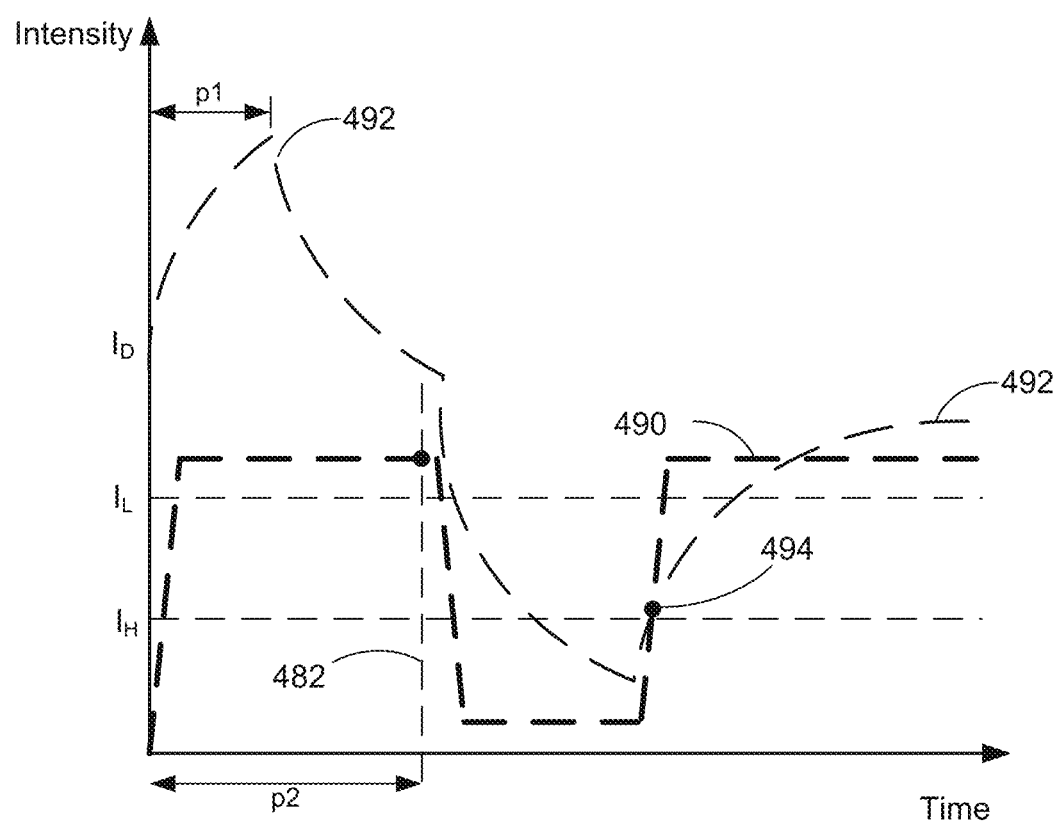

FIG. 4E illustrate yet another dynamic intensity threshold 492 (e.g., intensity threshold $I_D$). In FIG. 4E, a response associated with the intensity threshold $I_L$ is triggered after the delay time p2 has elapsed from when touch input 490 is initially detected. Concurrently, dynamic intensity threshold 492 decays after the predefined delay time p1 has elapsed from when touch input 490 is initially detected. So a decrease in intensity of touch input 490 after triggering the response associated with the intensity threshold $I_L$, followed by an increase in the intensity of touch input 490, without releasing touch input 490, can trigger a response associated with the intensity threshold $I_D$ (e.g., at time 494) even when the intensity of touch input 490 is below another intensity threshold, for example, the intensity threshold $I_L$.

An increase of characteristic intensity of the contact from an intensity below the light press intensity threshold $IT_L$ to an intensity between the light press intensity threshold $IT_L$ and the deep press intensity threshold $IT_D$ is sometimes referred to as a "light press" input. An increase of characteristic intensity of the contact from an intensity below the deep press intensity threshold $IT_D$ to an intensity above the deep press intensity threshold $IT_D$ is sometimes referred to as a "deep press" input. An increase of characteristic intensity of the contact from an intensity below the contact-detection intensity threshold $IT_0$ to an intensity between the contact-detection intensity threshold $IT_0$ and the light press intensity threshold $IT_L$ is sometimes referred to as detecting the contact on the touch-surface. A decrease of characteristic intensity of the contact from an intensity above the contact-detection intensity threshold $IT_0$ to an intensity below the contact-detection intensity threshold $IT_0$ is sometimes referred to as detecting liftoff of the contact from the touch-surface. In some embodiments $IT_0$ is zero. In some embodiments, $IT_0$ is greater than zero. In some illustrations a shaded circle or oval is used to represent intensity of a contact on the touch-sensitive surface. In some illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a first intensity threshold being met and a second intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and optionally one or more sensors to detect intensities of contacts with the touch-sensitive surface.

FIGS. 5A-5K illustrate exemplary user interfaces for capturing a grouped sequence of related images in accordance with some embodiments. The user interfaces in these figures are used to illustrate the processes described below, including the processes in FIGS. 9A-9G, 10A-10M, 11A-11I, 12A-12B, 24A-24E, 25A-25C, 26A-26D, and 27A-27E. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

Figure 5A:
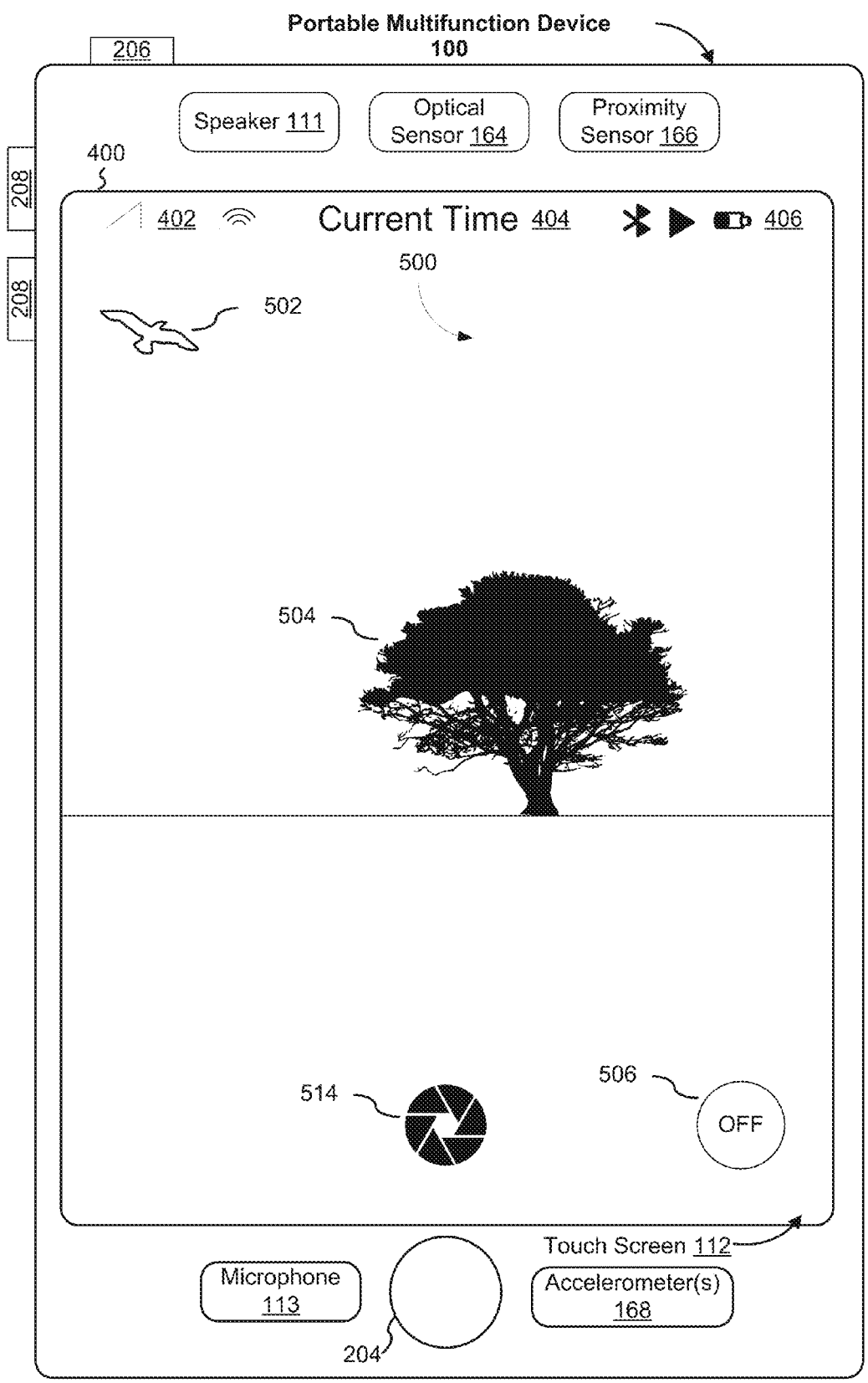
FIGS. 5A-5K illustrate exemplary user interfaces for capturing a grouped sequence of related images in accordance with some embodiments.

FIG. 5A illustrates a media capture user interface 500 for displaying a live preview on touch screen 112. The live preview illustrated in FIG. 5A is a preview of images obtained from a camera in portable multifunction device 100 (e.g., camera module 143 together with optical sensor 164). The live preview on media capture user interface 500 displays images obtained from the camera in real time or near-real-time (e.g., within an amount of processing time needed by portable multifunction device 100 to produce the displayed image). Thus, in the example shown in FIG. 5A, the user is looking at a scene with a seagull 502 flying in the sky over a tree 504 and portable multifunction device 100 is reproducing the scene in real time or near-real time on touch screen 112. In some embodiments, the live preview displays images at a first resolution (e.g., that is lower than an upper resolution limit of the camera).

In this example, portable multifunction device 100, while in the live preview, is configured to be in an enhanced media acquisition mode (e.g., in which portable multifunction device 100 is configured to obtain enhanced photos) or another media acquisition mode (e.g., in which portable multifunction device 100 is configure to capture still images, video, burst images, or any other type of image). In some embodiments, media capture user interface 500 includes an affordance 506 for enabling the enhanced media acquisition mode (e.g., turning/toggling enhance media acquisition mode on/off). In some embodiments, media capture user interface 500 includes a visual indication that the enhanced media acquisition mode is off. For example, in FIG. 5A, affordance 506 displays the word "OFF."

In some embodiments, when the enhanced media acquisition mode is on, portable multifunction device 100 provides a visual indication that the enhanced media acquisition mode is on (e.g., to indicate that image and/or audio data is being captured while media capture user interface 500 is displayed). For example, as shown in FIGS. 5C-5H, when the enhanced media acquisition mode is on, affordance 506 is animated with an animation showing a clock with a dial 508 that progresses around the clock.

Figure 5B:
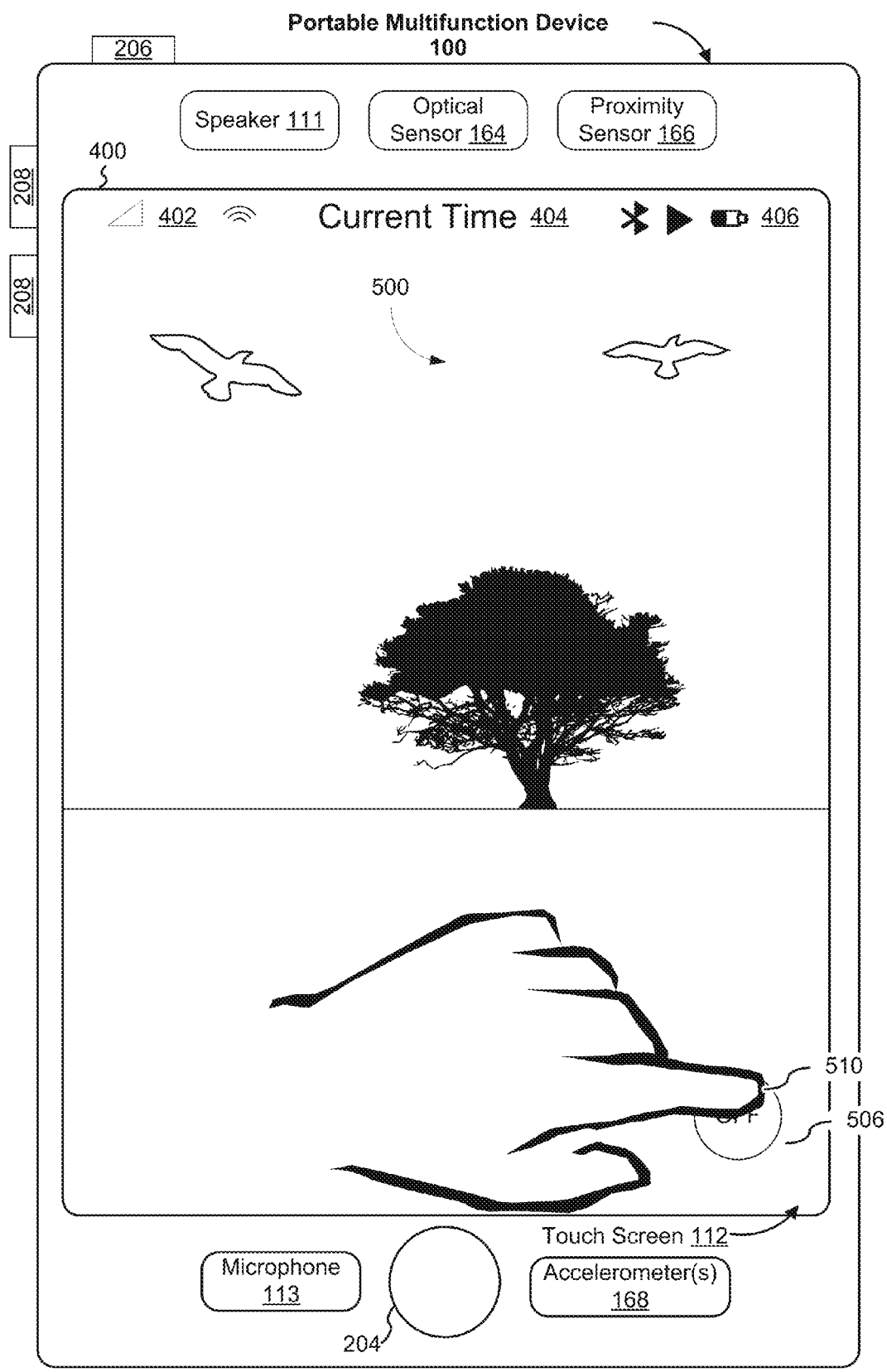
Figure 5C:
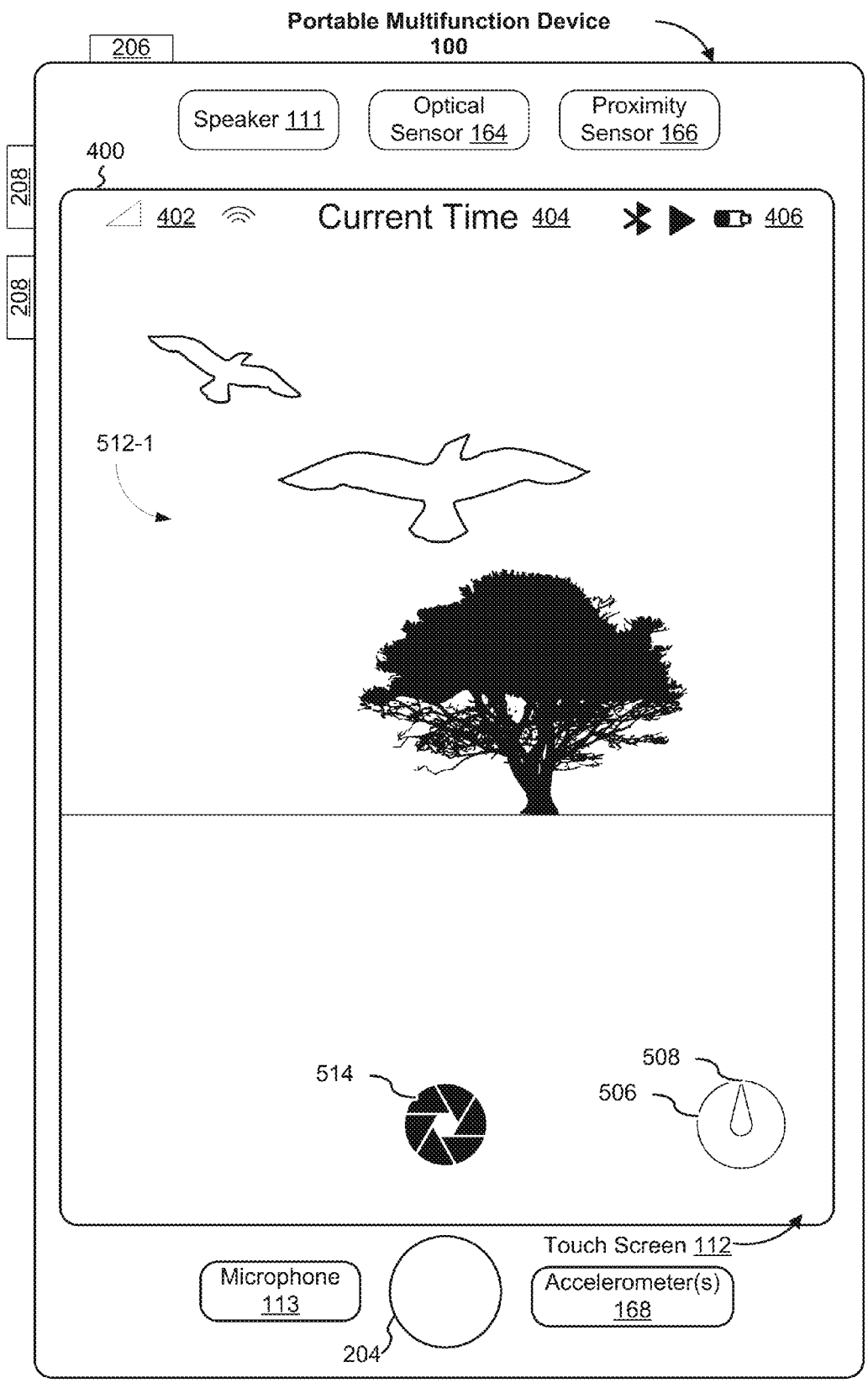
Figure 5D:
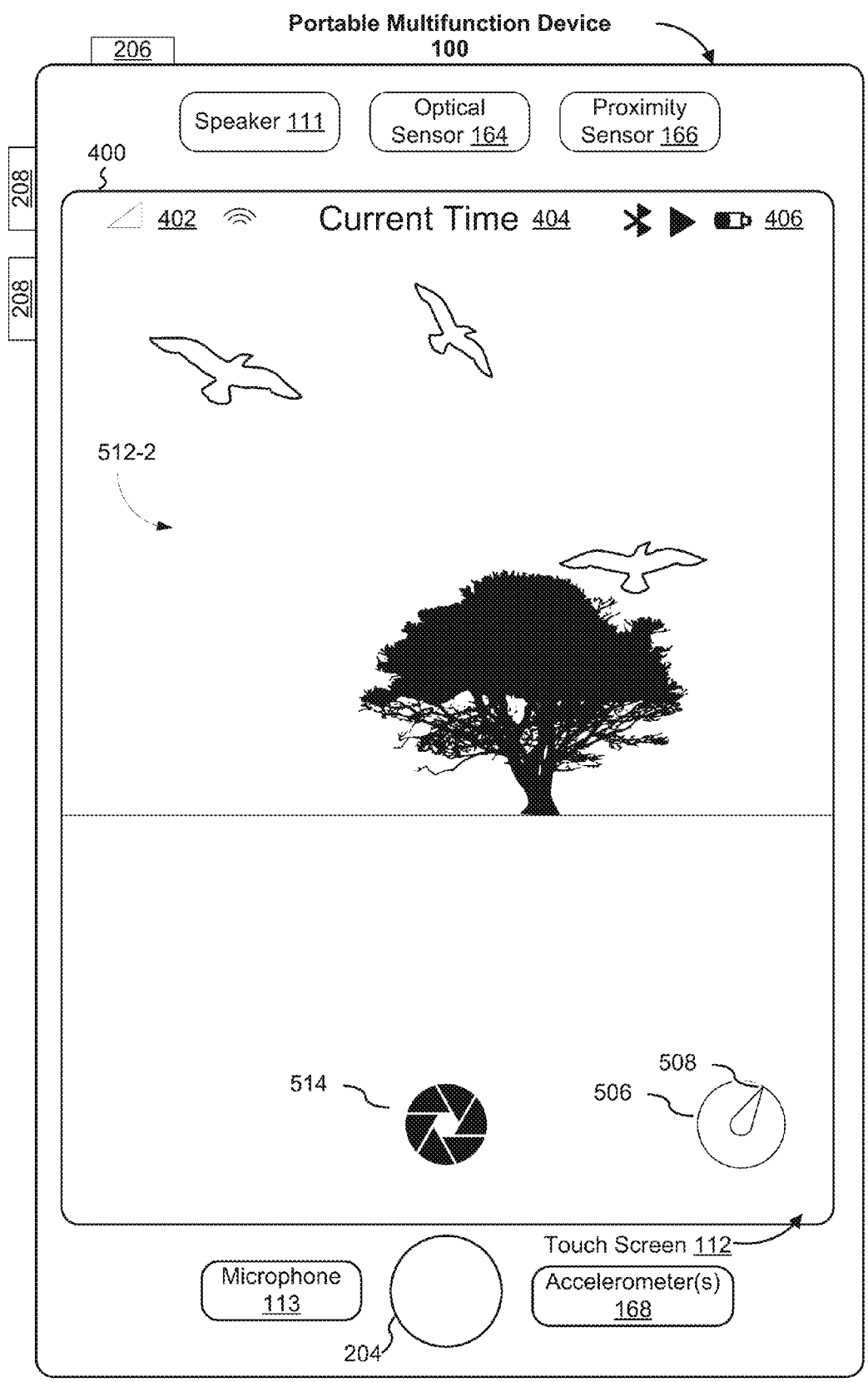
Figure 5E:
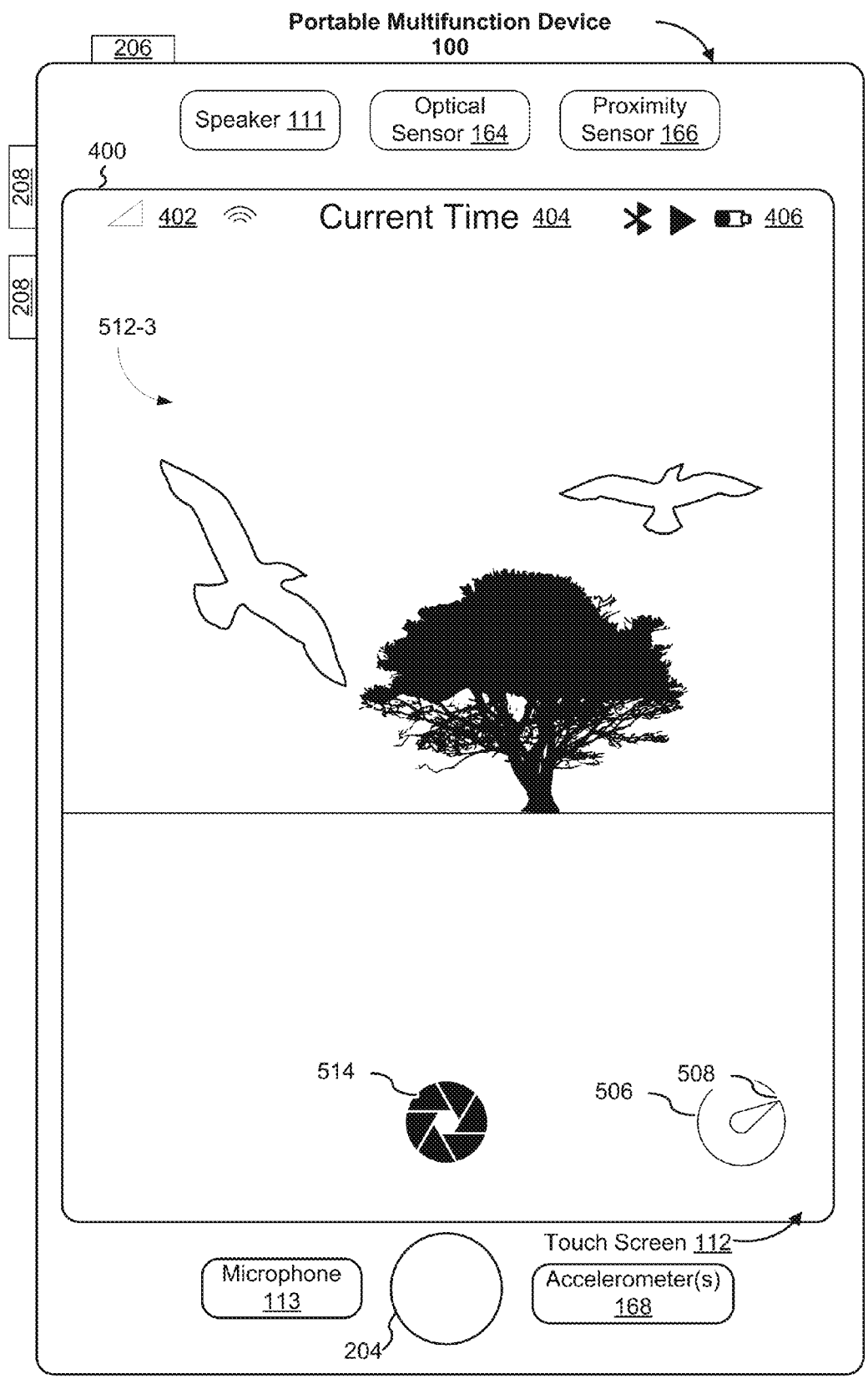

In some embodiments, as shown in FIG. 5B, portable multifunction device 100 detects selection of affordance 506 (e.g., detects tap gesture 510 on affordance 506) while the enhanced media acquisition mode is disabled. In response, portable multifunction device 100 enables the enhanced media acquisition mode (as illustrated in FIGS. 5C-5H by the animation of affordance 506).

Portable multifunction device 100 captures media (e.g., images and/or audio) when the enhanced media acquisition mode is on. For example, because the enhanced video mode is on in FIGS. 5C-5E, image 512-1 (FIG. 5C), image 512-2 (FIG. 5D), and image 512-3 (FIG. 5E) are captured (e.g., stored in persistent memory). In some embodiments, audio corresponding to the images is also captured (e.g., with microphone 113) and associated with the images (e.g., for subsequent playback with the images, as shown in FIGS. 6E-6I). In some embodiments, other information (e.g., metadata, such as time, location, or event data) is obtained and associated with the captured images (e.g., for subsequent display, as shown in FIGS. 6J-6M).

Figure 5F:
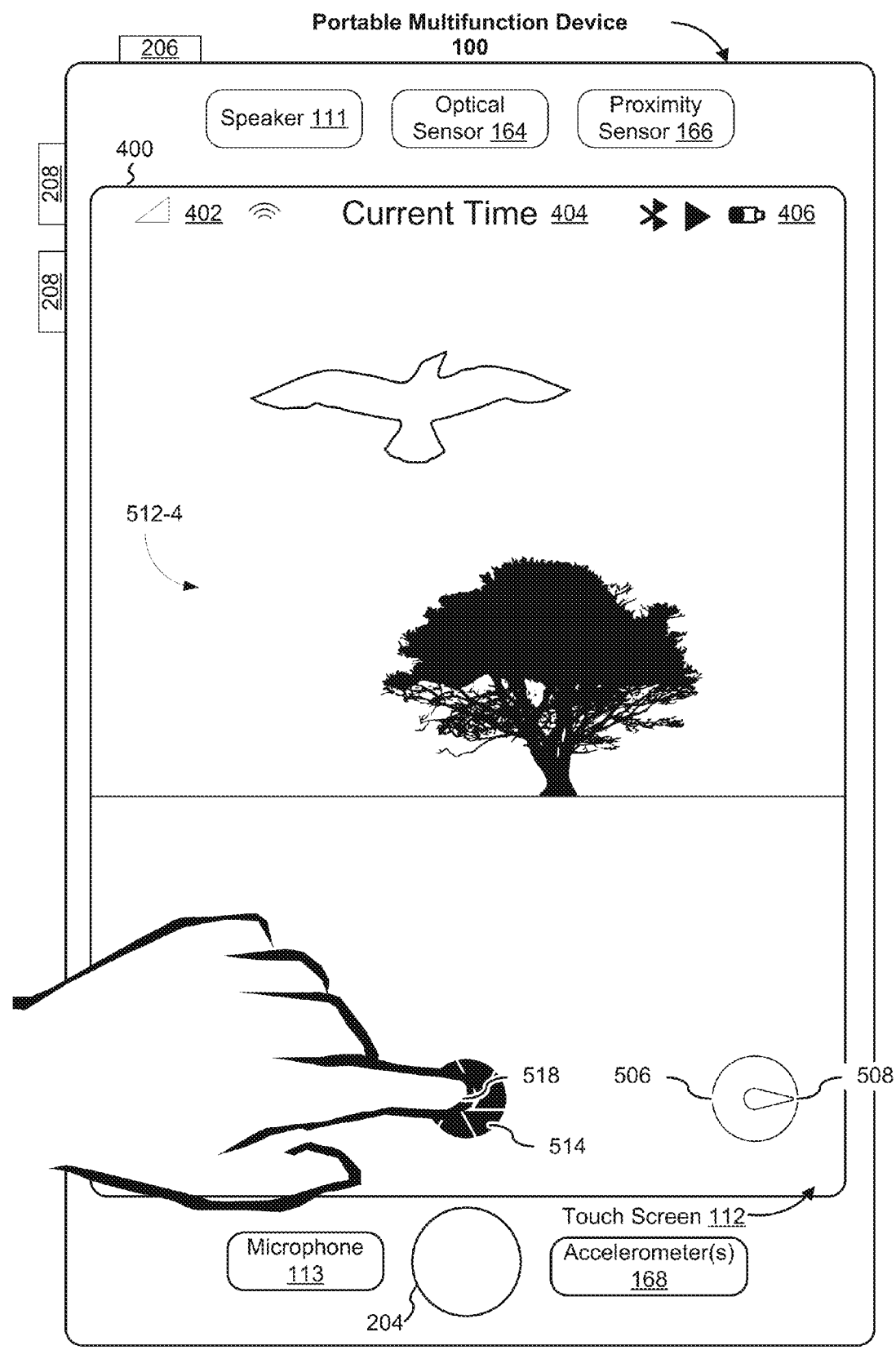

Media capture user interface 500 includes a shutter button 514 (illustrated as a shutter release icon). As shown in FIG. 5F, media capture user interface 500 is configured to detect activation of shutter button 514 (e.g., through tap gesture 518). In response to detecting activation of the shutter button 514, portable multifunction device 100 groups a plurality of images 512 acquired by the camera in temporal proximity to the activation of shutter button 514 into a sequence of images (e.g., a so-called "enhanced photo"). The enhanced photo includes some images 512 that were taken before tap gesture 518 (e.g., at least some of image 512-1, image 512-2, and image 512-3, which as noted above are stored in persistent memory), a representative image (e.g., image 512-4, FIG. 5F, that corresponds to the shutter activation), and some images taken after tap gesture 518 (e.g., image 512-5, FIG. 5G, image 512-6, FIG. 5H).

Figure 6A:
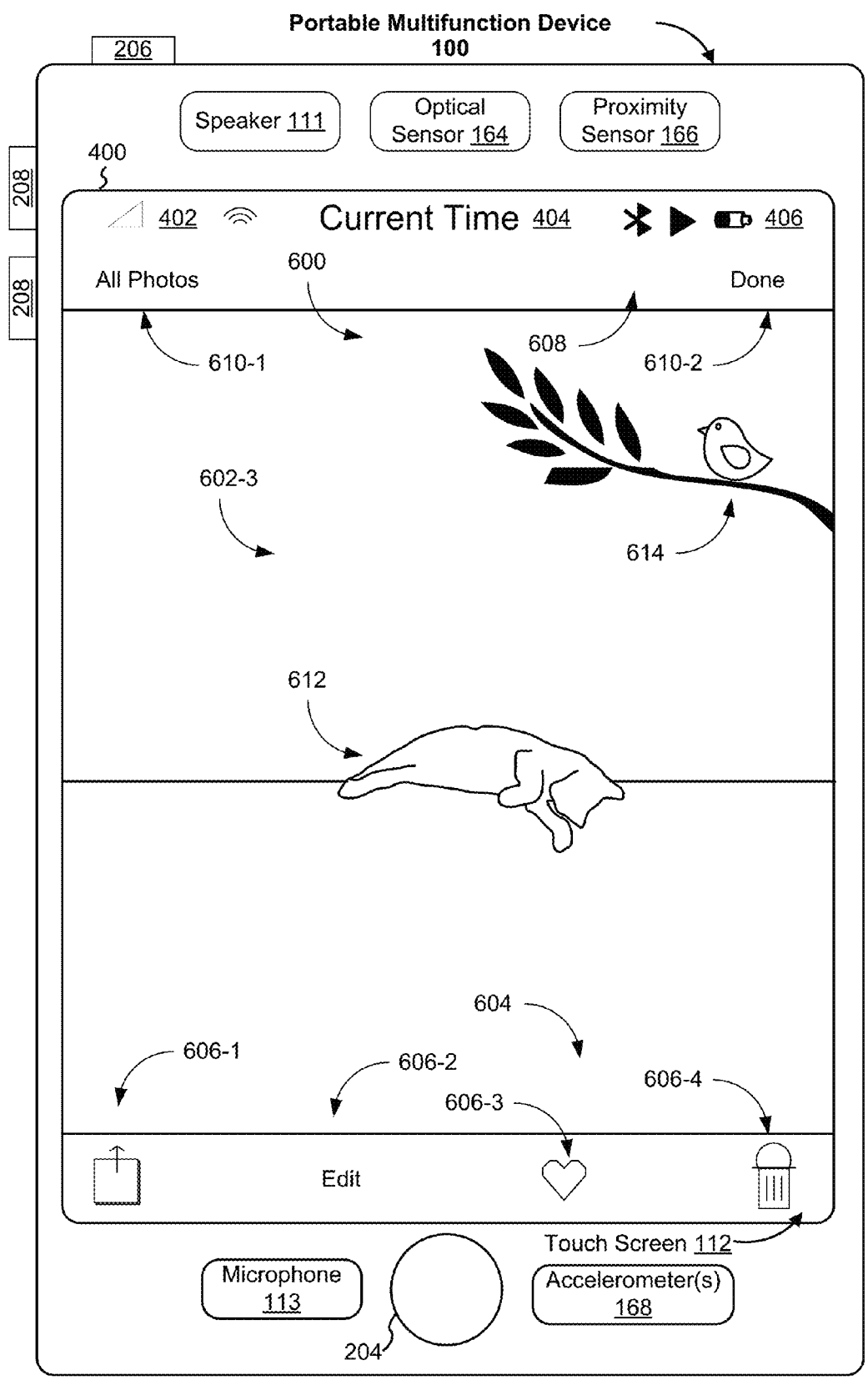
FIGS. 6A-6FF illustrate exemplary user interfaces for displaying (or replaying) a grouped sequence of related images in accordance with some embodiments.

In some embodiments, the representative image is analogous to a single image captured in the still image mode of a conventional digital camera when its shutter button is activated. In some embodiments, representative image 512-4 corresponds to an image that was acquired at the time shutter button 514 was activated by tap gesture 518. In some embodiments, representative image 512-4 corresponds to an image that was acquired shortly after detecting activation of the shutter button 514, at a time that takes into account shutter lag (the time delay between detecting activation of the shutter button and capturing/storing the representative image). In some embodiments, representative image 512-4 acquired by the camera is used to represent the sequence of images, for example in an image presentation mode (as shown in FIG. 6A).

As noted above, in some embodiments, the live preview displays images at a first resolution. In some embodiments, the sequence of images 512 includes images, at the first resolution, that were displayed in the live preview, while representative image 512-4 acquired by the camera has a second resolution that is higher than the first resolution. For example, as shown in FIG. 5I, the sequence of images 512 includes (in chronological order): image 512-2; image 512-3; image 512-4; image 512-5; and image 512-6, where image 512-4 is the representative image. In some embodiments, representative image 512-4 is stored at a higher resolution than image 512-2, image 512-3, image 512-5, or image 512-6.

Figure 5G:
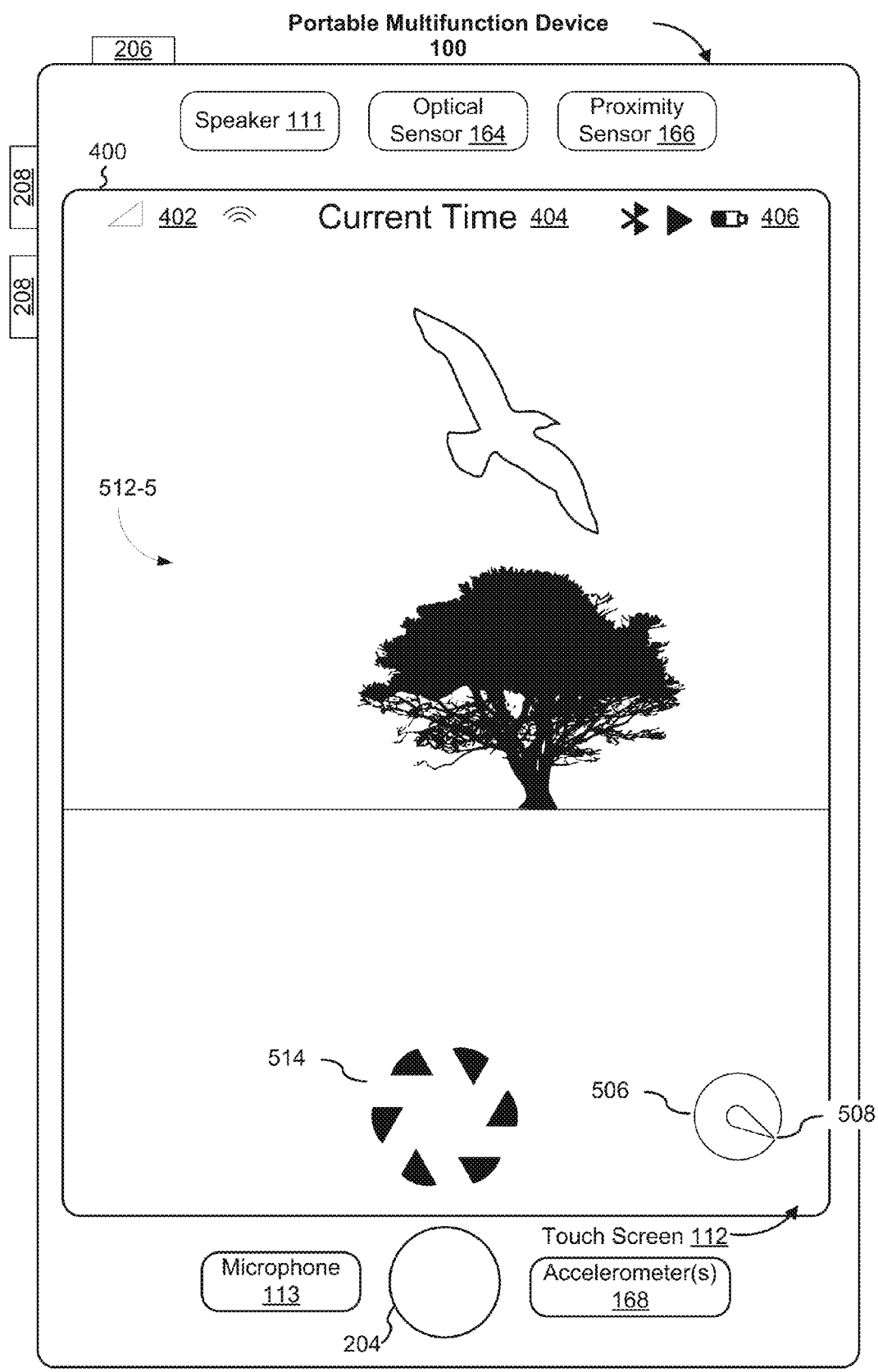
Figure 5H:
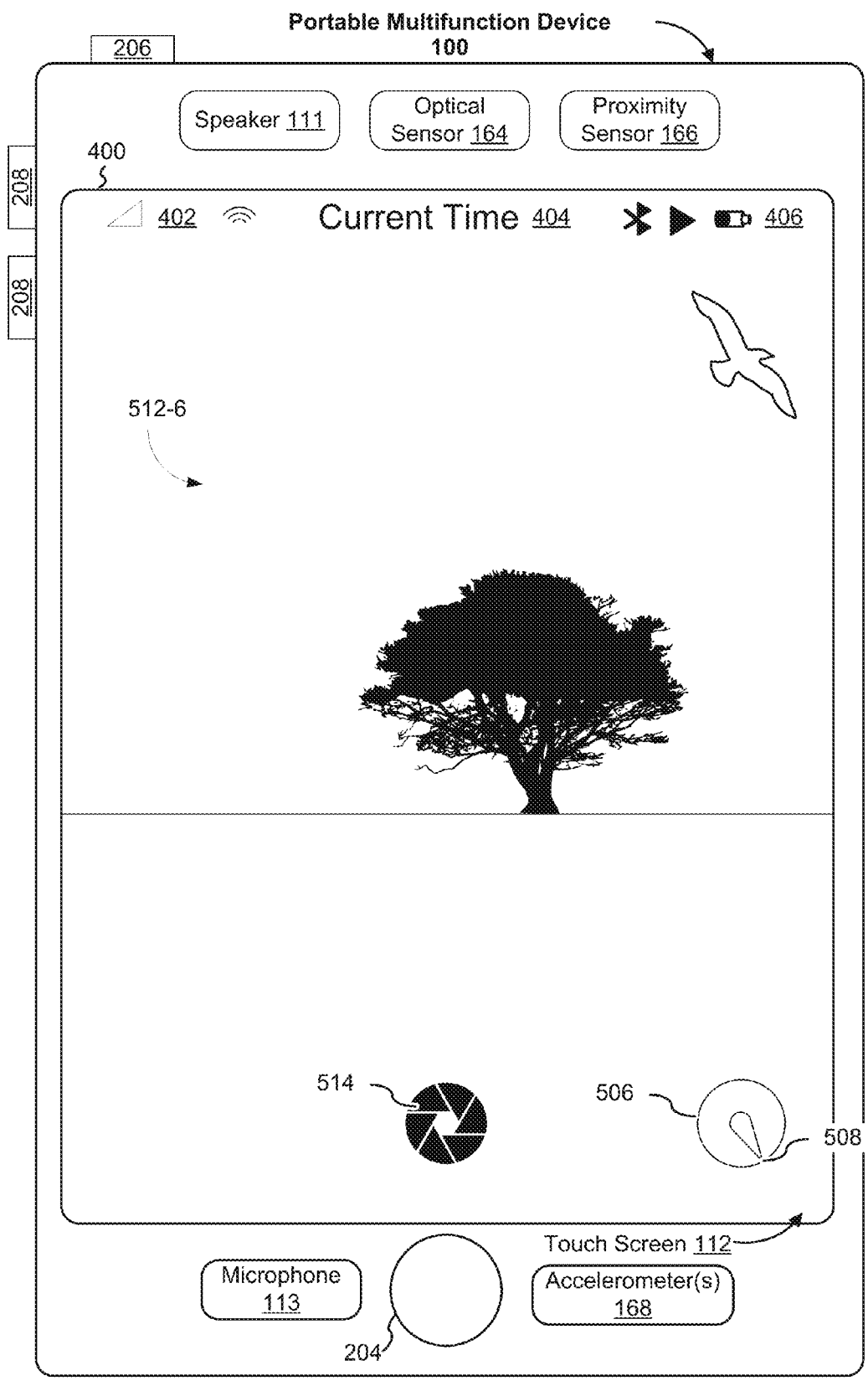
Figure 5I:
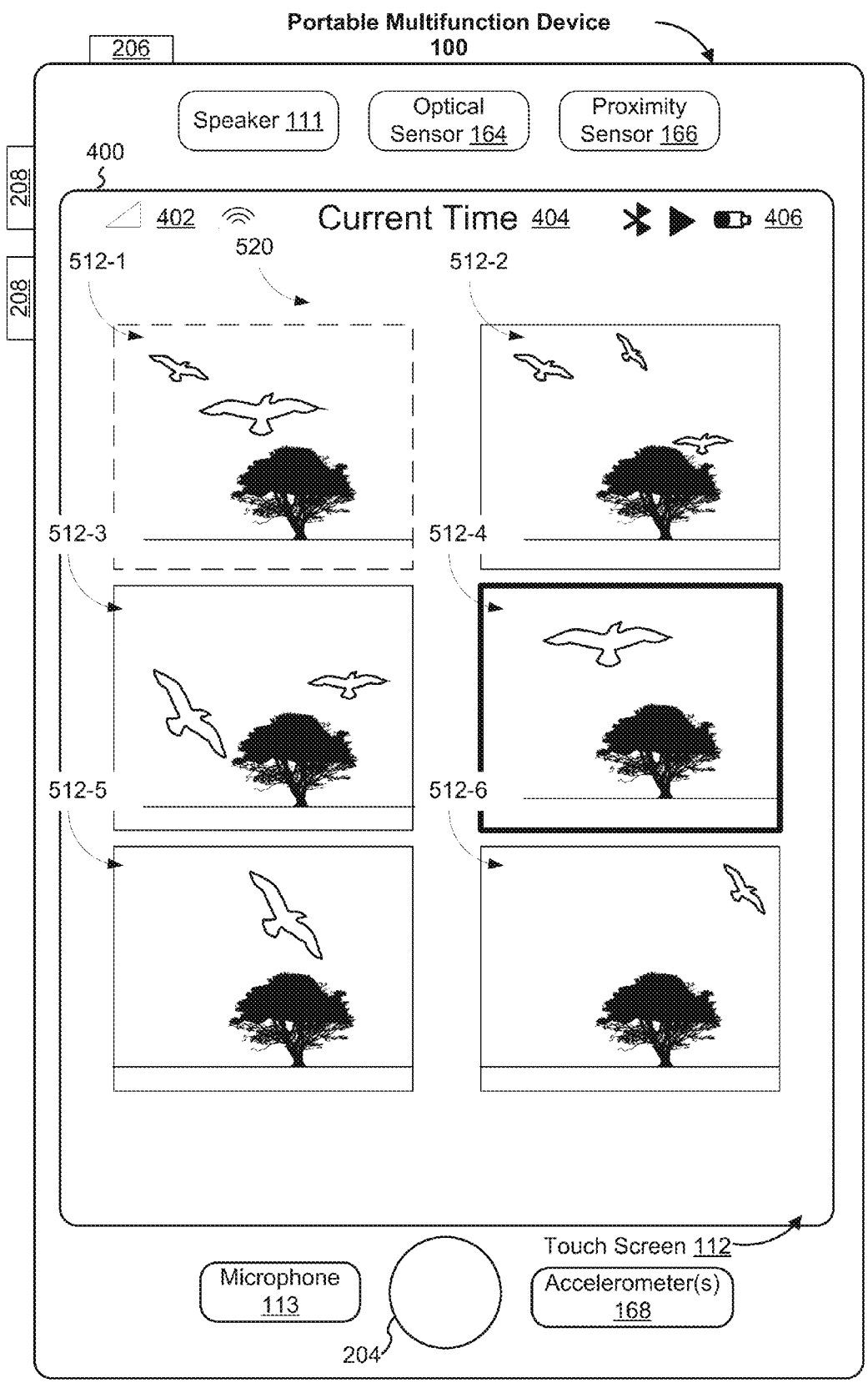

As shown in FIGS. 5F-5H, in some embodiments, after activation of shutter button 514, media capture user interface 500 displays an animation while it captures the remaining images that will be included in the grouped sequence of images (e.g., the animation is displayed while portable multifunction device 100 captures representative image 512-4 and the images acquired after representative image 512-4). In FIGS. 5F-5H, media capture user interface 500 displays an animation of shutter button 514 breaking apart and flying back together (e.g., so as to provide the user with an indication that images and/or audio are still being captured). In some embodiments, the animation is a looping animation that can be seamlessly extended if shutter button 514 is held down or activated again before the camera is finished acquiring images for the sequence of images.

In some embodiments, upon completion of capturing the sequence of images, portable multifunction device 100 returns to the functionality described with respect to FIG. 5A, so that a second sequence of images can be obtained by the user in an analogous manner to capture of the sequence of images described above.

Figure 5J:
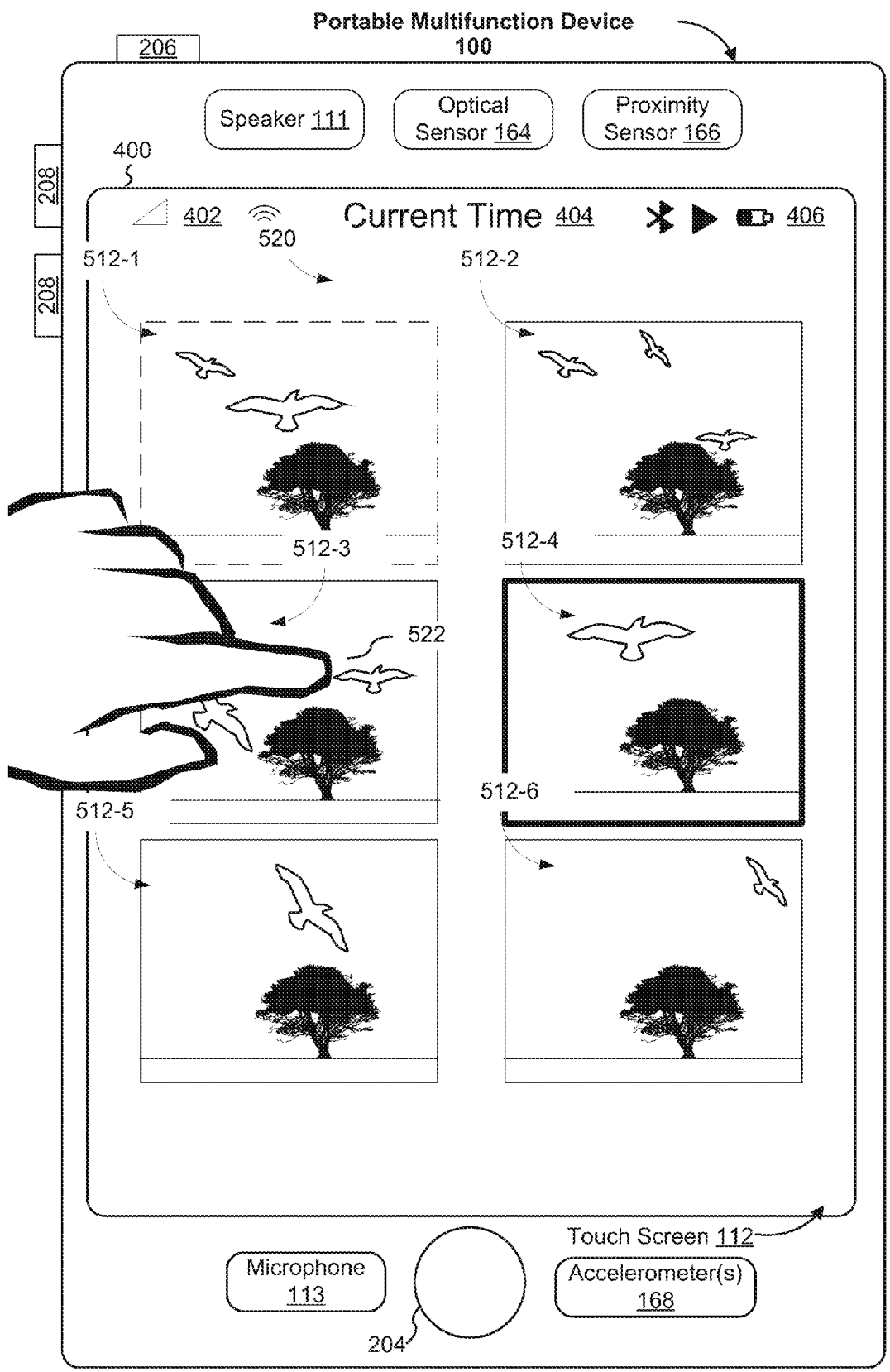
Figure 5K:
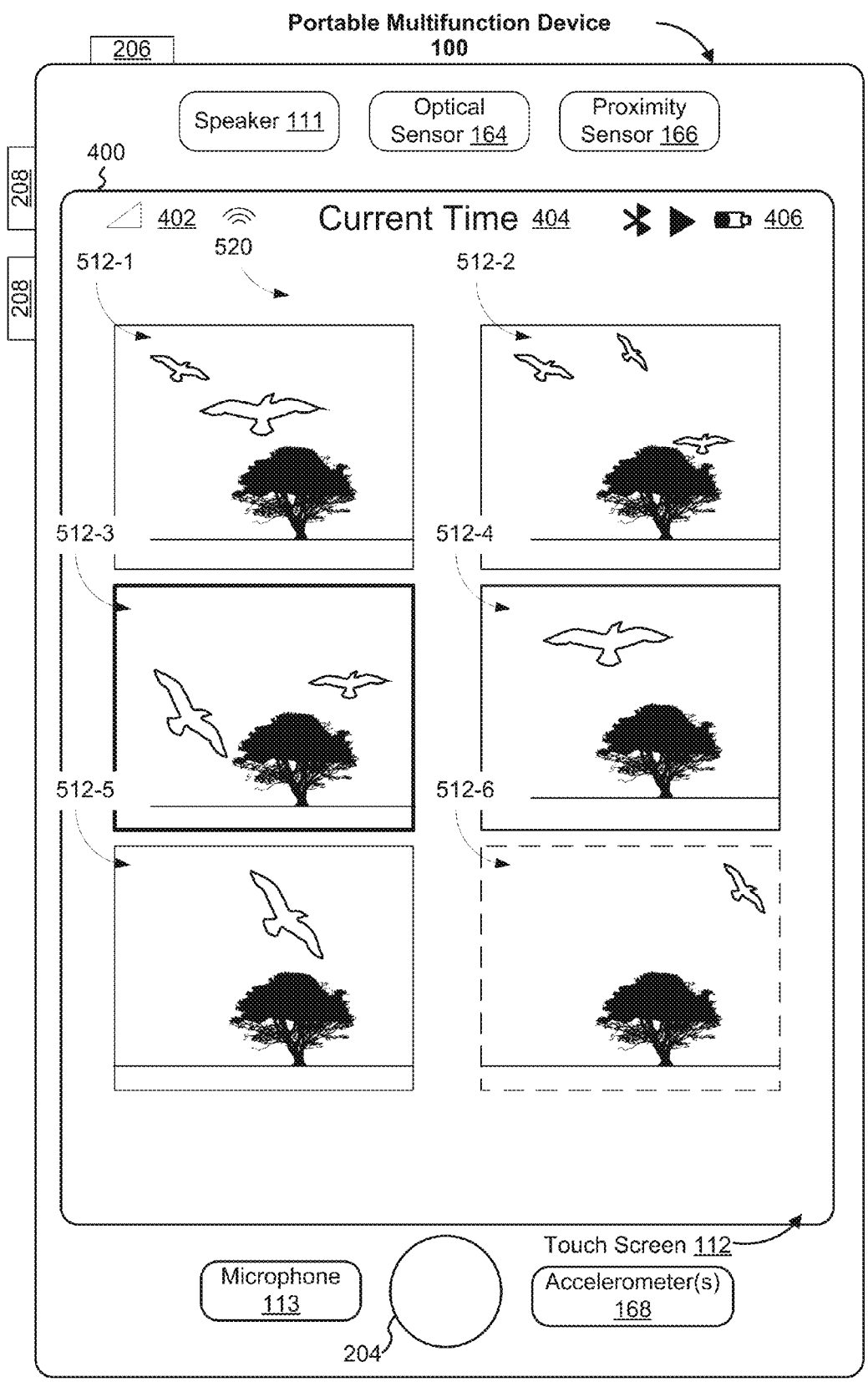

As shown in FIGS. 5I-5K, in some embodiments, portable multifunction device 100 displays a second user interface 520 for editing and/or configuring the sequence of images (e.g., second user interface 520 is a user interface in an image sequence editing mode). In FIG. 5I, the images 512 that are included in the sequence of images are those with a solid boundary: image 512-2; image 512-3; image 512-4; image 512-5; and image 512-6, where image 512-4 is the representative image. Thus, image 512-2 is the initial image in the sequence of images and there is one image (image 512-3) between initial image 512-2 and representative image 512-4 (although, in some embodiments, there are a greater integer number of images between the initial image and the representative image, such at 5, 10, or 30 images). Image 512-6 is the final image in the sequence of images and there is one image (image 512-5) between representative image 512-4 and final image 512-6 (although, in some embodiments, there are a greater integer number of images between the representative image and the final image, such at 5, 10, or 30 images, and this number need not be the same as the number of images between the initial image and the representative image). The bold border surrounding image 512-4 in FIG. 5I indicates that it is the representative image.

As shown in FIG. 5J, second user interface 520 is configured to receive a request to change the representative image in the sequence of images (e.g., receive a touch gesture 522 over an image that is not the current representative image 512-4). As shown in FIG. 5K, the device responds to touch gesture 522 by changing the representative image to image 512-3 (which has the bold border in FIG. 5K, signifying that it is the new representative image). In some embodiments, the number of images between the initial image and the representative image as well as the number of images between the representative image and the final image are fixed, so that portable multifunction device 100 changes the sequence of images by adding images to the sequence of images at one end and removing (e.g., deleting, or not including) images at the other end. For example, in FIG. 5K, image 512-1 has been added to the sequence of images to keep the number of images between the initial image and the representative image fixed, while image 512-6 has been removed from the sequence of images to keep the number of images between the representative image and the final image fixed.

FIGS. 6A-6FF illustrate exemplary user interfaces for displaying (or replaying) a grouped sequence of related images, sometimes referred to as an enhanced photograph, in accordance with some embodiments. The user interfaces in these figures are used to illustrate the processes described below, including the processes in FIGS. 9A-9G, 10A-10M, 11A-11I, 12A-12B, 24A-24E, 25A-25C, 26A-26D, and 27A-27E. Although the examples which follow will be given with reference to inputs on a touch-screen display (where the touch-sensitive surface and the display are combined, as shown on portable multifunction device 100), in some embodiments, the device detects inputs on a touch-sensitive surface 451 that is separate from the display 450, as shown in FIG. 4B.

FIG. 6A illustrates a user interface 600. Portable multifunction device 100 displays, in user interface 600, a representative image 602-3 in a grouped sequence of images 602. In some embodiments, user interface 600 is a user interface in an image presentation mode. As explained below, the sequence of images 602 includes the representative image 602-3, one or more images acquired by the camera after acquiring the representative image (e.g., image 602-4, FIG. 6C, and image 602-5, FIG. 6D), as well as one or more images acquired by the camera before acquiring the representative image (e.g., image 602-1, FIG. 6E, and image 602-2, FIG. 6F).

In some embodiments, user interface 600 is a user interface in an image management application (e.g., Photos from Apple Inc. of Cupertino, Calif.). To that end, in some embodiments, the camera that took the sequence of images 602 is part of portable multifunction device 100 (e.g., the camera comprises optical sensors 164 conjunction with imaging module 143, FIG. 1A). In some embodiments, the sequence of images 602 was taken by a camera that is not part of portable multifunction device 100 (e.g., the sequence of images 602 was transferred to portable multifunction device 100 after being taken with a camera on another device). In some embodiments, the sequence of images 602 was obtained in response to detecting activation of a shutter button at a first time, as described herein with respect to FIGS. 5A-5K and method 900 and/or FIGS. 22A-22D and method 2600. In some embodiments, the representative image 602-3 corresponds to the representative image acquired by the camera, as described herein with respect to FIGS. 5A-5K and method 900 and/or FIGS. 22A-22D and method 2600.

In some embodiments, portable multifunction device 100 stores a plurality of grouped sequences of images, some of which were acquired using portable multifunction device 100 and some of which were transferred to portable multifunction device 100 after being taken with a camera on a different device. For example, in some circumstances, a user may obtain (e.g., take, capture) sequences of images, as described with reference to methods 900/2600, on a plurality of devices (e.g., a tablet, a laptop, and/or a digital camera, all in addition to portable multifunction device 100) and synchronize or otherwise transfer the sequences of images onto portable multifunction device 100.

In some embodiments, user interface 600 is a user interface in a messaging application (e.g., Messages from Apple Inc. of Cupertino, Calif.). In some circumstance, a user may have obtained (e.g., taken, captured) a respective sequence of images on her own portable multifunction device 100 and also have received a different sequence of images from a different user (e.g., in a messaging application). Thus, in some embodiments, the sequence of images 602 is a respective sequence of images in a plurality of sequences of images stored on portable multifunction device 100 that includes at least one sequence of images obtained using a camera on portable multifunction device 100 and at least one sequence of images that was obtained using a camera on a different device, distinct from portable multifunction device 100.

In some embodiments, representative image 602-3 is displayed in user interface 600 when portable multifunction device 100 is in a collection view mode.

User interface 600 optionally includes one more toolbars. For example, as shown, user interface 600 includes an operations toolbar 604 that includes a plurality of affordances 606 (e.g., send affordance 606-1 that allows the user to send the sequence of images 602 to other users using e-mail, messaging, or other applications; edit affordance 606-2 that brings up a user interface for editing the sequence of images 602; a favorites affordance 606-3 through which the user may indicate that the sequence of images 602 is one of her favorites; and delete affordance 606-4 that allows the user to delete sequence of images 602). As another example, user interface 600 includes a navigation toolbar 608 that includes another plurality of affordances (e.g., all photos affordance 610-1 that, when activated, navigates to a user interface for navigating the user's photos; and "done" affordance 610-2 that, when activated, navigates to a different user interface, such as a user interface for obtaining a photo).

Figure 6B:
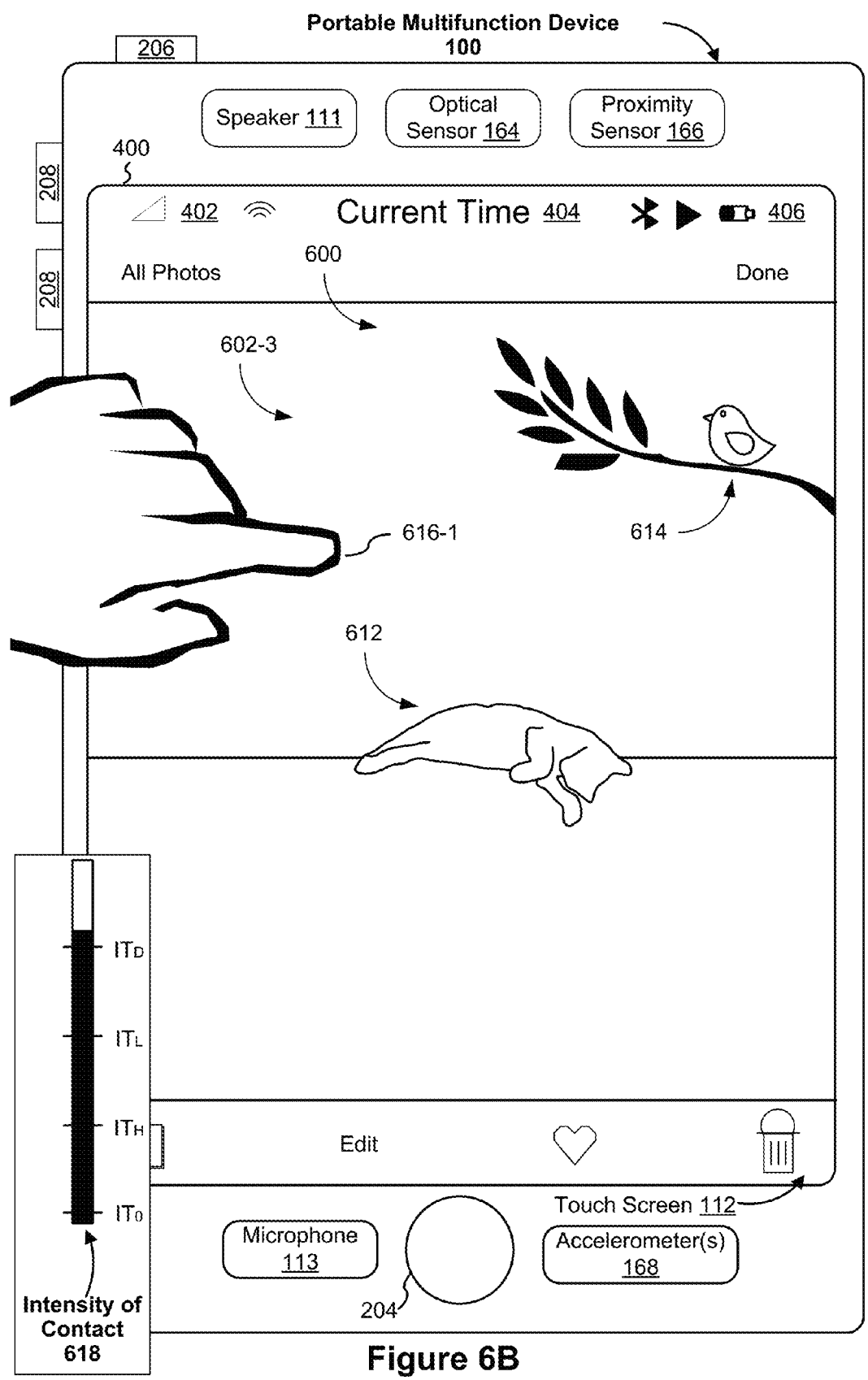
Figure 6C:
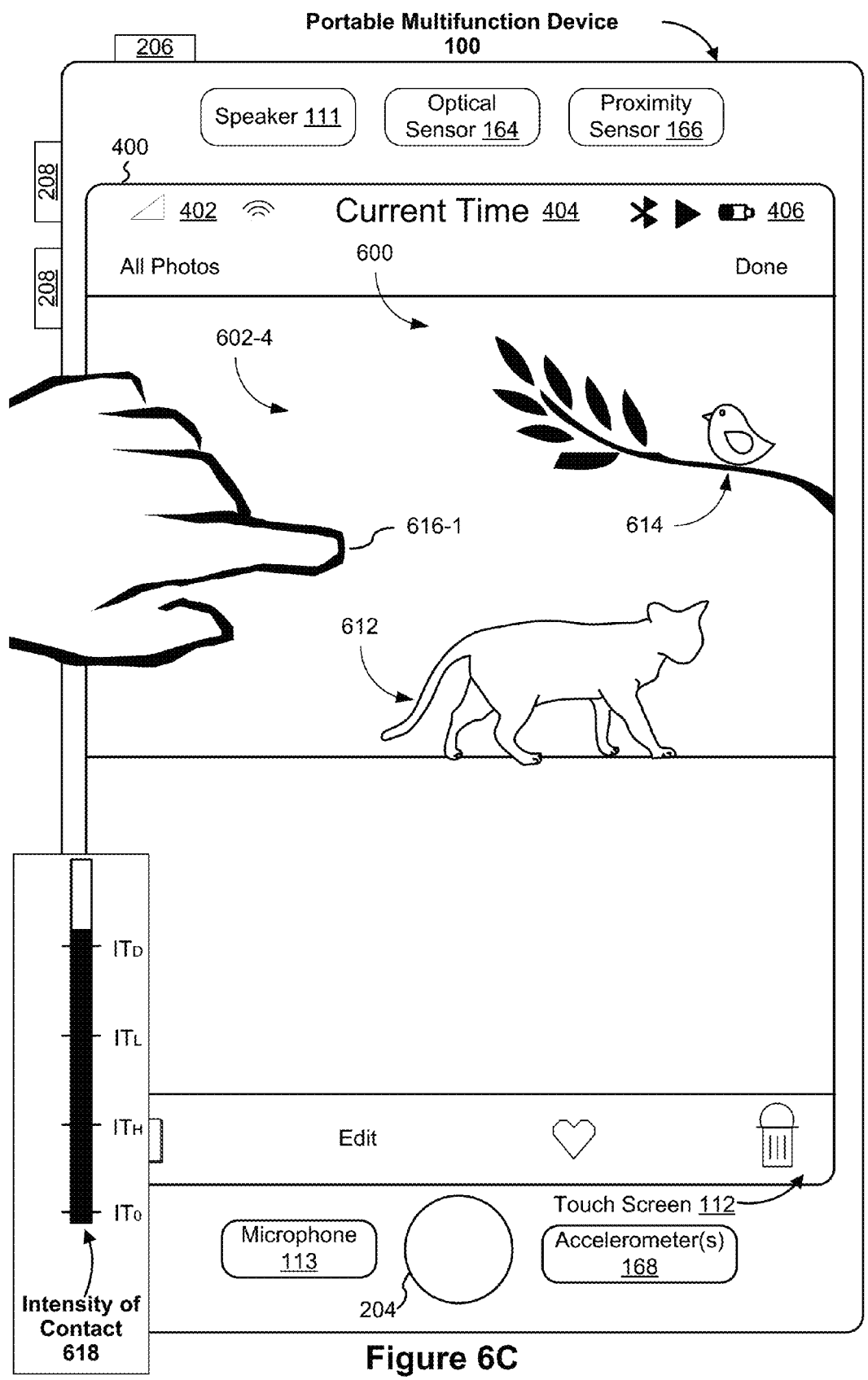
Figure 6D:
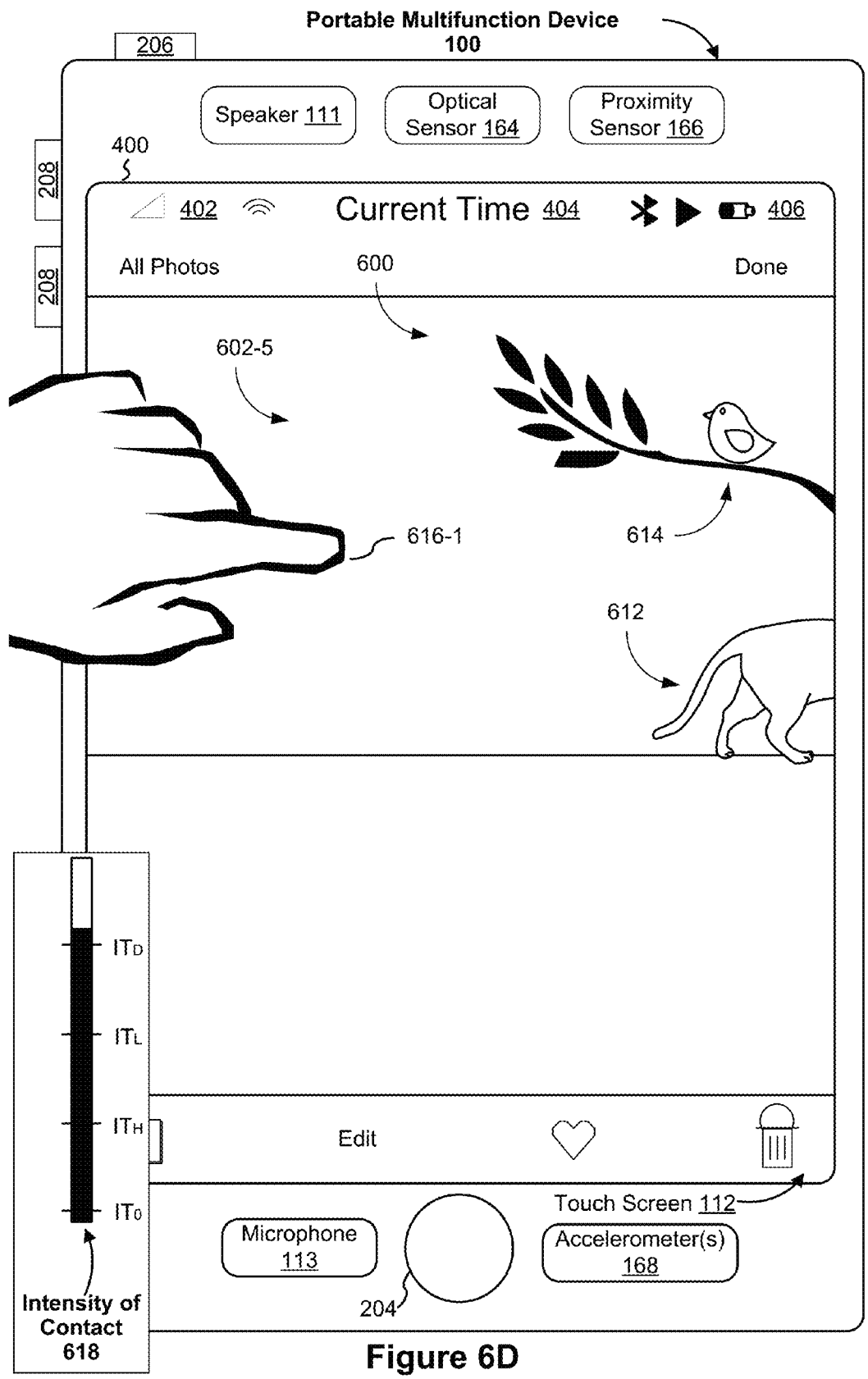
Figure 6E:
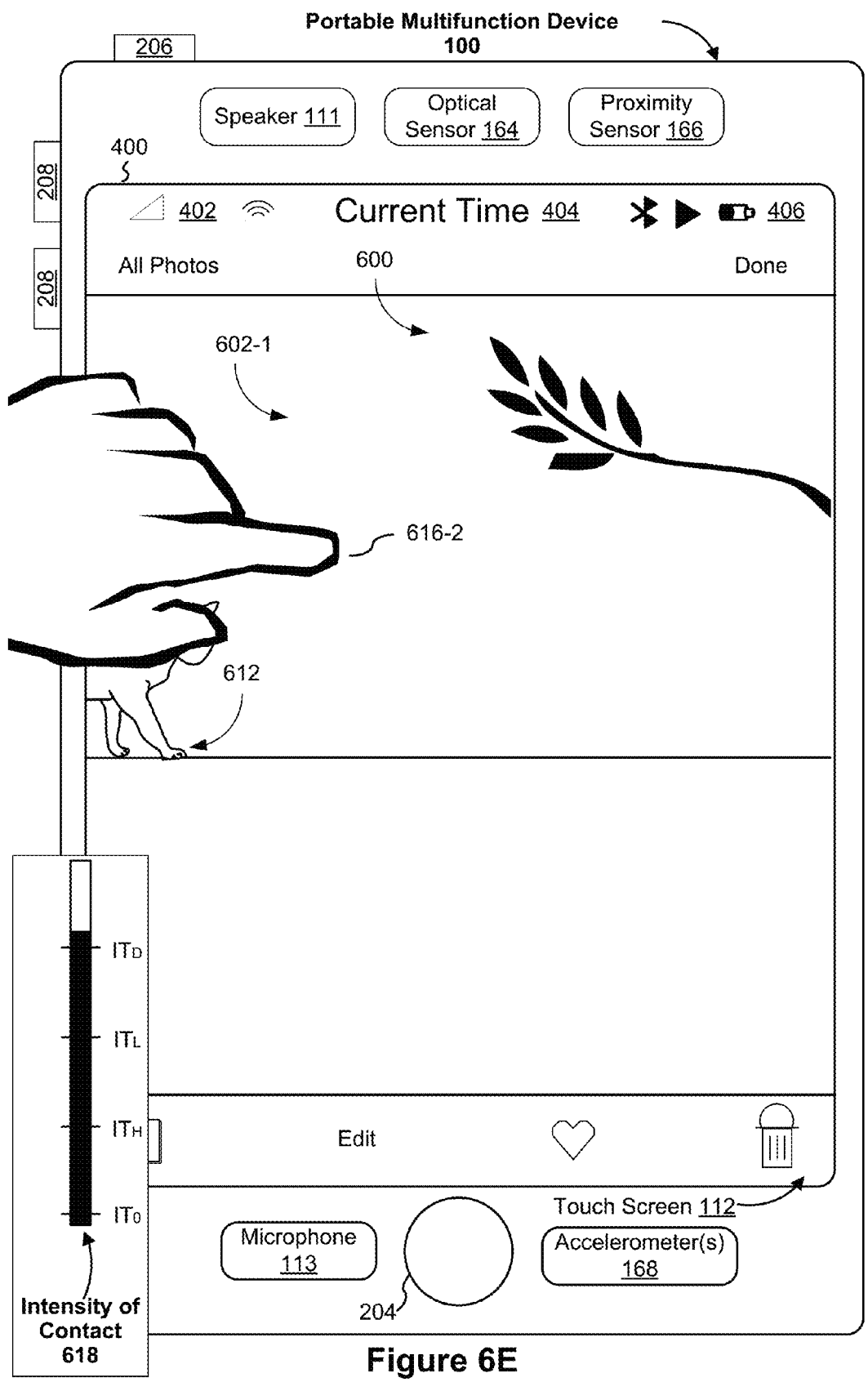
Figure 6F:
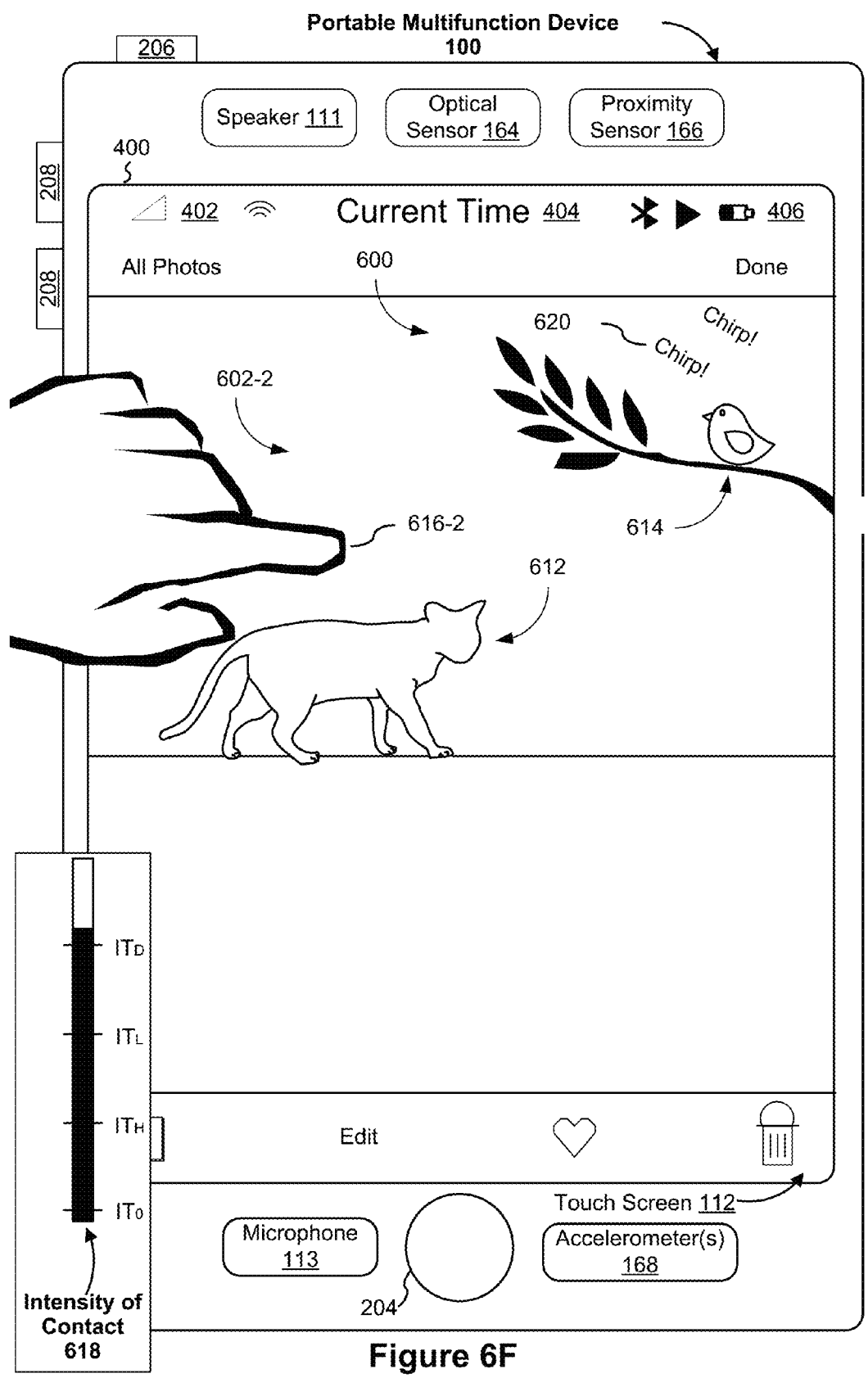
Figure 6G:
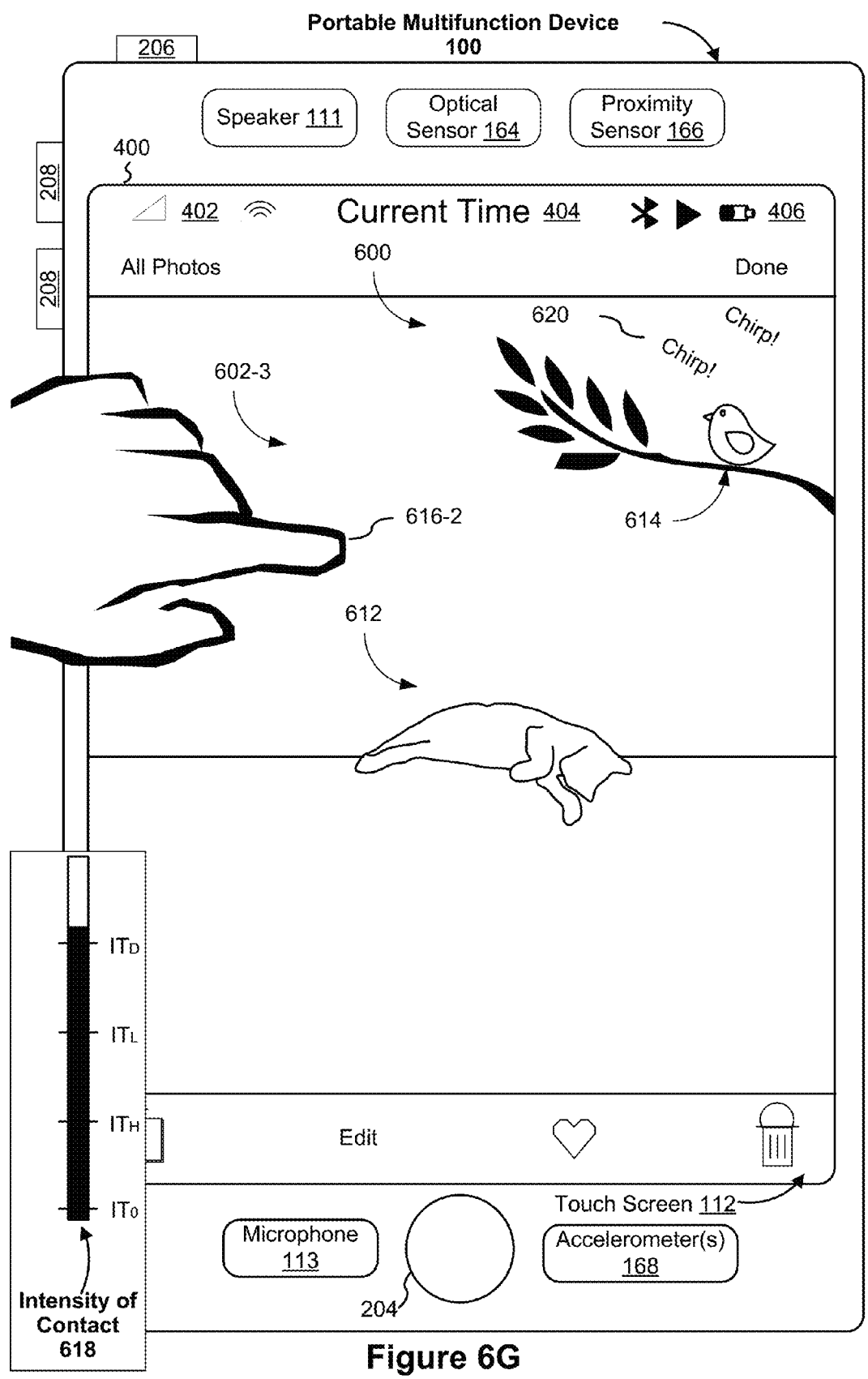
Figure 6H:
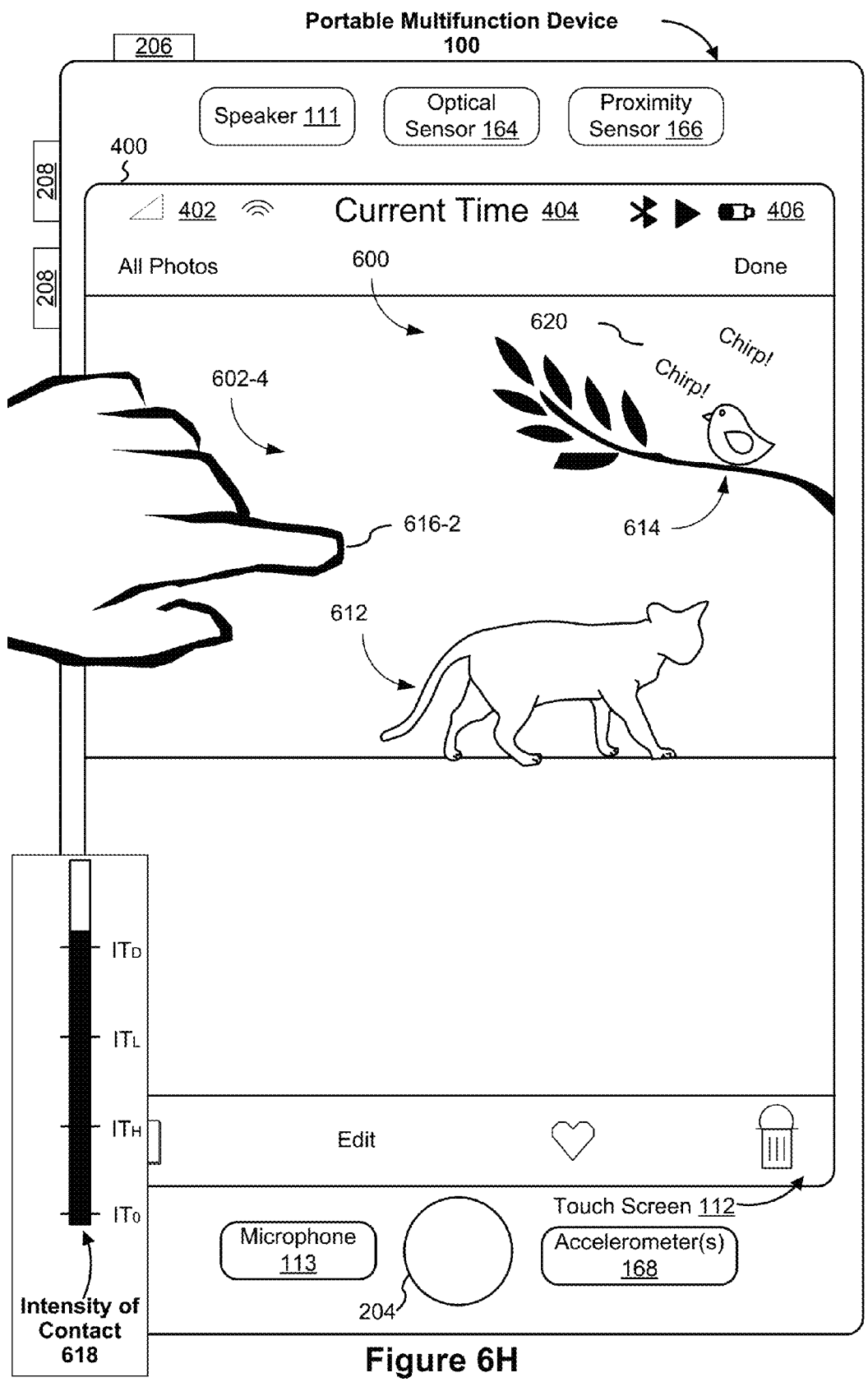
Figure 6I:
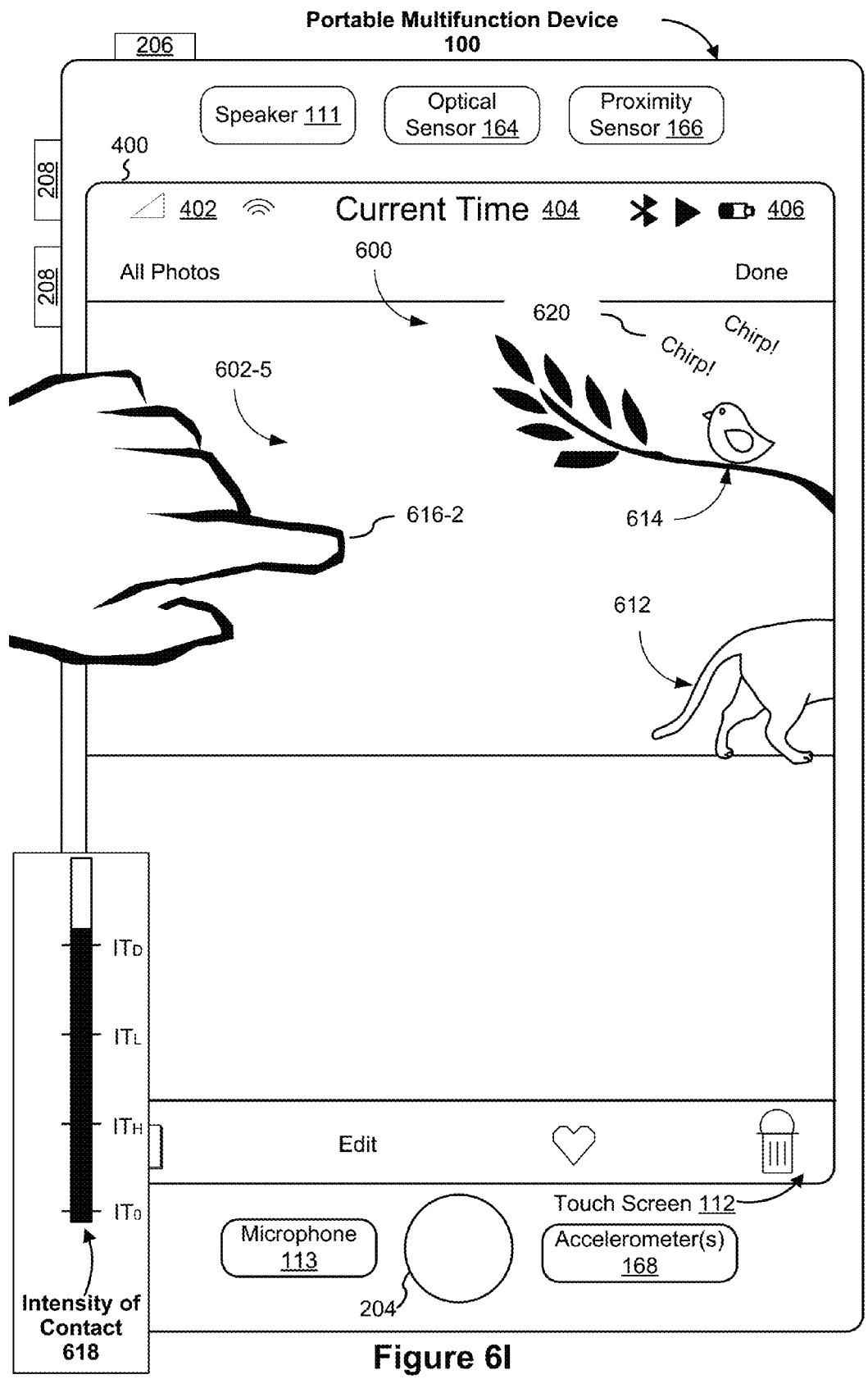
Figure 6J:
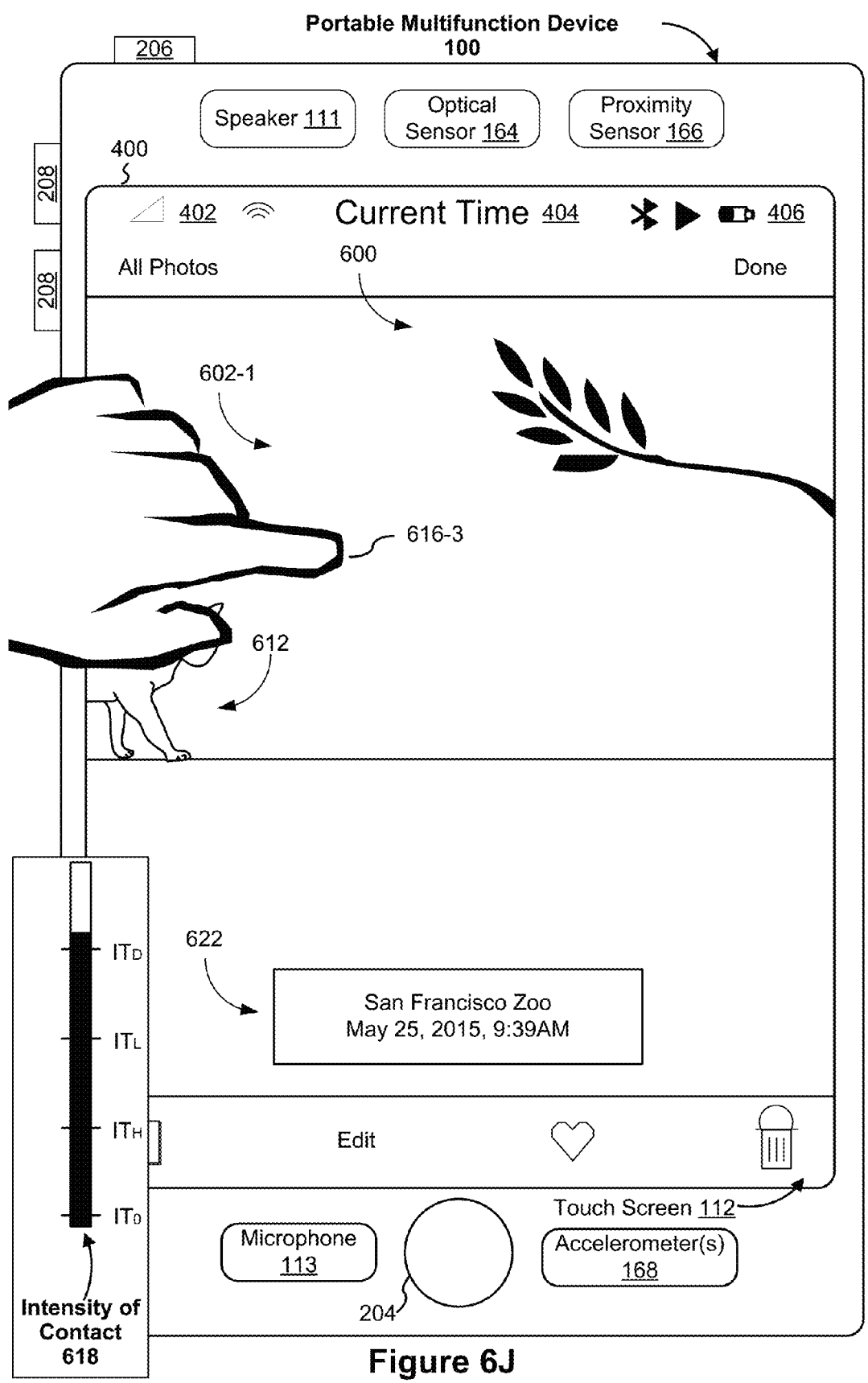
Figure 6K:
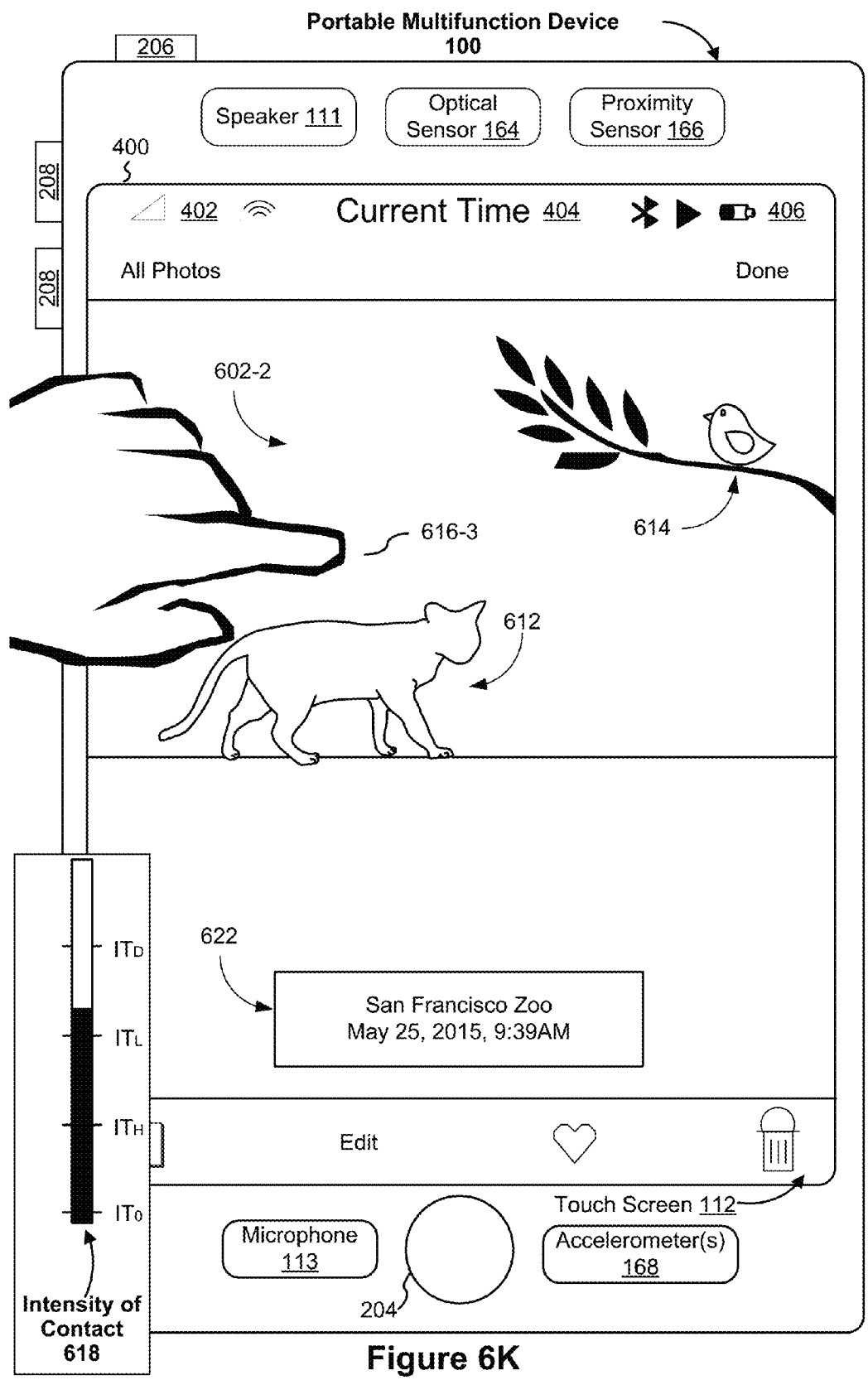
Figure 6L:
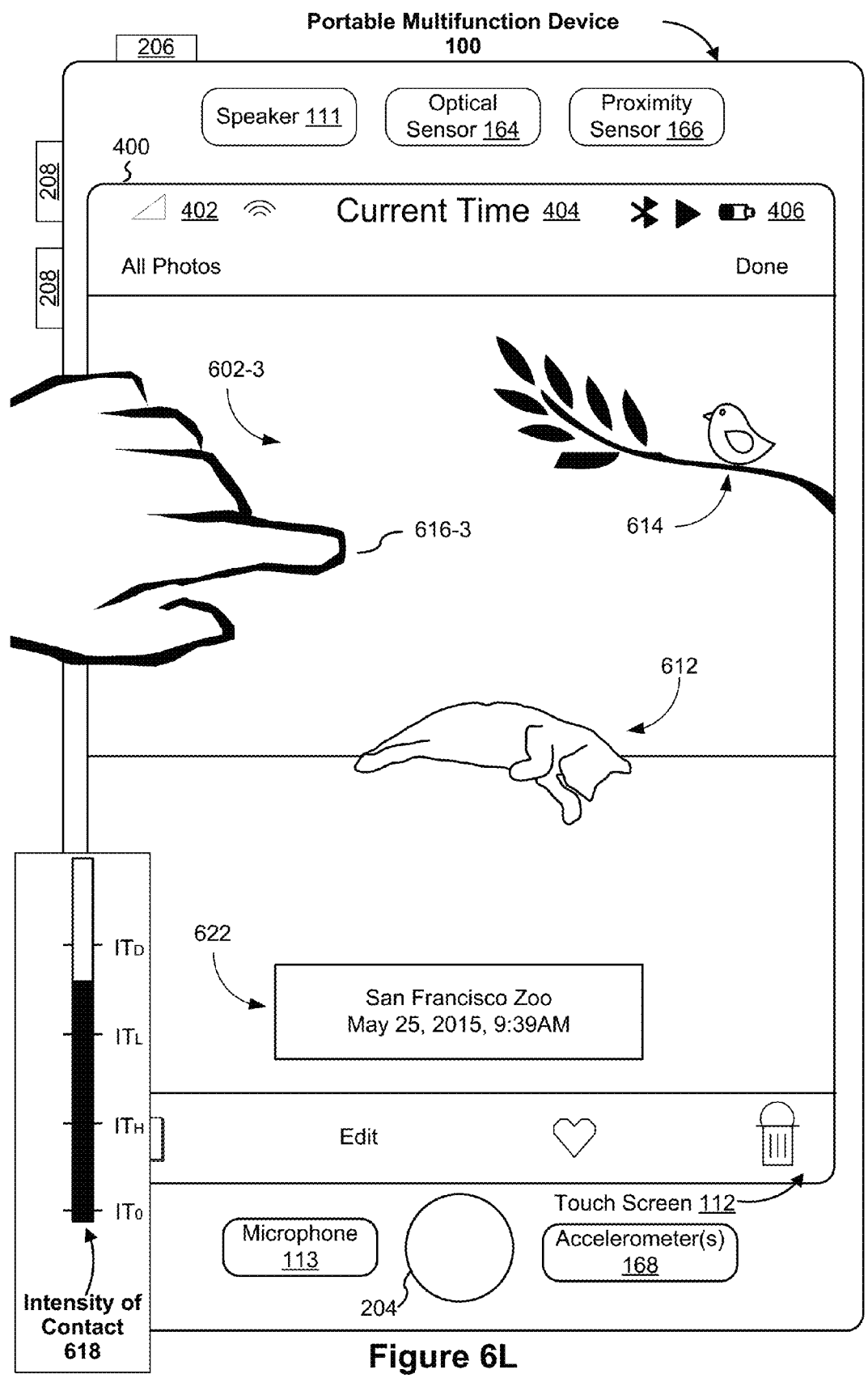
Figure 6M:
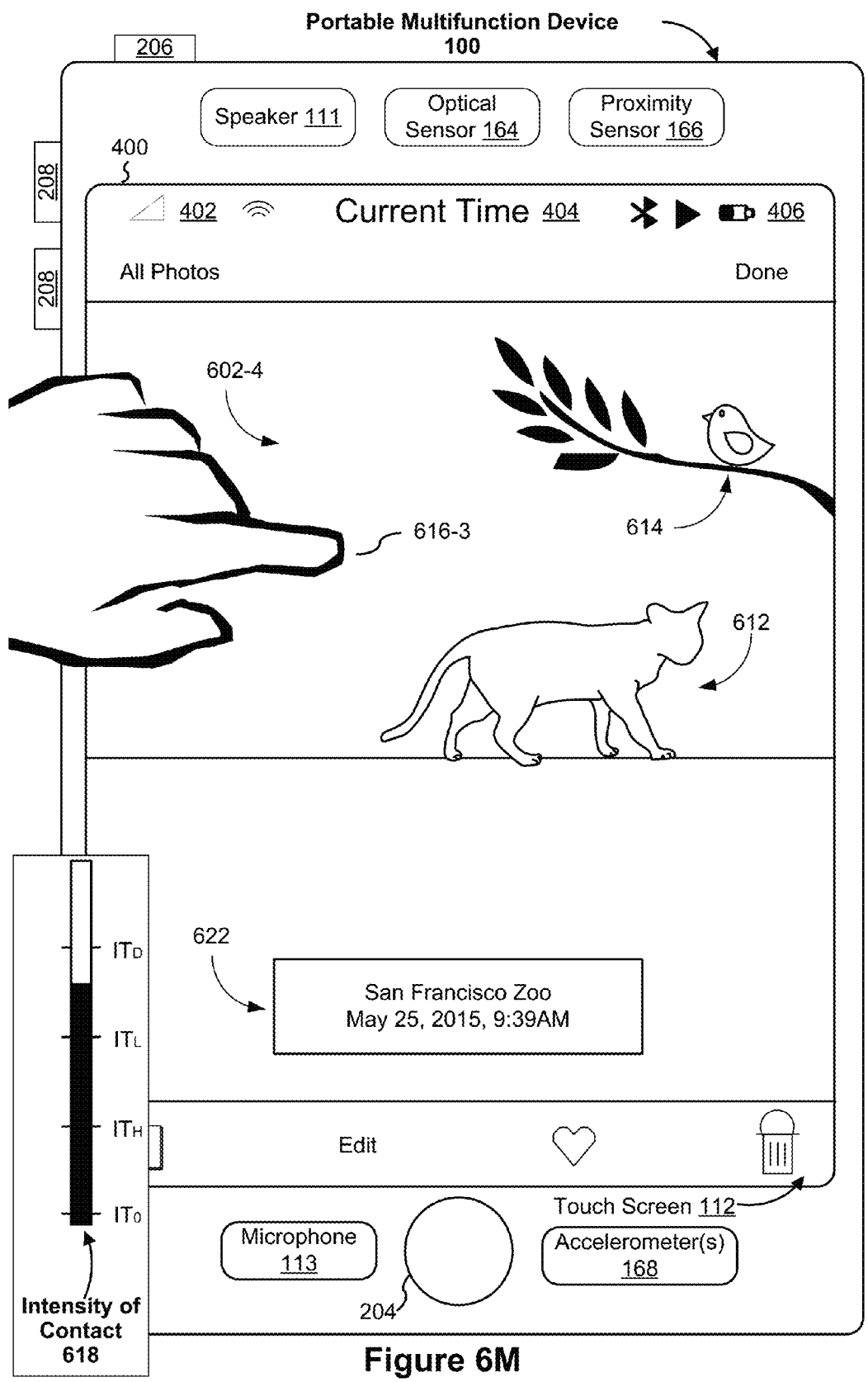
Figure 6N:
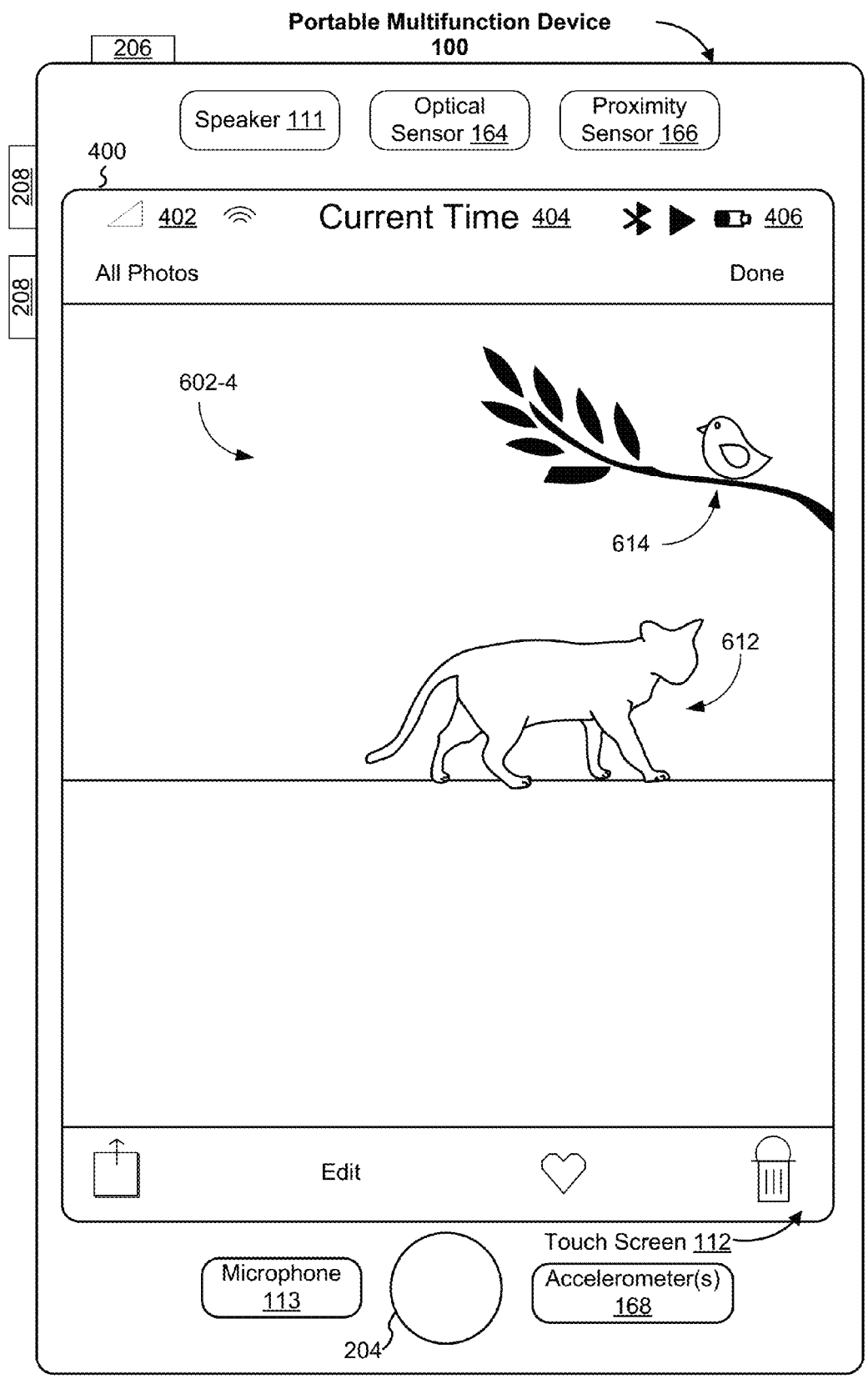
Figure 6O:
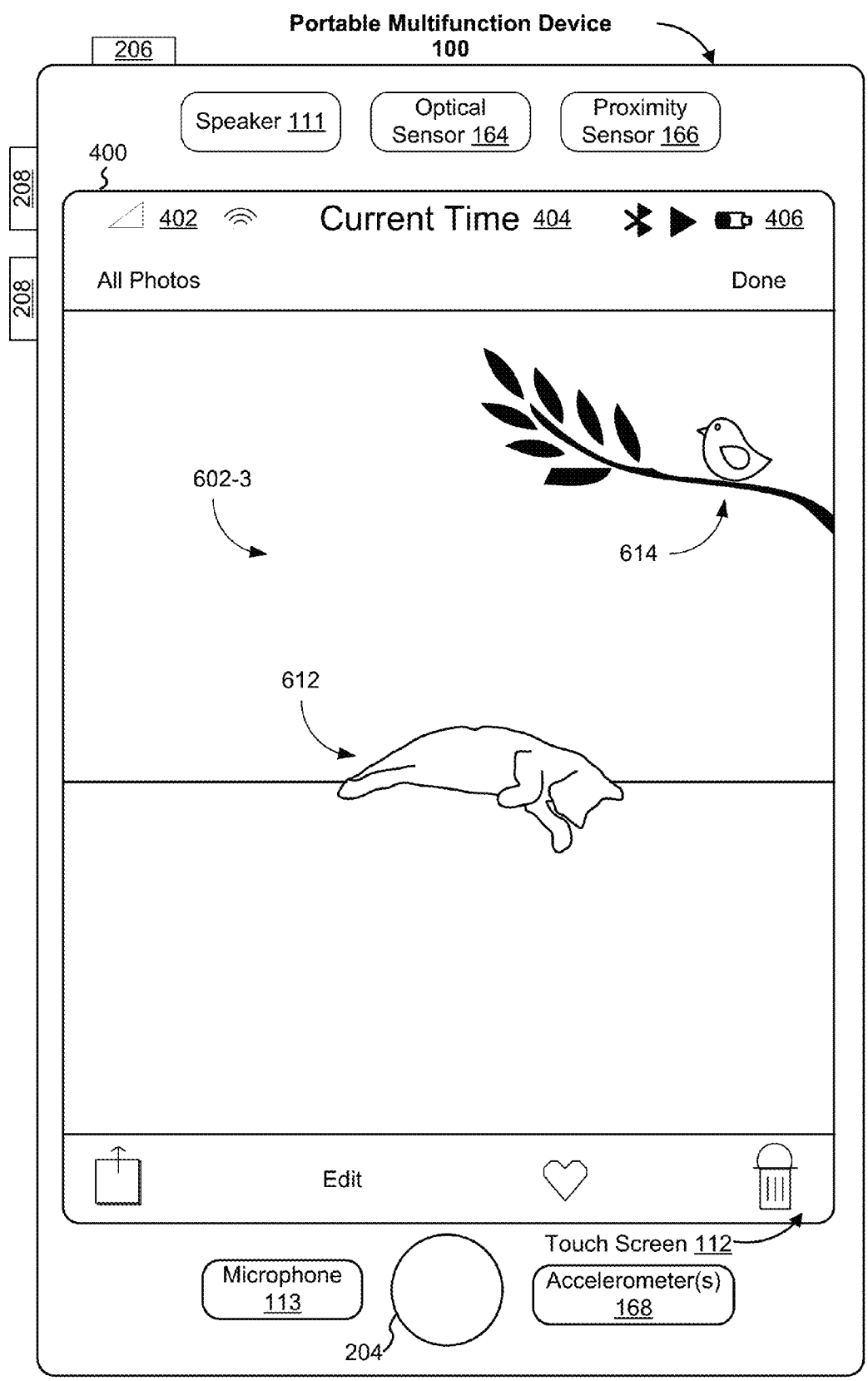
Figure 6P:
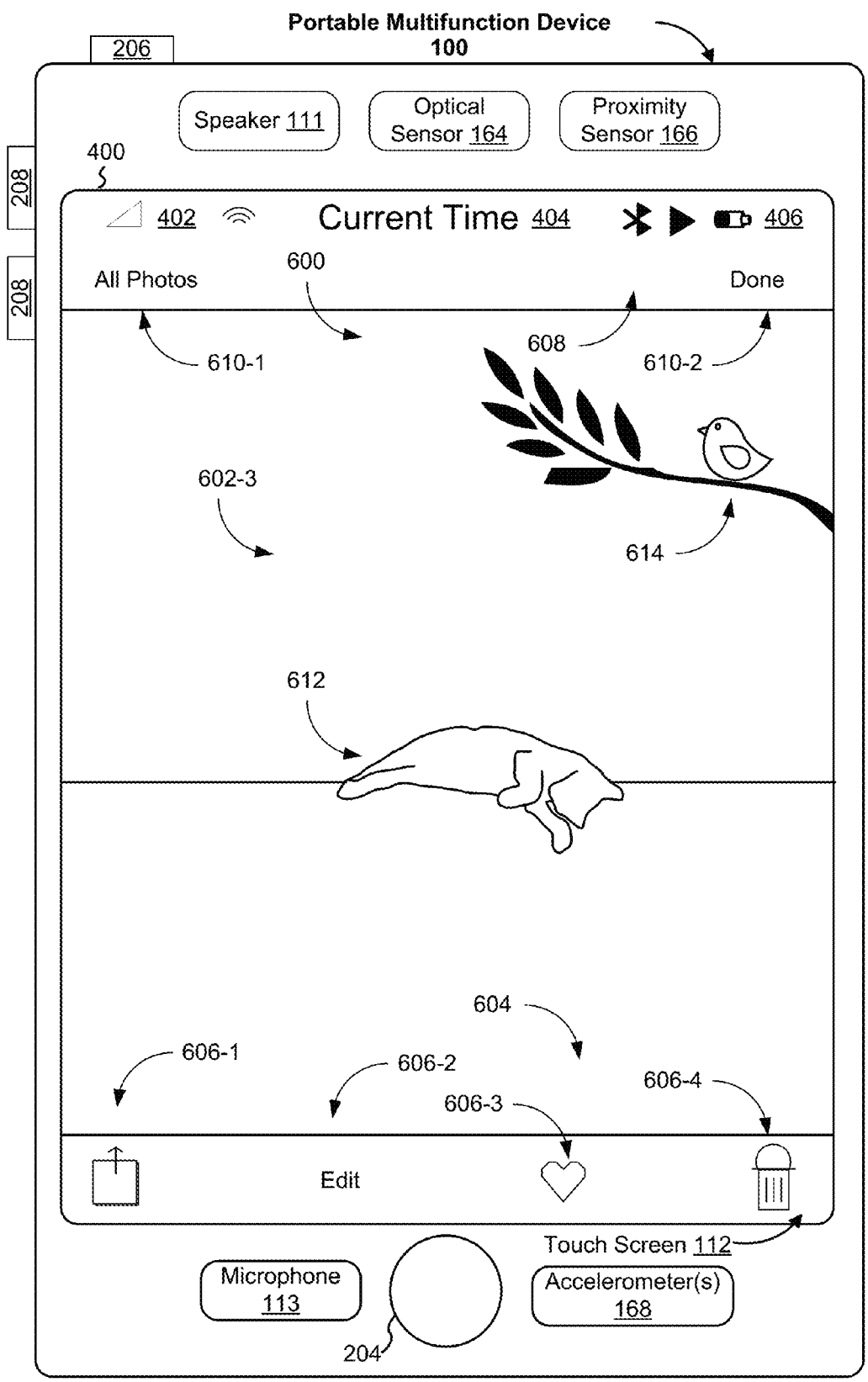
Figure 6Q:
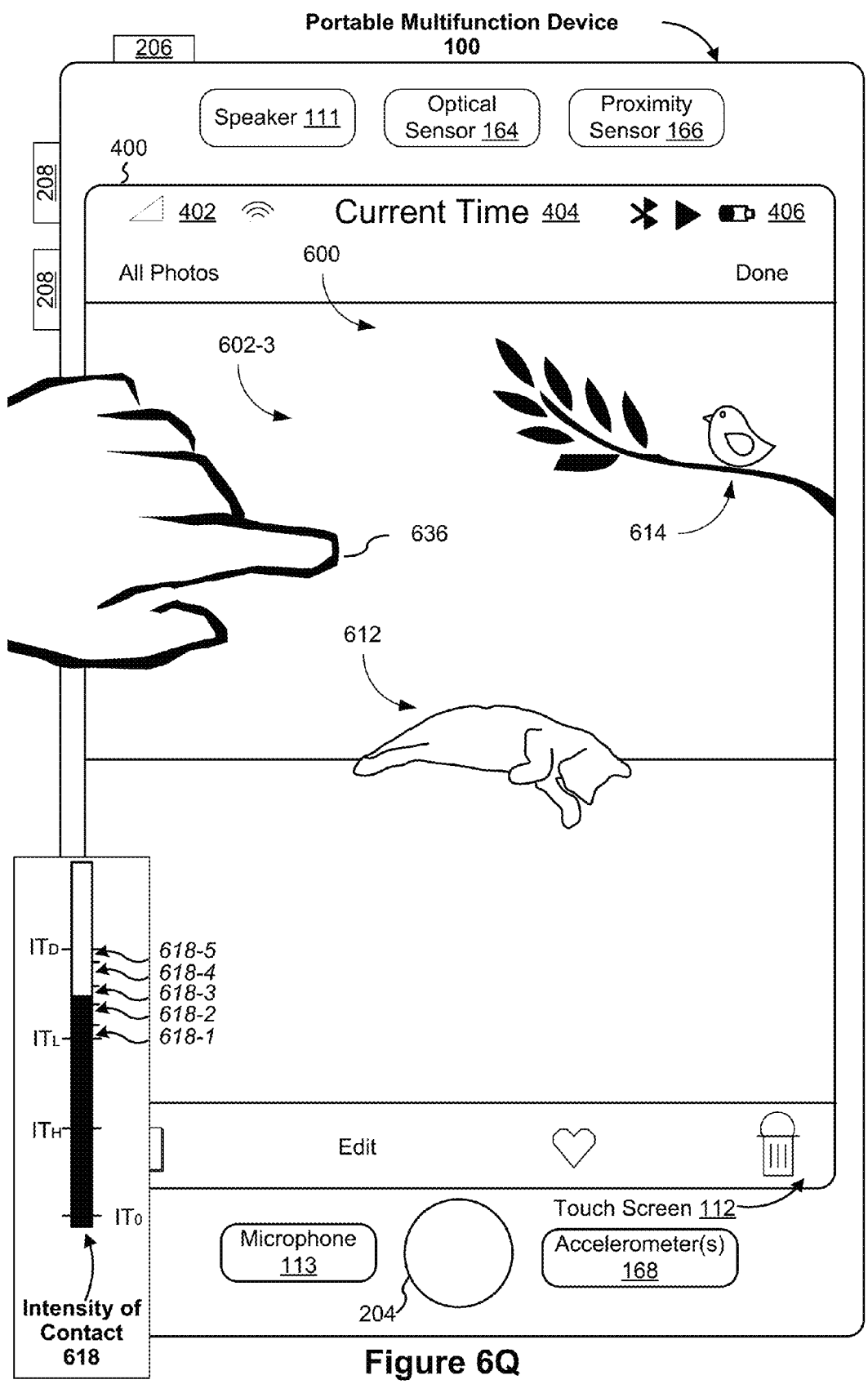
Figure 6R:
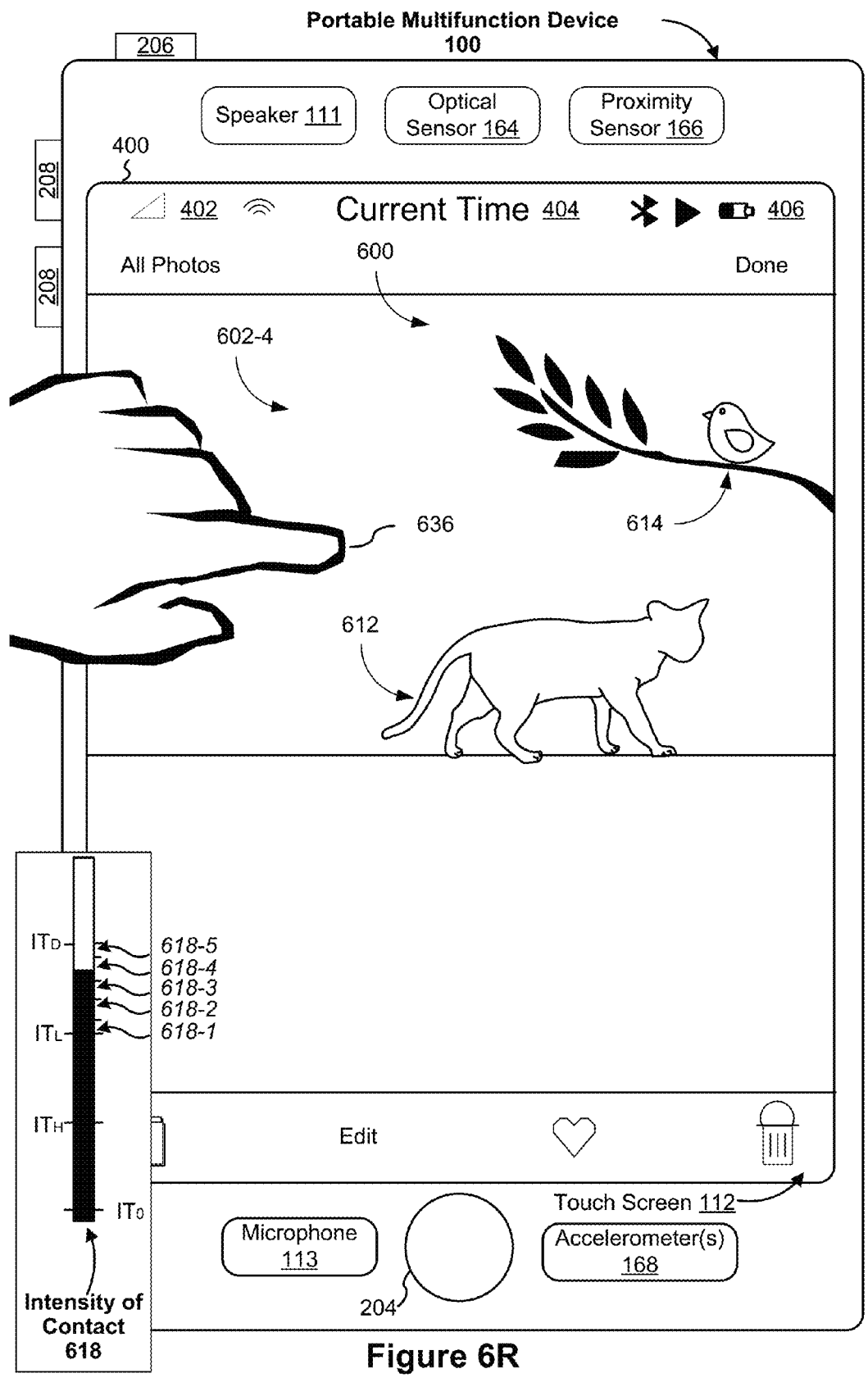
Figure 6S:
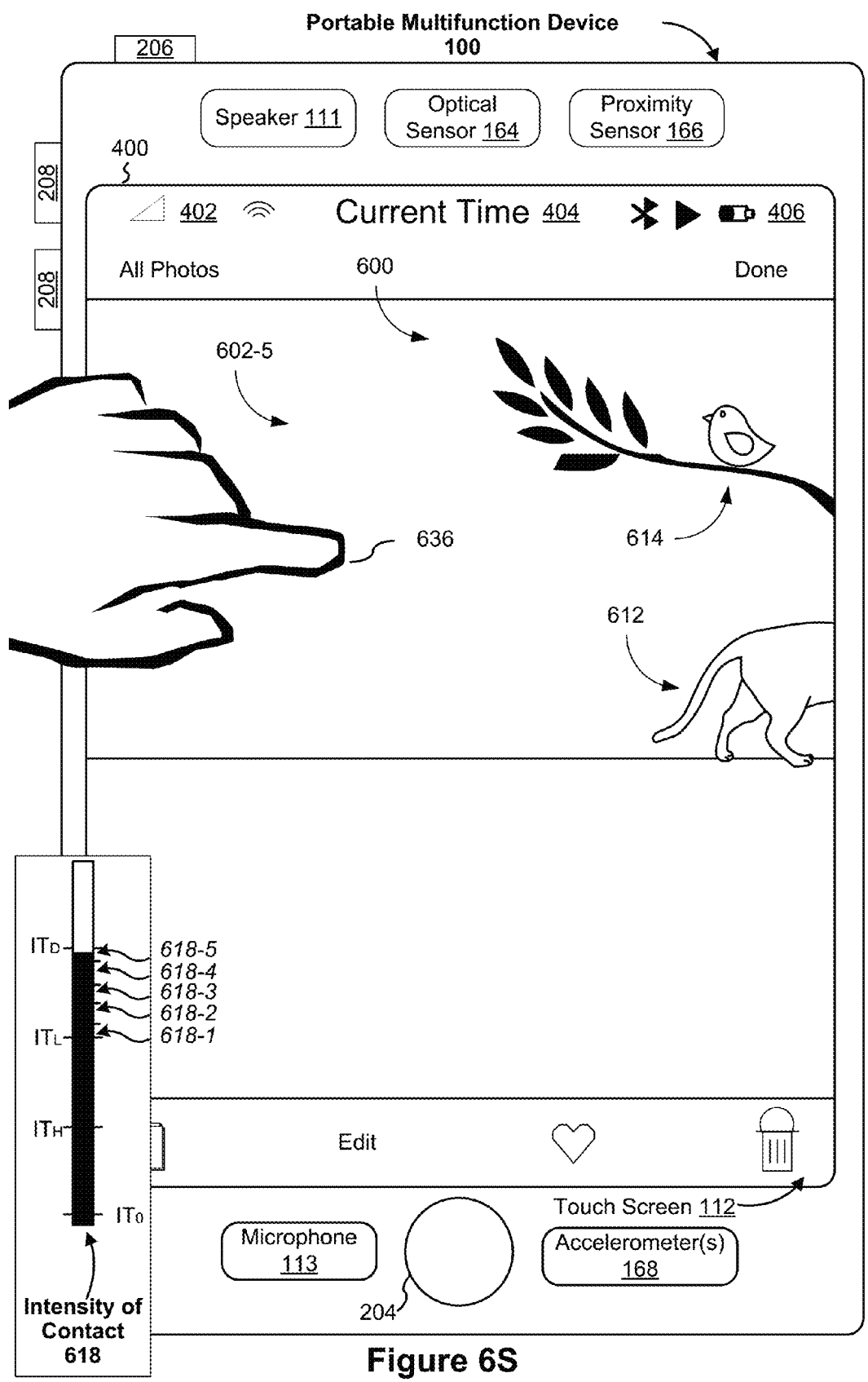
Figure 6T:
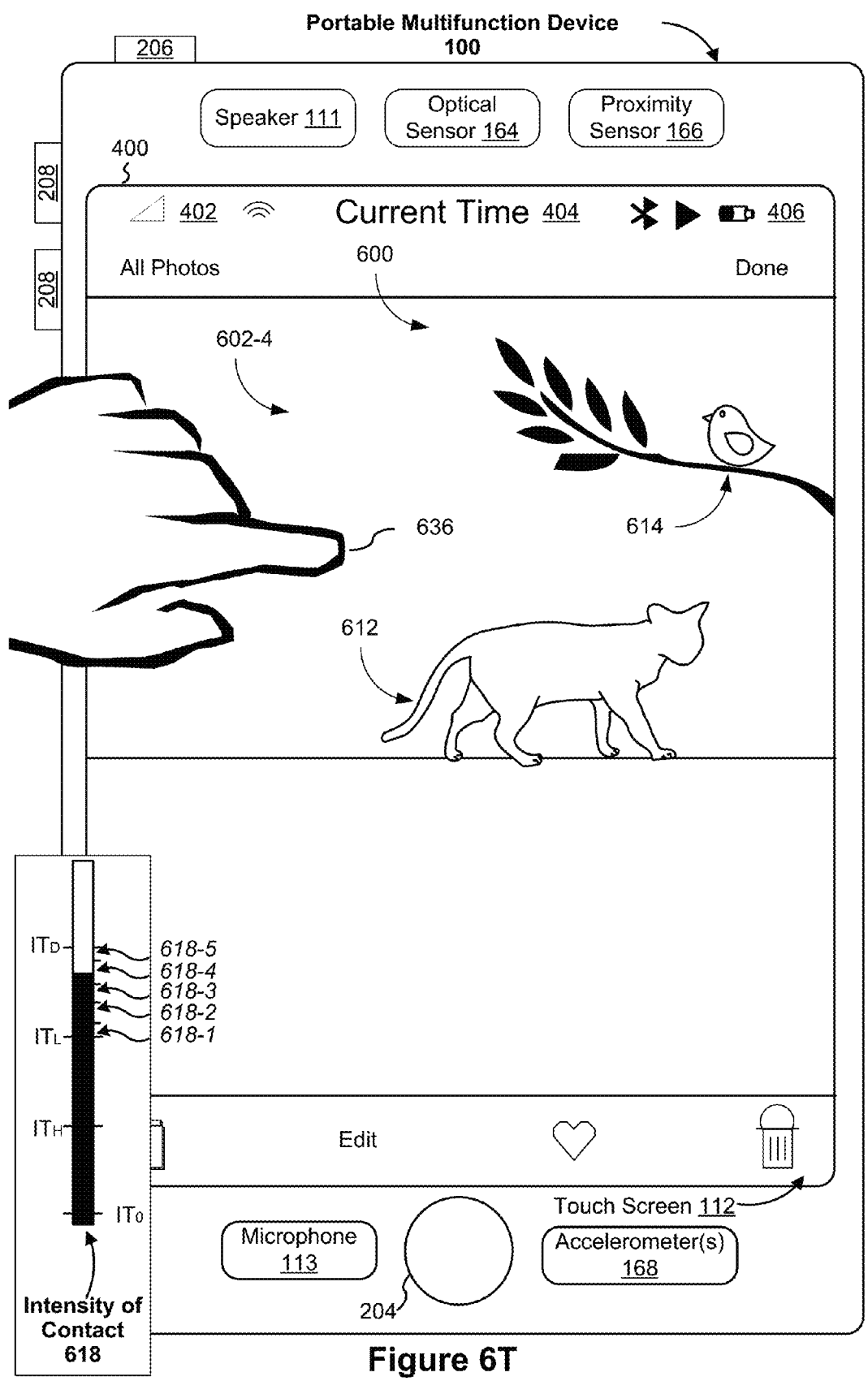
Figure 6U:
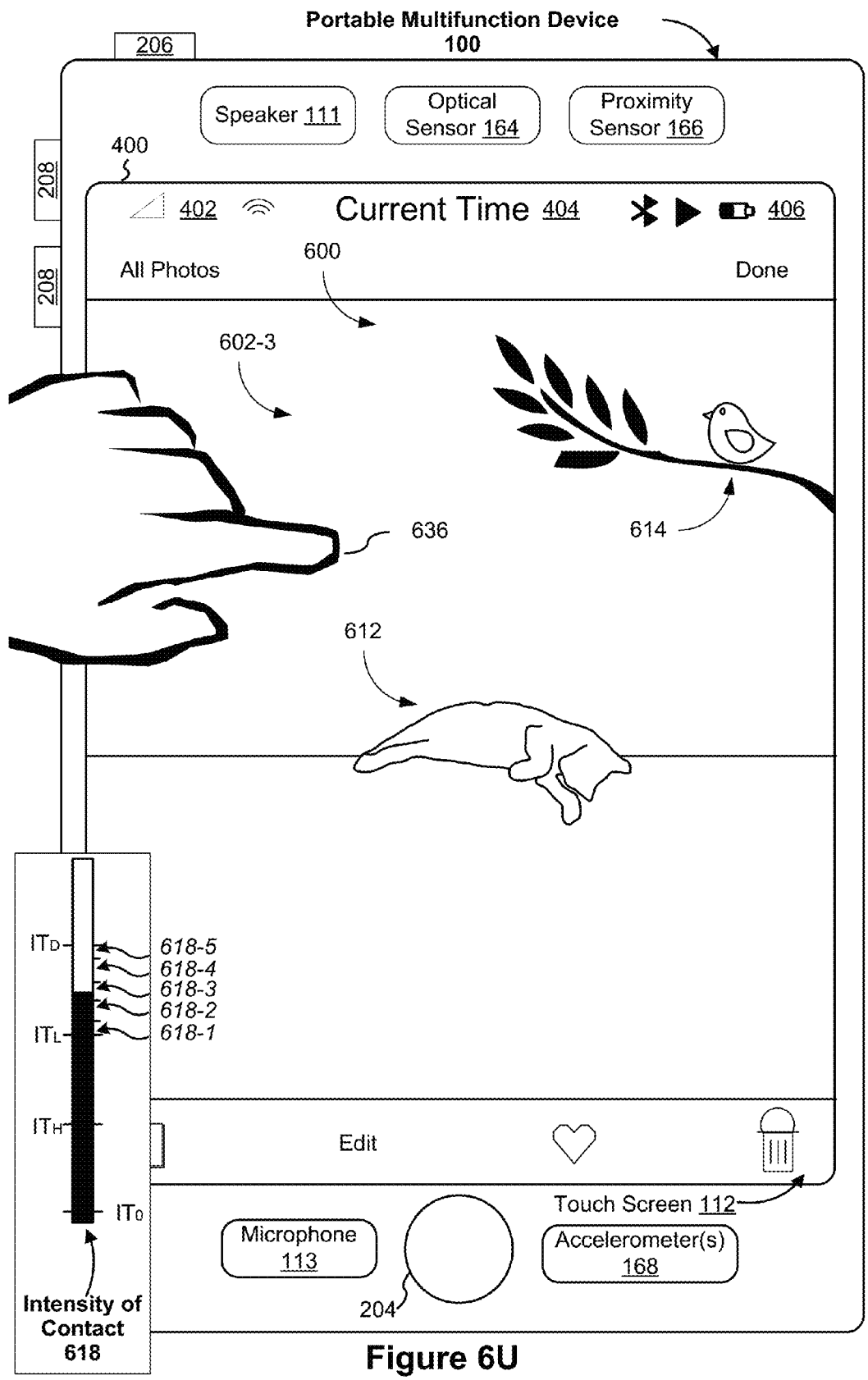
Figure 6V:
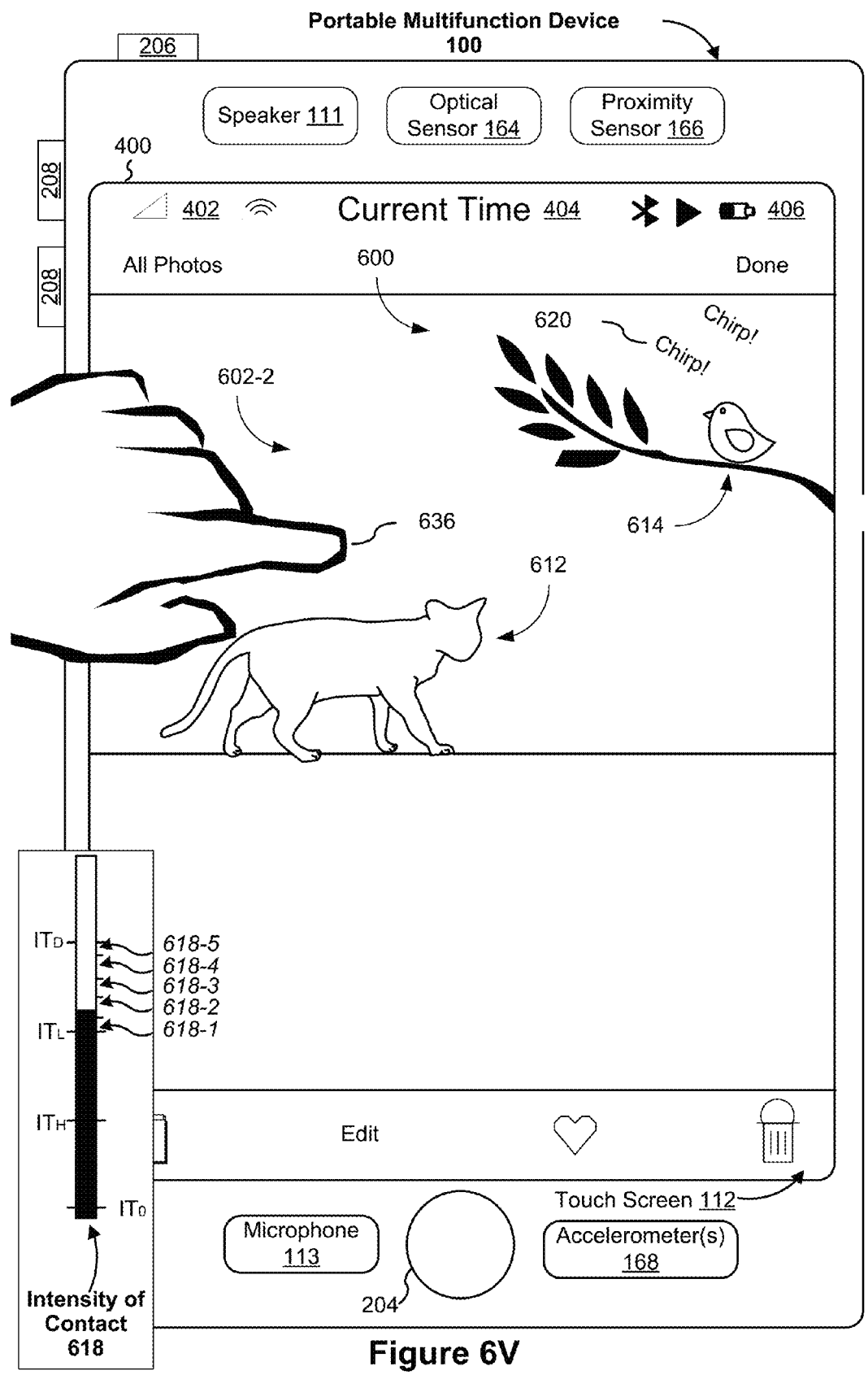

The sequence of images 602 shown in FIGS. 6A-6V depicts a scene in which a cat 612 walks into the field of view, rolls his back on the ground, and gets up and walks away. Meanwhile, a chirping bird 614 lands on a branch. While in reality, such a scene may take several seconds to unfold, in some embodiments, the sequence of images 602 is captured in a short temporal window. For example, in some embodiments, the sequence of images 602 depicts the moment surrounding (e.g., within 0.5, 1.0, 1.5, 2.0, or 2.5 seconds) the instant when representative image 602-3 was obtained. For example, the user's interest may have been piqued when cat 612 began rolling in the grass, prompting the user to take representative image 602-3. In some embodiments, the sequence of images 602 includes images just before and just after representative image 602-3 was obtained, such that the sequence of images 602 comprises an enhanced photo through which the moment can "come to life" when the user performs certain operations with respect to representative image 602-3, as described herein.

FIG. 6B illustrates a first portion 616-1 of a first input 616 detected by portable multifunction device 100 while portable multifunction device 100 displays user interface 600. In particular, while portable multifunction device 100 displays the representative image 602-3 on user interface 600, which is displayed on touch screen 112, portable multifunction device 100 detects the first portion 616-1 of first input 616. In some embodiments, the operations illustrated in FIGS. 6B-6O are performed in accordance with a determination that first input 616 meets predefined criteria (e.g., predefined enhanced photo display criteria). For example, in some embodiments, the operations illustrated in FIGS. 6B-6O are performed (e.g., triggered) when first input 616, or the first portion 616-1, is a press-and-hold gesture, as illustrated in FIGS. 6B-6O. In some embodiments, portable multifunction device 100 includes one or more sensors to detect intensity of contacts with touch screen 112, and the operations illustrated in FIGS. 6B-6O are performed (e.g., triggered) when first input 616 has a characteristic intensity that meets (e.g., satisfies) predefined intensity criteria (e.g., first input 616 exceeds light press threshold $IT_L$ as shown in intensity diagram 618, a diagram which is not part of displayed user interface 600, but which is provided to aid in the interpretation of the figures). In some embodiments, the operations illustrated in FIGS. 6B-6O are performed (e.g., triggered) when first input 616, or the first portion 616-1, has predefined path characteristics (e.g., stationary, as is the case with a press-and-hold gesture, or substantially linear, as is the case in a swipe/drag gesture) and meets predefined intensity criteria (e.g., exceeds a predefined intensity threshold). For the purposes of explanation, the operations illustrated in FIGS. 6B-6O are described below as being triggered by a press-and-hold gesture that exceeds light press threshold $IT_L$ as shown in intensity diagram 618.

FIG. 6C illustrates portable multifunction device 100's response to a continuation (from FIG. 6B) of the first portion 616-1 of first input 616 detected while portable multifunction device 100 displays user interface 600. In particular, as shown in FIGS. 6B-6D, in response to detecting the first portion 616-1 of first input 616, portable multifunction device 100 replaces display of the representative image within user interface 600 with display, within user interface 600, of the one or more images acquired by the camera after acquiring representative image 602-3. In accordance with some embodiments, the one or more images acquired by the camera after acquiring representative image 602-3 are displayed in sequence while the first portion 616-1 of first input 616 is detected. To that end, FIG. 6C illustrates display of image 602-4, which is the next image acquired after representative image 602-3 in the sequence of images 602. In image 602-4, cat 612 has stood up after rolling his back on the ground and begun to walk away. Bird 614 remains perched in the tree. Thus, image 602-4 is an image that was taken after respective image 602-3.

FIG. 6D illustrates portable multifunction device 100's response to a continuation (from FIG. 6C) of the first portion 616-1 of first input 616 detected while portable multifunction device 100 displays user interface 600. In FIG. 6D, portable multifunction device 100 replaces display of image 602-4 within user interface 600 with display, within user interface 600, of image 602-5, which is the last image acquired by the camera after acquiring representative image 602-3 in the sequence of images 602. Thus, FIGS. 6A-6D illustrate an example in which there are two images in the sequence of images 602 that were acquired after representative image 602-3. It should be understood, however, that in various embodiments and/or circumstances, a sequence of images may include a different (e.g., integer) number of images acquired by the camera after acquiring representative image 602-3 (e.g., 2, 5, 10, or 20 images).

In image 602-5, cat 612 has walked partially out of the field of view and bird 614 remains perched in the tree (e.g., image 602-5 is an image that was taken after respective image 602-4). Thus, FIGS. 6B-6D illustrate an example where, in accordance with some embodiments, a sufficiently deep press-and-hold gesture causes the enhanced photo to be displayed forward starting from the representative image, thereby creating an impression that the image has come to life. In some embodiments, unless first input 616 is terminated during the first portion 616-1, the first portion 616-1 of first input 616 lasts (e.g., has a duration of) an amount of time it takes to replace, in sequence, all of the images in the sequence of images 602 that were acquired by the camera after acquiring representative image 602-3. In such embodiments, a portion of first input 616 that occurs after the amount of time it takes to replace, in sequence, all of the images in the sequence of images 602 that were acquired by the camera after acquiring representative image 602-3 is not considered part of the first portion 616-1 but is rather considered a subsequent portion of first input 616, as described below.

In some embodiments, the one or more images acquired by the camera after acquiring representative image 602-3 are displayed, in response to detecting the first portion 616-1 of first input 616, in sequence at a rate that is based on an intensity of a contact in the first portion 616-1 of first input 616 as shown in intensity diagram 618 (e.g., the rate of display increases as an intensity of a contact in the first portion 616-1 of first input 616 increases, and the rate of display decreases as an intensity of a contact in the first portion 616-1 of first input 616 decreases). In some embodiments, during sequential display of the sequence of images 602 during the first portion 616-1 of first input 616, portable multifunction device 100 dwells on each respective image in the sequence of images 602 for a duration of time proportional (or inversely proportional) to a characteristic intensity of the first input 616 while the respective image is displayed. So, for example, in such embodiments, portable multifunction device 100 dwells on representative image 602-3 (FIG. 6B) and image 602-4 (FIG. 6C) for a shorter period of time than image 602-5 (FIG. 6D) because the intensity of first input 616 is higher during display of representative image 602-3 (FIG. 6B) and image 602-4 (FIG. 6C) than during display of image 602-5 (FIG. 6D), as shown by the intensity diagrams 618 in the respective figures.

In some embodiments, after this initial dependence of the display rate on contact intensity in first input 616, subsequent displays of the sequence of images 602 (in response to detecting later portions of first input 616, as described below) occur at fixed display rates, independent of the contact intensity in later portions of first input 616. So, for example, portable multifunction device 100 dwells on image 602-1 (FIG. 6E) and image 602-2 (FIG. 6F) for an equal duration of time, despite the difference in the intensity of first input 616, as shown by the intensity diagrams 618 in the respective figures.

In some embodiments, as described below with reference to FIGS. 6E-6I, after portable multifunction device 100 displays, in response to detecting the first portion 616-1 of first input 616, the one or more images acquired by the camera after acquiring representative 602-3, the device 100 loops back around and displays the entire sequence of images 602 in response to a second portion 616-2 of first input 616 (or displays the entire sequence of images 602 as long as first input 616 and/or its intensity is maintained). In some embodiments, a cross fade animation is displayed from the end of the sequence of images 602 to the beginning of the sequence of images 602 when the sequence of images 602 is looped or displayed again.

FIG. 6E illustrates a situation in which, after detecting the first portion 616-1 of first input 616, portable multifunction device 100 detects a second portion 616-2 of first input 616 (e.g., portable multifunction device 100 continues to detect sufficient contact and/or intensity in a finger gesture). In response to detecting the second portion 616-2 of first input 616, as shown in FIGS. 6E-6I, portable multifunction device 100 displays, within user interface 600, in sequence, the one or more images acquired by the camera before acquiring representative image 616-3 (e.g., image 616-1, FIG. 6E, and image 616-2, FIG. 6F), representative image 602-3 (FIG. 6G), and the one or more images acquired by the camera after acquiring representative image (e.g., image 602-4, FIG. 6H, and image 602-5, FIG. 6I). Thus, in some embodiments, in response to detecting the second portion 616-2 of first input 616, the entire sequence of images 602 is displayed, from the initial image to the final image in the sequence (unless, for example, first input 616 is interrupted).

In some embodiments, the second portion 616-2 of first input 616 is a portion that is continuous with and immediately subsequent to the first portion 616-1 of first input 616. In some embodiments, unless first input 616 is terminated during the second portion 616-2, the second portion 616-2 of first input 616 lasts (e.g., has a duration of) an amount of time it takes to replace, in sequence, all of the images in the sequence of images 602.

In image 602-1 (FIG. 6E), cat 612 is beginning to enter the field of view and bird 614 has not yet landed on the perch. In image 602-2 (FIG. 6F), cat 612 has fully entered the field of view and bird 614 has landed on the perch. Thus, image 602-2 is an image that was taken after 602-1, and both image 602-1 and 602-2 where taken before representative image 602-3 (FIG. 6G). (Respective images are the same in the various figures in which they are displayed. For example, image 602-4 is the same in FIG. 6C and FIG. 6H. For brevity, aspects of these figures that have been described with reference to other figures are not repeated).

In some embodiments, one difference between the sequential display, during the first portion 616-1 of first input 616, of the one or more images acquired by the camera after acquiring representative image 602-3 (as shown in FIGS. 6B-6D) and the sequential display, during the second portion 616-2 of first input 616, of the entire sequence of images 602 (as shown in FIGS. 6E-6I) is that, in response to detecting the second portion 616-2 of first input 616, portable multifunction device 100 presents audio 620 (e.g., via speaker 111) that corresponds to the sequence of images 602. This is illustrated in FIGS. 6F-6I by the words "chirp chirp" emanating from bird 614. (In this example, the words "chirp chirp" do not appear in the image, but are provided in the figures to indicate audio produced by speaker 111.) In some embodiments, in response to detecting the second portion 616-2 of first input 616, the entire sequence of images 602 is displayed with corresponding audio 620 that was recorded when the sequence of images 602 was acquired. In some embodiments, audio is not presented in response to detecting the first portion 616-1 of first input 616. In some embodiments, if first input 616 is maintained after the first complete playback of the sequence of images 602 (e.g., in response to detecting the second portion 616-2 of first input 616), the audio is not presented again during subsequent playbacks of the sequence in response to continued detection of first input 616 (as explained with reference to FIGS. 6J-6M, which illustrate a second playback of the entire sequence of images 602). In some embodiments, for a given input, audio is only presented during the first complete playback of the sequence of images 602. In some embodiments, for a given input, the audio is only presented during a different subsequent playback of the sequence of images 602 (e.g., the second complete playback of the sequence of images 602) or during a number of predefined playbacks (e.g., the first and second complete playbacks of the sequence of images 602).

In some embodiments, the sequence of images 602 is displayed, in response to detecting the second portion 616-2 of first input 616 (e.g., during the first complete playback), in sequence at a fixed rate (e.g., at the same rate at which the images were obtained, also called a "1×" rate). For example, in some embodiments, audio is presented during the first complete playback at 1× rate and the corresponding sequence of images 602 are displayed at a 1× rate, giving the playback a natural look and sound. In some embodiments, a 1× rate means that portable multifunction device 100 dwells upon a respective image for an amount of time substantially the same as the amount of time that elapsed between obtaining the respective image and the next image.

In some embodiments, images in the sequence of images 602 are sequentially displayed at a fixed rate, independent of the intensity of a contact in first input 616. For example, portable multifunction device 100 dwells on image 602-1 (FIG. 6E) and image 602-2 (FIG. 6F) for the same length of time, despite the different input intensities shown in the intensity diagrams 618 in the respective figures. In some embodiments, during the second portion 616-2 of first input 616, the rate at which images in the sequence of images 602 are sequentially displayed depends on the intensity of a contact of first input 616. For example, the rate increases as the intensity of the contact increases.

In some embodiments, as described below with reference to FIGS. 6J-6M, after portable multifunction device 100 displays the sequence of images 602 in response to detecting the second portion 616-2 of first input 616 (e.g., the device completes the first complete playback of the sequence of images 602), device 100 loops back around again and displays the entire sequence of images 602 in response to a third portion 616-3 of first input 616 (e.g., so long as first input 616 and/or its intensity is maintained). In some embodiments, a cross fade animation is displayed from the end of the sequence of images 602 to the beginning to the sequence of images 602 when the sequence of images 602 is looped or displayed again.

FIGS. 6J-6M illustrate a situation in which, after detecting the second portion 616-2 of first input 616, portable multifunction device 100 detects a third portion 616-3 of first input 616 (e.g., portable multifunction device 100 continues to detect sufficient contact and/or intensity in a finger gesture). In response to detecting the third portion 616-3 of first input 616, portable multifunction device 100 displays, within user interface 600, in sequence, the one or more images acquired by the camera before acquiring representative image 602-3 (e.g., image 602-1, FIG. 6J, and image 602-2, FIG. 6K), representative image 616-3 (FIG. 6L), and the one or more images acquired by the camera after acquiring representative image (e.g., image 602-4, FIG. 6M). However, in the example shown, first input 616 is terminated during the third portion 616-3, resulting in different functionality described in greater detail below. Thus, in some embodiments, in response to detecting the third portion 616-3 of first input 616, the entire sequence of images 602 is displayed, from the initial image to the final image in the sequence, unless first input 616 is interrupted (e.g., discontinued) before completing display of the entire sequence of images 602. In some embodiments, the looping continues as long as first input 616 is maintained, although different functionality and/or operations are optionally available (or performed) on different loops. For example, as described above, portable multifunction device 100 provides audio on the first complete playback. Similarly, in some embodiments, in response to detecting the third portion 616-3 of first input 616, and displaying the second complete playback, portable multifunction device 100 displays metadata 622 that corresponds to the sequence of images 602 (e.g., showing a date, time, location, or any other information associated with the sequence of images 602).

As noted above, FIGS. 6J-6O illustrate an example in which first input 616 is discontinued (e.g., by liftoff, or a drop in intensity below the predefined threshold $IT_0$, as shown by intensity diagram 618, FIG. 6N) during the third portion 616-3. FIGS. 6N-6O illustrate operations that occur, in accordance with some embodiments, in response to termination (e.g., discontinuation or suspension) of first input 616 during the third portion 616-3. In some embodiments, analogous operations are performed when the first input 616 is terminated during the second portion 616-2 or the first portion 616-1 of the first input 616. In some embodiments, when first input 616 is terminated, portable multifunction device 100 determines if the currently displayed image occurs before or after representative image 602-3. When the currently displayed image occurs after (e.g., was taken after) representative image 602-3, as shown in FIGS. 6N-6O, portable multifunction device 100 sequentially displays the sequence of images 602 from the currently displayed image (e.g., image 602-4, FIG. 6N) to representative image 602-3 in reverse chronological order (e.g., portable multifunction device 100 backtracks to representative image 602-3). Conversely, when the currently displayed image occurs before (e.g., was taken before) representative image 602-3, portable multifunction device 100 sequentially displays the sequence of images 602 from the currently displayed image to representative image 602-3 in chronological order (e.g., portable multifunction device 100 advances the loop, in forward order, up to representative image 602-3).

In some circumstances, a grouped sequence of images is asymmetrical with respect to its representative image, meaning that there are an unequal number of images that occur before and after the representative image. In some embodiments, portable multifunction device 100 determines whether there are fewer images between the currently displayed image and the representative image in the forward- or reverse-chronological order directions. Portable multifunction device 100 then sequentially displays (e.g., traverses) the sequence of images in whichever direction has fewer images between the currently displayed image and the representative image.

FIGS. 6P-6V illustrate embodiments in which a user controls display of images in a grouped sequence of images by controlling the intensity of a press-and-hold gesture 636. FIG. 6P is analogous to FIG. 6A and is provided as a starting point to describe the functionality in FIGS. 6Q-6V. In some embodiments, when press-and-hold gesture 636 meets pre-defined criteria, playback functionality for the sequence of images 602 is triggered. For example, when a respective press-and-hold input remains below press threshold $IT_L$, portable multifunction device 100 will not replace display of representative image 602-3 in response to the press-and-hold gesture (e.g., portable multifunction device 100 will instead perform different functionality). In contrast, when press-and-hold gesture 636 exceeds light press threshold $IT_L$, as shown in FIG. 6Q, portable multifunction device 100 maps an intensity of the press-and-hold gesture 636 (shown in intensity diagram 618) to at least some of the images in the sequence of images 602. For example, because playback functionality for the sequence of images 602 is triggered in FIG. 6Q, portable multifunction device 100 displays representative image 602-3 when the intensity of press-and-hold gesture 636 is in an intensity range 618-3 (FIG. 6Q and FIG. 6U). Similarly, portable multifunction device 100 displays image 602-1 when the intensity of press-and-hold gesture 636 is in an intensity range 618-1; displays image 602-2 when the intensity of press-and-hold gesture 636 is in an intensity range 618-2 (FIG. 6V); displays image 602-4 when the intensity of press-and-hold gesture 618 is in an intensity range 618-4 (FIG. 6T and FIG. 6R); and displays image 602-5 when the intensity of press-and-hold gesture 636 is in an intensity range 618-5 (FIG. 6S). Thus, FIGS. 6Q-6V illustrate a user's ability to scrub images in a grouped sequence of images backwards and forwards (e.g., directly control a displayed images in a grouped sequence of images) based on an intensity of a user input (e.g., resulting in a backwards and forwards smooth animation displaying replacement of images in the grouped sequence of images).

Figure 6W:
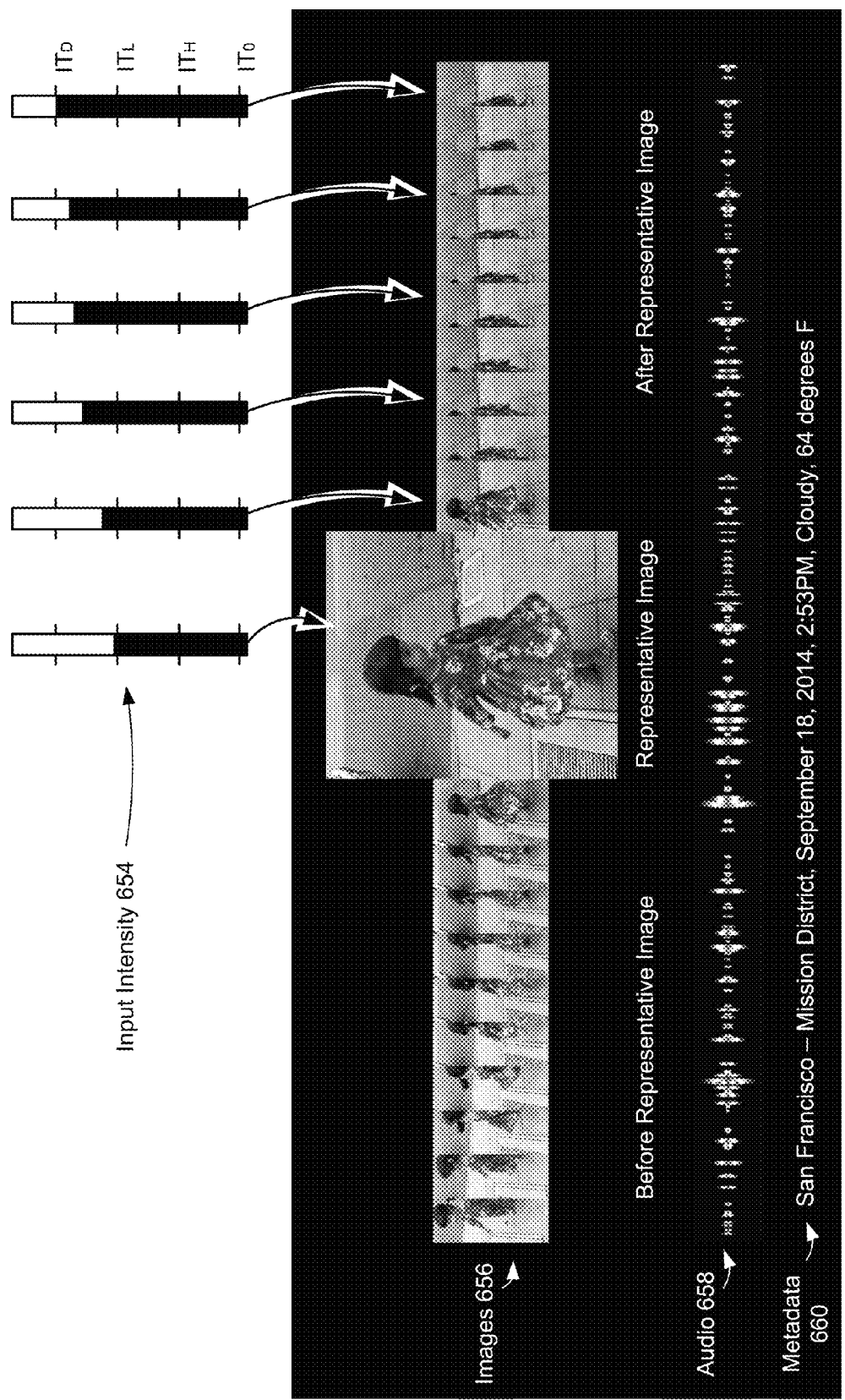

FIG. 6W illustrates embodiments in which a user controls display of images obtained after a representative image in a grouped sequence of images 656 by controlling an input intensity 654. In the example shown in FIG. 6W, intensity values between light press threshold $IT_L$ and deep press threshold $IT_D$ map to respective images that were obtained after the representative image in the grouped sequence of images 656. The intensity diagrams shown in FIG. 6W illustrate input intensities 654 that map to particular images, as indicated by their arrows, that were obtained after the representative image in the grouped sequence of images 656. So when an input exceeds light press threshold $IT_L$, the user can scrub forwards and then backwards through the images that were obtained after the representative image in the grouped sequence of images by controlling the intensity of the input. In some embodiments, when an input exceeds deep press threshold $IT_D$, the group sequence of images 656 are replaced (e.g., advance) at a fixed rate (e.g., the device plays back the grouped sequence of images 656 at a fixed rate, looping back to the beginning after the final image in the group sequence of images 656 is displayed). FIG. 6W also illustrates audio 658 and metadata 660 that is associated with the grouped sequence of images 656 (e.g., and provided with grouped sequence of images 656 as described above).

Figure 6X:
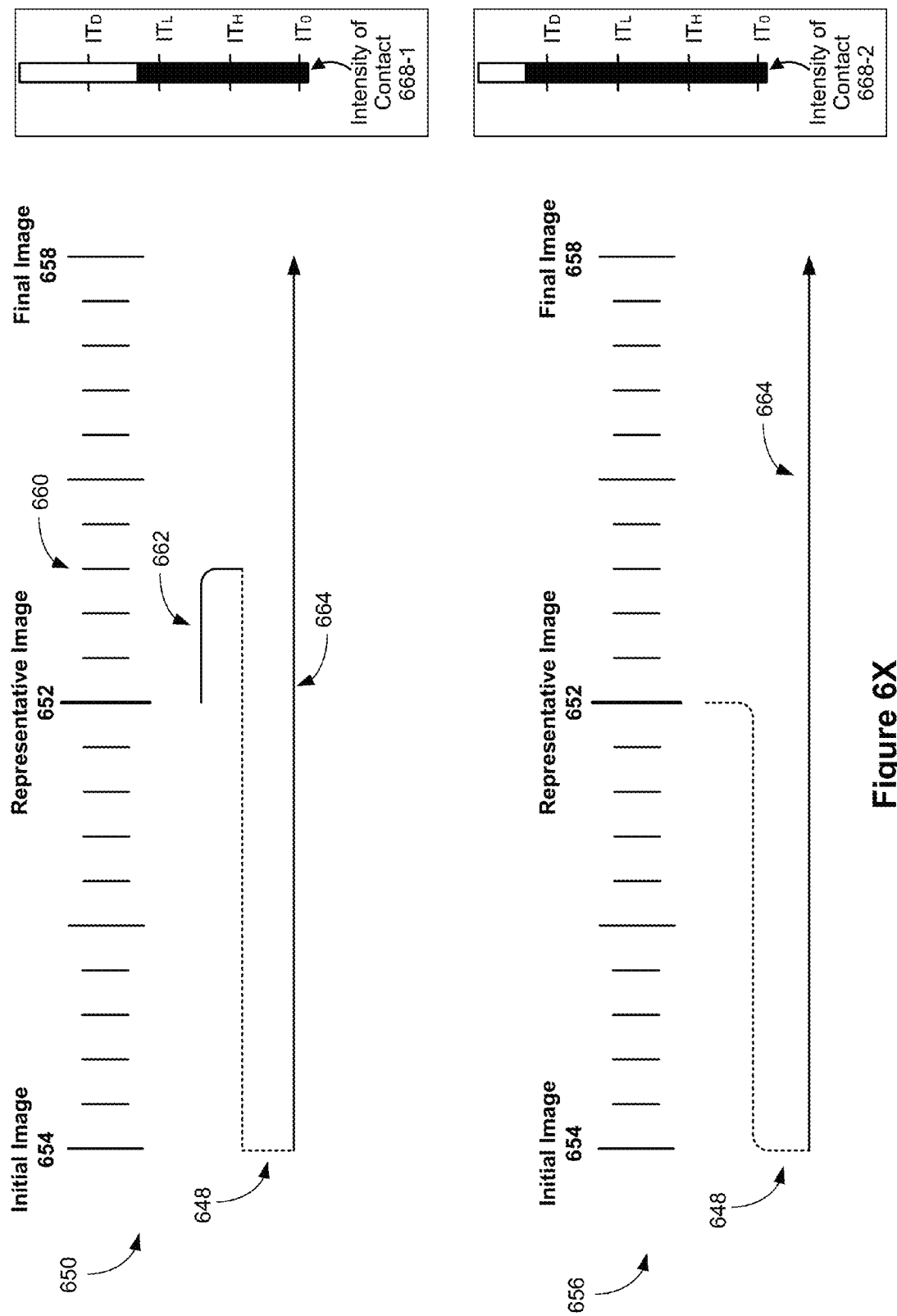

FIG. 6X illustrates embodiments that are largely analogous to the embodiments described with reference to FIGS. 6A-6O, except that device 100's response to an initial portion of a user input differs from those embodiments described with reference to FIGS. 6A-6O. In particular, in the embodiments illustrated in FIG. 6X, in response to detecting a first portion of a user input (e.g., a user input analogous to those described with reference to FIGS. 6A-6O), device 100 begins playback by either transitioning directly to the initial image in the sequence of images (e.g., as shown in diagram 656) or by playing the sequence of images forward briefly (e.g., by playing-forward a few images, as shown in diagram 650) and then cross-fading to the initial image (e.g., rather than initially playing the sequence of images forward until the final image in the sequence of images).

In FIG. 6X, playback during a user input 648 is represented by one or more curves (e.g., curve 662 and/or curve 664). Solid portions of the curves representing playback during user input 648 represent images that are played back, while dashed portions represent images that are not played back, in accordance with some embodiments.

So, for example, in diagram 650, device 100 initially displays representative image 652. In response to user input 648, device 100 plays three images forward (e.g., or one image or ten images, etc.) to image 660, then replaces display of image 660 with display of initial image 654. Device 100 then plays the sequence of images forward from initial image 654, in accordance with any of the embodiments described above with reference to FIGS. 6A-6O (e.g., loops through the enhanced photo with sound, metadata, etc., on subsequent loops). Thus, device 100 transitions from displaying representative image 652 to displaying the initial image 654 (or any other respective prior image) by displaying one or more images acquired after representative image 652. In some embodiments, device 100 cross-fades and/or blurs representative image 652 and/or one or more of the images acquired after the representative images into initial image 654.

As another example, in diagram 656, device 100 initially displays representative image 652. In response to user input 648, device 100 replaces display of representative image 652 with display of initial image 654 (or any other respective prior image). Device 100 then plays the sequence of images forward from initial image 654, in accordance with any of the embodiments described above with reference to FIGS. 6A-6O (e.g., loops through the enhanced photo with sound, metadata, etc., on subsequent loops). Thus, device 100 transitions from displaying representative image 652 to directly displaying initial image 654. In some embodiments, device 100 cross-fades and/or blurs representative image 652 into initial image 654.

In some embodiments, as shown in diagram 656, transitioning from displaying representative image 652 to displaying initial image 654 (e.g., the respective prior image) does not include displaying any of the one or more images acquired by the camera after acquiring representative image 652 (e.g., the device goes straight back to initial image 654).

In some embodiments, device 100 determines which transition to apply (e.g., the transition shown in diagram 650 or the transition shown in diagram 656) based on characteristics of user input 648 (e.g., a characteristic contact intensity of the first portion of the first input 648). For example, when the first portion of the first input 648 exceeds deep press threshold $IT_D$, as shown in intensity diagram 668-2, device 100 transitions in accordance with diagram 656. When the first portion of the first input 648 does not exceed deep press threshold $IT_D$, as shown in intensity diagram 668-1, device 100 transitions in accordance with diagram 650.

In some embodiments, certain images acquired during acquisition of the sequence of images are dropped or fused in generating a sequence of images. For example, blurry images are dropped (e.g., not included) in the sequence of images and/or one or more dark images are combined to increase the quality of the images in the sequence of images. In some circumstances, dropping and/or fusing images results in a sequence of images that are not evenly spaced temporally. For example, if ten images are acquired by a camera per second, but three images are fused to form a respective single image in the sequence of image, the respective single image represents a greater passage of time than the other images in the sequence of images. Thus, in some embodiments, playback of the sequence of images is re-timed according to removal and/or fusing of images within the sequence of images (e.g., in the example above, when playing the sequence of images at 1× playback, device 100 dwells on the respective single image of 0.3 seconds, or three times as long as it otherwise would).

Figure 6Y:
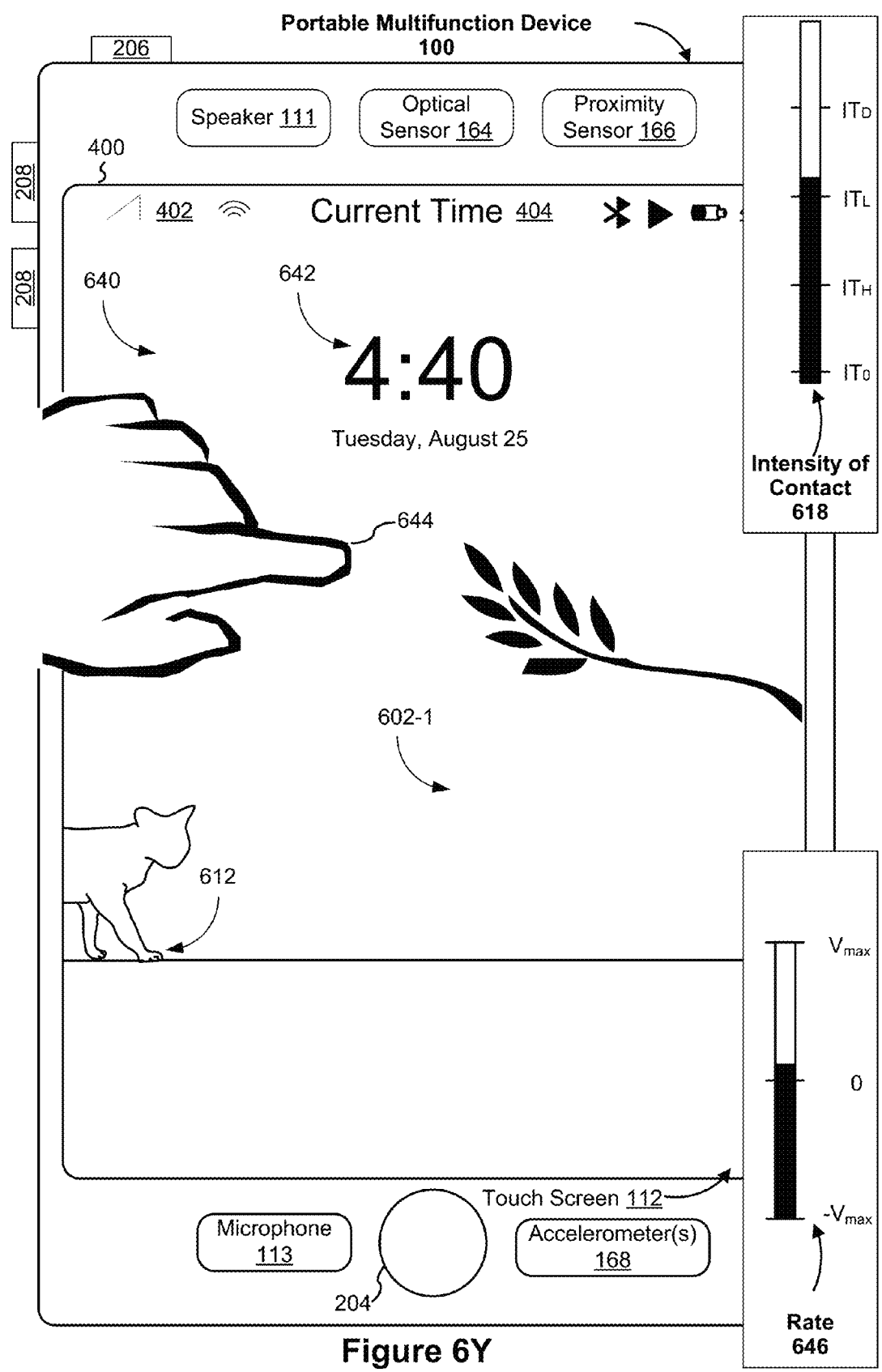

In accordance with some embodiments, FIGS. 6Y-6BB illustrate a user interface that initially displays a first image in a sequence of images (e.g., an enhanced photo). The user interface plays the sequence of images forwards or backwards, in accordance with an intensity of a contact of a user input, in the following manner: a range of intensities above a threshold map to forward rates of movement through the sequence of images while a range of intensities below the threshold map to backwards rates of movement through the sequence of images. In some embodiments, the user interface does not loop the sequence of images. So, when the initial image is displayed, a contact with an intensity above the threshold plays the images forward at a rate proportional to the contact intensity and stops when the final image is reached. When the user eases off of the contact such that the contact intensity drops below the threshold, the device plays the images backwards at a rate based on the contact intensity and stops when the initial image is reached.

FIG. 6Y illustrates a user interface 640. In some embodiments, user interface 640 is a lock-screen user interface. For example, a user may lock device 100 so that she can put device 100 in her pocket without inadvertently performing operations on device 100 (e.g., accidentally calling someone). In some embodiments, when the user wakes up device 100 (e.g., by pressing any button), lock screen user interface 640 is displayed. In some embodiments, a swipe gesture on touch screen 112 initiates a process of unlocking device 100.

Portable multifunction device 100 displays, in user interface 640, a representative image 602-1 in a grouped sequence of images 602. In some embodiments, the sequence of images 602 is an enhanced photo that the user has chosen for her lock screen (e.g., chosen in a settings user interface). In the example shown in FIGS. 6Y-6BB, the sequence of images is an enhanced photo that depicts a scene in which a cat 612 walks into the field of view and rolls his back on the ground. Meanwhile, a bird 614 lands on a branch. In some embodiments, the sequence of images includes one or more images acquired after acquiring the representative image (e.g., the representative image 602-1 is an initial image in the sequence of images).

In some embodiments, user interface 640 also includes quick access information 642, such as time and date information.

While displaying representative image 602-1 on touch screen 112, device 100 detects an input 644 (e.g., a press-and-hold gesture) for which a characteristic intensity of a contact on touch screen 112 exceeds an intensity threshold. In this example, the intensity threshold is the light press threshold $IT_L$. As shown in intensity diagram 618 (FIG. 6Y), input 644 includes a contact that exceeds light press threshold $IT_L$.

Figure 6Z:
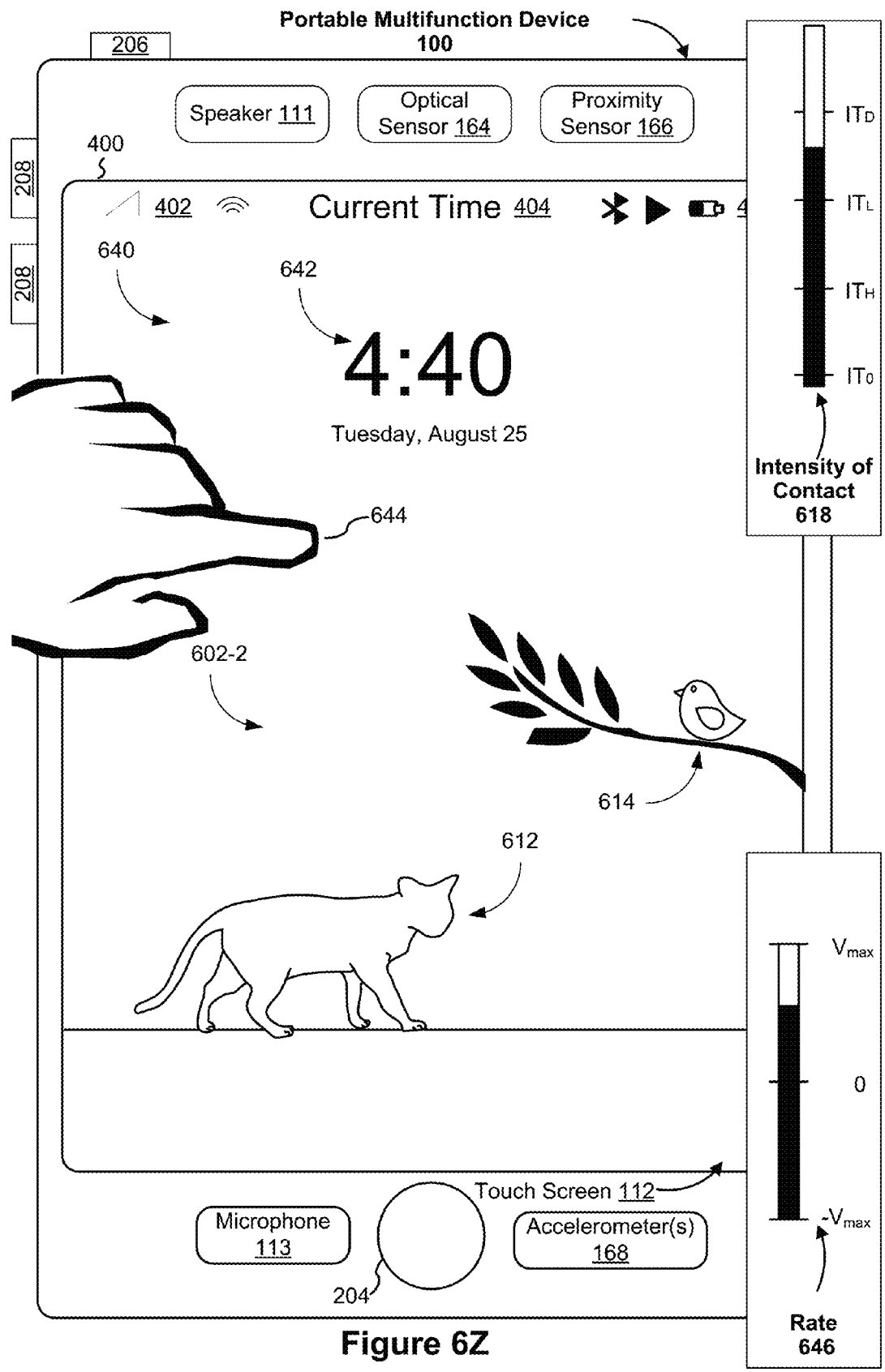
Figure 6A:
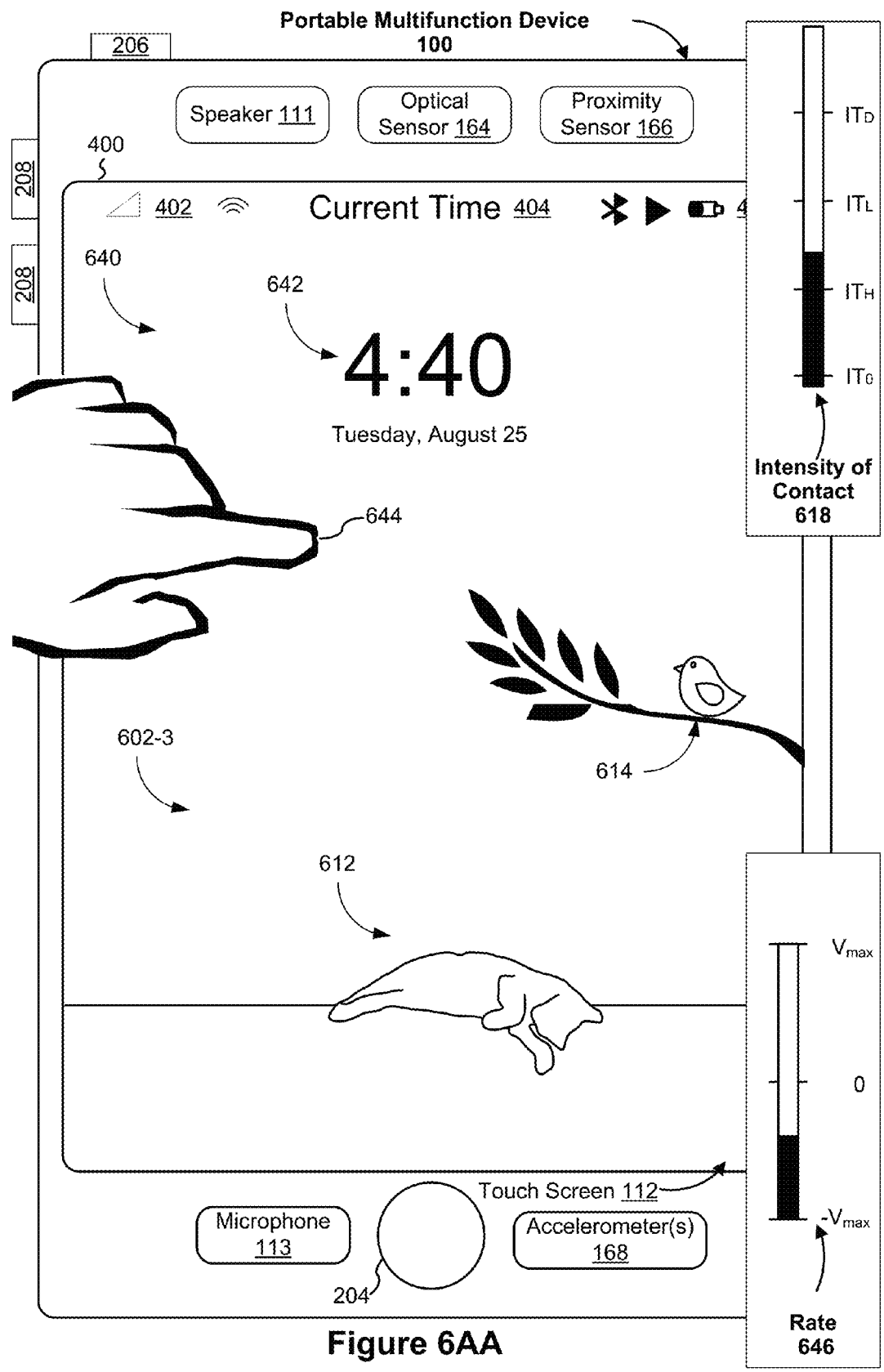
Figure 6B:
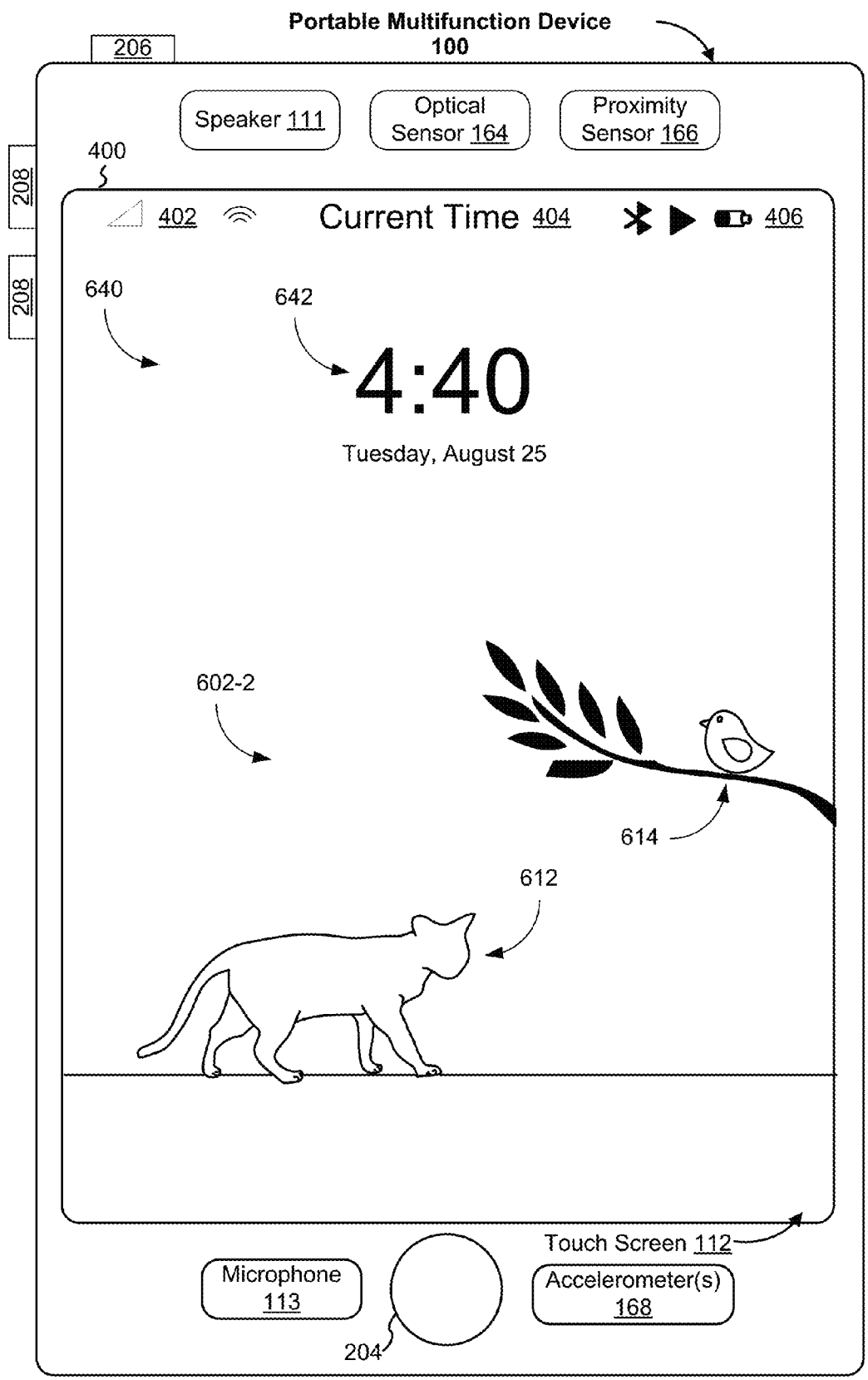
Figure 6C:
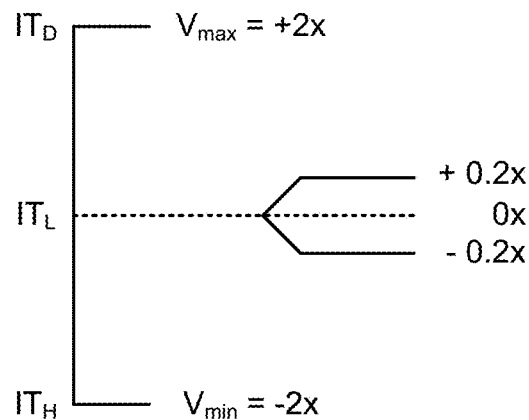
Figure 6D:
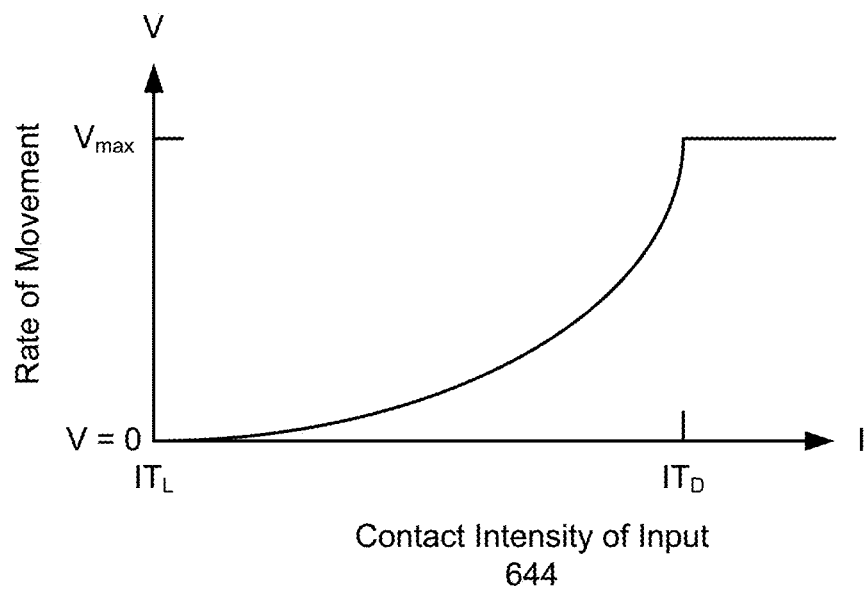
Figure 6E:
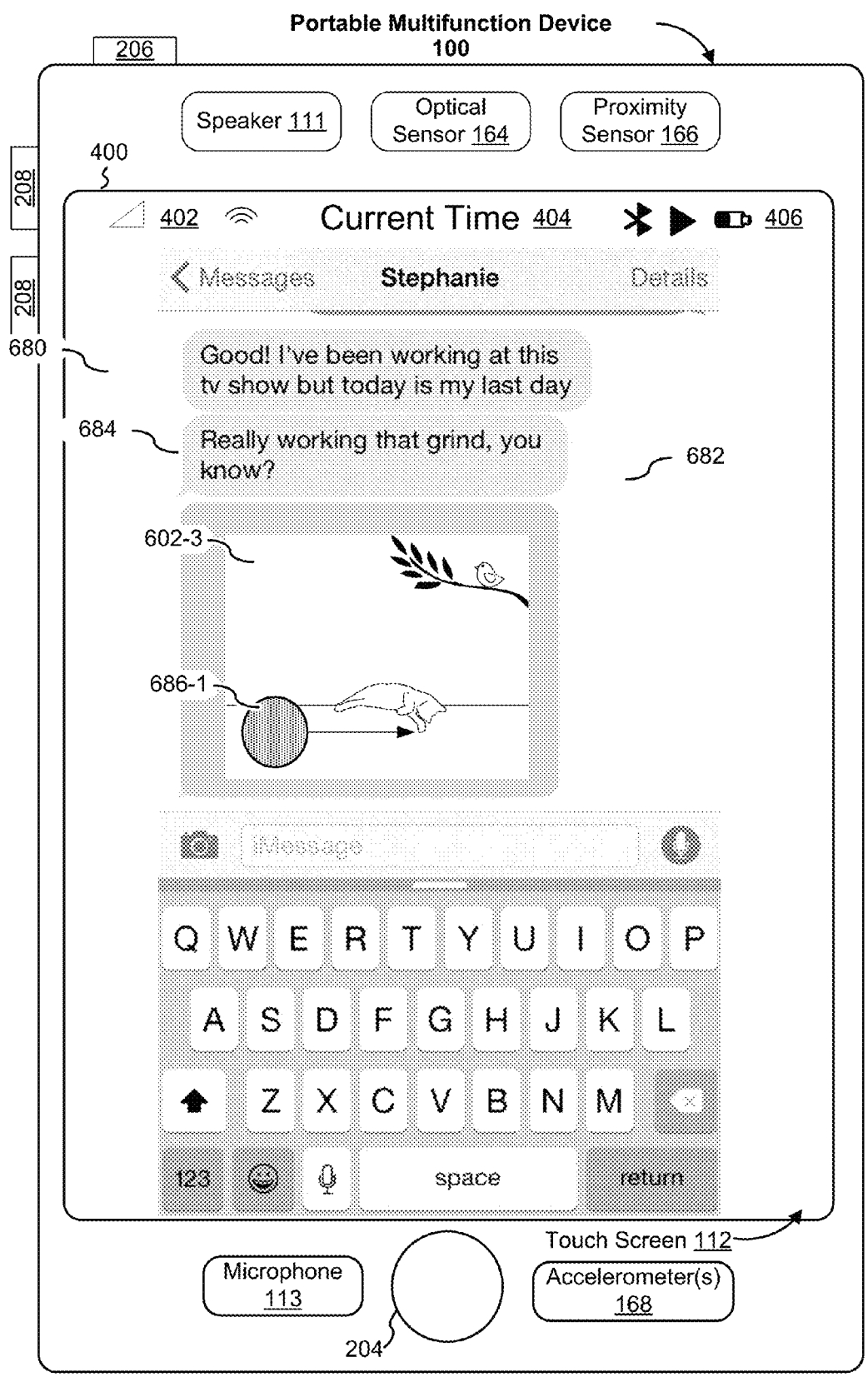
Figure 6F:
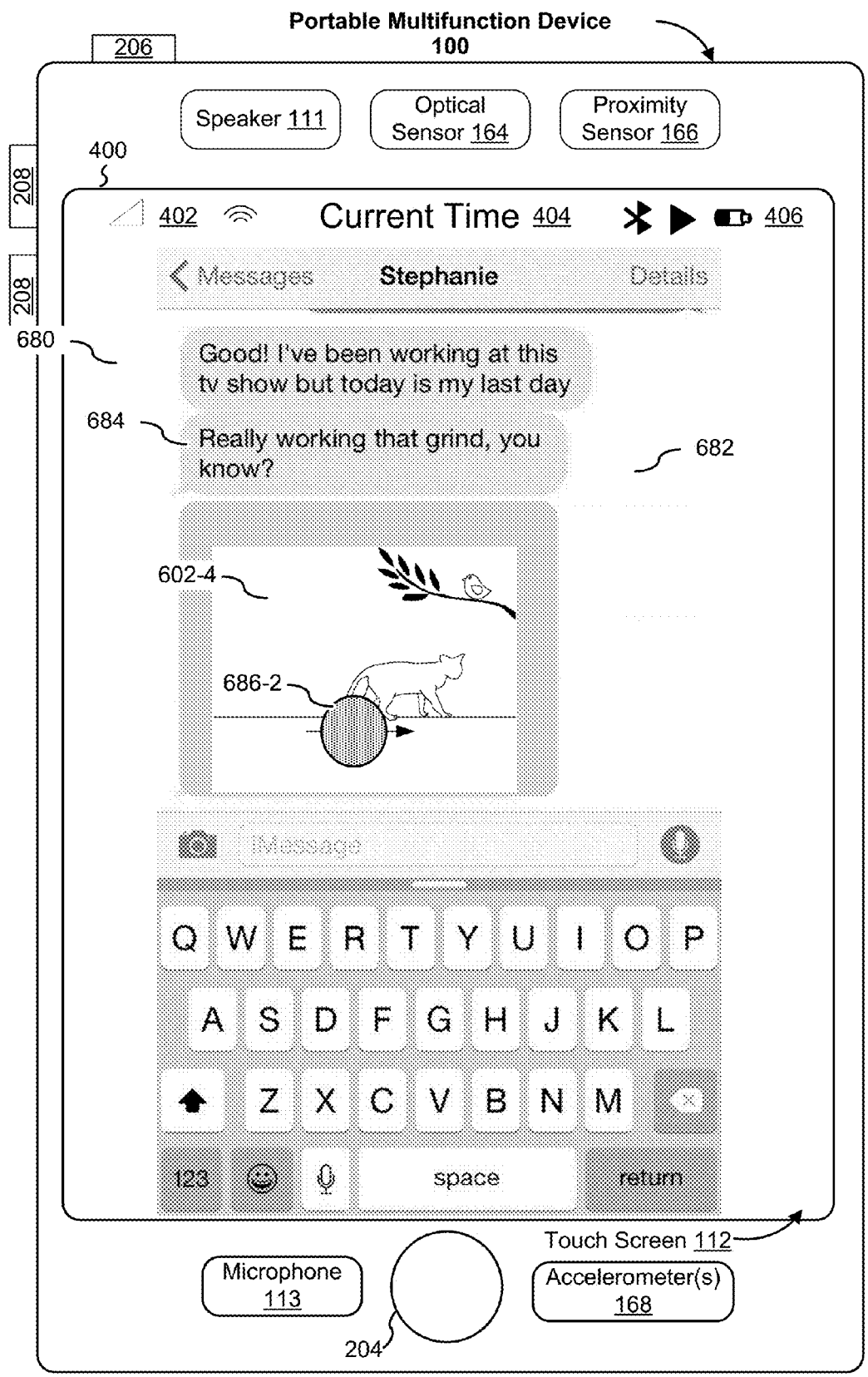

In response to detecting the increase in the characteristic intensity of the contact, the device advances in chronological order through the one or more images acquired after acquiring representative image 602-1 at a rate that is determined based at least in part on the characteristic intensity of the contact of input 644. So, for example, display of representative image 602-1 (FIG. 6Y) is replaced with display of image 602-2 (FIG. 6Z) at a rate, as indicated in rate diagram 646 (FIG. 6Y), that is based on the contact intensity shown in intensity diagram 618 (FIG. 6Y). Image 602-2 is an image in the sequence of images 602 that was acquired after representative image 602-1. Display of image 602-2 (FIG. 6Z) is replaced with display of image 602-3 (FIG. 6AA) at a faster rate, as indicated in rate diagram 646 (FIG. 6Z), that is based on the contact intensity shown in intensity diagram 618 (FIG. 6Z). Image 602-3 is an image in the sequence of images 602 that was acquired after image 602-2.

In FIG. 6AA, the intensity of input 644's contact drops below $IT_L$, which in this example is the threshold for playing backwards or forwards through the sequence of images 602. As a result, image 602-3 (FIG. 6AA) is replaced with previous image 602-2 (FIG. 6BB) at a backwards rate that is based on input 644's current contact intensity.

In some embodiments, the rate, indicated in rate diagrams 646 (FIGS. 6Y-6AA) is proportional to an absolute value of the difference between $IT_L$ and input 644's current contact intensity, as shown in intensity diagrams 618 (FIGS. 6Y-6AA). The direction of movement is based on whether the current contact intensity is above (e.g., forward movement) or below (e.g., backward movement) the $IT_L$ (or any other appropriate threshold).

In some embodiments, the rate forward or backward is determined in real-time or near-real time, so that the user can speed up or slow down movement through the images (either in the forward or reverse direction) by changing the characteristic intensity of the contact. Thus, in some embodiments, the user can scrub forwards and backwards through sequence of images 602 (e.g., in between the initial and final images in the sequence of images) by increasing and decreasing the contact intensity of user input 644.

In accordance with some embodiments, FIGS. 6CC-6DD are graphs illustrating how the rate of movement, V, relates to input 644's current contact intensity, I.

As shown in FIG. 6CC, the threshold for forward/backwards movement, in this example, is the light press threshold $IT_L$. When input 644's current contact intensity is equal to the light press threshold $IT_L$, device 100 does not advance through the sequence of images in either chronological or reverse-chronological order. Thus, device 100 maintains a currently displayed image from sequence of image 602 (e.g., the rate of movement is equal to 0×, where 1× is the speed at which the images in sequence of images 602 were acquired). When input 644's current contact intensity is just above the light press threshold $IT_L$, device 100 advances through the sequence of images in chronological order at a first rate (e.g., 0.2×). When input 644's current contact intensity is the same amount below the light press threshold $IT_L$, device 100 advances through the sequence of images in reverse-chronological order at the first rate (e.g., advances at a −0.2× rate, where the minus sign denotes reverse-chronological order or backwards playback).

In this example, device 100 has a maximum rate $V_{max}$ (e.g., plus or minus 2×) which is reached when input 644's current contact intensity reaches deep press threshold $IT_D$ (or any other upper threshold) and hint threshold $IT_H$ (or any other appropriate lower threshold), respectively. The rate of movement through the sequence of images is constrained by a maximum reverse rate while the contact is detected on the touch-sensitive surface FIG. 6DD shows an exemplary response curve where the rate of movement increases exponentially from 0× to $V_{max}$ between light press threshold $IT_L$ and deep press threshold $IT_D$. Above deep press threshold $IT_D$, the rate of movement is constant.

In accordance with some embodiments, certain circumstances optionally result in device 100 deviating from a rate of movement based solely on input 644's current contact intensity. For example, as device 100 nears a final image while advancing forward through sequence of images 602, device 100 slows the rate of movement as compared to what the rate of movement would be if it were based solely on input 644's current contact intensity (e.g., device 100 "brakes" slightly as it reaches the end of the sequence of images). Similarly, in some embodiments, as device 100 nears an initial image while advancing backwards through sequence of images 602, device 100 slows the rate of movement as compared to what the rate of movement would be if it were based solely on input 644's current contact intensity (e.g., device 100 "brakes" slightly as it reaches the beginning of the sequence of images going backwards).

FIGS. 6EE-6FF illustrate embodiments in which sequence of images 602 is displayed and/or played back in a user interface 680 for a messaging application (e.g., Messages from Apple Inc. of Cupertino, Calif.). In some embodiments, sequence of images 602 is a message in a message conversation displayed in a scrollable region 682 of the messaging application (e.g., the user can scroll up or down to view earlier or later messages in region 682). In some embodiment, representative image 602-3 is initially displayed in messaging application 680. In some embodiments, sequence of images 602 is displayed (e.g., played-back) in response to a swipe/drag gesture. In some embodiments, display of images in sequence of images 602 is controlled by a position of a drag gesture (e.g., the user can scrub forwards or backwards in sequence of images 602 by moving drag gesture to the right or left, respectively.). For example, in FIGS. 6EE-6FF, contact 686 moves from location 686-1 (FIG. 6EE) to location 686-2 (FIG. 6FF), which advances sequence of images 602 from representative image 602-3 (FIG. 6EE) to image 602-4 (FIG. 6FF).

In some embodiments, a swipe gesture triggers playback of sequence of images 602 upon termination (e.g., lift off) of the swipe gesture. In some embodiments, sequence of images 602 does not play back during a drag gesture but instead plays back up termination (e.g., lift off) of a drag gesture. In some embodiments, sequence of images 602 plays back in response to a press-and-hold gesture (e.g., sequence of images 602 in messaging application 680 plays back in accordance with any of the embodiments described with reference to FIGS. 6A-6DD). In some embodiments, sequence of images 602 in messaging application 680 plays back in accordance with any of the embodiments described with reference to FIGS. 7A-7CC.

In some embodiments, sequence of images 602 is displayed (e.g., played back) as the scrollable region of the messaging application is scrolled and the images are, in some circumstances interspersed with text messages 684 or other messages sent and received via the messaging application (e.g., in conversation bubbles). In some circumstance, a user may have obtained (e.g., taken, captured) a respective sequence of images on her own portable multifunction device 100 and also have received a different sequence of images from a different user (e.g., in a messaging application). Thus, in some circumstances, the plurality of sequences of images stored on portable multifunction device 100 includes at least one sequence of images obtained using a camera on portable multifunction device 100 and at least one sequence of images that was obtained using a camera on a different device, distinct from portable multifunction device 100.

Figure 7A:
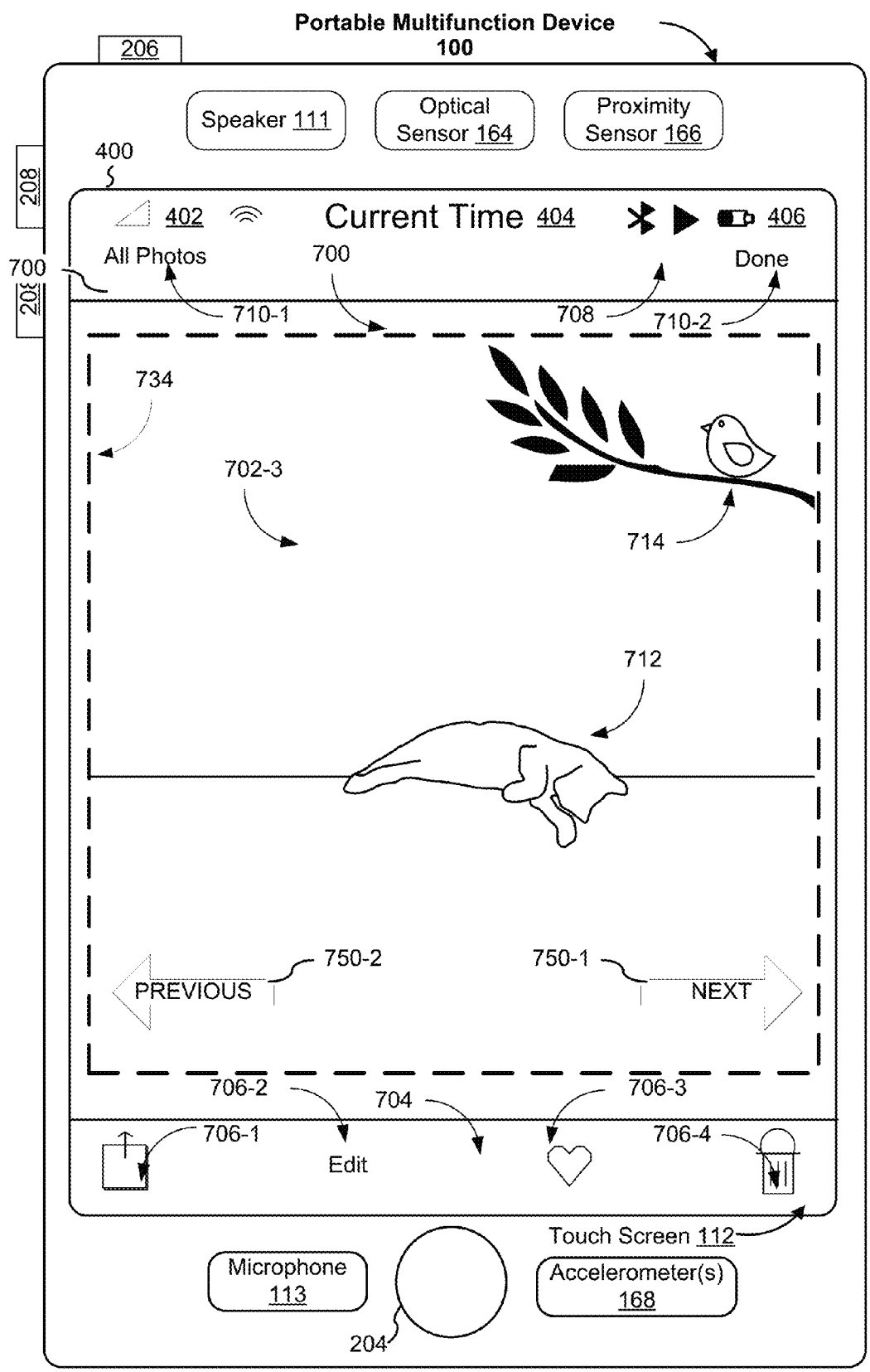
FIGS. 7A-7CC illustrate exemplary user interfaces for navigating through sequences of related images in accordance with some embodiments.
Figure 7B:
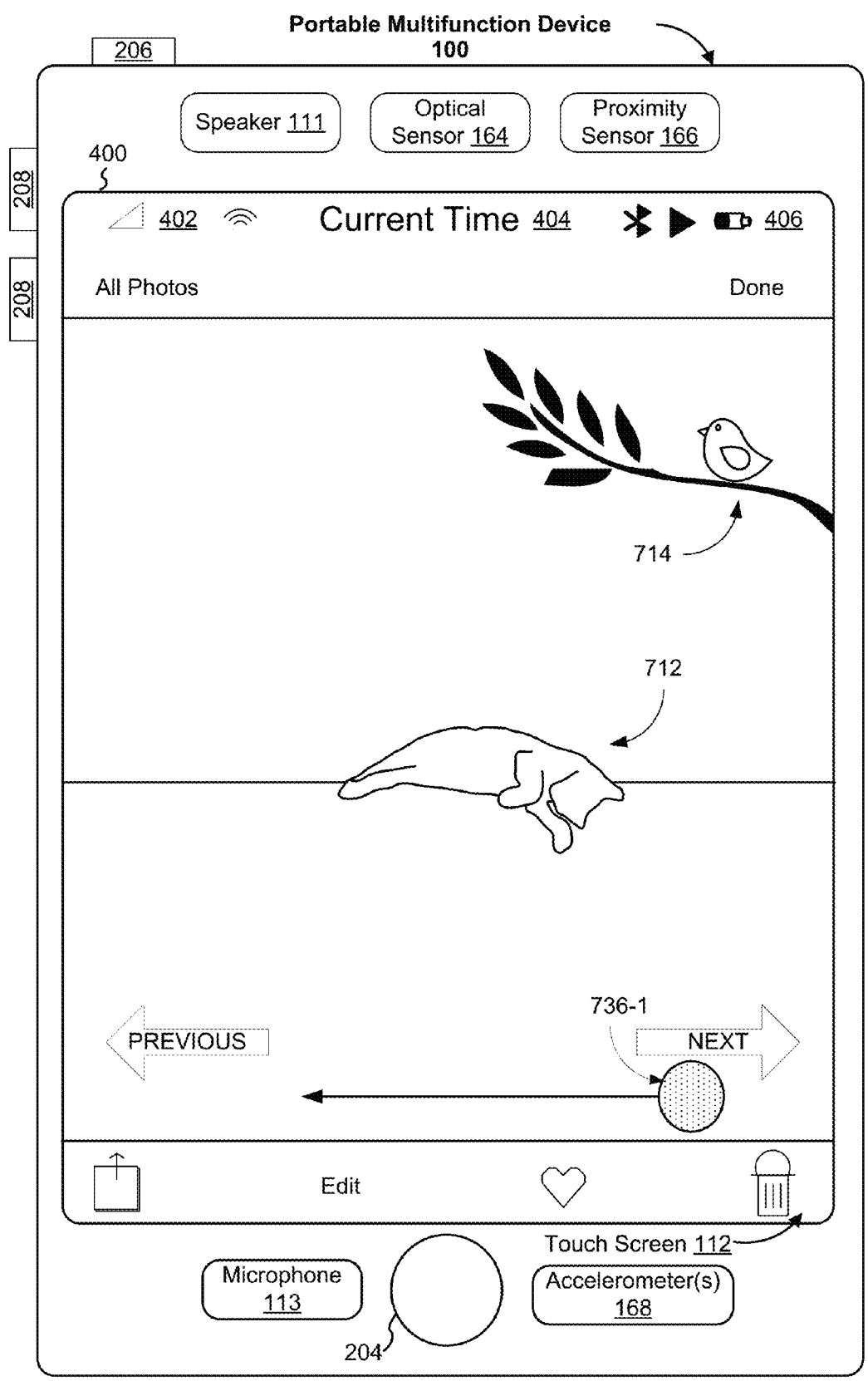
Figure 7C:
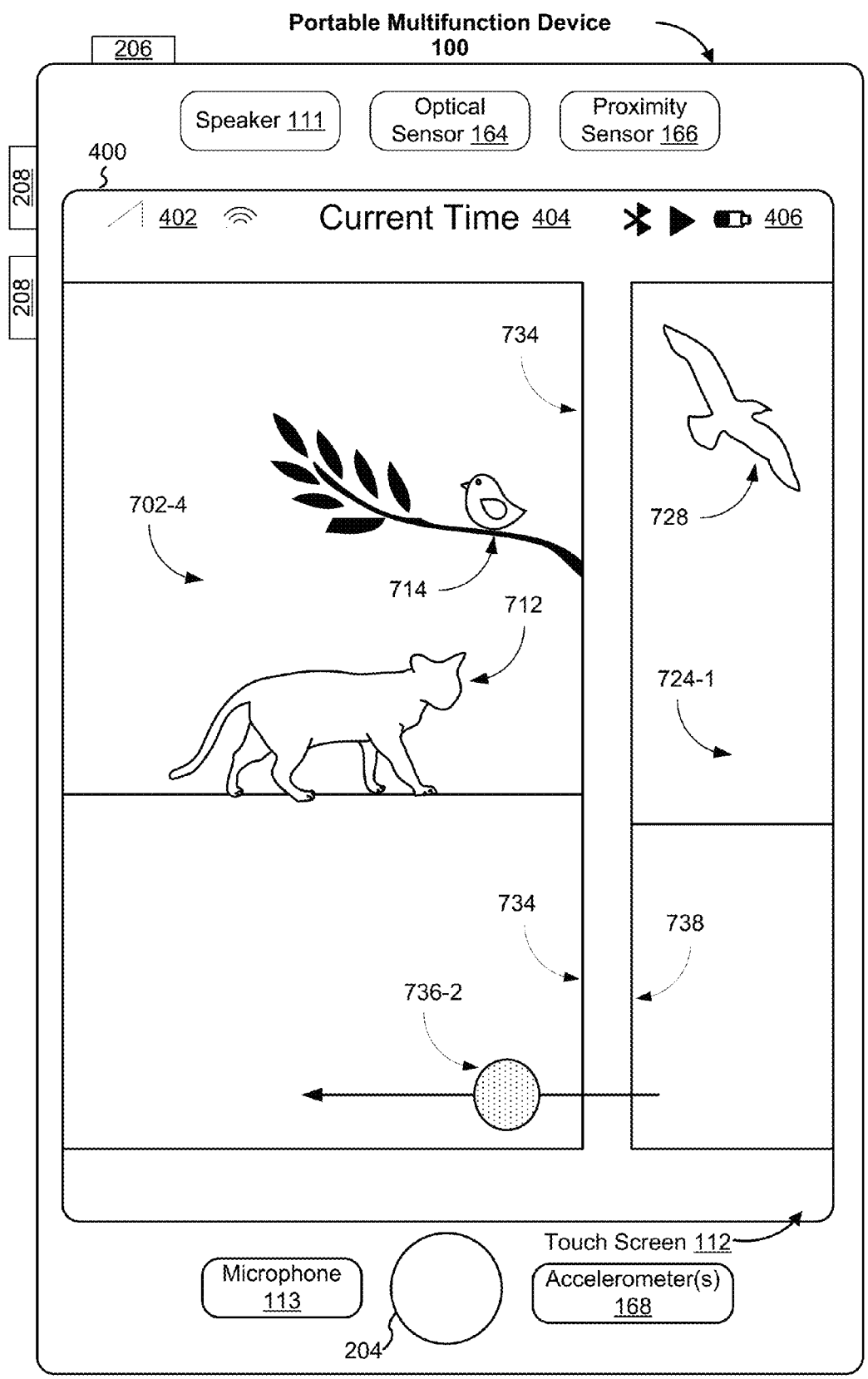

FIGS. 7A-7CC illustrate exemplary user interfaces for navigating through sequences of related images, sometimes referred to as enhanced photographs, in accordance with some embodiments. The user interfaces in these figures are used to illustrate the processes described below, including the processes in FIGS. 9A-9G, 10A-10M, 11A-11I, 12A-12B, 24A-24E, 25A-25C, 26A-26D, and 27A-27E. Although the examples which follow will be given with reference to inputs on a touch-screen display (where the touch-sensitive surface and the display are combined, as shown on portable multifunction device 100), in some embodiments, the device detects inputs on a touch-sensitive surface 451 that is separate from the display 450, as shown in FIG. 4B.

Portable multifunction device 100 displays user interface 700. User interface 700 optionally includes one more toolbars. For example, as shown, user interface 700 includes an operations toolbar 704 that includes a plurality of affordances 706 (e.g., send affordance 706-1 that allows the user to send first sequence of images 702 to other users using e-mail, messaging, or other applications; edit affordance 706-2 that brings up a user interface for editing first sequence of images 702; a favorites affordance 706-3 through which the user may indicate that first sequence of images 702 is one of her favorites; and delete affordance 706-4 that allows the user to delete first sequence of images 702). As another example, user interface 700 includes a navigation toolbar 706 that includes another plurality of affordances (e.g., all photos affordance 710-1 that navigates to a user interface for navigating the user's photos; "done" affordance 710-2 that navigates to a different user interface, such as a user interface for obtaining a photo).

FIGS. 7A-7CC illustrate an example in which portable multifunction device 100 stores a plurality of sequences of images (e.g., first sequence of images 702, second sequence of images 724, third sequence of images 726, and fourth grouped sequence of images 760, FIGS. 7A-7CC). First grouped sequence of images 702 includes first representative image 702-3 (FIG. 7A), which was taken by a camera, one or more images acquired by the camera after acquiring first representative image 702-3 (e.g., image 702-4, FIG. 7C, and image 702-5, FIG. 7D), and one or more images acquired by the camera before acquiring first representative image 702-3 (e.g., image 702-2, FIG. 7H, and image 702-1, FIG. 7I). Thus, the chronological order (e.g., the order in which the images were taken by the camera) of first sequence of images 702 is: image 702-1; image 702-2; image 702-3; image 702-4; and image 702-5.

First sequence of images 702 depicts a scene in which a cat 712 walks into the field of view, rolls his back on the ground, and gets up and walks away. Meanwhile, a bird 714 lands on a branch. While in reality, such a scene may take several seconds to unfold, in some embodiments, first sequence of images 702 is captured in a short temporal window. For example, in some embodiments, any of the sequences of images described herein may depict the moments surrounding (e.g., within half a second or one second) the moment when its respective representative image was obtained. For example, the user's interest may have been piqued when cat 712 began rolling in the grass, prompting the user to take first representative image 702-3. In some embodiments, first sequence of images 702 includes images just before and just after first representative image 702-3 was obtained, such that first sequence of images 702 comprises an enhanced photo through which the moment can "come to life" when the user performs certain operations with respect to first representative image 702-3, as described herein.

Figure 7D:
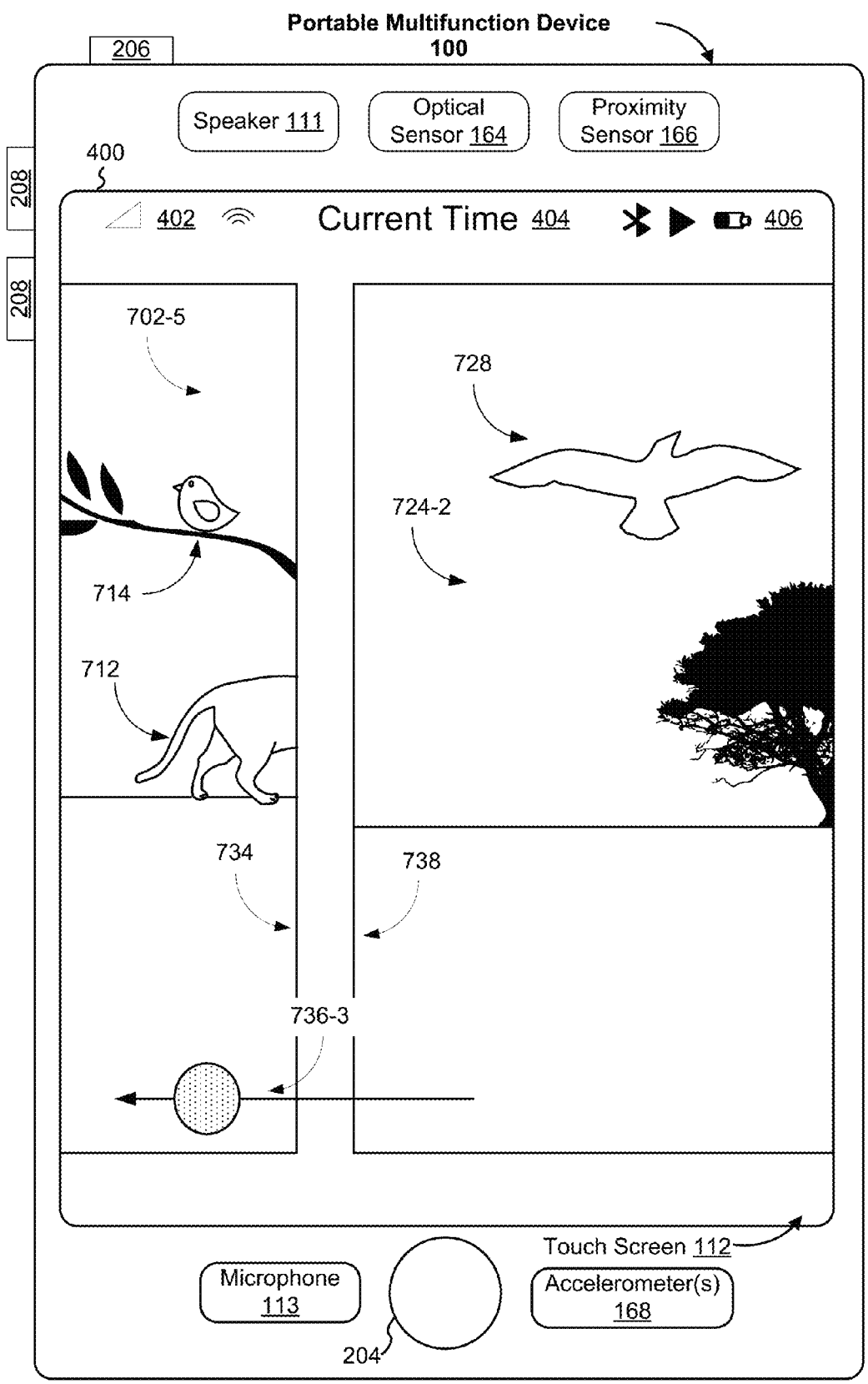

Second grouped sequence of images 724 includes second representative image 724-3 (FIG. 7F) and at least one or more images acquired by the camera before acquiring second representative image 724-3 (e.g., image 724-1, FIG. 7C, and image 724-2, FIG. 7D). Second sequence of images 724 includes one or more images acquired by the camera after acquiring second representative image 724-3. Thus, the chronological order (e.g., the order in which they were taken by the camera) of the second sequence of images 724 is: image 724-1; image 724-2; and image 724-3. Second sequence of images 724 depicts a scene in which a seagull 728 is flying in the distance (image 724-1, FIG. 7C), flies toward the foreground (image 724-2, FIG. 7D), and begins to fly away again (image 724-3, FIG. 7F).

Figure 7E:
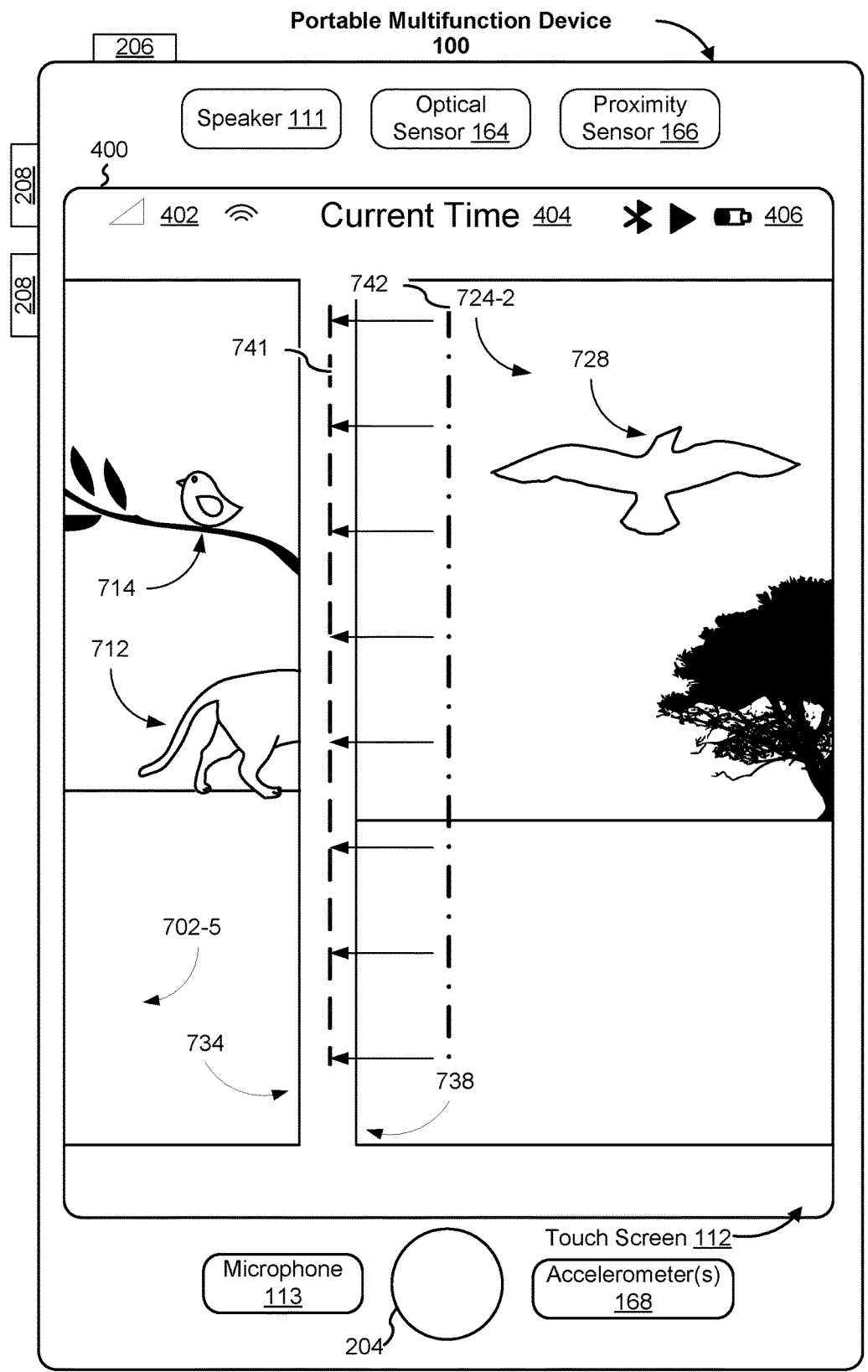
Figure 7F:
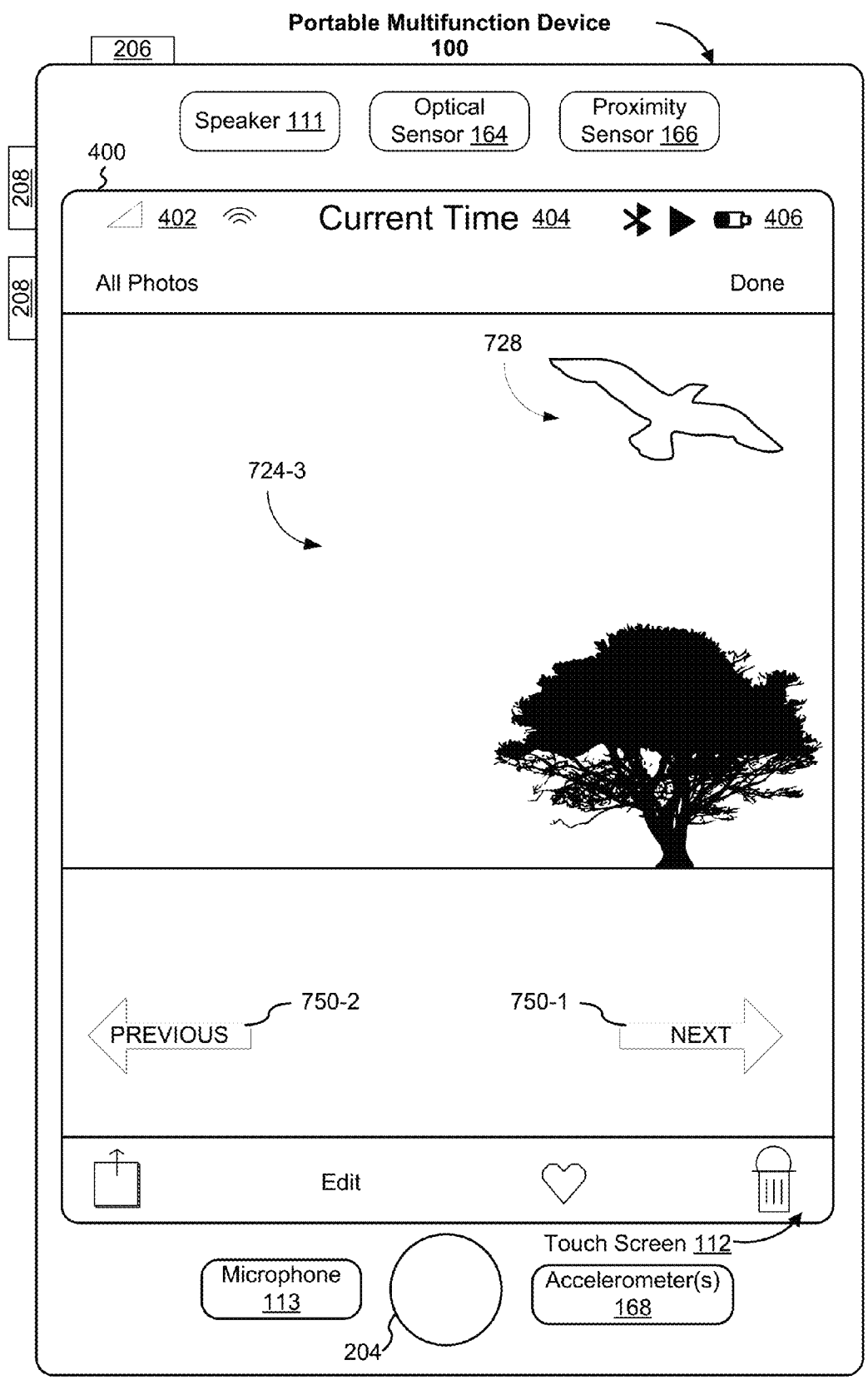
Figure 7G:
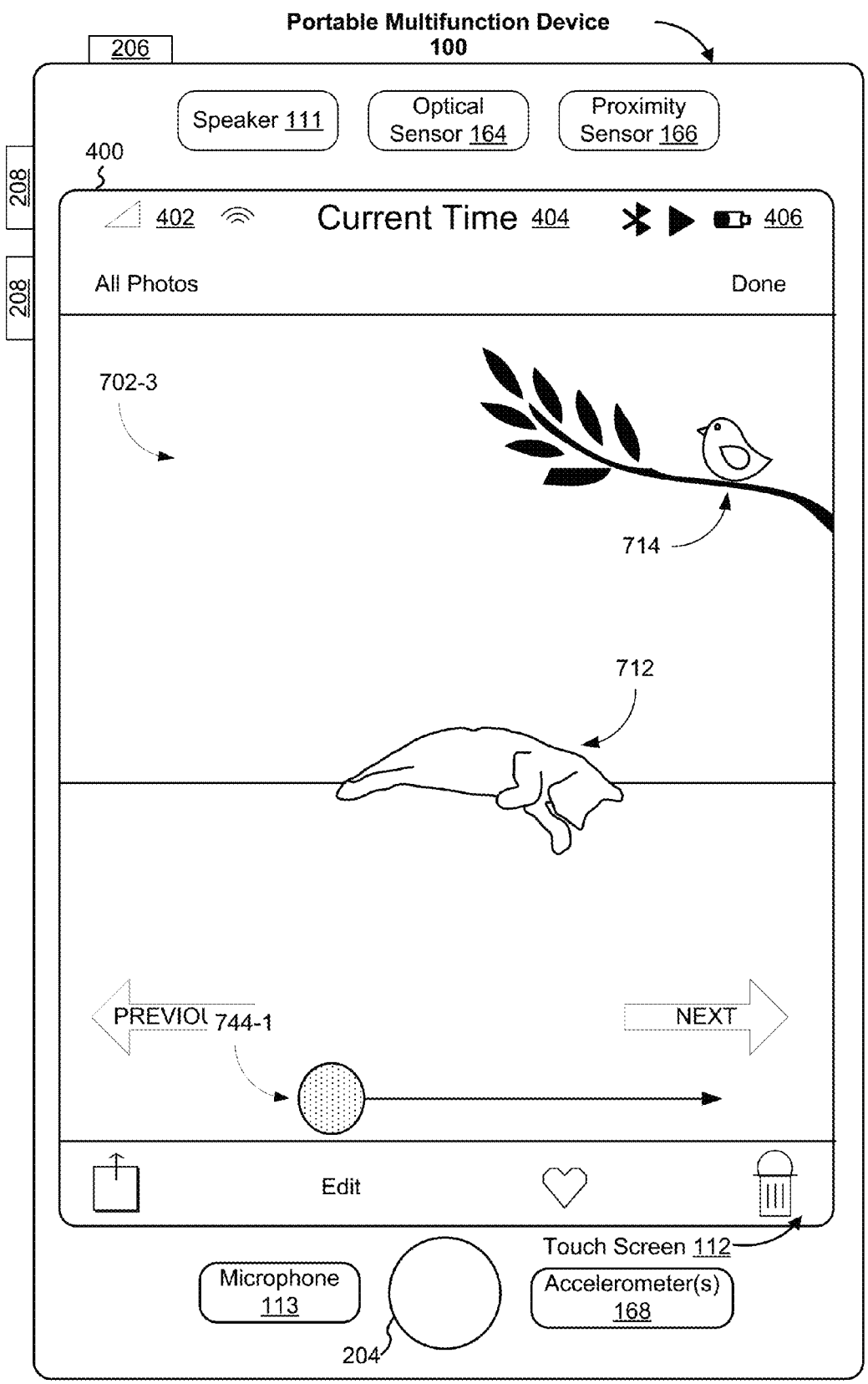
Figure 7H:
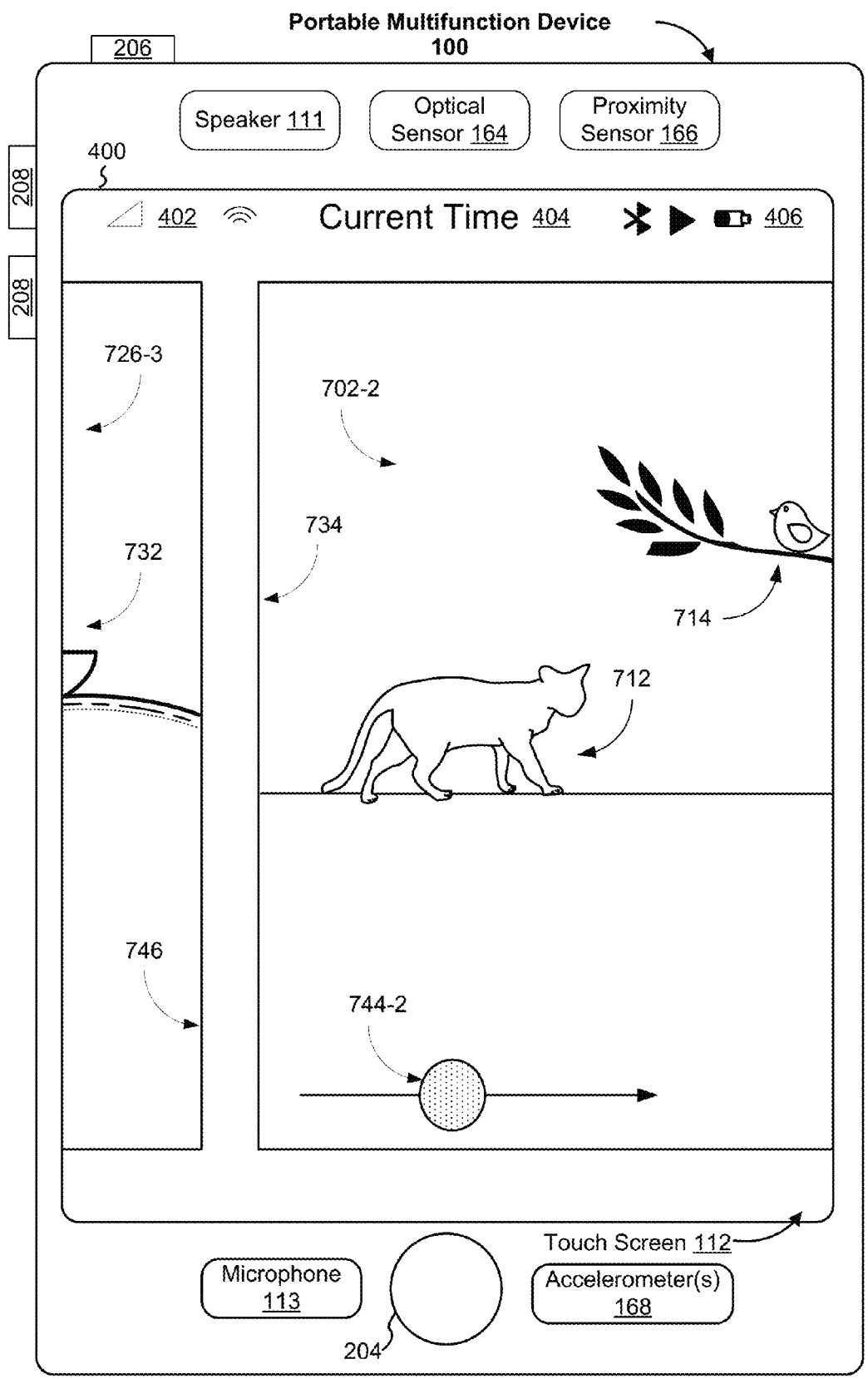
Figure 7I:
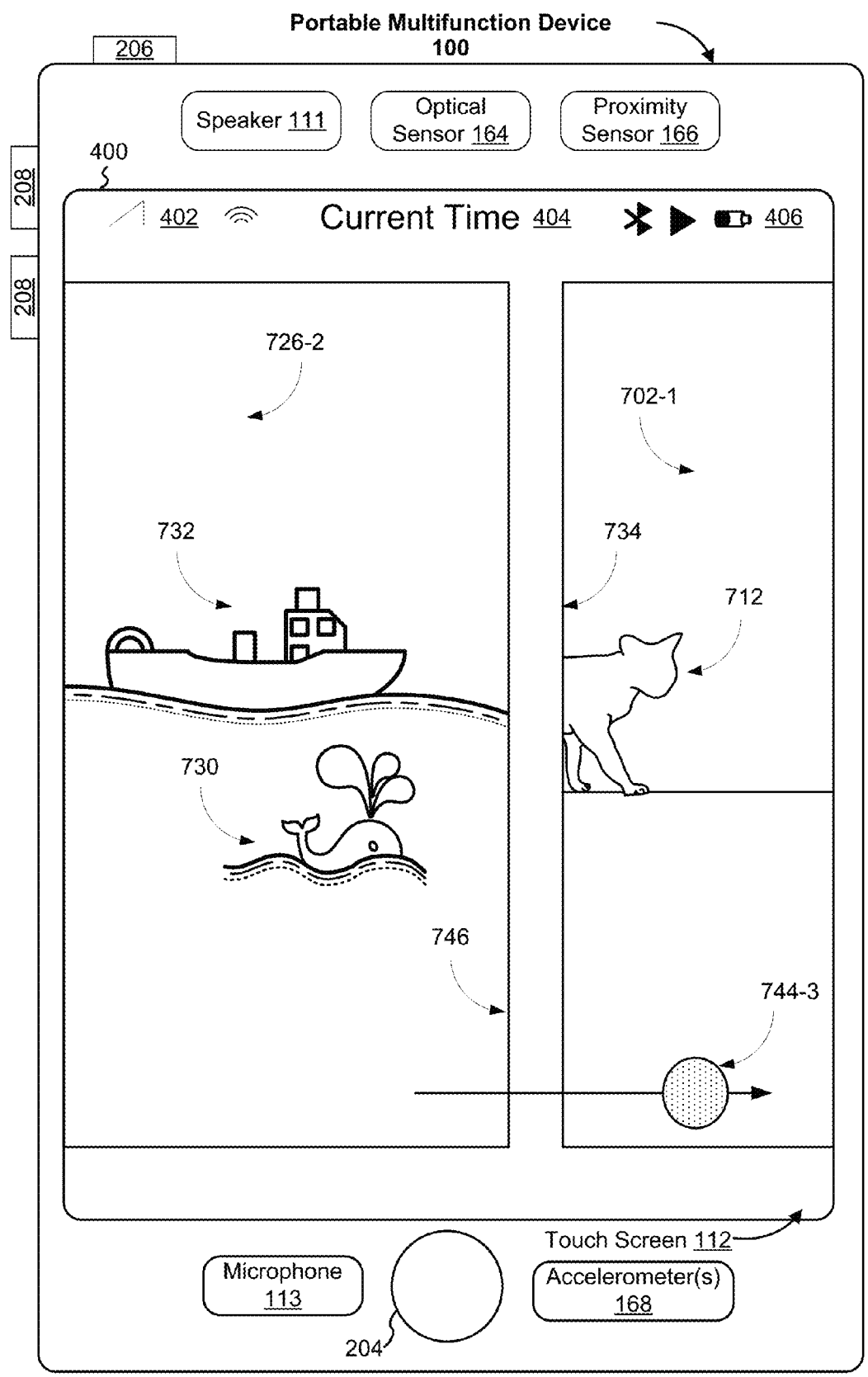

Third grouped sequence of images 726 includes third representative image 726-1 and at least one or more images acquired by the camera after acquiring third representative image 726-1 (e.g., image 726-3, FIG. 7H, and image 724-2, FIG. 7I). Third sequence of images 726 includes one or more images acquired by the camera before acquiring third representative image 726-1. Thus, the chronological order (e.g., the order in which they were taken by the camera) of the third sequence of images 726 is: image 726-1; image 726-2; and image 726-3. Third sequence of images 726 depicts a scene in which a whale 730 breaches (image 726-1, FIG. 7K), swims even in the field of view with a boat 732 (image 726-2, FIG. 7I), and disappears from the field of view, having dived into the ocean (image 726-3, FIG. 7H).

Figure 7J:
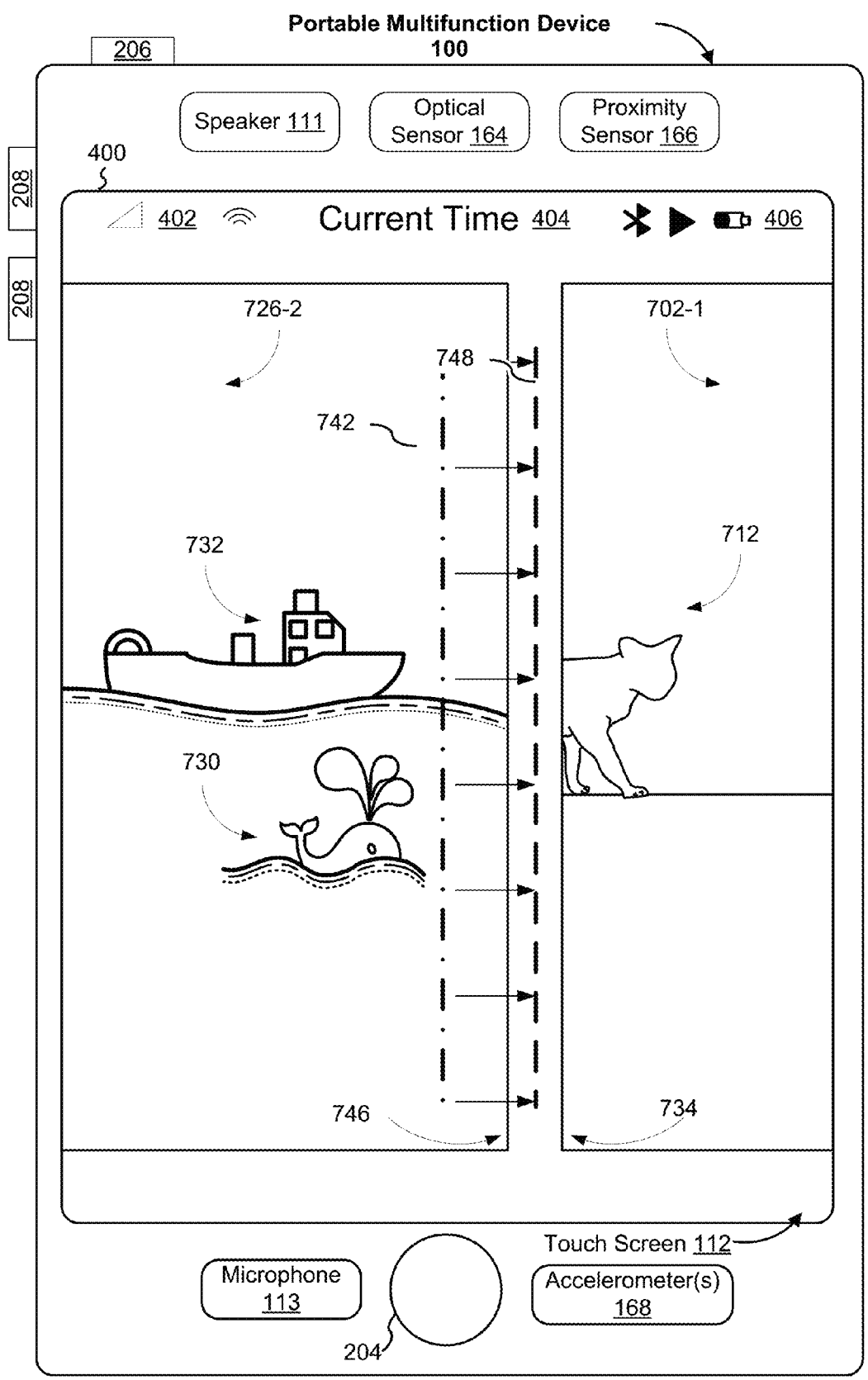
Figure 7K:
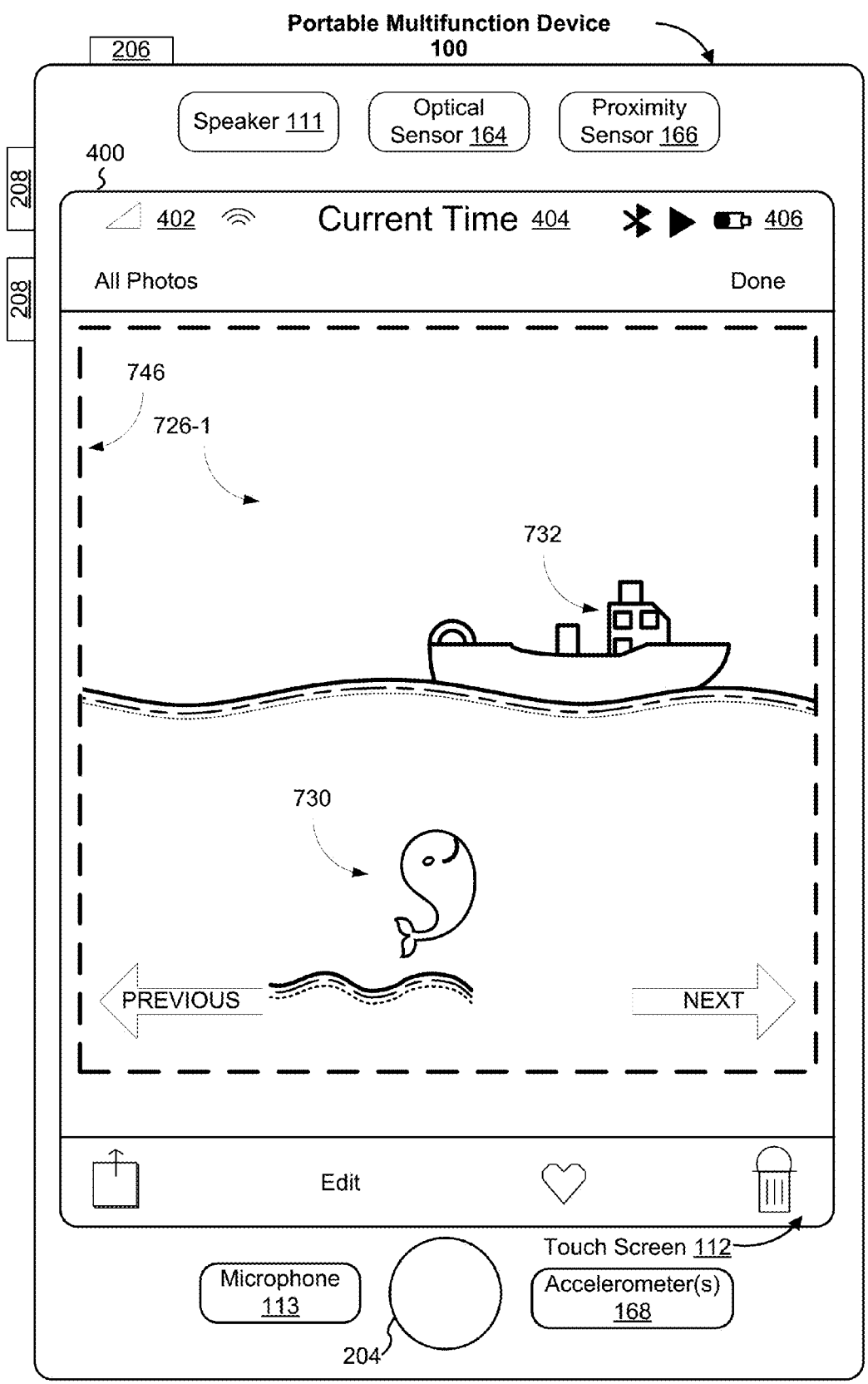
Figure 7L:
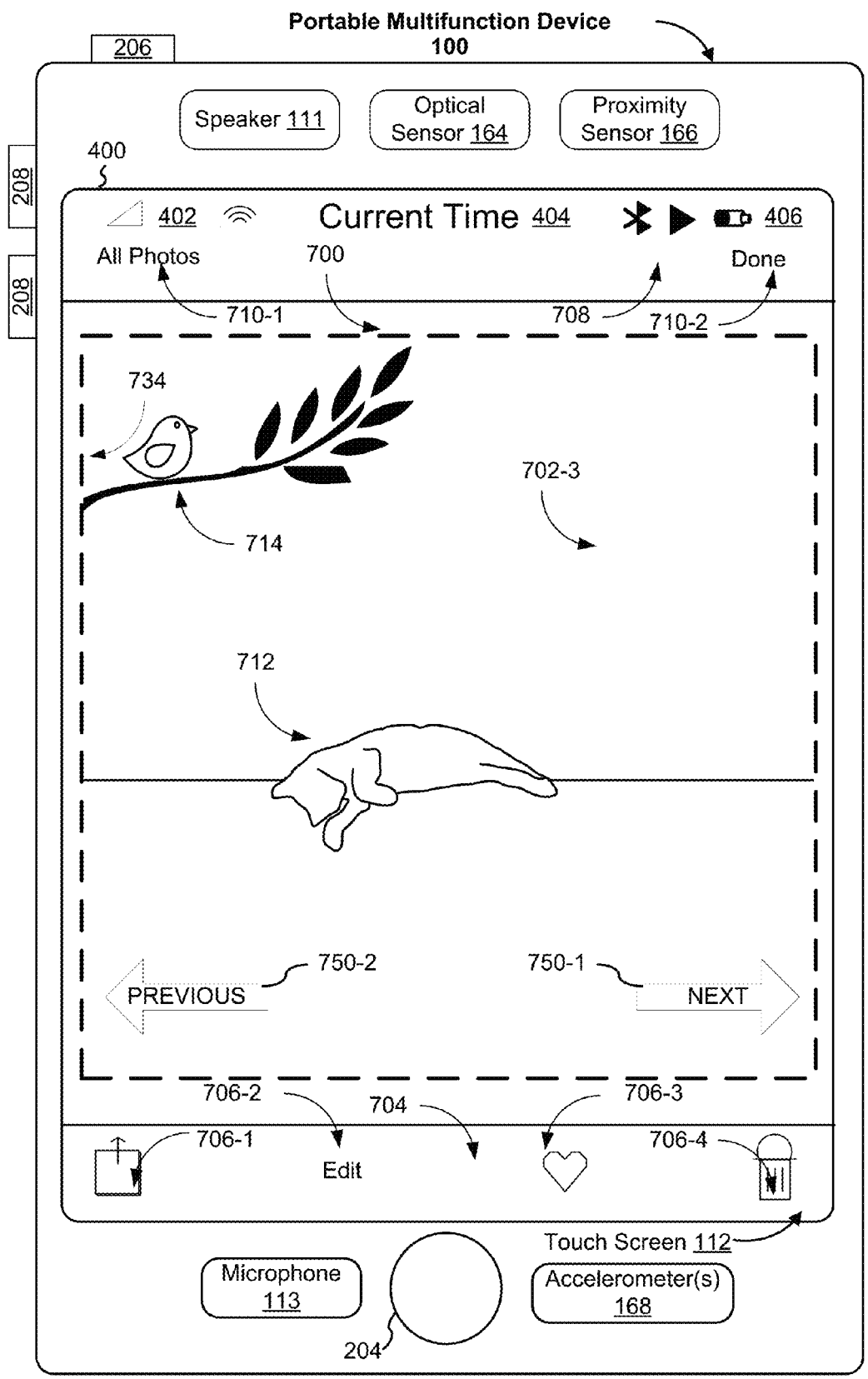
Figure 7M:
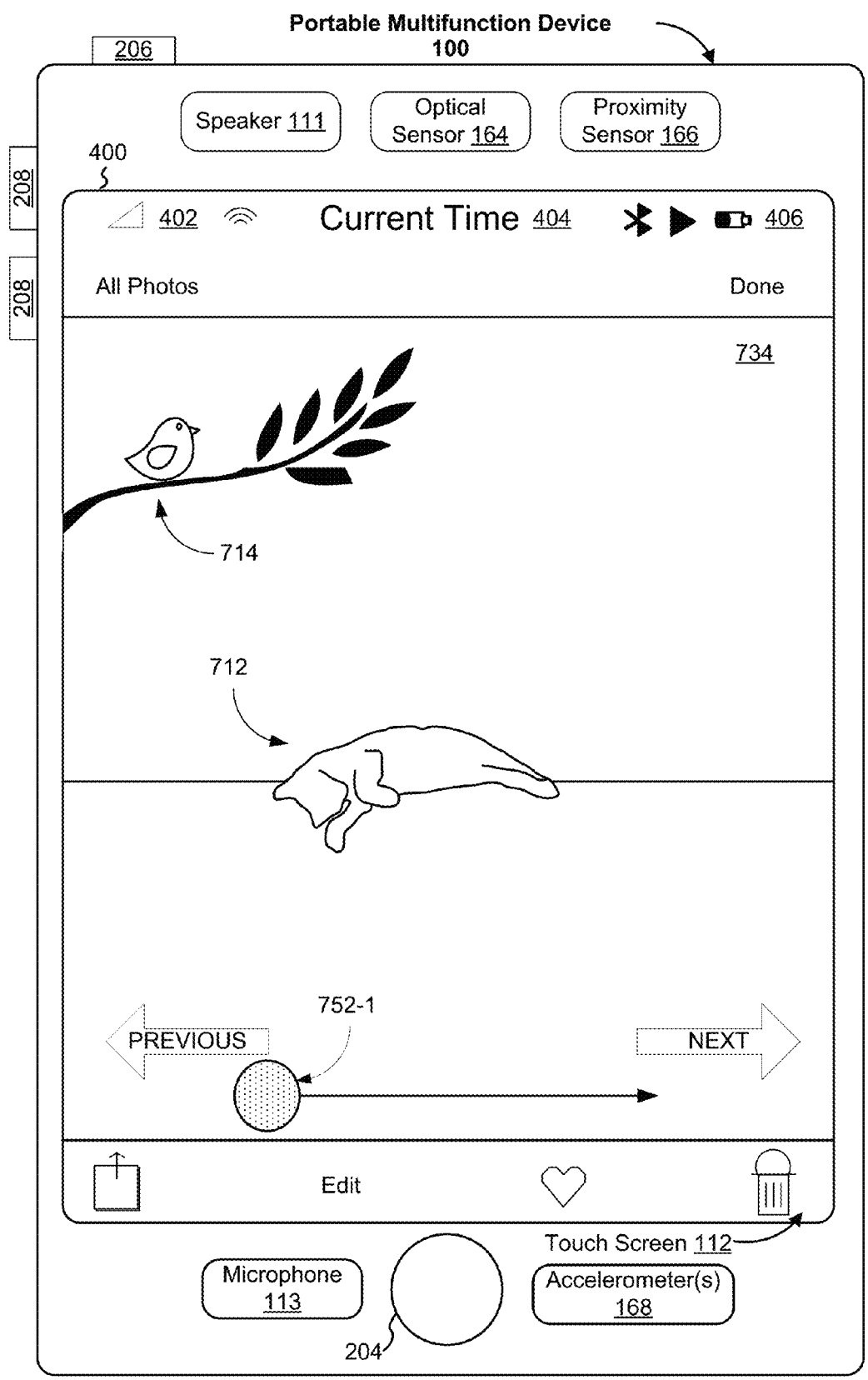
Figure 7N:
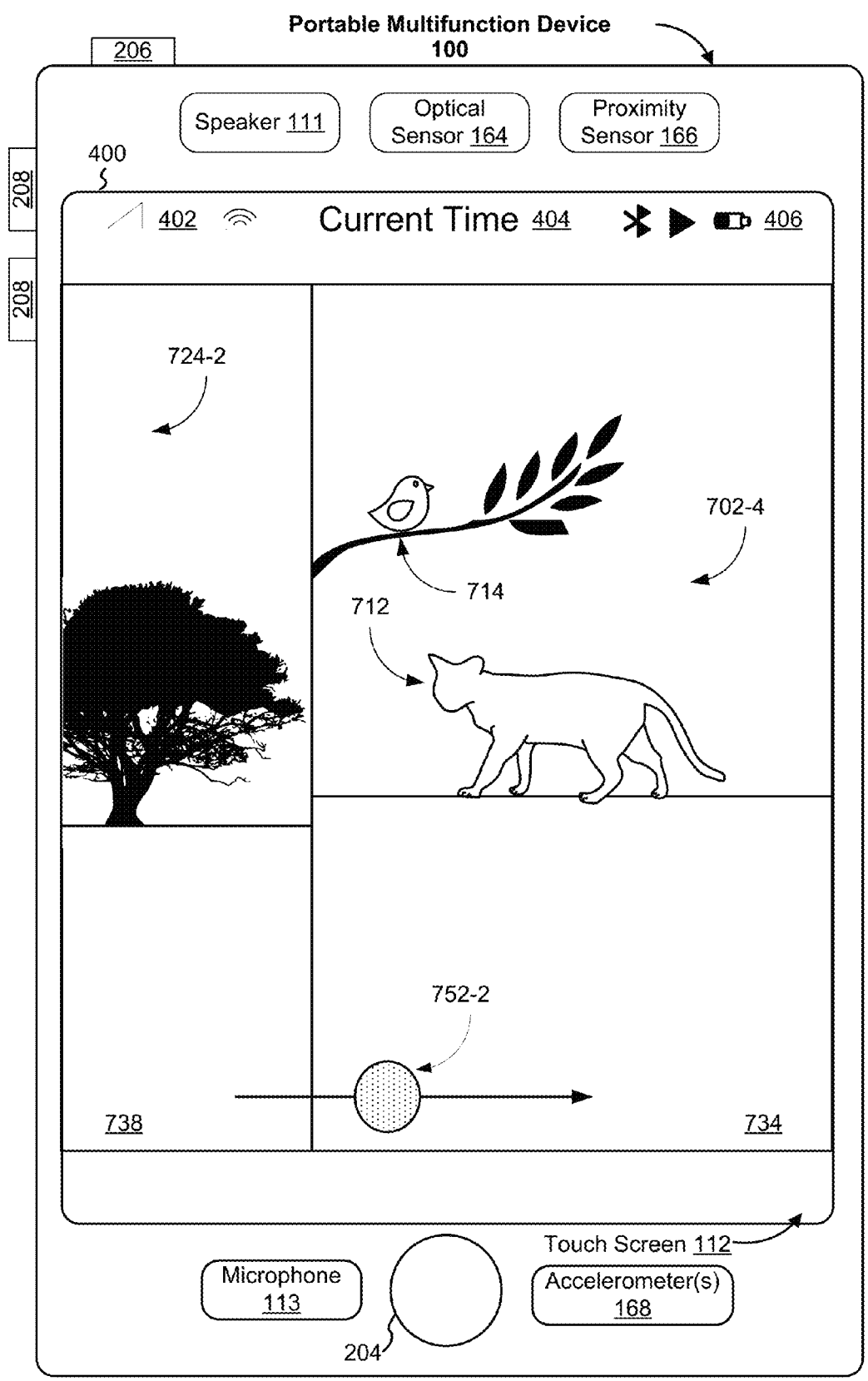
Figure 7O:
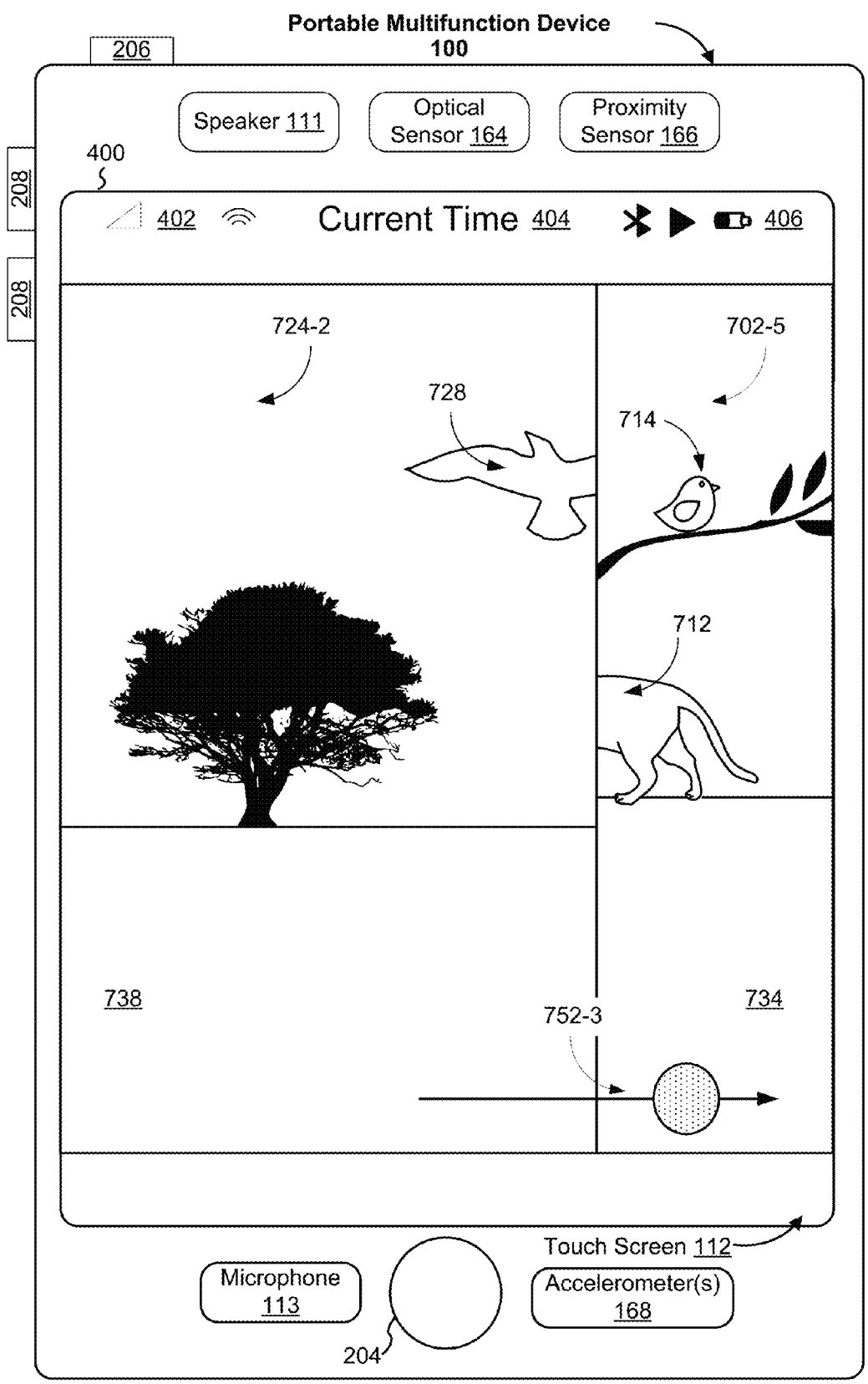
Figure 7P:
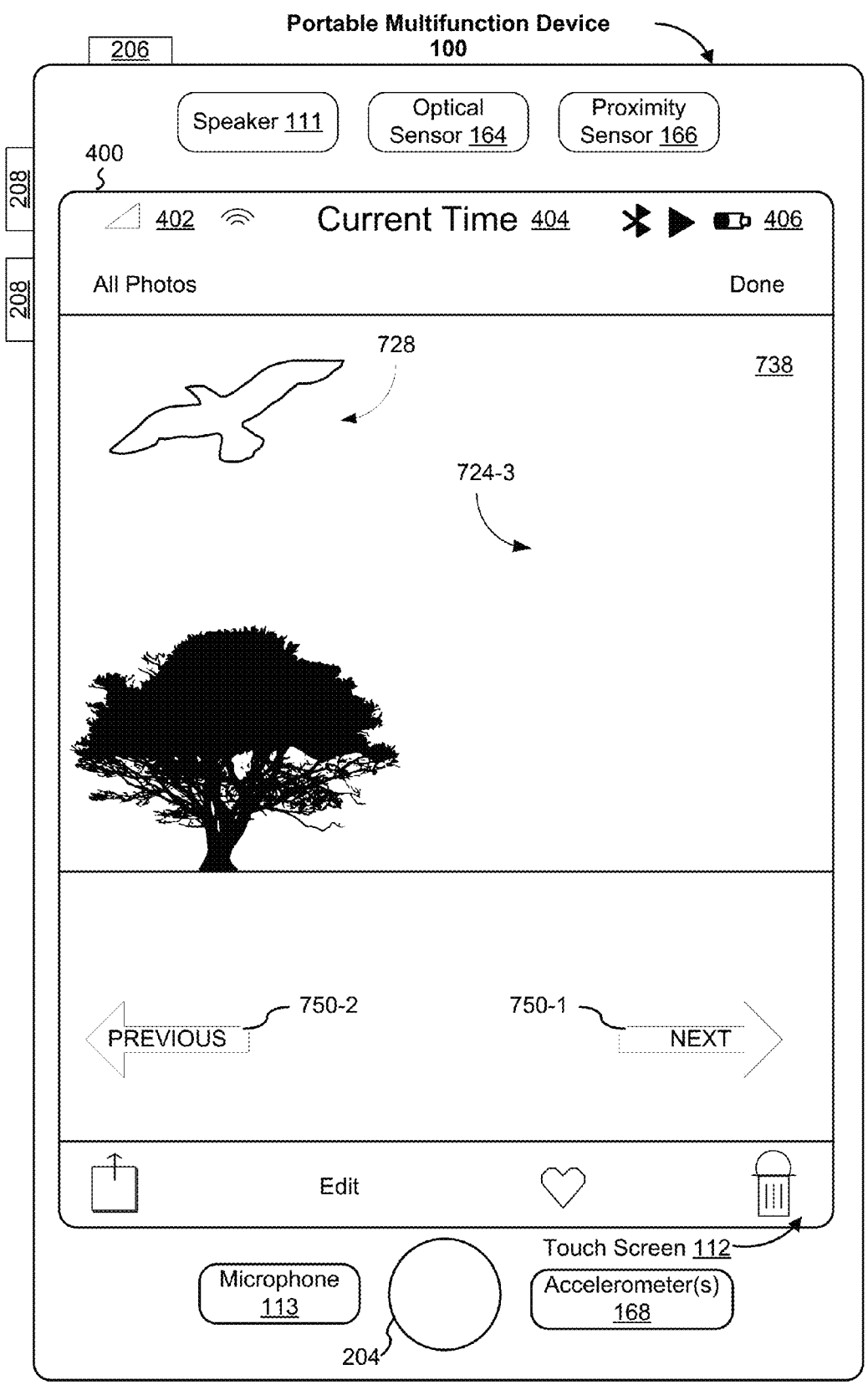
Figure 7Q:
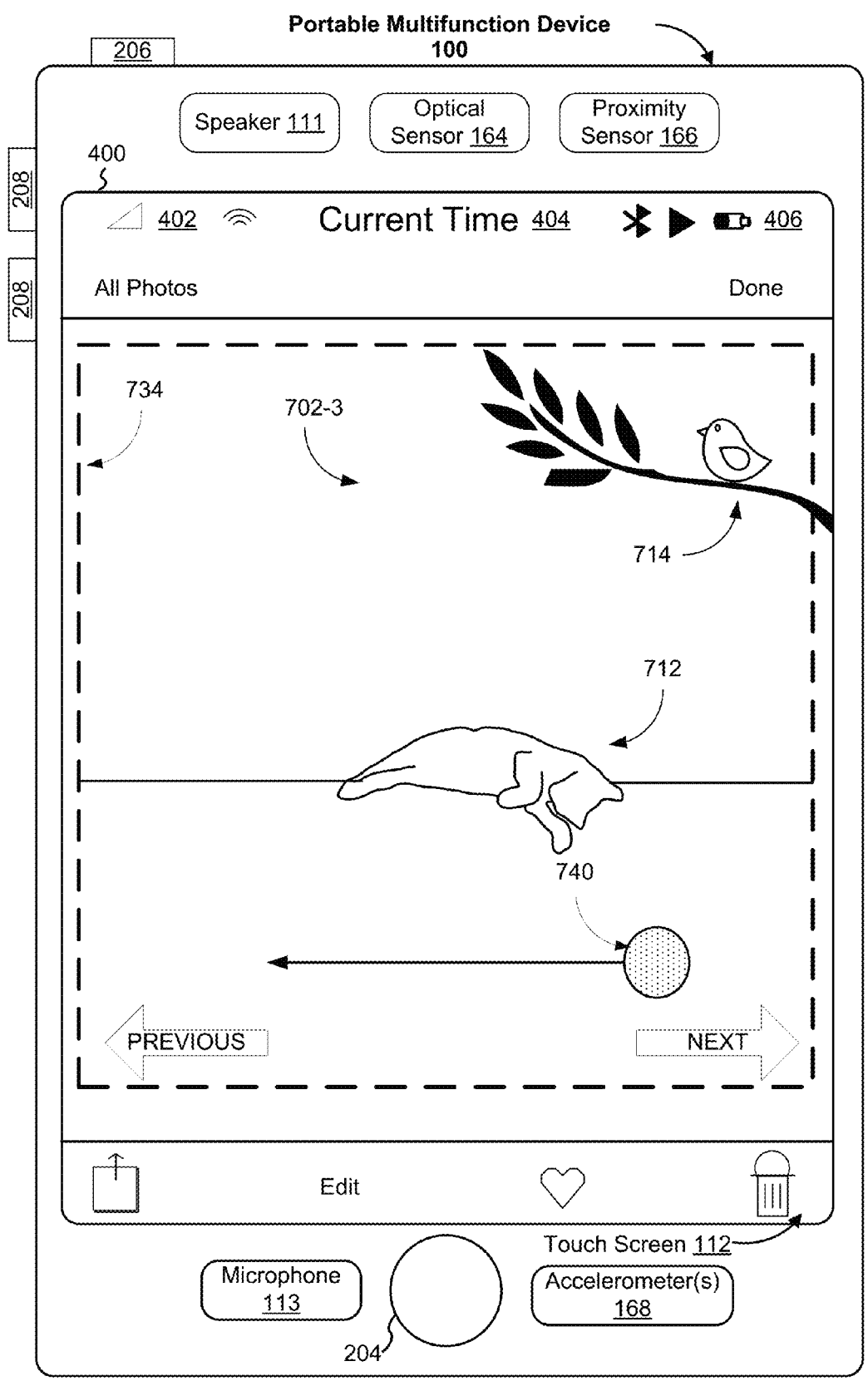
Figure 7R:
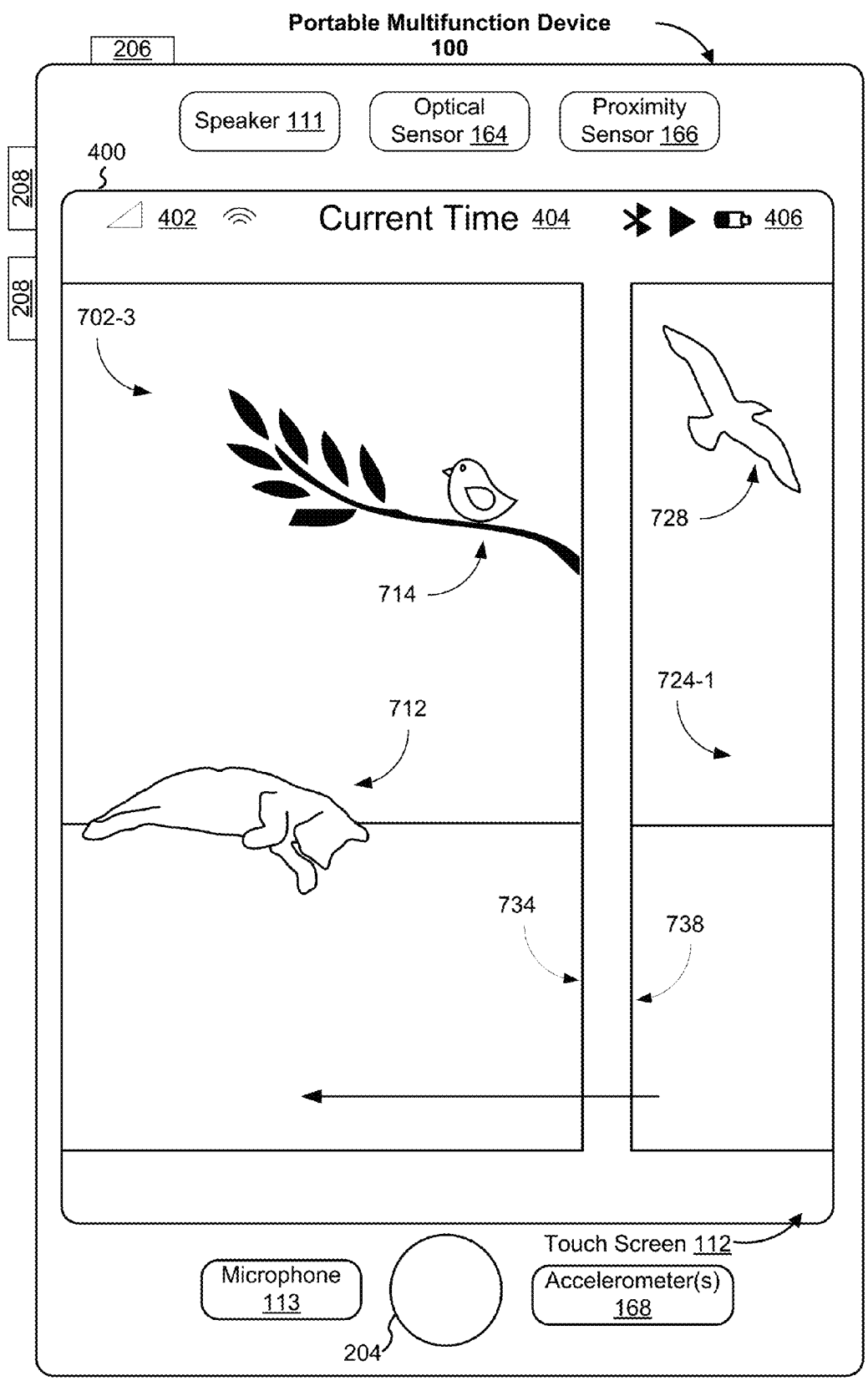
Figure 7S:
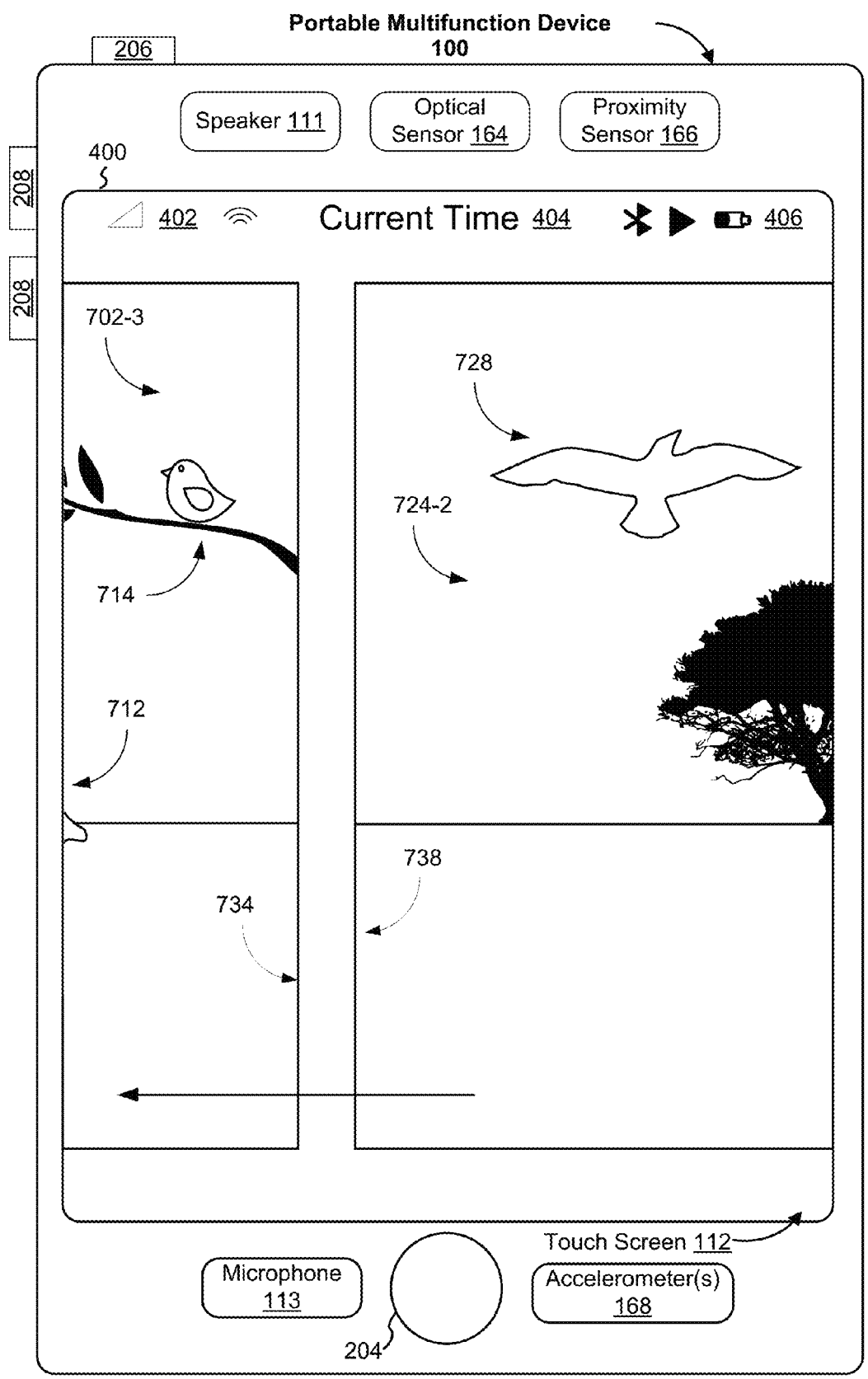
Figure 7T:
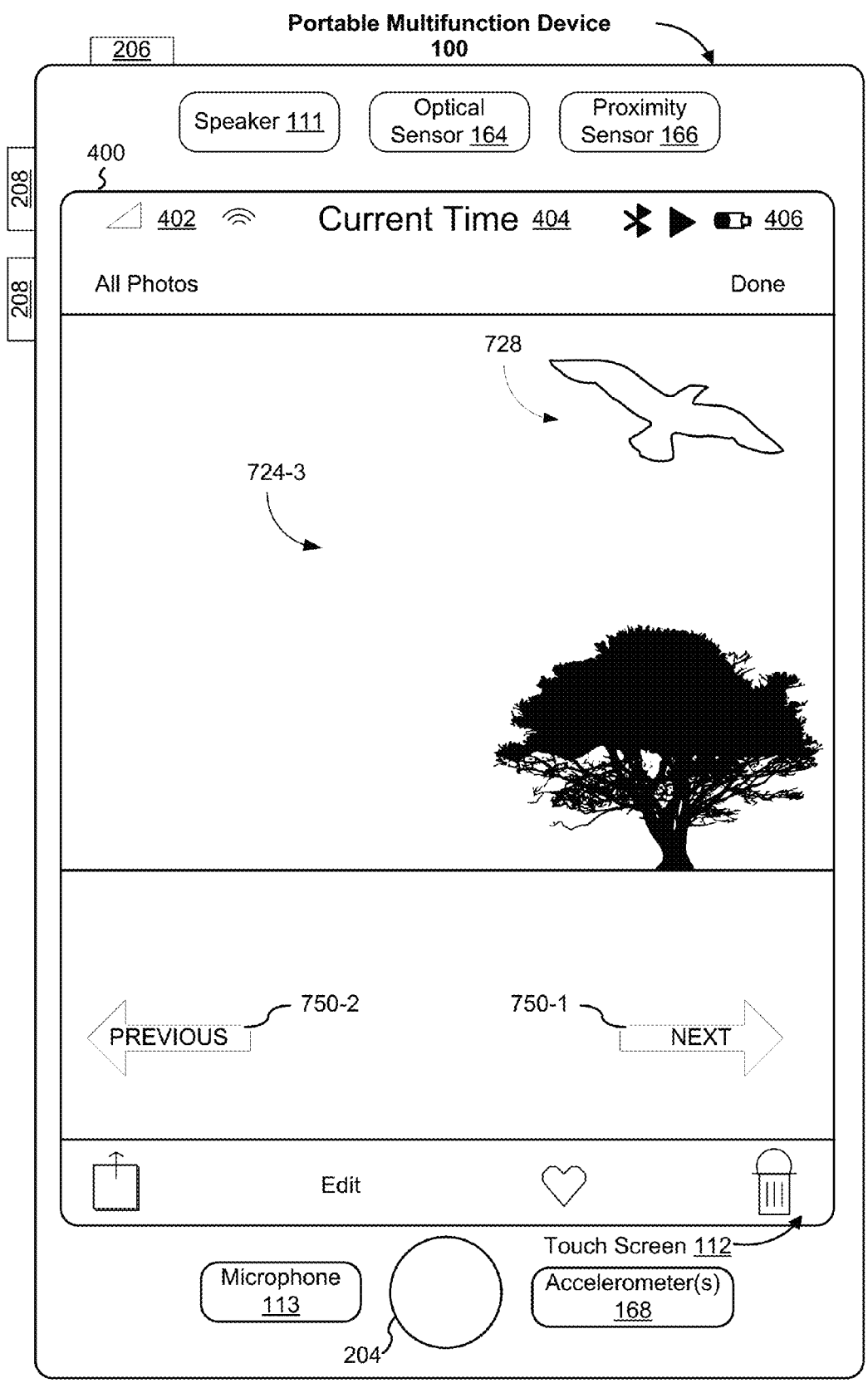
Figure 7U:
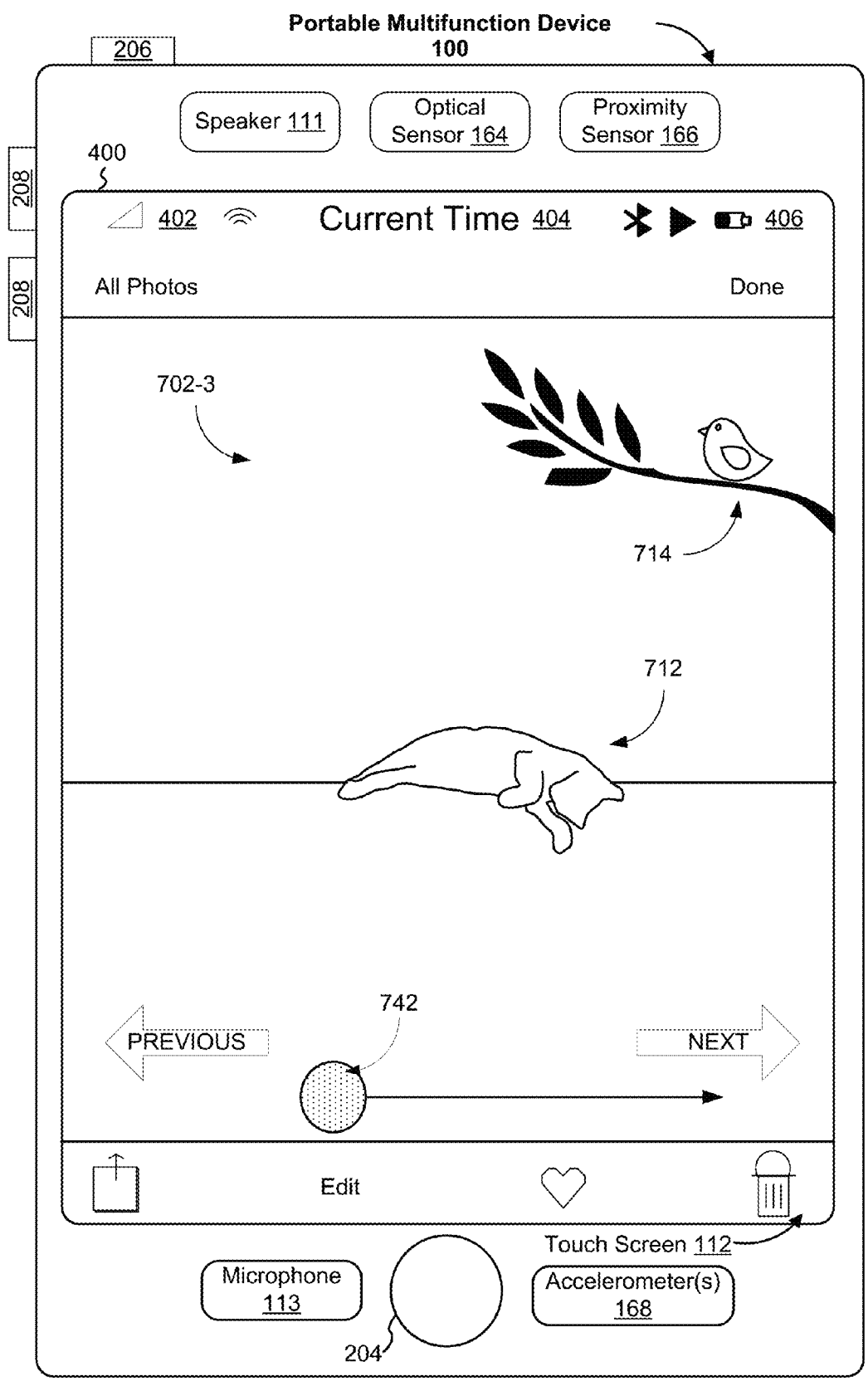
Figure 7V:
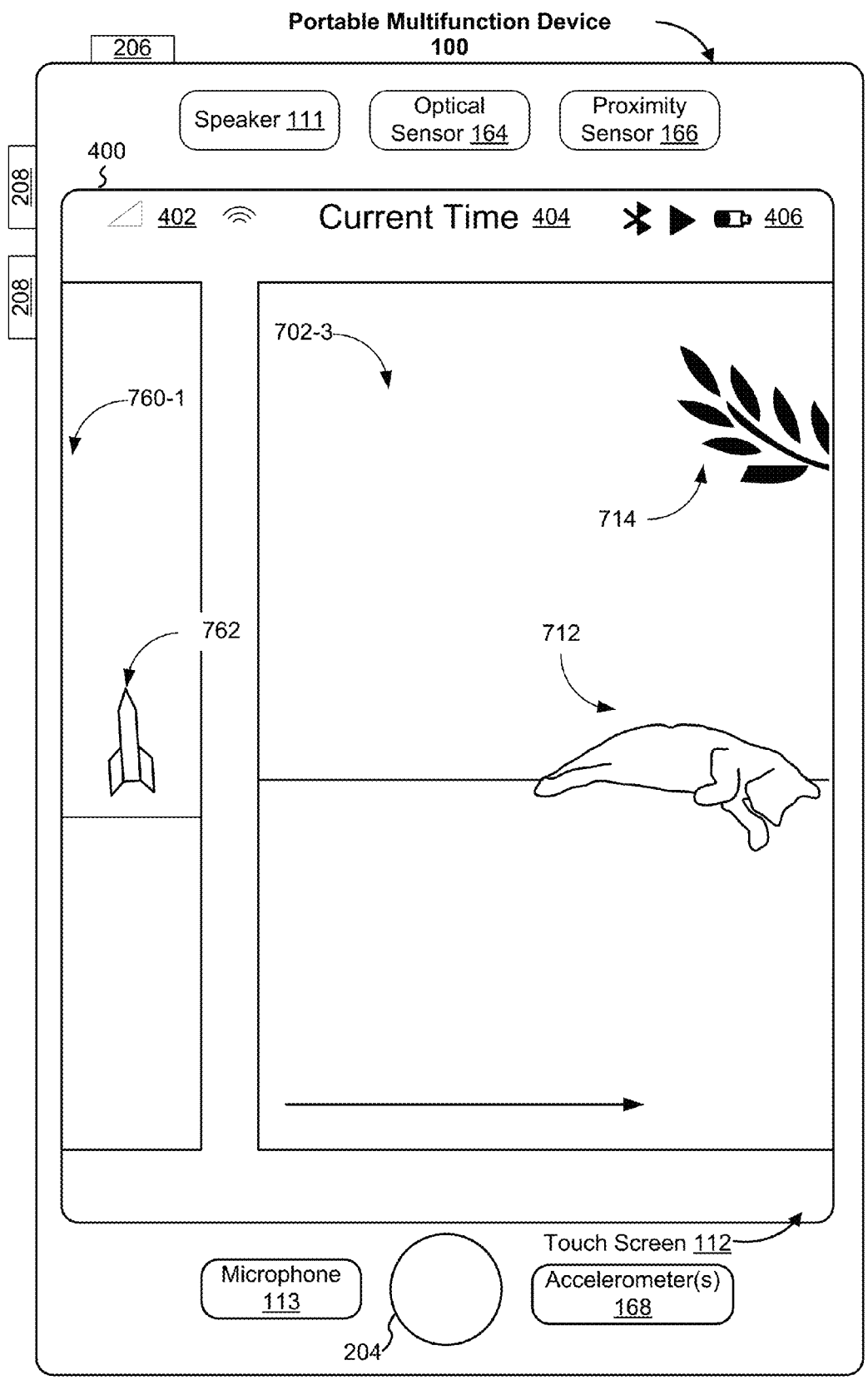
Figure 7W:
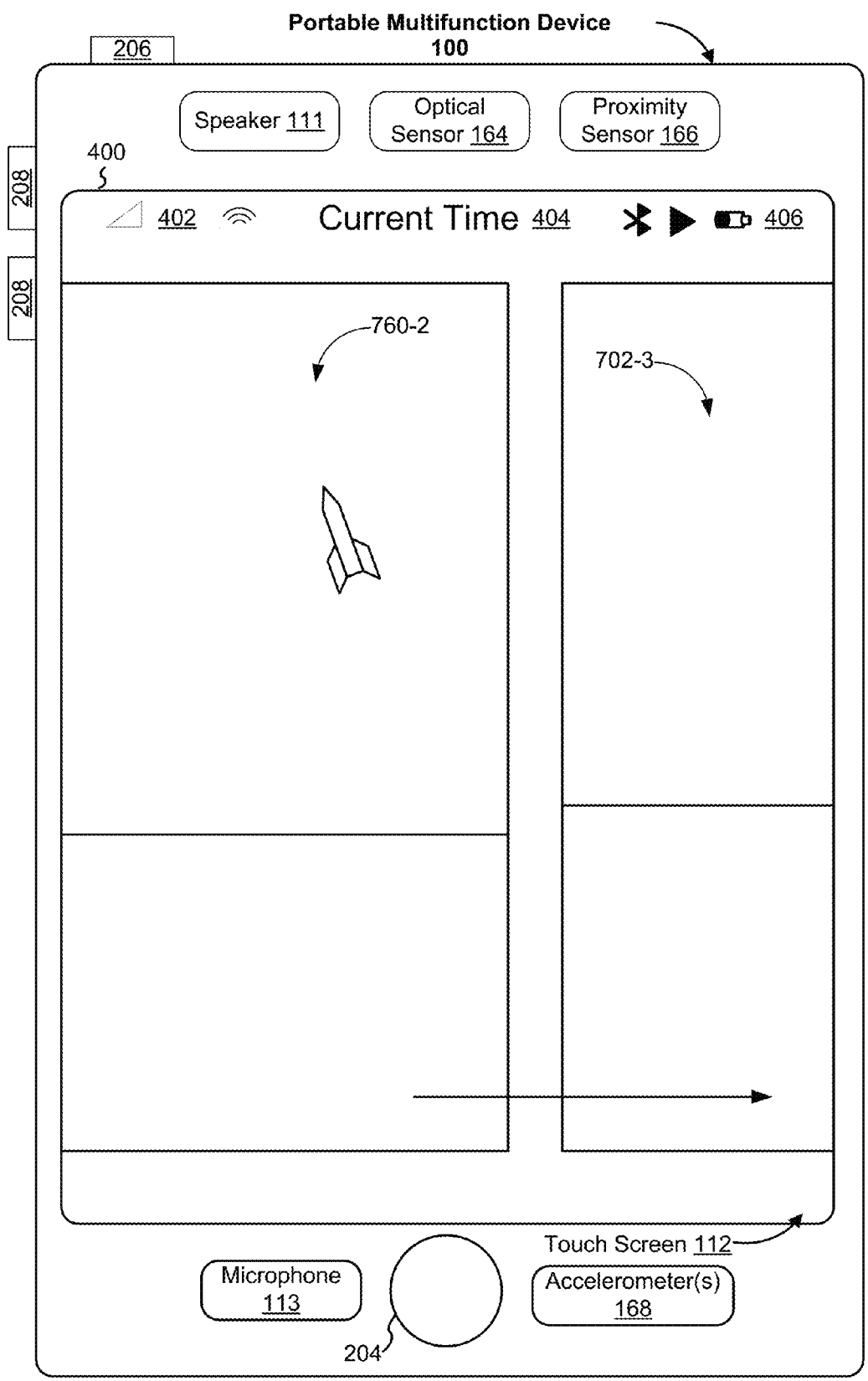

Fourth grouped sequence of images 760 includes fourth representative image 760-3 and at least one or more images acquired by the camera before acquiring fourth representative image 760-1 (e.g., image 760-1, FIG. 7V, and image 760-2, FIG. 7W). Thus, the chronological order (e.g., the order in which they were taken by the camera) of the fourth sequence of images 760 is: image 760-1; image 760-2; and image 760-3. Fourth sequence of images 760 depicts a scene in which a firework canister 762 launches (image 760-1, FIG. 7V), flies through the air (image 760-2, FIG. 7W), and explodes (image 760-3, FIG. 7X).

In some embodiments, the first sequence of images 702 was acquired by the camera before the second sequence of images 724, and the first sequence of images 702 was acquired by the camera after the third sequence of images 726.

In some embodiments, user interface 700 is a user interface in an image management application (e.g., Photos from Apple Inc. of Cupertino, Calif.). To that end, in some embodiments, the camera that took first sequence of images 702 (and/or second sequence of images 724; third sequence of images 726; etc.) is part of portable multifunction device 100 (e.g., the camera comprises optical sensors 164 in conjunction with imaging module 143, FIG. 1A). In some embodiments, first sequence of images 702 was taken by a camera that is not part of portable multifunction device 100 (e.g., first sequence of images 702 was transferred to portable multifunction device 100 after being taken with a camera on another device). In some embodiments, the first sequence of images 702 was obtained in response to detecting activation of a shutter button at a first time, as described herein with respect to FIGS. 5A-5K and method 900 and/or FIGS. 22A-22D and method 2600. In some embodiments, first representative image 702-3 corresponds to the representative image acquired by the camera, as described herein with respect to FIGS. 5A-5K and method 900 and/or FIGS. 22A-22D and method 2600.

In some embodiments, some of the plurality of sequences of images were acquired using portable multifunction device 100 and some were transferred to portable multifunction device 100 after being taken with a camera on a different device. For example, in some circumstances, a user may obtain (e.g., take, capture) sequences of images, as described with reference to methods 900/2600, on a plurality of devices (e.g., a tablet, a laptop, and/or a digital camera, all in addition to portable multifunction device 100) and synchronize or otherwise transfer the sequences of images onto portable multifunction device 100.

In some embodiments, user interface 700 is a user interface in a messaging application (e.g., Messages from Apple Inc. of Cupertino, Calif.). In some embodiments, first sequence of images 702 is a message in a message conversation displayed in a scrollable region of the messaging application, and first sequence of images 702 is displayed as the scrollable region of the messaging application is scrolled and the images are, in some circumstances interspersed with text messages or other messages sent and received via the messaging application (e.g., in conversation bubbles). In some circumstance, a user may have obtained (e.g., taken, captured) a respective sequence of images on her own portable multifunction device 100 and also have received a different sequence of images from a different user (e.g., in a messaging application). Thus, in some circumstances, the plurality of sequences of images stored on portable multifunction device 100 includes at least one sequence of images obtained using a camera on portable multifunction device 100 and at least one sequence of images that was obtained using a camera on a different device, distinct from portable multifunction device 100.

In some embodiments, representative image 702-3 is displayed in user interface 700 (e.g., displayed in an image management application or messaging application when the user is scrolling through her images or messages).

FIG. 7A illustrates user interface 700. Portable multifunction device 100 displays, in user interface 700, first representative image 702 in a movable first area 734 on touch screen 112. It should be understood that the boundary of movable first area 734 is not always displayed on touch screen 112 and is provided to aide in the description of the figures.

FIG. 7B illustrates portable multifunction device 100 detecting a drag gesture 736 (beginning at location 736-1) on touch screen 112. In some embodiments, the operations illustrated in FIGS. 7B-7K are performed in accordance with a determination that drag gesture 736 meets predefined criteria (e.g., predefined next photo navigation criteria). For example, in some embodiments, the operations illustrated in FIGS. 7B-7F are performed (e.g., triggered) when drag gesture 736 has predefined path characteristics (e.g., drag gesture 736 is characterized by a lateral (or vertical) velocity; that is, the drag gesture is more side-to-side (or up-and-down) than up-and-down (or side-to-side), in the orientation shown in FIGS. 7A-7CC). In some embodiments, portable multifunction device 100 includes one or more sensors to detect intensity of contacts with touch screen 112, and the operations illustrated in FIGS. 7B-7F are performed (e.g., triggered) when drag gesture 736 has a characteristic intensity that meets (e.g., satisfies) predefined intensity criteria (e.g., exceeds light press threshold $IT_L$, as described elsewhere in this document). In some embodiments, the operations illustrated in FIGS. 7B-7F are performed (e.g., triggered) when drag gesture 736 has predefined path characteristics (e.g., drag gesture 736 is characterized by a lateral velocity) and meets predefined intensity criteria (e.g., exceeds a predefined intensity threshold).

User interface 700, as shown in FIG. 7A, illustrates display of first representative image 702-3 in an image presentation mode. In some embodiments, as shown in FIG. 7A, the movable first area 734 is an area that displays images in the first sequence of images, without displaying images from sequences of images other than the first sequence of images.

In FIG. 7B, drag gesture 736 is leftward. Accordingly, portable multifunction device 100 moves first area 734 to the left, as shown in FIGS. 7C-7D. In addition, portable multifunction device 100 replaces, in moveable first area 734 of user interface 700, display of first representative image 702-3 with display, in chronological order, of at least some of one or more images for first sequence of images 702 acquired by the camera after acquiring first representative image 702-3 (namely image 702-4, FIG. 7C, and image 702-5, FIG. 7D). That is, portable multifunction device 100 displays an animated display of first sequence of images 702 in the first area.

In some embodiments, the display, in chronological order in first area 734, of at least some of the one or more images for first sequence of images 702 acquired by the camera after acquiring the first representative image occurs in accordance with the movement of contact in drag gesture 736. Thus, if the movement of drag gesture 736 to the left speeds up, the display of the chronological progression of images in first area 734 speeds up. If the movement of drag gesture 736 to the left slows down, the display of the chronological progression of images in first area 734 slows down. If the movement of drag gesture 736 to the left is paused, the display of the chronological progression of images in first area 734 is paused. And, if the movement of drag gesture 736 reverses direction (e.g., from a leftward drag gesture to a rightward drag gesture), the display of the progression of images in first sequence of images 702 in first area 734 is reversed and the images are shown in reverse chronological order in accordance with the movement of the drag gesture 736 in the reverse direction. More generally, in some embodiments, for a respective sequence of images, the display of a progression of images in the respective sequence of images, in a respective area, occurs in accordance with the movement of a contact in the drag gesture.

In some embodiments, the user triggers the operations shown in FIGS. 6A-6FF by altering one or more characteristics of drag gesture 736 in a predefined manner. For example, in some embodiments, when the user pauses drag gesture 736 and presses more deeply onto touch screen 112, portable multifunction device 100 plays back first sequence of images 702, as described with reference to FIGS. 6A-6FF, even if only a portion of first area 734 is on the display. In some embodiments, portable multifunction device 100 is configured to detect the change or modification of the one or more characteristics of drag gesture 736.

FIGS. 7C-7D also illustrate that, in some embodiments, in accordance with the leftward drag gesture 736, portable multifunction device 100 moves a second area 738 to the left. In some embodiments, moving second area 738 to the left includes moving at least part of second area 738 onto touch screen 112 from the left. In some embodiments, movable second area 738 is an area that displays images in second sequence of images 724, without displaying images from sequences of images other than second sequence of images 724 (e.g., first sequence of images 702 and third sequence of images 726 are not displayed in movable second area 738). In some embodiments, as shown in FIG. 7C, movable second area 738 is adjacent to movable first area 734 (e.g., to the right of movable first area 734). In some embodiments, while moving second area 738 to the left, portable multifunction device 100 displays, in chronological order in second area 738, at least some of one or more images for second sequence of images 724 acquired by the camera before acquiring second representative image 724-3.

In some embodiments, movement of first area 734 corresponds to movement of drag gesture 736. For example, in some embodiments, the movement of first area 734 between FIG. 7B and FIG. 7C is proportional to the distance between location 736-1 (FIG. 7B) and 736-2 (FIG. 7C). Similarly, in some embodiments, the movement of first area 734 between FIG. 7C and FIG. 7D is proportional to the distance between location 736-2 (FIG. 7C) and 736-3 (FIG. 7D), thus giving the user the impression of dragging movable first area 734. In some embodiments, as shown in FIGS. 7C-7D, moving first area 734 to the left includes moving at least part of first area 734 off of touch screen 112 to the left.

In some embodiments, as shown in FIGS. 7B-7D, the first area 734 and the second area 738 move across touch screen 112 at the same rate (e.g., the distance of the movement of first area 734 and the distance of the movement of second area 738 correspond to the distance of the movement of drag gesture 736). In some embodiments, as shown in FIGS. 7L-7P, the first area 734 and the second area 738 move at different rates. For example, in FIGS. 7L-7P, the movement of second area 738 in response to drag gesture 752 is less than the movement of first area 734 in response to drag gesture 752 (e.g., the distance of the movement of first area 734 matches the distance of the movement of drag gesture 752, and the distance of the movement of second area 738 is a fraction, such as 50%, of the distance of the movement of drag gesture 752).

In some embodiments, the display, in chronological order in second area 738, of at least some of the one or more images for second sequence of images 724 acquired by the camera before acquiring second representative image 724-3 occurs in accordance with the movement of a contact in drag gesture 736 (e.g., in analogous manner to that described above with reference to first sequence of images 702). For example, during drag gesture 736, the images in first area 734 and the images in the second area 738 are both advancing at the same rate, with the rate based on the movement of drag gesture 736. In some embodiments, for example as described below with reference to FIGS. 7L-7P, during drag gesture 752, the images in first area 734 and the images in the second area 738 are advancing at different rates. For example, in FIGS. 7L-7P, the rate at which the images in second area advance in response to drag gesture 752 is less than the rate at which the images in first area 734 advance in response to drag gesture 752 (e.g., 50% of the rate at which the image in first area 734 advance in response to drag gesture 752).

In some embodiments, as an alternative to the example shown in FIGS. 7B-7D, while moving second area 738 to the left, second area 738 just displays second representative image 724-3 for the second sequence of images, without displaying other images in the second sequence of images 724.

In some embodiments, user interface 700 includes a next icon 750-1 (e.g., FIG. 7A) and a previous icon 750-2. In some embodiments, like detecting a drag gesture in the first direction, detecting activation of next icon 750-1 also results in the animated display of images from the first sequence of images 702 in first area 734 and the animated display of images from the second sequence of images 724 in second area 738. In some embodiments, detecting activation of next icon 750-1 results in display of second representative image 724-3 replacing display of first representative image 702-3, without the animated display of images from first sequence of images 702 in first area 734 and without the animated display of images from the second sequence of images 724 in second area 738. In some embodiments, detecting activation of next icon 750-1 results in display of the second representative image 724-3 replacing display of the first representative image 702-3, without displaying other images in the first sequence or the second sequence.

While the operations occurring in FIGS. 7B-7D are described with respect to left/right movement of drag gesture 736, analogous operations are envisioned with respect to up/down movement of a drag gesture and are intended to fall within the scope of the claims unless otherwise stated. For example, in some embodiments, as an alternative to the example shown in FIGS. 7B-7D, instead of moving second area 738 leftward onto touch screen 112, second area 738 is underneath first area 734 in a z-layer (front-to-back) order when drag gesture 736 is a leftward or downward gesture, and second area 738 is revealed (e.g., uncovered) as first area 734 moves off touch screen 112 to the left (or toward the bottom).

As illustrated in FIG. 7F, in some embodiments, after moving second area 738 to the left, as described with respect to FIGS. 7B-7D, portable multifunction device 100 displays, in user interface 700, second representative image 724-3. In some embodiments, display of second representative image 724-3 occurs in accordance with the operations described below with respect to FIGS. 7E-7F.

As illustrated in FIG. 7E, in some embodiments, portable multifunction device 100 detects termination (e.g., lift off) of drag gesture 736 while moving first area 734 and second area 738. In response, portable multifunction device 100 determines whether drag gesture 736 meets next-sequence-navigation criteria. For example, in some embodiments, the next-sequence-navigation criteria are met when the movement of first area 734 is such that first area 734 is more than half way off touch screen 112 (e.g., a midpoint of first area 734 has been moved off of touch screen 112). In some embodiments, as shown in FIG. 7E, the next-sequence-navigation criteria are met when the movement of first area 734 and second area 738 is such that a boundary 741 between first area 734 and second area 738 is past a midpoint 742 of touch screen 112 (or a midpoint of user interface 700, if not centered within touch screen 112, or any other suitable predefined point such as one third or one quarter of the way across user interface 700). In some embodiments, the next-sequence-navigation criteria are met when a velocity of drag gesture 736 meets predefined velocity criteria (e.g., when an average velocity or an instantaneous velocity of drag gesture 736 exceeds a velocity threshold). In some embodiments, the next-sequence-navigation criteria are met when the velocity of drag gesture 736 is indicative of a "flick" gesture.

As shown in FIG. 7F, when the next-sequence-navigation criteria are met, portable multifunction device 100 moves first area 734 completely off touch screen 112 (e.g., by moving first area 734 further to the left until first area 734 is completely off touch screen 112) and moves second area 738 completely onto touch screen 112 (e.g., by moving second area 738 further to the left until second area 738 is completely on touch screen 112). As a result, portable multifunction device 100 displays second representative image 724-3 (FIG. 7F). Thus, in some embodiments, termination of drag gesture 736 when next-sequence-navigation criteria are met gives the user the impression of snapping second representative image 724-3 onto user interface 700.

Conversely, in some embodiments, when the next-sequence-navigation criteria are not met, portable multifunction device 100 moves second area 738 completely off touch screen 112 (e.g., by moving second area 738 to the right until second area 738 is completely off touch screen 112) and moves first area 734 completely onto touch screen 112 (e.g., by moving first area 734 back to the right until first area 734 is completely on touch screen 112). As a result, portable multifunction device 100 displays first representative image 702-3 again (e.g., returns to the view shown in FIG. 7A). Thus, in some embodiments, termination of drag gesture 736 when next-sequence-navigation criteria are not met gives the user the impression of snapping first representative image 702-3 back onto user interface 700. In some embodiments, first sequence of images 702 and second sequence of images 724 are displayed backwards (e.g., in reverse chronological order) while portable multifunction device 100 moves first area 734 completely on and second area 738 completely off touch screen 112.

FIGS. 7G-7K illustrate analogous features to FIGS. 7B-7F, except whereas FIGS. 7B-7F illustrate next-sequence navigation in accordance with some embodiments, FIGS. 7G-7K illustrate previous-sequence navigation in accordance with some embodiments.

FIG. 7G illustrates portable multifunction device 100 detecting a drag gesture 744 (beginning at location 744-1) on touch screen 112. In some embodiments, the operations illustrated in FIGS. 7G-7K are performed in accordance with a determination that drag gesture 744 meets predefined criteria (e.g., predefined previous photo navigation criteria). In some embodiments, the predefined criteria for navigating toward a previous photo (e.g., previous grouped sequence of images) are analogous to the predefined criteria for navigating toward a next photo (e.g., next grouped sequence of images), described with reference to FIGS. 7B-7F, except that the respective drag gestures for the two are generally in opposite directions (or at least principally so).

FIG. 7G is analogous to FIG. 7B except that drag gesture 744 is in the opposite direction of drag gesture 736 (FIG. 7B) while portable multifunction device 100 displays first representative image 702-3. That is, in FIG. 7G, drag gesture 744 is rightward. Accordingly, portable multifunction device 100 moves first area 734 to the right, as shown in FIGS. 7H-7I. In addition, portable multifunction device 100 replaces, in moveable first area 734 of user interface 700, display of first representative image 702-3 with display, in reverse chronological order, of at least some of one or more images for first sequence of images 702 acquired by the camera before acquiring first representative image 702-3 (namely image 702-2, FIG. 7H, and image 702-1, FIG. 7I). In some embodiments, as described above with reference to FIGS. 7B-7F, for a respective sequence of images, the display of a progression of images in the respective sequence of images, in a respective area, occurs in accordance with the movement of a contact in the drag gesture (e.g., movement from location 744-1, FIG. 7G, to location 744-2, FIG. 7H, to location 744-3, FIG. 7I).

FIGS. 7H-7I also illustrate that, in some embodiments, in accordance with the rightward drag gesture 744, portable multifunction device 100 moves a third area 746 to the right. In some embodiments, moving third area 746 to the right includes moving at least part of third area 746 rightward onto touch screen 112. In some embodiments, movable third area 746 is an area that displays images in third sequence of images 726, without displaying images from sequences of images other than third sequence of images 726 (e.g., first sequence of images 702 and second sequence of images 724 are not displayed in movable third area 746). In some embodiments, as shown in FIG. 7H, movable third area 746 is adjacent to movable first area 734 (e.g., to the left of movable first area 734, opposite movable second area 738). In some embodiments, while moving third area 746 to the right, portable multifunction device 100 displays, in reverse chronological order in third area 746, at least some of one or more images for third sequence of images 726 acquired by the camera before acquiring third representative image 726-1.

In some embodiments, the display, in reverse chronological order in third area 746, of at least some of the one or more images for third sequence of images 726 acquired by the camera after acquiring third representative image 726-1 occurs in accordance with the movement of a contact in drag gesture 744 (e.g., in analogous manner to that described above with reference to first sequence of images 702). For example, during drag gesture 744, the images in first area 734 and the images in the third area 746 are both reversing at the same rate, with the rate based on the movement of drag gesture 744.

In some embodiments, like detecting drag gesture 744 in the second direction, detecting activation of previous icon 750-2 (e.g., FIG. 7A) results in the animated display of images from the first sequence 702 in first area 734 and the animated display of images from the third sequence 726 in third area 746. In some embodiments, detecting activation of previous icon 750-2 results in display of the third representative image 726-1 replacing display of the first representative image 702-3, without the animated display of images from the first sequence 702 in the first area 734 and without the animated display of images from the third sequence 726 in the third area 746. In some embodiments, detecting activation of previous icon 750-2 results in display of the third representative image 726-1 replacing display of the first representative image 702-3, without displaying other images in the first sequence 702 or the third sequence 726.

In some embodiments, as an alternative to the example shown in FIGS. 7G-7I, while moving third area 746 to the right in response to drag gesture 744, third area 746 just displays third representative image 726-1 for third sequence of images 726, without displaying other images in third sequence of images 726.

While the operations occurring in FIGS. 7G-7I are described with respect to left/right movement of drag gesture 744, analogous operations are envisioned with respect to up/down movement of a drag gesture and are intended to fall within the scope of the claims unless otherwise stated. For example, in some embodiments, as an alternative to the example shown in FIGS. 7G-7I, instead of moving third area 746 onto touch screen 112 to the left, third area 746 is underneath first area 734 in a z-layer (front-to-back) order when drag gesture 744 is a rightward or upward gesture, and third area 746 is revealed (e.g., uncovered) as first area 734 moves off touch screen 112 to the right (or toward the top).

As illustrated in FIG. 7K, in some embodiments, after moving third area 746 to the right, as described with respect to FIGS. 7G-7I, portable multifunction device 100 displays, in user interface 700, third representative image 726-1. In some embodiments, display of third representative image 726-1 occurs in accordance with the operations described below with respect to FIGS. 7J-7K.

As illustrated in FIG. 7J, in some embodiments, portable multifunction device 100 detects termination (e.g., lift off) of drag gesture 744 while moving first area 734 and third area 746. In response, portable multifunction device 100 determines whether drag gesture 744 meets previous-sequence-navigation criteria. For example, in some embodiments, the previous-sequence-navigation criteria are met when the movement of first area 734 is such that first area 734 is more than half way off touch screen 112 (e.g., a midpoint of first area 734 has been moved off of touch screen 112). In some embodiments, as shown in FIG. 7J, the previous-sequence-navigation criteria are met when the movement of first area 734 and third area 746 is such that a boundary 748 between first area 734 and third area 746 is past the midpoint 742 of touch screen 112 (or the midpoint of user interface 700, if not centered within touch screen 112, or any other suitable predefined point).

As shown in FIG. 7K, when the previous-sequence-navigation criteria are met, portable multifunction device 100 moves first area 734 completely off touch screen 112 (e.g., by moving first area 734 further to the right until first area 734 is completely off touch screen 112) and moves third area 746 completely onto touch screen 112 (e.g., by moving third area 746 further to the right until third area 746 is completely on touch screen 112). As a result, portable multifunction device 100 displays third representative image 726-1 (FIG. 7K). Thus, in some embodiments, termination of drag gesture 744 when previous-sequence-navigation criteria are met gives the user the impression of snapping third representative image 726-1 onto user interface 700.

Conversely, in some embodiments, when the previous-sequence-navigation criteria are not met, portable multifunction device 100 moves third area 746 completely off touch screen 112 (e.g., by moving third area 746 to the left until third area 746 is completely off touch screen 112) and moves first area 734 completely onto touch screen 112 (e.g., by moving first area 734 back to the left until first area 734 is completely on touch screen 112). As a result, portable multifunction device 100 displays first representative image 702-3 again (e.g., returns to the view shown in FIG. 7A). Thus, in some embodiments, termination of drag gesture 744 when previous-sequence-navigation criteria are not met gives the user the impression of snapping first representative image 702-3 back onto user interface 700. In some embodiments, first sequence of images 702 and third sequence of images 726 are displayed forward (e.g., in chronological order) while portable multifunction device 100 moves first area 734 completely on and third area 746 completely off touch screen 112.

FIGS. 7L-7P illustrate embodiments in which, in response to a drag gesture 752, the first area 734 and the second area 738 move at different rates on touch screen 112. FIG. 7L is analogous to FIG. 7A and is provided as a starting point for the functionality shown in FIGS. 7M-7P. As shown in FIGS. 7M-7O, drag gesture 752 moves from location 752-1 (FIG. 7M) to location 752-2 (FIG. 7N) to location 752-3 (FIG. 7O). In some embodiments, the movement of first area 734 corresponds to the movement of drag gesture 752. For example, when drag gesture 752 moves by 1 centimeter (cm), first area 734 moves by 1 cm. In some embodiments, second area 738 moves based on the movement of drag gesture 752, but the distance of the movement of second area 738 is less than the distance of the movement of drag gesture 752. For example, when drag gesture 752 moves by 1 centimeter (cm), second area 738 moves by 0.5 cm.

In this example, first area 734 is over second area 738 (e.g., in a z-layer) so that, as first area 734 touch screen 112 in response to drag gesture 752, second area 738 is progressively revealed. At the beginning of drag gesture 752, second area 738 is partially, but not completely onto touch screen 112 (e.g., half way, or three quarters of the way onto touch screen 112). As the user slides first area 734 rightward off touch screen 112, second area 738 slides the remainder of the way onto touch screen 112, such that completely sliding first area 734 off of touch screen 112 corresponds to completely sliding second area 738 onto touch screen 112. Moving first area 734 off of touch screen 112 at a rate that is different from the rate at which second 738 is moved onto touch screen 112 provides the user with intuitive visual cues as to a direction that the user is navigating in a hierarchy (e.g., z-layering) of enhanced photos.

In some embodiments, during drag gesture 752, the images in first area 734 and the images in the second area 738 advance at different rates. In some embodiments, the respective rates at which images in first area 734 and the images in the second area 738 advance are both based on the movement of drag gesture 752. In some embodiments, the images in first area 734 advance at a rate that is higher than a rate at which the images in second area 738 advance. In FIGS. 7M-7P, images in first area 734, in response to drag gesture 752, advance at twice the rate of the images in the second area 738. For example, as shown in FIGS. 7N-7O, during the same period of time, first area 734 advances through two images in first sequence of images 702 (702-4, FIG. 7N, and 702-5, FIG. 7O) while second area 738 maintains display of a single image in the second sequence of images (724-2, FIGS. 7N and 7O). FIG. 7P illustrates that the second area 738 has advanced to displaying representative image 724-3.

FIGS. 7Q-7CC illustrate embodiments in which device 100 slides an enhanced photo onto the display. As the enhanced photo is slid onto the display, device 100 plays, in chronological order, the sequence of images comprising the enhanced photo (e.g., from the initial image to the representative image). In some embodiments, sliding the new enhanced photo onto the display displaces a currently displayed enhanced photo, as described above. For example, sliding the enhanced photo onto the display slides the currently displayed enhanced photo off of the display. As another example, sliding the enhanced photo onto the display covers up (e.g., in a z-direction) the currently displayed enhanced photo. In some embodiments, the currently displayed enhanced photo does not playback while it is being displaced (e.g., the device maintains display of a representative image from the currently displayed enhanced photo). In some embodiments, the enhanced photo plays forward regardless of whether it is the next enhanced photo or the previous enhanced photo (e.g., in a camera roll).

To that end, FIG. 7Q illustrates device 100 displaying first representative image 702-3 of first sequence of images 702 in movable first area 734 on touch screen 112.

As shown in FIG. 7Q, the device detects a gesture 740 (e.g., a swipe gesture) on touch screen 112 that includes leftward movement by a contact. As shown in FIG. 7R, in response to gesture 740, device 100 moves first area 734 leftward off of the display and moves movable second area 738 leftward onto the display (e.g., second area 738 is a movable area that is adjacent to first area 734). The arrow in FIG. 7R indicates inertia from gesture 740 that continues to move second area 738 onto the display. In this example, because gesture 740 is to the left, the sequence of images sliding onto the display (e.g., second sequence of images 724) is the next sequence of images (e.g., in a camera roll).

As shown in FIGS. 7R-7T, in accordance with a determination that sequence-display criteria are met, while moving second area 738 to the left, device 100 plays forward through at least some of the one or more images for second sequence of images 724 that were acquired by the camera before acquiring second representative image 724-3. For example, device 100 starts by displaying the initial image 724-1 from second sequence of images 724 (FIG. 7R). Device 100 plays back second sequence of images 724 (e.g., in chronological order) from initial image 724-1 to representative image 724-3 (FIGS. 7S-7T). In some embodiments, playback of second sequence of images 724 is timed such that representative image 724-3 appears just as movable area 738 finishes moving onto touch screen 112 (FIG. 7T).

In some embodiments, the sequence-display criteria include navigation criteria (e.g., criteria that indicate that device 100 should finish transitioning to the next or previous photo even without further user input). For example, device 100 only plays through second sequence of images 724 if the user has flicked quickly enough and/or dragged far enough to transition to the next sequence of images (e.g., second sequence of images 724). Navigation criteria are described in greater detail above with reference to FIG. 7E.

In some embodiments, as first area 734 slides off the display, device 100 maintains display of first representative image 702-3 (e.g., statically, without replacing display of first representative image 702-3) while playing-back a least a portion of second sequence of images 724 (e.g., first sequence of image 702 does not playback while second sequence of images 724 is playing-back). Thus, representative image 702-3 is displayed in first area 734 in each of FIGS. 7Q-7S.

Figure 7X:
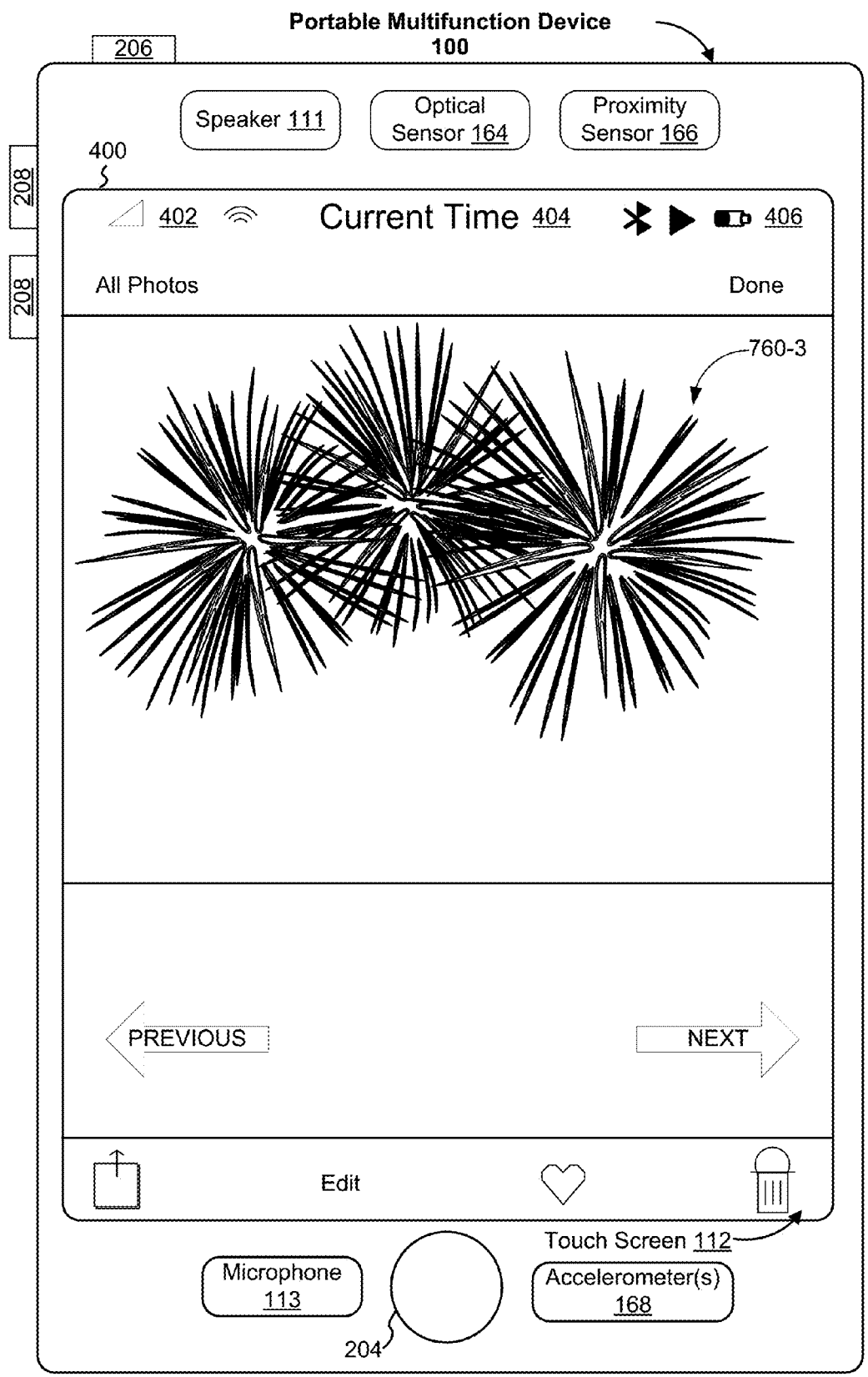

In some embodiments, a rightward swipe/drag gesture results in analogous functionality, except that the previous enhanced photo (e.g., in a camera roll) is slid onto the display instead of the next enhanced photo (e.g., in the camera roll). For example, in FIG. 7U, device 100 detects a swipe gesture 742 that is analogous to swipe gesture 740 except that swipe gesture 742 is to the right. In FIGS. 7V-7X, fourth sequence of images 760 (which, in this example, is the previous enhanced photo in a camera roll), plays forward from initial image 760-1 to representative image 760-3. That is, in some embodiments, regardless of whether the swipe/drag gesture is a previous-photo or next-photo navigation gesture, device 100 plays the enhanced photo forward (e.g., rather than playing a previous photo in the camera roll in reverse, as described above with reference to FIGS. 7G-7K). FIGS. 7U-7X are otherwise analogous to FIGS. 7Q-7T.

Figure 7Y:
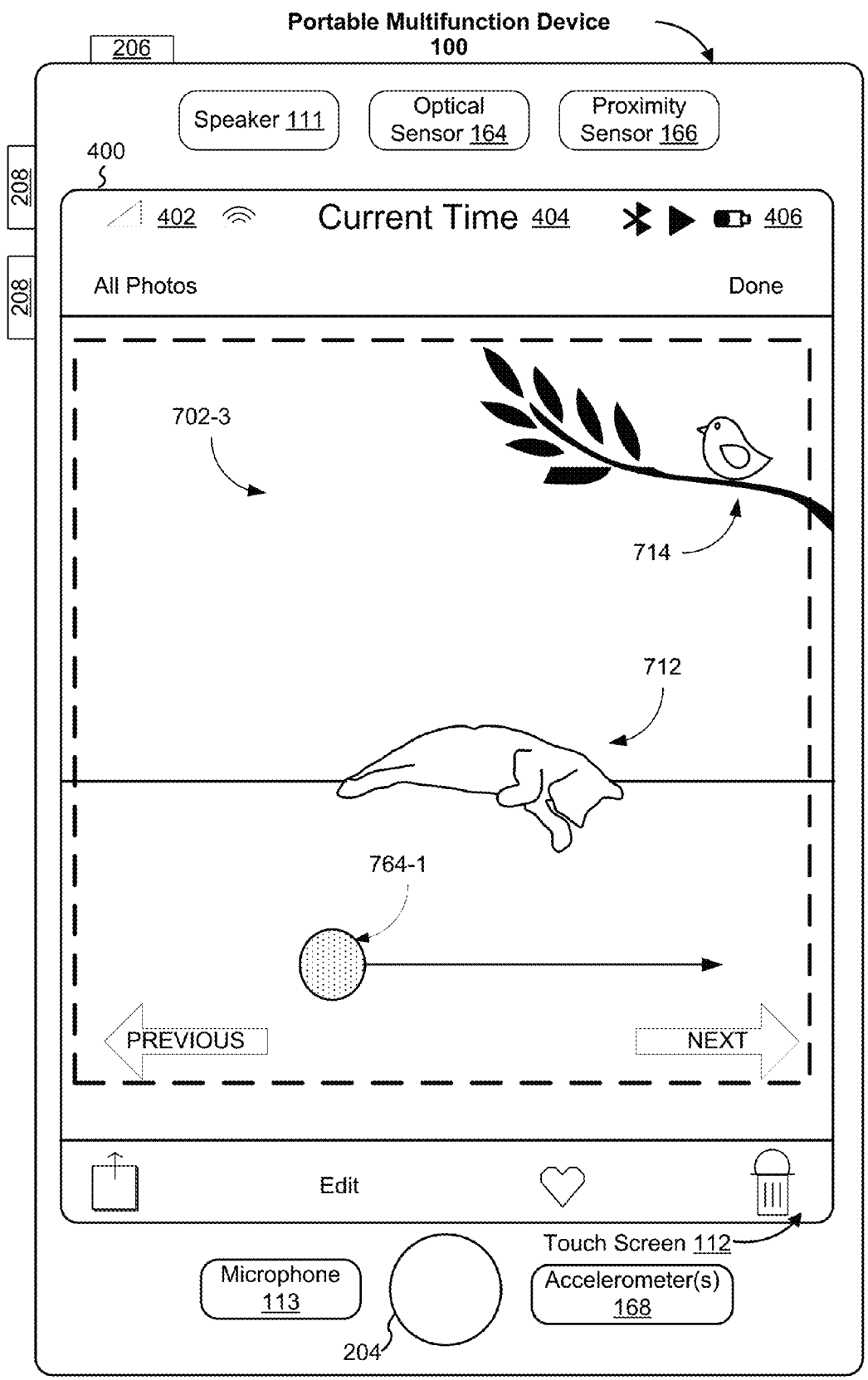
Figure 7Z:
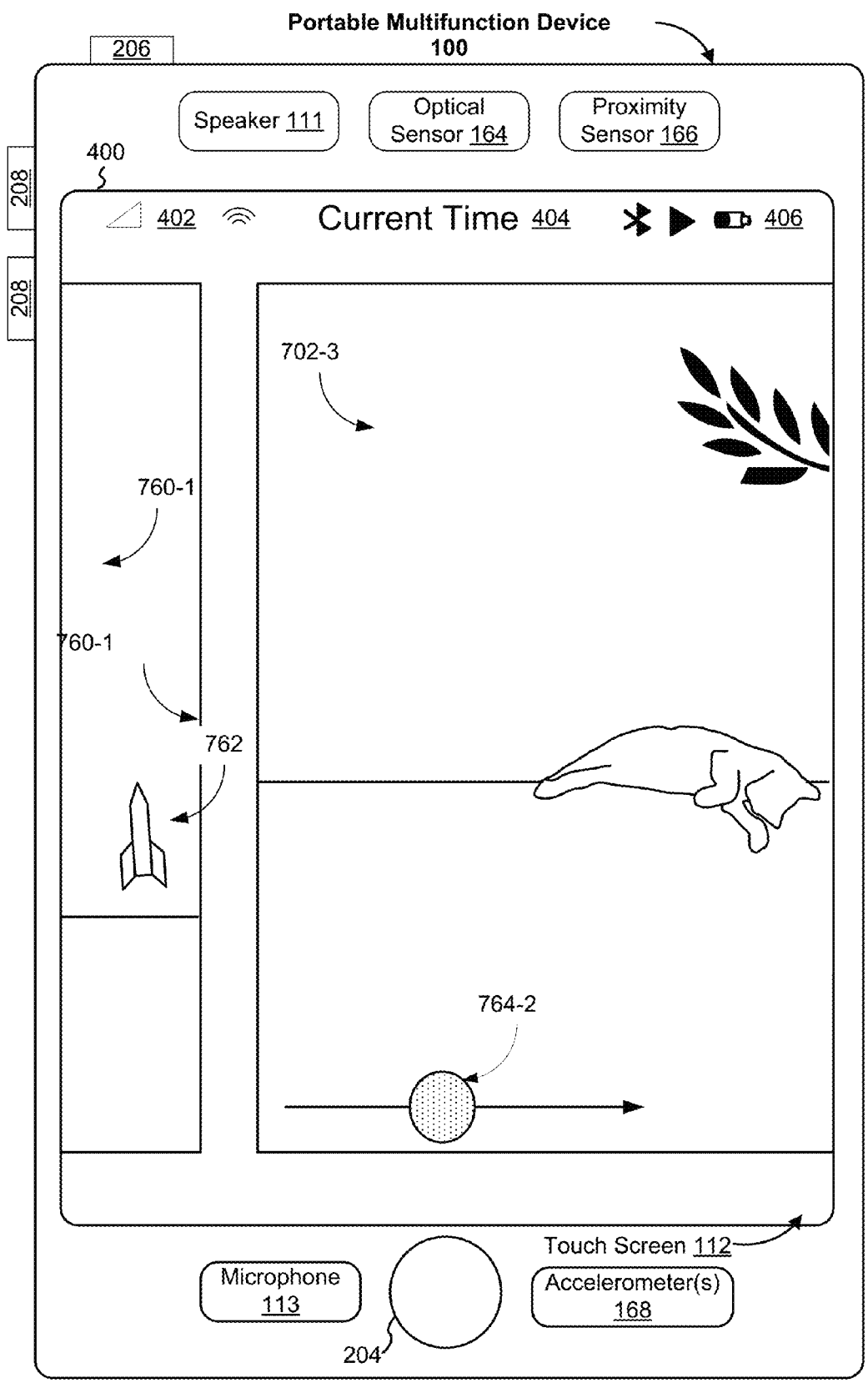
Figure 7A:
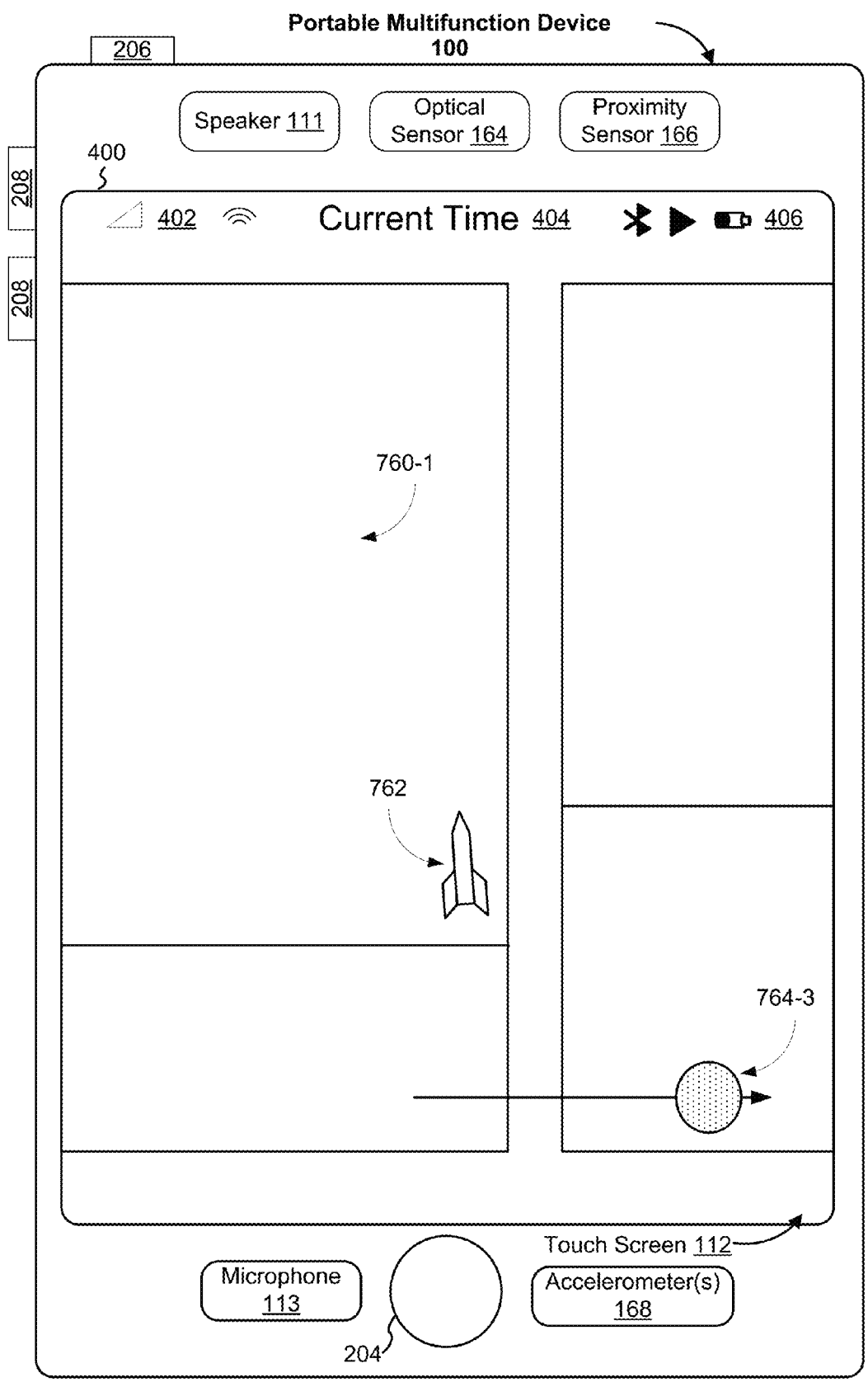
Figure 7B:
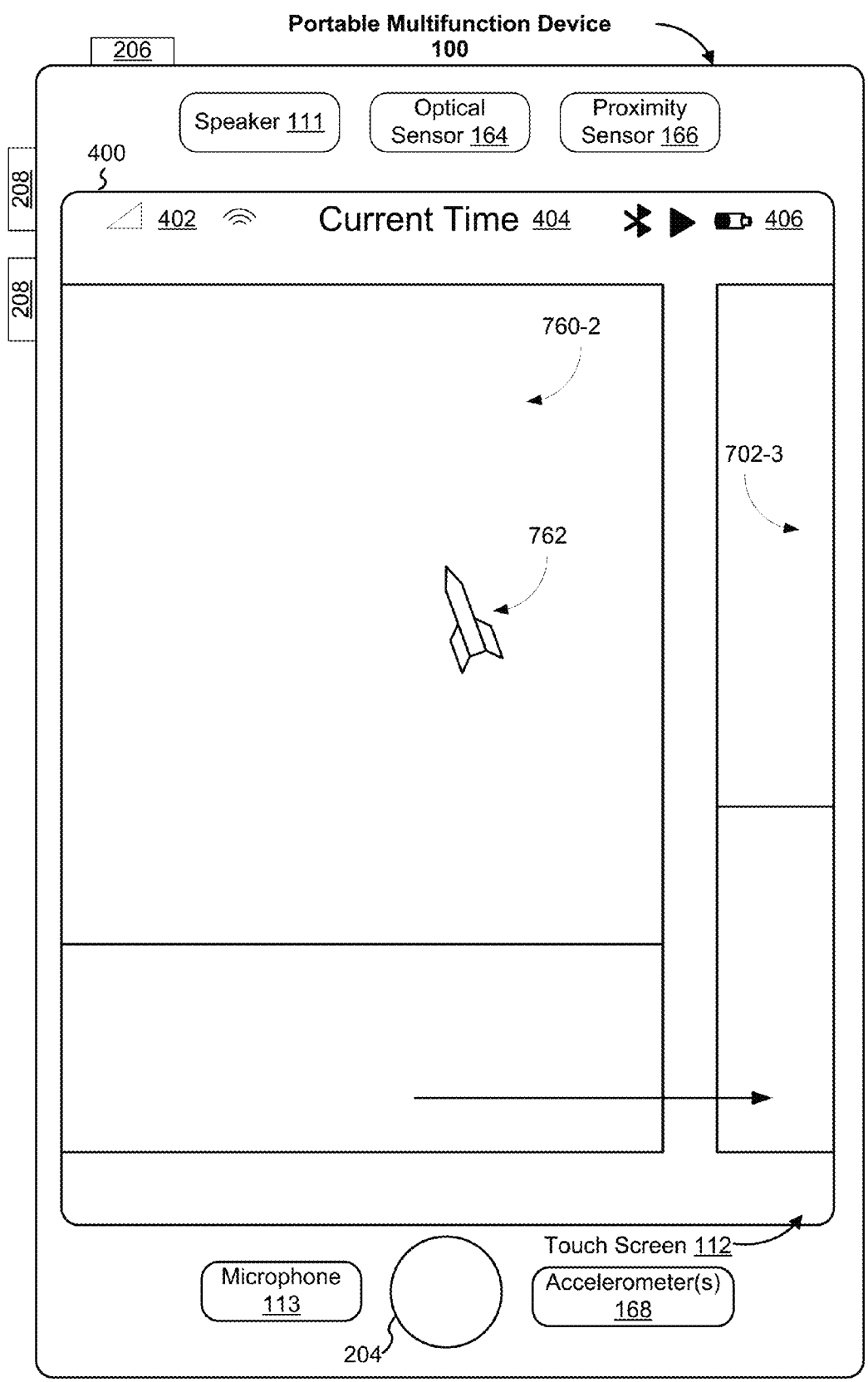
Figure 7C:
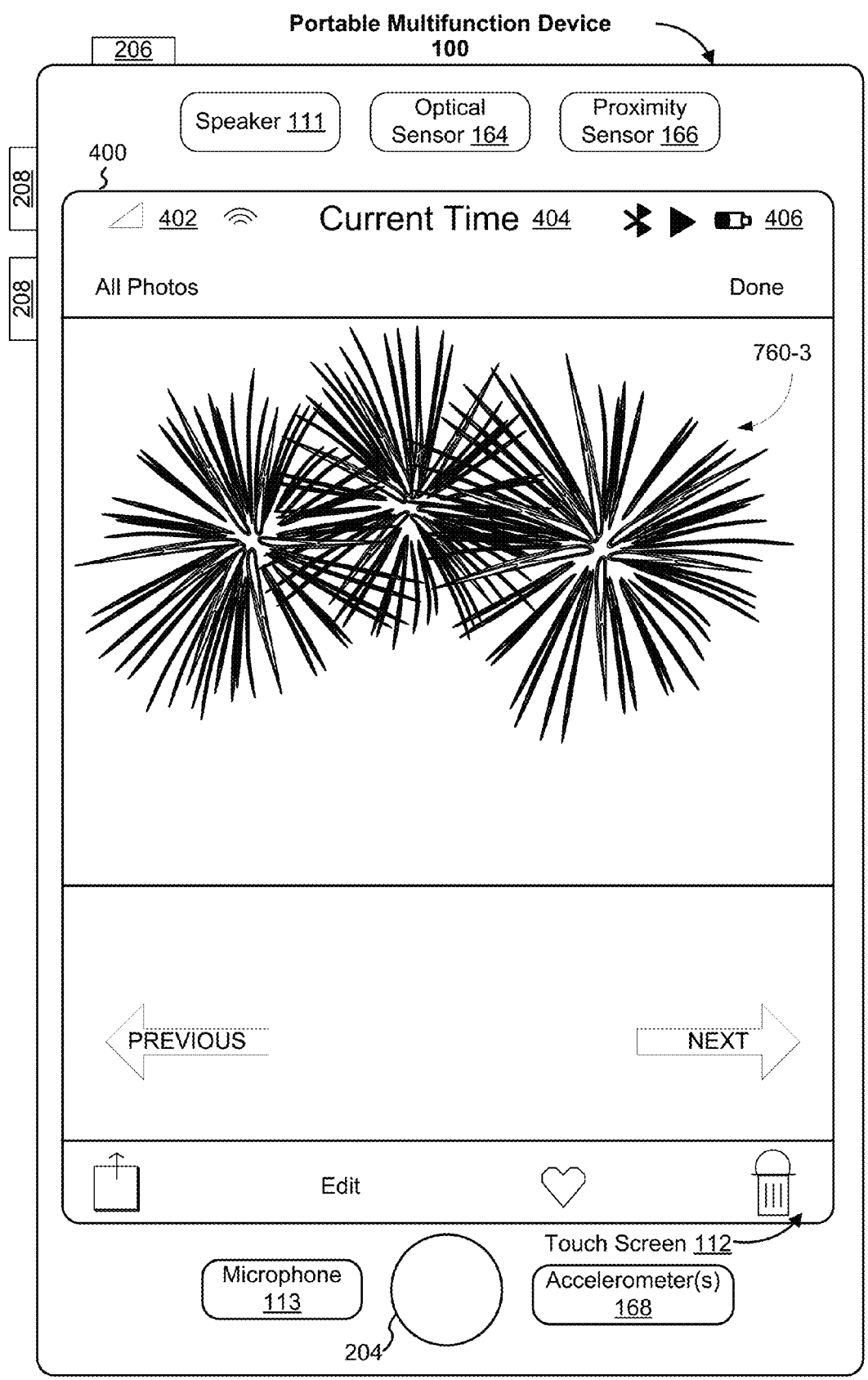

As shown in FIGS. 7Y-7CC, in some embodiments, the sequence-display criteria include a criterion that is met when device 100 detects lift-off of the gesture (e.g., device 100 only starts playing the new enhanced photo once the user has lifted her finger off of touch screen 112). For example, in FIG. 7Y, device 100 detects the beginning of a drag gesture 764 at a location 764-1. In FIG. 7Z, the user has moved drag gesture 764 to a location 764-2, and device 100 has accordingly moved initial image 760-1 of fourth sequence of images 760 partially onto the display. In FIG. 7AA, the user has moved drag gesture 764 further to a location 764-3, and device has accordingly moved initial image 760-1 of fourth sequence of images 760 farther onto the display. However, device 100 does not begin playback of fourth sequence of images 760 until the user lifts-off drag gesture 764 (FIG. 7BB). This criterion avoids over-stimulating the user as the user drags an enhanced photo on and off the display. As shown in FIG. 7CC, in some embodiments, playback and/or movement of the movable areas following liftoff of the gesture are timed so that the new enhanced photo's representative image (e.g., fourth representative image 760-3) is displayed during playback just as the new enhanced photo finishes sliding onto the display.

FIGS. 8A-8L illustrate exemplary user interfaces that perform distinct operations on sequences of related images as compared to individual images in accordance with some embodiments. The user interfaces in these figures are used to illustrate the processes described below, including the processes in FIGS. 9A-9G, 10A-10M, 11A-11I, 12A-12B, 24A-24E, 25A-25C, 26A-26D, and 27A-27E. Although the examples which follow will be given with reference to inputs on a touch-screen display (where the touch-sensitive surface and the display are combined, as shown on portable multifunction device 100), in some embodiments, the device detects inputs on a touch-sensitive surface 451 that is separate from the display 450, as shown in FIG. 4B.

FIGS. 8A-8L illustrate an example in which portable multifunction device 100 stores a plurality of sequences of images, one of which is grouped sequence of images 802 (displayed on user interface 800). Some features of user interface 800 are analogous to user interface 600 (FIGS. 6A-6W) and user interface 700 (FIGS. 7A-7CC) and are not repeated here for brevity. Sequence of images 802 includes representative image 802-3 (FIG. 8A), which was taken by a camera, one or more images acquired by the camera after acquiring representative image 802-3 (e.g., image 802-4, FIG. 8C, and image 802-5, FIG. 8D), and one or more images acquired by the camera before acquiring representative image 802-3 (e.g., image 802-1, FIG. 8E, and image 802-2, FIG. 8F). Thus, the chronological order (e.g., the order in which the images were taken by the camera) of sequence of images 802 is: image 802-1; image 802-2; image 802-3; image 802-4; and image 802-5.

Sequence of images 802 depicts a scene in which a cat 812 walks into the field of view, rolls his back on the ground, and gets up and walks away. Meanwhile, a bird 814 lands on a branch. While in reality, such a scene may take several seconds to unfold, in some embodiments, sequence of images 802 is captured in a short temporal window. For example, in some embodiments, any of the sequence of images described herein may depict the moment surrounding (e.g., within 0.5, 1.0, 1.5, 2.0, or 2.5 seconds) the instant when its respective representative image was obtained. For example, the user's interest may have been piqued when cat 812 began rolling in the grass, prompting the user to take representative image 802-3. In some embodiments, sequence of images 802 includes images just before and just after first representative image 802-3 was obtained, such that first sequence of images 802 comprises an enhanced photo through which the moment can "come to life" when the user performs certain operations with respect to representative image 802-3, as described herein.

In the example shown in FIGS. 8A-8L, portable multifunction device 100 also stores a plurality of images that are distinct from the images in the plurality of grouped sequences of images. For example, portable multifunction device 100 stores image 824 (FIG. 8I), which is not part of a sequence of images in the plurality of sequences of images (e.g., image 824 is a still image).

In some embodiments, user interface 800 is a user interface in an image management application (e.g., Photos from Apple Inc. of Cupertino, Calif.). To that end, in some embodiments, the camera that took sequence of images 802 is part of portable multifunction device 100 (e.g., the camera comprises optical sensors 164 in conjunction with imaging module 143, FIG. 1A). In some embodiments, the sequence of images 802 was taken by a camera that is not part of portable multifunction device 100 (e.g., sequence of images 802 was transferred to portable multifunction device 100 after being taken with a camera on another device). In some embodiments, sequence of images 802 was obtained in response to detecting activation of a shutter button at a first time, as described herein with respect to FIGS. 5A-5K and method 900 and/or FIGS. 22A-22D and method 2600. In some embodiments, the representative image 802-3 corresponds to the representative image acquired by the camera, as described herein with respect to FIGS. 5A-5K and method 900 and/or FIGS. 22A-22D and method 2600.

In some embodiments, some of the still images and/or the plurality of sequences of images were acquired using portable multifunction device 100 and some were transferred to portable multifunction device 100 after being taken with a camera on a different device. For example, in some circumstances, a user may obtain (e.g., take, capture) sequences of images, as described with reference to methods 900/2600, on a plurality of devices (e.g., a tablet, a laptop, and/or a digital camera, all in addition to portable multifunction device 100) and synchronize or otherwise transfer the sequences of images onto portable multifunction device 100, which stores additional still images.

In some embodiments, user interface 800 is a user interface in a messaging application (e.g., Messages from Apple Inc. of Cupertino, Calif.). In some embodiments, sequence of images 802 and/or still image 824 are messages in a message conversation displayed in a scrollable region of the messaging application, and sequence of images 802 is displayed as the scrollable region of the messaging application is scrolled. In some circumstance, a user may have obtained (e.g., taken, captured) a respective sequence of images on her own portable multifunction device 100 and also have received a different sequence of images, or different still images, from a different user (e.g., in a messaging application). Thus, in some embodiments, the plurality of sequences of images stored on portable multifunction device 100 includes at least one sequence of images obtained using a camera on portable multifunction device 100 and at least one sequence of images or still image that was obtained using a camera on a different device, distinct from portable multifunction device 100.

Figure 8A:
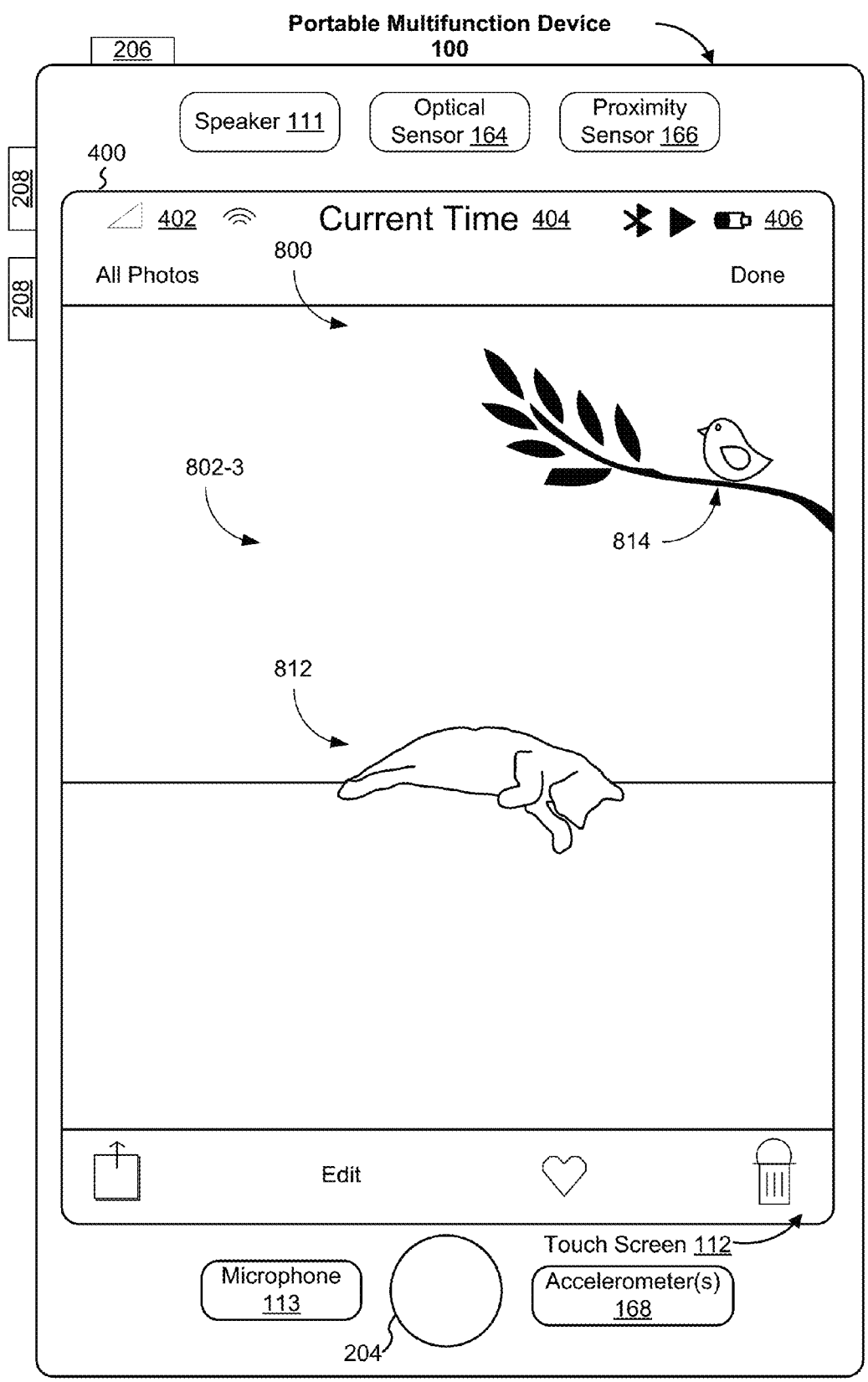
FIGS. 8A-8L illustrate exemplary user interfaces that perform distinct operations on sequences of related images as compared to individual images in accordance with some embodiments.
Figure 8B:
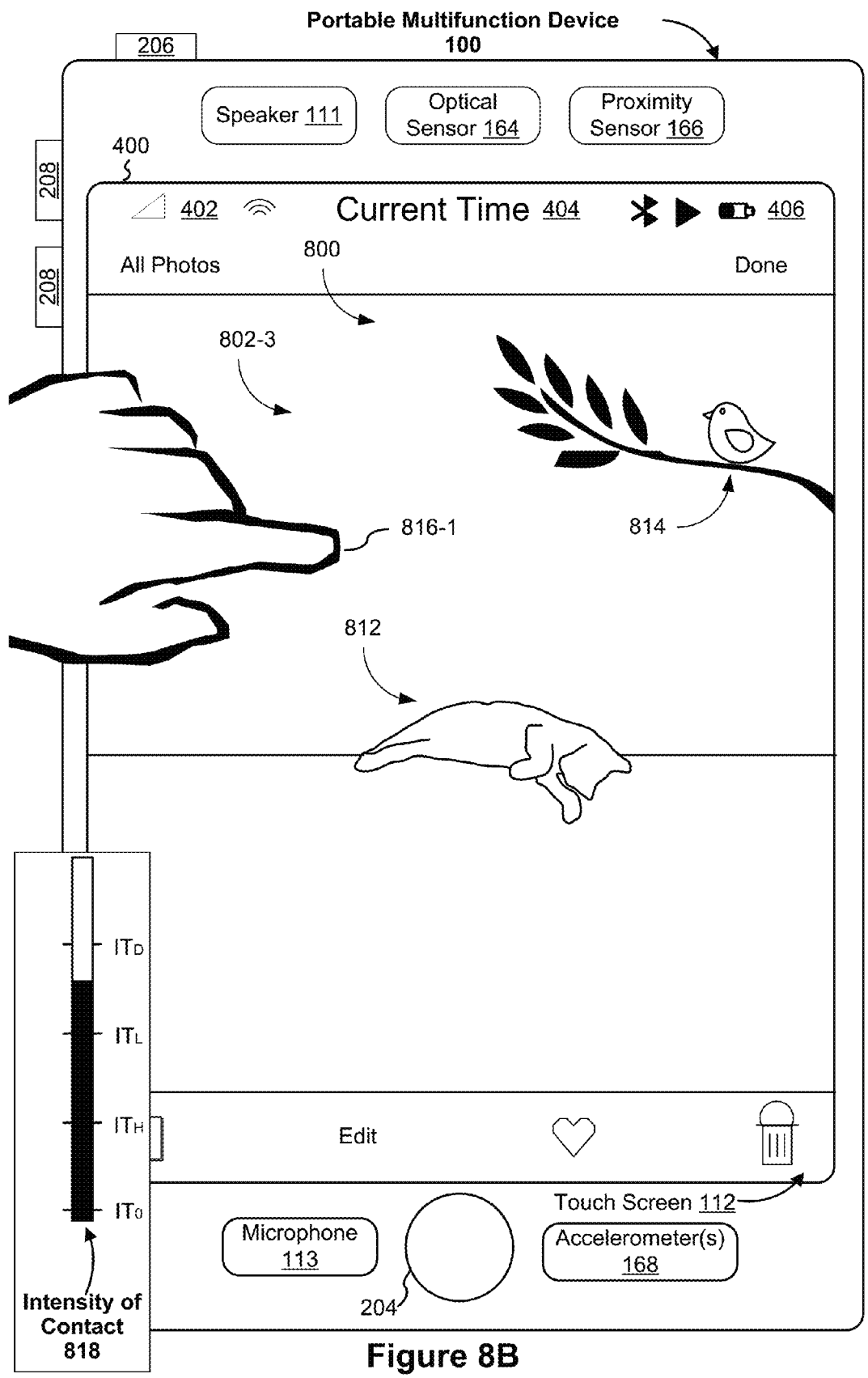
Figure 8C:
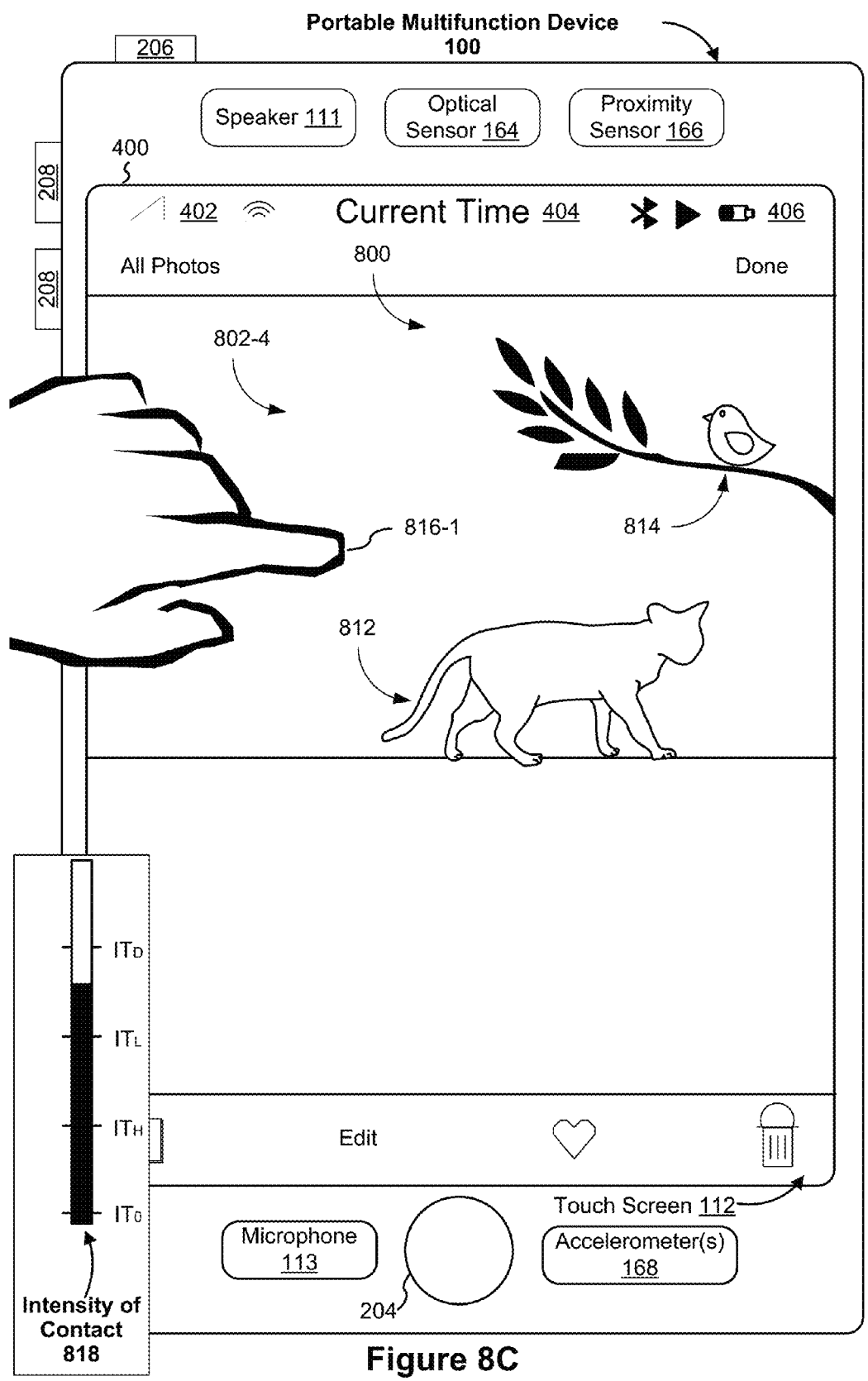
Figure 8D:
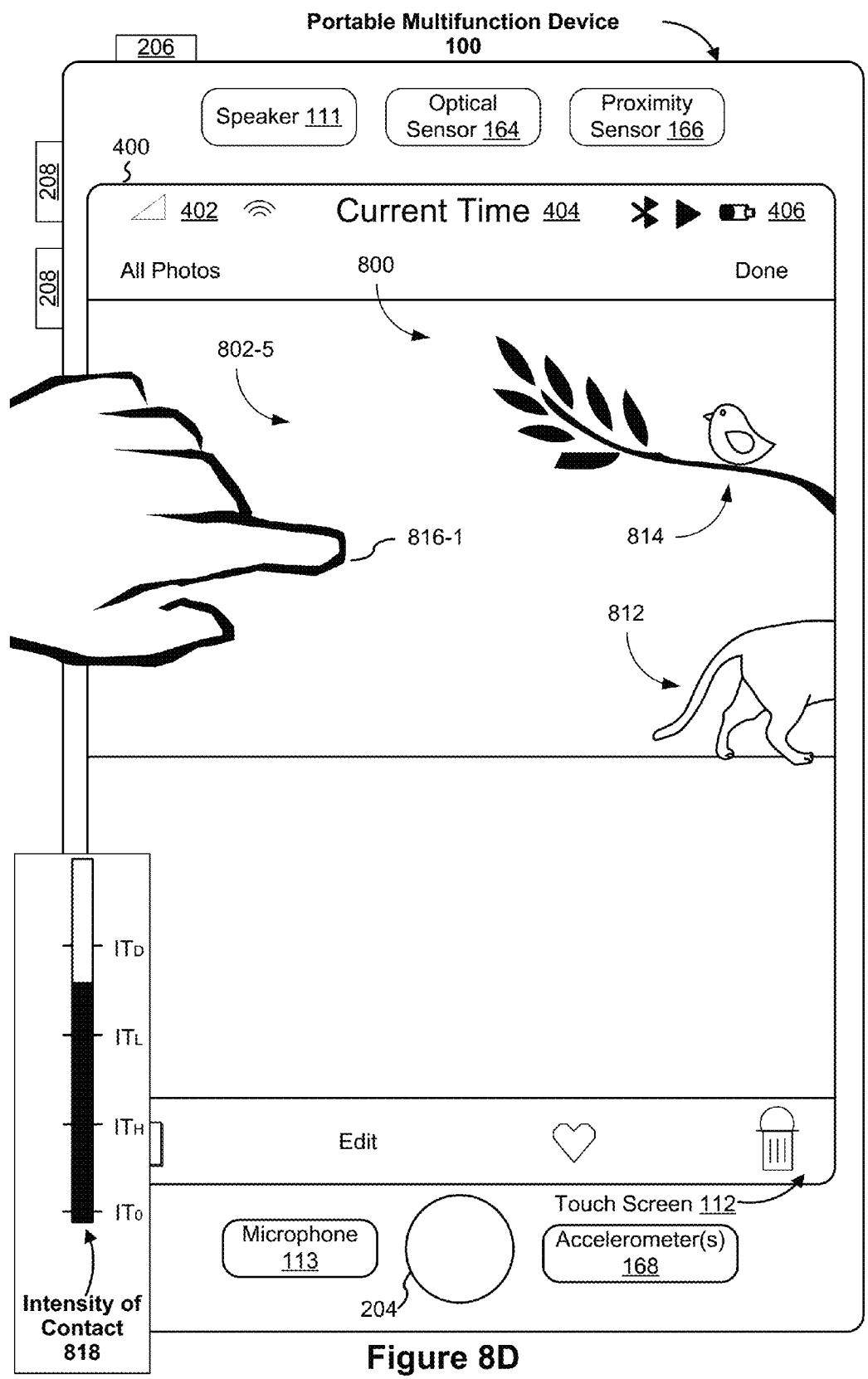
Figure 8E:
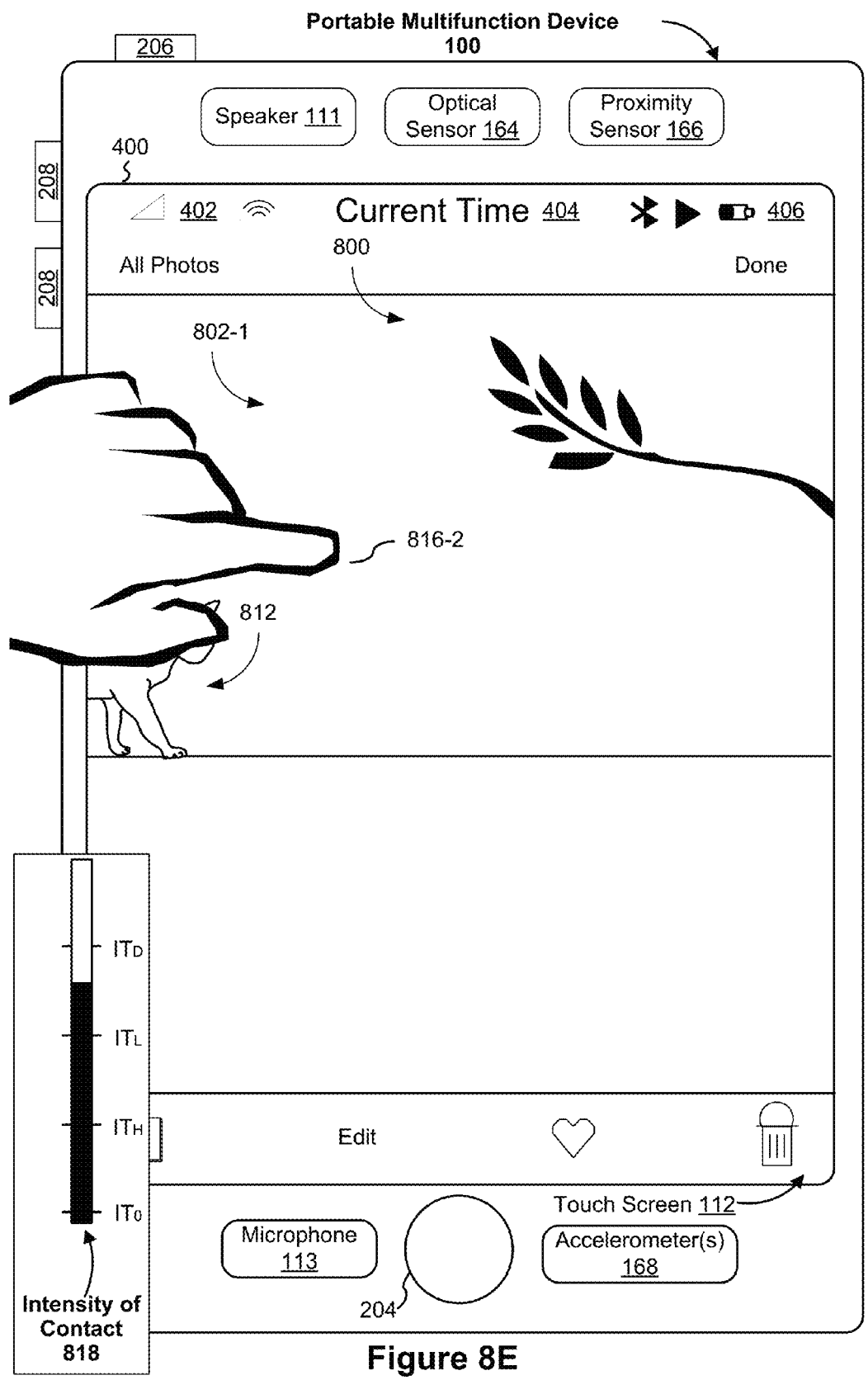
Figure 8F:
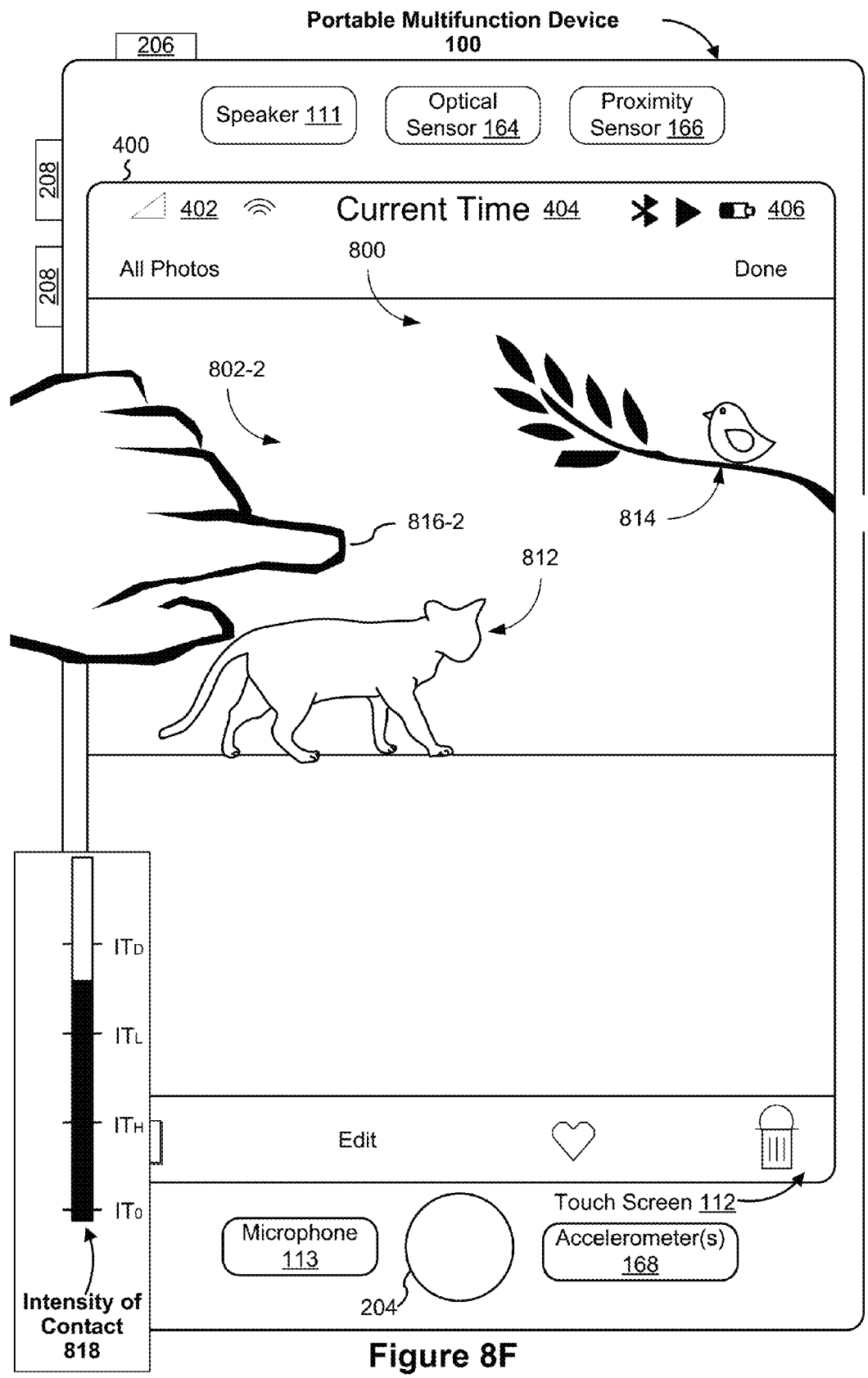
Figure 8G:
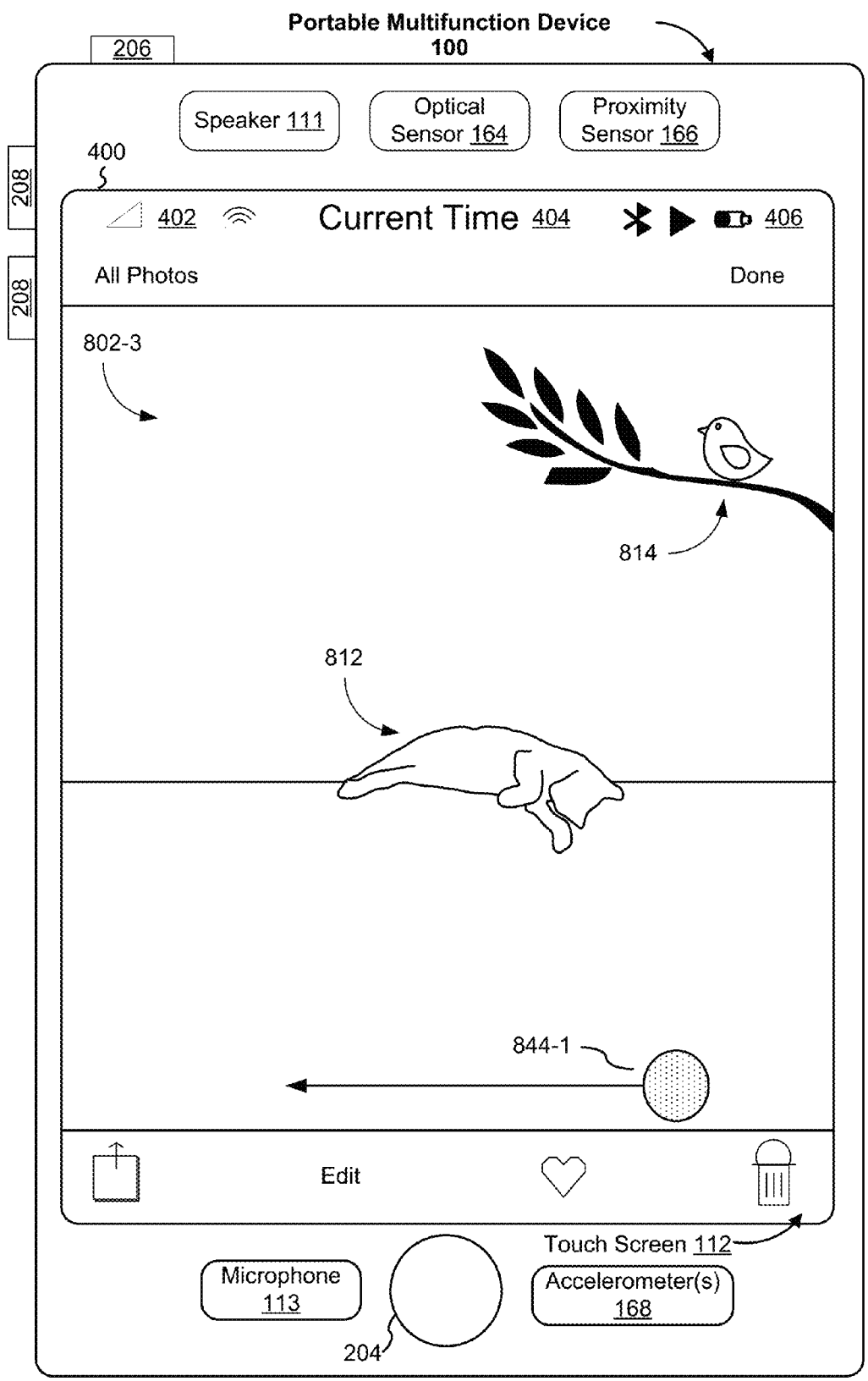
Figure 8H:
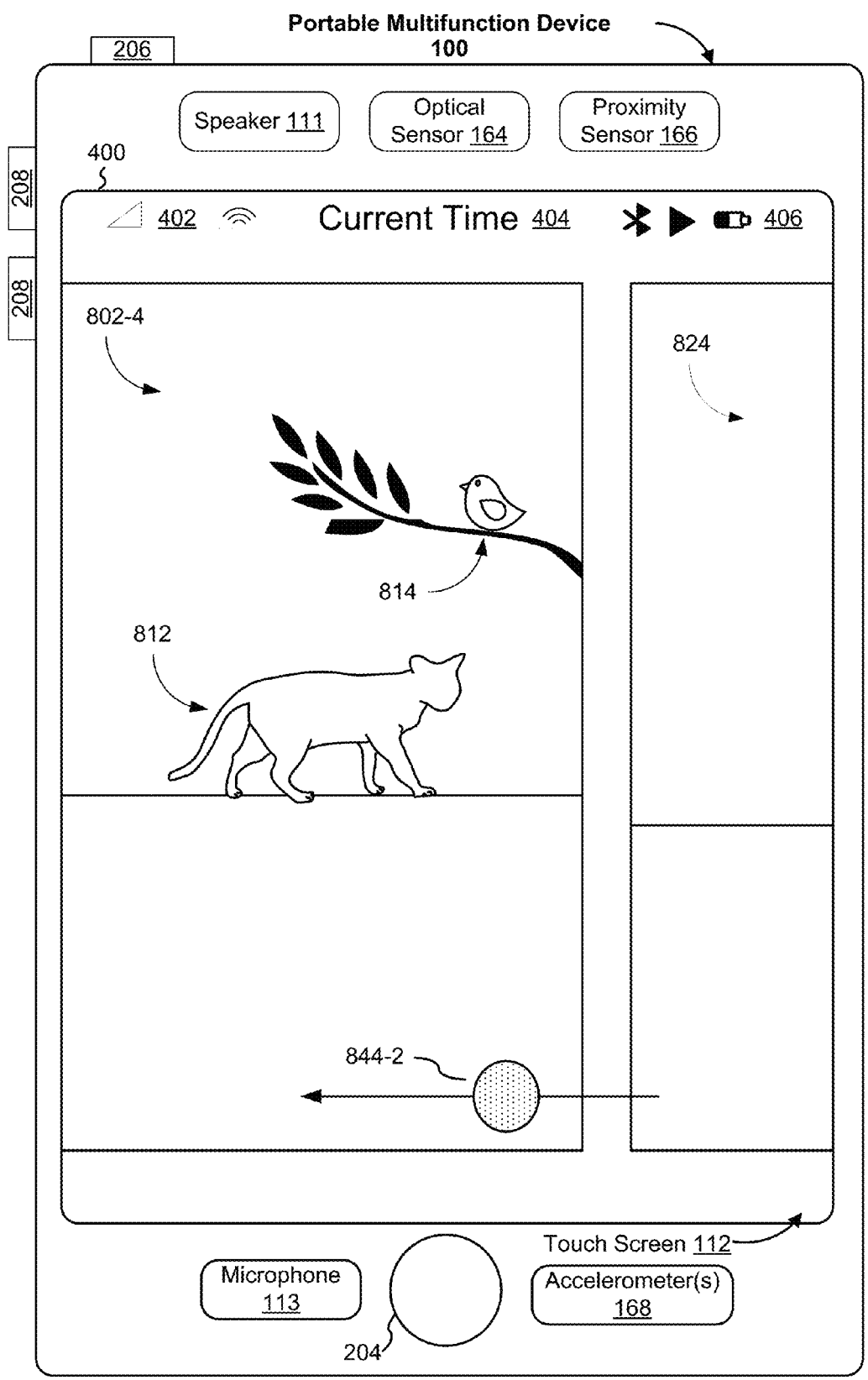
Figure 8I:
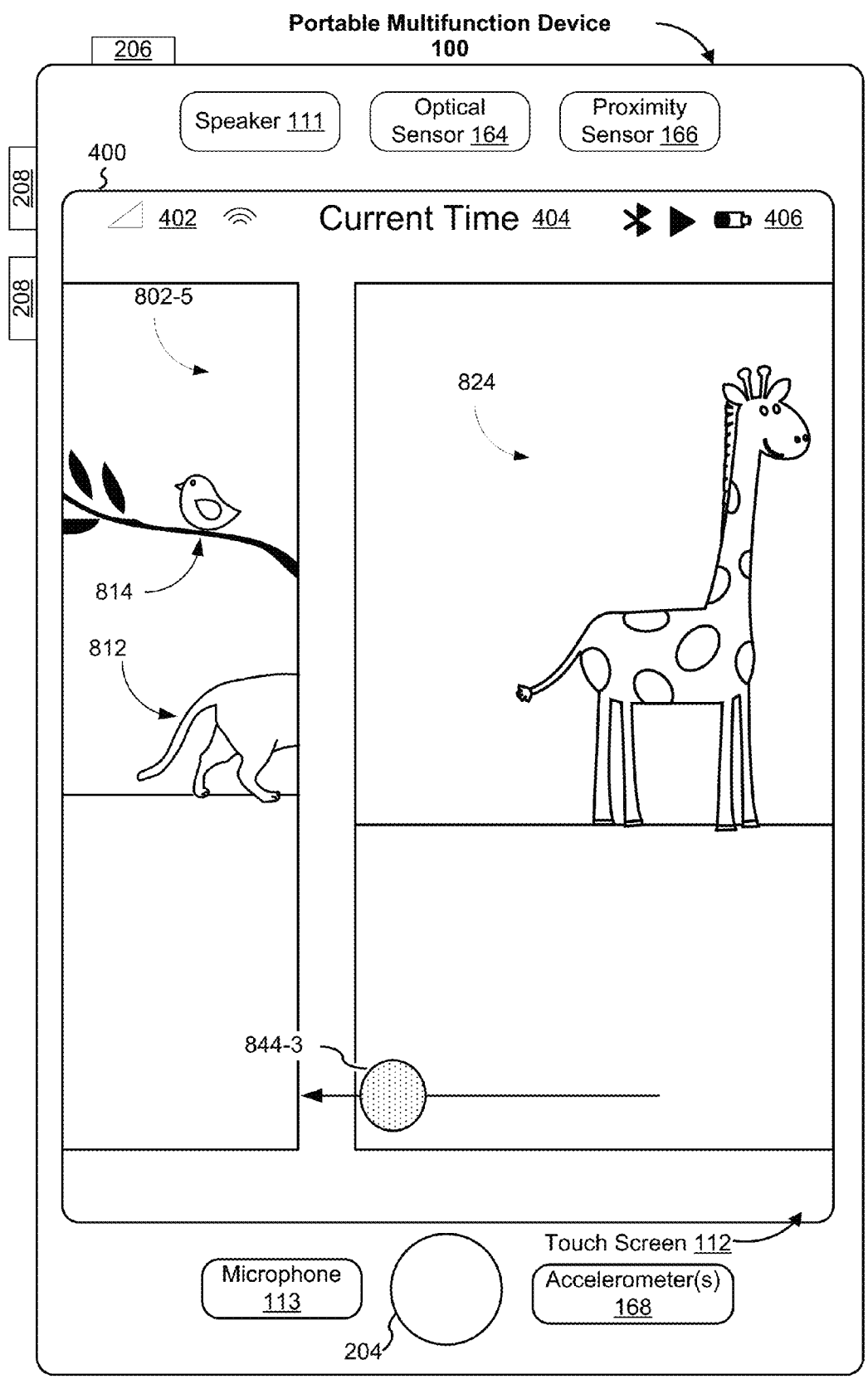
Figure 8J:
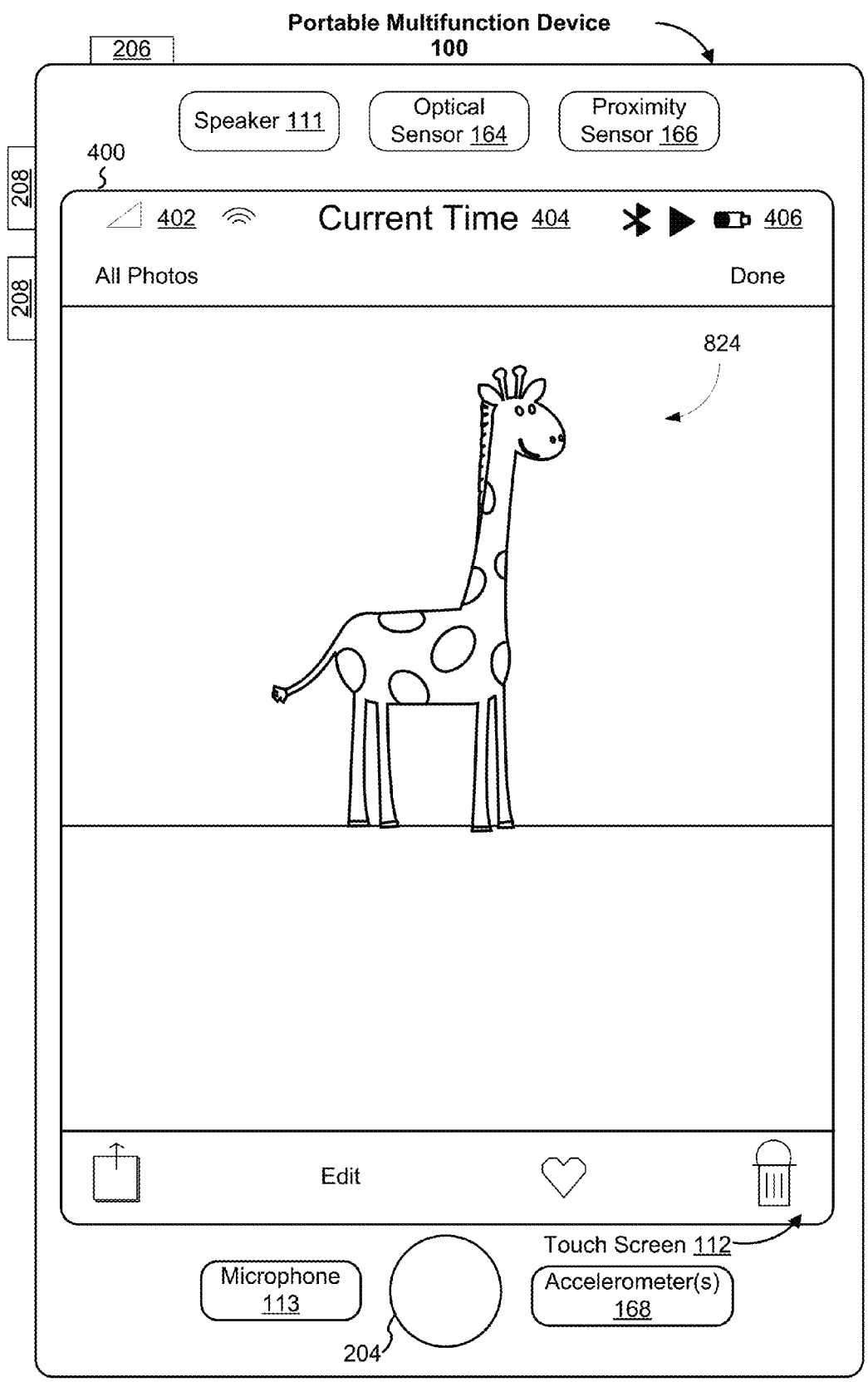
Figure 8K:
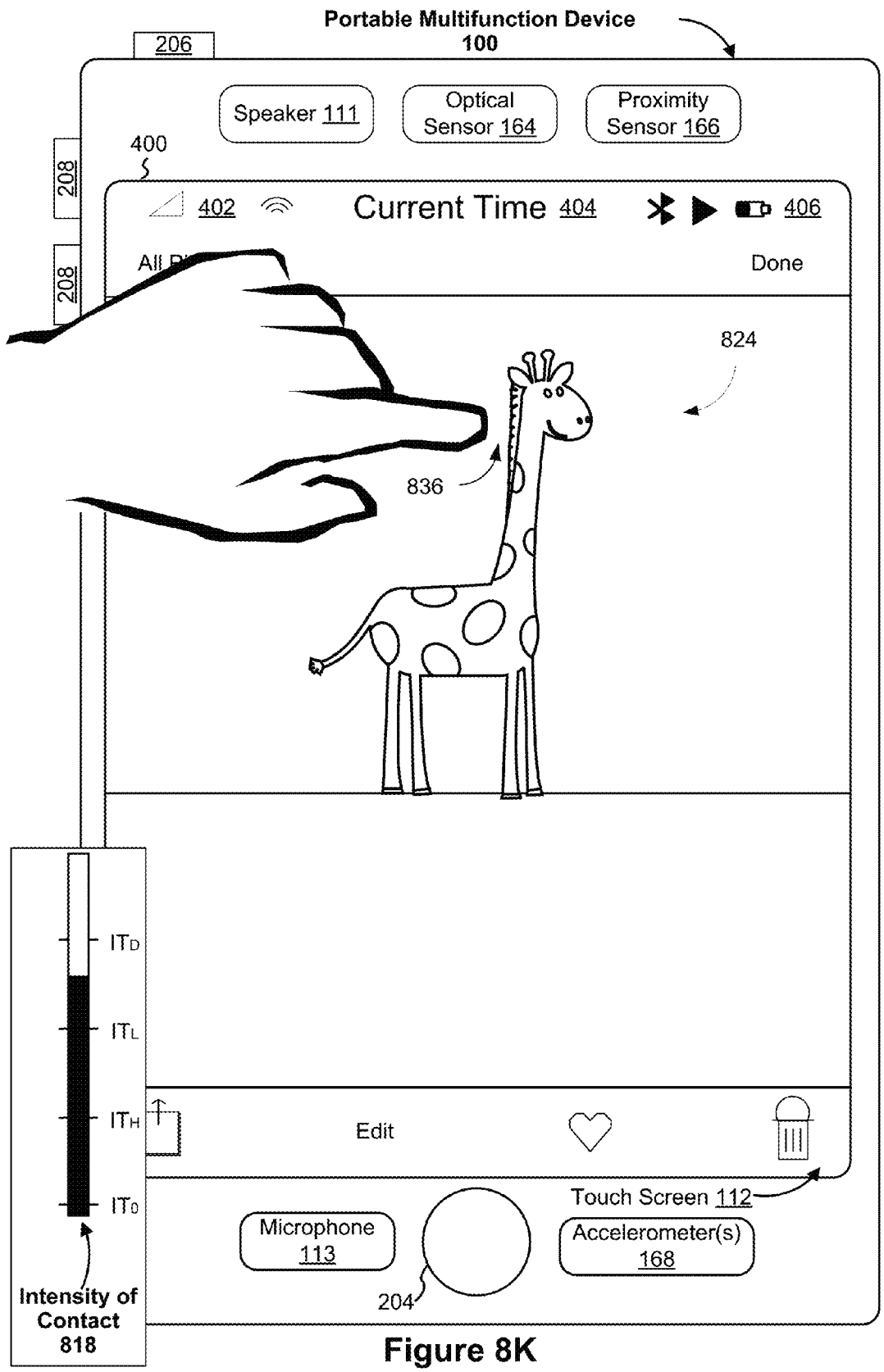
Figure 8L:
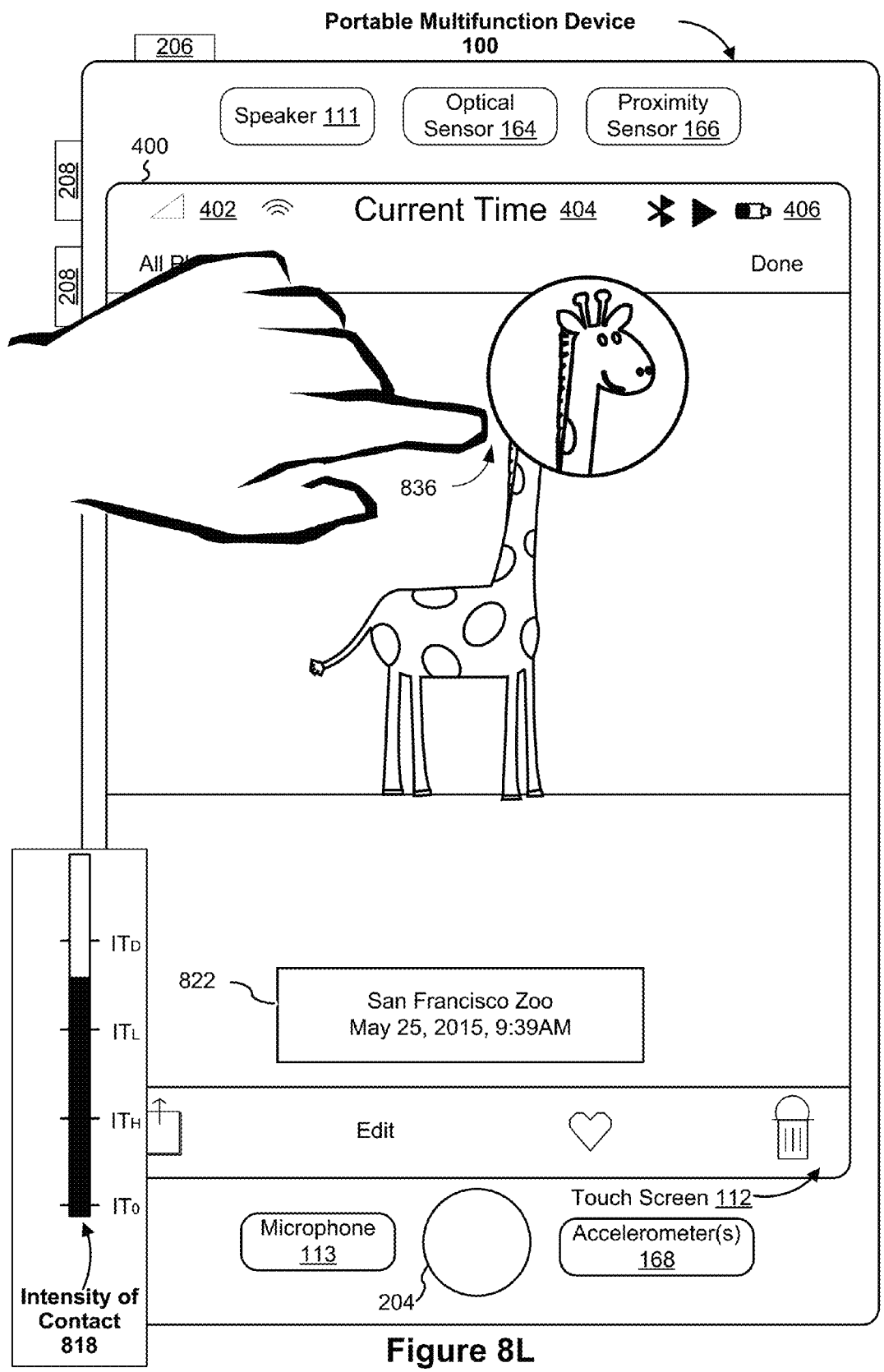
Figure 9D:
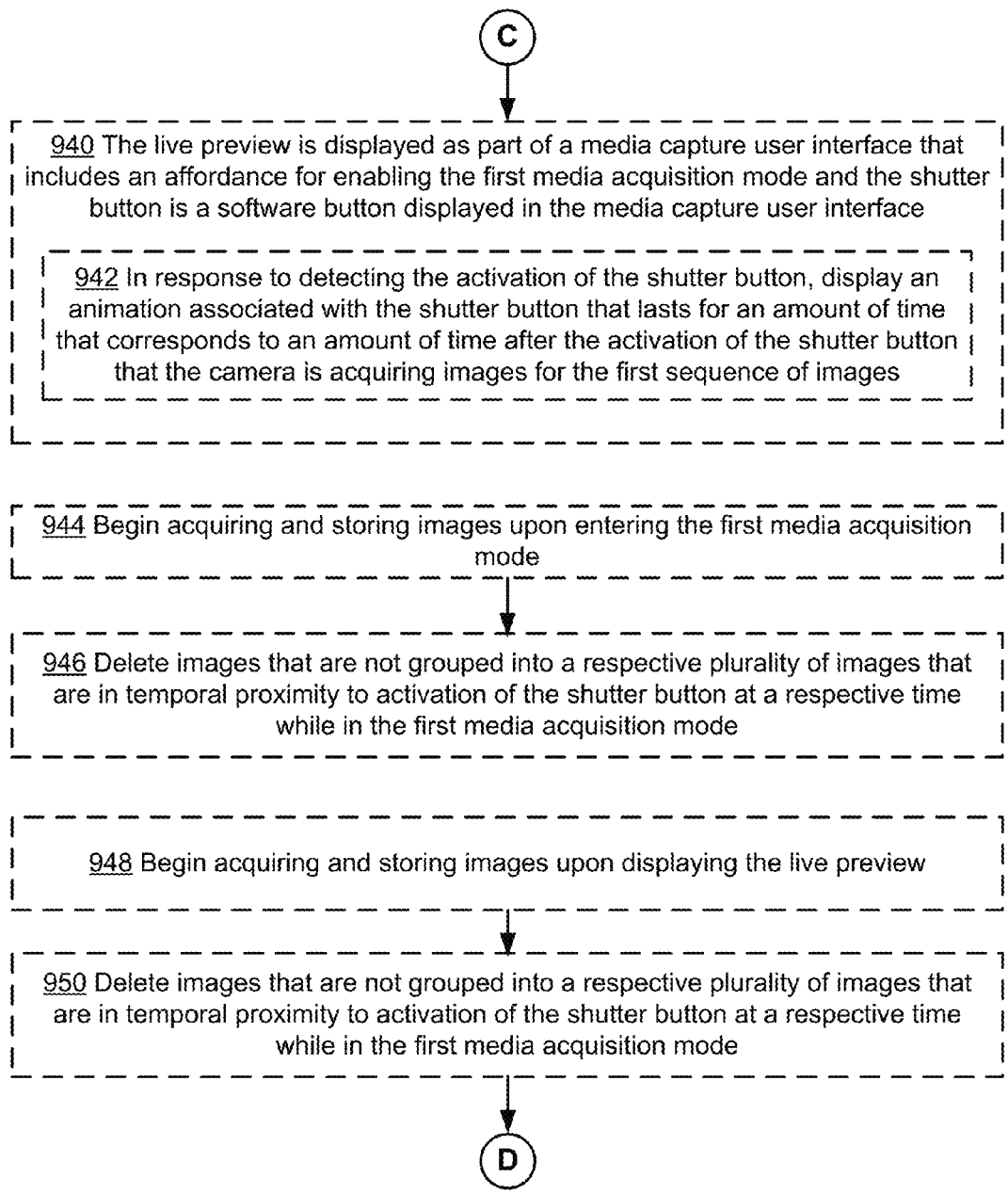
Figure 9E:
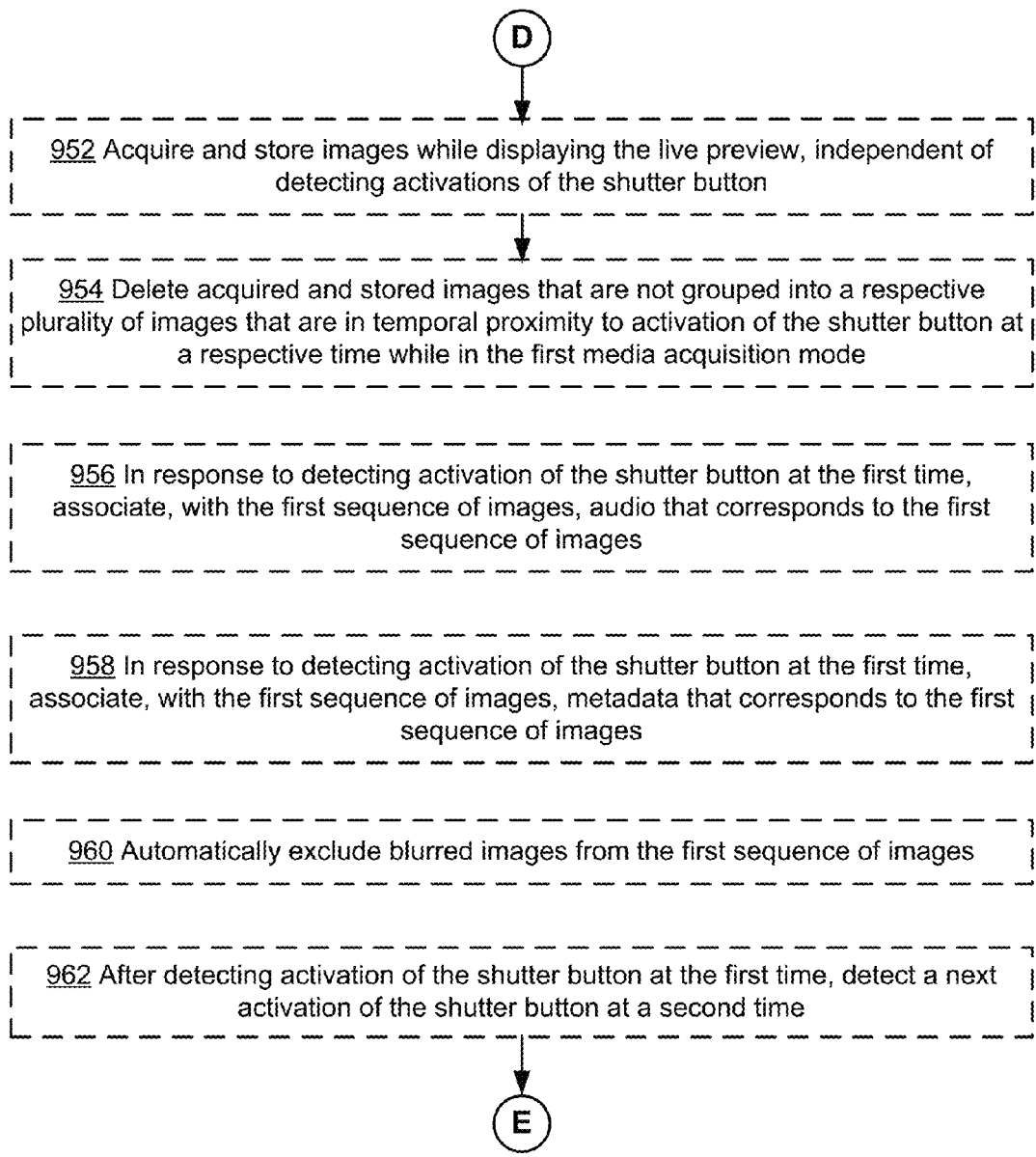
Figure 9F:
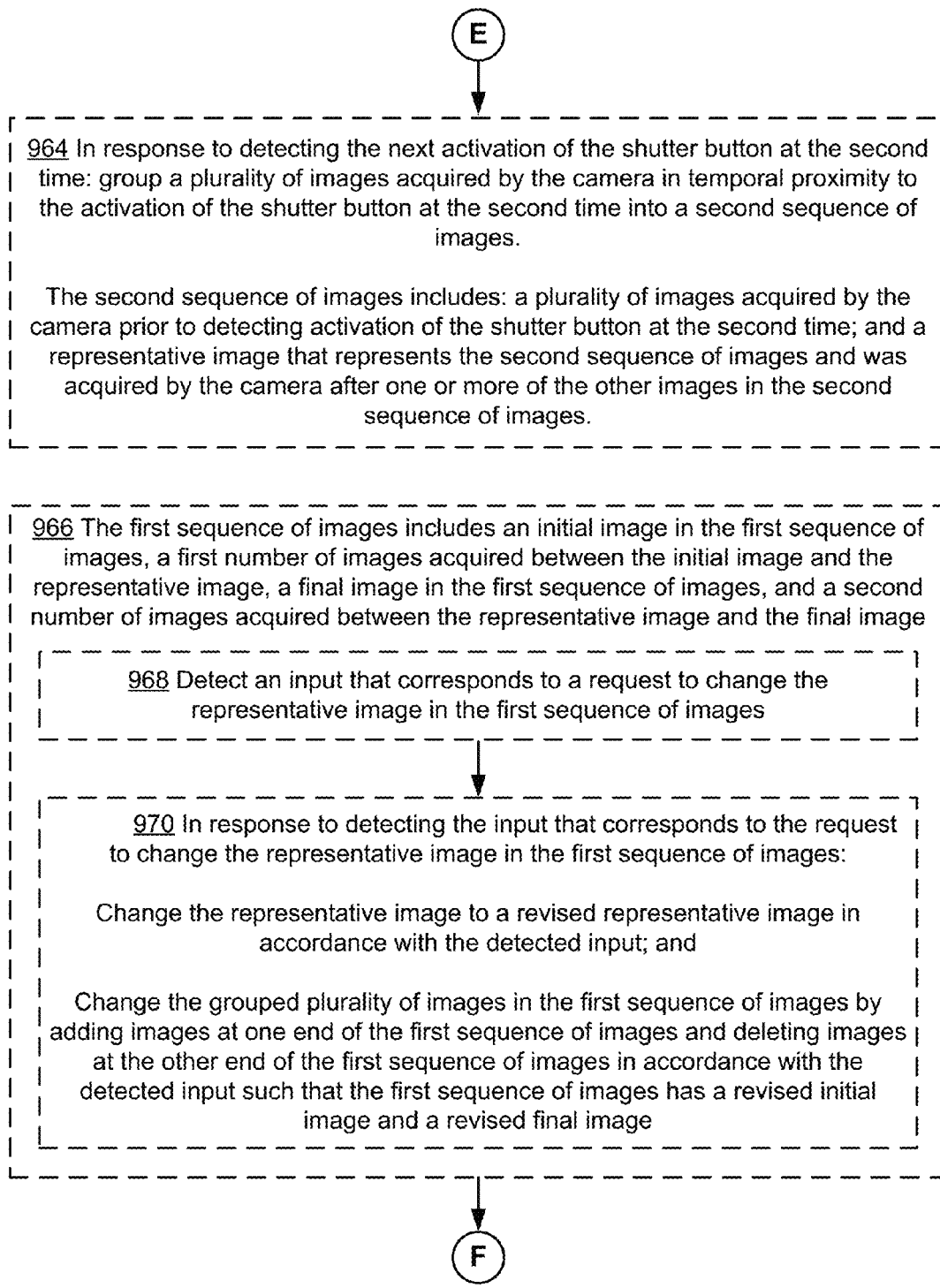
Figure 9G:
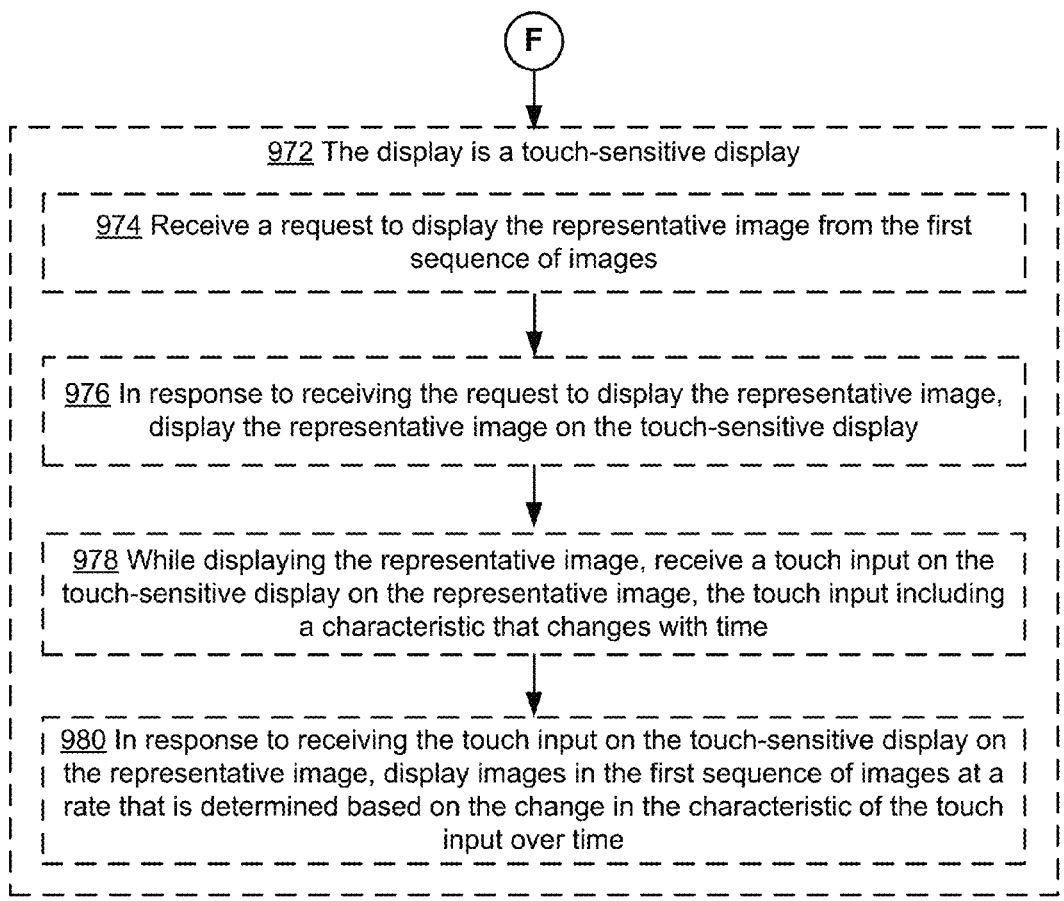
Figure 10B:
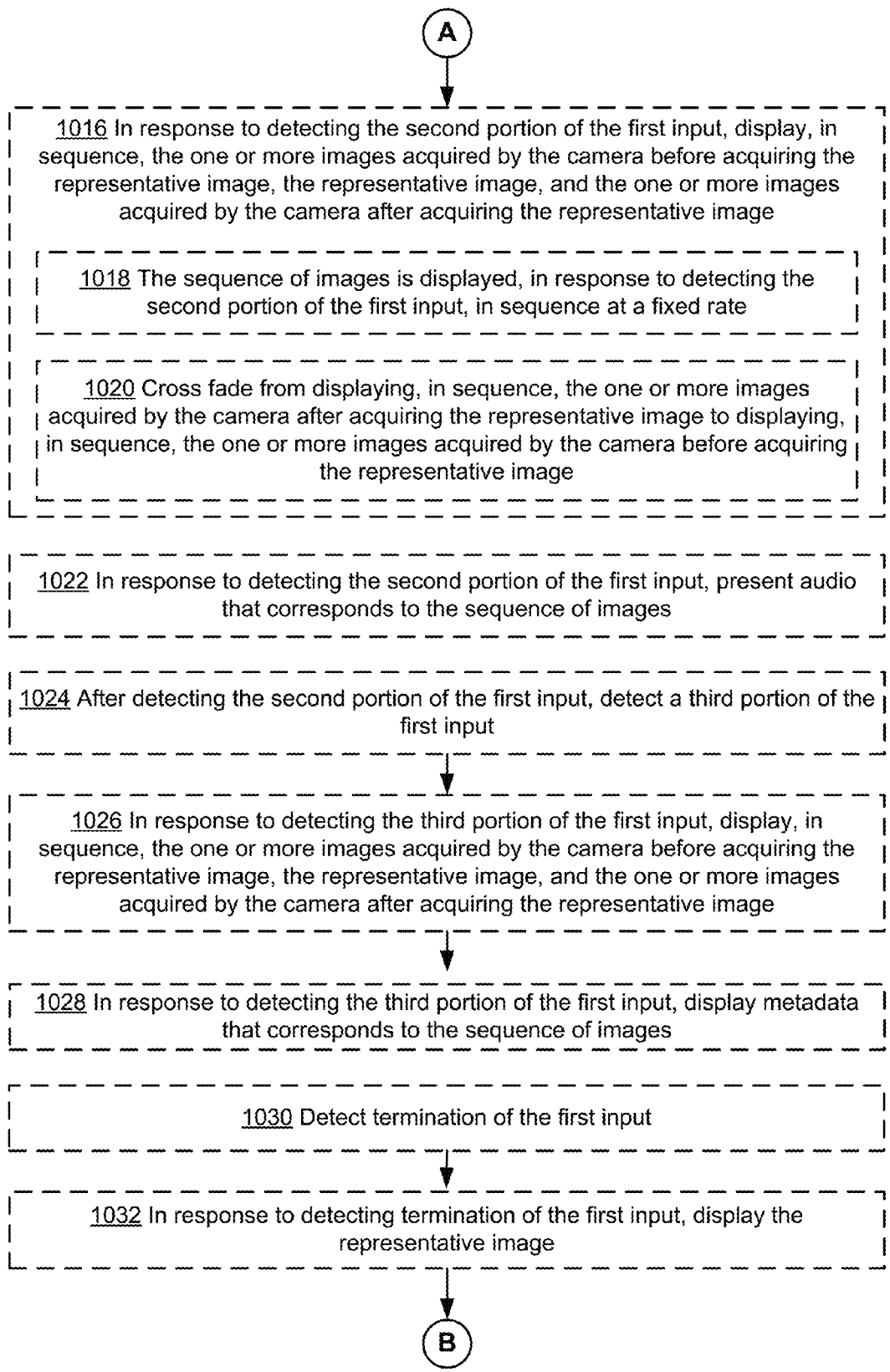
Figure 10C:
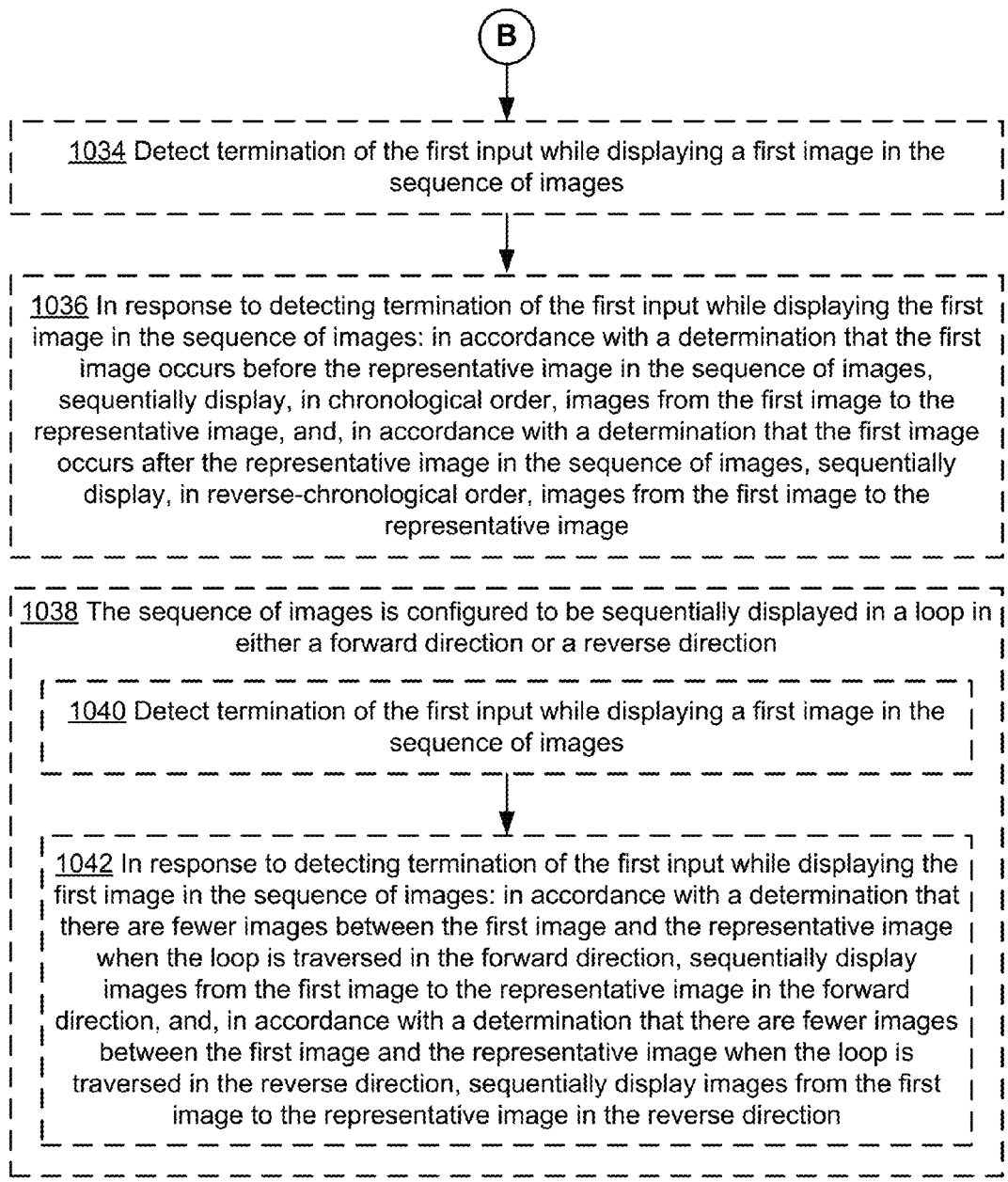
Figure 11B:
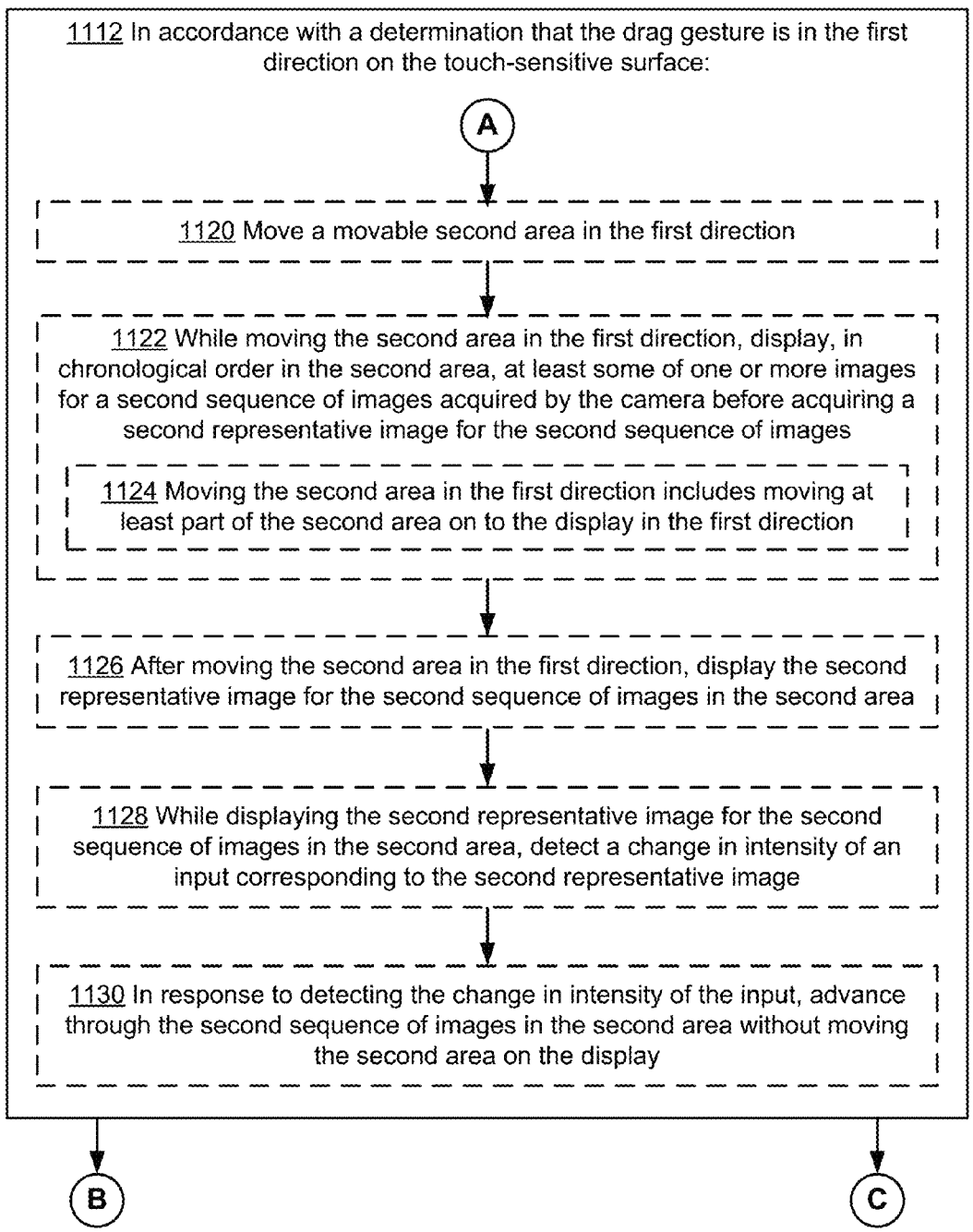
Figure 11C:
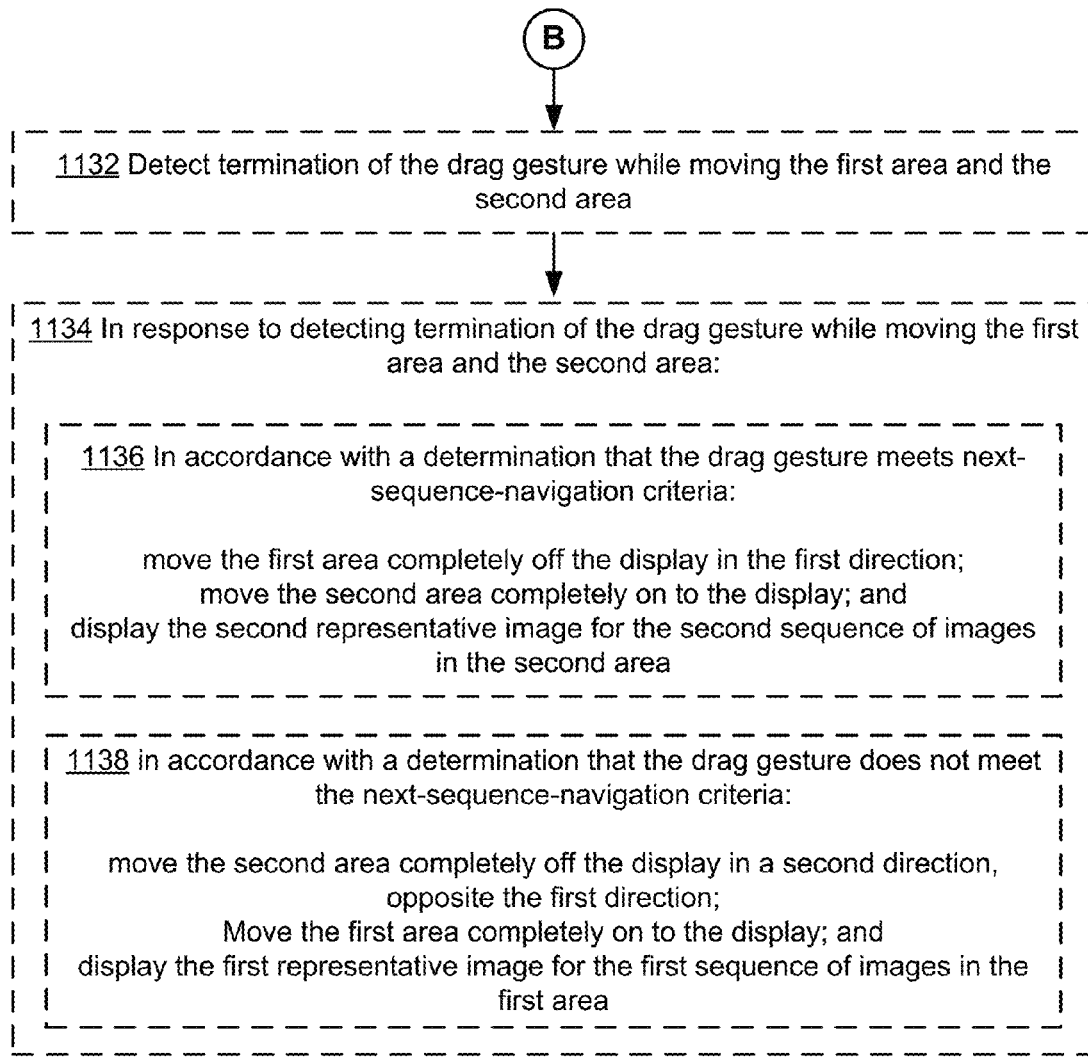
Figure 11D:
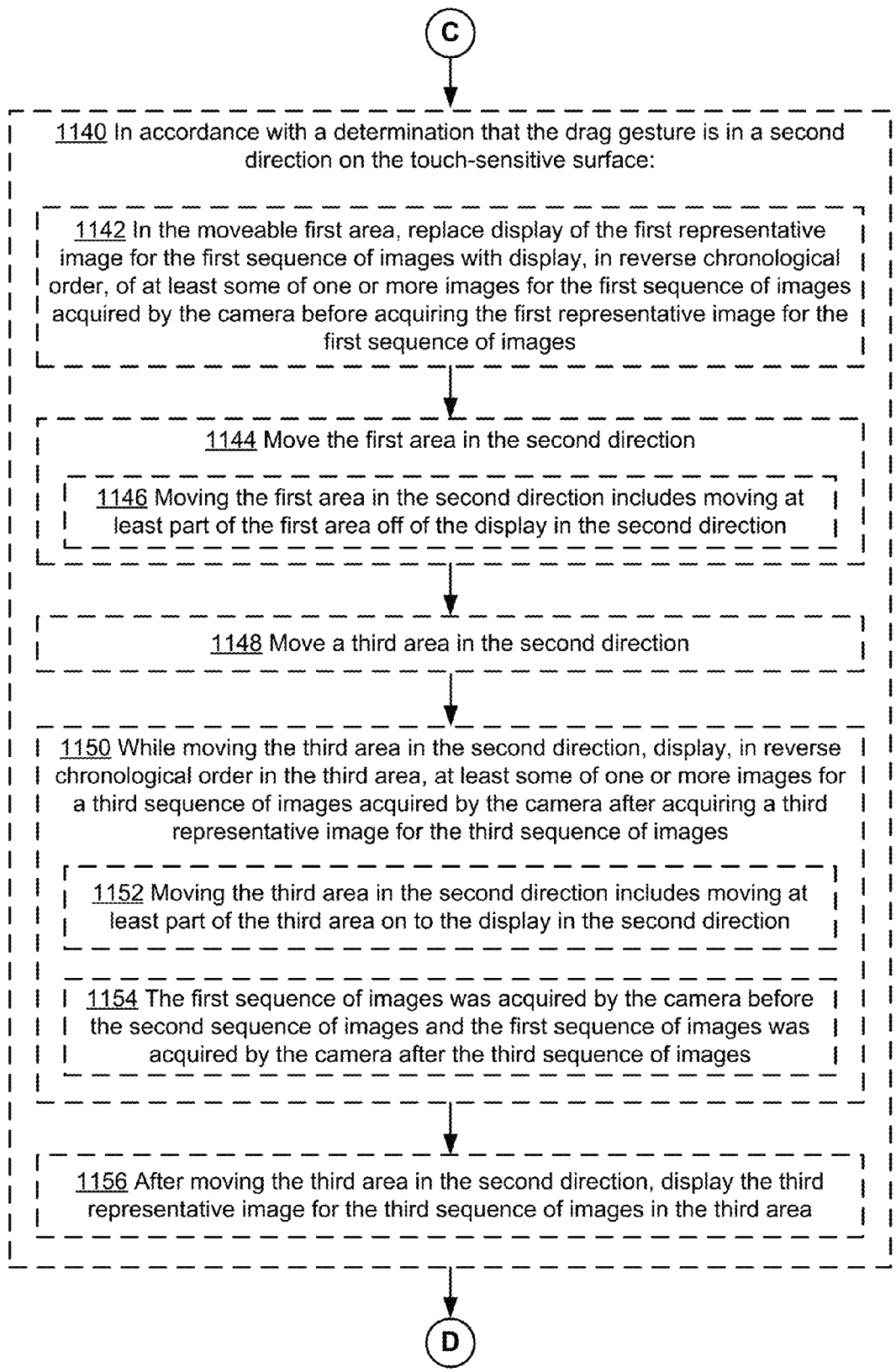
Figure 11E:
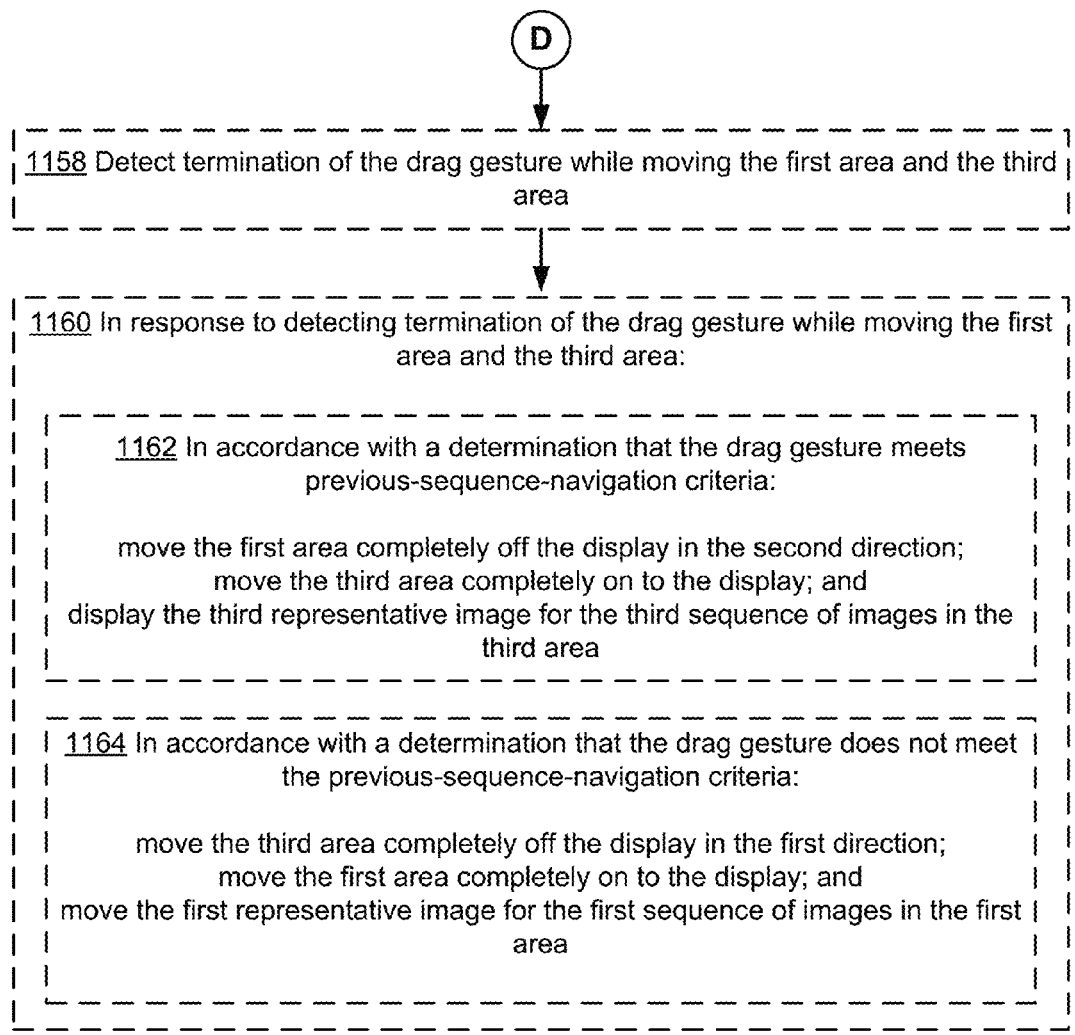

As shown in FIGS. 8A-8L, portable multifunction device 100 detects two analogous inputs: first input 816 (FIGS. 8B-8F) and second input 836 (FIGS. 8K-8L). First input 816 and second input 836 are analogous because they share a common set of characteristics (e.g., meet a common set of predefined criteria) such as intensity characteristics (as shown in intensity diagram 818) and path characteristics (e.g., both first input 816 and second input 836 are press-and-hold gestures). First input 816 and second input 836 are the same, except that first input 816 is detected over an image that is part of a sequence of images (e.g., representative image 802-3) while second input 836 is detected over an image that is not part of a sequence of images (e.g., still image 824).

As a result, portable multifunction device 100 performs a first operation when first input 816 is detected while displaying representative image 802-3 and a second, different, operation when second input 836 is detected while displaying still image 824. In the example shown in FIGS. 8B-8F, the first operation includes displaying at least a portion of the sequence of images 802 in the manner described with reference to FIGS. 6A-6FF and methods 1000/10000/10050. That is: during a first portion 816-1 of first input 816, portable multifunction device 100 plays back images obtained by the camera after obtaining image 802-3 (e.g., displays image 802-4, FIG. 8C, and displays image 802-5, FIG. 8D); and during a second portion 816-2 of first input 816, portable multifunction device 100 plays back images obtained by the camera before obtaining image 802-3 (e.g., displays image 802-1, FIG. 8E, and displays image 802-2, FIG. 8F). In the example shown in FIGS. 8K-8L, the second operation includes displaying an animation that shows different portions of still image 824. For example, as shown in FIG. 8L, the second operation includes an animation that zooms in on portion of still image 824 (e.g., a portion that is under or proximate to second input 836). In addition to or instead of zooming in, in some embodiments, the second operation includes displaying information (e.g., metadata 822) about still image 824.

FIGS. 8G-8I illustrate a navigational gesture 844 (e.g., a drag gesture). Navigational gesture is a leftward gesture, beginning at location 844-1, moving to location 844-2, moving to location 844-3. As such, in some embodiments, portable multifunction device 100 transitions from displaying sequence of images 802 (e.g., by displaying the sequence as described with reference to FIGS. 7A-7CC) to displaying still image 824 (e.g., image 824 slides across the touch screen 112 without animating through a sequence of images, because it is a still photo rather than an enhanced photo).). In some embodiments, when an input analogous to navigational gesture 844 is detected over a still image, portable multifunction device 100 transitions to a different image without displaying through images associated with the still image (e.g., because there are none).

FIGS. 9A-9G illustrate a flow diagram of a method 900 of capturing a grouped sequence of related images in accordance with some embodiments. The method 900 is performed at an electronic device (e.g., device 300, FIG. 3, or portable multifunction device 100, FIG. 1A) with a display and a camera. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 900 are, optionally, combined and/or the order of some operations is, optionally, changed.

While in a first media acquisition mode for the camera, the device displays (902)(e.g., as shown in FIG. 5A) a live preview on the display (e.g., the device displays images in real-time or near-real-time as the images are obtained from the camera). For example, the first media acquisition mode is a mode labeled as an enhanced photo mode, a moment mode, or the like.

In some embodiments, the first media acquisition mode is (904) configured to be enabled or disabled by a user of the device (e.g., via a settings interface for the camera). In some embodiments, the device includes at least three media acquisition modes: (1) the first media acquisition mode (which may be considered an "enhanced still image" acquisition mode), which groups a sequence of images in response to detecting activation of a shutter button, where the sequence of images includes images acquired before the activation of the shutter button and after the activation of the shutter button and stores them as a group of images; (2) a second media acquisition mode (e.g., a conventional still image acquisition mode), which stores a single image in response to detecting activation of a shutter button, like the still image mode in a conventional digital camera; and (3) a third media acquisition mode (e.g., a video acquisition mode), which stores video acquired after detecting activation of the shutter button, and which keeps recording video until the shutter button is activated again. In some embodiments, the user can select which media acquisition mode is enabled via a settings interface for the camera, mode selection buttons, a mode selection dial, or the like.

In some embodiments, the live preview is (906) displayed as part of a media capture user interface that includes an affordance for enabling the first media acquisition mode (e.g., affordance 506 FIGS. 5A-5H). While the first media acquisition mode is enabled, the affordance is animated (e.g., to indicate that image and/or audio data is being captured while the media capture user interface is displayed) and, while the first media acquisition mode is disabled, the affordance is not animated. In some embodiments, in response to detecting selection of the affordance (e.g., a tap gesture on the affordance) while the first media acquisition mode is disabled, the device enables the first media acquisition mode, starts capturing media (e.g., images and/or audio), and starts animating the affordance. In some embodiments, capturing media includes recording images and/or audio. In some embodiments, capturing media includes storing images and/or audio (e.g., in persistent memory).

While displaying the live preview, the device detects (908) activation of a shutter button at a first time (e.g., the device detects pressing of a physical button at the first time or detects a gesture on a virtual shutter button on a touch-sensitive display at the first time, such as a tap gesture on a shutter release icon (as shown in FIG. 5F), or a tap gesture on the live preview, where the live preview acts as a virtual shutter button). In some embodiments, the detected activation is a single activation of the shutter button (e.g., analogous to a single activation used in a conventional digital camera to capture a single image in the still image mode of a conventional digital camera).

In response to detecting activation of the shutter button at the first time, the device groups (910) a plurality of images acquired by the camera in temporal proximity to the activation of the shutter button at the first time into a first sequence of images, as shown in FIGS. 5I-5K). The first sequence of images includes: a plurality of images acquired by the camera prior to detecting activation of the shutter button at the first time; a representative image that represents the first sequence of images and was acquired by the camera after one or more of the other images in the first sequence of images; and a plurality of images acquired by the camera after acquiring the representative image.

In some embodiments, the representative image is acquired by the camera at the first time and is analogous to the single image captured in the still image mode of a conventional digital camera when its shutter button is activated. In some embodiments, the representative image acquired by the camera corresponds to an image that was acquired at the first time. In some embodiments, the representative image acquired by the camera corresponds to an image that was acquired shortly after detecting activation of the shutter button at the first time, at a time that takes into account shutter lag (the time delay between detecting activation of the shutter button and capturing/storing the representative image). In some embodiments, the representative image acquired by the camera is used to represent the sequence of images, for example in an image presentation mode.

In some embodiments, the first sequence of images includes a predefined number of images—such as 5, 10, 15, 20, 25, or 30 images—acquired after acquiring the representative image. In some embodiments, the images acquired after acquiring the representative image are images that are within a predefined time after acquiring the representative image, such as within 0.5, 1.0, 1.5, 2.0, or 2.5 seconds after acquiring the representative image. In some embodiments, the first sequence of images includes a predefined number of images—such as 5, 10, 15, 20, 25, or 30 images—acquired after detecting activation of the shutter button at the first time. In some embodiments, the images acquired after detecting activation of the shutter button at the first time are images that are within a predefined time after the first time, such as within 0.5, 1.0, 1.5, 2.0, or 2.5 seconds after the first time. In some embodiments, the plurality of images, in the first sequence of images, that is acquired after acquiring the representative image meet predefined grouping criteria. In some embodiments, the predefined grouping criteria include selecting a predefined number of images after the representative image. In some embodiments, the predefined grouping criteria include selecting images in a predefined range of time immediately after detecting activation of the shutter button. In some embodiments, the predefined grouping criteria include selecting images in a predefined range of time immediately after the time at which the representative image is acquired.

In some embodiments, the first sequence of images are (912) stored as a first distinct set of images in the memory (e.g., stored together in a data structure in non-volatile memory). In some embodiments, the representative image acquired by the camera is used to represent the first distinct set of images, for example in an image presentation mode (e.g., see FIGS. 6A-6FF, 7A-7CC, and 8A-8L).

In some embodiments, the live preview displays (914) images at a first resolution and the first sequence of images includes images, at the first resolution, that were displayed in the live preview (e.g., the first resolution is a lower resolution than an upper limit of the camera's resolution). In some embodiments, the representative image acquired by the camera has (916) a second resolution that is higher than the first resolution. In some embodiments, the representative image acquired by the camera has a higher resolution than other images in the first sequence of images. For example, the representative image acquired by the camera is a 12, 18, or 24 megapixel image and the other images in the first sequence of images have a lower resolution that corresponds to the resolution displayed in the live preview (e.g., the first resolution). In some embodiments, the representative image acquired by the camera has the same resolution as other images in the first sequence of images.

In some embodiments, parameters for a respective sequence of images grouped in response to detecting a respective activation of the shutter button are (918) configurable by a user of the device. For example, via a settings interface for the camera, a user can select the number of images in a respective sequence, which image serves as a representative image of the sequence (e.g., as shown in FIGS. 5I-5K), and/or other acquisition or display parameters for the sequence of images (e.g., the resolution of the respective image, the resolution of the other images, the frame rate, filter effects, etc.).

In some embodiments, the plurality of images acquired by the camera prior to detecting activation of the shutter button at the first time are (920) stored in a first form in the memory (e.g., program memory, volatile memory, ring buffer, etc.) prior to detecting activation of the shutter button at the first time and are stored in a second form in the memory (e.g., non-volatile memory/storage) in response to detecting activation of the shutter button at the first time.

In some embodiments, the plurality of images acquired prior to detecting activation of the shutter button at the first time is (922) a predefined number of images (e.g., 5, 10, 15, 20, 25, or 30 images).

In some embodiments, the plurality of images acquired prior to detecting activation of the shutter button at the first time is (924) images that are within a predefined time prior to the first time (e.g., within 0.5, 1.0, 1.5, 2.0, or 2.5 seconds prior to the first time).

In some embodiments, the plurality of images acquired prior to detecting activation of the shutter button at the first time is (926) images that are within a predefined time prior to a time at which the representative image is acquired (e.g., within 0.5, 1.0, 1.5, 2.0, or 2.5 seconds prior to the time at which the representative image is acquired).

In some embodiments, the plurality of images acquired prior to detecting activation of the shutter button at the first time are (928) from a range of time between the first time and a second time that is prior to the first time, and acquiring the plurality of images prior to detecting activation of the shutter button at the first time is independent of detecting an interaction with the shutter button that is temporally proximate to the second time (other than detecting activation of the shutter button at the first time). For example, the plurality of images acquired prior to detecting activation of the shutter button at the first time is not acquired in response to detecting an interaction with the shutter button that is temporally proximate to the second time (other than detecting activation of the shutter button at the first time). For example, the plurality of images acquired prior to detecting activation of the shutter button at the first time is not acquired in response to detecting a partial (or complete) activation of the shutter button at or near the second time.

In some embodiments, the plurality of images, in the first sequence of images, that are acquired prior to detecting activation of the shutter button at the first time meet (930) one or more predefined grouping criteria. In some embodiments, the predefined grouping criteria include selecting (932) a predefined number of images prior to detecting activation of the shutter button. In some embodiments, the predefined grouping criteria include selecting (934) a predefined number of images prior to the representative image.

In some embodiments, the predefined grouping criteria include selecting (936) images in a predefined range of time immediately prior to detecting activation of the shutter button. In some embodiments, the predefined grouping criteria include selecting (938) images in a predefined range of time immediately prior to the time at which the representative image is acquired.

In some embodiments, the live preview is (940) displayed as part of a media capture user interface that includes an affordance for enabling the first media acquisition mode and the shutter button is a software button displayed in the media capture user interface (e.g., shutter button 514, FIGS. 5A-5H). In response to detecting the activation of the shutter button (e.g., tap gesture 518, FIG. 5F), the device displays (942) an animation associated with the shutter button (e.g., an animation of a portion of the shutter button breaking apart and flying back together, as shown in FIGS. 5F-5H) that lasts for an amount of time that corresponds to an amount of time after the activation of the shutter button that the camera is acquiring images for the first sequence of images (e.g., so as to provide the user with an indication that media is still being captured). In some embodiments, the animation is a looping animation that can be seamlessly extended if the shutter button is activated again before the camera is finished acquiring images for the first sequence of images.

In some embodiments, the device begins (944) acquiring and storing images upon entering the first media acquisition mode (independent of detecting activations of the shutter button). The device deletes (946) (or marks for deletion) images that are not grouped into a respective plurality of images that are in temporal proximity to activation of the shutter button at a respective time while in the first media acquisition mode.

In some embodiments, the device begins (948) acquiring and storing images upon displaying the live preview (independent of detecting activations of the shutter button). The device deletes (950) (or marks for deletion) images that are not grouped into a respective plurality of images that are in temporal proximity to activation of the shutter button at a respective time while in the first media acquisition mode.

In some embodiments, the devices acquires (952) and stores images while displaying the live preview, independent of detecting activations of the shutter button. The device deletes (954) (or marks for deletion) acquired and stored images that are not grouped into a respective plurality of images that are in temporal proximity to activation of the shutter button at a respective time while in the first media acquisition mode.

In some embodiments, the user can select a length of time that an image is retained before discarding the image if it is not grouped into a sequence of images. For example, the user can set the device to retain images displayed in the live preview mode for 5, 10, or 20 seconds. Assuming, for example, that the user selects a length of time of 5 seconds, an image displayed in the live preview is retained for 5 seconds after it is displayed in the live preview and then discarded (e.g., deleted, or marked for deletion) if it is not grouped into a sequence of images by activation of the shutter button.

In some embodiments, in response to detecting activation of the shutter button at the first time, the device associates (956), with the first sequence of images, audio that corresponds to the first sequence of images (e.g., including audio that was recorded prior to detecting activation of the shutter button and audio that was recorded after detecting activation of the shutter button). In some embodiments, the device includes a microphone (or is in communication with a microphone) and audio detected when the sequence of images was acquired is stored in the memory and linked to (or otherwise associated with) the stored first sequence of images. For example, FIGS. 6E-6I illustrate playback of a sequence of images with corresponding audio.

In some embodiments, in response to detecting activation of the shutter button at the first time, the device associates (958), with the first sequence of images, metadata that corresponds to the first sequence of images (e.g., FIGS. 6J-6M illustrate playback of a sequence of images with corresponding metadata). In some embodiments, metadata such as time, date, location (e.g., via GPS), weather, music that was playing when the sequence of images was acquired (e.g., music identified with music identification software in the device, such as Shazam, SoundHound, or Midomi), local event information (such as a sports game that was being played when and where the first sequence of images was acquired), post-event information (such as a final score), etc., for the sequence of images is stored in the memory and linked to (or otherwise associated with) the stored sequence of images.

In some embodiments, the device automatically excludes (960) (or deletes or forgoes displaying as part of the sequence) blurred images from the first sequence of images.

In some embodiments, after detecting activation of the shutter button at the first time, the device detects (962) a next activation of the shutter button at a second time (without detecting any activations of the shutter button between the first time and the second time). In response to detecting the next activation of the shutter button at the second time: the device groups (964) a plurality of images acquired by the camera in temporal proximity to the activation of the shutter button at the second time into a second sequence of images. The second sequence of images includes: a plurality of images acquired by the camera prior to detecting activation of the shutter button at the second time and a representative image that represents the second sequence of images and was acquired by the camera after one or more of the other images in the second sequence of images. In some embodiments, capturing sequences of images is done in an analogous manner to capturing individual images with a conventional digital camera, which makes it simple and intuitive for even novice users to capture such sequences of images. For a conventional digital camera, each time the shutter button is activated, an individual image is captured. Here, each time the shutter button is activated, a sequence of images is captured. This manner of capturing sequences of images is different from the manner of capturing video with a conventional digital camera. For capturing video with a conventional digital camera, a first activation of a shutter button starts recording the video and the next activation of the shutter button stops recording the video.

In some embodiments, the first frame and/or a last frame in a sequence are changed in accordance with a change of the representative image (e.g., as shown in FIGS. 5I-5K). To that end, in some embodiments, the first sequence of images includes (966) an initial image in the first sequence of images, a first number of images acquired between the initial image and the representative image, a final image in the first sequence of images, and a second number of images acquired between the representative image and the final image. The device detects (968) an input that corresponds to a request to change the representative image in the first sequence of images. In some embodiments, while in an image sequence editing mode, the device detects a gesture (e.g., a drag gesture or a tap gesture) that causes a representative-image-selection indicator to move from the current representative image to another image in the first sequence of images (e.g., touch gesture 522). In some embodiments, while in an image sequence editing mode, the device detects a gesture (e.g., a drag gesture or a tap gesture) that causes the current representative image to move out of a representative-image-selection area and causes another image in the first sequence of images to move into the representative-image-selection area. In response to detecting the input that corresponds to the request to change the representative image in the first sequence of images: the device changes (970) the representative image to a revised representative image in accordance with the detected input; and changes the grouped plurality of images in the first sequence of images by adding images at one end of the first sequence of images and deleting images at the other end of the first sequence of images in accordance with the detected input such that the first sequence of images has a revised initial image and a revised final image.

In some embodiments, the number of images between the initial image and the representative image and the number of images between the revised initial image and the revised representative image is the same. In some embodiments, the number of images between the representative image and the final image and the number of images between the revised representative image and the revised final image is the same. In some embodiments, the added images are in temporal proximity to the one end of the first sequence of images. For example, if the revised representative image is three images earlier in the first sequence of images, then three images (acquired immediately before the initial image) are added to the beginning of the first sequence (with the earliest of the three images becoming the revised initial image), and three images are deleted from the end of the first sequence.

In some embodiments, the display is (972) a touch-sensitive display. The device receives (974) a request to display the representative image from the first sequence of images. In response to receiving the request to display the representative image, the device displays (976) the representative image on the touch-sensitive display. While displaying the representative image, the device receives (978) a touch input on the touch-sensitive display on the representative image, the touch input including a characteristic that changes with time. For example, an intensity of the touch input changes with time, or a position of a contact in the touch input changes with time (e.g., due to lateral movement of the contact across the touch-sensitive display). In response to receiving the touch input on the touch-sensitive display on the representative image, the device displays (980) (e.g., sequentially) images in the first sequence of images at a rate that is determined based on the change in the characteristic of the touch input over time (for example, as described with reference to the press-and-hold gesture, FIGS. 6A-6FF, or a navigational drag gesture, FIGS. 7A-7CC).

It should be understood that the particular order in which the operations in FIGS. 9A-9G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 1000, 10000, 10050, 1100, 11000, 1200, 2400, 2500, 2600, and 2700) are also applicable in an analogous manner to method 900 described above with respect to FIGS. 9A-9G. For example, the contacts, gestures, user interface objects, intensity thresholds, animations, and sequences of images, described above with reference to method 900 optionally have one or more of the characteristics of the contacts, gestures, user interface objects, intensity thresholds, animations, and sequences of images described herein with reference to other methods described herein (e.g., methods 1000, 10000, 10050, 1100, 11000, 1200, 2400, 2500, 2600, and 2700). For brevity, these details are not repeated here. In addition, it should be noted that the details of other processes described in Appendix A are also applicable in an analogous manner to method 900 described above with respect to FIGS. 9A-9G. For example, the acquiring, grouping, and storing operations described above with respect to method 900 optionally have one or more of the characteristics of the capturing, trimming, storing, or retrieving operations for enhanced photos described in Appendix A.

FIGS. 10A-10E illustrate a flow diagram of a method 1000 of displaying (or replaying) a sequence of related images in accordance with some embodiments. The method 1000 is performed at an electronic device (e.g., device 300, FIG. 3, or portable multifunction device 100, FIG. 1A) with a display and a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

The device displays (1002) a representative image on the display (e.g., while the device is in an image presentation mode, see FIG. 6A). The representative image is one image in a sequence of images taken by a camera. The sequence of images includes one or more images acquired by the camera after acquiring the representative image. The sequence of images also includes one or more images acquired by the camera before acquiring the representative image. In some embodiments, the camera that took the sequence of images is part of the electronic device. In some embodiments, the sequence of images was taken by a camera that is not part of the electronic device (e.g., the sequence of images was transferred to the electronic device after being taken with a camera on another device). In some embodiments, the sequence of images was obtained in response to detecting activation of a shutter button at a first time, as described herein with respect to FIGS. 5A-5K and method 900 and/or FIGS. 22A-22D and method 2600. In some embodiments, the representative image corresponds to the representative image acquired by the camera, as described herein with respect to FIGS. 5A-5K and method 900 and/or FIGS. 22A-22D and method 2600.

While displaying the representative image on the display, the device detects (1004) a first portion of a first input (e.g., an input on the touch-sensitive surface, see first portion 616-1 of first input 616, FIGS. 6B-6D). In some embodiments, the first input is (1006) a press-and-hold gesture (e.g., a press-and-hold finger gesture on the representative image on a touch-sensitive display, or a press-and-hold finger gesture on a track pad while a cursor or other focus selector is over the representative image on a display). In some embodiments, the first input is a click-and-hold input with a mouse while a cursor or other focus selector is over the representative image on a display. In some embodiments, the device includes (1008) one or more sensors to detect intensity of contacts with the touch-sensitive surface, and the first input includes a finger contact that satisfies first contact-intensity criteria (e.g., a finger gesture on the representative image on a touch-sensitive display, or a finger gesture on a track pad while a cursor or other focus selector is over the representative image on a display, wherein a contact in the finger gesture exceeds a light press (or deep press) intensity threshold for at least part of the input). For example, as shown in FIGS. 6B-6D, first input 616 is a press-and-hold input that exceeds light press intensity threshold $IT_L$.

In response to detecting the first portion of the first input, the device replaces (1010) display of the representative image with display, in sequence, of the one or more images acquired by the camera after acquiring the representative image (e.g., as shown in FIGS. 6B-6D). Thus, in some embodiments, in response to detecting the first portion of the first input, the one or more images acquired by the camera after acquiring the representative image are sequentially displayed. In some embodiments, the one or more images acquired by the camera after acquiring the representative image are displayed (1012), in response to detecting the first portion of the first input, in sequence at a rate that is based on an intensity of a contact in the first portion of the input (e.g., the rate of display increases as an intensity of a contact in the first portion of the first input increases, and the rate of display decreases as an intensity of a contact in the first portion of the first input decreases). In some embodiments, the rate at which images from the representative image to the final image are sequentially displayed (in response to detecting the first portion of the first input) varies in accordance with the intensity of a contact in the first portion of the first input. In some embodiments, after this initial dependence of the display rate on contact intensity in the first input, subsequent displays of the sequence of images (in response to detecting later portions of the first input, as shown in FIGS. 6E-6M) occur at fixed display rates, independent of the contact intensity in later portions of the first input. In some embodiments, the one or more images acquired by the camera after acquiring the representative image are displayed, in response to detecting the first portion of the first input, in sequence at a fixed rate. In some embodiments, the position of the progress through the sequence of images is based on an intensity of the contact (e.g., particular intensities of the contact are mapped to a corresponding amount of progress through the sequence of images, as shown in FIGS. 6P-6V and FIG. 6W). In some embodiments this mapping between intensity and animation progress applies when the intensity of the contact intensities between $IT_L$ an $IT_D$ and when the intensity of the contact is above $IT_D$ the animation between the sequence of images progresses at a predefined rate (e.g. 1× real time) or at a rate that is determined based on the intensity of the contact (e.g., faster for a contact with higher intensity and slower for a contact with lower intensity). In some embodiments, replacing display of the representative image with display, in sequence, of the one or more images acquired by the camera after acquiring the representative image includes displaying an animation that dynamically displays images in the sequence of images based on changes in the intensity of the first contact over time.

In some embodiments, replacing display of the representative image with display, in sequence, of the one or more images acquired by the camera after acquiring the representative image includes updating (e.g., replacing) the displayed image multiple times a second (e.g., 10, 20, 30, or 60 times per second), optionally without regard to whether or not the first portion of the first input meets one or more predetermined intensity criteria. In some embodiments, the animation is a fluid animation that is updated as the intensity of the first portion of the first input changes, so as to provide feedback to the user as to the amount of intensity detected by the device (e.g., feedback as to the amount of force applied by the user). In some embodiments the animation is updated smoothly and quickly so as to create the appearance for the user that the user interface is responding in real-time to changes in force applied to the touch-sensitive surface (e.g., the animation is perceptually instantaneous for the user so as to provide immediate feedback to the user and enable the user to better modulate the force that they are applying to the touch-sensitive surface to interact efficiently with user interface objects that are responsive to contacts with different or changing intensity).

In some embodiments, an animation showing the sequence of images being replaced, in sequence, is displayed in a manner that dynamically responds to small changes in the intensity of the first contact (e.g., as shown in FIG. 6W).

In some embodiments, after detecting the first portion of the first input, the device detects (1014) a second portion of the first input (e.g., continuing to detect sufficient contact and/or intensity in a finger gesture). In some embodiments, the second portion is a continuation of the first input that has the same characteristics as the first portion of the first input (e.g., there is no time dependent change between the first portion and the second portion of the first input). In some embodiments, unless interrupted or discontinued by the user, the first portion of the first input lasts as long as it takes to perform operation 1010, and anything after that is the second portion, or a later portion, of the first input.

In some embodiments, in response to detecting the second portion of the first input, the device displays (1016), in sequence, the one or more images acquired by the camera before acquiring the representative image, the representative image, and the one or more images acquired by the camera after acquiring the representative image (e.g., as shown in FIGS. 6E-6I). Thus, in some embodiments, in response to detecting the second portion of the first input, the entire sequence of images is displayed, from the initial image to the final image in the sequence.

In some embodiments, instead of responding to detecting the first portion of the first input by replacing display of the representative image with display, in sequence, of the one or more images acquired by the camera after acquiring the representative image, the device responds to detecting the first portion of the first input by replacing display of the representative image with display, in sequence, of the initial image of the sequence followed by the remainder of the sequence.

In some embodiments, the sequence of images is displayed (1018), in response to detecting the second portion of the first input, in sequence at a fixed rate. In some embodiments, images in the sequence of images are sequentially displayed at a fixed rate, independent of the intensity of a contact in the first input (e.g., during the second portion of the first input). For example, the sequence of images is sequentially displayed at a 1× video playback rate (e.g., a rate at which the images were obtained) during the second portion of the first input. In some embodiments, the rate at which images in the sequence of images are sequentially displayed during the second portion of the first input depends on the intensity of a contact in the first input. For example, the rate increases as the intensity of the contact increases. In some embodiments, the sequence of images is displayed, in response to detecting the second portion of the first input, in sequence at a rate that is based on an intensity of a contact in the first portion of the input.

In some embodiments, the device cross fades (1020) from displaying, in sequence, the one or more images acquired by the camera after acquiring the representative image to displaying, in sequence, the one or more images acquired by the camera before acquiring the representative image. In some embodiments, a cross fade animation is displayed from the end of the sequence of images (e.g., as shown in FIG. 6D) to the beginning to the sequence of images (e.g., as shown in FIG. 6E) when the sequence of images is looped or displayed again.

In some embodiments, in response to detecting the second portion of the first input, the device presents (1022) audio that corresponds to the sequence of images. In some embodiments, in response to detecting the second portion of the first input, the entire sequence of images is displayed with corresponding audio that was recorded when the sequence of images was acquired. In some embodiments, audio is not presented in response to detecting the first portion of the first input. In some embodiments, the audio is presented during the first complete playback of the sequence of images (e.g., in response to detecting the second portion of the first input). In some embodiments, if the first input is maintained after the first complete playback of the sequence of images (e.g., in response to detecting the second portion of the first input), the audio is not presented again during subsequent playbacks of the sequence in response to continued detection of the first input. In some embodiments, for a given input, the audio is only presented during the first complete playback of the sequence of images. In some embodiments, for a given input, the audio is only presented during the second complete playback of the sequence of images.

In some embodiments, after detecting the second portion of the first input, the device detects (1024) a third portion of the first input (e.g., continuing to detect sufficient contact and/or intensity in a finger gesture, as shown in FIGS. 6J-6M). In some embodiments, the third portion of the first input is a continuation of the second portion of the first input without a change in a characteristic of the first input. In response to detecting the third portion of the first input, the device displays (1026), in sequence, the one or more images acquired by the camera before acquiring the representative image, the representative image, and the one or more images acquired by the camera after acquiring the representative image (e.g., the device loops back and displays the sequence again). In some embodiments, if pressure and/or contact in the first input are maintained, the sequence of images is displayed again. In some embodiments, the looping and playback continues as long as the first input is maintained.

In some embodiments, in response to detecting the third portion of the first input, the device displays (1028) metadata that corresponds to the sequence of images. In some embodiments, if pressure and/or contact in the first input is maintained, the sequence of images is displayed again with concurrent display of metadata for the sequence of images, such as time, date, location (e.g., via GPS), weather, music that was playing when the sequence of images was acquired (e.g., music identified with music identification software in the device, such as Shazam, SoundHound, or Midomi), local event information (such as a sports game that was being played when and where the first sequence of images was acquired), and/or post-event information (such as a final score). For example, FIGS. 6J-6M illustrate concurrent display of location and time information corresponding to the images in the sequence of images.

In some embodiments, the device detects (1030) termination of the first input (e.g., detecting liftoff of a contact in the first input or detecting the intensity of a contact in the first input drop below a predetermined threshold intensity value, such as $IT_L$, as shown in FIG. 6N). In response to detecting termination of the first input, the device displays (1032) the representative image (e.g., the device displays an animation that ends with display of just the representative image in the sequence of images).

In some embodiments, the device detects (1034) termination of the first input (e.g., detecting liftoff of a contact in the first input or detecting the intensity of a contact in the first input drop below a predetermined threshold intensity value, such as $IT_L$, as shown in FIG. 6N) while displaying a first image in the sequence of images (e.g., image 602-4, FIG. 6N). In response (1036) to detecting termination of the first input while displaying the first image in the sequence of images: in accordance with a determination that the first image occurs before the representative image in the sequence of images (e.g., the first image was taken before the representative image), the device sequentially displays, in chronological order, images from the first image to the representative image (e.g., the device displays the sequence of images forward until it gets to the representative image). In accordance with a determination that the first image occurs after the representative image in the sequence of images (e.g., the first image was taken after the representative image), the device sequentially displays, in reverse-chronological order, images from the first image to the representative image (e.g., the device displays the sequence of images backwards until it gets to the representative image). In some embodiments, sequentially displaying, in chronological order, images from the first image to the representative image includes gradually slowing down the rate at which the images are displayed, so that the playback of the sequence of images slowly eases to a stop at the representative image. In some embodiments, sequentially displaying, in reverse-chronological order, images from the first image to the representative image includes gradually slowing down the rate at which the images are displayed, so that the reverse playback of the sequence of images slowly eases to a stop at the representative image.

In some embodiments, the sequence of images is (1038) configured to be sequentially displayed in a loop in either a forward direction or a reverse direction. The device detects (1040) termination of the first input (e.g., the device detects liftoff of a contact in the first input or detecting the intensity of a contact in the first input drop below a predetermined threshold intensity value) while displaying a first image in the sequence of images. In response (1042) to detecting termination of the first input while displaying the first image in the sequence of images: in accordance with a determination that there are fewer images between the first image and the representative image when the loop is traversed in the forward direction, the device sequentially displays images from the first image to the representative image in the forward direction, and in accordance with a determination that there are fewer images between the first image and the representative image when the loop is traversed in the reverse direction, the device sequentially displays images from the first image to the representative image in the reverse direction.

In some embodiments, the one or more images acquired by the camera after acquiring the representative image are sequentially displayed (1044) in accordance with respective intensity levels applied by the first input. For example, as shown in FIGS. 6P-6V and 6W, respective images are mapped to respective intensities, and the user can scrub forward and backward through the one or more images that were obtained after the representative image by changing the intensity applied by the first input (e.g., providing a touch input with intensity that corresponds to intensity range 618-4 initiates displaying a user interface illustrated in FIG. 6R and subsequently increasing the intensity of the touch input so that the intensity corresponds to intensity range 618-5 initiates replacing display of the user interface illustrated in FIG. 6R with the user interface illustrated in FIG. 6S).

In some embodiments, the first portion of the first input includes (1046) a change in intensity of a contact detected on the touch-sensitive surface (e.g., as shown in FIGS. 6P-6V). While the representative image is displayed and the contact has a first intensity, the device detects an increase in intensity of the contact by a respective amount to a second intensity. In response to detecting the increase in intensity of the contact by the respective amount, the device replaces display of the representative image with display of a first subsequent image that is a respective number of images after the representative image in the sequence of images. For example, in FIGS. 6Q-6R, the intensity of contact 636 increases from intensity with intensity range 618-3 to intensity within intensity range 618-4, and display of image 602-3 is replaced with display of image 602-4. While displaying the first subsequent image and the contact has the second intensity, the device detects an increase in intensity of the contact by the respective amount to a third intensity. In response to detecting the increase in intensity of the contact by the respective amount from the second intensity to the third intensity, the device replaces display of the first subsequent image with display of a second subsequent image that is the respective number of images after the first subsequent image in the sequence of images. For example, in FIGS. 6R-6S, the intensity of contact 636 increases from intensity within intensity range 618-4 to intensity within range 618-5, and display of image 602-4 is replaced with display of image 602-5.

In some embodiments, the respective number of images is based (1048) on the magnitude of the change in intensity of the contact. For example, in FIGS. 6Q-6S, when the intensity of contact 636 increases from intensity within intensity range 618-3 to intensity within intensity range 618-4, the respective number of images is one, and when the intensity of contact 636 increases from intensity within intensity range 618-3 to intensity within intensity range 618-5, the respective number of images is two.

In some embodiments, when the change in intensity of the contact has a first magnitude, the first sequential image is (1050) immediately after the respective image in the sequence of images and the second sequential image is immediately after the first sequential image in the sequence of images. In some embodiments, when the respective change in intensity of the contact has a second magnitude that is greater than the first magnitude, the first sequential image spaced apart from the respective image by a respective number of images in the sequence of images and the second sequential image is spaced apart from the first sequential image by the respective number of images in the sequence of images, wherein the respective number of images is one or more images. For example, in FIGS. 6Q-6S, when the intensity of contact 636 increases from intensity within intensity range 618-3 to intensity within intensity range 618-4, display of image 602-3 is replaced with display of image 602-4, and when the intensity of contact 636 increases from intensity within intensity range 618-3 to intensity within intensity range 618-5, display of image 602-3 is replaced with display of image 602-5.

In some embodiments, the first portion of the first input includes (1052) a change in intensity of a contact detected on the touch-sensitive surface (e.g., as shown in FIGS. 6P-6V). While the representative image is displayed and the contact has a first intensity, the device detects an increase in intensity of the contact by a respective amount to a second intensity. In response to detecting the increase in intensity of the contact by the (same) respective amount, the device replaces display of the representative image with display of a first subsequent image that is a respective number of images after the representative image in the sequence of images. For example, in FIGS. 6Q-6R, the intensity of contact 636 increases from intensity with intensity range 618-3 to intensity within intensity range 618-4, and display of image 602-3 is replaced with display of image 602-4. While displaying the first subsequent image and the contact has the second intensity, the device detects a change in intensity of the contact by the (same) respective amount. In response to detecting the change in intensity of the contact by the (same) respective amount: in accordance with a determination that the change in intensity of the contact by the (same) respective amount includes an increase in intensity of the contact from the second intensity to a third intensity, the device replaces display of the first subsequent image with display of a second subsequent image that is the respective number of images after the first subsequent image in the sequence of images; and in accordance with a determination that the change in intensity of the contact by the (same) respective amount includes a decrease in intensity of the contact from the second intensity to the first intensity, the device replaces display of the first subsequent image with display of the representative image. For example, when the intensity of contact 636 increases from intensity within intensity range 618-4 to intensity within range 618-5 as shown in FIGS. 6R-6S, display of image 602-4 is replaced with display of image 602-5, and when the intensity of contact 636 decreases from intensity within intensity range 618-4 to intensity within intensity range 618-3 as shown in FIGS. 6T-6U, display of image 602-4 is replaced with display of image 602-3.

It should be understood that the particular order in which the operations in FIGS. 10A-10E have been described is merely exemplary and is not intended to indicate that the described order is the only order in which the operations could be performed. One of ordinary skill in the art would recognize various ways to reorder the operations described herein. In some implementations, one or more operations described herein may be omitted. For example, in some embodiments, operations 1014 and 1016 are omitted. Additionally, it should be noted that details of other processes described herein with respect to other methods described herein (e.g., methods 900, 10000, 10050, 1100, 11000, 1200, 2400, 2500, 2600, and 2700) are also applicable in an analogous manner to method 1000 described above with respect to FIGS. 10A-10E. For example, the contacts, gestures, user interface objects, intensity thresholds, animations, and sequences of images, described above with reference to method 1000 optionally have one or more of the characteristics of the contacts, gestures, user interface objects, intensity thresholds, animations, and sequences of images described herein with reference to other methods described herein (e.g., methods 900, 10000, 10050, 1100, 11000, 1200, 2400, 2500, 2600, and 2700). For brevity, these details are not repeated here.

FIGS. 10E-10I illustrate a flow diagram of a method 10000 of displaying (or replaying) a sequence of related images in accordance with some embodiments. The method 10000 is performed at an electronic device (e.g., device 300, FIG. 3, or portable multifunction device 100, FIG. 1A) with a display and a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 10000 are, optionally, combined and/or the order of some operations is, optionally, changed.

The device displays (10002) a representative image on the display. The representative image is one image in a sequence of images taken by a camera. The sequence of images includes one or more images acquired by the camera after acquiring the representative image. The sequence of images includes one or more images acquired by the camera before acquiring the representative image. In some embodiments, the sequence of images is analogous to the sequence of images described with reference to operation 1002 of method 1000.

While displaying the representative image on the display, the device detects (10004) a first portion of a first input. In some embodiments, the first input is (10006) a press-and-hold gesture. In some embodiments, the first input is analogous to the first input described with reference to operations 1004-1008 of method 1000.

In response to detecting the first portion of the first input: the device transitions (10008) from displaying the representative image to displaying a respective prior image in the sequence of images, wherein the respective prior image was acquired by the camera before acquiring the representative image; and, after transitioning from displaying the representative image to displaying the respective prior image, the device displays, in sequence starting with the respective prior image, at least some of the one or more images acquired by the camera before acquiring the representative image and at least some of the one or more images acquired by the camera after acquiring the representative image. In some embodiments, after transitioning from displaying the representative image to displaying the respective prior image, the device displays, in sequence starting with the respective prior image, at least some of the one or more images acquired by the camera before acquiring the representative image, the representative image, and at least some of the one or more images acquired by the camera after acquiring the representative image.

In some embodiments, transitioning from displaying the representative image to displaying the respective prior image includes displaying (10010), in sequence, at least some of the one or more images acquired by the camera after acquiring the representative image and then replacing display of a respective subsequent image acquired after acquiring the representative image with the respective prior image (e.g., the device cross fades and/or blurs to switch from displaying the respective subsequent image to displaying the respective prior image, as described with reference to diagram 650, FIG. 6X).

In some embodiments, transitioning from displaying the representative image to displaying the respective prior image includes replacing (10012) display of the representative image with the respective prior image (e.g., the device cross fades and/or blurs to switch from displaying the representative image to displaying the respective prior image, without displaying one or more images acquired by the camera after acquiring the representative image prior to the switch, as described with reference to diagram 656, FIG. 6X).

In some embodiments, transitioning from displaying the representative image to displaying the respective prior image includes: in accordance with a determination that the first portion of the first input meets first playback criteria (e.g., detecting a slow increase in intensity of a contact to a playback intensity threshold or detecting an increase in intensity of the contact to a slow playback intensity threshold that is lower than a fast playback intensity threshold), displaying (10014), in sequence, at least some of the one or more images acquired by the camera after acquiring the representative image and then replacing display of a respective subsequent image acquired after acquiring the representative image with the respective prior image (e.g., cross fading and/or blurring to switch from displaying the respective subsequent image to displaying the respective prior image); and, in accordance with a determination that the first portion of the first input meets second playback criteria (e.g., detecting a fast increase in intensity of the contact to the playback intensity threshold or detecting an increase in intensity of the contact to the fast playback intensity threshold), different from the first playback criteria, replacing display of the representative image with the respective prior image (e.g., cross fading and/or blurring to switch from displaying the representative image to displaying the respective prior image, without displaying one or more images acquired by the camera after acquiring the representative image prior to the switch).

In some embodiments, the device includes (10016) one or more sensor units to detect intensity of contacts with the touch-sensitive surface. The first input includes a contact on the touch-sensitive surface. The first playback criteria include a criterion that is met when the contact has a characteristic intensity above a first intensity threshold (e.g., light press threshold $IT_L$, FIG. 6X). The second playback criteria include a criterion that is met when the contact has a characteristic intensity above a second intensity threshold that is greater than the first intensity threshold (e.g., deep press threshold $IT_D$, FIG. 6X).

In some embodiments, the one or more images acquired by the camera before acquiring the representative image and the one or more images acquired by the camera after acquiring the representative image are displayed (10018), in sequence starting with the respective prior image, at a fixed rate (e.g., in an analogous manner to the display of images at a fixed rate described with reference to operation 1018, method 1000).

In some embodiments, the device presents (10020) audio that corresponds to the sequence of images (e.g., analogous to presentation of audio described with reference to operation 1022, method 1000).

In some embodiments, after detecting the first portion of the first input, the device detects (10022) a second portion of the first input. In response to detecting the second portion of the first input, the device displays, in sequence, at least some of the one or more images acquired by the camera before acquiring the representative image and at least some of the one or more images acquired by the camera after acquiring the representative image (e.g., in an analogous manner to operations 1024-1028, method 1000). In some embodiments, in response to detecting the second portion of the first input, the device displays (10024) metadata that corresponds to the sequence of images.

In some embodiments, the device detects (10026) termination (e.g. liftoff) of the first input. In response to detecting termination of the first input, the device displays the representative image. (e.g., in an analogous manner to operations 1030-1032, method 1000).

In some embodiments, the device detects (10028) termination (e.g. liftoff) of the first input while displaying a first image in the sequence of images. In response to detecting termination of the first input while displaying the first image in the sequence of images: in accordance with a determination that the first image occurs before the representative image in the sequence of images, the device sequentially displays, in chronological order, images from the first image to the representative image, and in accordance with a determination that the first image occurs after the representative image in the sequence of images, the device sequentially displays, in reverse-chronological order, images from the first image to the representative image (e.g., in an analogous manner to operations 1034-1036, method 1000).

In some embodiments, the sequence of images is (10030) configured to be sequentially displayed in a loop in either a forward direction or a reverse direction. The device detects termination (e.g., liftoff) of the first input while displaying a first image in the sequence of images. In response to detecting termination of the first input while displaying the first image in the sequence of images: in accordance with a determination that there are fewer images between the first image and the representative image when the loop is traversed in the forward direction, the device sequentially displays images from the first image to the representative image in the forward direction, and in accordance with a determination that there are fewer images between the first image and the representative image when the loop is traversed in the reverse direction, the device sequentially displays images from the first image to the representative image in the reverse direction (e.g., in an analogous manner to operations 1038-1042, method 1000).

It should be understood that the particular order in which the operations in FIGS. 10E-10I have been described is merely exemplary and is not intended to indicate that the described order is the only order in which the operations could be performed. One of ordinary skill in the art would recognize various ways to reorder the operations described herein. In some implementations, one or more operations described herein may be omitted. For example, in some embodiments, operations 10014 and 10016 are omitted. Additionally, it should be noted that details of other processes described herein with respect to other methods described herein (e.g., methods 900, 1000, 10050, 1100, 11000, 1200, 2400, 2500, 2600, and 2700) are also applicable in an analogous manner to method 10000 described above with respect to FIGS. 10E-10I. For example, the contacts, gestures, user interface objects, intensity thresholds, animations, and sequences of images, described above with reference to method 10000 optionally have one or more of the characteristics of the contacts, gestures, user interface objects, intensity thresholds, animations, and sequences of images described herein with reference to other methods described herein (e.g., methods 900, 1000, 10050, 1100, 11000, 1200, 2400, 2500, 2600, and 2700). For brevity, these details are not repeated here.

FIGS. 10J-10M illustrate a flow diagram of a method 10050 of displaying (or replaying) a sequence of related images in accordance with some embodiments. The method 10050 is performed at an electronic device (e.g., device 300, FIG. 3, or portable multifunction device 100, FIG. 1A) with a display and a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 10050 are, optionally, combined and/or the order of some operations is, optionally, changed.

At an electronic device with a display, a touch-sensitive surface, and one or more sensors to detect intensity of contacts with the touch-sensitive surface: the device displays (10052) a representative image on the display (e.g., representative image 602-1, FIG. 6Y).

The representative image is one image in a sequence of images taken by a camera. The sequence of images includes one or more images acquired by the camera after acquiring the representative image. In some embodiments, the representative image is an initial image in the sequence of images. In some embodiments, the sequence of images includes (10054) one or more images acquired by the camera before acquiring the representative image (e.g., sequence of images is analogous to the sequence of images described with reference to operation 1002 of method 1000).

While displaying the representative image on the display, the device detects (10056) a first input that includes detecting an increase in a characteristic intensity of a contact on the touch-sensitive surface to a first intensity that is greater than a first intensity threshold (e.g., light press threshold $IT_L$, FIGS. 6Y-6AA).

In some embodiments, the first input is (10058) a press-and-hold gesture. In some embodiments, the first input is analogous to the first input described with reference to operations 1004-1008 of method 1000.

In response to detecting the increase in the characteristic intensity of the contact, the device advances (10060), in a first direction (e.g., in chronological order), through the one or more images acquired by the camera after acquiring the representative image at a rate that is determined based at least in part on the first intensity (e.g., as described with reference to FIGS. 6Y-6AA).

After advancing through the one or more images acquired by the camera after acquiring the representative image at the rate that is determined based on the first intensity, the device detects (10062) a decrease in intensity of the contact to a second intensity that is less than the first intensity.

In response to detecting the decrease in the characteristic intensity of the contact to the second intensity: in accordance with a determination that the second intensity is above the first intensity threshold, the device continues (10064) to advance, in the first direction, through the one or more images acquired by the camera after acquiring the representative image at a second rate, wherein: the second rate is determined based at least in part on the second intensity and the second rate is slower than the first rate; and, in accordance with a determination that the second intensity is below the first intensity threshold, the device moves, in a second direction that is opposite to the first direction (e.g., reverse-chronological order), through the one or more images acquired by the camera after acquiring the representative image at a rate that is determined based at least in part on the second intensity (e.g., device 100 moves backwards in the sequence of images 602 from FIG. 6AA to FIG. 6BB because input 644 has a contact intensity below light press threshold $IT_L$).

In some embodiments, images are (10066) displayed, in sequence, at a rate that increases as the characteristic intensity of the contact increases (e.g., the first rate and/or the second rate is proportional to the characteristic intensity of the contact). In some embodiments, in accordance with a determination that the characteristic intensity of the contact is above a first intensity threshold, display of the representative image is replaced with display, in sequence, of at least some of the one or more images acquired by the camera after acquiring the representative image at a rate that increases as the characteristic intensity of the contact increases.

In some embodiments, in accordance with a determination that the characteristic intensity of the contact is below the first intensity threshold, images in the sequence are displayed in reverse-chronological order at a backward rate that increases as the characteristic intensity of the contact decreases (e.g., as shown in rate diagrams 646, FIGS. 6Y-6AA, and the graphs shown in FIGS. 6CC-6DD).

In some embodiments, the rate forward or backward is determined in real-time or near-real time, so that the user can speed up or slow down progress through the images (either in the forward or reverse direction) by changing the characteristic intensity of the contact.

In some embodiments, the images are (10068) displayed, in sequence, at a rate proportional to a difference between the characteristic intensity of the contact and the first intensity threshold (e.g., the first rate and/or the second rate is proportional to the difference between the characteristic intensity of the contact and the first intensity threshold). In some embodiments, in accordance with a determination that the characteristic intensity of the contact is above a first intensity threshold, display of the representative image is replaced with display, in sequence, of at least some of the one or more images acquired by the camera after acquiring the representative image at a rate proportional to a difference between the characteristic intensity of the contact and the first intensity threshold.

In some embodiments, in accordance with a determination that the characteristic intensity of the contact is below the first intensity threshold, images in the sequence are displayed in reverse-chronological order at a backward rate proportional to the difference between the characteristic intensity of the contact and the first intensity threshold.

In some embodiments, the rate forward or backward is determined in real-time or near-real time, so that the user can speed up or slow down progress through the images (either in the forward or reverse direction) by changing the characteristic intensity of the contact.

In some embodiments, the device decreases (10070) a rate at which images in the sequence of images are displayed as a terminus of the sequence of images is approached e.g., independent of the characteristic intensity of the contact).

For example, in some embodiments, the first rate is (10072) determined based in part on a proximity of a currently displayed image to an end of the sequence of images (e.g., as playback nears the end of the sequence, the rate of advancement slows down, so that the playback of the sequence of images slows to a stop at the end of the sequence of images). Thus, the device "brakes" slightly as it reaches the end of the sequence of images.

As another example, in some embodiments, the second rate is (10074) determined based in part on a proximity of a currently displayed image to a beginning of the sequence of images (e.g., as reverse playback nears the beginning of the sequence, the rate of backwards movement slows down, so that the reverse playback of the sequence of images slows to a stop at the beginning of the sequence of images). Thus, the device "brakes" slightly as it reaches the beginning of the sequence of images moving in reverse-chronological order.

In some embodiments, the rate of advancement through the sequence of images is (10076) constrained by a maximum rate while the contact is detected on the touch-sensitive surface (e.g., a maximum rate of 2x, where x is the standard playback speed for the content, e.g., the speed at which playing back for 1 second corresponds to 1 second of time elapsing during the acquisition of the images in the sequence).

In some embodiments, intensity values of the characteristic intensity of the contact proximate to the first intensity threshold are (10078) associated with rate values that are at least a predetermined amount away from a rate of zero images per second (e.g., 0.2× for values above the first intensity threshold and −0.2× for values below the first intensity threshold). Ensuring that the playback rate of the sequence of images does not get close to zero prevents the images from being played back so slowly that inconsistencies between the images become readily apparent, which avoids breaking the illusion of smooth playback through the sequence of images.

In some embodiments, the rate of movement through the sequence of images is (10080) constrained by a maximum reverse rate while the contact is detected on the touch-sensitive surface (e.g., a maximum reverse rate of −2×).

In some embodiments, the representative image is (10082) displayed as a background image on a lock screen of a device, and one or more foreground elements (e.g., a date, a time, one or more notifications, network status information, battery status information, device unlock instructions, and/or other status information) are not changed while the device advances through the one or more images captured after the respective image.

In some embodiments, the device displays (10084) metadata that corresponds to the sequence of images. For example, the device displays metadata such as time, date, location (e.g., via GPS), weather, music that was playing when the sequence of images was acquired (e.g., music identified with music identification software in the device, such as Shazam, SoundHound, or Midomi), local event information (such as a sports game that was being played when and where the first sequence of images was acquired), and/or post-event information (such as a final score).

In some embodiments, the device detects (10086) liftoff of the contact from the touch-sensitive surface. In response to detecting liftoff of the contact, the device moves through the images in the second direction at a rate that is greater than the maximum reverse rate (e.g., a rate of −4×).

In some embodiments, the device detects (10088) termination (e.g., liftoff) of the first input. In response to detecting termination of the first input, the device displays the representative image (e.g., in an analogous manner to operations 1030-1032, method 1000).

In some embodiments, the device detects (10090) termination (e.g., liftoff) of the first input while displaying a first image in the sequence of images. In response to detecting termination of the first input while displaying the first image in the sequence of images: in accordance with a determination that the first image occurs before the representative image in the sequence of images, the device sequentially displays, in chronological order, images from the first image to the representative image, and in accordance with a determination that the first image occurs after the representative image in the sequence of images, the device sequentially displays, in reverse-chronological order, images from the first image to the representative image (e.g., in an analogous manner to operations 1034-1036, method 1000).

It should be understood that the particular order in which the operations in FIGS. 10J-10M have been described is merely exemplary and is not intended to indicate that the described order is the only order in which the operations could be performed. One of ordinary skill in the art would recognize various ways to reorder the operations described herein. In some implementations, one or more operations described herein may be omitted. For example, in some embodiments, operations 10064 and 10066 are omitted. Additionally, it should be noted that details of other processes described herein with respect to other methods described herein (e.g., methods 900, 1000, 10000, 1100, 11000, 1200, 2400, 2500, 2600, and 2700) are also applicable in an analogous manner to method 10050 described above with respect to FIGS. 10J-10M. For example, the contacts, gestures, user interface objects, intensity thresholds, animations, and sequences of images, described above with reference to method 10050 optionally have one or more of the characteristics of the contacts, gestures, user interface objects, intensity thresholds, animations, and sequences of images described herein with reference to other methods described herein (e.g., methods 900, 1000, 10000, 1100, 11000, 1200, 2400, 2500, 2600, and 2700). For brevity, these details are not repeated here.

FIGS. 11A-11E illustrate a flow diagram of a method 1100 of navigating through sequences of related images in accordance with some embodiments. The method 1100 is performed at an electronic device (e.g., device 300, FIG. 3, or portable multifunction device 100, FIG. 1A) with a display and a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1100 are, optionally, combined and/or the order of some operations is, optionally, changed.

The device stores (1102) a plurality of sequences of images (e.g., in non-volatile memory and/or program memory). A respective sequence of images includes: a respective representative image taken by a camera, one or more images acquired by the camera after acquiring the respective representative image, and one or more images acquired by the camera before acquiring the respective representative image. In some embodiments, the camera that took the respective sequence of images is part of the electronic device. In some embodiments, the respective sequence of images was taken by a camera that is not part of the electronic device (e.g., the respective sequence of images was transferred to the electronic device after being taken with a camera on another device). In some embodiments, the respective sequence of images was obtained in response to detecting activation of a shutter button at a first time, as described herein with respect to FIGS. 5A-5K and method 900 and/or FIGS. 22A-22D and method 2600. In some embodiments, the respective representative image corresponds to the representative image acquired by the camera, as described herein with respect to FIGS. 5A-5K and method 900 and/or FIGS. 22A-22D and method 2600. In some embodiments, the respective representative image has a higher resolution than other images in the respective sequence of images. In some embodiments, the respective representative image has the same resolution as other images in the respective sequence of images.

The device displays (1104) a first representative image for a first sequence of images in a movable first area on the display (e.g., while the device is in an image presentation mode, as shown in FIG. 7A). In some embodiments, the movable first area is an area that displays images in the first sequence of images, without displaying images from sequences of images other than the first sequence of images.

In some embodiments, the first sequence of images is (1106) a message in a message conversation displayed in a scrollable region of a messaging application, and the first sequence of images is displayed as the scrollable region of the messaging application is scrolled (e.g., as the message moves across the display).

The device detects (1108) a drag gesture on the touch-sensitive surface (e.g., drag gesture 736, FIGS. 7B-7D). In some embodiments, the drag gesture begins in the movable first area on the display. In some embodiments, the drag gesture ends in the movable first area on the display. In some embodiments, the drag gesture begins and ends in the movable first area on the display (e.g., because the drag gesture drags the movable first area with it).

In accordance with a determination (1112) that the drag gesture is in a first direction on the touch-sensitive surface (e.g., leftward or upward): in the moveable first area, the device replaces (1114) display of the first representative image for the first sequence of images with display, in chronological order, of at least some of one or more images for the first sequence of images acquired by the camera after acquiring the first representative image for the first sequence of images. The device also moves (1116) the first area in the first direction (e.g., drags the first area with the drag gesture). For example, in response to detecting a leftward drag gesture, as shown FIGS. 7B-7D, the device drags first area 734 to the left.

In some embodiments, the movement of the first area in the first direction on the display corresponds to the movement of a contact in the drag gesture in the first direction on the touch-sensitive surface (e.g., movement of the contact appears to directly manipulate the movement of the first area). More generally, in some embodiments, the movement of a respective area that displays images in a respective sequence of images corresponds to the movement of a contact in a drag gesture on the touch-sensitive surface.

In some embodiments, the display, in chronological order in the first area, of at least some of the one or more images for the first sequence of images acquired by the camera after acquiring the first representative image occurs in accordance with the movement of a contact in the drag gesture. Thus, if the movement of the contact in the first direction speeds up, the display of the chronological progression of images in the first area speeds up. If the movement of the contact in the first direction slows down, the display of the chronological progression of images in the first area slows down. If the movement of the contact in the first direction is paused, the display of the chronological progression of images in the first area is paused. And, if the movement of the contact reverses direction (e.g., from a leftward drag gesture to a rightward drag gesture), the display of the progression of images in the first sequence of images in the first area is reversed and the images are shown in reverse chronological order in accordance with the movement of the contact in the reverse direction. More generally, in some embodiments, for a respective sequence of images, the display of a progression of images in the respective sequence of images, in a respective area, occurs in accordance with the movement of a contact in the drag gesture.

In some embodiments, moving the first area in the first direction includes (1118) moving at least part of the first area off of the display in the first direction (e.g., leftward or upward). In some embodiments, as a result of moving the first area in the first direction, only a portion of the first area is displayed on the display. For example, as shown in FIGS. 7B-7D, part of first area 734 is dragged off the screen.

In some embodiments, in accordance with the determination that the drag gesture is in the first direction on the touch-sensitive surface (e.g., leftward or upward): the device moves (1120) a movable second area in the first direction. In some embodiments, the movable second area is an area that displays images in the second sequence of images, without displaying images from sequences of images other than the second sequence of images (e.g., movable second area 738, FIGS. 7B-7D). In some embodiments, the movable second area is adjacent to the movable first area (e.g., to the right of the movable first area). In some embodiments, movable second area is an area for a next sequence of images. While moving the second area in the first direction, the device also displays (1122), in chronological order in the second area, at least some of one or more images for a second sequence of images (e.g., the next sequence of images) acquired by the camera before acquiring a second representative image for the second sequence of images.

In some embodiments, the display, in chronological order in the second area, of at least some of the one or more images for the second sequence of images acquired by the camera before acquiring the second representative image occurs in accordance with the movement of a contact in the drag gesture (e.g., in analogous manner to that described above with reference to the first sequence of images). For example, during the drag gesture, the images in the first area and the images in the second area are both advancing at the same rate, with the rate based on the movement of the contact.

In some embodiments, while moving the second area in the first direction, the second area just displays the second representative image for the second sequence of images, without displaying other images in the second sequence of images.

In some embodiments, instead of moving the second area in the first direction, the second area is underneath the first area in a z-layer (front-to-back) order, and the second area is revealed as the first area moves off the display in the first direction.

In some embodiments, like detecting a drag gesture in the first direction, detecting activation of a next icon or button (e.g., next icon 750-1, FIG. 7A) also results in the animated display of images from the first sequence in the first area and the animated display of images from the second sequence in the second area. In some embodiments, detecting activation of a next icon or button results in display of the second representative image replacing display of the first representative image, without the animated display of images from the first sequence in the first area and without the animated display of images from the second sequence in the second area. In some embodiments, detecting activation of a next icon or button results in display of the second representative image replacing display of the first representative image, without displaying other images in the first sequence or the second sequence. In some embodiments, the response to different types of input (e.g., a leftward drag gesture versus activation of a next icon or button) is user configurable, for example via a settings interface.

In some embodiments, moving the second area in the first direction includes (1124) moving at least part of the second area onto the display in the first direction (e.g., leftward or upward). In some embodiments, as a result of moving the second area in the first direction, only a portion of the second area is displayed on the display, with more of the second area revealed as the second area is dragged in the first direction. For example, as shown in FIGS. 7B-7D, part of second area 738 is dragged onto the screen.

In some embodiments, in accordance with the determination that the drag gesture is in the first direction on the touch-sensitive surface (e.g., leftward or upward): after moving the second area in the first direction, the device displays (1126) the second representative image for the second sequence of images in the second area. For example, FIG. 7F illustrates that, as the upshot of drag gesture 736 (FIGS. 7B-7D), second representative image 724-3 is displayed (albeit with optional intermediate operations being performed, as described below).

In some embodiments, while displaying the second representative image for the second sequence of images in the second area, the device detects (1128) a change in intensity of an input corresponding to the second representative image. In response to detecting the change in intensity of the input, the device advances (1130) through the second sequence of images in the second area without moving the second area on the display (e.g., starting with images chronologically after the second representative image and looping back to images chronologically before the second representative image). For example, in some embodiments, the user can pause the drag gesture, thereby converting the drag gesture to a press-and-hold gesture that triggers playback the second sequence of images as described in greater detail with reference to methods 1000/10000/10050, FIGS. 10A-10M).

In some embodiments, the device detects (1132) termination (e.g., lift off) of the drag gesture while moving the first area and the second area. In response to detecting termination (1134) of the drag gesture while moving the first area and the second area: in accordance with a determination that the drag gesture meets next-sequence-navigation criteria (e.g., more than half of the first area has been moved off the display (as shown FIG. 7E) or more than another predefined portion of the first area has been moved off the display (such as 0.2, 0.3 or 0.4) or the drag gesture is a flick gesture with a liftoff velocity above a predefined threshold velocity): the device moves (1136) the first area completely off the display in the first direction; moves the second area completely onto the display; and displays the second representative image for the second sequence of images in the second area. In some embodiments, the display, in chronological order in the first area, of at least some of the one or more images for the first sequence of images acquired by the camera after acquiring the first representative image continues as the first area moves off the display (e.g., even after the input is terminated). In some embodiments, the display, in chronological order in the second area, of at least some of the one or more images for the second sequence of images acquired by the camera before acquiring a second representative image continues as the second area moves onto the display until the second representative image is displayed.

In some embodiments, in response to detecting termination of the drag gesture while moving the first area and the second area: in accordance with a determination that the drag gesture does not meet the next-sequence-navigation criteria: the devices moves (1138) the second area completely off the display in a second direction, opposite the first direction; moves the first area completely onto the display; and displays the first representative image for the first sequence of images in the first area. In some embodiments, the display, in chronological order in the first area, of at least some of the one or more images for the first sequence of images acquired by the camera after acquiring the first representative image is reversed as the first area moves completely onto the display until the first representative image is displayed. In some embodiments, the display, in chronological order in the second area, of at least some of the one or more images for the second sequence of images acquired by the camera before acquiring the second representative image is reversed as the second area moves completely off the display.

In some embodiments in accordance with a determination (1140) that the drag gesture is in a second direction on the touch-sensitive surface (e.g., rightward or downward): in the moveable first area, the device replaces (1142) display of the first representative image for the first sequence of images with display, in reverse chronological order, of at least some of one or more images for the first sequence of images acquired by the camera before acquiring the first representative image for the first sequence of images. The device also moves (1144) the first area in the second direction (e.g., rightward or downward).

In some embodiments, the movement of the first area in the second direction on the display corresponds to the movement of a contact in the drag gesture in the second direction on the touch-sensitive surface (e.g., movement of the contact appears to directly manipulate the movement of the first area). More generally, in some embodiments, the movement of a respective area that displays images in a respective sequence of images corresponds to the movement of a contact in a drag gesture on the touch-sensitive surface.

In some embodiments, the display, in reverse chronological order in the first area, of at least some of the one or more images for the first sequence of images acquired by the camera before acquiring the first representative image occurs in accordance with the movement of a contact in the drag gesture. Thus, if the movement of the contact in the second direction speeds up, the display of the reverse chronological progression of images in the first area speeds up. If the movement of the contact in the second direction slows down, the display of the reverse chronological progression of images in the first area slows down. If the movement of the contact in the second direction is paused, the display of the reverse chronological progression of images in the first area is paused. And, if the movement of the contact reverses direction (e.g., from a rightward drag gesture to a leftward drag gesture), the display of the progression of images in the first sequence of images in the first area is reversed and the images are shown in chronological order in accordance with the movement of the contact in the reverse direction. More generally, in some embodiments, for a respective sequence of images, the display of a progression of images in the respective sequence of images, in a respective area, occurs in accordance with the movement of a contact in the drag gesture.

In some embodiments, moving the first area in the second direction includes (1146) moving at least part of the first area off of the display in the second direction (e.g., rightward or downward). For example, in response to detecting rightward drag gesture 744, FIGS. 7G-7I, the device moves first area 734 off of the display to the right while displaying first sequence of images 702 in reverse chronological order.

In some embodiments, in accordance with the determination that the drag gesture is in the second direction on the touch-sensitive surface (e.g., to the right or downward): the device moves (1148) a third area in the second direction. In some embodiments, the movable third area is an area that displays images in the third sequence of images, without displaying images from sequences of images other than the third sequence of images. In some embodiments, the movable third area is adjacent to the movable first area (e.g., to the left of the movable first area). While moving the third area in the second direction, the device also displays (1150), in reverse chronological order in the third area, at least some of one or more images for a third sequence of images acquired by the camera after acquiring a third representative image for the third sequence of images.

In some embodiments, the display, in reverse chronological order in the third area, of at least some of the one or more images for the third sequence of images acquired by the camera after acquiring the third representative image occurs in accordance with the movement of a contact in the drag gesture (e.g., in analogous manner to that described above with reference to the first sequence of images). For example, during the drag gesture, the images in the first area and the images in the third area are both retreating at the same rate, with the rate based on the movement of the contact.

In some embodiments, while moving the third area in the second direction, the third area just displays the third representative image for the third sequence of images, without displaying other images in the third sequence of images.

In some embodiments, instead of moving the first area in the second direction, the first area is underneath the third area in a z-layer (front-to-back) order, and the first area is covered as the third area moves onto the display in the second direction.

In some embodiments, like detecting a drag gesture in the second direction, detecting activation of a previous icon (e.g., previous icon 750-2, FIG. 7A) or button also results in the animated display of images from the first sequence in the first area and the animated display of images from the third sequence in the third area. In some embodiments, detecting activation of a previous icon or button results in display of the third representative image replacing display of the first representative image, without the animated display of images from the first sequence in the first area and without the animated display of images from the third sequence in the third area. In some embodiments, detecting activation of a previous icon or button results in display of the third representative image replacing display of the first representative image, without displaying other images in the first sequence or the third sequence. In some embodiments, the response to different types of input (e.g., a rightward drag gesture versus activation of a previous icon or button) is user configurable, for example via a settings interface.

In some embodiments, moving the third area in the second direction includes (1152) moving at least part of the third area onto the display in the second direction (e.g., rightward or downward). For example, in response to detecting rightward drag gesture 744, FIGS. 7G-7I, the devices moves third area 746 onto the display from the right while displaying third sequence of images 726 in reverse chronological order.

In some embodiments, the first sequence of images was acquired (1154) by the camera before the second sequence of images and the first sequence of images was acquired by the camera after the third sequence of images. For example, the sequences of images are in chronological order from left to right.

In some embodiments, in accordance with the determination that the drag gesture is in the second direction on the touch-sensitive surface (e.g., rightward or downward): after moving the third area in the second direction, the device displays (1156) the third representative image for the third sequence of images in the third area (e.g., as shown in FIG. 7K).

In some embodiments, the device detects (1158) termination (e.g., lift off) of the drag gesture while moving the first area and the third area (e.g., as shown in FIG. 7J). In response to detecting (1160) termination of the drag gesture while moving the first area and the third area: in accordance with a determination that the drag gesture meets (1162) previous-sequence-navigation criteria (e.g., the first area is at least half off the display (as shown in FIG. 7J) or more than another predefined portion of the first area has been moved off the display (such as 0.2, 0.3 or 0.4), or the drag gesture is a flick gesture with a liftoff velocity above a predefined threshold velocity): the devices moves the first area completely off the display in the second direction (e.g., rightward or downward); moves the third area completely onto the display; and displays the third representative image for the third sequence of images in the third area. In some embodiments, the display, in reverse chronological order, of at least some of one or more images for the first sequence of images acquired by the camera before acquiring the first representative image continues as the first area moves off the display. In some embodiments, the display, in reverse chronological order in the third area, of at least some of one or more images for the third sequence of images acquired by the camera after acquiring a third representative image continues as the third area moves onto the display until the third representative image is displayed.

In some embodiments, in accordance with a determination that the drag gesture does not (1164) meet the previous-sequence-navigation criteria: the device moves the third area completely off the display in the first direction (e.g., leftward or upward); moves the first area completely onto the display; and displays the first representative image for the first sequence of images in the first area. In some embodiments, the display, in reverse chronological order in the first area, of at least some of the one or more images for the first sequence of images acquired by the camera before acquiring the first representative image is reversed as the first area moves completely onto the display until the first representative image is displayed. In some embodiments, the display, in reverse chronological order in the third area, of at least some of the one or more images for the third sequence of images acquired by the camera after acquiring the third representative image is reversed as the third area moves completely off the display.

It should be understood that the particular order in which the operations in FIGS. 11A-11E have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 10000, 10050, 11000, 1200, 2400, 2500, 2600, and 2700) are also applicable in an analogous manner to method 1100 described above with respect to FIGS. 11A-11E. For example, the contacts, gestures, user interface objects, intensity thresholds, animations, and sequences of images, described above with reference to method 1100 optionally have one or more of the characteristics of the contacts, gestures, user interface objects, intensity thresholds, animations, and sequences of images described herein with reference to other methods described herein (e.g., methods 900, 1000, 10000, 10050, 11000, 1200, 2400, 2500, 2600, and 2700). For brevity, these details are not repeated here.

FIGS. 11F-11I illustrate a flow diagram of a method 11000 of navigating through sequences of related images in accordance with some embodiments. The method 11000 is performed at an electronic device (e.g., device 300, FIG. 3, or portable multifunction device 100, FIG. 1A) with a display and a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 11000 are, optionally, combined and/or the order of some operations is, optionally, changed.

The device stores (11002) a plurality of sequences of images. A respective sequence of images includes: a respective representative image taken by a camera, and one or more images acquired by the camera before acquiring the respective representative image. In some embodiments, the camera that took the respective sequence of images is part of the electronic device. In some embodiments, a respective sequence of images includes (11004) one or more images acquired by the camera after acquiring the respective representative image.

In some embodiments, the respective sequence of images was taken by a camera that is not part of the electronic device (e.g., the respective sequence of images was transferred to the electronic device after being taken with a camera on another device). In some embodiments, the respective sequence of images was obtained in response to detecting activation of a shutter button at a first time, as described herein with respect to FIGS. 9A-9G (method 900) and/or FIGS. 26A-26D (method 2600). In some embodiments, the respective representative image corresponds to the representative image acquired by the camera, as described herein with respect to FIGS. 9A-9G (method 900) and/or FIGS. 26A-26D (method 2600). In some embodiments, the respective representative image has a higher resolution than other images in the respective sequence of images. In some embodiments, the respective representative image has a same resolution as other images in the respective sequence of images.

The device displays (11006) a first representative image for a first sequence of images in a movable first area on the display (e.g., while the device is in an image presentation mode). In some embodiments, the movable first area is an area that displays images in the first sequence of images, without displaying images from sequences of images other than the first sequence of images (e.g., representative image 702-3, FIG. 7Q).

In some embodiments, the first sequence of images is (11008) a message in a message conversation displayed in a scrollable region of a messaging application, and the first sequence of images is displayed as the scrollable region of the messaging application is scrolled (e.g., as described with reference to operation 1106, method 1100).

The device detects (11010) a gesture on the touch-sensitive surface, the gesture including movement by a contact that corresponds to movement in a first direction on the display (e.g., flick/swipe gesture 740, FIGS. 7Q-7S and/or drag gesture 764, FIGS. 7Y-7AA).

In response to detecting the gesture on the touch-sensitive surface, the device: moves (11012) (e.g., with the first representative image) the first area in the first direction on the display; moves a movable second area in the first direction on the display; and, in accordance with a determination that sequence-display criteria are met, while moving the second area in the first direction, displays, in chronological order in the second area, at least some of one or more images for a second sequence of images acquired by the camera before acquiring a second representative image for the second sequence of images (e.g., display of sequence of images 724, FIGS. 7R-7T). In some embodiments, the movement of the first area in the first direction on the display corresponds to the movement of the contact in the gesture in the first direction on the touch-sensitive surface (e.g., movement of the contact appears to directly manipulate the movement of the first area). In some embodiments, the movable second area is an area that displays images in a second sequence of images, without displaying images from sequences of images other than the second sequence of images. In some embodiments, the movable second area is adjacent to the movable first area (e.g., to the right of the movable first area).

In some embodiments, in response to detecting the gesture on the touch-sensitive surface: in accordance with a determination that the sequence-display criteria are not met, while moving the second area in the first direction, the device displays (11014) the second representative image for the second sequence of images in the movable second area on the display (without displaying other images in the second sequence of images in the moveable second area). In some embodiments, in accordance with a determination that the sequence-display criteria are not met, while moving the second area in the first direction, the device displays an initial image (rather than the second representative image) for the second sequence of images in the movable second area on the display, or another image acquired before the second representative image for the second sequence of images.

In some embodiments, the sequence-display criteria include (11016) a criterion that the contact lifts off prior to displaying, in chronological order in the second area, at least some of one or more images for the second sequence of images acquired by the camera before acquiring the second representative image. In some embodiments, if the contact continues to be detected while the second area is moving in the first direction, then just the representative image (or just the initial image) for the second sequence images is displayed while the second area moves in the first direction. For example, the contact is part of a leftward (or rightward) drag gesture that moves slowly across the touch sensitive surface and slowly drags the second area leftward (or rightward). Conversely, if the contact ceases to be detected while the second area is moved in the first direction, then an animated sequence of images taken prior to the second representative image is displayed in the second area while the second area continues to move in the first direction. For example, the contact is part of a leftward (or rightward) flick gesture that moves quickly across the touch sensitive surface and then lifts off while the second area is still moving leftward (or rightward). For example, the contact is part of a leftward (or rightward) drag gesture that moves across the touch sensitive surface (while displaying just the second representative image, or the initial image, for the second sequence of images in the second area) and then lifts off after at least a predetermined amount (e.g., 25%, 30%, 40%, or 50%) of the second area has moved onto the display. After liftoff, the remainder of the second area moves onto the display and at least some of the images for the second sequence of images acquired by the camera before acquiring the second representative image are displayed in the second area.

In some embodiments, moving the movable second area in the first direction on the display includes (11018) displaying a respective prior image that was acquired prior to acquiring the second representative image in the second region (e.g., the device initially displays the initial image in the sequence of images rather than the representative image).

In some embodiments, the sequence-display criteria include (11020) detecting liftoff of the contact (e.g., as described with reference to FIGS. 7Y-7AA). In response to detecting liftoff of the contact, the device continues to move the moveable second area in the first direction and continues to move the moveable first area in the first direction. The images from the second sequence of images are displayed at a rate such that the second representative image is displayed in the moveable second area when the moveable second area stops moving in the first direction (e.g., the rate of movement of the moveable second area is selected to match the rate of movement through the sequence of images, or the rate of advancement through the sequence of images is selected to match the rate of movement of the moveable second area, or some combination of the two). In some embodiments, the device advances through a sequence of images corresponding to the moveable first area while the moveable first area is moving. In some embodiments, the device does not advance through a sequence of images corresponding to the moveable first area while the moveable first area is moving.

In some embodiments, while moving the moveable first region, the device displays (11022) a simulated parallax effect for an image within the moveable first region such that the image within the moveable first region shifts relative to a frame of the moveable first region (e.g., as though the frame of the moveable first region were separated in a simulated z-direction from the image within the moveable first region).

In some embodiments, while moving the moveable second region while the contact is detected on the touch-sensitive surface (e.g., prior to displaying the images from the second sequence of images), the device displays (11024) a simulated parallax effect for an image within the moveable second region such that the image within the moveable second region shifts relative to a frame of the moveable second region (e.g., as though the frame of the moveable second region were separated in a simulate z-direction from the image within the moveable second region).

In some embodiments, moving the first area in the first direction includes (11026) moving at least part of the first area off of the display in the first direction (e.g., sliding the first area off the display, FIGS. 7A-7CC).

In some embodiments, moving the second area in the first direction includes (11028) moving at least part of the second area onto the display in the first direction (e.g., sliding the second area onto the display in conjunction with sliding the first area off the display, FIGS. 7A-7CC).

In some embodiments, after moving the second area in the first direction, the device displays (11030) the second representative image for the second sequence of images in the second area (e.g., as shown in FIG. 7CC, among others).

In some embodiments, while displaying the second representative image for the second sequence of images in the second area, the device detects (11032) a change in intensity of an input corresponding to the second representative image. In response to detecting the change in intensity of the input, the device advances through the second sequence of images in the second area without moving the second area on the display (e.g., the device performs any of the operations shown in FIGS. 6A-6FF).

In some embodiments, the device detects (11034) termination of the drag gesture while moving the first area and the second area. In response to detecting termination of the drag gesture while moving the first area and the second area: in accordance with a determination that the drag gesture meets next-sequence-navigation criteria, the device: moves the first area completely off the display in the first direction; moves the second area completely onto the display; and displays the second representative image for the second sequence of images in the second area (e.g., as described with reference to operation 1136, method 1100).

In some embodiments, in response to detecting termination of the drag gesture while moving the first area and the second area: in accordance with a determination that the drag gesture does not meet the next-sequence-navigation criteria, the device: moves (11036) the second area completely off the display in a second direction, opposite the first direction; moves the first area completely onto the display; and displays the first representative image for the first sequence of images in the first area (e.g., as described with reference to operation 1138, method 1100).

It should be understood that the particular order in which the operations in FIGS. 11F-11I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 10000, 10050, 1100, 1200, 2400, 2500, 2600, and 2700) are also applicable in an analogous manner to method 11000 described above with respect to FIGS. 11F-11I. For example, the contacts, gestures, user interface objects, intensity thresholds, animations, and sequences of images, described above with reference to method 11000 optionally have one or more of the characteristics of the contacts, gestures, user interface objects, intensity thresholds, animations, and sequences of images described herein with reference to other methods described herein (e.g., methods 900, 1000, 10000, 10050, 1100, 1200, 2400, 2500, 2600, and 2700). For brevity, these details are not repeated here.

FIGS. 12A-12B illustrate a flow diagram of a method 1200 of performing distinct operations on sequences of related images as compared to individual images in accordance with some embodiments. The method 1200 is performed at an electronic device (e.g., device 300, FIG. 3, or portable multifunction device 100, FIG. 1A) with a display and a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1200 are, optionally, combined and/or the order of some operations is, optionally, changed.

The device stores (1202) a plurality of sequences of images. A respective sequence of images includes: a respective representative image taken by a camera, one or more images acquired by the camera after acquiring the respective representative image, and one or more images acquired by the camera before acquiring the respective representative image. In some embodiments, the camera that took the respective sequence of images is part of the electronic device. In some embodiments, the respective sequence of images was taken by a camera that is not part of the electronic device (e.g., the respective sequence of images was transferred to the electronic device after being taken with a camera on another device). In some embodiments, the respective sequence of images was obtained in response to detecting activation of a shutter button at a first time, as described herein with respect to FIGS. 5A-5K and method 900 and/or FIGS. 22A-22D and method 2600. In some embodiments, the respective sequence of images was obtained in a burst mode. In some embodiments, the respective representative image corresponds to the representative image acquired by the camera, as described herein with respect to FIGS. 5A-5K and method 900 and/or FIGS. 22A-22D and method 2600. In some embodiments, the respective representative image has a higher resolution than other images in the respective sequence of images. In some embodiments, the respective representative image has a same resolution as other images in the respective sequence of images.

The device stores (1204) a plurality of images that are distinct from the images in the plurality of sequences of images. A respective image in the plurality of images is not part of a sequence of images in the plurality of sequences of images.

The device displays (1206) a first image on the display (e.g., as shown in FIG. 8A). While displaying the first image on the display, the device (1208) detects a first input (e.g., press-and-hold input 816, FIG. 8B). In response to (1210) detecting the first input: in accordance with a determination that the first image is an image in a first sequence of images (e.g., the first image is a representative image for a first sequence of images), the device performs (1212) a first operation that includes displaying at least some of the images in the first sequence of images besides the first image (e.g., sequentially displaying the at least some of the images in the first sequences of images besides the first image)(e.g., as shown in FIGS. 8C-8F). In accordance with a determination that the first image is an image in the plurality of images that are distinct from the images in the plurality of sequences of images, the device performs (1214) a second operation, distinct from the first operation, involving the first image (e.g., as shown in FIGS. 8K-8L). That is, in some embodiments, the device responds differently to the same type of input (e.g., an input sharing one or more common path or intensity characteristics) depending on whether the image is part of an enhanced photo or a still image. In accordance with various embodiments, the first operation is any of the operations described herein with respect to sequences of images. Specific examples are provided below.

In some embodiments, the first input is (1216) a press-and-hold gesture, the first operation displays at least a portion of the first sequence of images (e.g., as described herein with respect to FIGS. 10A-10M and methods 1000/10000/10050), and the second operation displays information about the first image with the first image (e.g., time, date, location (e.g., via GPS), and/or other metadata about the first image are overlaid on a portion of the first image, as shown in FIGS. 8K-8L). In some embodiments, the press-and-hold gesture is a press-and-hold finger gesture on the first image on a touch-sensitive display, or a press-and-hold finger gesture on a track pad while a cursor or other focus selector is over the first image on a display). In some embodiments, the first input is a click-and-hold input with a mouse while a cursor or other focus selector is over the first image on a display.

In some embodiments, the first input is (1218) a press-and-hold gesture, the first operation displays at least a portion of the first sequence of images (e.g., as described herein with respect to FIGS. 10A-10M and methods 1000/10000/10050), and the second operation displays an animation that shows different portions of the first image. In some embodiments, the press-and-hold gesture is a press-and-hold finger gesture on the first image on a touch-sensitive display, or a press-and-hold finger gesture on a track pad while a cursor or other focus selector is over the first image on a display. In some embodiments, the first input is a click-andhold input with a mouse while a cursor or other focus selector is over the first image on a display). For example, the second operation is an animation that zooms and/or pans the first image (such as a Ken Burns effect), and/or an animation that applies a filter to the first image. In some embodiments, the second operation includes zooming out from the image so as to give the impression of the first image being pushed back into the display.

In some embodiments, the device includes (1220) one or more sensors to detect intensity of contacts with the touch-sensitive surface, the first input includes a finger contact that satisfies first contact-intensity criteria (e.g., a finger gesture on the first image on a touch-sensitive display, or a finger gesture on a track pad while a cursor or other focus selector is over the first image on a display, wherein a contact in the finger gesture exceeds a light press (or deep press) intensity threshold for at least part of the input), the first operation displays at least a portion of the first sequence of images (e.g., as described herein with respect to FIGS. 10A-10M and methods 1000/10000/10050), and the second operation displays information about the first image with the first image (e.g., time, date, location (e.g., via GPS), and/or other metadata about the first image are overlaid on a portion of the first image).

In some embodiments, the device includes (1222) one or more sensors to detect intensity of contacts with the touch-sensitive surface, the first input includes a finger contact that satisfies first contact-intensity criteria (e.g., a finger gesture on the first image on a touch-sensitive display, or a finger gesture on a track pad while a cursor or other focus selector is over the first image on a display, wherein a contact in the finger gesture exceeds a deep press intensity threshold for at least part of the input), the first operation displays at least a portion of the first sequence of images (e.g., as described herein with respect to FIGS. 10A-10M and methods 1000/ 10000/10050), and the second operation displays an animation that shows different portions of the first image. For example, the second operation is an animation that zooms and/or pans the first image (such as a Ken Burns effect), and/or an animation that applies a filter to the first image. In some embodiments, the second operation includes zooming out from the image so as to give the impression of the first image being pushed back into the display.

In some embodiments, the first input is (1224) a drag gesture, the first operation displays at least some of the images in the first sequence of images while transitioning from displaying the first image to displaying a second image (the second image not being an image in the first sequence of images) (e.g., as described herein with respect to FIGS. 10A-10M and methods 1000/10000/10050), and the second operation transitions from displaying the first image to displaying a third image (the third image not being an image in the first sequence of images).

In some embodiments, when the first image is an image in a first sequence of images, the method further includes detecting a navigational input and navigating to a second image that is an image in the plurality of images that are distinct from the images in the plurality of sequences of images. The method further includes detecting a second input that shares one or more characteristics with the first input (e.g., intensity and/or path inputs). In some embodiments, the first input and the second input need not share a location. The method further includes, in response to detecting the second input, performing the second operation involving the second image.

It should be understood that the particular order in which the operations in FIGS. 12A-12B have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1000, 10000, 10050, 1100, 11000, 2400, 2500, 2600, and 2700) are also applicable in an analogous manner to method 1200 described above with respect to FIGS. 12A-12B. For example, the contacts, gestures, user interface objects, intensity thresholds, animations, and sequences of images, described above with reference to method 1200 optionally have one or more of the characteristics of the contacts, gestures, user interface objects, intensity thresholds, animations, and sequences of images described herein with reference to other methods described herein (e.g., methods 900, 1000, 10000, 10050, 1100, 11000, 2400, 2500, 2600, and 2700). For brevity, these details are not repeated here.

Figure 13:
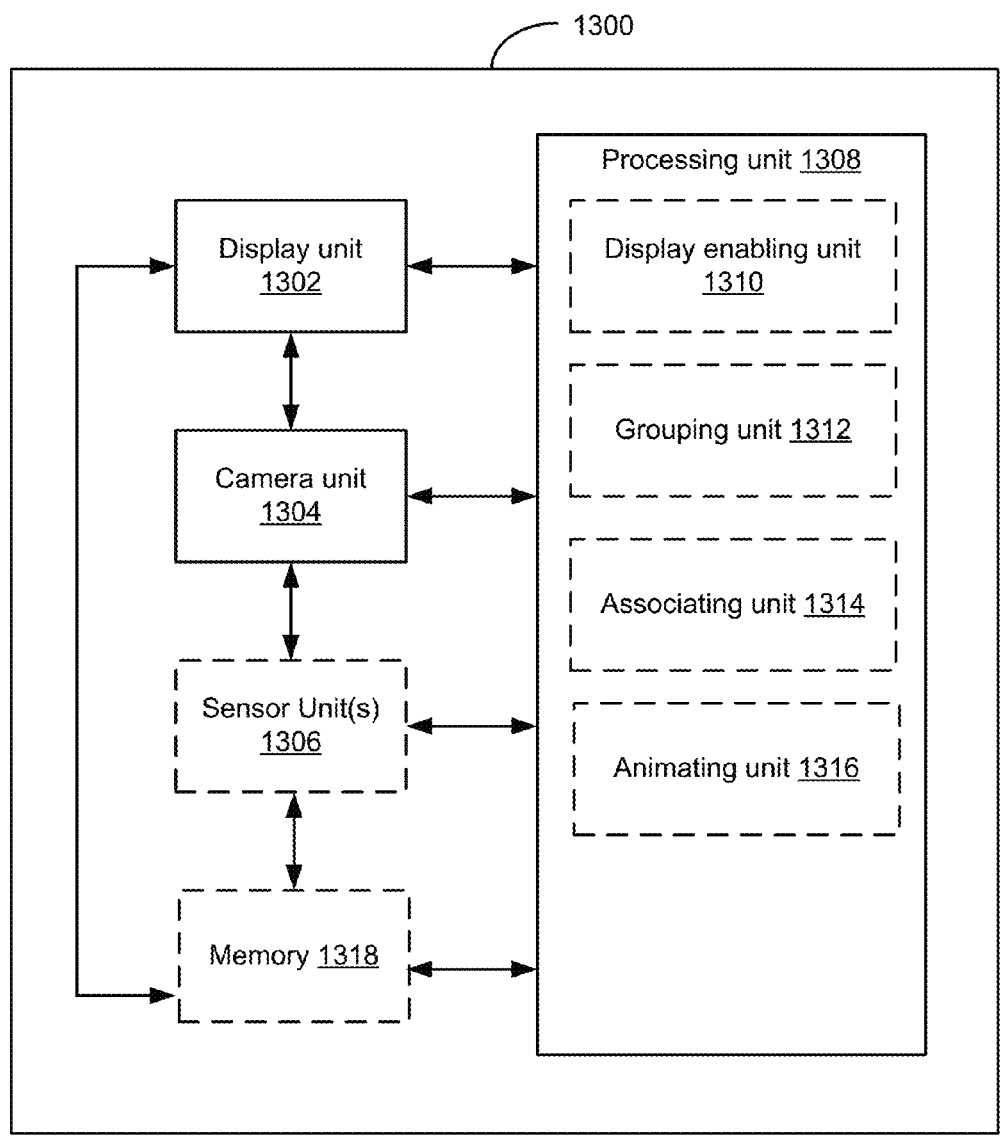
FIGS. 13-19 are functional block diagrams of electronic devices in accordance with some embodiments.

In accordance with some embodiments, FIG. 13 shows a functional block diagram of an electronic device 1300 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 13 are, optionally, combined or separated into sub-blocks to implement the principles of the various described embodiments. Therefore, the description herein optionally supports any possible combination or separation or further definition of the functional blocks described herein.

As shown in FIG. 13, an electronic device 1300 includes a camera unit 1304 configured to acquire images, a display unit 1302 configured to display a live preview (e.g., of images obtained from the camera unit), one or more optional sensor units 1306 configured to detect activation of a shutter button; and a processing unit 1308 coupled with the display unit 1302, the camera unit 1304 and the one or more optional sensor units 1306. In some embodiments, the processing unit 1308 includes a display enabling unit 1310, a grouping unit 1312, an associating unit 1314, and an animating unit 1316.

The processing unit 1308 is configured to: while in a first media acquisition mode for the camera unit 1304 display (e.g., using the display enabling unit 1310) the live preview on the display unit 1302 (e.g., of images obtained from the camera unit 1304) while displaying the live preview, detect activation of a shutter button at a first time (e.g., using the sensor units 1306). In response to detecting activation of the shutter button at the first time, the processing unit 1308 is configured to group (e.g., with the grouping unit 1312) a plurality of images acquired by the camera unit 1304 in temporal proximity to the activation of the shutter button at the first time into a first sequence of images. The first sequence of images includes: a plurality of images acquired by the camera unit 1304 prior to detecting activation of the shutter button at the first time; a representative image that represents the first sequence of images and was acquired by the camera unit 1304 after one or more of the other images in the first sequence of images; and a plurality of images acquired by the camera unit 1304 after acquiring the representative image.

Figure 14:
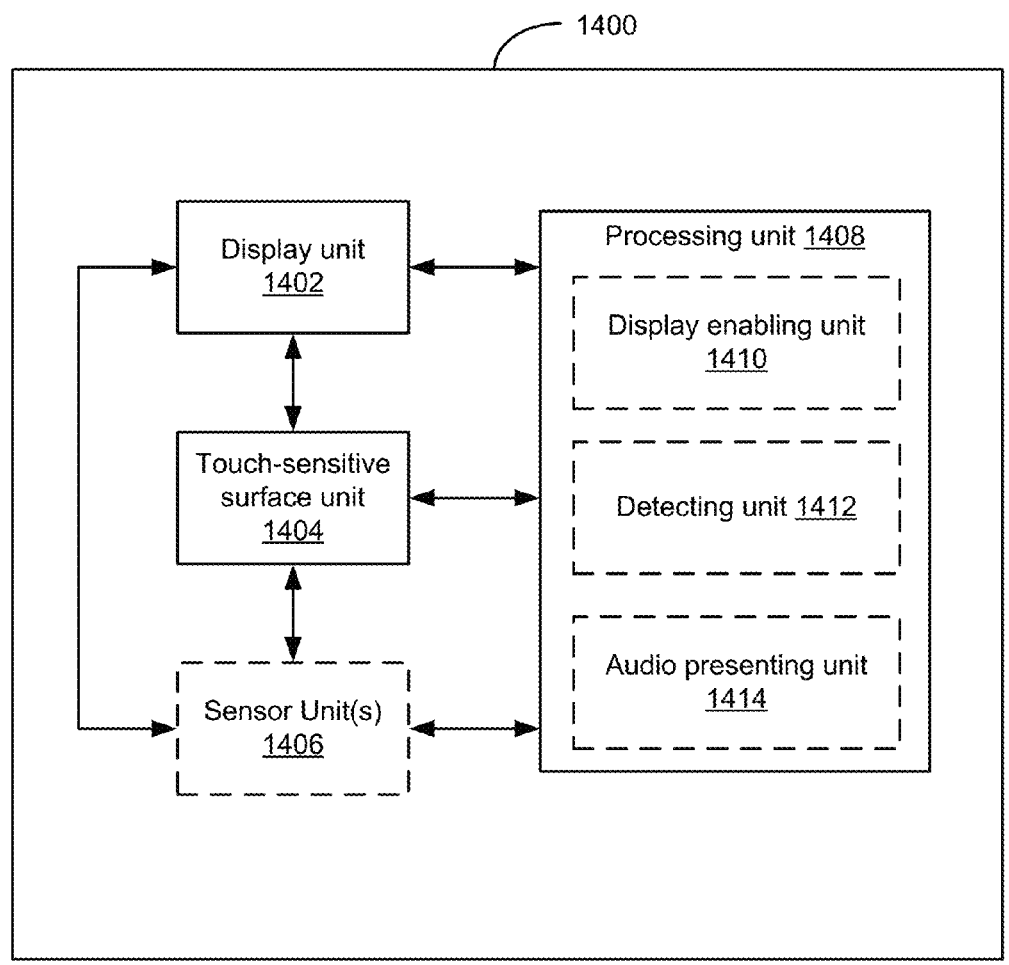

As shown in FIG. 14, an electronic device 1400 includes a display unit 1402 configured to display images, a touch-sensitive surface unit 1404 configured to detect user inputs, one or more optional sensor units 1406 configured to detect intensity of contacts with the touch-sensitive surface unit 1404; and a processing unit 1408 coupled with the display unit 1402, the touch-sensitive surface unit 1404 and the one or more optional sensor units 1406. In some embodiments, the processing unit 1408 includes a display enabling unit 1410, a detecting unit 1412, and an audio presenting unit 1414.

The processing unit 1408 is configured to display a representative image on the display unit 1402 (e.g., with display enabling unit 1410). The representative image is one image in a sequence of images taken by a camera. The sequence of images includes one or more images acquired by the camera after acquiring the representative image and the sequence of images includes one or more images acquired by the camera before acquiring the representative image. The processing unit 1408 is further configured to, while displaying the representative image on the display unit 1402, detect a first portion of a first input (e.g., with the detecting unit 1412, which optionally detects inputs on the touch-sensitive surface unit 1404). The processing unit 1408 is configured, in response to detecting the first portion of the first input, replace display (e.g., with the display enabling unit 1410) of the representative image with display, on the display unit 1402, in sequence, of the one or more images acquired by the camera after acquiring the representative image. The processing unit 1408 is configured, after detecting the first portion of the first input, detect a second portion of the first input (e.g., with the detecting unit 1412). The processing unit 1408 is configured, in response to detecting the second portion of the first input, display, on the display unit 1402, in sequence, the one or more images acquired by the camera before acquiring the representative image, the representative image, and the one or more images acquired by the camera after acquiring the representative image.

Figure 15:
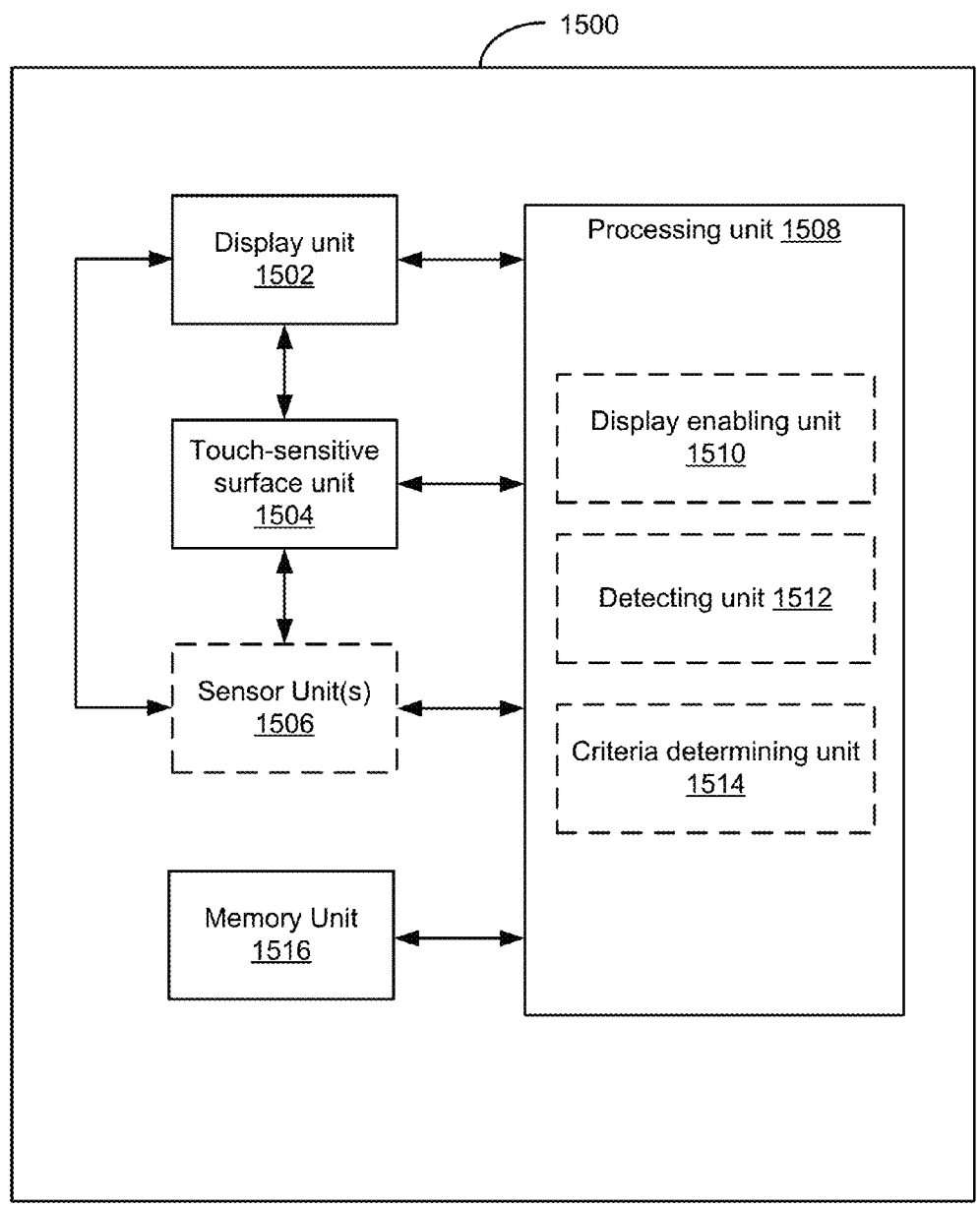

As shown in FIG. 15, an electronic device 1500 includes a display unit 1502 configured to display images, a touch-sensitive surface unit 1504 configured to detect user inputs, one or more optional sensor units 1506 configured to detect intensity of contacts with the touch-sensitive surface unit 1504, a memory unit 1516 configured to store images; and a processing unit 1508 coupled with the display unit 1502, the touch-sensitive surface unit 1504, the memory unit 1516, and the one or more optional sensor units 1506. In some embodiments, the processing unit 1508 includes a display enabling unit 1510, a detecting unit 1512, and a criteria determining unit 1514.

The processing unit 1508 is configured to store, in the memory unit 1516, a plurality of sequences of images. A respective sequence of images includes: a respective representative image taken by a camera, one or more images acquired by the camera after acquiring the respective representative image, and one or more images acquired by the camera before acquiring the respective representative image. The processing unit 1508 is further configured to display (e.g., with the display enabling unit 1510), on the display unit 1502, a first representative image for a first sequence of images in a movable first area on the display unit 1502. The processing unit 1508 is further configured to detect (e.g., with detecting unit 1512) a drag gesture on the touch-sensitive surface unit 1504. In accordance with a determination that the drag gesture is in a first direction on the touch-sensitive surface unit 1504: the processing unit 1508 is configured to replace (e.g., with the display enabling unit 1510), in the moveable first area, display of the first representative image for the first sequence of images with display, on the display unit 1502, in chronological order, of at least some of one or more images for the first sequence of images acquired by the camera after acquiring the first representative image for the first sequence of images. The processing unit 1508 is further configured to move (e.g., with the display enabling unit 1510) the first area in the first direction on the display unit 1502.

Figure 16:
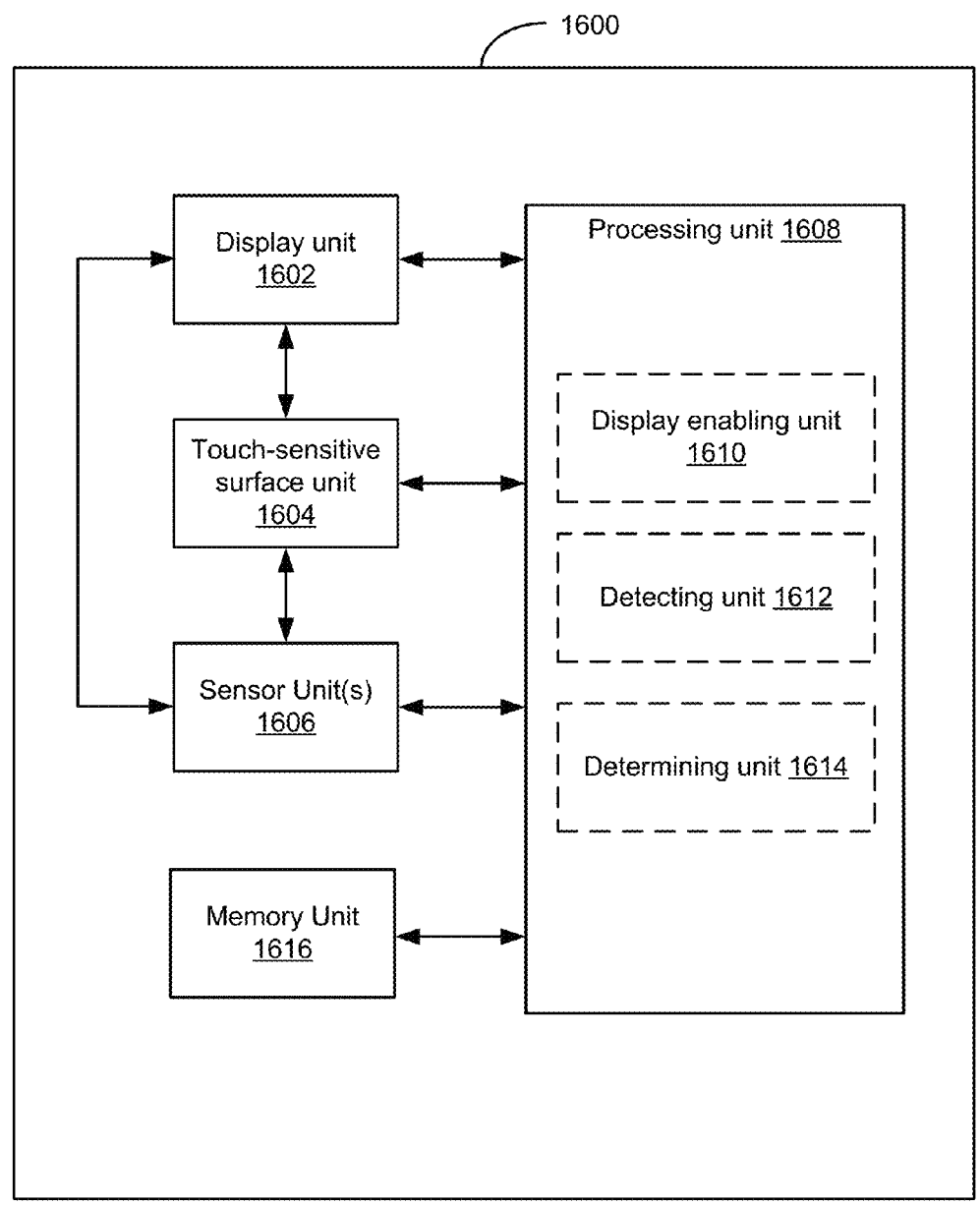

As shown in FIG. 16, an electronic device 1600 includes a display unit 1602 configured to display images, a touch-sensitive surface unit 1604 configured to detect user inputs, one or more optional sensor units 1606 configured to detect intensity of contacts with the touch-sensitive surface unit 1604, a memory unit 1616 configured to store images; and a processing unit 1608 coupled with the display unit 1602, the touch-sensitive surface unit 1604, the memory unit 1616, and the one or more optional sensor units 1606. In some embodiments, the processing unit 1608 includes a display enabling unit 1610, a detecting unit 1612, and a determining unit 1614.

The processing unit 1608 is configured to store, in the memory unit 1616, a plurality of sequences of images. A respective sequence of images includes: a respective representative image taken by a camera, one or more images acquired by the camera after acquiring the respective representative image, and one or more images acquired by the camera before acquiring the respective representative image. The processing unit 1608 is further configured to store, in the memory unit 1616, a plurality of images that are distinct from the images in the plurality of sequences of images. A respective image in the plurality of images is not part of a sequence of images in the plurality of sequences of images. The processing unit 1608 is further configured to display (e.g., with display enabling unit 1610) a first image on the display unit 1602. The processing unit 1608 is further configured to, while displaying the first image on the display unit 1602, detect (e.g., with detecting unit 1612) a first input. The processing unit 1608 is further configured to, in response to detecting the first input: in accordance with a determination (e.g., with determining unit 1614) that the first image is an image in a first sequence of images, perform a first operation that includes displaying (e.g., with display enabling unit 1610), on the display unit 1602, at least some of the images in the first sequence of images besides the first image; and, in accordance with a determination (e.g., with determining unit 1614) that the first image is an image in the plurality of images that are distinct from the images in the plurality of sequences of images, perform a second operation, distinct from the first operation, involving the first image.

Figure 17:
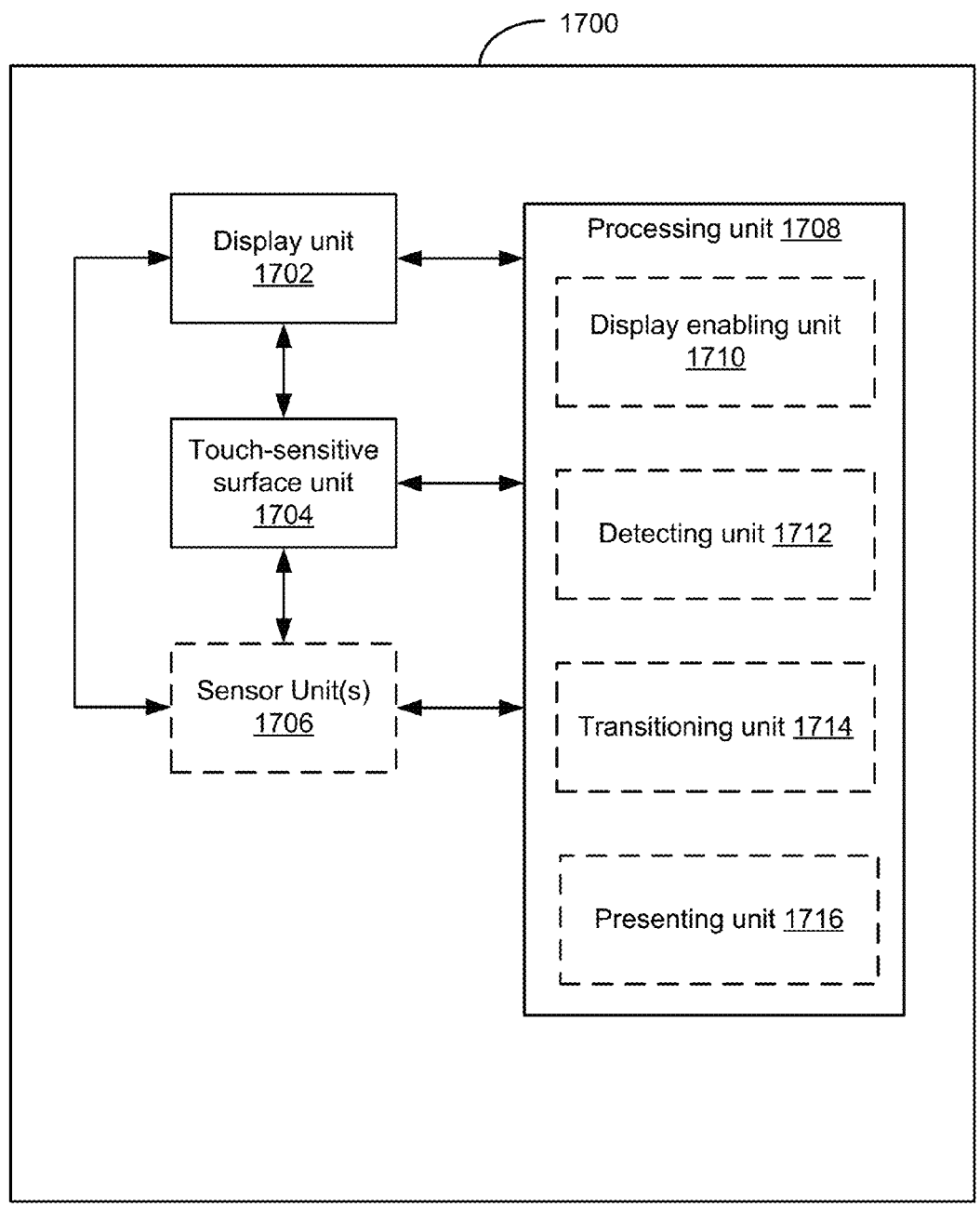

As shown in FIG. 17, an electronic device 1700 includes a display unit 1702 configured to display images; a touch-sensitive surface unit 1704 configured to detect user inputs; one or more optional sensor units 1706 configured to detect intensity of contacts with the touch-sensitive surface unit 1704; and a processing unit 1708 coupled with the display unit 1702, the touch-sensitive surface unit 1704, and the optional one or more sensor units 1706. In some embodiments, the processing unit 1708 includes a display enabling unit 1710, a detecting unit 1712, a transitioning unit 1714, and a presenting unit 1716.

The processing unit 1708 is configured to enable display (e.g., with display enabling unit 1710) of a representative image on the display unit 1702. The representative image is one image in a sequence of images taken by a camera. The sequence of images includes one or more images acquired by the camera after acquiring the representative image. The sequence of images includes one or more images acquired by the camera before acquiring the representative image. The processing unit 1708 is further configured to, while enabling display of the representative image on the display unit 1702, detect (e.g., with detecting unit 1712) a first portion of a first input. The processing unit 1708 is further configured to, in response to detecting the first portion of the first input, transition (e.g., with transitioning unit 1714) from displaying the representative image to displaying a respective prior image in the sequence of images. The respective prior image was acquired by the camera before acquiring the representative image. The processing unit 1708 is further configured to, in response to detecting the first portion of the first input, after transitioning from displaying the representative image to displaying the respective prior image, enable display (e.g., with display enabling unit 1710) of, in sequence starting with the respective prior image, at least some of the one or more images acquired by the camera before acquiring the representative image and at least some of the one or more images acquired by the camera after acquiring the representative image.

Figure 18:
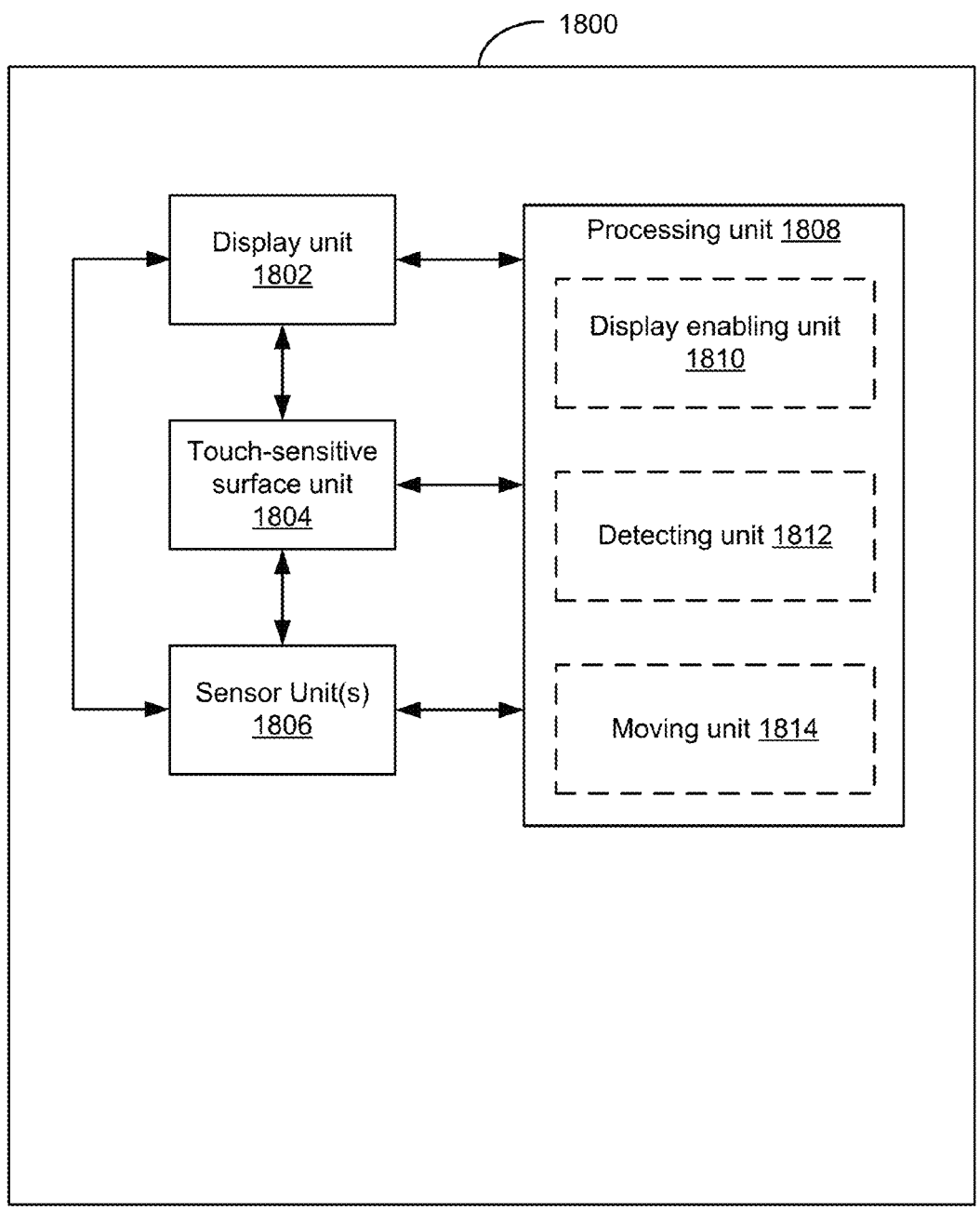

As shown in FIG. 18, an electronic device 1800 includes a display unit 1802 configured to display images; a touch-sensitive surface unit 1804 configured to detect user inputs; one or more sensor units 1806 configured to detect intensity of contacts with the touch-sensitive surface unit 1804; and a processing unit 1808 coupled with the display unit 1802, the touch-sensitive surface unit 1804, and the one or more sensor units 1806. In some embodiments, the processing unit 1808 includes a display enabling unit 1810, a detecting unit 1812, and a moving unit 1814.

The processing unit 1808 is configured to enable display (e.g., with display enabling unit 1810) of a representative image on the display unit 1802. The representative image is one image in a sequence of images taken by a camera. The sequence of images includes one or more images acquired by the camera after acquiring the representative image. The processing unit 1808 is further configured to, while enabling display of the representative image on the display unit 1802, detect (e.g., with detecting unit 1812) a first input that includes detecting (e.g., with sensor units 1804) an increase in a characteristic intensity of a contact on the touch-sensitive surface unit 1804 to a first intensity that is greater than a first intensity threshold. The processing unit 1808 is further configured to, in response to detecting the increase in the characteristic intensity of the contact, advance (e.g., with moving unit 1814), in a first direction, through the one or more images acquired by the camera after acquiring the representative image at a rate that is determined based at least in part on the first intensity. The processing unit 1808 is further configured to, after advancing through the one or more images acquired by the camera after acquiring the representative image at the rate that is determined based on the first intensity, detect (e.g., with detecting unit 1812) a decrease in intensity of the contact to a second intensity that is less than the first intensity. The processing unit 1808 is further configured to, in response to detecting the decrease in the characteristic intensity of the contact to the second intensity: in accordance with a determination that the second intensity is above the first intensity threshold, continue to advance (e.g., with moving unit 1814), in the first direction, through the one or more images acquired by the camera after acquiring the representative image at a second rate. The second rate is determined based at least in part on the second intensity and the second rate is slower than the first rate. The processing unit 1808 is further configured to, in response to detecting the decrease in the characteristic intensity of the contact to the second intensity: in accordance with a determination that the second intensity is below the first intensity threshold, move (e.g., with moving unit 1814), in a second direction that is opposite to the first direction, through the one or more images acquired by the camera after acquiring the representative image at a rate that is determined based at least in part on the second intensity.

Figure 19:
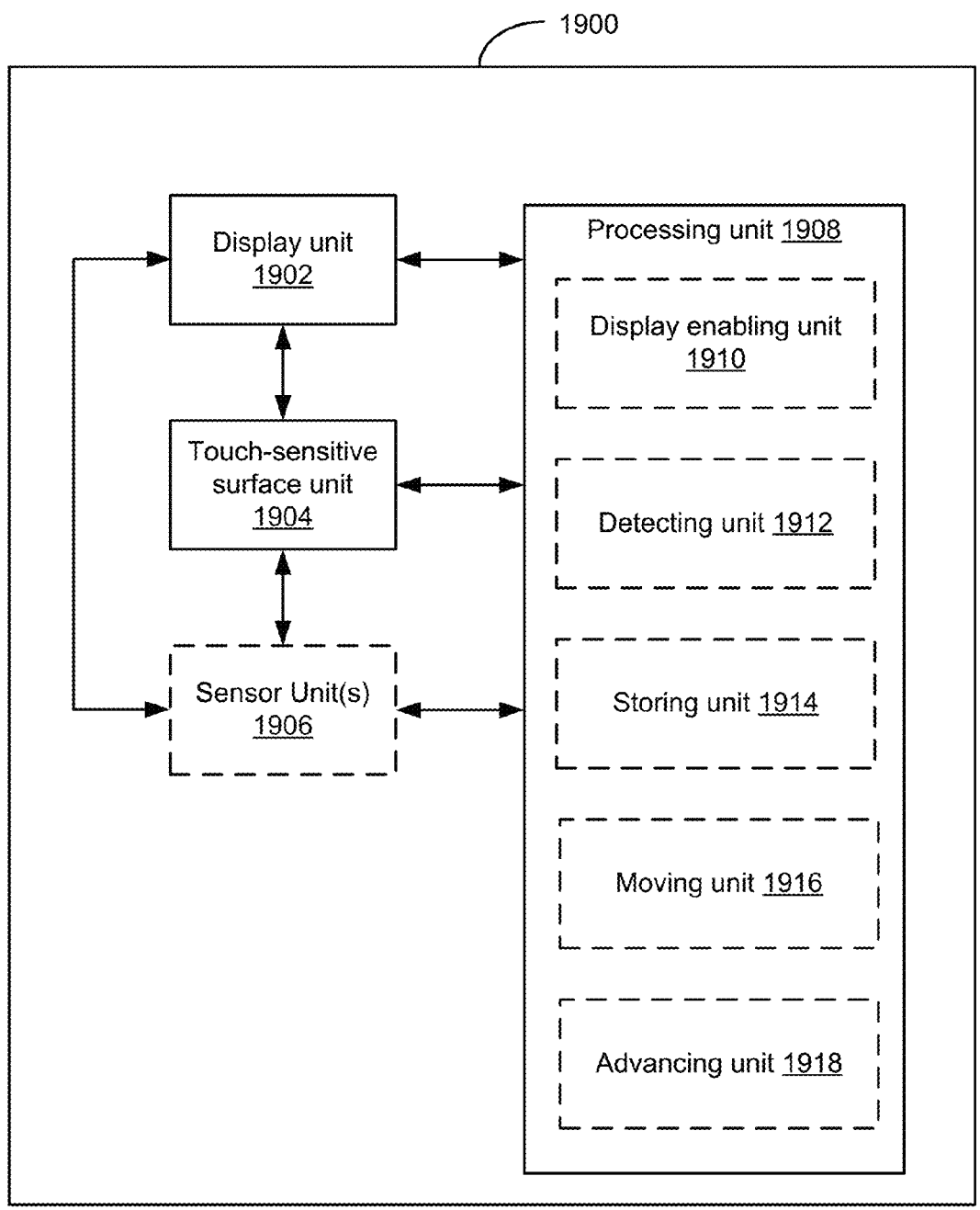

As shown in FIG. 19, an electronic device 1900 includes a display unit 1902 configured to display images; a touch-sensitive surface unit 1904 configured to detect user inputs; one or more optional sensor units 1906 configured to detect intensity of contacts with the touch-sensitive surface unit 1904; and a processing unit 1908 coupled with the display unit 1902, the touch-sensitive surface unit 1904, and the optional one or more sensor units 1906. In some embodiments, the processing unit 1908 includes a display enabling unit 1910, a detecting unit 1912, a storing unit 1914, a moving unit 1916; and advancing unit 1918.

The processing unit 1908 is configured to store (e.g., with storing unit 1914) a plurality of sequences of images. A respective sequence of images includes: a respective representative image taken by a camera, and one or more images acquired by the camera before acquiring the respective representative image. The processing unit 1908 is further configured to enable display (e.g., with display enabling unit 1910) of a first representative image for a first sequence of images in a movable first area on the display unit 1902. The processing unit 1908 is further configured to detect (e.g., with detecting unit 1912) a gesture on the touch-sensitive surface unit 1904, the gesture including movement by a contact that corresponds to movement in a first direction on the display unit 1902. The processing unit 1908 is further configured to, in response to detecting the gesture on the touch-sensitive surface unit 1904: move (e.g., with moving unit 1916) the first area in the first direction on the display unit 1902; move (e.g., with moving unit 1916) a movable second area in the first direction on the display unit 1902; and, in accordance with a determination that sequence-display criteria are met, while moving the second area in the first direction, enable display (e.g., with display enabling unit 1910) of, in chronological order in the second area, at least some of the one or more images for a second sequence of images acquired by the camera before acquiring a second representative image for the second sequence of images.

FIGS. 20A-20L illustrate exemplary user interfaces for modifying images in a sequence of images, in accordance with some embodiments. The user interfaces in these figures are used to illustrate the processes described below, including the processes in FIGS. 9A-9G, 10A-10M, 11A-11I, 12A-12B, 24A-24E, 25A-25C, 26A-26D, and 27A-27E. Although the examples which follow will be given with reference to inputs on a touch-screen display (where the touch-sensitive surface and the display are combined), in some embodiments, the device detects inputs on a touch-sensitive surface 451 that is separate from the display 450, as shown in FIG. 4B.

Figure 20A:
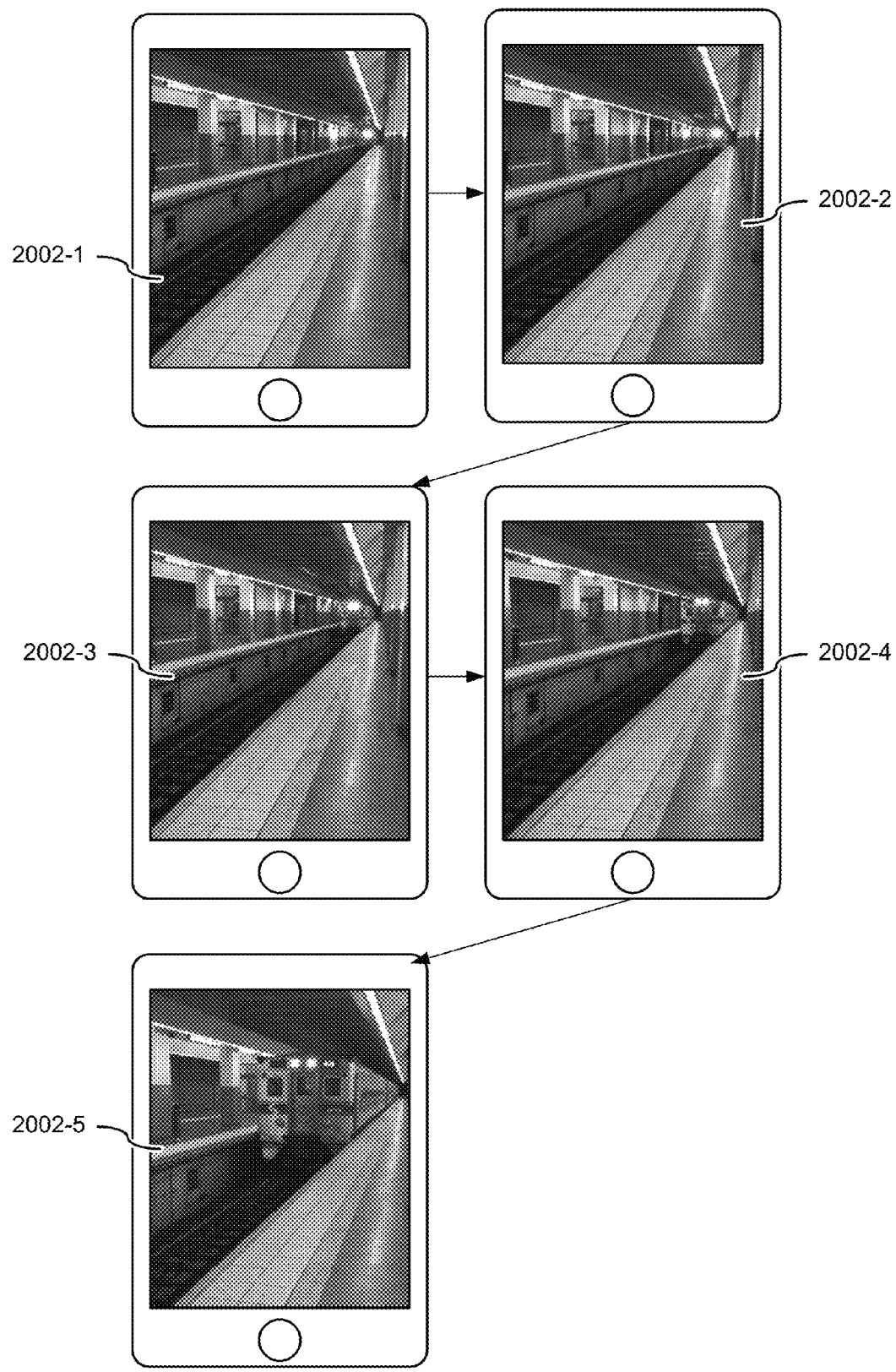
FIGS. 20A-20L illustrate exemplary user interfaces for modifying images in a sequence of images, in accordance with some embodiments.

FIG. 20A illustrates a sequence of images 2002 showing a train approaching a platform. Sequence of images includes representative image 2002-3, images 2002-1 and 2002-2 acquired by the camera before acquiring representative image 2002-3; and images 2002-4 and 2002-5 acquired by the camera after acquiring representative image 2002-3. The chronological order of sequence of images 2002 is: image 2002-1; image 2002-2; representative image 2002-3; image 2002-4; and image 2002-5.

Figure 20B:
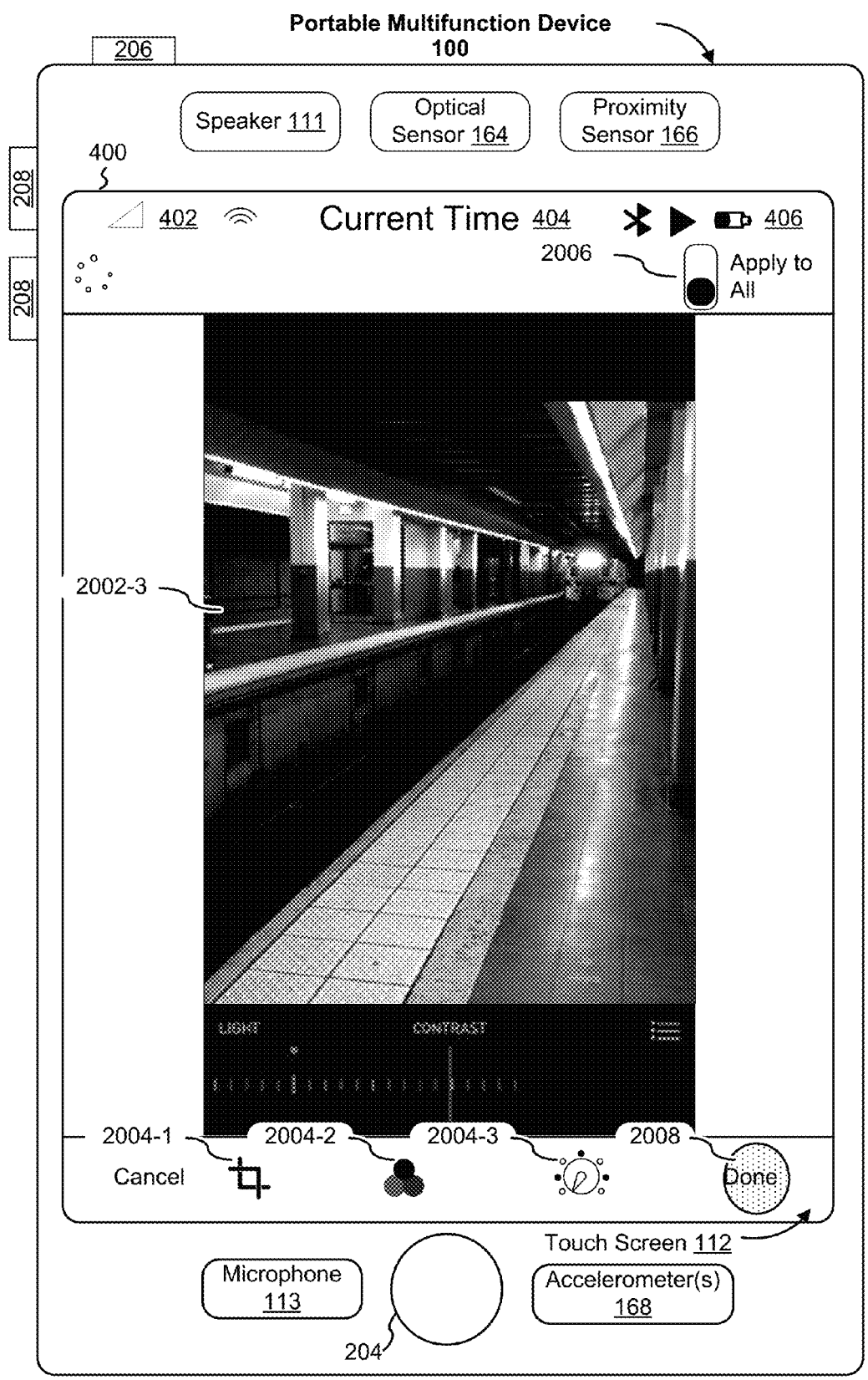

FIG. 20B illustrates device 100 displaying representative image 2002-3 on the display while device 100 is in a photo editing user interface. The photo editing user interface includes affordances 2004 for editing representative image 2002-3 (e.g., crop affordance 2004-1; filter affordance 2004-

2; lighting affordance 2004-3). In this example, it is assumed that the user has already selected lighting affordance 2004-3 and has modified the contrast of representative image 2002-3 (representative image 2002-3, as shown in FIG. 20B has had its contrast increased as compared to representative image 2002-3 as shown in FIG. 20A).

The photo editing user interface also includes an affordance 2006 (e.g., a toggle switch) for toggling between a first editing mode (e.g., an apply-to-all editing mode) and a second editing mode (e.g., a single image editing mode). In FIG. 20B, toggle switch 2006 is set to the second editing mode, so that when device 100 detects user input 2008 (e.g., an input to modify the representative image), device 100 modifies representative image 2002-3 without modifying the one or more images acquired by the camera after acquiring representative image 2002-3 (e.g., images 2002-4 and 2002-5), and without modifying the one or more images acquired by the camera before acquiring representative image 2002-3 (e.g., images 2002-1 and 2002-2).

Figure 20C:
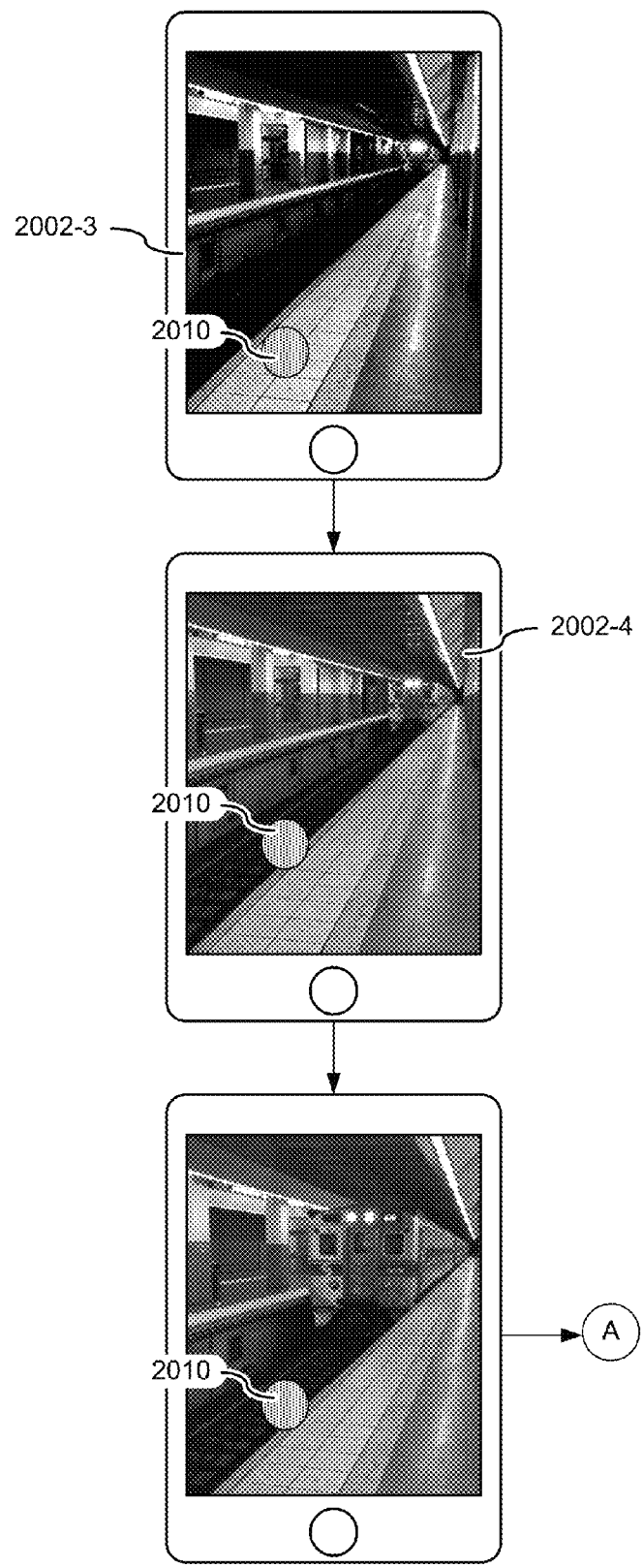
Figure 20D:
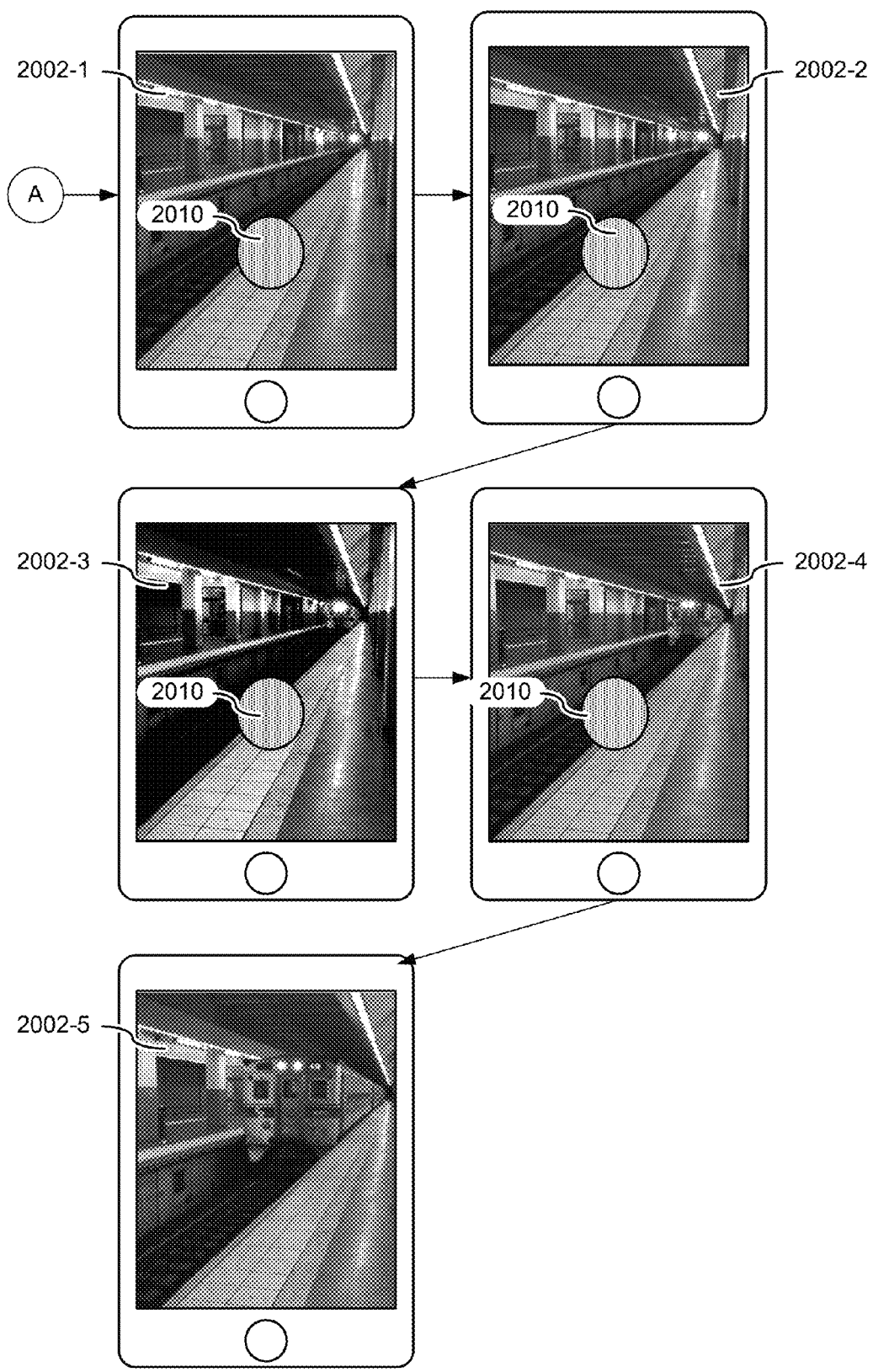
Figure 20E:
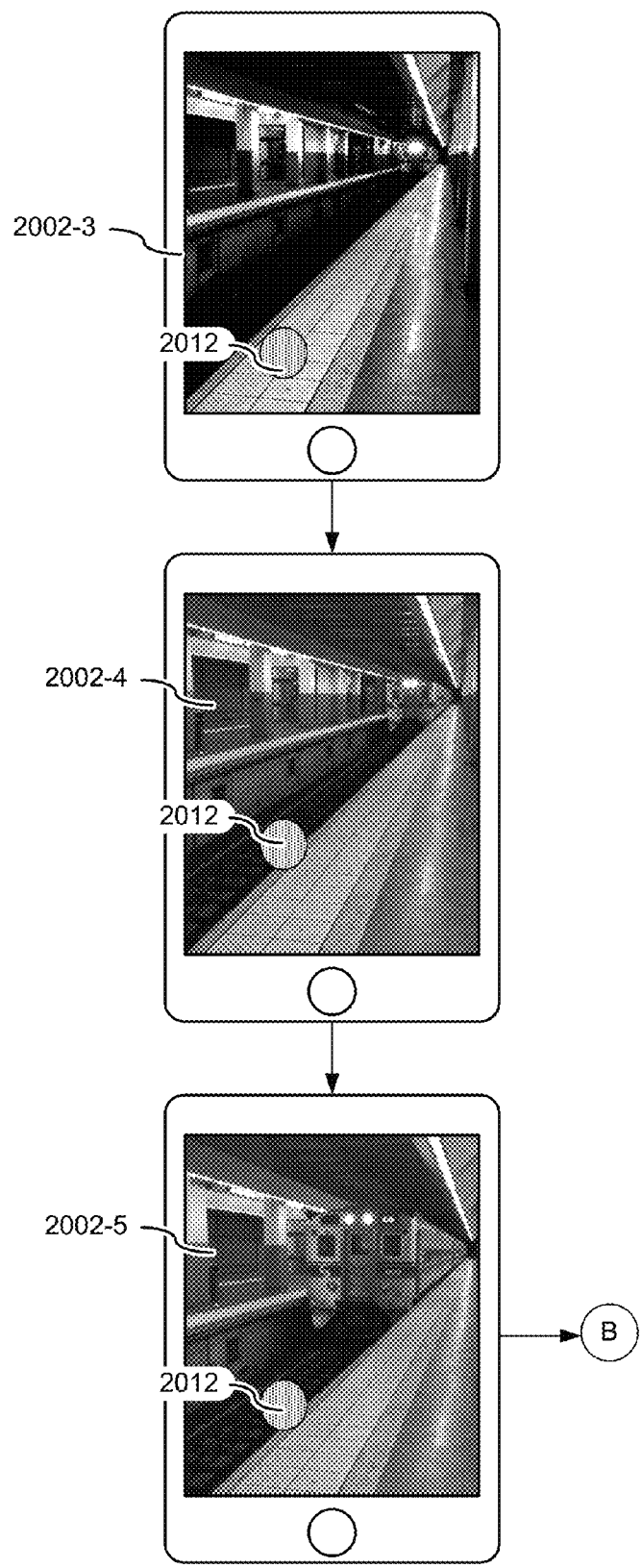
Figure 20F:
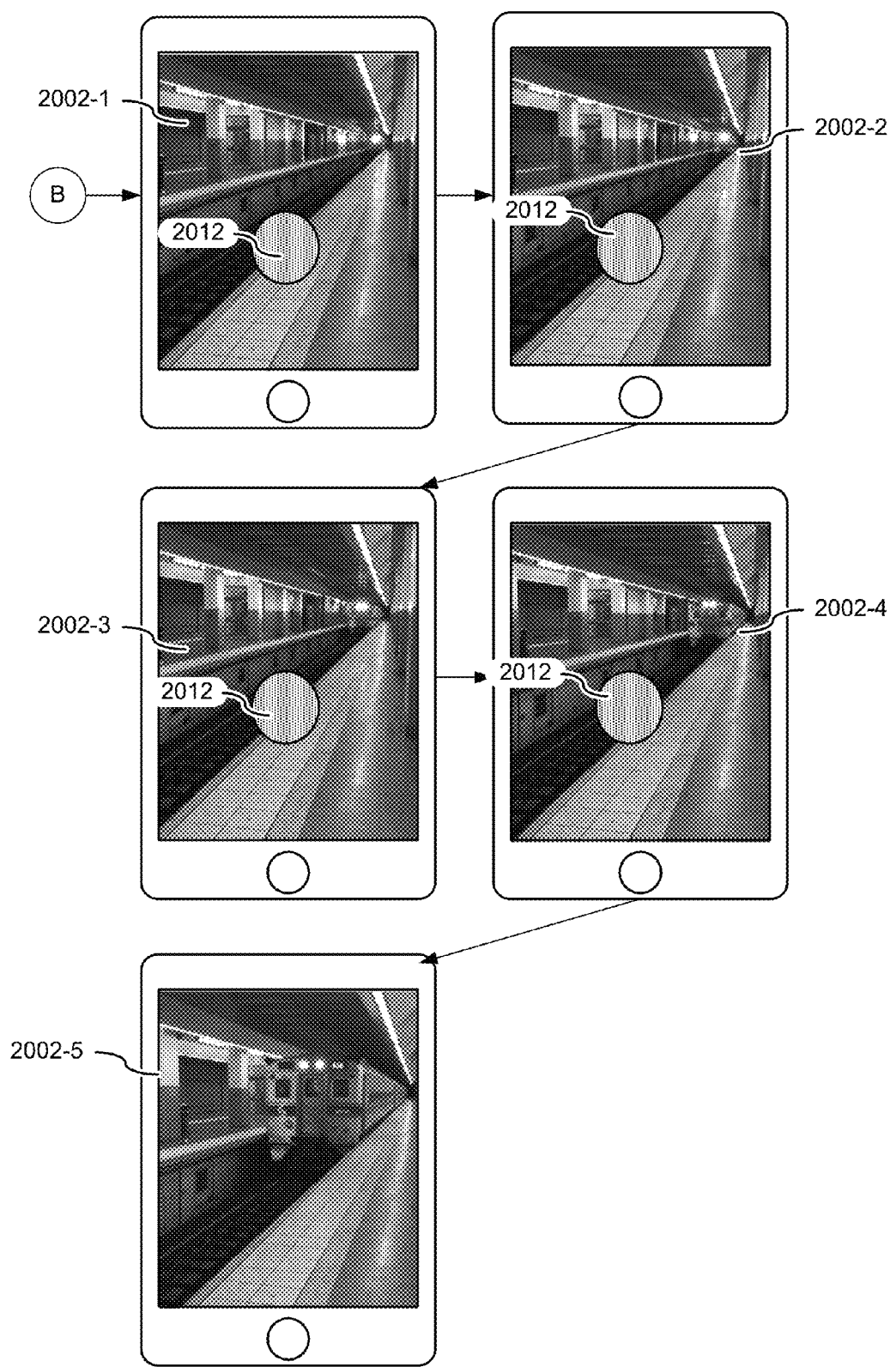
Figure 20G:
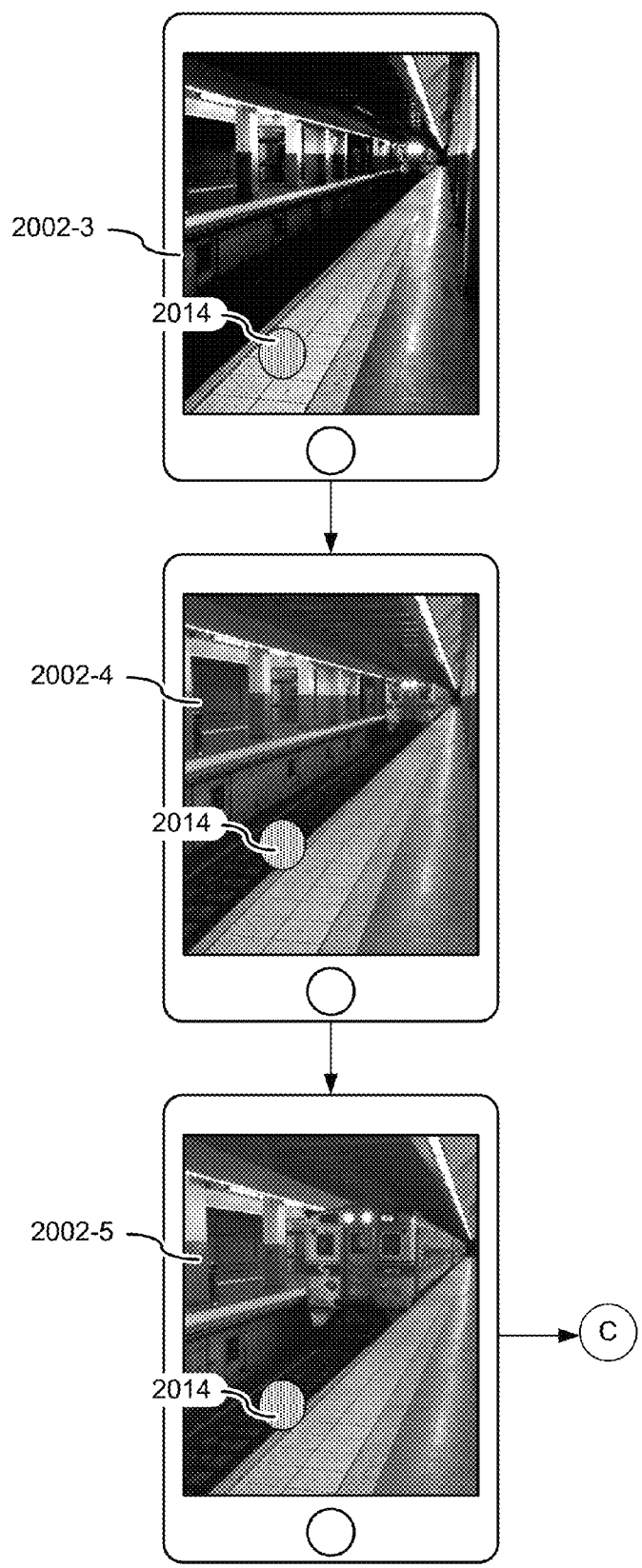
Figure 20H:
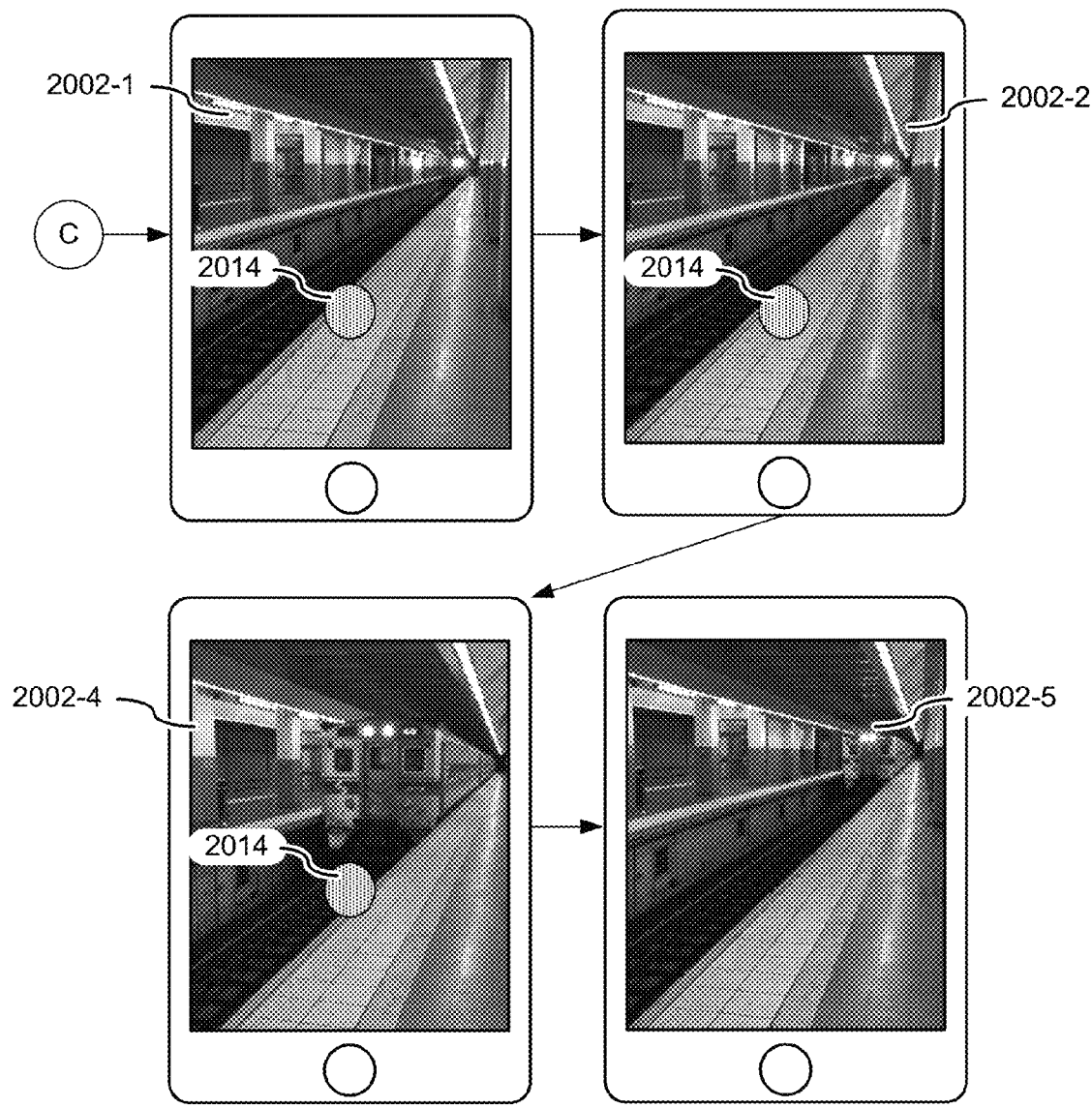
Figure 20I:
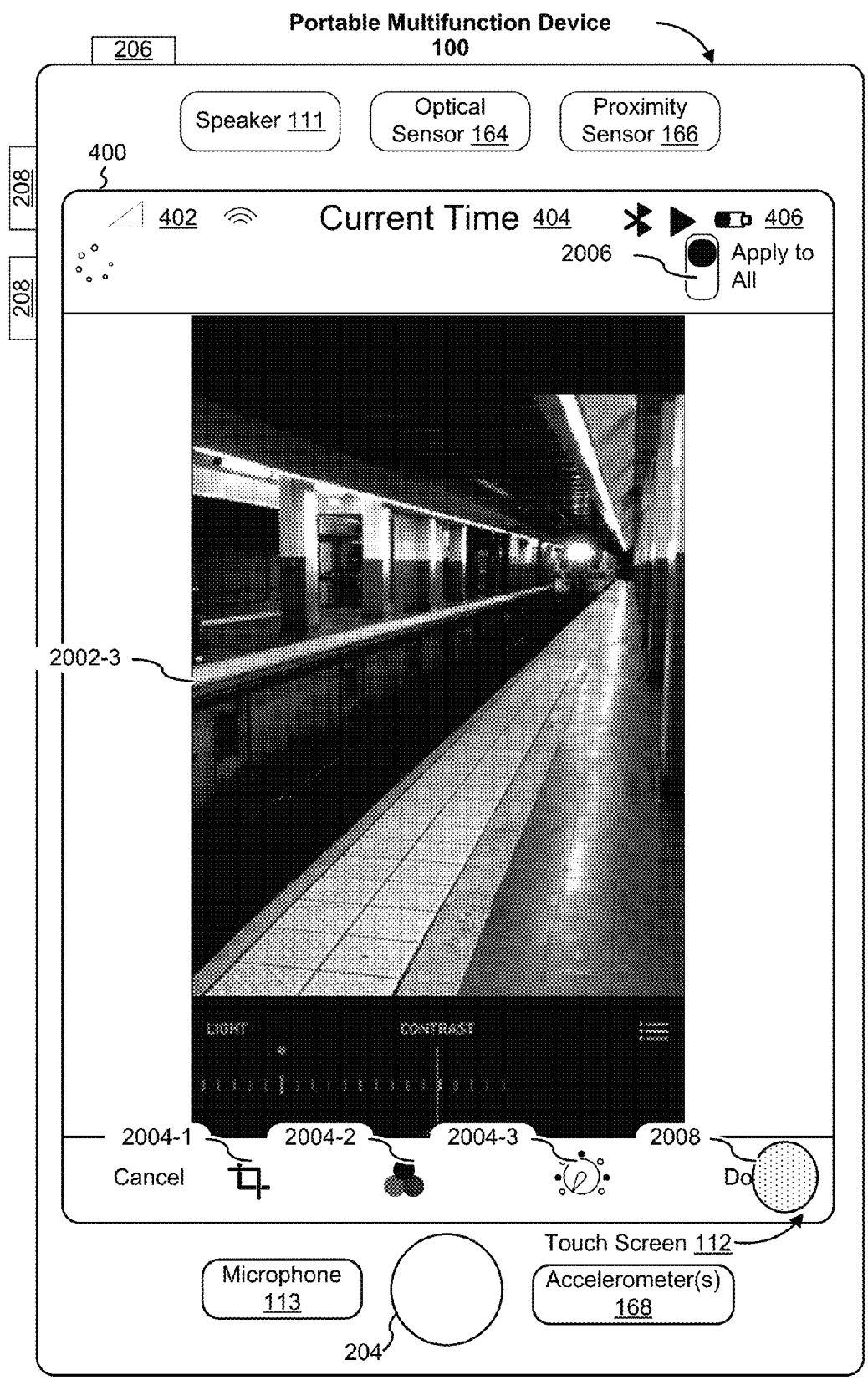

In contrast, in FIG. 20I, toggle switch 2006 is set to the first editing mode (e.g., the apply-to-all mode), so that when device 100 detects user input 2008, which applies the user's modifications, device 100 modifies representative image 2002-3, the one or more images acquired by the camera after acquiring representative image 2002-3 (e.g., images 2002-4 and 2002-5), and the one or more images acquired by the camera before acquiring representative image 2002-3 (e.g., images 2002-1 and 2002-2).

Returning to the example in which only representative image 2002-3 is modified (e.g., following from FIG. 20B), FIGS. 20C-20H illustrate various embodiments for playing back a sequence of images in which only the representative image has been modified.

In particular, as shown in FIGS. 20C-20D, in some embodiments, after modifying only representative image 2002-3, while displaying representative image 2002-3, device 100 receives a user input 2010 that is a request to playback sequence of images 2002. As shown in FIG. 20C, in response to a first portion of the user input 2010 to play back sequence of images 2002, device 100 replaces display of representative image 2002-3 with at least some of the images acquired after representative image 2002-3 (e.g., image 2002-4 and image 2002-5). As shown in FIG. 20D, in response to a second portion of the user input 2010 to play back sequence of images 2002, device 100 displays, in sequence, at least some of the one or more images acquired by the camera before acquiring representative image 2002-3 (e.g., image 2002-1 and image 2002-2), the modified representative image 2002-3, and at least some of the one or more images acquired by the camera after acquiring representative image 2002-3 (e.g., image 2002-4 and image 2002-5). That is, in some embodiments, representative image 2002-3 is included in playback in its modified form.

FIGS. 20E-20F illustrate another example in which, after modifying only representative image 2002-3, while displaying the modified representative image 2002-3, device 100 receives a user input 2012 that is a request to playback sequence of images 2002. As shown in FIG. 20E, in response to a first portion of the user input 2012 to play back sequence of images 2002, device 100 replaces display of representative image 2002-3 with at least some of the images acquired after representative image 2002-3 (e.g., image 2002-4 and image 2002-5). As shown in FIG. 20F, in response to a second portion of the user input 2012 to play back sequence of images 2002, device 100 displays, in sequence, at least some of the one or more images acquired by the camera before acquiring representative image 2002-3 (e.g., images 2002-1 and image 2002-2), representative image 2002-3 without modification, and at least some of the one or more images acquired by the camera after acquiring representative image 2002-3 (e.g., image 2002-4 and image 2002-5). That is, in some embodiments, representative image 2002-3 is reverted to its unmodified form for the purposes of playback.

FIGS. 20G-20H illustrate another example in which, after modifying only representative image 2002-3, while displaying the modified representative image 2002-3, device 100 receives a user input 2014 that is a request to playback sequence of images 2002. As shown in FIG. 20G, in response to a first portion of the user input 2014 to play back sequence of images 2002, device 100 replaces display of representative image 2002-3 with at least some of the images acquired after representative image 2002-3 (e.g., image 2002-4 and image 2002-5). As shown in FIG. 20H, in response to a second portion of the user input 2014 to play back sequence of images 2002, device 100 displays, in sequence, at least some of the one or more images acquired by the camera before acquiring representative image 2002-3 (e.g., image 2002-1 and image 2002-2) and at least some of the one or more images acquired by the camera after acquiring representative image 2002-3 (e.g., image 2002-4 and image 2002-5). That is, in some embodiments, representative image 2002-3, once modified, is omitted from playback altogether.

As noted above, in FIG. 20I, toggle switch 2006 is set to the first editing mode (e.g., the apply-to-all mode), so that when device 100 detects user input 2008, which applies the user's modifications, device 100 modifies representative image 2002-3, the one or more images acquired by the camera after acquiring representative image 2002-3 (e.g., images 2002-4 and 2002-5), and the one or more images acquired by the camera before acquiring representative image 2002-3 (e.g., images 2002-1 and 2002-2).

Figure 20J:
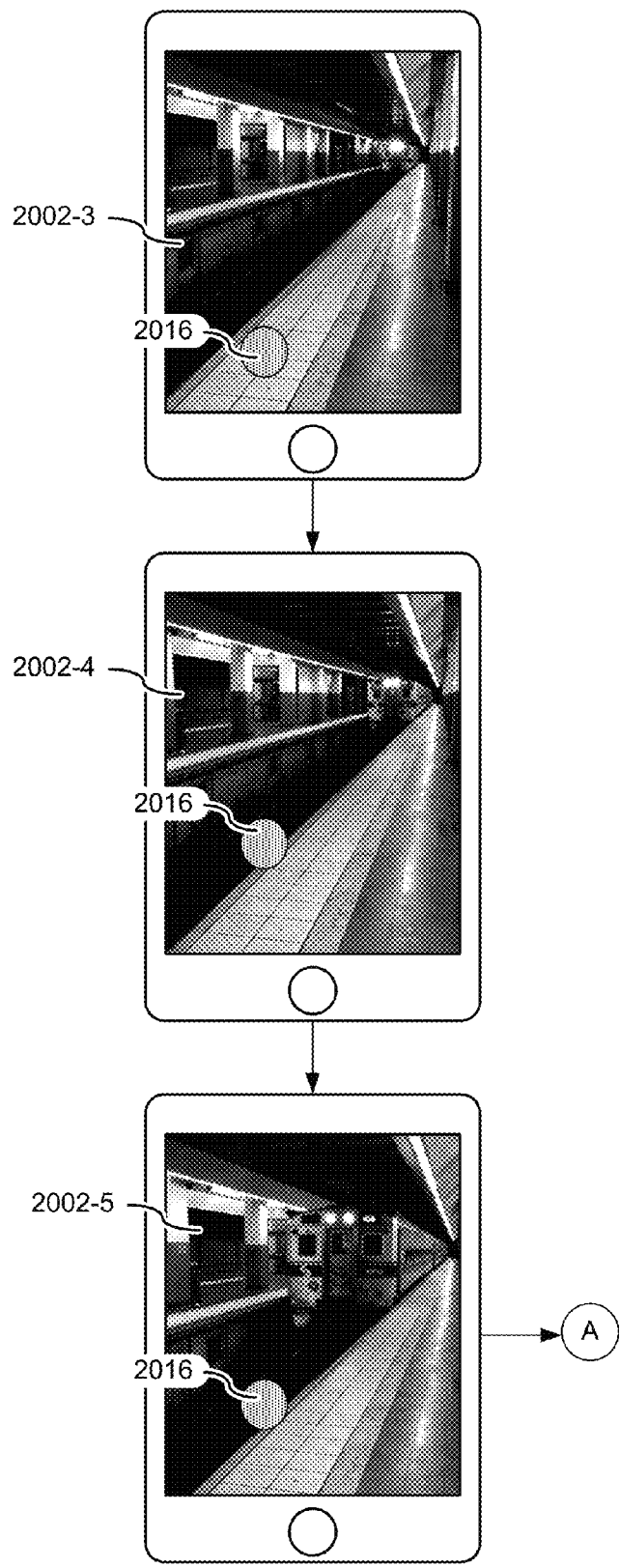
Figure 20K:
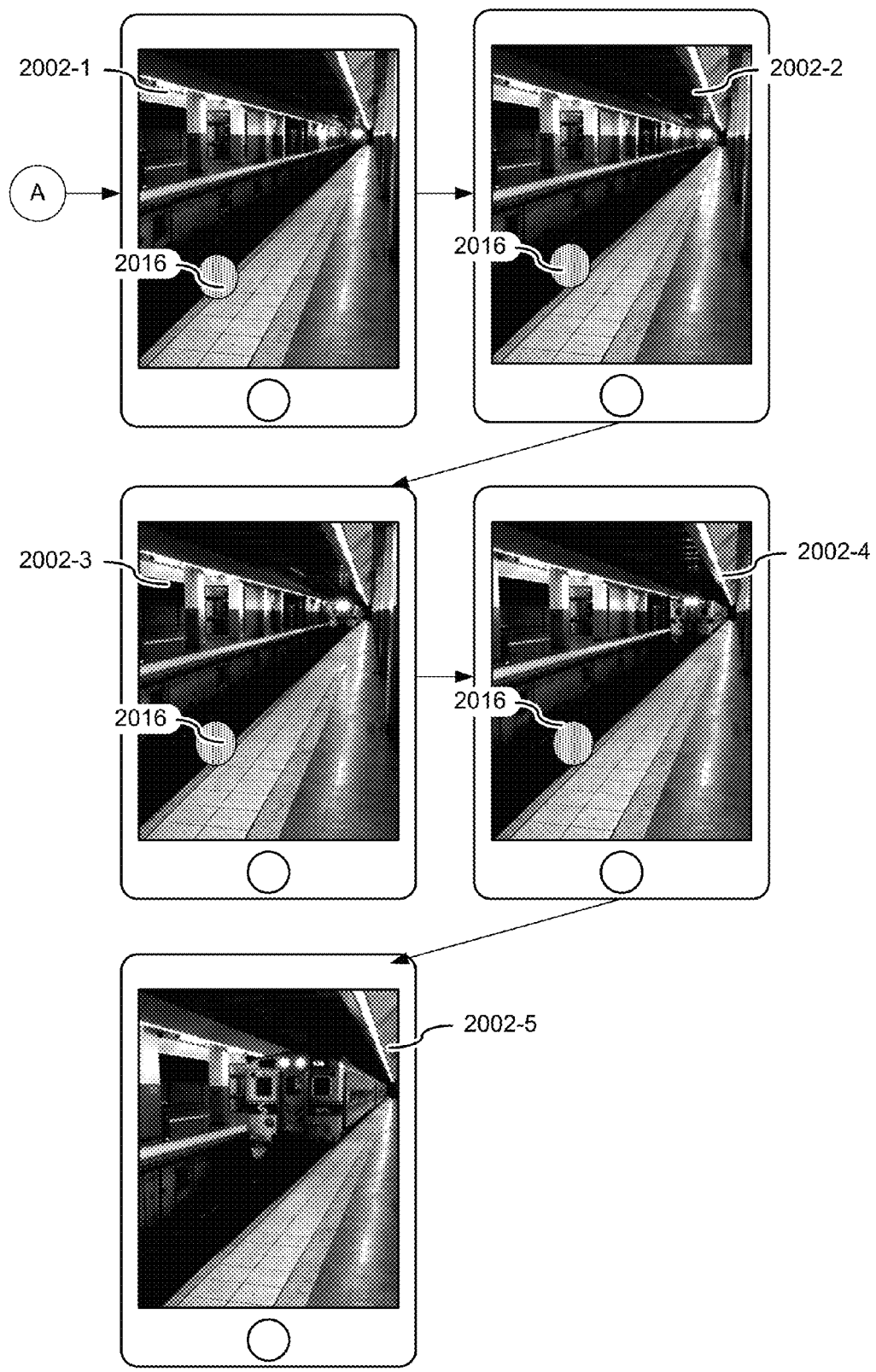

FIGS. 20J-20K illustrate play back of a sequence of images in which all of the images in the sequence of images have been modified, in accordance with some embodiments. While displaying the modified representative image 2002-3, after modifying representative image 2002-3, the one or more images acquired by the camera after acquiring representative image 2002-3 (e.g., images 2002-4 and 2002-5), and the one or more images acquired by the camera before acquiring representative image 2002-3 (e.g., images 2002-1 and 2002-2), device 100 receives a user input 2016 that is a request to playback sequence of images 2002. As shown in FIG. 20J, in response to a first portion of the user input 2016 to play back sequence of images 2002, device 100 replaces display of representative image 2002-3 with at least some of the modified images acquired after representative image 2002-3 (e.g., images 2002-4 and image 2002-5). As shown in FIG. 20K, in response to a second portion of the user input 2016 to play back sequence of images 2002, device 100 displays, in sequence, at least some of the one or more images acquired by the camera before acquiring representative image 2002-3 (e.g., images 2002-1 and image 2002-2) and at least some of the one or more images acquired by the camera after acquiring representative image 2002-3 (e.g., images 2002-4 and image 2002-5). That is, in some embodiments, when all of the images in a sequence of images are modified, device 100 plays the sequence of images with all images modified.

In some embodiments, rather than replace display of representative image 2002-3 with at least some of the images acquired after representative image 2002-3 (e.g., images 2002-4 and image 2002-5) in any of the examples above, device 100 replaces display of representative image 2002-3 with display of a respective image acquired before representative image 2002-3 (e.g., omits the playback shown in FIG. 20C, FIG. 20E, FIG. 20G and FIG. 20J). More generally, when only the representative image is modified in a sequence of images, any of the embodiments for play back of a sequence of image described elsewhere in this document (e.g., FIGS. 6A-6FF, FIGS. 7A-7CC, FIGS. 8A-8L, method 1000, method 1100, and/or method 1200) are optionally performed with the modified image omitted, reverted to its unmodified form, or included as-modified during playback. Likewise, when all of the images in a sequence of images are modified, any of the embodiments for play back of a sequence of image described elsewhere in this document (e.g., FIGS. 6A-6FF, FIGS. 7A-7CC, FIGS. 8A-8L, method 1000, method 1100, and/or method 1200) are optionally performed with the modified sequence of images.

Figure 20L:
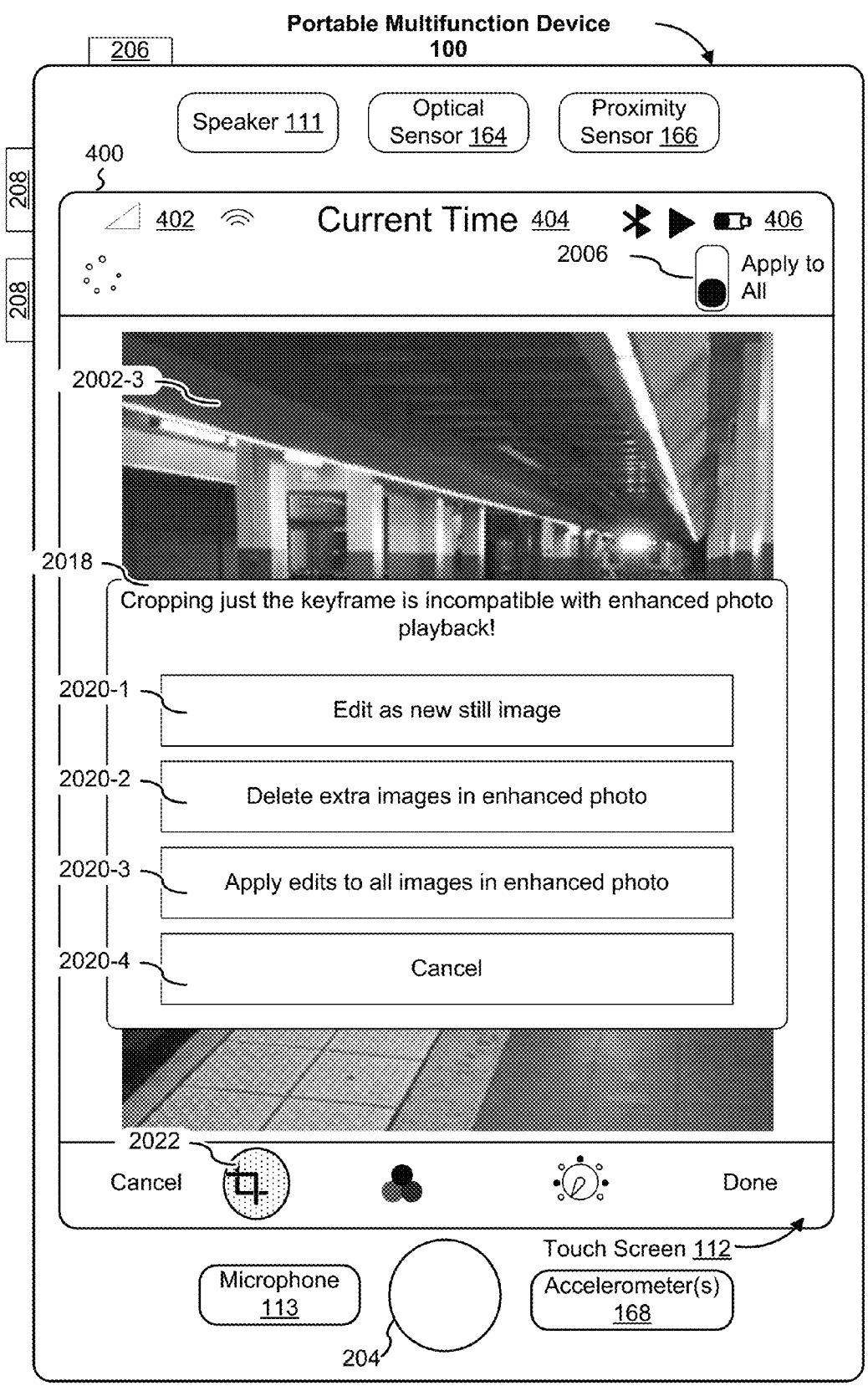

In some circumstances, modifying the representative image without modifying the additional images would result in a discontinuity when the enhanced photograph is played back. For example, as shown in FIG. 20L, in some embodiments, while toggle switch 2006 is set to "off," device 100 detects a user input 2022 to crop (e.g., or rotate) representative image 2002-3. However, when representative image 2002-3 is cropped/rotated, playing back the enhanced photo, as described above with reference to FIGS. 20C-20H would result in a "jump" when representative image 2002-3 is displayed. Thus, in some embodiments, when making certain modifications (e.g., cropping and/or rotating) to representative image 2002-3, without modifying the one or more images acquired by the camera after acquiring representative image 2002-3, and without modifying the one or more images acquired by the camera before acquiring representative image 2002-3, device 100 automatically turns off playback of the additional images, deletes the additional images, or causes the modified representative image to be saved to a new file as a still image. In some embodiments, device 100 provides a warning 2018 to the user. In some embodiments, device 100 provides options 2020 to the user. For example, device 100 provides the user with an option 2020-1 to save the edited image as a new still image; an option 2020-2 to delete the extra images in the sequence of images (e.g., the enhanced photo); and option 2020-3 to enter the apply-to-all editing mode, and an option 2020-4 to cancel.

FIGS. 21A-21J illustrate exemplary user interfaces for sending images from a sequence of images to a second electronic device, in accordance with some embodiments. The user interfaces in these figures are used to illustrate the processes described below, including the processes in FIGS. 9A-9G, 10A-10M, 11A-11I, 12A-12B, 24A-24E, 25A-25C, 26A-26D, and 27A-27E. Although the examples which follow will be given with reference to inputs on a touch-screen display (where the touch-sensitive surface and the display are combined), in some embodiments, device 100 detects inputs on a touch-sensitive surface 451 that is separate from the display 450, as shown in FIG. 4B.

Figure 21A:
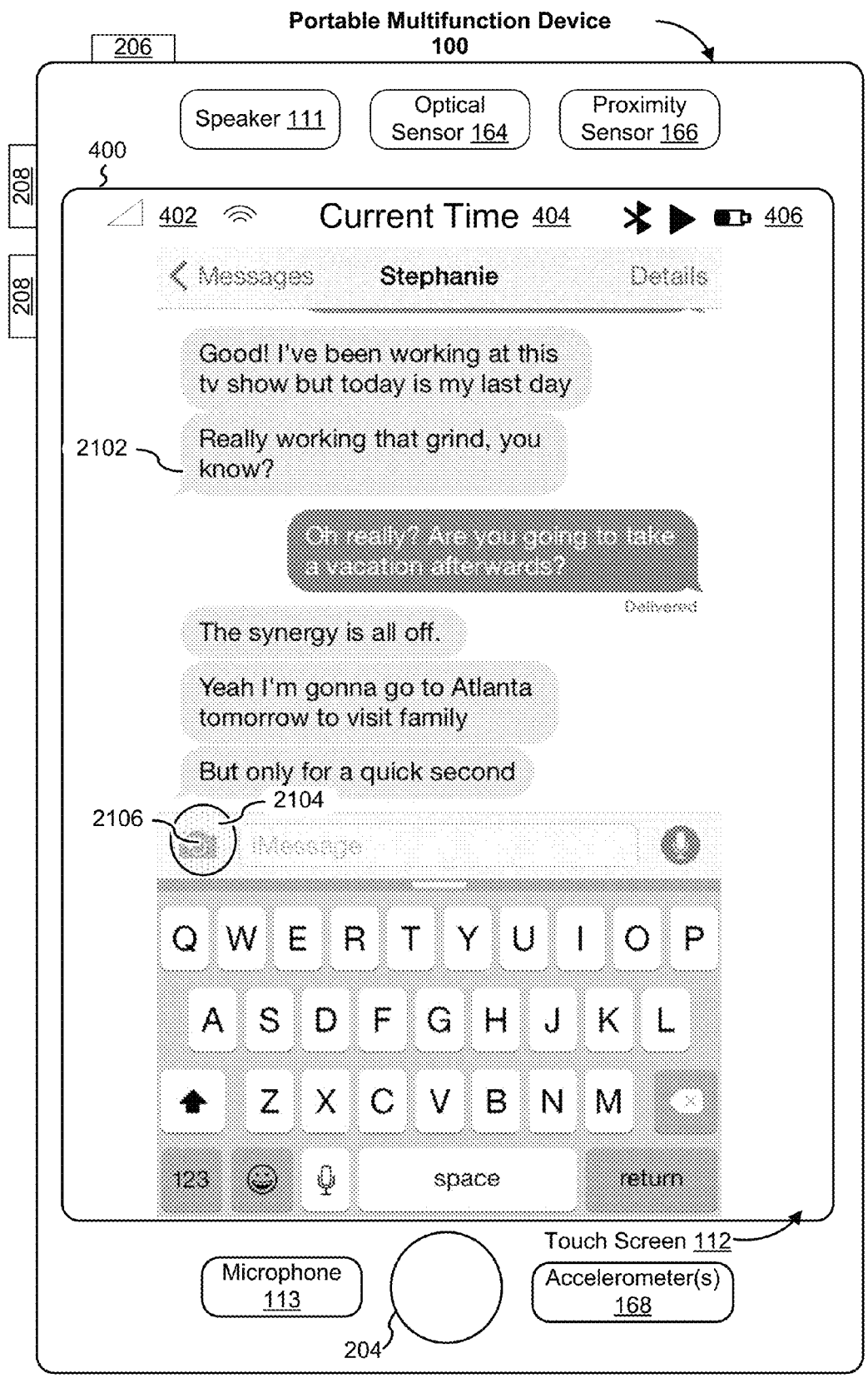
FIGS. 21A-21J illustrate exemplary user interfaces for sending images from a sequence of images to a second electronic device, in accordance with some embodiments.
Figure 21B:
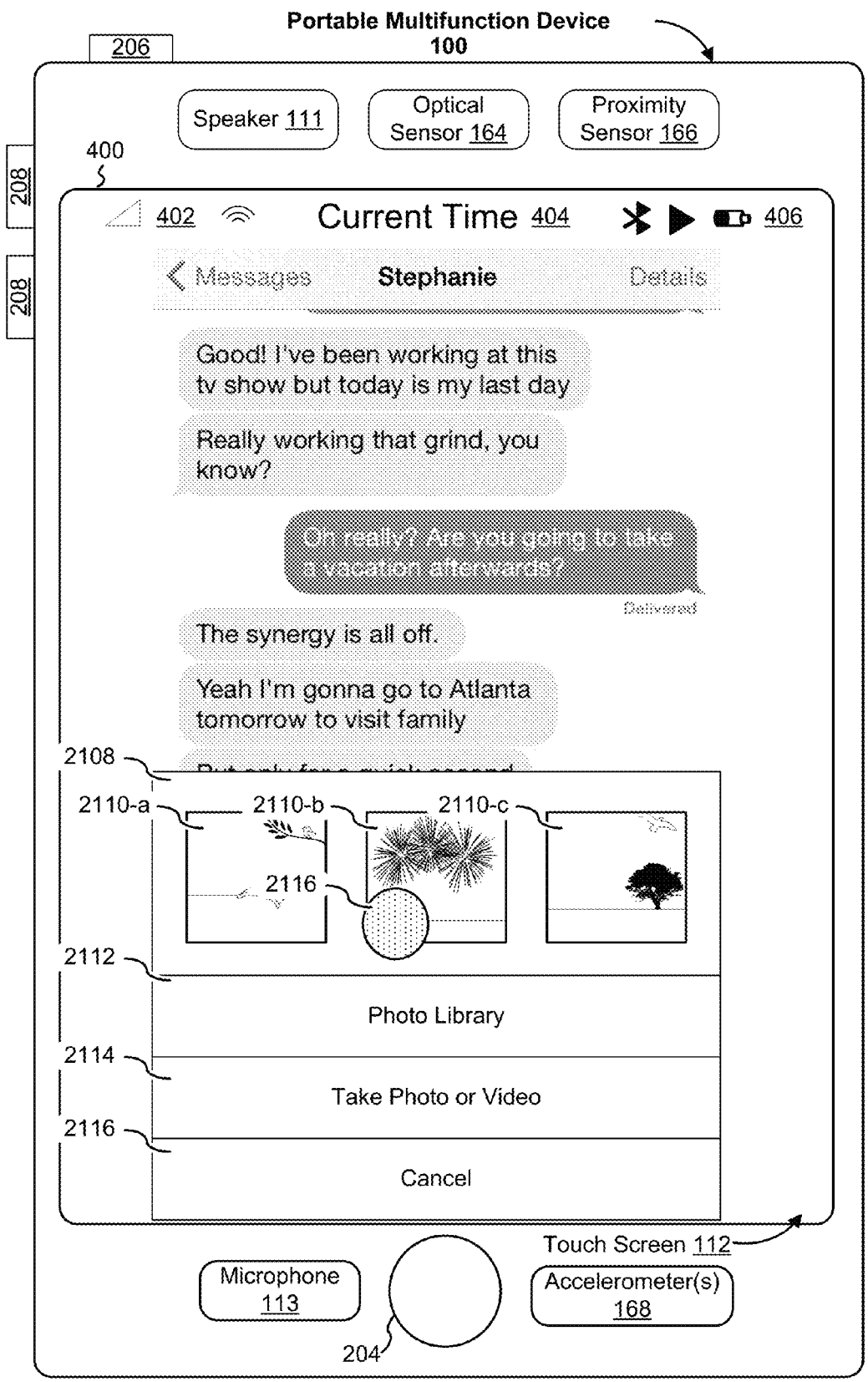
Figure 21C:
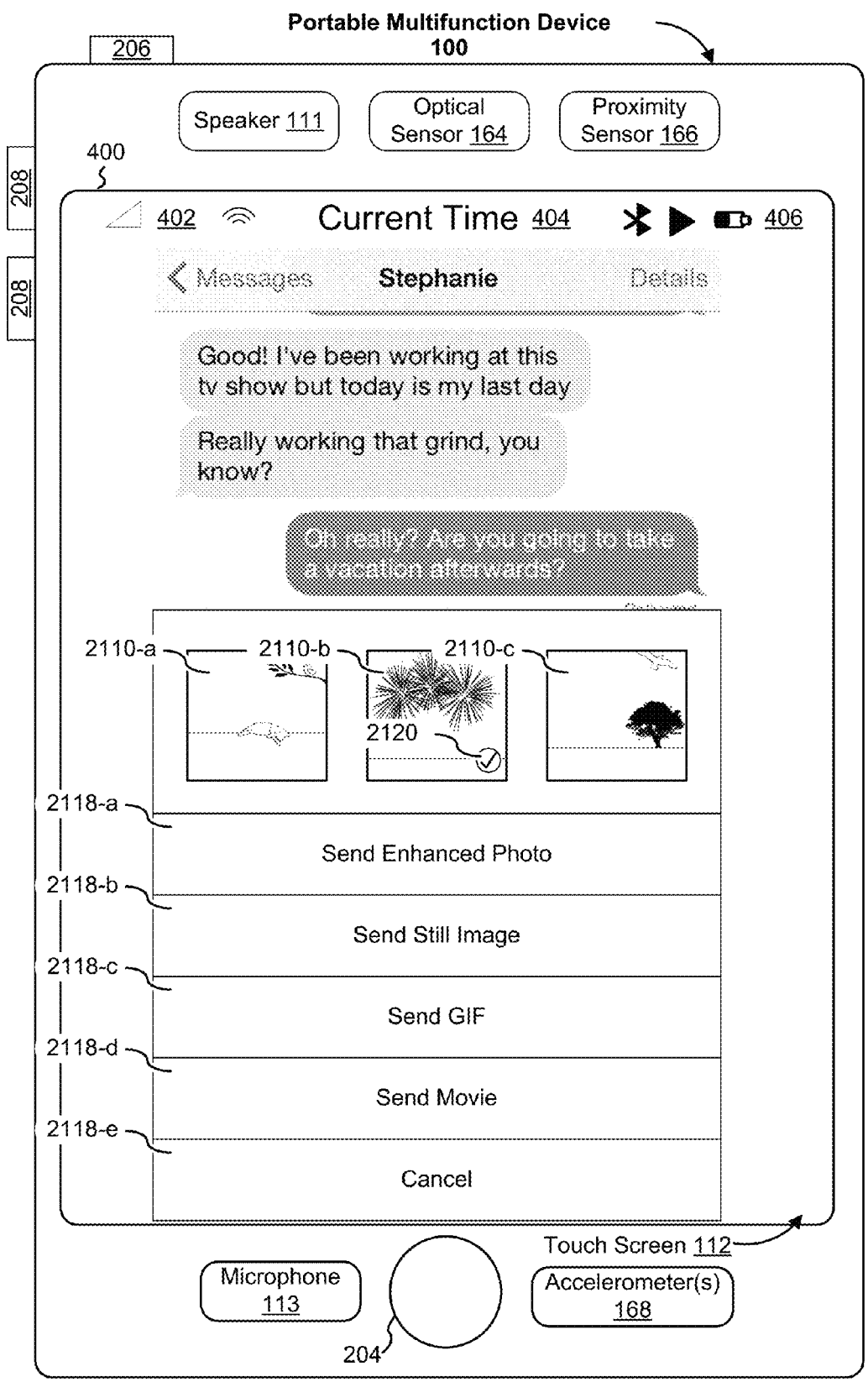
Figure 21D:
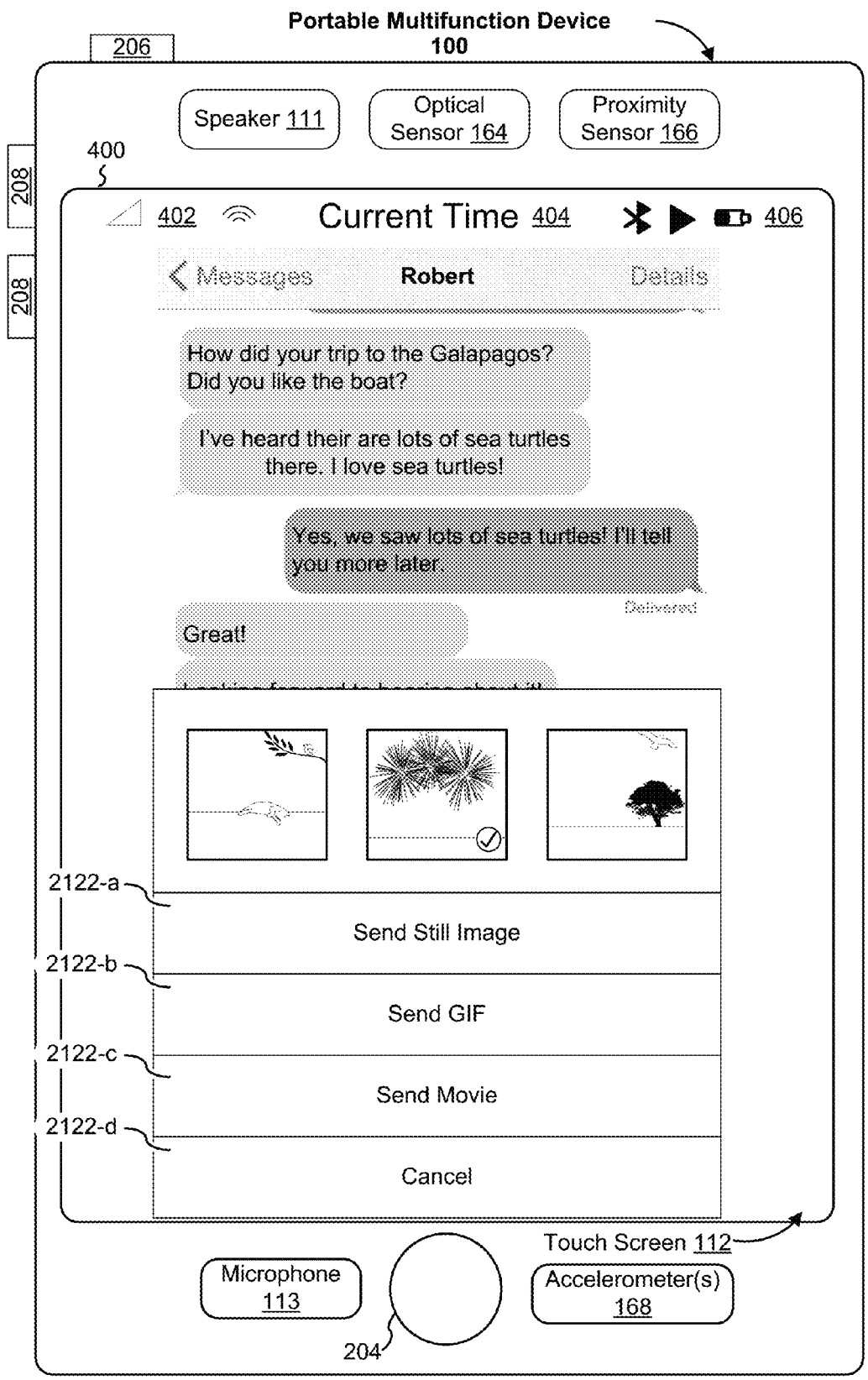

FIGS. 21A-21J illustrate two exemplary scenarios in which, while displaying a representative image from a sequence of images on the display, device 100 detects an input that corresponds to a request to send a representative image from a sequence of images or a request to select a representative image from a sequence of images for sending. When the second electronic device is configured to interact with the sequence of images as a group (e.g., the second electronic device is configured to perform the interactions described in FIGS. 6A-6FF, FIGS. 7A-7CC, and/or FIG. 8A-8L), device 100 displays a first set of options for sending at least a portion of the sequence of images to the second electronic device (e.g., as shown in FIG. 21C). Conversely, when the second electronic device is not configured to interact with the sequence of images as a group, device 100 displays a second set of options for sending at least a portion of the sequence of images to the second electronic device (e.g., as shown in FIG. 21D).

FIGS. 21A-21D illustrate a scenario in which options for sending a representative image from a sequence of images are provided in response to a user request to select the representative image for sending. FIG. 21A illustrates a conversation on device 100 (e.g., a conversation in a messaging application/messaging user interface 2102). The conversation is with a user (Stephanie) of a second electronic device. In some embodiments, when the user of device 100 requests to select the representative image for sending, the destination of the representative image (e.g., the second electronic device) is known to device 100, because the process of requesting the representative image for sending originates from within a conversation with the second device.

To that end, as shown in FIG. 21A, device 100 detects a user input 2104 (e.g., a tap gesture) that selects an affordance 2106 for adding media (e.g., adding a still photo, an enhanced photo, a video, or any other type of media) to the conversation.

FIG. 21B illustrates that, in response to user input 2104 (FIG. 21A), device provides a user interface 2108 that provides the user with options for selecting a photo to send to the user of the second electronic device. User interface 2108 includes a region with selectable images 2110 (e.g., image 2110-a through image 2110-c). In some embodiments, the selectable images 2110 are representations of recent photos (e.g., the most recent three or five photos). User interface 2108 includes an option 2112 for selecting a photo from the user's photo library, an option 2114 for taking a photo or video (e.g., with a camera integrated into device 100), and an option 2116 for cancelling adding media.

In this example, device 100 detects a user input 2116 that is a request to select image 2110-b for sending to the user of the second device. For the purposes of explanation, in this example, image 2110-b is a representative image from a sequence of images (e.g., a representative image from an enhanced photo) that includes images acquired before representative image 2110-b and/or images acquired after representative image 2110-b.

As shown in FIG. 21C, because Stephanie's device (the second electronic device) is configured to interact with the sequence of images as a group, device 100 displays a first set of options 2118 for sending at least a portion of the sequence of images to the second electronic device. In some embodiments, first set of options 2118 includes: an option 2118-a to send the entire sequence of images (e.g., send the enhanced photo); an option 2118-b for sending the representative image without sending the images acquired before representative image 2110-b and without sending images acquired after representative image 2110-b (e.g., sending only representative image 2110-b as a still image); an option 2118-c for converting at least the portion of the sequence of images to an animated image format (e.g., a GIF format); an option 2118-d for converting at least the portion of the sequence of images to a video format (e.g., an MPEG format); and an option 2118-e to cancel. Device 100 also displays an indication 2120 that image 2110-*b* has been selected for sending to the second electronic device.

In contrast, FIG. 21D illustrates a second set of options 2122 for sending at least a portion of the sequence of images to the second electronic device. Second set of options 2122 is displayed because, in this example, the second electronic device (e.g., Robert's device) is not configured to interact with the sequence of images as a group. The process of reaching the second set of options 2122 is analogous to the process of reaching the first set of options 2118, described with reference to FIGS. 21A-21C. That is, in some embodiments, second set of options 2122 is displayed after the user of device 100 selects, while in a conversation with Robert, an affordance for adding media to the conversation (e.g., affordance 2106, FIG. 21A), then selects a representative image from a sequence of images for sending to Robert's device (e.g., selects image 2110-*b* with a user input analogous to input 2116).

Second set of options 2122 includes: an option 2122-*a* for sending the representative image without sending the images acquired before representative image 2110-*b* and without sending the images acquired after representative image 2110-*b* (e.g., sending only representative image 2110-*b* as a still image); an option 2122-*b* for converting at least the portion of the sequence of images to an animated image format (e.g., a GIF format); an option 2122-*c* for converting at least the portion of the sequence of images to a video format (e.g., an MPEG format); and an option 2122-*d* to cancel. Device 100 also displays an indication 2120 that image 2110-*b* has been selected for sending to the second electronic device. In some embodiments, second set of options 2122 does not include an option to send the entire sequence of images (e.g., send the enhanced photo) because Robert's device is not configured to interact with the entire sequence of images as a group.

Figure 21E:
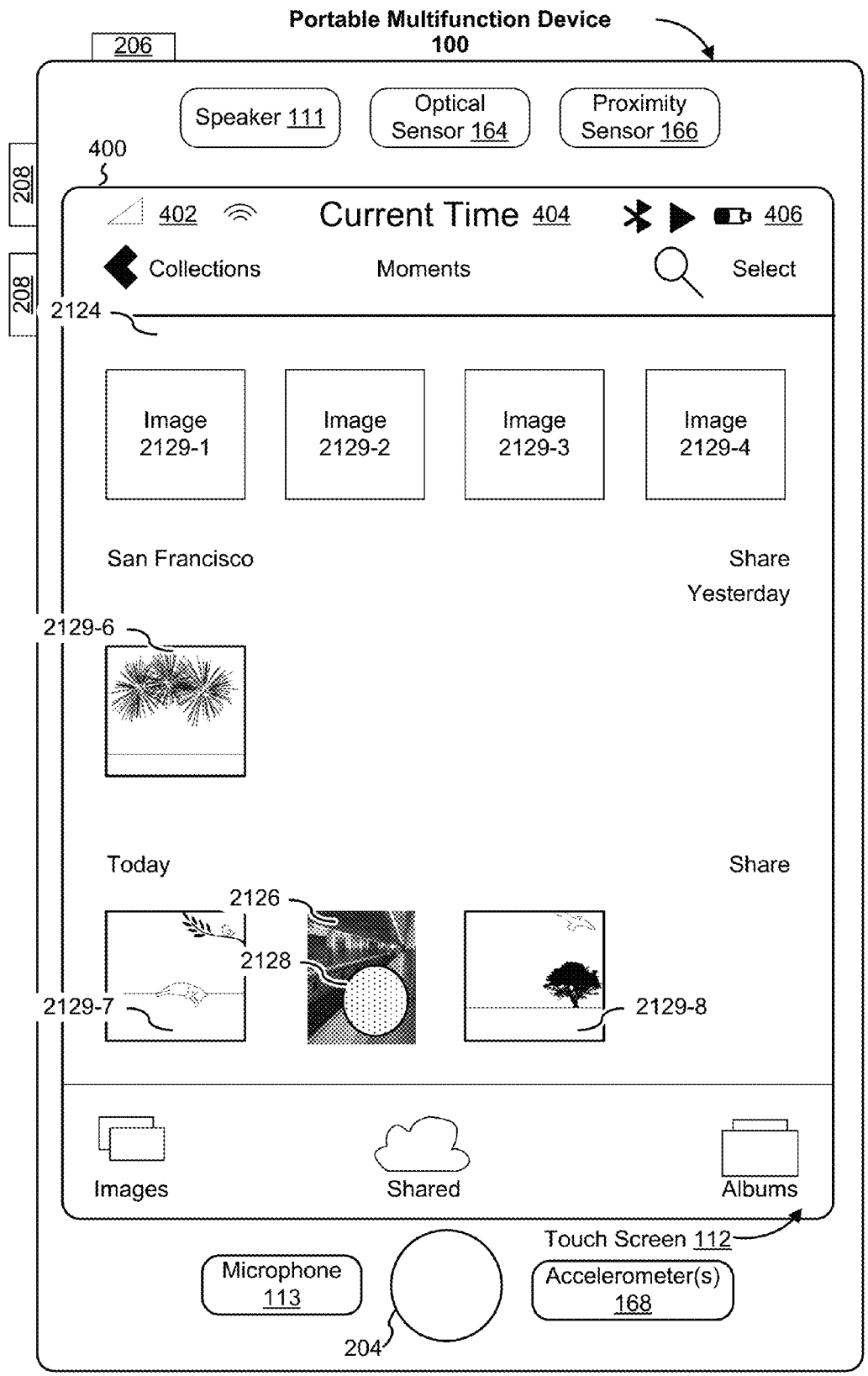

FIGS. 21E-21J illustrate a scenario in which options for sending a representative image from a sequence of images are provided in response to a user request to send the representative image. FIG. 21E illustrates a camera roll user interface 2124 on device 100. Camera roll user interface 2124 displays image 2126 and other images 2129 (e.g., image 2129-1 through image 2129-8), which are optionally representations of photos, enhanced photos, or movies. In this example, it is assumed that the user of device 100 has not navigated to camera roll user interface 2124 from within a conversation (e.g., has navigated to user interface 2124 from a home screen). Thus, in the example shown in FIGS. 21E-21J, when the user selects image 2126 (e.g., via user input 2128, FIG. 21E), or requests to share image 2126 (e.g., via user input 2132, FIG. 21F), the destination of the representative image (e.g., the second electronic device) is not yet known to device 100. Thus, device 100 cannot yet display different first options or second options depending on whether the receiving second electronic device is configured to interact with the sequence of images as a group. Instead, as described below, the first options or second options are displayed when the user requests to send the image, once the destination is known.

To that end, FIG. 21E illustrates a user input 2128 selecting image 2126 from within camera roll user interface 2124. In this example, image 2126 is assumed to be a representative image from a sequence of images.

Figure 21F:
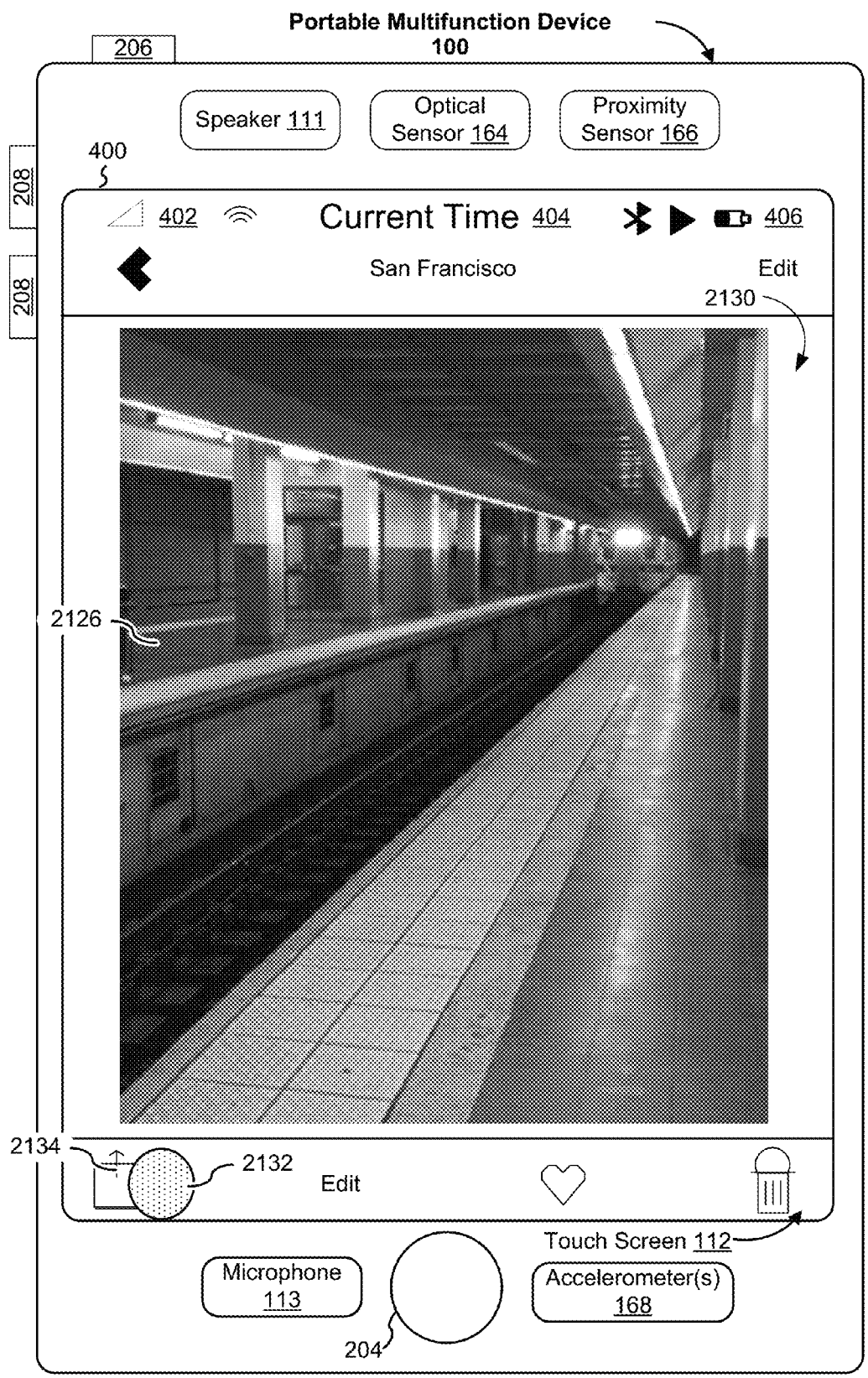

As shown in FIG. 21F, in response to user input 2128, device 100 displays image 2126 in an image viewing user interface 2130. FIG. 21F also illustrates a user input 2132 that requests to share image 2126 (e.g., by selecting a share affordance 2134).

Figure 21G:
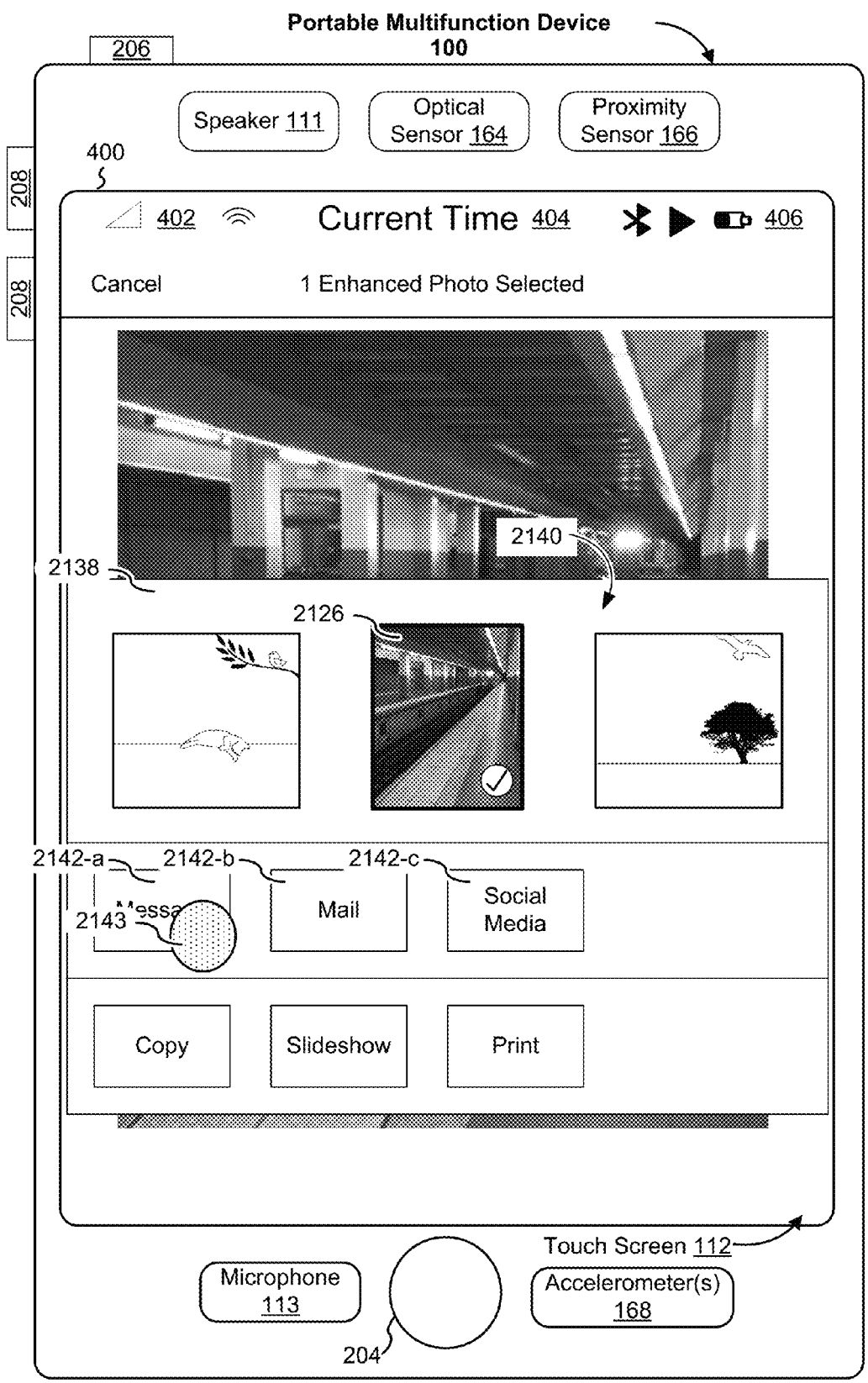

As shown in FIG. 21G, in response to user input 2132, device 100 displays a sharing user interface 2138. Since sharing user interface 2138 was displayed in response to the request to share image 2126, image 2126 is pre-selected in a region 2140 of the sharing user interface 2138, which shows a few images (e.g., three images, five images, etc.) that were acquired in temporal proximity to image 2126. Sharing user interface also includes protocol-based sharing options for selecting a protocol through which to share image 2126, including a message-protocol sharing option 2142-*a*, a mail-protocol sharing option 2142-*b*, and a social media-protocol sharing option 2142-*c*. In FIG. 21G, the user selects message-protocol sharing option 2142-*a* (via user input 2143), which brings up a conversation user interface 2144 shown in FIG. 21H.

In this example, when conversation user interface 2144 (FIG. 21H) is initially displayed, destination field 2146 is empty because the user of device 100 has not yet specified the destination of image 2126 (e.g., device 100 brings up a message with an empty destination field 2146 and image 2126 automatically inserted into body 2148 of the message). Thus, in this example, it is assumed that the user of device 100 has manually entered "Stephanie Levin" as the destination in conversation user interface 2144 in FIG. 21H. The user has also typed a short message 2150, "Check out this train."

Figure 21H:
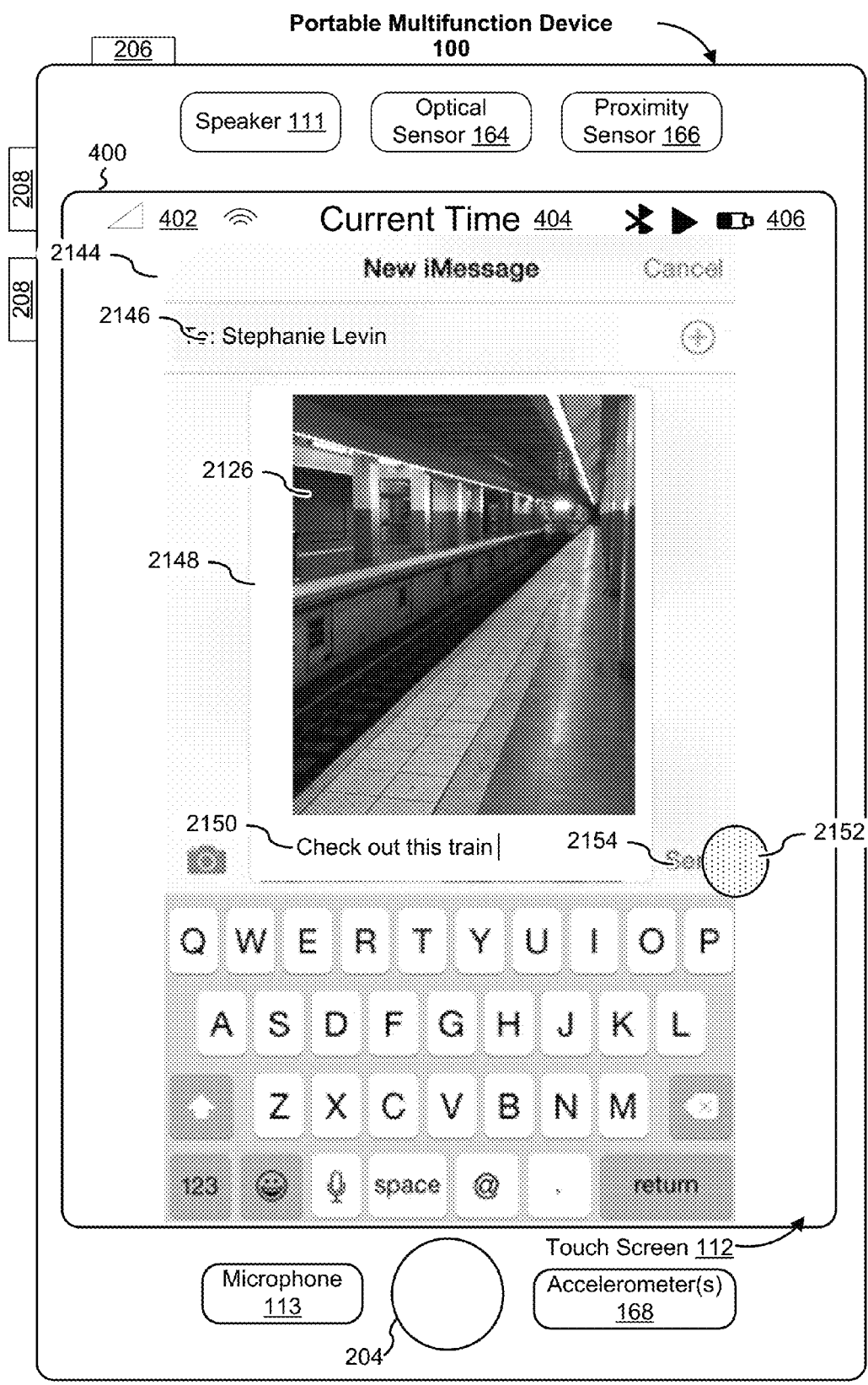

As also shown in FIG. 21H, the user selects (via user input 2152) send button 2154, requesting to send image 2126 as well as the rest of the message.

Figure 21I:
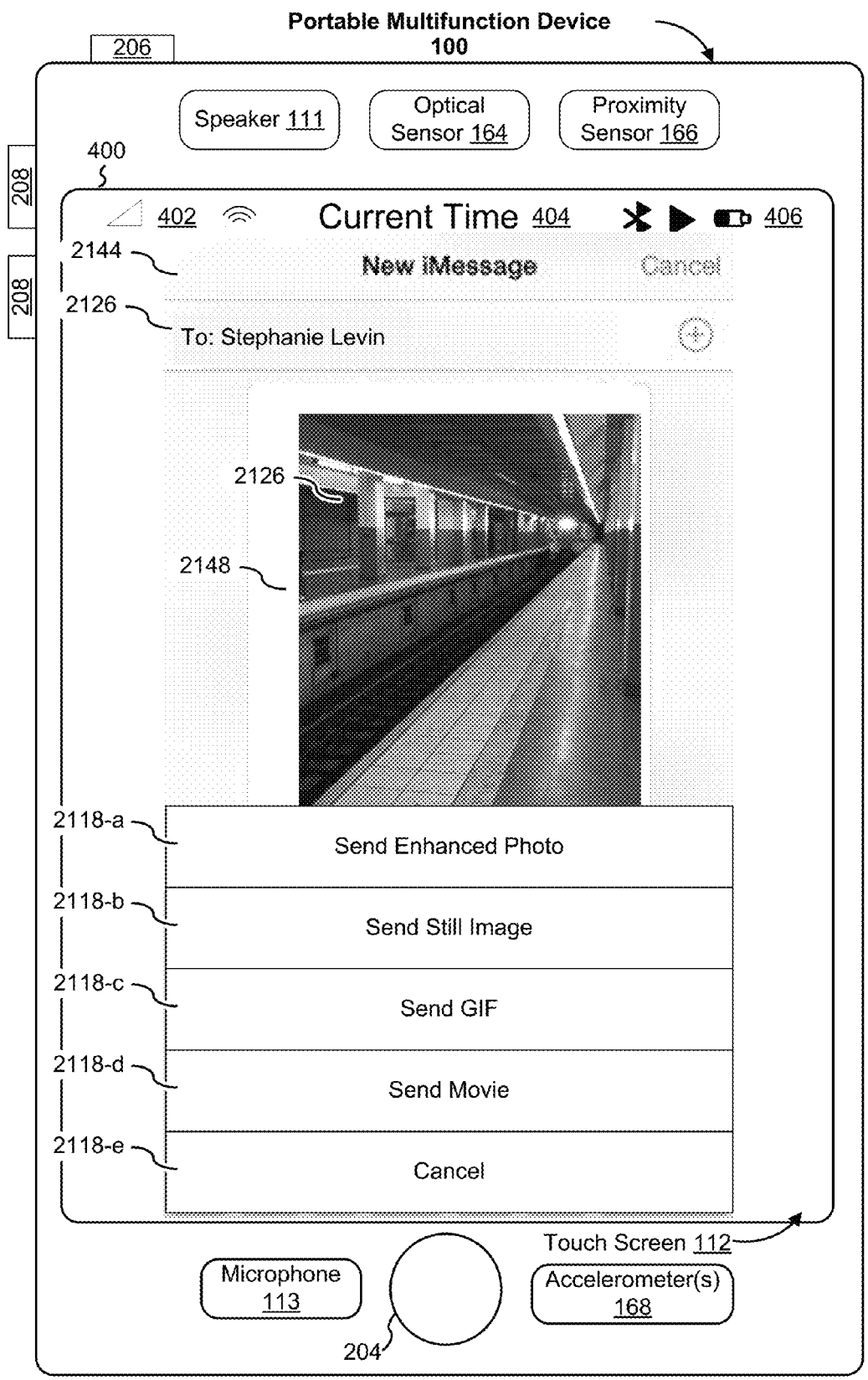

As shown in FIG. 21I, in response to user input 2152, because Stephanie Levin's device (the second electronic device) is configured to interact with the sequence of images as a group, device 100 displays first set of options 2118 for sending at least a portion of the sequence of images to the second electronic device (described above with reference to FIG. 21C).

Figure 21J:
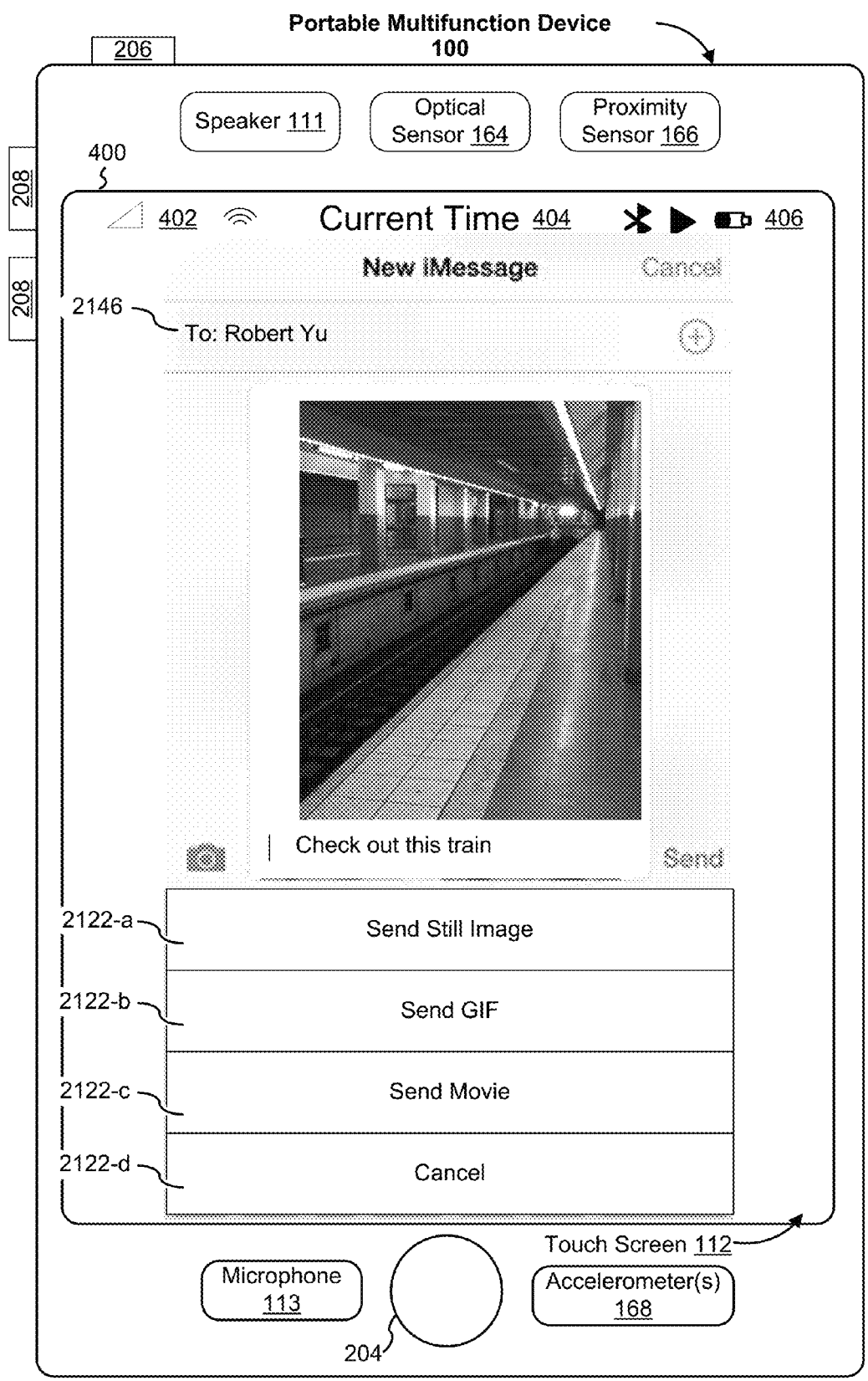

In contrast, FIG. 21J illustrates second set of options 2122 for sending at least a portion of the sequence of images to the second electronic device. Second set of options 2122 is displayed because, in this example, the second electronic device (e.g., Robert Yu's device) is not configured to interact with the sequence of images as a group. The process of reaching the second set of options 2122 is analogous to the process of reaching the first set of options 2118, described with reference to FIGS. 21E-21H. That is, in some embodiments, second set of options 2122 is displayed when the user of device 100 enters Robert Yu as the destination 2146 instead of Stephanie Levin in FIG. 21H and then presses send.

FIGS. 22A-22D illustrate exemplary user interfaces for acquiring photos (e.g., enhanced photos or still photos) using scene recognition, in accordance with some embodiments. The user interfaces in these figures are used to illustrate the processes described below, including the processes in FIGS. 9A-9G, 10A-10M, 11A-11I, 12A-12B, 24A-24E, 25A-25C, 26A-26D, and 27A-27E. Although the examples which follow will be given with reference to inputs on a touch-screen display (where the touch-sensitive surface and the display are combined), in some embodiments, device 100 detects inputs on a touch-sensitive surface 451 that is separate from the display 450, as shown in FIG. 4B.

Some scenes, more than others, are conducive to being captured as a sequence of images (e.g., an enhanced photo). For example, people often use the same portable multifunction device to capture important moments (e.g., a picture of their children smiling at the beach) and to capture more mundane images, such as taking a picture of a receipt for documentation purposes. In accordance with some embodiments, FIGS. 22A-22D illustrate user interfaces for devices that automatically determine, via scene recognition, whether to capture a sequence of images (e.g., in the case of smiling children) or a still image (in the case of a receipt). For example, when the scene meets action capture criteria (e.g., criteria concerning activity in a scene), the device retains a sequence of images in response to activation of a shutter button, including images acquired before activation of the shutter button and images acquired after activation of the shutter button. Conversely, when the scene does not meet the action capture criteria, the device retains a single image (e.g., analogous to a single image acquired in response to activation of a shutter in a conventional camera).

Figure 22A:
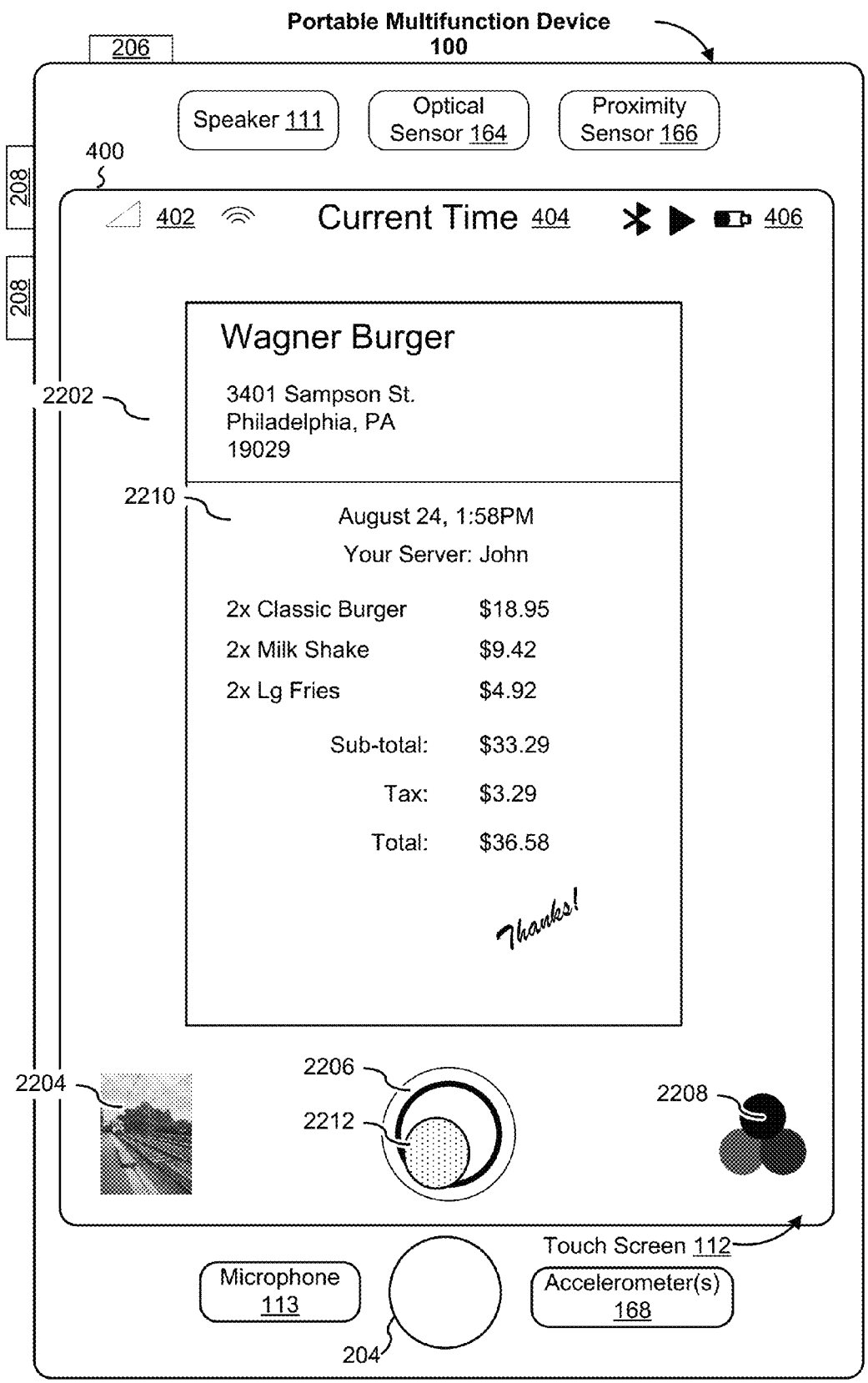
FIGS. 22A-22D illustrate exemplary user interfaces for acquiring photos (e.g., enhanced photos or still photos) using scene recognition, in accordance with some embodiments.

In FIG. 22A, device 100 is in a media acquisition mode (e.g., a photo acquisition mode or an auto still/enhanced photo acquisition mode). While device 100 is in the media acquisition mode, device 100 displays an image capture user interface 2202 that includes a live preview 2210 of a scene detected by a camera (e.g., the camera is integrated into device 100). Image capture user interface 2202 also includes an affordance 2204 for navigating to a camera roll (e.g., affordance 2204 displays a miniature representation of the last photo/video acquired by the camera); a virtual shutter button 2206; and an affordance 2208 for applying filters to the live preview of the scene (e.g., a sepia filter).

While device 100 is in the media acquisition mode, device 100 performs scene recognition on the scene. For example, in some embodiments, the scene recognition includes detecting text, detecting movement, detecting people's faces, and/or detecting movement of device 100 (e.g., when the user is planning to track a target). In FIG. 22A, device 100 recognizes, using the scene recognition, that the scene is mostly text (e.g., the scene is of a receipt). In some embodiments, device 100 recognizes that the scene is mostly text by recognizing that the scene includes more than a threshold amount of text. In some embodiments, when device 100 recognizes that the scene is mostly text, the action capture criteria are not met. For example, since is it unlikely that the user wants to capture the moments surrounding a receipt lying on a table, in response to activation of shutter button 2206, device 100 retains a single image 2214 (shown in FIG. 22B in an image view mode).

Figure 22B:
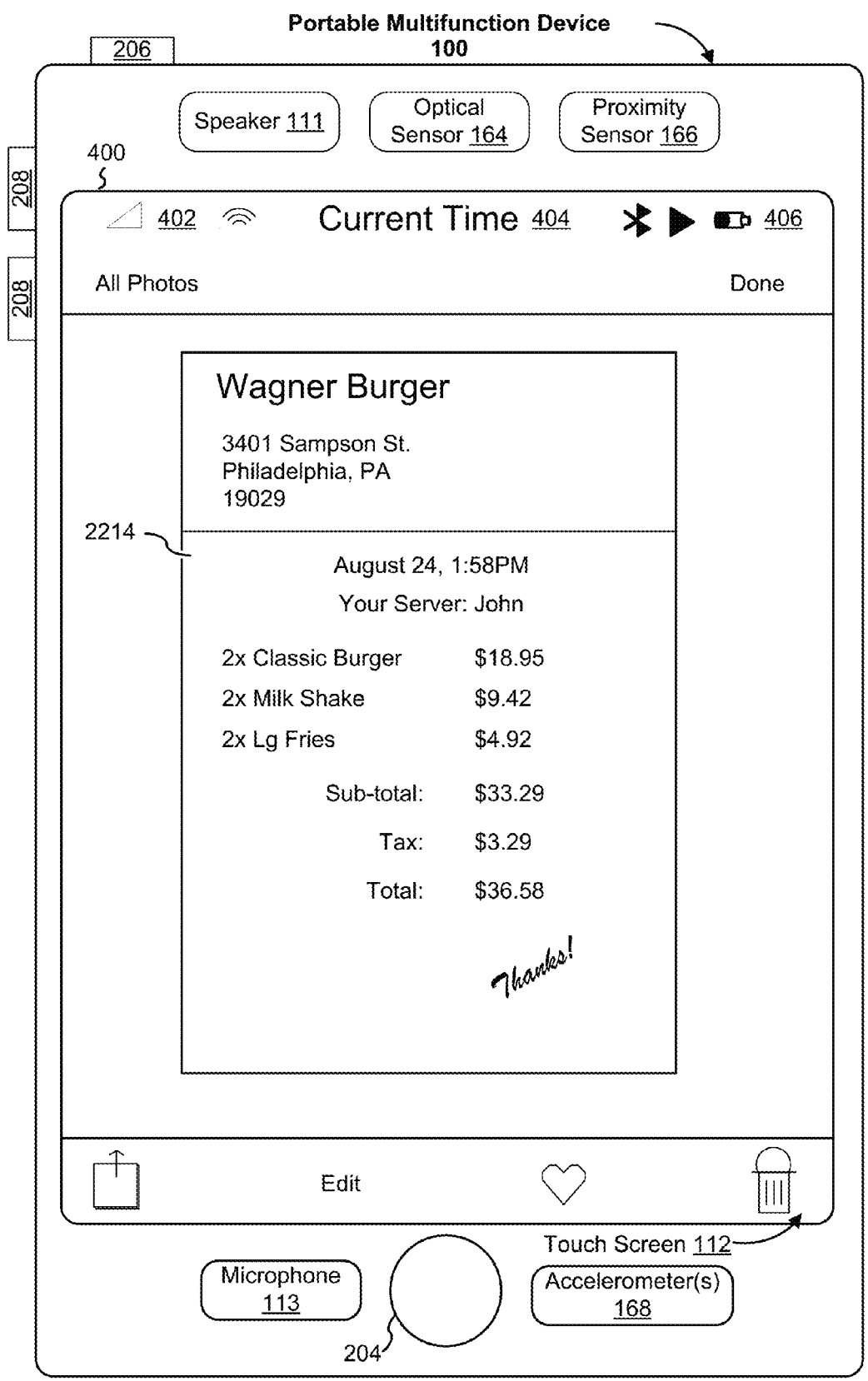
Figure 22C:
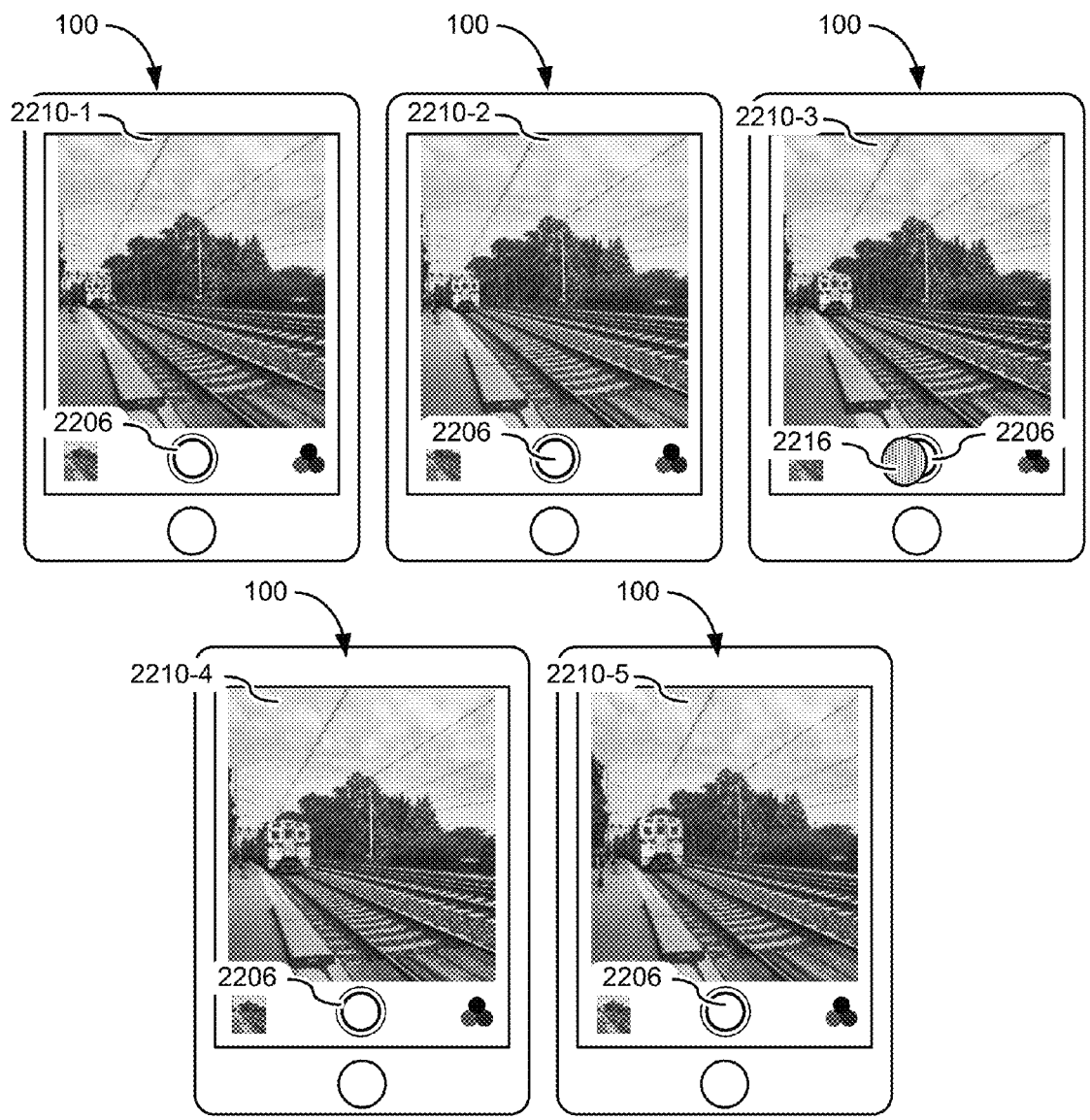

In contrast, FIG. 22C depicts a scene, shown in live preview 2210 in the media acquisition mode, of a train approaching a platform. In particular, FIG. 22C depicts the live preview 2210 of the scene at five different times (in chronological order: time 2210-1; time 2210-2; time 2210-3; time 2210-4; and time 2210-5).

Device 100 performs scene detection while live preview 2210 is displayed on the display. In this example, the action capture criteria are met when the device detects a threshold amount of movement. So, because the train is moving in the live preview 2210, in response to activation of shutter button 2206 at time 2210-3, device 100 retains a sequence of images 2218 (e.g., an enhance photo) as shown in FIG. 22D.

Figure 22D:
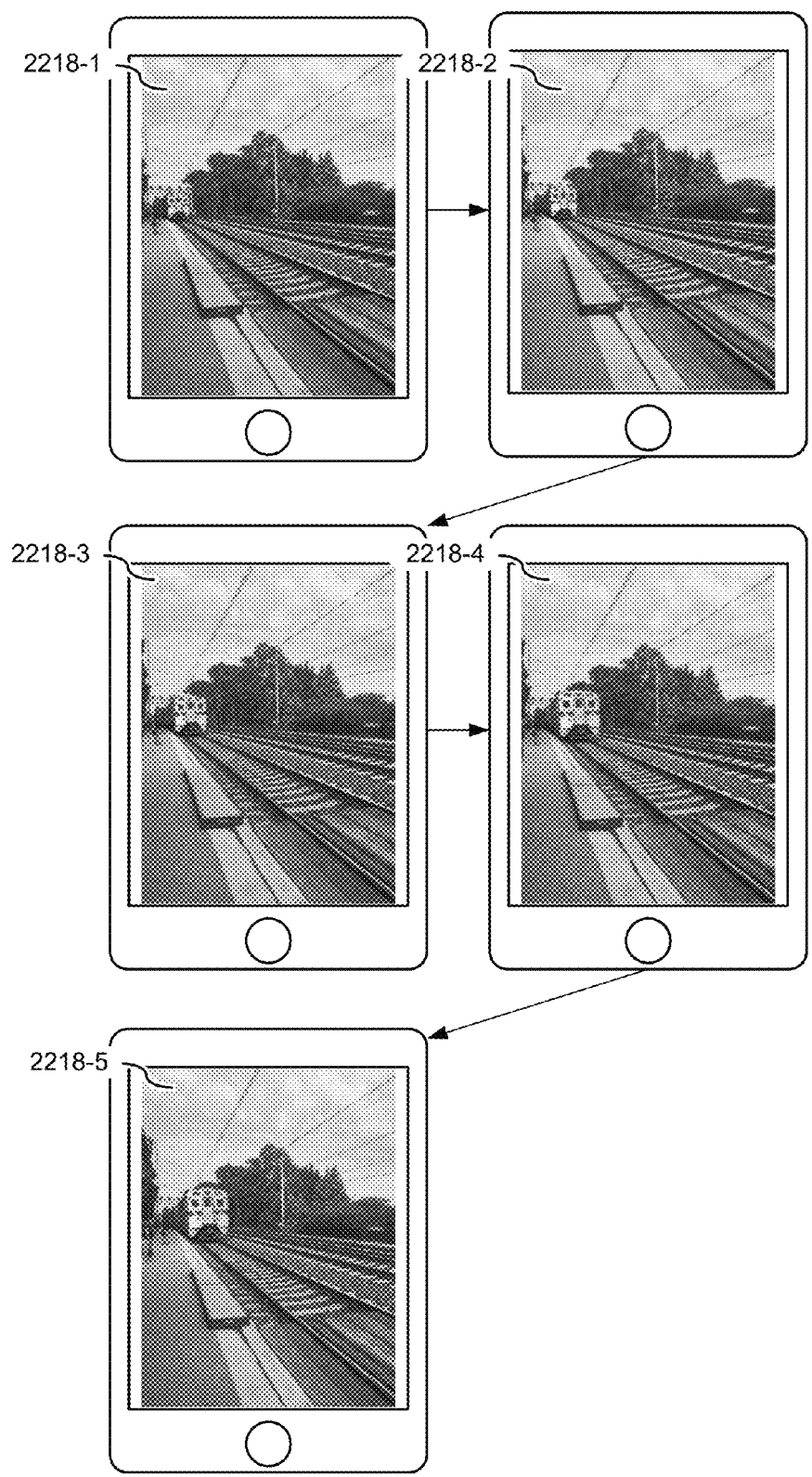

As shown in FIG. 22D, sequence of images 2218 includes: a plurality of images acquired prior to activation of shutter button 2206 (e.g., images 2218-1 and 2218-2); a representative image 2218-3 that, in some embodiments, was acquired in temporal proximity to activation of shutter button 2206 (e.g., image 2218-3 is analogous to a single image acquired in response to activation of a shutter in a conventional camera); and a plurality of images acquired by the camera after acquiring representative image 2218-3 (e.g., images 2218-4 and 2218-5). That is, because the moving train exceeded the threshold amount of movement, device 100 captured an enhanced photo. The enhanced photo can then be played back in accordance with, for example, the embodiments described with reference to FIGS. 6A-6FF, FIGS. 7A-7CC, and/or FIG. 8A-8L.

FIGS. 23A-23E illustrate exemplary user interfaces for trimming a sequence of images (e.g., an enhanced photo), in accordance with some embodiments. The user interfaces in these figures are used to illustrate the processes described below, including the processes in FIGS. 9A-9G, 10A-10M, 11A-11I, 12A-12B, 24A-24E, 25A-25C, 26A-26D, and 27A-27E. Although the examples which follow will be given with reference to inputs on a touch-screen display (where the touch-sensitive surface and the display are combined), in some embodiments, device 100 detects inputs on a touch-sensitive surface 451 that is separate from the display 450, as shown in FIG. 4B.

Figure 23A:
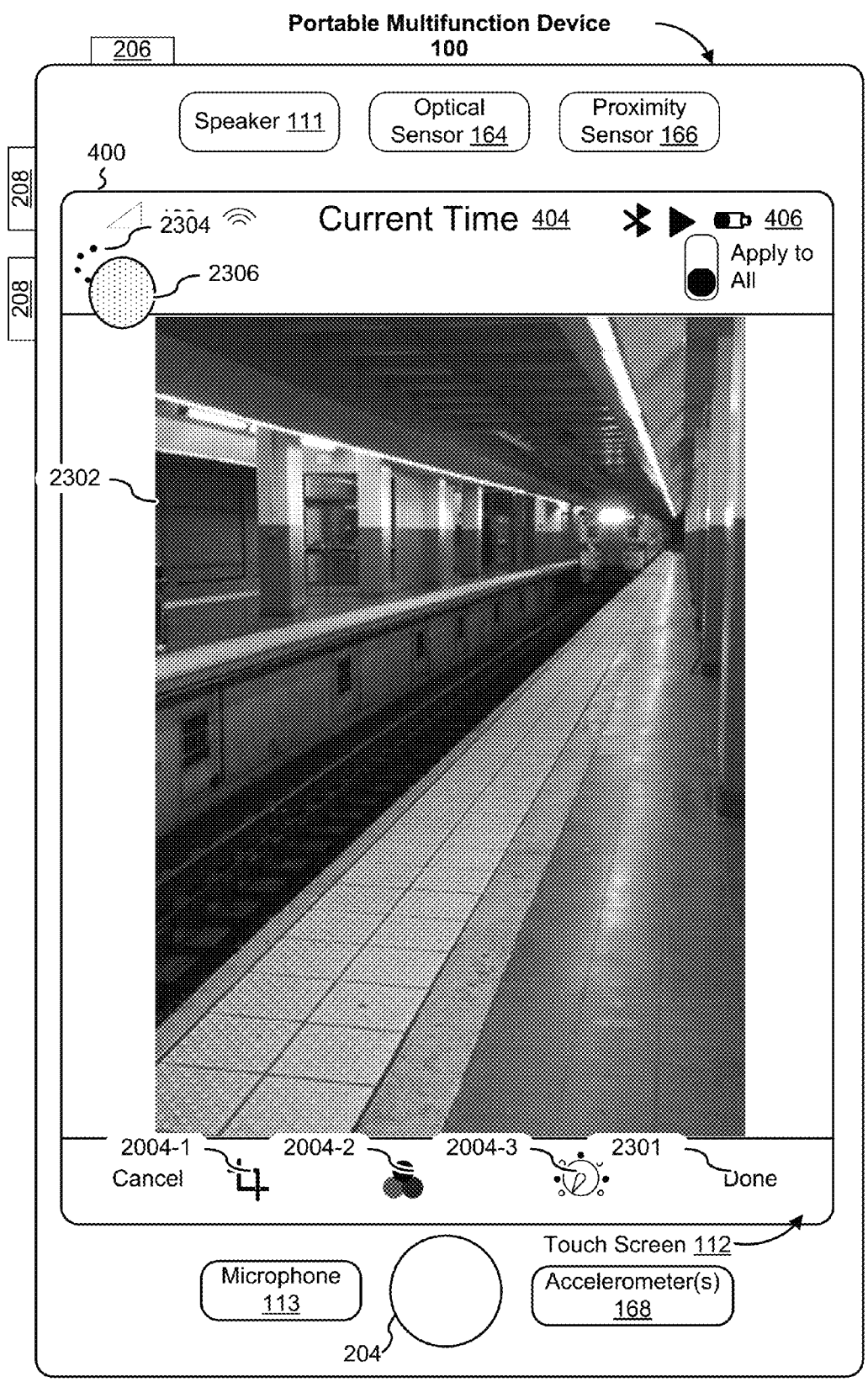
FIGS. 23A-23E illustrate exemplary user interfaces for trimming a sequence of images (e.g., an enhanced photo), in accordance with some embodiments.

FIG. 23A illustrates device 100 displaying representative image 2302 on the display while device 100 is in a photo editing user interface. Representative image 2302 represents a sequence of images (e.g., represents an enhanced photo). In some embodiments, device 100 displays a currently selected image from the sequence of images that is not necessarily the representative image. The photo editing user interface includes affordances 2004 for editing representative image 2302 (e.g., crop affordance 2004-1; filter affordance 2004-2; lighting affordance 2004-3). The photo editing user interface also includes a selectable icon 2304. In some embodiments, when the displayed image in the photo editing user interface is a representative image from a sequence of images, selectable icon 2304 is animated, displayed in color, and/or filled in. In some embodiments, when the displayed image in the photo editing user interface is a still image, selectable icon 2304 is displayed in black and white, is not animated and/or is not filled in. Thus, in some embodiments, selectable icon 2304 indicates to the user whether he or she is editing an enhanced photo. In some embodiments, selectable icon 2304 is only selectable when a representative image from a sequence of images is displayed in the photo editing user interface.

The photo editing user interface also includes a "done" affordance 2301, which applies the user's modifications to the photo.

In FIG. 23A, device 100 receives a user input 2306 that selects selectable icon 2304.

Figure 23B:
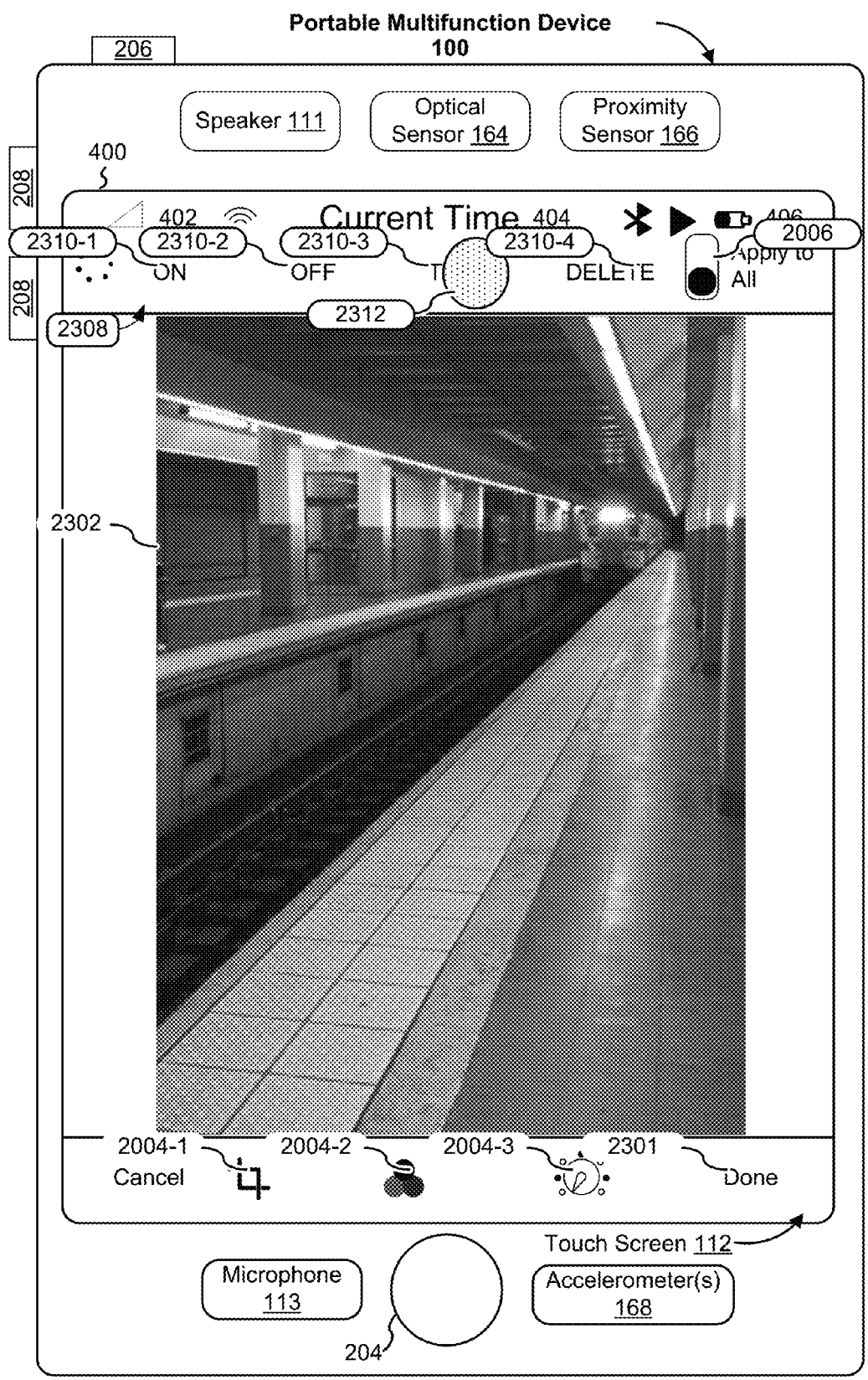

In FIG. 23B, in response to user input 2306, device 100 displays an affordance bar 2308. Affordance bar 2308 includes: an affordance 2310-1 for turning on animated playback of the sequence of images; an affordance 2310-2 for turning off animated playback of the sequence of images while retaining the sequence of images; affordance 2310-3 for trimming the sequence of images; and affordance 2310-4 for deleting the other images in the sequence of images besides representative image 2302. In some embodiments, only one of affordance 2310-1 or affordance 2310-2 is selectable at any given time, depending on whether animated playback is currently turned on or turned off (e.g., if playback is currently on, the "on" affordance 2310-1 is "grayed out"). The photo editing user interface also includes an affordance 2006 (e.g., a toggle switch) for toggling between a first editing mode (e.g., an apply-to-all editing mode) and a second editing mode (e.g., a single image editing mode), as described with reference to FIGS. 20A-20L.

In FIG. 23B, device 100 receives a user input 2312 that selects affordance 2310-3 for trimming the sequence of images.

Figure 23C:
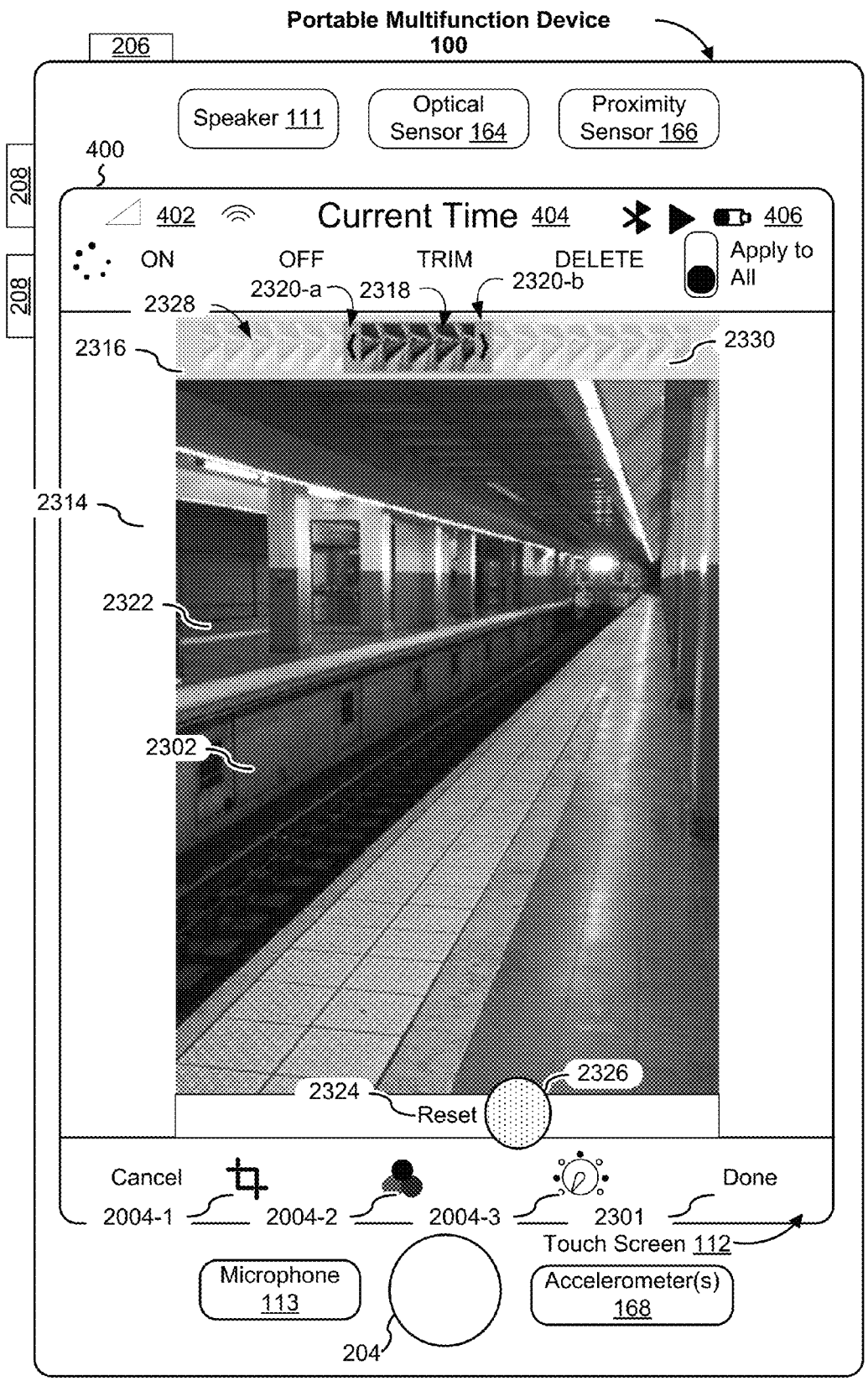

In FIG. 23C, in response to user input 2312, device 100 displays a user interface 2314 for trimming the sequence of images to a subset of the sequences of images (e.g., to a subset that is fewer than all of the images in the sequence of images). User interface 2314 includes an area 2316 (e.g., a strip) that contains representations 2318 of images in the sequence of images (for visual clarity, only one representation 2318 of an image is labeled in the figure). In some embodiments, representations 2318 of images are thumbnails of images in the sequence of images. In some embodiments, the representations of images are arranged in chronological order, so that those representations 2318 that are to the left in area 2316 represent images that were acquired earlier than those representations 2318 that are to the right in area 2316.

User interface 2314 includes second area 2322, displayed concurrently with area 2316. The representative image, or a currently selected image, is displayed in second area 2322.

Area 2316 includes a begin handle 2320-a that delimits a beginning image in the subset of the sequence of images. Area 2316 also includes an end handle 2320-b that delimits an ending image in the subset of the sequence of images. Begin handle 2320-a and end handle 2320-b are located at positions in the area 2316 that are automatically selected by the device (e.g., using scene detection). For example, device 100 uses scene detection to determine a period of time during which the best action transpired (e.g., by determining when a face is turned toward the camera, or determining when the images are least blurry). Device 100 sets begin handle 2320-a to a position in area 2316 representing the beginning of the period of time during which the best action transpired and sets end handle 2320-b to a position in area 2316 representing the end of the period of time during which the best action transpired.

FIG. 23C also illustrates that representations 2318 of images between begin handle 2320-a and end handle 2320-b are visually distinguished from the other representations 2318 in area 2316 (e.g., by slightly graying out the other representations).

User interface 2314 also includes reset affordance 2324. In FIG. 23C, device 100 receives a user input 2326 that selects reset affordance 2324.

Figure 23D:
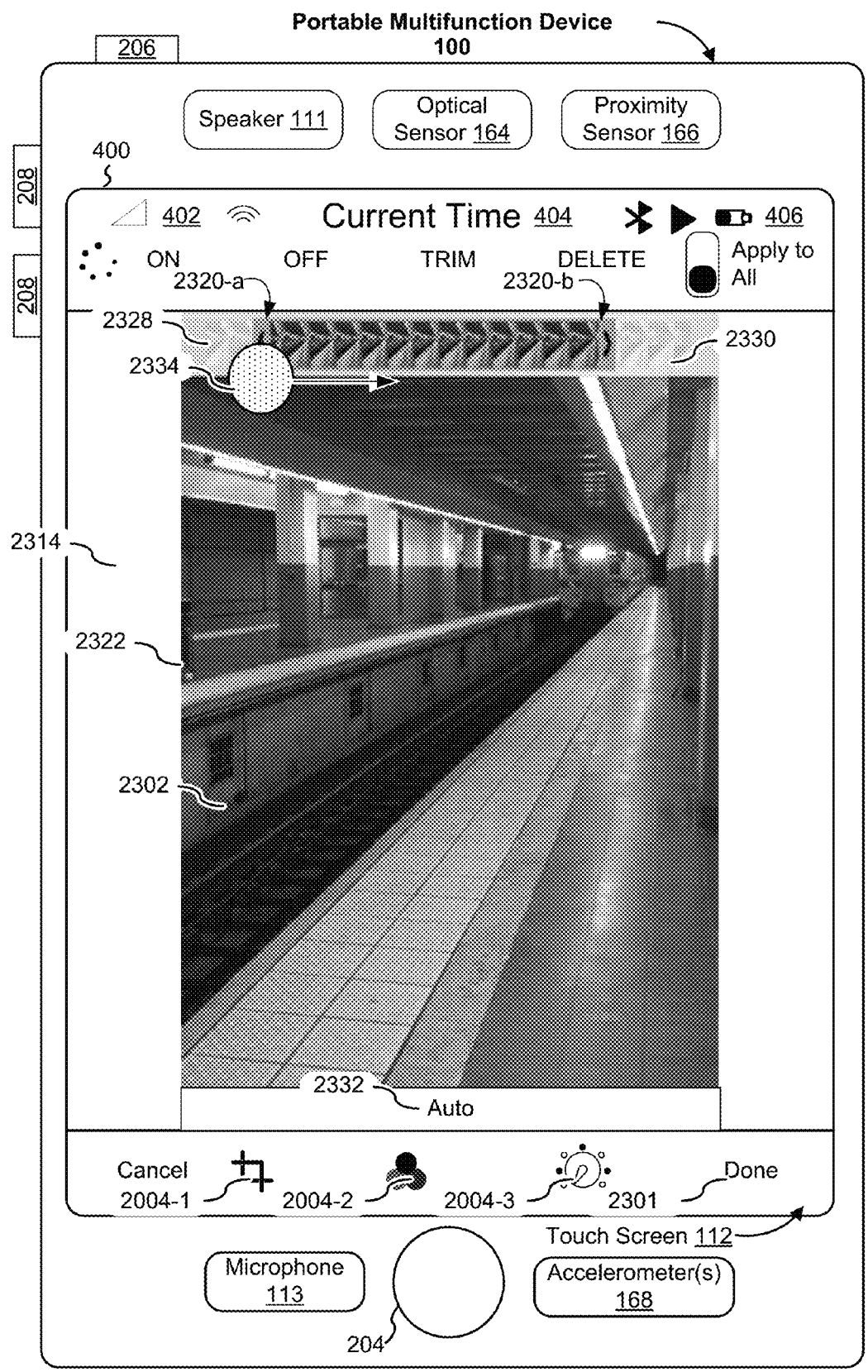

In FIG. 23D, in response to user input 2326 selecting reset affordance 2324, device 100 moves begin handle 2320-a to a position corresponding to an initial image in the untrimmed sequence of images and moves end handle 2320-b to a final image in the untrimmed sequence of images. That is, reset affordance 2324 resets the trimming handles to correspond to the sequence of images before the user entered trimming user interface 2314.

As shown in FIG. 23D, in some embodiments, user interface 2314 displays representations 2328 of images, not included in the original sequence of images, that were obtained before the initial image in the original (e.g., untrimmed) sequence of images and/or representations 2330 of images, not included in the original sequence of images, that were obtained after the final image in the original (e.g., untrimmed) sequence of images.

As also shown in FIG. 23D, in some embodiments, when the user selects reset affordance 2324, user interface 2314 displays (e.g., in place of reset affordance 2324) auto affordance 2332, which allows the user to toggle back to the automatically selected positions for begin handle 2320-a and end handle 2320-b that are based on scene detection.

Figure 23E:
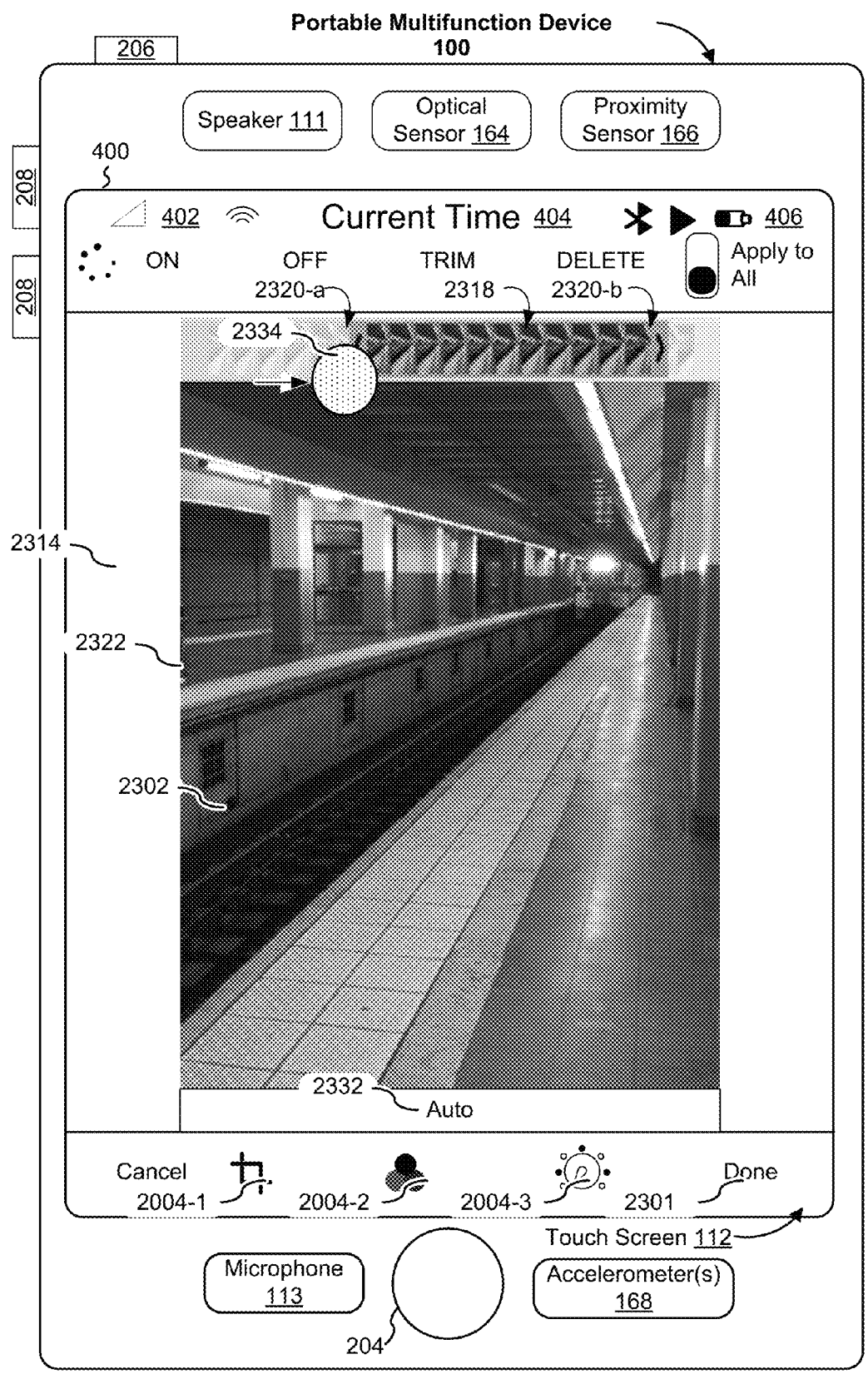

As also shown in FIGS. 23D-23E, the user can manually adjust the positions of begin handle 2320-a and end handle 2320-b. In FIG. 23D, device 100 receives a user input 2334 (e.g., a drag gesture over begin handle 2320-a). FIG. 23E illustrates that the position of begin handle 2320-a in area 2316 has moved according to the drag gesture 2334.

In some embodiments, when the user selects "done" affordance 2301 while in trimming user interface 2314, which applies the user's trimming to the sequence of images, device 100 either deletes (or marks for deletion) the images not included in the subset of images (e.g., whose representations 2318 are not in between begin handle 2320-a and end handle 2320-b), or disables playback of the images not included in the subset of images. For example, when the trimmed sequence of images is played back in accordance with the embodiments described with reference to FIGS. 6A-6FF, FIGS. 7A-7CC, and/or FIG. 8A-8L, the images not included in the subset of images are not played backed. In some embodiments, when device 100 disables playback of the images not included in the subset of images, device 100 retains the images not included in the subset of images so that the user can recover the whole sequence of images, or any part of the whole sequence of images at a later time (e.g., in the trimming user interface 2314).

FIGS. 24A-24E illustrate a flow diagram of a method 2400 of modifying images in a sequence of images, in accordance with some embodiments. The method 2400 is performed at an electronic device (e.g., device 300, FIG. 3, or portable multifunction device 100, FIG. 1A) with a display and a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2400 are, optionally, combined and/or the order of some operations is, optionally, changed.

Method 2400 provides an intuitive way to modify an enhanced photo. In particular, when the user is modifying a representative image for the enhanced photo (e.g., cropping, making black & white, changing balance and/or contrast), in some embodiments, method 2400 allows a user to specify (e.g., with a toggle switch) whether the modifications should be applied to just the representative image or to all of the images in the enhanced photo. When the modifications are applied to only the representative image, method 2400 provides playback recipes in accordance with a variety of embodiments. For example, in various embodiments, an enhanced photo that includes a sequence of images with a modified representative image is played back with the representative image modified, unmodified, or omitted. When the modifications are apply to the entire sequence of images, the enhanced photo plays back the modified sequence of images.

The device displays (2402) a representative image on the display (e.g., while the device is in an image presentation mode). The representative image is one image in a sequence of images taken by a camera. The sequence of images includes one or more images acquired by the camera after acquiring the representative image. The sequence of images includes one or more images acquired by the camera before acquiring the representative image. In some embodiments, the camera that took the sequence of images is part of the electronic device. In some embodiments, the sequence of images was taken by a camera that is not part of the electronic device (e.g., the sequence of images was transferred to the electronic device after being taken with a camera on another device). In some embodiments, the sequence of images was obtained in response to detecting activation of a shutter button at a first time, as described herein with respect to FIGS. 5A-5K and method 900 and/or FIGS. 22A-22D and method 2600. In some embodiments, the representative image corresponds to the representative image acquired by the camera, as described herein with respect to FIGS. 5A-5K and method 900 and/or FIGS. 22A-22D and method 2600.

While displaying the representative image on the display, the device detects (2404) an input to modify the representative image (e.g., an input to crop, filter, adjust the exposure, adjust the color, convert to black & white, or the like). For example, input 2008, FIG. 20B, is an input to modify representative image 2002-3.

In response to detecting the input to modify the representative image: in accordance with a determination that the device is in a first editing mode (e.g., an affordance, such as toggle switch 2006, FIG. 20I, is set to apply edits to all images in a respective sequence of images), the device modifies (2406) the representative image, the one or more images acquired by the camera after acquiring the representative image, and the one or more images acquired by the camera before acquiring the representative image; and, in accordance with a determination that the device is in a second editing mode (e.g., an affordance, such as toggle switch 2006, FIG. 20B, is set to apply edits only to the representative image in a respective sequence of images), distinct from the first editing mode, the device modifies the representative image, without modifying the one or more images acquired by the camera after acquiring the representative image, and without modifying the one or more images acquired by the camera before acquiring the representative image.

In some embodiments, the device provides the affordance to toggle between the first editing mode and the second editing mode in a photo editing user interface (e.g., toggle switch 2006, FIG. 20B and FIG. 20I, is a component of a photo editing user interface). In some embodiments, the photo editing user interface includes affordances to turn on/off playback of the enhanced photo, to delete the additional images in the enhanced photo, and/or to trim the set of additional photos (e.g. modify selection of the still images to be included in the enhanced photo), as described with reference to FIGS. 23A-23E and method 2700.

In some embodiments, in response to detecting the input to modify the representative image, the device presents the user with the option of applying the modification to only the representative image or to the representative image as well as the one or more images acquired by the camera after acquiring the representative image, and the one or more images acquired by the camera before acquiring the representative image.

In some circumstances, modifying the representative image without modifying the additional images would result in a discontinuity when the enhanced photograph is played back. For example, when the representative image is cropped or rotated relative to the additional image, playing-back the enhanced photograph would result in a "jump" when the representative image is displayed. Thus, in some embodiments, when making certain modifications to the representative image (e.g., cropping and/or rotating), without modifying the one or more images acquired by the camera after acquiring the representative image, and without modifying the one or more images acquired by the camera before acquiring the representative image, the device automatically turns off playback of the additional images, deletes the additional images, or causes the modified representative image to be saved to a new file as a still image. In some embodiments, the device warns the user that the modification will result in the modified representative image becoming a still image and provides the user with the option to continue the modification or cancel the modification (e.g., warning 2018, FIG. 20L).

In some embodiments, after modifying the representative image, without modifying the one or more images acquired by the camera after acquiring the representative image, and without modifying the one or more images acquired by the camera before acquiring the representative image: the device displays (2408) the modified representative image on the display. While displaying the modified representative image on the display, the device detects a first portion of a second input. In response to detecting the first portion of the second input, the device replaces display of the modified representative image with display of, in sequence, at least some of the one or more images acquired by the camera after acquiring the representative image. Thus, in some embodiments, in response to detecting the first portion of the second input, the one or more (unmodified) images acquired by the camera after acquiring the representative image are sequentially displayed (e.g., as shown in FIG. 20E). In some embodiments, the device displays a cross fade animation between the modified representative image and the one or more (unmodified) images acquired by the camera after acquiring the representative image.

After detecting the first portion of the second input, the device detects a second portion of the second input (e.g., continues to detect contact and/or intensity in a finger gesture). In response to detecting the second portion of the second input, the device displays, in sequence, at least some of the one or more images acquired by the camera before acquiring the representative image, the representative image without modification, and at least some of the one or more images acquired by the camera after acquiring the representative image (e.g., as shown in FIG. 20F).

Thus, in some embodiments, in response to detecting the second portion of the second input, the entire sequence of (unmodified) images is played, from the initial image to the final image in the sequence. For example, the representative image is modified by changing it to a black and white image, while the other images in the sequence remain color images. While the black and white representative image is displayed, a first portion of an input (e.g., a press-and-hold gesture or a deep press gesture) is detected. In response, the display of the black and white representative image is replaced by the display of, in sequence, one or more (unmodified) color images in the sequence of images, which were acquired by the camera after acquiring the representative image. In response to detecting a second portion of the second input, the entire sequence of images is played, from the initial image to the final image in the sequence, with all the images displayed in color.

In some embodiments, after modifying the representative image, without modifying the one or more images acquired by the camera after acquiring the representative image, and without modifying the one or more images acquired by the camera before acquiring the representative image: the device displays (2410) the modified representative image on the display. While displaying the modified representative image on the display, the device detects a second input. In response to detecting the second input, the device displays, in sequence, at least some of the one or more images acquired by the camera before acquiring the representative image, the representative image without modification, and at least some of the one or more images acquired by the camera after acquiring the representative image.

Thus, in some embodiments, in response to detecting the second input, the device plays back the enhanced photo, with none of the images modified, starting from an image acquired before acquiring the representative image (e.g., starting with the initial image in the sequence of images) rather than starting playback by displaying images acquired by the camera after the representative image.

In some embodiments, after modifying the representative image, without modifying the one or more images acquired by the camera after acquiring the representative image, and without modifying the one or more images acquired by the camera before acquiring the representative image: the device displays (2412) the modified representative image on the display. While displaying the modified representative image on the display, the device detects a first portion of a second input. In response to detecting the first portion of the second input, the device replaces display of the modified representative image with display of, in sequence, at least some of the one or more images acquired by the camera after acquiring the representative image. Thus, in some embodiments, in response to detecting the first portion of the second input, the one or more (unmodified) images acquired by the camera after acquiring the representative image are sequentially displayed. In some embodiments, the device displays a cross fade animation between the modified representative image and the one or more (unmodified) images acquired by the camera after acquiring the representative image (e.g., as shown in FIG. 20C).

After detecting the first portion of the second input, the device detects a second portion of the second input (e.g., continues to detect contact and/or intensity in a finger gesture). In response to detecting the second portion of the second input, the device displays, in sequence, at least some of the one or more images acquired by the camera before acquiring the representative image, the modified representative image, and at least some of the one or more images acquired by the camera after acquiring the representative image (e.g., as shown in FIG. 20D).

Thus, in some embodiments, in response to detecting the second portion of the second input, the entire sequence of images is played, from the initial image to the final image in the sequence, with just the representative image being modified. For example, the representative image is modified by changing it to a black and white image, while the other images in the sequence remain color images. While the black and white representative image is displayed, a first portion of an input (e.g., a press-and-hold gesture or a deep press gesture) is detected. In response, the display of the black and white representative image is replaced by the display of, in sequence, one or more (unmodified) color images in the sequence of images, which were acquired by the camera after acquiring the representative image. In response to detecting a second portion of the second input, the entire sequence of images is played, from the initial image to the final image in the sequence, with all the images displayed in color except the representative image, which is displayed in black and white.

In some embodiments, after modifying the representative image, without modifying the one or more images acquired by the camera after acquiring the representative image, and without modifying the one or more images acquired by the camera before acquiring the representative image: the device displays (2414) the modified representative image on the display. While displaying the modified representative image on the display, the device detects a second input. In response to detecting the second input, the device displays, in sequence, at least some of the one or more images acquired by the camera before acquiring the representative image, the modified representative image, and at least some of the one or more images acquired by the camera after acquiring the representative image.

Thus, in some embodiments, in response to detecting the second input, the device plays back the enhanced photo, with only the representative image modified, starting from an image acquired before acquiring the representative image (e.g., starting with the initial image in the sequence of images) rather than starting playback by displaying images acquired by the camera after the representative image.

In some embodiments, after modifying the representative image, without modifying the one or more images acquired by the camera after acquiring the representative image, and without modifying the one or more images acquired by the camera before acquiring the representative image: the device displays (2416) the modified representative image on the display. While displaying the modified representative image on the display, the device detects a first portion of a second input. In response to detecting the first portion of the second input, the device replaces display of the modified representative image with display of, in sequence, at least some of the one or more images acquired by the camera after acquiring the representative image. Thus, in some embodiments, in response to detecting the first portion of the second input, the one or more (unmodified) images acquired by the camera after acquiring the representative image are sequentially displayed. In some embodiments, the device displays a cross fade animation between the modified representative image and the one or more (unmodified) images acquired by the camera after acquiring the representative image (e.g., as shown in FIG. 20G).

After detecting the first portion of the second input, the device detects a second portion of the second input (e.g., continues to detect contact and/or intensity in a finger gesture). In response to detecting the second portion of the second input, the device displays, in sequence, at least some of the one or more images acquired by the camera before acquiring the representative image and at least some of the one or more images acquired by the camera after acquiring the representative image (e.g., as shown in FIG. 20H).

Thus, in some embodiments, in response to detecting the second portion of the second input, the entire sequence of images is played, from the initial image to the final image in the sequence, except the representative image is not displayed (e.g., the modified representative image is omitted from the first full playback of the enhanced photo). In some embodiments, the device continues to loop through the sequence of images as long as the input is maintained (e.g., a press-and-hold gesture and/or a deep press with an intensity above a predefined threshold).

In some embodiments, after modifying the representative image, without modifying the one or more images acquired by the camera after acquiring the representative image, and without modifying the one or more images acquired by the camera before acquiring the representative image: the device displays (2418) the modified representative image on the display. While displaying the modified representative image on the display, the device detects a second input. In response to detecting the second input, the device displays, in sequence, at least some of the one or more images acquired by the camera before acquiring the representative image and at least some of the one or more images acquired by the camera after acquiring the representative image.

Thus, in some embodiments, in response to detecting the second input, the device plays back the enhanced photo, with the representative image omitted and the remaining images unmodified, starting from an image acquired before acquiring the representative image (e.g., starting with the initial image in the sequence of images) rather than starting playback by displaying images acquired by the camera after the representative image.

In some embodiments, after modifying the representative image, the one or more images acquired by the camera after acquiring the representative image, and the one or more images acquired by the camera before acquiring the representative image: the device displays (2420) the modified representative image on the display. While displaying the modified representative image on the display, the device detects a first portion of a second input. In response to detecting the first portion of the second input, the device replaces display of the modified representative image with display of, in sequence, at least some of the modified one or more images acquired by the camera after acquiring the representative image. Thus, in some embodiments, in response to detecting the first portion of the second input, the modified one or more images acquired by the camera after acquiring the representative image are sequentially displayed (e.g., as shown in FIG. 20J).

After detecting the first portion of the second input, the device detects a second portion of the second input (e.g., continues to detect contact and/or intensity in a finger gesture). In response to detecting the second portion of the second input, the device displays, in sequence, at least some of the modified one or more images acquired by the camera before acquiring the representative image, the modified representative image, and at least some of the modified one or more images acquired by the camera after acquiring the representative image (e.g., as shown in FIG. 20K).

Thus, in some embodiments, in response to detecting the second portion of the second input, the entire sequence of modified images is played, from the initial image to the final image in the sequence. For example, the images in the sequence are modified by changing them from color to black and white images. While the black and white representative image is displayed, a first portion of an input (e.g., a press-and-hold gesture or a deep press gesture) is detected. In response, the display of the black and white representative image is replaced by the display of, in sequence, one or more black and white images in the sequence of images, which were acquired by the camera after acquiring the representative image. In response to detecting a second portion of the second input, the entire sequence of images is played, from the initial image to the final image in the sequence, with all the images displayed in black and white.

In some embodiments, after modifying the representative image, the one or more images acquired by the camera after acquiring the representative image, and the one or more images acquired by the camera before acquiring the representative image: the device displays (2422) the modified representative image on the display. While displaying the modified representative image on the display, the device detects a second input. In response to detecting the second input, the device displays, in sequence, at least some of the modified one or more images acquired by the camera before acquiring the representative image, the modified representative image, and at least some of the modified one or more images acquired by the camera after acquiring the representative image.

Thus, in some embodiments, in response to detecting the second input, the device plays back the enhanced photo, with all of the images modified, starting from an image acquired before acquiring the representative image (e.g., starting with the initial image in the sequence of images) rather than starting playback by displaying images acquired by the camera after the representative image.

In some embodiments, the device detects (2424) a second input corresponding to a request to delete the one or more images acquired by the camera before acquiring the representative image and the one or more images acquired by the camera after acquiring the representative image. In response to detecting the second input, the device deletes (or marks for deletion) the one or more images acquired by the camera before acquiring the representative image and the one or more images acquired by the camera after acquiring the representative image (e.g., deletes all of the additional images in the enhanced photo, other than the representative image, without additional user input beyond the second input).

It should be understood that the particular order in which the operations in FIGS. 24A-24E have been described is merely exemplary and is not intended to indicate that the described order is the only order in which the operations could be performed. One of ordinary skill in the art would recognize various ways to reorder the operations described herein. In some implementations, one or more operations described herein may be omitted. For example, in some embodiments, operations 2408 and 2410 are omitted. Additionally, it should be noted that details of other processes described herein with respect to other methods described herein (e.g., methods 900, 1000, 10000, 10050, 1100, 11000, 1200, 2500, 2600, and 2700) are also applicable in an analogous manner to method 2400 described above with respect to FIGS. 24A-24E. For example, the contacts, gestures, user interface objects, intensity thresholds, animations, and sequences of images, described above with reference to method 2400 optionally have one or more of the characteristics of the contacts, gestures, user interface objects, intensity thresholds, animations, and sequences of images described herein with reference to other methods described herein (e.g., methods 900, 1000, 10000, 10050, 1100, 11000, 1200, 2500, 2600, and 2700). For brevity, these details are not repeated here.

FIGS. 25A-25C illustrate a flow diagram of a method 2500 of sending images from a sequence of images to a second electronic device, in accordance with some embodiments. The method 2500 is performed at a first electronic device (e.g., device 300, FIG. 3, or portable multifunction device 100, FIG. 1A) with a display and, optionally, a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2500 are, optionally, combined and/or the order of some operations is, optionally, changed.

In accordance with some embodiments, method 2500 allows a user to share her enhanced photos with other users' devices when the other users' devices are configured to interact (e.g., compatible) with enhanced photos. To that end, method 2500 includes determining if a remote electronic device is configured to interact with enhanced photos and, when the remote electronic device is configured to interact with enhanced photos, method 2500 includes responding to a request to send an enhanced photo by displaying a first set of sharing options (e.g., that includes an option to send the enhanced photo). When the remote electronic device is not configured to interact with enhanced photos, method 2500 includes responding to a request to send an enhanced photo by displaying a second set of sharing options (e.g., that includes sending just a representative image or converting the enhanced photo to a video or GIF format).

The first electronic device displays (2502), on a display, a representative image in a user interface of an application that is configured to communicate with other electronic devices. For example, the representative image is displayed in an input area for a messaging application (e.g., iMessage from Apple Inc. of Cupertino, Calif.), a social networking application (e.g., Twitter or Facebook), an ad hoc network service (e.g., AirDrop from Apple Inc. of Cupertino, Calif.), or an email application (e.g., Mail from Apple Inc. of Cupertino, Calif.).

The representative image is one image in a sequence of images taken by a camera. The sequence of images includes one or more images acquired by the camera after acquiring the representative image. The sequence of images includes one or more images acquired by the camera before acquiring the representative image. In some embodiments, the camera that took the sequence of images is part of the first electronic device. In some embodiments, the sequence of images was taken by a camera that is not part of the first electronic device (e.g., the sequence of images was transferred to the first electronic device after being taken with a camera on another device). In some embodiments, the sequence of images was obtained in response to detecting activation of a shutter button at a first time, as described herein with respect to FIGS. 5A-5K and method 900 and/or FIGS. 22A-22D and method 2600. In some embodiments, the representative image corresponds to the representative image acquired by the camera, as described herein with respect to FIGS. 5A-5K and method 900 and/or FIGS. 22A-22D and method 2600.

In some embodiments, the application that is configured to communicate with other electronic devices is displayed (2504) in response to detecting selection of an application icon that corresponds to the application in a sharing user interface (e.g., a sharing menu such as a share sheet in iOS by Apple Inc. of Cupertino, Calif.). In some embodiments, the representative image is displayed in the sharing user interface and the sharing user interface is configured to display interactions with the sequence of images as a group (such as those interactions described with reference to FIGS. 6A-6FF). In some embodiments, the sharing user interface is displayed in response to selection of a share icon while the representative image is displayed in an image management application (e.g., Photos by Apple Inc. of Cupertino, Calif.).

While displaying the representative image on the display, the first electronic device detects (2506) an input that corresponds to a request to send the representative image or a request to select the representative image for sending (e.g., detecting activation of a "send" icon or a "select photo" icon by a tap gesture on a touch-sensitive surface of the first electronic device or a mouse click) to a second electronic device, remote from the first electronic device, using the application.

In response to detecting the input that corresponds to the request to send the representative image or to the request to select the representative image for sending to the second electronic device: in accordance with a determination that the second electronic device is configured to interact with the sequence of images as a group (e.g., the second electronic device is configured to perform the interactions described with reference to FIGS. 6A-6FF), the first electronic device displays (2508) a first set of options for sending at least a portion of the sequence of images to the second electronic device (e.g., as shown in FIGS. 21C and/or 21I); and, in accordance with a determination that the second electronic device is not configured to interact with the sequence of images as a group, the first electronic device displays a second set of options for sending at least a portion of the sequence of images to the second electronic device, wherein the second set of options is different from the first set of options (e.g., as shown in FIGS. 21D and/or 21J).

In some embodiments, the determination that the second electronic device is not configured to interact with the sequence of images as a group includes instances where it cannot be determined that the second electronic device is configured to interact with the sequence of images as a group. In some embodiments, if it cannot be determined that the second electronic device is configured to interact with the sequence of images as a group, it is concluded that the second electronic device is not configured to interact with the sequence of images as a group.

In some embodiments, the determination that the second electronic device is configured to interact with the sequence of images as a group is based at least in part on determining the operating system being used by the second electronic device. In some embodiments, as an alternative to presenting the first set of options, in accordance with a determination that the second electronic device is configured to interact with the sequence of images as a group, the first electronic device automatically sends the sequence of images (e.g., sends the entire sequence of images, to be interacted with as a group, without further user intervention after the user presses the "send" button). In some embodiments, in accordance with a determination that the second electronic device is not configured to interact with the sequence of images as a group, the first electronic device automatically sends the representative image without sending the one or more images acquired by the camera after acquiring the representative image and without sending the one or more images acquired by the camera before acquiring the representative image.

In some embodiments, the first set of options for sending at least a portion of the sequence of images to the second electronic device includes (2510) an option to send the entire sequence of images (e.g., the first set of options includes an option for sending the sequence of images as an enhanced photo).

In some embodiments, the second set of options for sending at least a portion of the sequence of images to the second electronic device includes (2512) an option for converting at least the portion of the sequence of images to a video format (e.g., an MPEG format). In some embodiments, the second set of options for sending at least a portion of the sequence of images to the second electronic device includes an option for converting at least the portion of the sequence of images to a format with which the second electronic device is configured to interact. In some embodiments, the second set of options for sending at least a portion of the sequence of images to the second electronic device includes an option for converting at least the portion of the sequence of images to an animated image format (e.g., a GIF format).

In some embodiments, if the second electronic device is not configured to interact with the sequence of images as a group, instead of sending the representative image without sending other images in the sequence of images, the first electronic device displays a menu (e.g., a pop-up menu) that gives a user the option to convert the sequence of images (and, in some embodiments, audio that corresponds to the sequence of images) into a video clip and/or animated GIF. In response to user selection of a "convert to video" and/or "send as video" option, a video that corresponds to the sequence of images is sent to the second electronic device. In some embodiments, in response to user selection of a "convert to video" and/or "send as video" option, the first electronic device converts the sequence of images into a video and sends the video to the second electronic device. In response to user selection of a "convert to GIF" and/or "send as GIF" option, an animated GIF that corresponds to the sequence of images is sent to the second electronic device. In some embodiments, in response to user selection of a "convert to GIF" and/or "send as GIF" option, the first electronic device converts the sequence of images into an animated GIF and sends the GIF to the second electronic device.

In some embodiments, the first set of options for sending at least a portion of the sequence of images to the second electronic device includes (2514) an option for converting at least the portion of the sequence of images to a video format (e.g., an MPEG format). In some embodiments, the first electronic device displays a menu (e.g., a send options menu) that gives a user the option to convert the sequence of images (and, in some embodiments, audio that corresponds to the sequence of images) into a video clip and/or animated GIF, independent of whether the second electronic device is configured to interact with the sequence of images as a group. Thus, if such an option is selected, a video or animated GIF is sent to the second electronic device, instead of the sequence of images (with or without associated audio and/or metadata), even if the second electronic device is configured to interact with the sequence of images as a group.

In some embodiments, the first electronic device displays a menu (e.g., an export, "send as" or "convert to" menu) that gives a user the option to convert the sequence of images (and, in some embodiments, audio that corresponds to the sequence of images) into a video clip and/or animated GIF. If such an option is selected, the sequence of images (with or without associated audio and/or metadata) is converted to a video or animated GIF in accordance with the option selected.

In some embodiments, in accordance with the determination that the second electronic device is configured to interact with the sequence of images as a group (e.g., the second electronic device is configured to perform the interactions described with respect to FIGS. 6A-6FF), the first electronic device sends (2516) audio that corresponds to the sequence of images. For example, when the first set of options includes an option to send the entire sequence of images (e.g., send the enhance photo), and the user of the first electronic device selects the option to send the entire sequence of images, the first electronic device sends the audio to the second electronic device so that the user of the second electronic device can playback the enhanced photo with audio, as described with reference to FIGS. 6F-6I.

In some embodiments, in accordance with the determination that the second electronic device is configured to interact with the sequence of images as a group (e.g., second electronic device is configured to perform the interactions described with respect to FIGS. 6A-6FF), the first electronic device sends (2518) metadata that corresponds to the first sequence of images. For example, when the first set of options includes an option to send the entire sequence of images (e.g., send the enhance photo), and the user of the first electronic device selects the option to send the entire sequence of images, the first electronic device sends the metadata to the second electronic device so that the user of the second electronic device can playback the enhanced photo with metadata, as described with reference to FIGS. 6J-6M. In some embodiments, metadata such as time, date, location (e.g., via GPS), weather, music that was playing when the sequence of images was acquired (e.g., music identified with music identification software in the first electronic device, such as Shazam, SoundHound, or Midomi), and/or local event information (such as a sports game that was being played when and where the first sequence of images was acquired), post-event information (such as a final score) for the sequence of images is linked to (or otherwise associated with) the sequence of images.

In some embodiments, the second set of options for sending at least a portion of the sequence of images to the second electronic device includes (2520) an option for sending the representative image without sending the one or more images acquired by the camera after acquiring the representative image and without sending the one or more images acquired by the camera before acquiring the representative image (e.g., sending the representative image as a still image).

In some embodiments, the first electronic device determines (2522) whether the first electronic device is in a first mode that permits sending the sequence of images (e.g., as a group). In accordance with a determination that the first electronic device is not in the first mode that permits sending the sequence of images as a group, the first electronic device modifies the first set of options for sending at least the portion of the sequence of images to the second electronic device. In some embodiments, to send the sequence of images instead of just sending the representative image, in addition to determining that the second electronic device is configured to interact with the sequence of images as a group, the first electronic device also needs to be in a mode that permits sending the sequence of images as a group, rather than in a mode that only permits sending a still image (e.g., the representative image) from the sequence of images. In some embodiments, a user can choose between these two modes using an affordance, such as toggle switch 2006, as shown in FIG. 20B.

In some embodiments, while displaying the representative image on the display (and one of the set of options), the first electronic device detects (2524) a second input. In response to detecting the second input, the first electronic device replaces display of the representative image with display of, in sequence, at least some of the images in the sequence of images. In some embodiments, the first electronic device is configured to play back the enhanced photo while displaying the sharing options, which may help the user decide how she wants to share the photo (e.g., as an enhanced photo, video, GIF, or still image).

In some embodiments, the first electronic device includes (2526) a touch-sensitive surface and one or more sensors to detect intensity of contacts with the touch-sensitive surface. The second input includes a finger contact that satisfies first contact-intensity criteria. For example, when the set of options is displayed, a deep press over the representative image plays back the enhanced photo.

It should be understood that the particular order in which the operations in FIGS. 25A-25C have been described is merely exemplary and is not intended to indicate that the described order is the only order in which the operations could be performed. One of ordinary skill in the art would recognize various ways to reorder the operations described herein. In some implementations, one or more operations described herein may be omitted. For example, in some embodiments, operations 2510 and 2512 are omitted. Additionally, it should be noted that details of other processes described herein with respect to other methods described herein (e.g., methods 900, 1000, 10000, 10050, 1100, 11000, 1200, 2400, 2600, and 2700) are also applicable in an analogous manner to method 2500 described above with respect to FIGS. 25A-25C. For example, the contacts, gestures, user interface objects, intensity thresholds, animations, and sequences of images, described above with reference to method 2500 optionally have one or more of the characteristics of the contacts, gestures, user interface objects, intensity thresholds, animations, and sequences of images described herein with reference to other methods described herein (e.g., methods 900, 1000, 10000, 10050, 1100, 11000, 1200, 2400, 2600, and 2700). For brevity, these details are not repeated here.

FIGS. 26A-26D illustrate a flow diagram of a method 2600 of acquiring photos (e.g., enhanced photos or still photos) using scene recognition, in accordance with some embodiments. The method 2600 is performed at an electronic device (e.g., device 300, FIG. 3, or portable multifunction device 100, FIG. 1A) with a display, a camera, and, optionally, a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2600 are, optionally, combined and/or the order of some operations is, optionally, changed.

In accordance with some embodiments, the device performs scene recognition while capturing images from the camera. In response to a user activating a shutter, the device determines, based on the scene recognition, whether to retain a sequence of images (e.g., as an enhanced photo) or retain a still image. For example, when the scene includes a lot of movement, the device automatically retains an enhanced photo. As another example, when the scene includes a large amount of text (e.g., the "scene" is merely a receipt or a page from a book), the device retains a still image.

To that end, while in a first media acquisition mode for the camera (e.g., a mode labeled as an auto still/enhanced photo mode): the device displays (2602) a live preview of a scene on the display.

The device performs (2604) scene recognition on the scene. In some embodiments, performing scene recognition includes recognizing faces in the scene, recognizing motion in the scene, recognizing text in the scene, recognizing whether the scene is indoors or outdoors (e.g., recognizing a threshold amount of brightness and/or recognizing the sun), and/or recognizing a depth of field of the scene (e.g., determining if the scene is of a landscape).

While displaying the live preview of the scene, the device detects (2606) a single activation of a shutter button at a first time. In some embodiments, detecting a single activation of a shutter button at a first time includes detecting pressing of a physical button at the first time or detecting a gesture on a virtual shutter button on a touch-sensitive display at the first time, such as a tap gesture on a shutter release icon or a tap gesture on the live preview, where the live preview acts as a virtual shutter button). In some embodiments, the detected activation is a single activation of the shutter button (e.g., analogous to a single activation used in a conventional digital camera to capture a single image in the still image mode of a conventional digital camera). In some embodiments, the single activation of the shutter button does not require that the activation be maintained for any particular amount of time (e.g., any detectable activation of the shutter button will suffice, regardless of the length that the activation is maintained).

In response to detecting (2608) the single activation of the shutter button at the first time: in accordance with a determination that the scene meets action capture criteria (e.g., criteria concerning activity in a scene), based at least in part on the scene recognition performed on the scene, the device retains a plurality of images acquired by the camera in temporal proximity to the activation of the shutter button at the first time and groups the plurality of images into a first sequence of images (e.g., the device retains an enhanced photo of the scene, as shown in FIGS. 22C-22D).

The first sequence of images includes: a plurality of images acquired by the camera prior to detecting activation of the shutter button at the first time; a representative image that represents the first sequence of images and was acquired by the camera after one or more of the other images in the first sequence of images; and a plurality of images acquired by the camera after acquiring the representative image.

In accordance with a determination that the scene does not meet the action capture criteria, the device retains a single image in temporal proximity to the activation of the shutter button at the first time (without grouping a plurality of images acquired by the camera in temporal proximity to the activation of the shutter button at the first time into a first sequence of images, as shown in FIGS. 22A-22B).

In some embodiments, the images acquired prior to detecting activation of the shutter button at the first time are a predefined number of images, such as 5, 10, 15, 20, 25, or 30 images. In some embodiments, the images acquired prior to detecting activation of the shutter button at the first time are images that are within a predefined time prior to the first time, such as within 0.5, 1.0, 1.5, 2.0, or 2.5 seconds prior to the first time. In some embodiments, the plurality of images acquired prior to detecting activation of the shutter button at the first time are from a range of time between a second time (prior to the first time) and the first time, and the plurality of images acquired prior to detecting activation of the shutter button at the first time are independent of interaction with the shutter button that is temporally proximate to the second time. For example, the plurality of images acquired prior to detecting activation of the shutter button at the first time are not acquired in response to detecting an interaction with the shutter button that is temporally proximate to the second time. For example, the plurality of images acquired prior to detecting activation of the shutter button at the first time are not acquired in response to detecting a partial (or complete) activation of the shutter button at or near the second time.

In some embodiments, the device begins acquiring and storing images upon entering the first media acquisition mode.

In some embodiments, the plurality of images, in the first sequence of images, that are acquired prior to detecting activation of the shutter button at the first time meet predefined grouping criteria. In some embodiments, the predefined grouping criteria include selecting a predefined number of images prior to the representative image. In some embodiments, the predefined grouping criteria include selecting images in a predefined range of time immediately prior to detecting activation of the shutter button. In some embodiments, the predefined grouping criteria include selecting images in a predefined range of time immediately prior to the time at which the representative image is acquired. In some embodiments, the predefined grouping criteria include selecting images based on scene recognition and/or movement of the device (e.g., the device discards images that were obtained when the device was moving too much, so as to discard, for example, images taken as the user lifted the device up).

In some embodiments, the representative image is acquired by the camera at the first time and is analogous to the single image captured in the still image mode of a conventional digital camera when its shutter button is activated. In some embodiments, the representative image acquired by the camera corresponds to an image that was acquired at the first time. In some embodiments, the representative image acquired by the camera corresponds to an image that was acquired shortly after detecting activation of the shutter button at the first time, at a time that takes into account shutter lag (the time delay between detecting activation of the shutter button and capturing/storing the representative image). In some embodiments, the representative image acquired by the camera is used to represent the sequence of images, for example in an image presentation mode.

In some embodiments, the first sequence of images includes a predefined number of images—such as 5, 10, 15, 20, 25, or 30 images—acquired after acquiring the representative image. In some embodiments, the images acquired after acquiring the representative image are images that are within a predefined time after acquiring the representative image, such as within 0.5, 1.0, 1.5, 2.0, or 2.5 seconds after acquiring the representative image. In some embodiments, the first sequence of images includes a predefined number of images—such as 5, 10, 15, 20, 25, or 30 images—acquired after detecting activation of the shutter button at the first time. In some embodiments, the images acquired after detecting activation of the shutter button at the first time are images that are within a predefined time after the first time, such as within 0.5, 1.0, 1.5, 2.0, or 2.5 seconds after the first time. In some embodiments, the plurality of images, in the first sequence of images, that are acquired after acquiring the representative image meet predefined grouping criteria. In some embodiments, the predefined grouping criteria include selecting a predefined number of images after the representative image. In some embodiments, the predefined grouping criteria include selecting images in a predefined range of time immediately after detecting activation of the shutter button. In some embodiments, the predefined grouping criteria include selecting images in a predefined range of time immediately after the time at which the representative image is acquired. In some embodiments, the predefined grouping criteria include selecting images based on scene recognition and/or movement of the device.

In some embodiments, the action capture criteria include (2610) recognizing one or more faces in the scene. In some embodiments, when the device recognizes at least one face in the scene, the device retains and groups the plurality of images.

In some embodiments, the device includes (2612) default image capture parameters for acquiring images. The device determines (2614) that the scene contains a single face in portrait orientation, the single face occupying more than a predetermined amount of the display. In response to determining that the scene contains the single face in portrait orientation, the single face occupying more than a predetermined amount of the display: the device acquires (2616) (and/or retains) the plurality of images with image capture parameters that are distinct from the default image capture parameters (e.g., higher frame rate to capture small changes in expression, higher resolution to better capture detail, etc.).

In some embodiments, the action capture criteria include (2618) recognizing motion in the scene (e.g., detecting motion (e.g., in the live preview) above a predetermined threshold value). In some embodiments, when the device recognizes at least a predefined threshold amount of motion in the scene, the device retains and groups the plurality of images.

In some embodiments, performing scene recognition on the scene includes (2620) determining an amount of motion in the scene. Retaining the plurality of images acquired by the camera in temporal proximity to the activation of the shutter button at the first time includes: in accordance with a determination that the amount of motion is a first amount, retaining the plurality of images at a first frame rate; and in accordance with a determination that the amount of motion is a second amount that is greater than the first amount, retaining images at a second frame rate that is higher than the first frame rate.

In some circumstances, the electronic device itself is moving (e.g., panning, and/or translating). In some embodiments, the action capture criteria include (2622) detecting movement of the electronic device above a predetermined threshold value. In some embodiments, certain properties of the movement of the device indicate that the device is being aimed at a moving scene (e.g., the device is panned while remaining substantially level). When the device determines that the device is being aimed, the device retains and groups the plurality of images. For example, in some circumstances, the device is panned to track a subject (e.g., an athlete playing a sport, a car passing by, etc.). In some embodiments, detecting the movement of the electronic device includes detecting acceleration of the device using accelerometers 168 (FIG. 1A).

In some embodiments, the number of images in the retained plurality of images depends (2624) on detected movement of the device while the plurality of images was acquired. For example, the device recognizes when it is being translated (e.g., attached to a helmet of a mountain biker or skier). When the device is being translated faster (e.g., as indicated by vibrations and or quick changes in acceleration), the device retains and groups the plurality of images at a higher frame rate, and/or for a longer period of time, resulting in a greater number of images retained in the plurality of images.

In some embodiments, performing scene recognition includes recognizing a landscape with activity (e.g., a waterfall, a windmill, trees with leaves blowing in the wind). When the device recognizes that the device is capturing a landscape with activity, the device retains and groups the plurality of images (e.g., as an enhanced photo). In some embodiments, enhanced photos of landscapes playback in a loop so that the landscape scene appears continuous.

Conversely, the device acquires a single image in response to detecting the single activation of the shutter button at the first time (without grouping a plurality of images acquired by the camera in temporal proximity to the activation of the shutter button at the first time into a first sequence of images), in accordance with a determination that no faces are present in the scene, there is no significant movement in the scene, and/or the electronic device itself is not moving (e.g., the device is stationary). In some embodiments, the single image is a still image that merges a plurality of still images, such as a high dynamic range (HDR) still image.

In some embodiments, certain properties of the movement of the device indicate that the device is not being aimed (e.g., is being taken out of the user's pocket and/or is being lifted up to aim at the scene). When the device determines that it is moving without being aimed, the device retains a single image.

In some embodiments, performing scene recognition on the scene includes (2626) recognizing text. The action capture criteria include a criterion that is met when an amount of text in the scene is below a predefined threshold. In some embodiments, the device recognizes when the picture is of a receipt or document. When the picture is of a receipt or document, the device captures a still image rather than an enhanced photo.

It should be understood that the particular order in which the operations in FIGS. 26A-26D have been described is merely exemplary and is not intended to indicate that the described order is the only order in which the operations could be performed. One of ordinary skill in the art would recognize various ways to reorder the operations described herein. In some implementations, one or more operations described herein may be omitted. For example, in some embodiments, operations 2610 and 2612 are omitted. Additionally, it should be noted that details of other processes described herein with respect to other methods described herein (e.g., methods 900, 1000, 10000, 10050, 1100, 11000, 1200, 2400, 2500, and 2700) are also applicable in an analogous manner to method 2600 described above with respect to FIGS. 26A-26D. For example, the contacts, gestures, user interface objects, intensity thresholds, animations, and sequences of images, described above with reference to method 2600 optionally have one or more of the characteristics of the contacts, gestures, user interface objects, intensity thresholds, animations, and sequences of images described herein with reference to other methods described herein (e.g., methods 900, 1000, 10000, 10050, 1100, 11000, 1200, 2400, 2500, and 2700). For brevity, these details are not repeated here.

FIGS. 27A-27D illustrate a flow diagram of a method 2700 of trimming a sequence of images (e.g., an enhanced photo), in accordance with some embodiments. The method 2700 is performed at an electronic device (e.g., device 300, FIG. 3, or portable multifunction device 100, FIG. 1A) with a display, a camera, and, optionally, a touch-sensitive surface. In some embodiments, the device includes one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 2700 are, optionally, combined and/or the order of some operations is, optionally, changed.

In accordance with some embodiments, the device provides a user interface for trimming a sequence of image to a subset of the sequence of images (e.g., modifying the beginning and ending image in the sequence of images). When a user requests to trim an enhanced photo, the device provides movable handles that the user can use to modify the beginning and ending images in the sequence of images. The initial location of the handles (e.g., when the user first enters the user interface for trimming the sequence of images) are automatically provided by the device (e.g., based on scene detection). In some embodiments, the user can toggle the locations of the handles between the automatically suggested beginning and ending images and the initial and final images in the sequence of images. As used herein, the terms "initial image" and "final image" refer to the first and last images in the (original) sequence of images, whereas "beginning image" and "ending image" refer to the first and last images in the subset of the sequence of images.

To that end, the device displays (2702) an image on a display (e.g., while the device is in an image editing mode).

The image is one image in a sequence of images taken by a camera. The sequence of images includes a representative image. The sequence of images includes one or more images acquired by the camera after acquiring the representative image. The sequence of images includes one or more images acquired by the camera before acquiring the representative image. In some embodiments, the camera that took the sequence of images is part of the electronic device. In some embodiments, the sequence of images was taken by a camera that is not part of the electronic device (e.g., the sequence of images was transferred to the electronic device after being taken with a camera on another device). In some embodiments, the sequence of images was obtained in response to detecting activation of a shutter button at a first time, as described herein with respect to FIGS. 5A-5K and method 900 and/or FIGS. 22A-22D and method 2600. In some embodiments, the representative image corresponds to the representative image acquired by the camera, as described herein with respect to FIGS. 5A-5K and method 900 and/or FIGS. 22A-22D and method 2600.

In some embodiments, while displaying the image, the device displays a visual indication that the image is a respective image in a sequence of images (e.g., the device displays an indication that the image is from an enhanced photo). In some embodiments, the visual indication that the image is a respective image in a sequence of images is an affordance (e.g., selectable affordance 2304, FIG. 23A). In some embodiments, the affordance is animated when an enhanced photo is displayed, and the affordance is not animated when a still image is displayed. In some embodiments, activation of the affordance results in display of an editing menu, from which the user can select functionality to trim the sequence of images. In some embodiments, some operations of the method 2700 are performed after the user activates the functionality to trim a sequence of images.

In some embodiments, the displayed image is (2704) the representative image from the sequence of images.

In some embodiments, the displayed image is (2706) a currently selected image from the sequence of images. In some embodiments, the currently selected image is visually distinguished from the other images in the sequence of images. In some embodiments, the currently selected image is concurrently displayed in the second area (described below) with a representation (e.g., a thumbnail) of the currently selected image in the area that contains representations of images in the sequence of images. In some embodiments, selection of a given image replaces the representative image with the given image as a new representative image. In some embodiments, the user can select a new representative image for the sequence of images by tapping on a thumbnail of a given image in the sequence of images to select a new representative image.

While displaying the image in the sequence of images on the display, the device detects (2708) a first input (e.g., detects an input that corresponds to a request to display a user interface for trimming the sequence of images, such as a tap gesture on trim icon 2310-3 in FIG. 23B).

In response to detecting the first input: the device displays (2710) a user interface for trimming the sequence of images to a subset, less than all, of the sequence of images. In some embodiments, the user interface is part of a trimming mode.

The user interface includes: an area (e.g., a strip, such as strip 2316, FIG. 23C) that contains representations of images in the sequence of images; a user-adjustable begin-trim icon (e.g., begin handle 2320-a, FIG. 23C) that delimits a beginning image in the subset of the sequence of images via a position of the begin-trim icon in the area that contains representations of images in the sequence of images; and a user-adjustable end-trim icon (e.g., end handle 2320-*b*, FIG. 23C) that delimits an ending image in the subset of the sequence of images via a position of the end-trim icon in the area that contains representations of images in the sequence of images. In some embodiments, the representations of images are smaller than the displayed image. In some embodiments, the representations of images are thumbnails of images in the sequence of images. In some embodiments, the representations of images are arranged in chronological order.

The begin-trim icon is located at a first position, in the area that contains representations of images in the sequence of images, that is automatically selected by the device. The end-trim icon is located at a second position, in the area that contains representations of images in the sequence of images, that is automatically selected by the device. In some embodiments, the beginning image for the subset that is automatically selected by the device (which is shown by the first position of the begin-trim icon) is not the initial image in the sequence of images. In some embodiments, the beginning image for the subset is a later image in the sequence of images than the initial image. In some embodiments, the ending image for the subset that is automatically selected by the device (which is shown by the second position of the end-trim icon) is not the final image in the sequence of images. In some embodiments, the ending image for the subset is an earlier image in the sequence of images than the final image.

In some embodiments, representations of images between the begin-trim icon and the end-trim icon are (2712) visually distinguished from the other representations in the area that contains representations of images in the sequence of images. In some embodiments, both the sequence of images and the subset of the sequence of images include an uninterrupted consecutive set of images acquired by the camera.

In some embodiments, the user interface for trimming the sequence of images includes (2714) a second area that displays the image in the sequence of images. The second area is displayed concurrently with the area that contains representations of images in the sequence of images. In some embodiments, the second region occupies more than half of the display, more than 80% of the display, or more than 90% of the display. In some embodiments, the second region of the display occupies the entire region of the display save optional menu bars at the top and bottom of the display and the area that contains representations of images in the sequence of images.

In some embodiments, automatically selecting the beginning image in the subset and the corresponding first position of the begin-trim icon is (2716) based on one or more characteristics of the images in the sequence of images. Automatically selecting the ending image in the subset and the corresponding second position of the begin-trim icon is based on one or more characteristics of the images in the sequence of images. In some embodiments, the device selects/suggests the beginning image and the ending image in the subset based on scene recognition on the sequence of images.

In some embodiments, the sequence of images includes (2718) an initial image and a final image. The device displays, in the area that contains representations of images in the sequence of images, one or more representations of images, not included in the sequence of images, that were obtained before the initial image in the sequence of images and/or that were obtained after the final image in the sequence of images. In some embodiments, in addition to trimming the original sequence of images, a user is also able to add images obtained just before or just after the original sequence of images.

In some embodiments, prior to detecting the second input, while displaying the user interface for trimming the sequence of images, the device detects (2720) an input on the end-trim icon. In response to detecting the input on the end-trim icon, the device moves the end-trim icon from the second position to a third position in the area that contains representations of images in the sequence of images. In some embodiments, a user is able to manually override the ending image for the subset that was automatically recommended/selected by the device. Similarly, in some embodiments, a user is able to manually override the beginning image for the subset that was automatically recommended/selected by the device, e.g., with a drag gesture that starts on the begin-trim icon and moves the begin-trim icon from the first position to another position in the area that contains representations of images in the sequence of images.

While displaying the user interface for trimming the sequence of images, the device detects (2722) a second input (e.g., detects activation of done icon 2301, FIG. 23C), or another icon that initiates trimming in accordance with the current positions of the begin-trim icon and the end-trim icon).

In response to detecting a second input, the device trims (2724) the sequence of images to the subset of the sequence of images in accordance with a current position of the begin-trim icon and a current position of the end-trim icon. In some embodiments, trimming the sequence of images to the subset of the sequence of images includes storing data indicating a position of the beginning image in the subset and the ending image in the subset.

In some embodiments, the device deletes (2726) images, from the sequence of images, which are not included in the subset of the sequence of images. In some embodiments, the device edits the sequence of images to include only those images in the subset (which were automatically selected/suggested by the device and confirmed by the user, or which were manually selected by the user). In some embodiments, the device continues to store the images that are not in the subset, e.g., so that the user can further modify the sequence of images at a later time with all of the original images in the sequence of images available (e.g., as obtained by the camera).

In some embodiments, the sequence of images includes (2728) an initial image and a final image, and the user interface includes a reset affordance (e.g., reset button 2324, FIG. 23C), a "manual" button, or other similar icon). Prior to detecting the second input, while displaying the user interface for trimming the sequence of images, the device detects an input on the reset affordance (e.g., a tap gesture on reset button 2324, FIG. 23C). In response to detecting the input on the reset affordance: the device displays, the begin-trim icon at a position, in the area that contains representations of images in the sequence of images, that corresponds to delimiting the initial image in the sequence of images; and displays the end-trim icon at a position, in the area that contains representations of images in the sequence of images, that corresponds to delimiting the final image in the sequence of images.

In some embodiments, in response to detecting the input on the reset affordance: the device displays (2730) an automatic selection affordance (e.g., "auto" icon 2332, FIG. 23D) that when activated displays the begin-trim icon at the first position and the end-trim icon at the second position, in the area that contains representations of images in the sequence of images. In some embodiments, display of the "auto" icon replaces display of the "reset" icon.

In some embodiments, in response to detecting a third input, the device selects (2732) a new representative image for the subset of the sequence of images (e.g., an image at the middle of the subset or an image selected based on scene recognition performed on the subset of the sequence of images).

In some embodiments, after trimming the sequence of images to the subset of the sequence of images in accordance with the current position of the begin-trim icon and the current position of the end-trim icon, the device displays (2734) a representative image of the subset of the sequence of images on the display (e.g., while the device is in an image presentation mode). In some embodiments, the representative image of the subset of the sequence of images is the same as the representative image of the sequence of images. In some embodiments, the representative image of the subset of the sequence of images is different from the representative image of the sequence of images. In some embodiments, the representative image of the subset is displayed in response to an input that corresponds to a request to exit the editing mode. While displaying the representative image on the display, the device detects a third input (e.g., an input that corresponds to a request to playback the subset of the sequence of images, such as a press-and-hold gesture or a gesture that meets contact intensity criteria for playback). In response to detecting the third input, the device replaces display of the representative image with an animated playback of the subset of the sequence of images. In some embodiments, the subset of the sequence of images is played back in an analogous manner to playback of the sequence of images, as described herein with respect to FIGS. 6A-6FF and methods 1000/10000/10050.

In some embodiments, in response to detecting a fourth input, the device disables (2736) the animated playback of the subset of the sequence of images while retaining the subset of images.

In some embodiments, in response to detecting a third input that corresponds to a request to edit the representative image, the device provides (2738) a user of the device with options to: continue editing the representative image with the animated playback of the subset of the sequence of images disabled; and cancel editing the representative image.

In some embodiments, the device presents (2740) an affordance for deleting images in the sequence of images other than the representative image. In response to detecting a third input, the device deletes the one or more images acquired by the camera after acquiring the representative image and the one or more images acquired by the camera before acquiring the representative image.

It should be understood that the particular order in which the operations in FIGS. 27A-27E have been described is merely exemplary and is not intended to indicate that the described order is the only order in which the operations could be performed. One of ordinary skill in the art would recognize various ways to reorder the operations described herein. In some implementations, one or more operations described herein may be omitted. For example, in some embodiments, operations 2714 and 2716 are omitted. Additionally, it should be noted that details of other processes described herein with respect to other methods described herein (e.g., methods 900, 1000, 10000, 10050, 1100, 11000, 1200, 2400, 2500, and 2600) are also applicable in an analogous manner to method 2700 described above with respect to FIGS. 27A-27E. For example, the contacts, gestures, user interface objects, intensity thresholds, animations, and sequences of images, described above with reference to method 2700 optionally have one or more of the characteristics of the contacts, gestures, user interface objects, intensity thresholds, animations, and sequences of images described herein with reference to other methods described herein (e.g., methods 900, 1000, 10000, 10050, 1100, 11000, 1200, 2400, 2500, and 2600). For brevity, these details are not repeated here.

Figure 28:
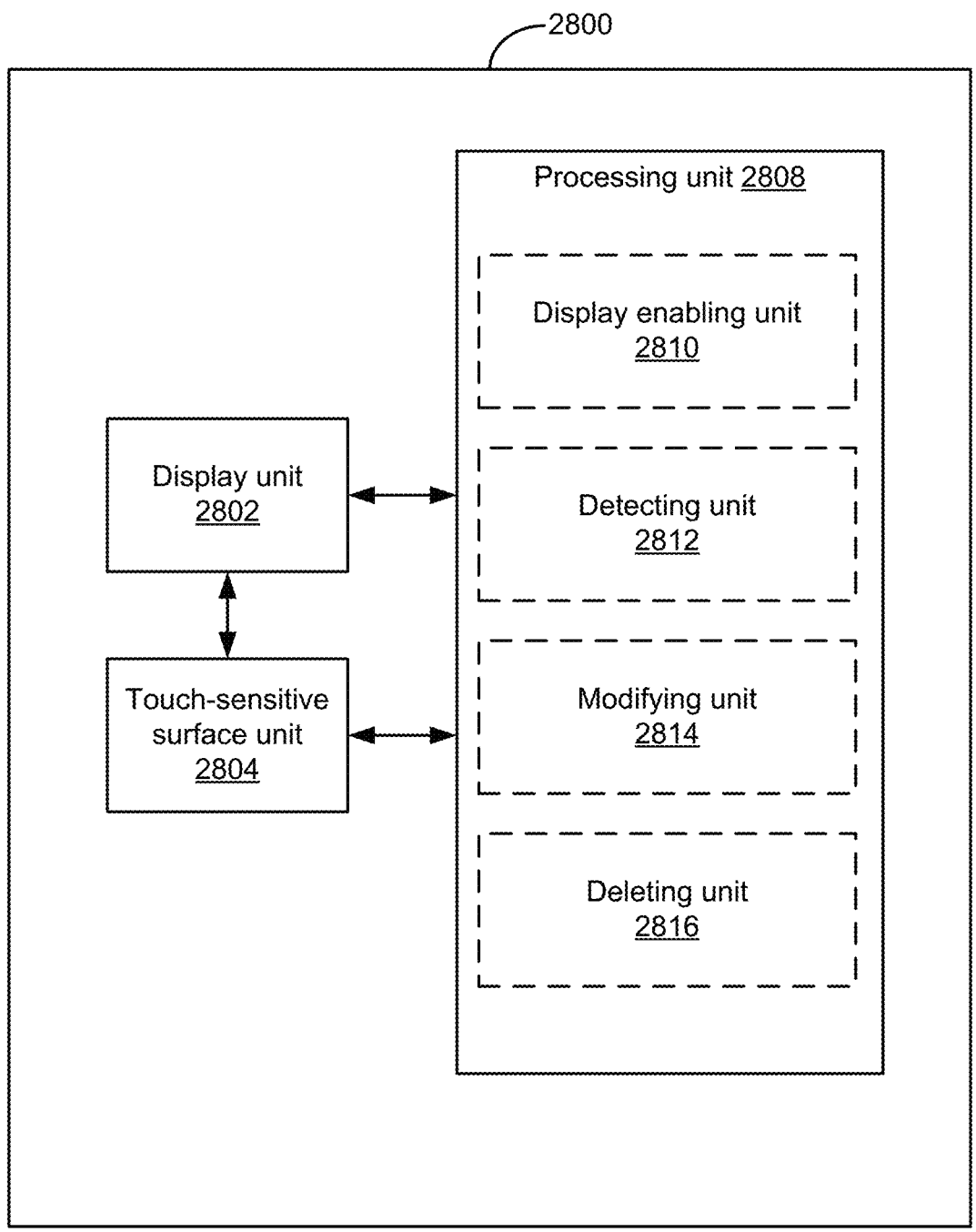
FIGS. 28-31 are functional block diagrams of electronic devices in accordance with some embodiments.

In accordance with some embodiments, FIG. 28 shows a functional block diagram of an electronic device 2800 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 28 are, optionally, combined or separated into sub-blocks to implement the principles of the various described embodiments. Therefore, the description herein optionally supports any possible combination or separation or further definition of the functional blocks described herein.

As shown in FIG. 28, an electronic device 2800 includes a display unit 2802 configured to display images; a touch-sensitive surface unit 2804 configured to detect inputs; and a processing unit 2808 coupled with the display unit 2802 and the touch-sensitive surface unit 2804. In some embodiments, the processing unit 2808 includes a display enabling unit 2810, a detecting unit 2812, a modifying unit 2814, and a deleting unit 2816.

The processing unit 2808 is configured to enable (e.g., with the display enabling unit 2810) display of a representative image on the display unit 2812. The representative image is one image in a sequence of images taken by a camera. The sequence of images includes one or more images acquired by the camera after acquiring the representative image. The sequence of images includes one or more images acquired by the camera before acquiring the representative image. The processing unit 2808 is further configured to, while enabling display of the representative image on the display unit 2802, detect (e.g., with the detecting unit 2812, in conjunction with the touch-sensitive surface unit 2804) an input to modify the representative image. The processing unit 2808 is further configured to, in response to detecting the input to modify the representative image: in accordance with a determination that the device is in a first editing mode, modify (e.g., with the modifying unit 2814) the representative image, the one or more images acquired by the camera after acquiring the representative image, and the one or more images acquired by the camera before acquiring the representative image; and, in accordance with a determination that the device is in a second editing mode, distinct from the first editing mode, modify (e.g., with the modifying unit 2814) the representative image, without modifying the one or more images acquired by the camera after acquiring the representative image, and without modifying the one or more images acquired by the camera before acquiring the representative image.

Figure 29:
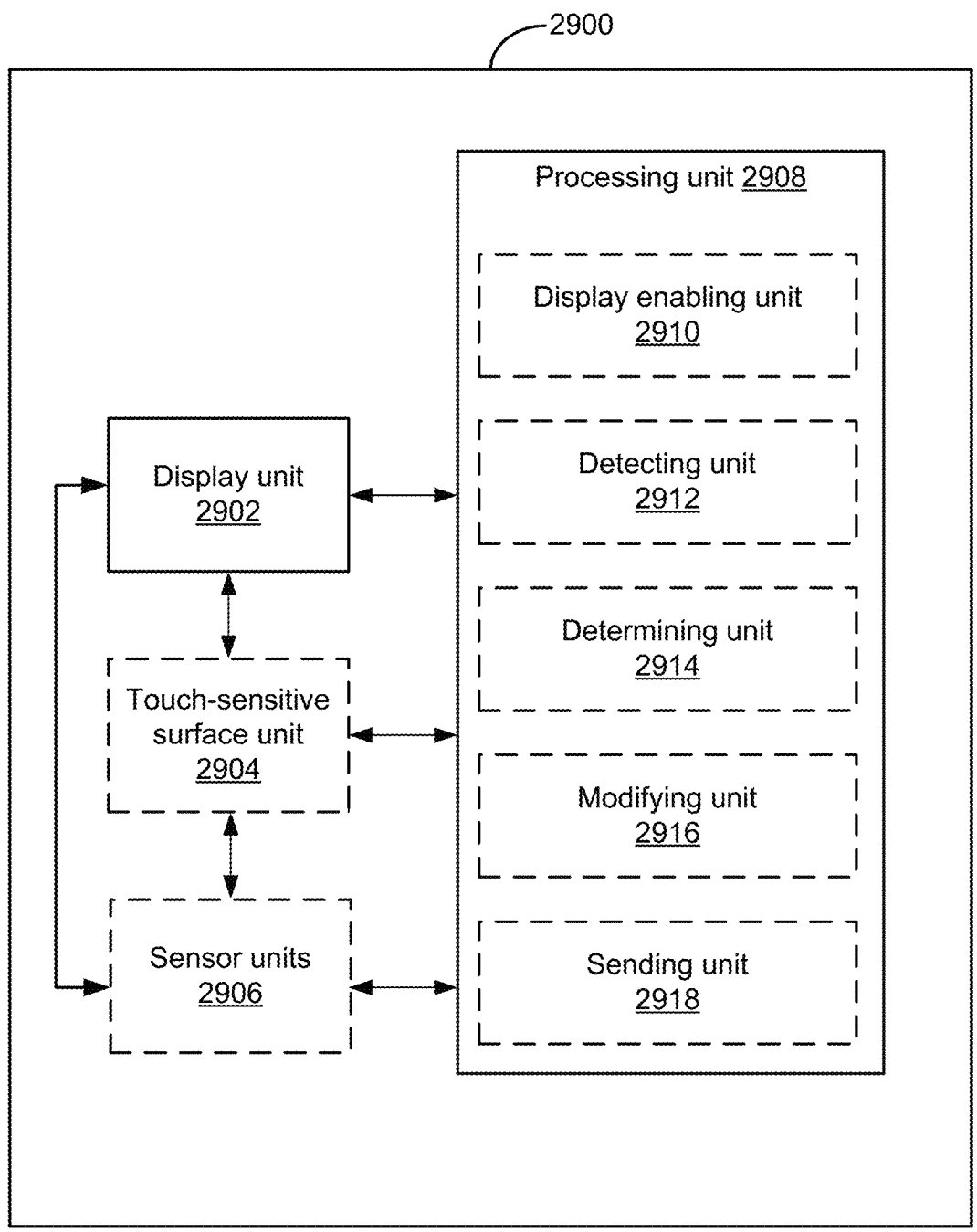

In accordance with some embodiments, FIG. 29 shows a functional block diagram of an electronic device 2900 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 29 are, optionally, combined or separated into sub-blocks to implement the principles of the various described embodiments. Therefore, the description herein optionally supports any possible combination or separation or further definition of the functional blocks described herein.

As shown in FIG. 29, a first electronic device 2900 includes a display unit 2902 configured to display images; an optional touch-sensitive surface unit 2904 configured to detect inputs; one or more optional sensor units 2906 configured to detect intensity of contacts with the touch-sensitive surface unit 2904; and a processing unit 2908 coupled with the display unit 2902, the optional touch-sensitive surface unit 2904, and the one or more optional sensor units 2906. In some embodiments, the processing unit 2908 includes a display enabling unit 2910, a detecting unit 2912, a determining unit 2914, a modifying unit 2916, and a sending unit 2918.

The processing unit 2908 is configured to enable (e.g., with display enabling unit 2910) display, on the display unit 2902, of a representative image in a user interface of an application that is configured to communicate with other electronic devices. The representative image is one image in a sequence of images taken by a camera. The sequence of images includes one or more images acquired by the camera after acquiring the representative image. The sequence of images includes one or more images acquired by the camera before acquiring the representative image. The processing unit 2908 is further configured to, while enabling display of the representative image on the display unit 2902, detect (e.g., with detecting unit 2912, in conjunction with touch-sensitive surface unit 2904) an input that corresponds to a request to send the representative image or a request to select the representative image for sending to a second electronic device, remote from the electronic device, using the application. The processing unit 2908 is further configured to, in response to detecting the input that corresponds to the request to send the representative image or to the request to select the representative image for sending to the second electronic device: in accordance with a determination that the second electronic device is configured to interact with the sequence of images as a group, enable (e.g., with display enabling unit 2910) display of a first set of options for sending at least a portion of the sequence of images to the second electronic device; and, in accordance with a determination that the second electronic device is not configured to interact with the sequence of images as a group, enable (e.g., with display enabling unit 2910) display of a second set of options for sending at least a portion of the sequence of images to the second electronic device. The second set of options is different from the first set of options.

Figure 30:
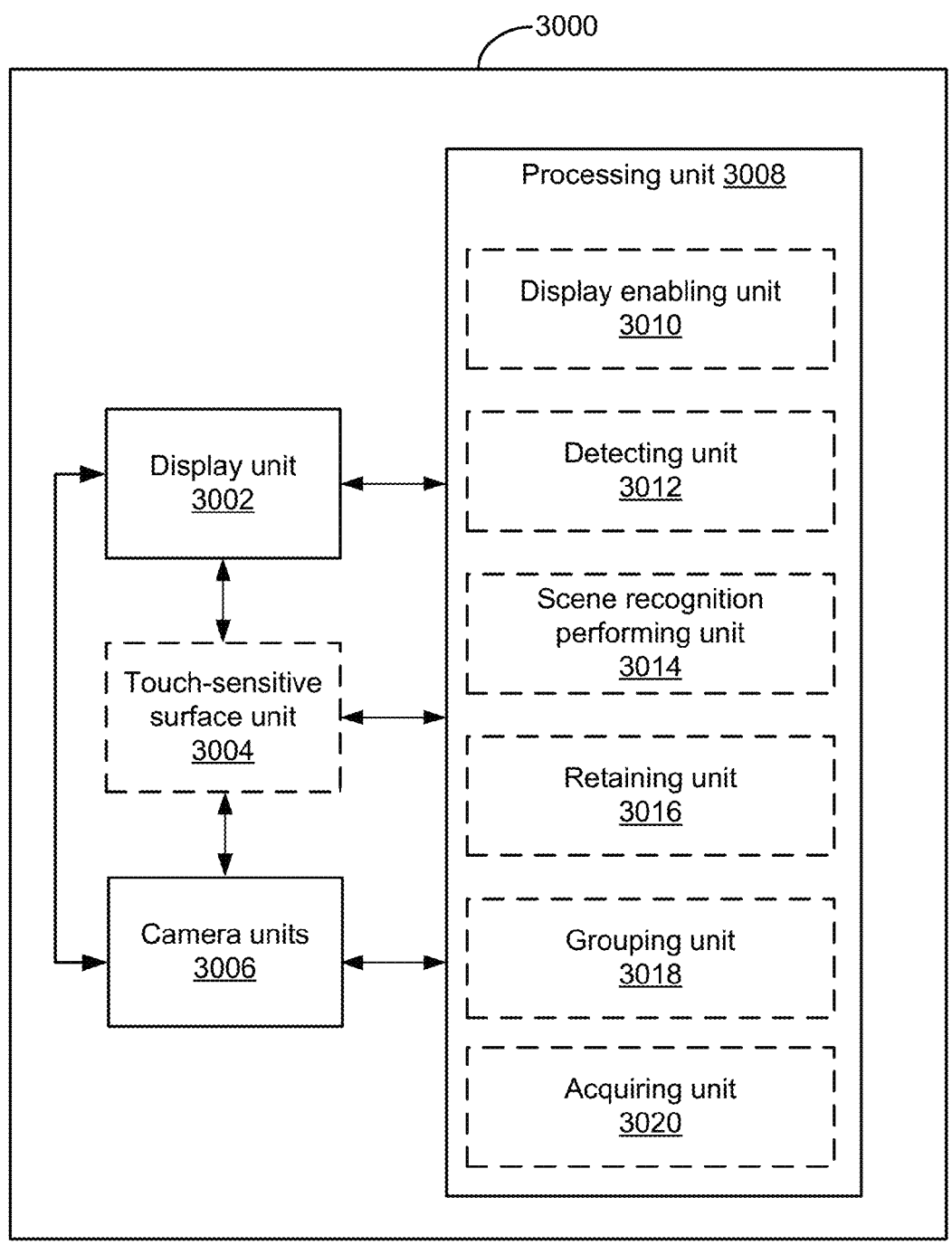

In accordance with some embodiments, FIG. 30 shows a functional block diagram of an electronic device 3000 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 30 are, optionally, combined or separated into sub-blocks to implement the principles of the various described embodiments. Therefore, the description herein optionally supports any possible combination or separation or further definition of the functional blocks described herein.

As shown in FIG. 30, an electronic device 3000 includes a display unit 3002 configured to display images; an optional touch-sensitive surface unit 3004 configured to detect inputs; a camera unit 2906 configured to acquire images, and a processing unit 3008 coupled with the display unit 3002 and the optional touch-sensitive surface unit 3004, and the camera unit 2906. In some embodiments, the processing unit 3008 includes a display enabling unit 3010, a detecting unit 3012, a scene recognition performing unit 3014, a retaining unit 3016, a grouping unit 3018, and an acquiring unit 3020.

The processing unit 3008 is configured to, while in a first media acquisition mode for the camera unit 3006: enable (e.g., with display enabling unit 3010) display of a live preview of a scene on the display unit 3002 and perform (e.g., with scene recognition performing unit 3014) scene recognition on the scene. The processing unit 3008 is further configured to, while enabling display of the live preview of the scene, detect (e.g., with detecting unit 3012, in conjunction with touch-sensitive surface unit 3004) a single activation of a shutter button at a first time. The processing unit 3008 is further configured to, in response to detecting the single activation of the shutter button at the first time: in accordance with a determination that the scene meets action capture criteria, based at least in part on the scene recognition performed on the scene, retain (e.g., with retaining unit 3016) a plurality of images acquired by the camera unit 3006 in temporal proximity to the activation of the shutter button at the first time and group (e.g., with grouping unit 3018) the plurality of images into a first sequence of images. The first sequence of images includes: a plurality of images acquired by the camera unit 3006 prior to detecting activation of the shutter button at the first time; a representative image that represents the first sequence of images and was acquired by the camera unit 3006 after one or more of the other images in the first sequence of images; and a plurality of images acquired by the camera unit 3006 after acquiring the representative image. The processing unit 3008 is further configured to, in accordance with a determination that the scene does not meet the action capture criteria, retain (e.g., with retaining unit 3016) a single image in temporal proximity to the activation of the shutter button at the first time.

Figure 31:
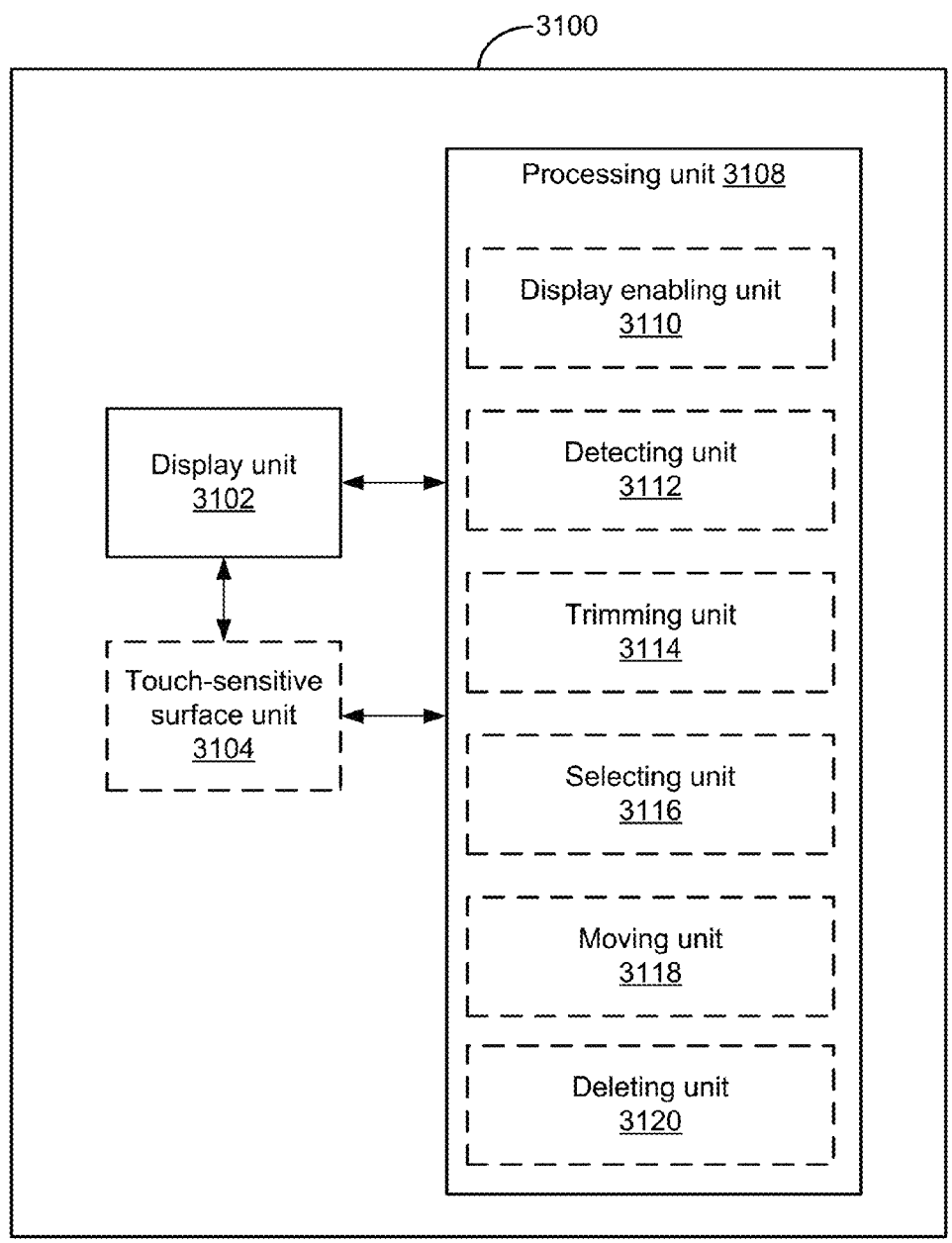

In accordance with some embodiments, FIG. 31 shows a functional block diagram of an electronic device 3100 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 31 are, optionally, combined or separated into sub-blocks to implement the principles of the various described embodiments. Therefore, the description herein optionally supports any possible combination or separation or further definition of the functional blocks described herein.

As shown in FIG. 31, an electronic device 3100 includes a display unit 3102 configured to display images; a touch-sensitive surface unit 3104 configured to detect inputs; and a processing unit 3108 coupled with the display unit 3102 and the touch-sensitive surface unit 3104. In some embodiments, the processing unit 3108 includes a display enabling unit 3110, a detecting unit 3112, a trimming unit 3114, a selecting unit 3116, a moving unit 3118, and a deleting unit 3120.

The processing unit 3108 is configured to enable display (e.g., with the display enabling unit 3110) of an image on the display unit 3102. The image is one image in a sequence of images taken by a camera. The sequence of images includes a representative image. The sequence of images includes one or more images acquired by the camera after acquiring the representative image. The sequence of images includes one or more images acquired by the camera before acquiring the representative image.

The processing unit 3108 is further configured to, while enabling display of the image in the sequence of images on the display unit 3102, detect (e.g., with detecting unit 3112) a first input. The processing unit 3108 is further configured to, in response to detecting the first input, enable display (e.g., with display enabling unit 3110) of a user interface for trimming the sequence of images to a subset, less than all, of the sequence of images. The user interface includes: an area that contains representations of images in the sequence of images; a user-adjustable begin-trim icon that delimits a beginning image in the subset of the sequence of images via a position of the begin-trim icon in the area that contains representations of images in the sequence of images; and a user-adjustable end-trim icon that delimits an ending image in the subset of the sequence of images via a position of the end-trim icon in the area that contains representations of images in the sequence of images. The begin-trim icon is located at a first position, in the area that contains representations of images in the sequence of images, that is automatically selected by the device. The end-trim icon is located at a second position, in the area that contains representations of images in the sequence of images, that is automatically selected by the device.

The processing unit 3108 is further configured to, while enabling display of the user interface for trimming the sequence of images, detect (e.g., with detecting unit 3112) a second input. The processing unit 3108 is further configured to, in response to detecting a second input, trim (e.g., with trimming unit 3114) the sequence of images to the subset of the sequence of images in accordance with a current position of the begin-trim icon and a current position of the end-trim icon.

The operations in methods described above are, optionally implemented by running one or more functional modules in information processing apparatus such as general purpose processors (e.g., as described above with respect to FIGS. 1A and 3) or application specific chips. The operations described above with reference to FIGS. 9A-9G are, optionally, implemented by components depicted in FIGS. 1A-1B or FIG. 13. For example, detection operation 908 is, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. For example, the methods described herein are also applicable in an analogous manner to electronic devices configured for management, playback, and/or streaming (e.g., from an external server) of audio and/or visual content that are in communication with a remote control and a display (e.g., Apple TV from Apple Inc. of Cupertino, Calif.). For such devices, inputs are optionally received that correspond to gestures on a touch-sensitive surface of the remote control, voice inputs to the remote control, and/or activation of buttons on the remote control, rather than having the touch-sensitive surface, audio input device (e.g., a microphone), and/or buttons on the device itself. For such devices, data is optionally provided to the display rather than displayed by the device itself. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with a display and a touch-sensitive surface:
        storing a plurality of sequences of images, wherein a respective sequence of images includes:
            a respective representative image taken by a camera, and
            one or more images acquired by the camera before acquiring the respective representative image;
        displaying a first representative image for a first sequence of images in a movable first area on the display;
        detecting a gesture on the touch-sensitive surface, the gesture including movement by a contact that corresponds to movement in a first direction on the display;
        in response to detecting the gesture on the touch-sensitive surface:
            moving the first area in the first direction on the display;
            moving a movable second area in the first direction on the display; and,
            in accordance with a determination that sequence-display criteria are met, while moving the second area in the first direction, displaying, in chronological order in the second area, at least some of the one or more images for a second sequence of images acquired by the camera before acquiring a second representative image for the second sequence of images.

2. The method of claim 1, including:
    in response to detecting the gesture on the touch-sensitive surface:
        in accordance with a determination that the sequence-display criteria are not met, while moving the second area in the first direction, displaying the second representative image for the second sequence of images in the movable second area on the display.

3. The method of claim 1, wherein the sequence-display criteria include a criterion that the contact lifts off prior to displaying, in chronological order in the second area, at least some of the one or more images for the second sequence of images acquired by the camera before acquiring the second representative image.

4. The method of claim 1, wherein moving the movable second area in the first direction on the display includes displaying a respective prior image that was acquired prior to acquiring the second representative image in the second region.

5. The method of claim 1, wherein the sequence-display criteria include detecting liftoff of the contact; and the method includes:
in response to detecting liftoff of the contact, continuing to move the moveable second area in the first direction and continuing to move the moveable first area in the first direction, wherein the images from the second sequence of images are displayed at a rate such that the second representative image is displayed in the moveable second area when the moveable second area stops moving in the first direction.

6. The method of claim 1, including while moving the moveable first region, displaying a simulated parallax effect for an image within the moveable first region such that the image within the moveable first region shifts relative to a frame of the moveable first region.

7. The method of claim 1, including while moving the moveable second region while the contact is detected on the touch-sensitive surface, displaying a simulated parallax effect for an image within the moveable second region such that the image within the moveable second region shifts relative to a frame of the moveable second region.

8. The method of claim 1, wherein a respective sequence of images includes one or more images acquired by the camera after acquiring the respective representative image.

9. The method of claim 1, wherein moving the first area in the first direction includes moving at least part of the first area off of the display in the first direction.

10. The method of claim 1, wherein moving the second area in the first direction includes moving at least part of the second area onto the display in the first direction.

11. The method of claim 1, including, after moving the second area in the first direction, displaying the second representative image for the second sequence of images in the second area.

12. The method of claim 11, including:
while displaying the second representative image for the second sequence of images in the second area, detecting a change in intensity of an input corresponding to the second representative image; and
in response to detecting the change in intensity of the input, advancing through the second sequence of images in the second area without moving the second area on the display.

13. The method of claim 1, including:
detecting termination of the gesture while moving the first area and the second area; and
in response to detecting termination of the gesture while moving the first area and the second area:
in accordance with a determination that the gesture meets next-sequence-navigation criteria:
moving the first area completely off the display in the first direction;
moving the second area completely onto the display; and
displaying the second representative image for the second sequence of images in the second area.

14. The method of claim 13, including:
in response to detecting termination of the gesture while moving the first area and the second area:
in accordance with a determination that the gesture does not meet the next-sequence-navigation criteria:
moving the second area completely off the display in a second direction, opposite the first direction;
moving the first area completely onto the display; and
displaying the first representative image for the first sequence of images in the first area.

15. The method of claim 1, wherein the first sequence of images is a message in a message conversation displayed in a scrollable region of a messaging application, and the first sequence of images is displayed as the scrollable region of the messaging application is scrolled.

16. An electronic device, comprising:
a display;
a touch-sensitive surface;
one or more processors;
memory; and
one or more programs, wherein the one or more programs are stored in the memory and configured to be executed by the one or more processors, the one or more programs including instructions for:
storing a plurality of sequences of images, wherein a respective sequence of images includes:
a respective representative image taken by a camera, and
one or more images acquired by the camera before acquiring the respective representative image;
displaying a first representative image for a first sequence of images in a movable first area on the display;
detecting a gesture on the touch-sensitive surface, the gesture including movement by a contact that corresponds to movement in a first direction on the display;
in response to detecting the gesture on the touch-sensitive surface:
moving the first area in the first direction on the display;
moving a movable second area in the first direction on the display; and,
in accordance with a determination that sequence-display criteria are met, while moving the second area in the first direction, displaying, in chronological order in the second area, at least some of the one or more images for a second sequence of images acquired by the camera before acquiring a second representative image for the second sequence of images.

17. The electronic device of claim 16, including instructions for:
in response to detecting the gesture on the touch-sensitive surface:
in accordance with a determination that the sequence-display criteria are not met, while moving the second area in the first direction, displaying the second representative image for the second sequence of images in the movable second area on the display.

18. The electronic device of claim 16, wherein the sequence-display criteria include a criterion that the contact lifts off prior to displaying, in chronological order in the second area, at least some of the one or more images for the second sequence of images acquired by the camera before acquiring the second representative image.

19. The electronic device of claim 16, wherein moving the movable second area in the first direction on the display includes displaying a respective prior image that was acquired prior to acquiring the second representative image in the second region.

20. The electronic device of claim 16, wherein the sequence-display criteria include detecting liftoff of the contact; and the electronic device includes instructions for:
in response to detecting liftoff of the contact, continuing to move the moveable second area in the first direction and continuing to move the moveable first area in the first direction, wherein the images from the second sequence of images are displayed at a rate such that the second representative image is displayed in the moveable second area when the moveable second area stops moving in the first direction.

21. The electronic device of claim 16, including instructions for, while moving the moveable first region, displaying a simulated parallax effect for an image within the moveable first region such that the image within the moveable first region shifts relative to a frame of the moveable first region.

22. The electronic device of claim 16, including instructions for, while moving the moveable second region while the contact is detected on the touch-sensitive surface, displaying a simulated parallax effect for an image within the moveable second region such that the image within the moveable second region shifts relative to a frame of the moveable second region.

23. The electronic device of claim 16, wherein a respective sequence of images includes one or more images acquired by the camera after acquiring the respective representative image.

24. The electronic device of claim 16, wherein moving the first area in the first direction includes moving at least part of the first area off of the display in the first direction.

25. The electronic device of claim 16, wherein moving the second area in the first direction includes moving at least part of the second area onto the display in the first direction.

26. The electronic device of claim 16, including instructions for, after moving the second area in the first direction, displaying the second representative image for the second sequence of images in the second area.

27. The electronic device of claim 26, including instructions for:
while displaying the second representative image for the second sequence of images in the second area, detecting a change in intensity of an input corresponding to the second representative image; and
in response to detecting the change in intensity of the input, advancing through the second sequence of images in the second area without moving the second area on the display.

28. The electronic device of claim 16, including instructions for:
detecting termination of the gesture while moving the first area and the second area; and
in response to detecting termination of the gesture while moving the first area and the second area:
in accordance with a determination that the gesture meets next-sequence-navigation criteria:
moving the first area completely off the display in the first direction;
moving the second area completely onto the display; and
displaying the second representative image for the second sequence of images in the second area.

29. The electronic device of claim 28, including instructions for:
in response to detecting termination of the gesture while moving the first area and the second area:
in accordance with a determination that the gesture does not meet the next- sequence-navigation criteria:
moving the second area completely off the display in a second direction, opposite the first direction;
moving the first area completely onto the display; and
displaying the first representative image for the first sequence of images in the first area.

30. The electronic device of claim 16, wherein the first sequence of images is a message in a message conversation displayed in a scrollable region of a messaging application, and the first sequence of images is displayed as the scrollable region of the messaging application is scrolled.

31. A non-transitory computer readable storage medium storing one or more programs, the one or more programs comprising instructions, which when executed by an electronic device with a display and a touch-sensitive surface, cause the device to:
store a plurality of sequences of images, wherein a respective sequence of images includes: a respective representative image taken by a camera, and one or more images acquired by the camera before acquiring the respective representative image; display a first representative image for a first sequence of images in a movable first area on the display; detect a gesture on the touch-sensitive surface, the gesture including movement by a contact that corresponds to movement in a first direction on the display; in response to detecting the gesture on the touch-sensitive surface: move the first area in the first direction on the display; move a movable second area in the first direction on the display; and, in accordance with a determination that sequence-display criteria are met, while moving the second area in the first direction, display, in chronological order in the second area, at least some of the one or more images for a second sequence of images acquired by the camera before acquiring a second representative image for the second sequence of images.

32. non-transitory the computer readable storage medium of claim 31, including instructions, which when executed by the electronic device, cause the electronic device to: in response to detecting the gesture on the touch-sensitive surface: in accordance with a determination that the sequence-display criteria are not met, while moving the second area in the first direction, display the second representative image for the second sequence of images in the movable second area on the display.

33. non-transitory the computer readable storage medium of claim 31, wherein the sequence-display criteria include a criterion that the contact lifts off prior to displaying, in chronological order in the second area, at least some of the one or more images for the second sequence of images acquired by the camera before acquiring the second representative image.

34. the non-transitory computer readable storage medium of claim 31, wherein moving the movable second area in the first direction on the display includes displaying a respective prior image that was acquired prior to acquiring the second representative image in the second region.

35. the non-transitory computer readable storage medium of claim 31, wherein the sequence-display criteria include detecting liftoff of the contact; and the one or more programs comprise instructions, which when executed by the electronic device cause the electronic device to: in response to detecting liftoff of the contact, continue to move the moveable second area in the first direction and continue to move the moveable first area in the first direction, wherein the images from the second sequence of images are displayed at a rate such that the second representative image is displayed in the moveable second area when the moveable second area stops moving in the first direction.

36. the non-transitory computer readable storage medium of claim 31, including instructions, which when executed by the electronic device, cause the electronic device to, while moving the moveable first region, display a simulated parallax effect for an image within the moveable first region such that the image within the moveable first region shifts relative to a frame of the moveable first region.

37. the non-transitory computer readable storage medium of claim 31, including instructions, which when executed by the electronic device, cause the electronic device to, while moving the moveable second region while the contact is detected on the touch-sensitive surface, display a simulated parallax effect for an image within the moveable second region such that the image within the moveable second region shifts relative to a frame of the moveable second region.

38. the non-transitory computer readable storage medium of claim 31, wherein a respective sequence of images includes one or more images acquired by the camera after acquiring the respective representative image.

39. the non-transitory computer readable storage medium of claim 31, wherein moving the first area in the first direction includes moving at least part of the first area off of the display in the first direction.

40. the non-transitory computer readable storage medium of claim 31, wherein moving the second area in the first direction includes moving at least part of the second area onto the display in the first direction.

41. the non-transitory computer readable storage medium of claim 31, including instructions, which when executed by the electronic device, cause the electronic device to, after moving the second area in the first direction, display the second representative image for the second sequence of images in the second area.

42. the non-transitory computer readable storage medium of claim 41, including instructions, which when executed by the electronic device, cause the electronic device to: while displaying the second representative image for the second sequence of images in the second area, detect a change in intensity of an input corresponding to the second representative image; and in response to detecting the change in intensity of the input, advance through the second sequence of images in the second area without moving the second area on the display.

43. the non-transitory computer readable storage medium of claim 31, including instructions, which when executed by the electronic device, cause the electronic device to: detect termination of the gesture while moving the first area and the second area; and in response to detecting termination of the gesture while moving the first area and the second area: in accordance with a determination that the gesture meets next-sequence-navigation criteria: move the first area completely off the display in the first direction; move the second area completely onto the display; and display the second representative image for the second sequence of images in the second area.

44. the non-transitory computer readable storage medium of claim 43, including instructions, which when executed by the electronic device, cause the electronic device to: in response to detecting termination of the gesture while moving the first area and the second area: in accordance with a determination that the gesture does not meet the next-sequence-navigation criteria: move the second area completely off the display in a second direction, opposite the first direction; move the first area completely onto the display; and display the first representative image for the first sequence of images in the first area.

45. the non-transitory computer readable storage medium of claim 31, wherein the first sequence of images is a message in a message conversation displayed in a scrollable region of a messaging application, and the first sequence of images is displayed as the scrollable region of the messaging application is scrolled.

* * * * *

UNITED STATES PATENT AND TRADEMARK OFFICE
CERTIFICATE OF CORRECTION

PATENT NO.       : 9,706,127 B2
APPLICATION NO.  : 14/864601
DATED            : July 11, 2017
INVENTOR(S)      : Penha et al.

It is certified that error appears in the above-identified patent and that said Letters Patent is hereby corrected as shown below:

In the Claims

Claim 32, Column 142, Line 44, please delete "non-transitory the computer" and insert
--The non-transitory computer--;

Claim 33, Column 142, Line 53, please delete "non-transitory the computer" and insert
--The non-transitory computer--;

Claim 34, Column 142, Line 60, please delete "the non-transitory" and insert --The non-transitory--;

Claim 35, Column 142, Line 65, please delete "the non-transitory" and insert --The non-transitory--;

Claim 36, Column 143, Line 10, please delete "the non-transitory" and insert --The non-transitory--;

Claim 37, Column 143, Line 17, please delete "the non-transitory" and insert --The non-transitory--;

Claim 38, Column 143, Line 26, please delete "the non-transitory" and insert --The non-transitory--;

Claim 39, Column 143, Line 30, please delete "the non-transitory" and insert --The non-transitory--;

Claim 40, Column 143, Line 34, please delete "the non-transitory" and insert --The non-transitory--;

Claim 41, Column 143, Line 38, please delete "the non-transitory" and insert --The non-transitory--;

Claim 42, Column 144, Line 1, please delete "the non-transitory" and insert --The non-transitory--;

Claim 43, Column 144, Line 11, please delete "the non-transitory" and insert --The non-transitory--;

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,706,127 B2

Claim 44, Column 144, Line 23, please delete "the non-transitory" and insert --The non-transitory--;

Claim 45, Column 144, Line 34, please delete "the non-transitory" and insert --The non-transitory--.